US011345040B2

(12) United States Patent
Oleynik

(10) Patent No.: US 11,345,040 B2
(45) Date of Patent: May 31, 2022

(54) SYSTEMS AND METHODS FOR OPERATING A ROBOTIC SYSTEM AND EXECUTING ROBOTIC INTERACTIONS

(71) Applicant: MBL LIMITED, Jersey (JE)

(72) Inventor: Mark Oleynik, Monaco (MC)

(73) Assignee: MBL Limited, St. Helier (JE)

( * ) Notice: Subject to any disclaimer, the term of this patent is extended or adjusted under 35 U.S.C. 154(b) by 410 days.

(21) Appl. No.: 16/045,613

(22) Filed: Jul. 25, 2018

(65) Prior Publication Data

US 2019/0291277 A1 Sep. 26, 2019

Related U.S. Application Data

(60) Provisional application No. 62/536,625, filed on Jul. 25, 2017, provisional application No. 62/546,022, filed on Aug. 16, 2017, provisional application No. 62/597,449, filed on Dec. 12, 2017, provisional application No. 62/648,711, filed on Mar. 27, 2018, provisional application No. 62/678,456, filed on May 31, 2018.

(51) Int. Cl.
*B25J 9/16* (2006.01)

(52) U.S. Cl.
CPC ............. *B25J 9/1697* (2013.01); *B25J 9/162* (2013.01); *B25J 9/163* (2013.01); *B25J 9/1664* (2013.01); *B25J 9/1669* (2013.01)

(58) Field of Classification Search
CPC . B25J 9/1697; B25J 9/162; B25J 9/163; B25J 9/1664; B25J 9/1669
See application file for complete search history.

(56) References Cited

U.S. PATENT DOCUMENTS

| | | | | |
|---|---|---|---|---|
| 10,131,051 B1 * | 11/2018 | Goyal | .................... | B25J 9/1697 |
| 2010/0274389 A1 * | 10/2010 | Ortmaier | ................ | A61B 34/20<br>700/258 |
| 2011/0067521 A1 | 3/2011 | Linn | | |
| 2012/0249800 A1 * | 10/2012 | George-Svahn | .......... | G01J 5/02<br>348/164 |

(Continued)

OTHER PUBLICATIONS

International Search Report, PCT/IB2018/000949, dated Jan. 7, 2019.

(Continued)

*Primary Examiner* — Jeff A Burke
*Assistant Examiner* — Mohamad O El Sayah
(74) *Attorney, Agent, or Firm* — Radlo & Su; Peter Su

(57) ABSTRACT

Systems and methods are provided for managing a robotic assistant. Environment data corresponding to a current environment is collected to determine a type of the current environment based on the collected environment data. One or more objects in the current environment are detected. The one or more objects are associated with the type of the current environment. For each of the one or more objects, one or more interactions are identified based on a type of the respective object and the type of the current environment. Object libraries corresponding to the one or more objects are downloaded. The object libraries include interaction data corresponding to the respective identified one or more interactions. At least a portion of the one or more interactions are executed upon the respective one or more objects.

45 Claims, 303 Drawing Sheets

(56) References Cited

U.S. PATENT DOCUMENTS

| | | | | |
|---|---|---|---|---|
| 2013/0245824 A1* | 9/2013 | Barajas | B25J 9/1664 700/253 |
| 2013/0345875 A1* | 12/2013 | Brooks | G05B 19/42 700/259 |
| 2017/0113342 A1* | 4/2017 | Abramson | B25J 9/1697 |
| 2017/0203434 A1* | 7/2017 | Ueda | B25J 13/085 |
| 2018/0018518 A1* | 1/2018 | Rajkumar | G06K 9/6296 |
| 2018/0344284 A1* | 12/2018 | Freudenberger | A61B 8/54 |
| 2019/0202058 A1* | 7/2019 | Dai | B25J 9/1697 |

OTHER PUBLICATIONS

International Preliminary Report on Patentability, PCT/IB2018/000949, dated Jun. 19, 2019.

* cited by examiner

Calculating Probability of Desired Result for Multi-Step Cooking Operations probability of success = product of the probabilities of success at all stages probability of success at each stage = probability that any alternative works for that stage $$P(S) = \prod_{S_i \in S} P(s_i | A(s_i))$$

$$P(s_i | A(s_i)) = 1 - \prod_{a_j \epsilon A(s_i)} (1 - P(s_i | a_j)$$

| Non-Standard | Standard |
| --- | --- |
| 0.9 | 0.99 |
| 0.81 | 0.9801 |
| 0.729 | 0.970299 |
| 0.6561 | 0.96059601 |
| 0.59049 | 0.95099005 |
| 0.531441 | 0.941480149 |
| 0.4782969 | 0.932065348 |
| 0.43046721 | 0.922744694 |
| 0.387420489 | 0.913517247 |
| 0.34867844 | 0.904382075 |
| 0.313810596 | 0.895338254 |
| 0.282429536 | 0.886384872 |
| 0.254186583 | 0.877521023 |
| 0.228767925 | 0.868745813 |
| 0.205891132 | 0.860058355 |

72

782
Chef Studio Cooking Capture Process

Database Structure of Minimanipulation (MM) library

| name of MM | code of MM | code(s) of standardized equipment and tools associated with the performance of MM | initial position and orientation of the manipulated (standard or non-standard) objects (ingredients and tools) in a robotic hand | parameters/Variable defined by user (or taking from recorded recipe during execution): | | | | Sequence of robotic hand movements (control signals for all servos) and connecting feedback parameters (from any sensors or video recognizing system) of MM on the timeline. The variables are an initial data information for the sequence. |
|---|---|---|---|---|---|---|---|---|
| | | | | MM Starting coordinate XYZ in the volume of the standardized kitchen module | MM speed | MM object size (may be non-standard) | MM object shape (may non-standard) | |
| | | | | | | | | |
| | | | | | | | | |
| | | | | | | | | |
| | | | | | | | | |

| name of objects | image of object | code of object | virtual 3D model with full dimensions of object in matrix of (XYZ coordinates matrix) (resolution preferably be defined) | virtual vector model of the object (if available) | definition and marking of the working elements of the object (the elements, which may be in contact with hands and other objects for manipulation) | initial standard orientation of object for each specific manipulations |
|---|---|---|---|---|---|---|
| | | | | | | |
| | | | | | | |
| | | | | | | |
| | | | | | | |

86
Storage Station Containers Elevation View (one example)

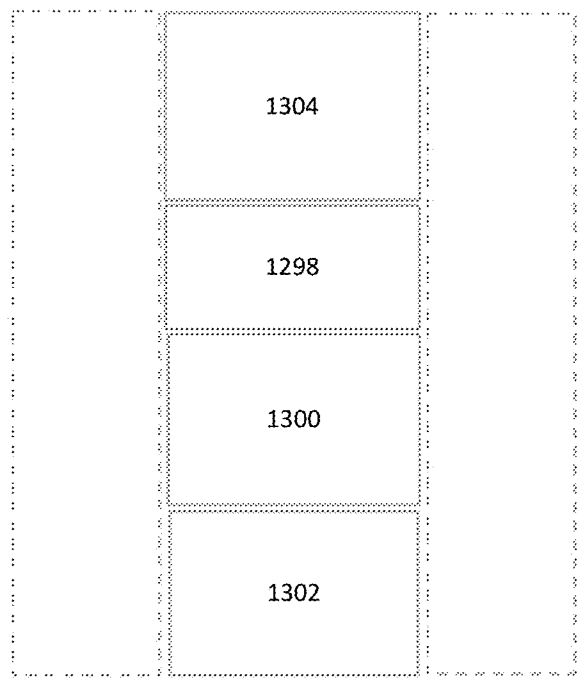

storage (where temperature, humidity, oxygen and other room conditions can be monitored and control).

different setting levels:

1304 pantry/ dry storage 1298 ripening level (12 ~ 14°C) for tropical fruits and tubers vegetables such as potatoes and wine cell level (7 ~ 18°C)

1300 chill level(2 ~ -4°C) for fresh produce, fruit, and meat to confer optimal shelf life 1302 frozen level (-16 ~ -20°C) for frozen meat, bakery and deep freeze level (-28~-30°C): example, for seafood and ice cream

FIG. 39

1392 ingredients inventory overview (e.g.
(dairy, eggs, fruits, legume – meat, seasonings, sweeteners, vegetables & mushrooms)

1394 ingredient nutrition distribution 1396 storage Utilization and allocation 1397 expiration, fulfillment schedule 1398 alerts: decays, abnormal temperature, capacity overloading 1399 voice command for query or ingredient check-in/check-out

1420

1524

1676

1678

1730

1960

50

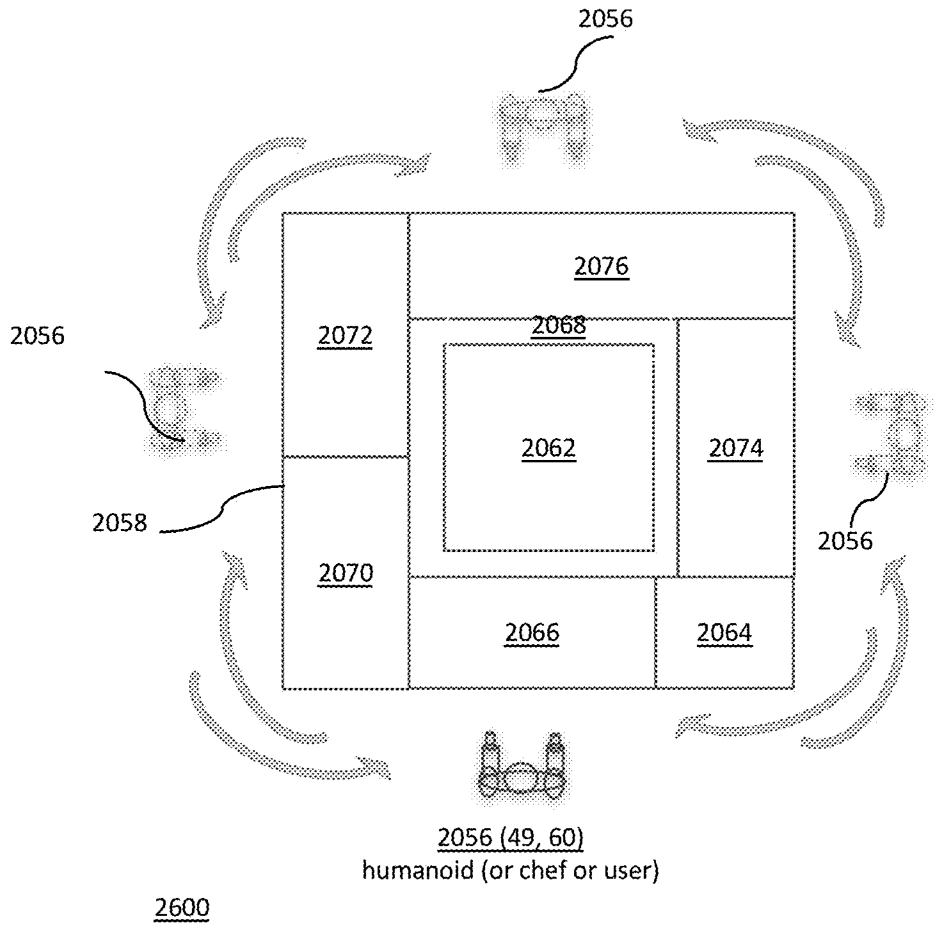

FIG. 62B 2064 user/chef console: interface to schedule dish(es) and have personal setting, overview, and manage recipe 2066 ingredient access station (scanner, camera, sensor, packing line, recycling to inspect, identify, pack and dispose food/ingredient, and move item to designated storage zone)

2062 storage station: different storage areas with different temperature sensors and control (e.g. deep freeze, frozen, chill and other setting for humidity, pressure, light, oxygen, sterilization control and best stability on food/ingredient)

2068 automatic shelf station (for cookware's, bake ware's, container, packing material, table ware, serving ware, dinning ware to be moved automatically for easy access)

2070 wash/cleaning station; control sink, dishwasher, appliance self-cleaning 2072 technique tooling station (to use blade, knife, paddle, whisker, juicer, opener, shear and apply cooking techniques with tooling assembly)

2076 cooking appliance station (oven, stove, griller, steamer, fryer, microwave, dehydrator, range/cooker, blender)

2074 serving station (warmer, cooler, airy)

Robotic Intelligence System

Robotic Human Nursing Care System Process

3050

3160

3180

Data-Centric View of the Robotic Architecture

Subject expert function result and
minimanipulation library example: making Sushi

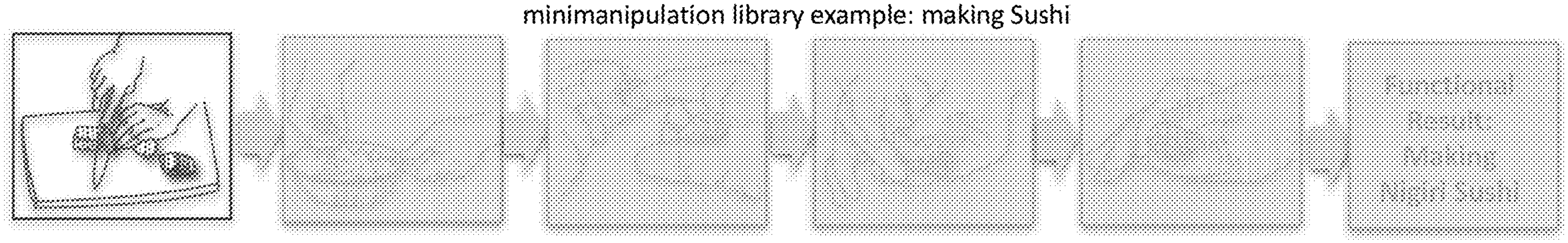

minimanipulation and parameters: Take the whole piece of fish filet from container and lay on cutting board 3351a

| Parameter(variable) value as initially captured in cooking process or defined by creator, or obtaining from three-dimensional volume scanning real time process, or predefined parameters | | | | Application parameters (generated from 3D vision), or predefined parameters |
|---|---|---|---|---|
| Time | (Right) Hand and fingers | (Left) Hand and fingers | Temporary non-standard object library | Standard object |
| Starting and ending | XYZ position and orientation pressure to take out whole fish fillet and put on cutting board | XYZ position and orientation pressure to hold container to keep from moving | <u>Fish fillet</u>:<br>-Size, shape, weight<br>-XYZ position and orientation in container<br>-XYZ position and orientation on the cutting board | <u>Fish fillet container</u>:<br>XYZ position and orientation<br><u>Cutting board</u>:<br>XYZ position and orientation |

minimanipulation and parameters: slice fish and set aside on cutting board 3351b

| | | | | |
|---|---|---|---|---|
| Starting and ending | XYZ position and orientation to hold knife<br>pressure, angle to cut fish and to move each sliced piece aside on the cutting board | XYZ position and orientation pressure on fish fillet to keep from moving | <u>Fish piece</u>:<br>-size, shape, thickness, weight of sliced fish<br>-XYZ position and orientation on the cutting board | <u>Knife</u>:<br>XYZ position and orientation,<br><u>cutting board</u>:<br>XYZ position and orientation |

Subject expert function result and mini-manipulation library example: making Sushi

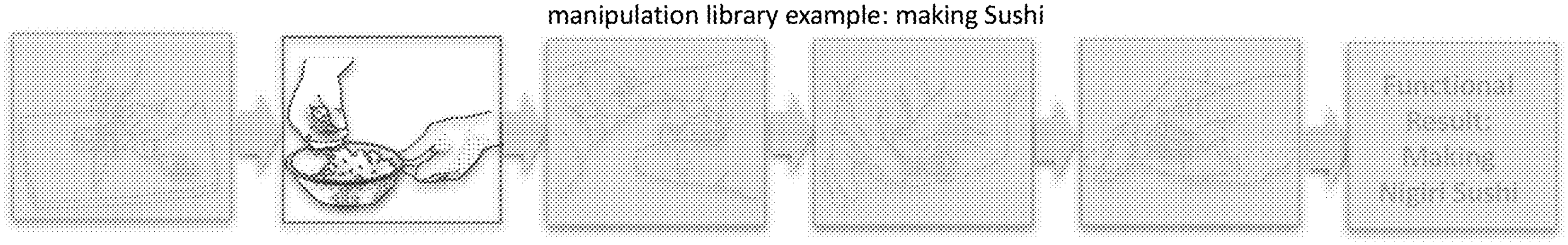

minimanipulation and parameters: Take rice from container 3352a

| Parameter(variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to take out rice from container and hold the rice piece | -XYZ position and orientation<br>-Pressure to hold the rice container to keep from moving | rice:<br>-XYZ position in the container<br>-Amount to take | rice container:<br>XYZ position and orientation |

minimanipulation and parameters: press rice to stick together and shape into a rice log 3352b

| | | | |
|---|---|---|---|
| Starting and ending | -XYZ position and orientation<br>-Pressure to hold and press the rice | -XYZ position and orientation<br>-Pressure to hold and press the rice | Rice log:<br>-Size and shape<br>-XYZ position and orientation |

Subject expert function result and mini-manipulation library example: making Sushi

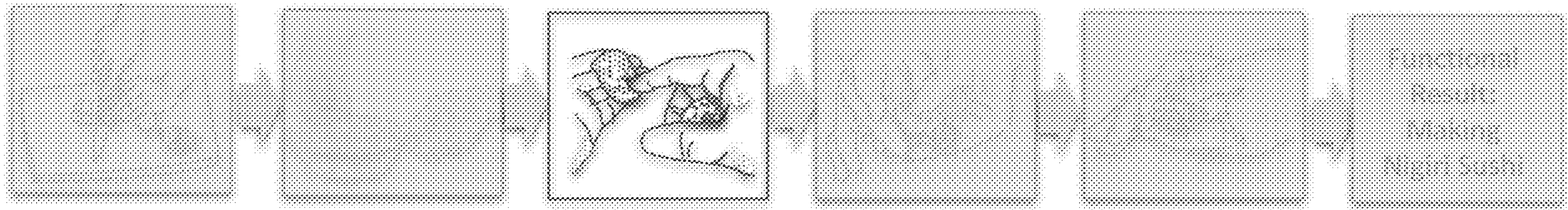

minimanipulation and parameters: Pick up a piece of fish 3353a

| Parameter(variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to hold the rice log | -XYZ position and orientation<br>-Pressure to take targeted fish piece from cutting board | Rice log:<br>XYZ position and orientation in right hand .<br>Fish piece:<br>-XYZ position and orientation on cutting board.<br>-XYZ position and orientation in left hand. | Wasabi container:<br>XYZ position and orientation |

minimanipulation and parameters: Swipe wasabi into the fish piece 3353b

| | | | | |
|---|---|---|---|---|
| Starting and ending | -XYZ position and orientation<br>-pressure to hold the rice log<br>-Pressure to take wasabi piece | -XYZ position and orientation<br>-Pressure to hold fish piece | Wasabi piece :<br>XYZ position and orientation with premeasured amount in container, or take a certain amount in real time<br>Fish piece:<br>-XYZ position and orientation in left hand<br>-Spot of XYZ position to swipe wasabi into. | Wasabi container:<br>XYZ position and orientation |

FIG. 95

Subject expert function result and mini-manipulation library example: making Sushi

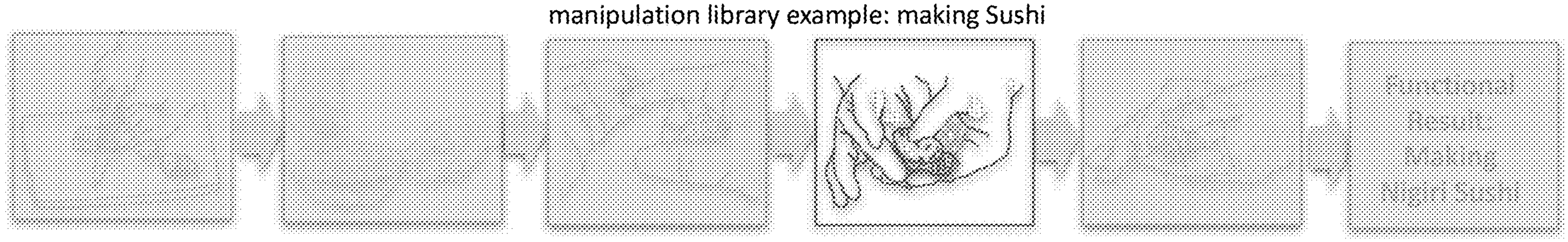

minimanipulation and parameters:
Place the rice log on top of fish and firm up assembled rice/fish to a rectangular shape of hump

3354

| Parameter (variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to press rice log to fish piece | -XYZ position and orientation<br>-Pressure to take targeted fish piece from cutting board | Rice log:<br>XYZ position and orientation in right hand<br>Fish piece:<br>XYZ position and orientation in left hand. | Wasabi container:<br>XYZ position and orientation |

FIG. 96

Subject expert function result and mini-manipulation library example: making Sushi

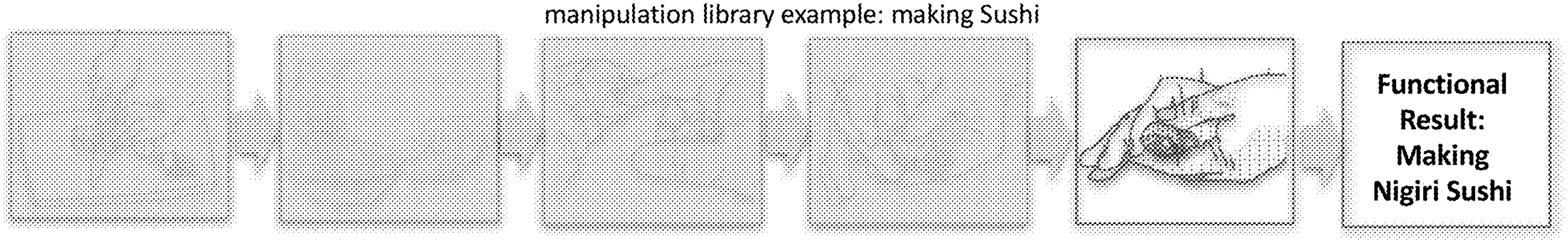

minimanipulation and parameters: :
Flip the assembled rice/fish piece (nigiri) over and press fish to hug the rice 3355

| Parameter (variable) value as initially captured in cooking process | | | Parameter (variable) value as initially captured in cooking process or defined by creator |
|---|---|---|---|
| Time | (Right) Hand and fingers | (Left) Hand and fingers | Temporary non-standard object library |
| Starting and ending | -XYZ position and orientation<br>-Pressure to press and shape assembled rice/fish piece(nigiri) | -XYZ position and orientation<br>-Pressure to press and shape assembled rice/fish piece(nigiri) | Assembled fish/rice piece (nigiri):<br>-XYZ position and orientation in hands<br>-Shape, dimension |

FIG. 97

Subject expert function result and minimanipulation library
example: Playing piano musical composition

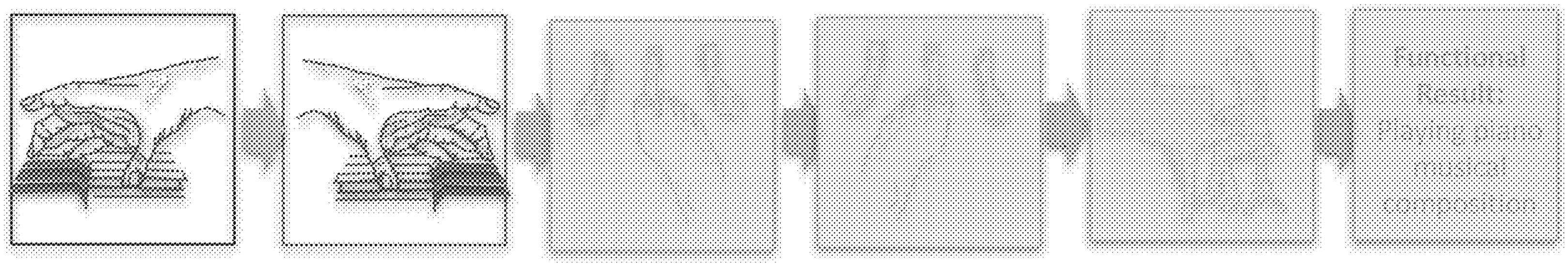

minimanipulation and parameters: Successfully press keys according playing technique 1... n by right hand

| Parameter (variable) value as initially captured in piano playing process or defined by creator | | Pre-defined parameter |
|---|---|---|
| Time | (Right) Hand and fingers | Standard object |
| Time each finger pressing starting and ending period | Define the number of pressing technique for each time period (one time pressing key period, or holding time) – a particular time cycle, where the time cycle could be the same time duration or different time duration | Piano keys: Assign each finger to exact key |

minimanipulation and parameters: Successfully press keys according playing technique 1... n by left hand

| parameter(variable) value as initially captured in piano playing process or defined by creator | | pre-defined parameter |
|---|---|---|
| Time | (Left) Hand and fingers | Standard object |
| Time each finger pressing starting and ending period | Define the number of pressing technique for each time period (one time pressing key period, or holding time) | Piano keys: Assign each finger to exact key |

FIG. 99

Subject expert function result and minimanipulation library example: Playing piano musical composition

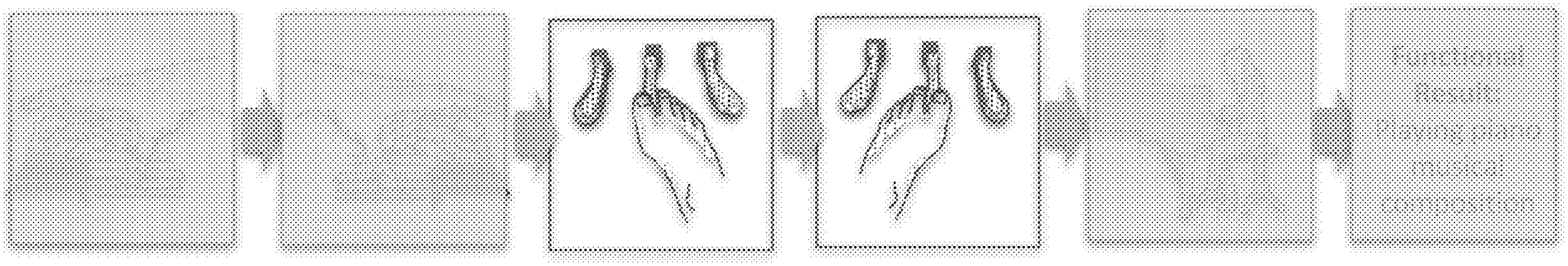

minimanipulation and parameters: Successfully press piano pedal by right foot

| Parameter (variable) value as initially captured in piano playing process or defined by creator | | Pre-defined parameter |
|---|---|---|
| Time | (Right) Foot | Standard object |
| Time each foot pressing starting and ending period | Define the number of pressing technique for each time period (one time pressing key period, or holding time) | Piano pedals:<br>Assigning each feet to sufficient pedal |

minimanipulation and parameters: Successfully press piano pedal by left foot

| Parameter (variable) value as initially captured in piano playing process or defined by creator | | Pre-defined parameter |
|---|---|---|
| Time | (Left) Foot | Standard object |
| Time each foot pressing starting and ending period | Define the number of pressing technique for each time period (one time pressing key period, or holding time) | Piano pedals:<br>Assigning each feet to sufficient pedal |

FIG. 100

Subject expert function result and minimanipulation library example: Playing piano musical composition

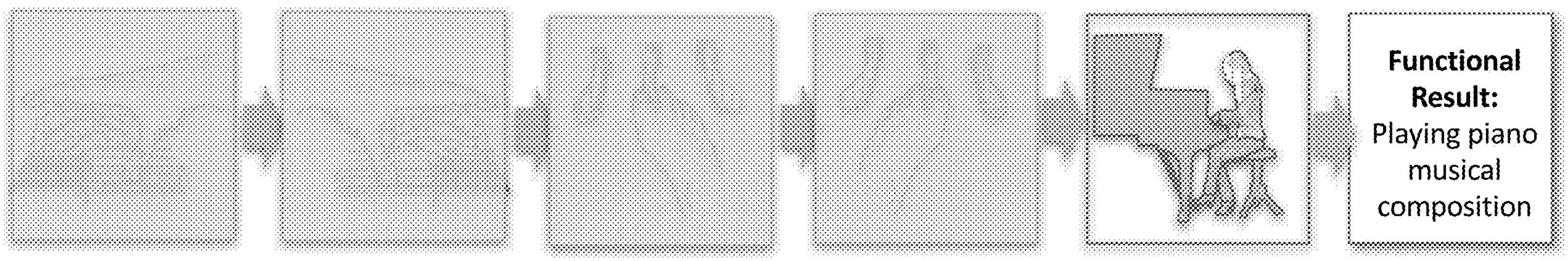

minimanipulation and parameters: Moving the body according Creator motion

| Parameter (variable) value as initially captured in piano playing process or defined by creator | |
|---|---|
| Time | Body |
| Time of staring and ending motions | XYZ initial body position<br>XYZ ending body position in each period of time (one time one direction moving body period |

General function result and minimanipulation library example: Moving by walking from A-position to B-position –based on natural human walking

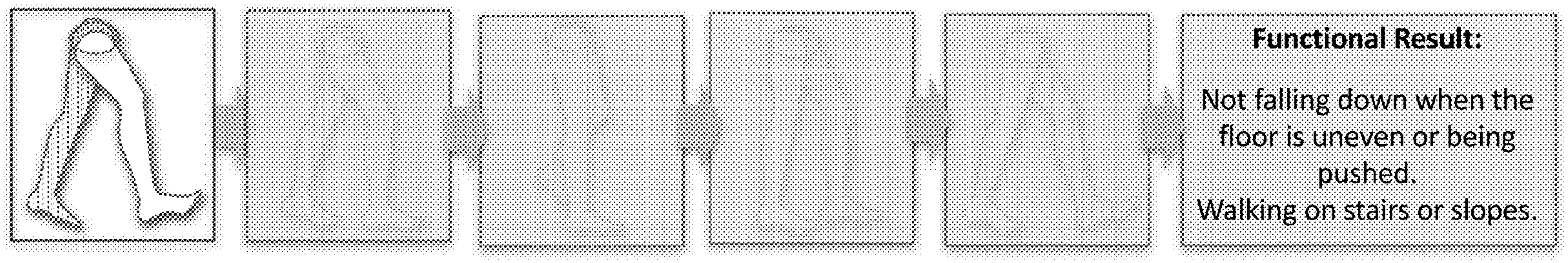

minimanipulation and parameters: the stride 3371

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 103

General function result and minimanipulation library example: Moving by walking from A-position to B-position –based on natural human walking

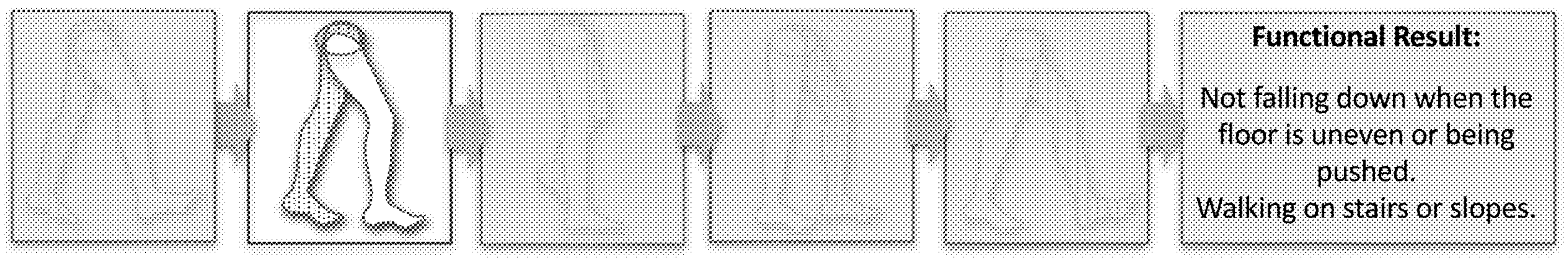

minimanipulation and parameters: the squash 3372

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 104

General function result and minimanipulation library example: Moving by walking from A-position to B-position –based on natural human walking

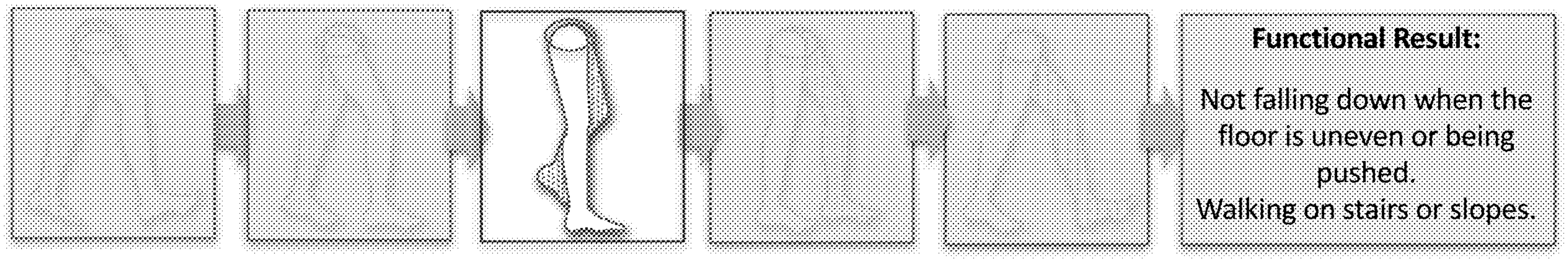

minimanipulation and parameters: the passing 3373

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 105

General function result and minimanipulation library example: Moving by walking from A-position to B-position –based on natural human walking

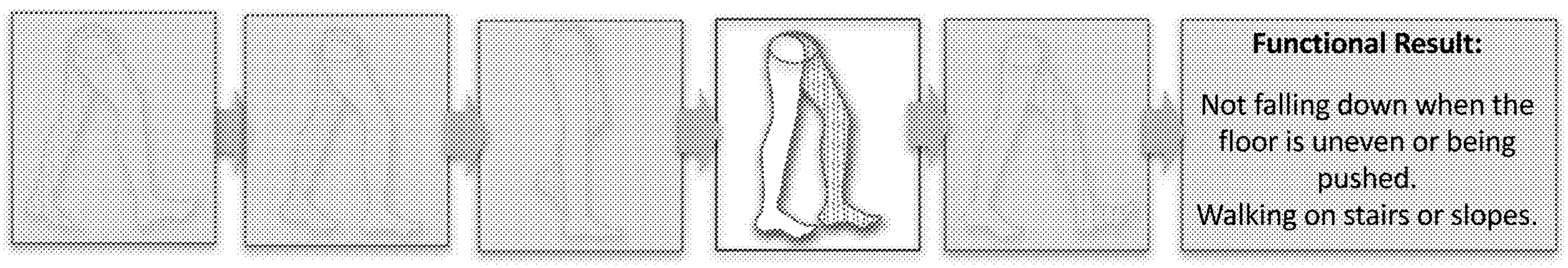

minimanipulation and parameters: the stretch 3374

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 106

General function result and minimanipulation library example: Moving by walking from A-position to B-position –based on natural human walking

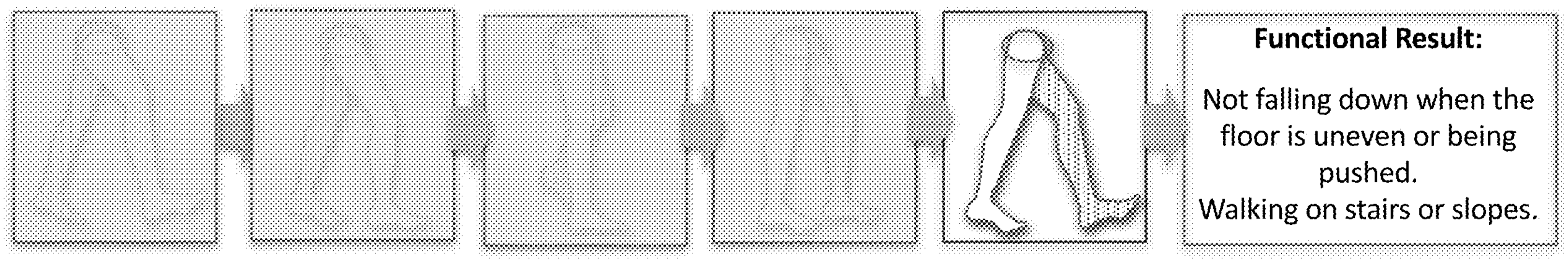

minimanipulation and parameters: the stride (change to the other leg) 3375

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 107

3381
Nursing care suite module – robot arms/hands operating

Task Execution example 1 – helping patient/senior taking medicine

Task Execution example 2 – helping patient/senior moving

Full torque required to move arm

Case 1 : $T_{original}(hand) = (w_{hand} + w_{motor})d_h(hand, elbow)$

Reduced Torque required

Case 2 : $T_{new}(hand) = (w_{hand})d_h(hand, elbow) + (w_{motor})\epsilon_h + \frac{1}{2}w_{axel}d_h(hand, elbow)$ front view top view First explosions
Step grip | steady I plasticine, card, and foam
1. Firs test First explosions
Step grip | steady I plasticine, card, and foam
2.1 knuckle exploration 1/2

First explosions
Step grip | steady I plasticine, card, and foam
2.2 knuckle exploration 2/2

Final proposal
Adjusted loft| precise and angled| PLA
3. Step grip exploration

Loft iterations
Flowing grip| steady and curvilinear | PLA
1. Loft iterations

Loft iterations
Flowing grip| steady and curvilinear | PLA
2.1 taking the loft forward 1/2

Loft iterations
Flowing grip| steady and curvilinear | PLA
2.2 taking the loft forward 2/2

Loft iterations
Flowing grip| steady and curvilinear | PLA
3 taking the loft forward – iterative process Final proposal
Adjusted loft| precise and angled| PLA
Final proposal 1/2

Final proposal
Adjusted loft| precise and angled| PLA
Final proposal 2/2

PALETTE KNIFE

SMALL SPATULAR

FISH SLICE

SMALL SAUCEPAN

WOK

PASTA BASKET

SLAB

CHEF'S KNIFE

BLENDER

SQUEEZY BOTTLE

| Types of functional results: | Functional result | minimanipulations | Parameters (variables) |
|---|---|---|---|
| | Robot making sushi | | |
| | | Taking exact amount of rice from container | 1.XYZ position and orientation of container with rice<br>2. Position rice in the container (temporary library non-standardized objects)<br>3.Amount of rice you need to take, according Creator captured or entered information<br>4.Time of starting, according Creator timeline<br>5. Time of ending, according Creator timeline |
| | | Making sufficient for sushi piece of rice by pressing out by fingers | 1.Size of piece according initial size made by Creator<br>2.Shape of piece according initial size made by Creator<br>3.Position XYZ and orientation where we need to place it<br>4. Fingers pressure to making piece of rice according Creator initial pressure<br>5.Time of starting, according Creator timeline<br>6. Time of ending, according Creator timeline |
| | | Take the whole piece of fish filet from container | 1.XYZ position and orientation of container with fish filet<br>2. Shape of fish filet (temporary non-standardized object library)in container<br>3. Size of fish filet (temporary non-standardized object library) in container.<br>4. XYZ position and orientation of fish filet in container.<br>5. XYZ position and orientation, where we need to put the fish filet<br>6.Time of starting, according Creator timeline<br>7. Time of ending, according Creator timeline |
| | | Cut sufficient for sushi piece of fish by knife of by special device. | 2. Shape of fish filet (temporary non-standardized object library)<br>3. Size of fish filet (temporary non-standardized object library)<br>4. XYZ position and orientation of fish filet on operating place.<br>5.defined by initial Creator cooking thickness of current required piece<br>6. cutting angle, taking from initial Creator cooking process<br>7.Time of starting, according Creator timeline<br>8. Time of ending, according Creator timeline |

FIG. 133A

| | | | |
|---|---|---|---|
| | | Put exact amount of wasabi on the top of piece of rice | 1.XYZ position and orientation of container with pre-measured wasabi pieces<br>2. XYZ position and orientation of targeted wasabi piece (temporary non-standardized object library).<br>3. XYZ position where we need to put the wasabi piece according the shape of piece of rice and Creator place choice<br>3. Pressure of pushing wasabi in piece of rice according Creator initial pressure<br>4.Time of starting, according Creator timeline<br>5. Time of ending, according Creator timeline |
| | | Put piece of fish on the top of piece of rice in sufficient way | 1.XYZ position and orientation of catted piece of fish<br>2. XYZ position and orientation of prepared piece of rice<br>3. XYZ position and orientation where we need to place cut piece of fish<br>4.Time of starting, according Creator timeline<br>5. Time of ending, according Creator timeline |
| | | Press out the sushi by fingers | 1.XYZ position and orientation of piece of rice with fish on the top<br>2. Pressure of pinch according of Creator initial pinch<br>3.Time of starting, according Creator timeline<br>4. Time of ending, according Creator timeline |
| | Robot playing piano musical composition | | |
| | | Successfully press keys according playing technique 1... n by right hand | 1.Time each finger pressing starting and ending period<br>2. Define the number of pressing techniques<br>3.Assign each finger to exact key number |
| | | Successfully press keys according playing technique 1... n by left hand | 1.Time each finger pressing starting and ending period<br>2. Define the number of pressing techniques<br>3.Assign each finger to exact key number |
| | | Successfully press pedal piano by feet | 1.Time each feet pressing starting and ending period<br>2. The number of pressing techniques<br>3. Assigning each feet to sufficient pedal |
| | | Moving the body according Creator motion | 1.XYZ initial body position<br>2. XYZ ending body position<br>3. Time of starting motion<br>4. Time of ending motion |

FIG. 133B

| | | | |
|---|---|---|---|
| | Robot moving by walking from A-position to B-position. | Making walking step by right leg | 1.Speed (starting and ending time)<br>2.XYZ initial and target position<br>3. Height of leg raising depends of any barriers on the way<br>4. Type of stepping technique |
| | | Making walking step by left leg | 1.Speed (starting and ending time)<br>2.XYZ initial and target position<br>3. Height of leg raising depends of any barriers on the way<br>4. Type of stepping technique |
| | Robot moving by running from A to B position | Making running step by right leg | 1.Speed (starting and ending time)<br>2.XYZ initial and target position<br>3. Height of leg raising depends of any barriers on the way<br>4. Type of stepping technique |
| | | Making running step by left leg | 1.Speed (starting and ending time)<br>2.XYZ initial and target position<br>3. Height of leg raising depends of any barriers on the way<br>4. Type of stepping technique |
| | Robot jumping from A to B position | | |
| | Robot taking particular book from shelf | | |
| | Robot bringing bag form A position to B position | | |
| | Robot opening the jar | | |
| | Putting food in a bowl for a cat | | |

FIG. 133C

Manipulation – REGULAR

| Manipulation | 1st level | 2nd level |
|---|---|---|
| Measurement | | |
| | Measurement of body temperature | |
| | | Basal body temperature (observable entity) |
| | | Breast temperature (observable entity) |
| | | Axillary temperature (observable entity) |
| | | Bladder temperature (observable entity) |
| | | Groin temperature (observable entity) |
| | | Nasopharyngeal temperature (observable entity) |
| | | Oral temperature (observable entity) |
| | | Rectal temperature (observable entity) |
| | | Temperature of esophagus (observable entity) |
| | | Temperature of vagina (observable entity) |
| | | Tympanic temperature (observable entity) |
| | | Joint temperature (observable entity) |
| | | Temperature of digit (observable entity) |
| | | Temperature of pinna (observable entity) |
| | | Temperature of skin (observable entity) |
| | Measurement of Blood pressure | |
| | Measurement of heart rate | |
| | Measurement of respiratory rate | |
| | Measurements of a body | |
| | | Growth |
| | | Weight |
| | | head circumference |
| | | chest circumference |
| | | hip circumference |
| Lavage | | |
| | Gastric lavage | |
| | | Gastric lavage with instillation of therapeutic substance |
| | | Gastric lavage with water |
| | | Nasogastric irrigation |
| | Irrigation of bowel | |
| | Irrigation of bowel | |
| | Irrigation of colon | |
| | Irrigation of colon via cecostomy tube | |
| | Rectal irrigation | |
| | Rectal stump washout via rectum | |
| | Rectal stump washout via stoma | |
| | Irrigation of gastrostomy | |

FIG. 134A

| | | |
|---|---|---|
| | Irrigation of nasoenteral probe | |
| | Irrigation of nasogastrall probe | |
| | Irrigation of ear | |
| | | Syringing ear to remove wax |
| | Irrigation of eye | |
| | Irrigation of nasal passages | |
| | | Displacement therapy of nose, Proetz type |
| | | Irrigation of nasal sinus |
| | | Aspiration and lavage of nasal sinus by puncture |
| | | Displacement therapy of nose, Proetz type |
| | | Irrigation by cannulation of sphenoid sinus |
| | | Irrigation of maxillary antrum |
| | | Irrigation by cannulation of maxillary sinus |
| | | Nasal sinus puncture and irrigation |
| | pharynx Irrigation | |
| | Irrigation of ureteral catheter | |
| | | Irrigation of indwelling urinary catheter |
| | Irrigation of ureterostomy and ureteral catheter | |
| | Irrigation of ureterostomy | |
| | Irrigation of ureterostomy and ureteral catheter | |
| | Irrigation of urethra | |
| | Irrigation of urinary bladder | |
| | Irrigation of cystostomy | |
| | Manual bladder washout through catheter | |
| | Urethral irrigation of bladder | |
| | Stoma irrigation | |
| | Irrigation of enterostomy | |
| Supplemental oxygen | | |
| Maintenance of body temperature | | |
| | Active rewarming of the hypothermic patient | |
| | Cooling - control body temperature | |
| Catheterization | | |
| | Catheterization of nasal sinus | |
| | Catheterization of ureter | |
| | | Cystoscopic catheterization of ureter |
| | | Cystostomy with insertion of ureteral catheter |
| | | Retrograde catheterization of ureter |
| | Catheterization of urinary bladder | |
| | | Bladder catheter - diagnostic |
| | | Urethral catheterization for urodynamics |
| | | Catheterization of bladder by indwelling suprapubic catheter |
| | | Complicated catheterization of bladder |
| | | Cystostomy and insertion of suprapubic catheter |

FIG. 134B

| | | |
|---|---|---|
| | | Insertion of indwelling catheter into urinary bladder |
| | | Insertion of suprapubic catheter using ultrasound guidance |
| | | Residual catheterization |
| | Insertion of catheter into esophagus, permanent tube type | |
| | Insertion of chronic ambulatory peritoneal dialysis catheter | |
| | | Insertion of dialysis catheter using doppler ultrasound guidance |
| | Insertion of nontunneled hemodialysis catheter | |
| | Insertion of urethral catheter | |
| | | Insertion of indwelling urethral catheter |
| | | Insertion of urethral catheter using guide wire |
| | | Intermittent urethral catheterization |
| | | Clean intermittent self-catheterization |
| | | Urethral catheterization for urodynamics |
| | Insertion of vascular catheter | |
| | Catheterization of vein | |
| | Catheterization of brachial vein | |
| | Catheterization of neck vein | |
| | Jugular vein catheterization | |
| | Catheterization of external jugular vein | |
| | Catheterization of subclavian vein | |
| | Catheterization of vein of lower limb | |
| | Catheterization of vein of upper limb | |
| | Central venous cannula insertion | |
| | Central venous cannula insertion via antecubital fossa vein | |
| | Central venous cannula insertion via axillary vein | |
| | Central venous cannula insertion via femoral vein | |
| | Central venous cannula insertion via jugular vein | |
| | Central venous cannula insertion via external jugular vein | |
| | Central venous cannula insertion via long saphenous vein | |
| | Central venous cannula insertion via subclavian vein | |
| | Insertion of subclavian feeding line | |
| | Central venous cannula insertion via umbilical vein | |
| | Insertion of catheter for central venous pressure monitoring | |
| | Insertion of central venous catheter using doppler ultrasound guidance | |
| | Insertion of cuffed central venous catheter | |
| | Insertion of nontunneled central venous catheter | |
| | Insertion of peripherally inserted central catheter | |
| | Insertion of peripherally inserted central catheter using fluoroscopic guidance | |
| | Percutaneous transluminal insertion of peripherally inserted central catheter | |
| | Insertion of tunneled venous catheter | |
| | Reinsertion of tunneled central venous catheter | |
| | Insertion of catheter with venous sampling | |
| | Bilateral insertion of catheter with bilateral venous sampling | |
| | Intravenous insertion | |

FIG. 134C

| | | |
|---|---|---|
| | Venous catheterization for renal dialysis | |
| | Insertion of catheter into artery | |
| | Introduction of catheter, retrograde, brachial artery | |
| | Introduction of catheter into carotid artery | |
| | Umbilical artery cannula insertion | |
| | Adjustment of chronic ambulatory peritoneal dialysis catheter | |
| | Aspiration of chronic ambulatory peritoneal dialysis catheter | |
| | Flushing of chronic ambulatory peritoneal dialysis catheter | |
| | Insertion of chronic ambulatory peritoneal dialysis catheter | |
| | Removal of chronic ambulatory peritoneal dialysis catheter | |
| | Renewal of chronic ambulatory peritoneal dialysis catheter | |
| | Insertion of peritoneal dialysis catheter using fluoroscopy guidance | |
| | Insertion of temporary peritoneal dialysis catheter | |
| | Laparoscopic insertion of peritoneal dialysis catheter | |
| | Peritoneal dialysis catheter procedure using fluoroscopic guidance | |
| | Removal of peritoneal dialysis catheter | |
| | Removal of chronic ambulatory peritoneal dialysis catheter | |
| | Replacement of peritoneal dialysis catheter | |
| | Renewal of chronic ambulatory peritoneal dialysis catheter | |
| | Shaving of peritoneal dialysis catheter cuff | |
| | Repositioning of Tenckhoff catheter | |
| | Venous catheter care | |
| | | Care of central venous catheter |
| | | Care of tunneled central venous catheter |
| Physiotherapy | | |
| | massage | |
| | passive mobilization | |
| | | Continuous passive mobilization of ankle |
| | | Continuous passive mobilization of elbow |
| | | Continuous passive mobilization of fingers |
| | | Continuous passive mobilization of hip |
| | | Continuous passive mobilization of knee |
| | | Continuous passive mobilization of shoulder |
| | | Continuous passive mobilization of wrist |
| | Exercises for paralysis | |
| | Exercises for rigidity | |
| | Exercises for spasticity | |
| | Physical exercises | |
| | | Active exercise |
| | | Assisting exercise |
| | | Muscle strength exercise |
| | | Relaxation exercise |
| | Physical medicine ultrasound treatment | |

FIG. 134D

| | | |
|---|---|---|
| | Physical rehabilitation therapy procedure | |
| | | Care of stump technique |
| | | Control of phantom sensation technique |
| | | Protection of stump technique |
| | | Cerebral palsy rehabilitation |
| | | Doffing lower limb prosthesis practice |
| | | Donning lower limb prosthesis practice |
| | | Functional rehabilitation |
| | | Gait evaluation |
| | | Locomotor training |
| | | Transfers with patient participation |
| | | Lower limb amputee transfer practice |
| | | Wheelchair transfer practice |
| | | Walking practice |
| | | Walking with patient - mobilization |
| | | Weight transfer practice |
| | | Joint disease rehabilitation |
| | | Physical medicine initial examination and planning for rehabilitation program |
| | | Sensorimotor techniques |
| | | Biomechanical therapeutic activity |
| | | Biomechanical remedial activity |
| | | Body mechanics promotion |
| | | Range of motion activity |
| | | Lower limb activities |
| | | Range of motion exercise |
| | | Upper limb activities |
| | | Motor retraining technique |
| | | Neurodevelopmental techniques |
| | | Developmental therapy |
| | | Movement facilitation |
| | | Activity for ontogenetic motor pattern |
| | | Kinetic activities for coordination |
| | | Kinetic activities for range of motion |
| | | Kinetic activities for strengthening |
| | | Movement experience |
| | | Neurological functional rehabilitation |
| | | Neuromuscular stimulation |

FIG. 134E

| | | |
|---|---|---|
| | | Reciprocal arm movements |
| | | Reflex inhibition |
| | | Reflex inhibiting patterning |
| | | Reflex inhibiting posture |
| | | Rhythmic stabilization |
| | | Rhythmical bouncing |
| | | Trunk elongation |
| | | Weight transference - neurological |
| | | Weight-bearing - neurological |
| | | Weight-bearing through affected side |
| | | Play therapy |
| | | Competitive games psychotherapy |
| | | Group trust experience games |
| | | Minor group games for therapy |
| | | Minor team games for therapy |
| | | Pair activity games for therapy |
| | | Relay games for therapy |
| | | Team games for therapy |
| hygienic procedures | | |
| | Assisting with mouthcare | |
| | Assisting with personal grooming | |
| | Assistance with shaving | |
| | Assisting with haircare | |
| | Assistance with hair styling | |
| | Assistance with washing hair | |
| | Assisting with nail care | |
| | Self-care assistance: bathing/hygiene | |
| | Assisting with toileting | |
| | | Give bedpan, remove and clean |
| | | Give urinal, remove and clean |
| | | Placing a patient on a bedpan |

FIG. 134F

| | |
|---|---|
| | Rectal tube insertion |
| feeding | |
| | Bottle feeding of patient |
| | Fluid intake encouragement |
| | Food intake encouragement |
| | Forced feeding of patient |
| | Intravenous feeding of patient |
| | Parenteral alimentation procedure |
| | Central line feeding |
| | Prolonged intravenous feeding |
| | Peripheral line feeding |
| | Total parenteral nutrition |
| | Mealtime assistance |
| | Nil by mouth |
| | Re-introduction of fiber |
| | Routine feeding of patient |
| | Self-care assistance: feeding |
| Sampling for analyses | |
| | blood sampling |
| | urine sampling |
| | scraping |
| | stool sampling |
| | smear sampling |
| Care of stoma and catheters | |
| | Assessment of stoma self care |
| | Assessment of cathether self care |
| Care of a wound | |
| | Application of pressure to wound |
| | Change of wound pack |
| | Chemical cauterization of wound |
| | Cleaning wound |
| | Dressing of wound |

FIG. 134G

| | | |
|---|---|---|
| | Exploration of wound | |
| | Gluing of wound | |
| | Glue closure of skin wound | |
| | Immobilization of wound | |
| | Irrigation of wound | |
| | Closure of skin wound by tape | |
| | Shave debridement of skin wound | |
| | Wound care | |
| | | Closed drainage wound care |
| | | Post-surgical wound care |
| | | Special care of wound |
| | | Wound infiltration |
| | | Wound infiltration of local anesthetic |
| Methods of administering drugs | | |
| | Oral | |
| | parenterally (injections) | |
| | | Subcutaneously |
| | | Intramuscularly |
| | | intra-arterial |
| | | intravenously (dropper) |
| | | intravenously (bolus) |
| | inhaler (or puffer) | |
| | per rectum | |
| | vaginal (pessary) | |
| | sublingual | |
| | intra-nasal | |
| | eye drops | |
| | ear drops | |
| | topical skin cream | |
| | nebuliser | |
| | Installation of dropper | |

FIG. 134H

| | | |
|---|---|---|
| | | arm |
| | | leg |
| | | subclavicular vein |
| | intramuscular injection execution | |
| | | buttock |
| | | thigh |
| | | arm |
| | | other |
| | subcutaneous injection execution | |
| | | shoulder |
| | | thigh |
| | | subscapular |
| | | abdomen |
| | "per os" drug administration | |
| | ointment applying | |
| | Eye drops instillation | |
| | | eye |
| | | ear |
| | general anaesthetic | |
| | local anaesthetic | |
| | regional block | |
| | nerve block | |
| | entonox | |
| | sedation | |

FIG. 134I

Manipulation – EMERGENCY

| Manipulation | 1st level | 2nd level |
|---|---|---|
| Intubation | | |
| Resuscitation/cardiopulmonary resuscitation | | |
| | Cardiac reanimation | |
| | Chest compressions | |
| | Defibrillation/pacing | |
| | | - defibrillation |
| | | - external pacing |
| | Artificial respiration | |
| | Artificial respiration | |
| | Continuous positive airways pressure/nasal intermittent positive pressure ventilation/bag valve mask | |
| | Nasal airway | |
| | Oral airway | |
| replenishment of blood loss | | |
| | blood transfusion | |
| | Transfusion of blood components | |
| | Saline infusion | |
| Hemostasis | | |
| | Rainey clips | |
| | Tourniquet | |
| | Bandage | |
| | injection hemostasis | |
| | Suture | |
| Emergency manipulation on trachea | | |
| | Tracheostomy | |
| | cricothyrotomy | |
| Fracture of bone | | |
| | Immobilization | |
| | Splinting | |
| | Fracture review | |
| | Joint aspiration | |
| | Plaster of Paris | |
| | | application Plaster of Paris |
| | | removal Plaster of Paris |
| Wound closure (excluding sutures) | | |
| | Steri-Strips | |
| | wound glue | |
| | other (e.g. clips) | |

FIG. 135

Equipment List

| | | |
|---|---|---|
| Equipment | | |
| | CPAP / BIPAP | |
| | | Chin Restraint |
| | | CPAP water chambers |
| | | CPAP humidifiers |
| | | CPAP mask pads |
| | Oxygen Concentrator | |
| | | Oxygen Cylinders |
| | Compressor Nebulizer System | |
| | Willchair | |
| | Apnea Monitors | |
| | Ventilators | |
| | Monitor | |
| | defibrillator | |
| | pulseoxymeter | |
| | Ambu's bag | |
| | tonometer | |
| | thermometer | |
| | irrigator | |
| Expendables | | |
| | Test tubes | |
| | Syringes | |
| | Catheter urethral | |
| | nteric feeding tube | |
| | Bed Pan | |
| | Tube rectal | |
| | Infusional system | |
| | Needle | |
| | Catheter intravenous | |
| | urinal | |
| | ostomy pouching system | |
| | Catheter aspiration | |
| | Tube for an intubation | |
| | bandage | |
| | plait | |
| | dressing | |
| Medication | | |
| | morphine | |
| | adrenaline | |
| | atropine | |
| | physical solution | |

FIG. 136

Nursery Service - Manipulation Guide

| Manipulation | minimanipulations |
|---|---|
| Intramuscular injection (in the buttock) | |
| -Preparation for manipulation: | |
| | 1. Help the patient to adopt the necessary position. |
| | 2. remove the clothing at the injection site |
| | 3. treat your hands with untiseptic solution |
| -Guidelines | |
| | 1. Define a place (XYZ coordinates and shape) of insertion of a needle |
| | 2. Treat the place by untiseptic from the center to the periphery (or from bottom to up) a large area of skin |
| | 3. Treat by untiseptic the puncture site |
| | 4. Open the steril syringe pack |
| | 5. Wipe by untiseptic the top of the ampule or vial. |
| | 6. Open the ampule or vial. |
| | 7. Take the necessary amount of drug into the syringe |
| | 8. Take the syringe in a right hand |
| | 9. Shift the skin using the left hand over the injection site |
| | 10. Insert a needle with exact power into the muscle at 90 degrees to a predetermined depth. |
| | 11. Move your left robotic hand on the plunger and push gently (inject the drug into a muscle). |
| | 12. Press the antiseptic wipes to the injection site and quickly withdraw the needle. |
| | 13. Discard syringe and materials to the waste container |
| Intravenous injection - jet injection (subcutaneous veins of the anterior surface of the forearm and elbow) | |
| -Preparation for manipulation: | |
| | 1. Help the patient to adopt the necessary position. |
| | 2. remove the clothing at the injection site |
| | 3. treat the robotics hands with antiseptic |
| -Guidelines | |
| | 1. Open the steril syringe pack |
| | 2. Wipe by untiseptic the top of the ampule or vial. |
| | 3. Open the ampule or vial. |
| | 4. Take the necessary amount of drug into the syringe |
| | 5. Put on the gloves on the robotic hands |
| | 6. Apply venous tourniquet on the middle third of the shoulder through the disposable diaper or napkin (or clothes). |
| | 7. Ask the patient to stretch and relax the fist for a few times. |
| | 8. Find and palpate the most accessible and filled vein (select vein for injection). |
| | 9. Treat from the center to the periphery (or from bottom to up) a large area of skin with the first ball, |
| | 10. Ask the patient to make a fist |

FIG. 137A

| | |
|---|---|
| | 11. Treat the injection site with the antiseptic wipes |
| | 12.Shift the elbow skin (using the left thumb), fixing the vein |
| | 13.Take the syringe in the right hand, holding the index finger on the cannula needle, place the needle parallelly to the surface, gently (with power X) pierce the skin and vein (simultaneously or successively) and slide 1/3 length of the needle to feel the "falling into the void", or the appearance of blood in the cannula and the syringe barrel; |
| | 14.Pull the plunger and ensure that the blood appeared in the syringe barrel; |
| | 15.Untie the tourniquet by pulling one of the ends. |
| | 16. Ask the patient to unclench his fist. |
| | 17. Pull the plunger to check the needle contact with a vein. |
| | 18. Gently push the plunger (Inject the drug), without changing the position of the syringe |
| | 19.Apply the antiseptic wipes to the injection site and remove the needle from the vein |
| | 20.Ask the patient to bend the arm, leaving the ball at the puncture site to stop bleeding |
| | 21. Discard syringe and materials to the waste container |
| Defibrillation | |
| -Equipment: | |
| | Defibrillator |
| -Guidelines | |
| | 1. Place the patient on his back on a surface |
| | 2. Open the chest surface |
| | 3. Prepare the chest surface to the attachment of the electrodes |
| | 4. Turn on the power. |
| | 5. Place the first electrode over an area of cardiac dullness (women - outwards from the apex of the heart, beyond the breast) |
| | 6. Place the second electrode under the right clavicle (at the right edge of the sternum directly below the clavicle), and if it is the dorsal electrode, then under the left scapula. |
| | 7. Do not touch the patient and equipment |
| | 8. Wait for completion of the ECG and the information about the need to discharge |
| | 9. Determine the readiness of equipment for electric discharge |
| | 10. Do not touch the patient |
| | 11. Push on "discharge" button after the defibrillator is ready |
| | 12. Open the chest surface |

FIG. 137B

Equipment List

| | | |
|---|---|---|
| Equipment | | |
| | CPAP / BIPAP | |
| | | Chin Restraint |
| | | CPAP water chambers |
| | | CPAP humidifiers |
| | | CPAP mask pads |
| | Oxygen Concentrator | |
| | | Oxygen Cylinders |
| | Compressor Nebulizer System | |
| | Willchair | |
| | Apnea Monitors | |
| | Ventilators | |
| | Monitor | |
| | defibrillator | |
| | pulseoxymeter | |
| | Ambu's bag | |
| | tonometer | |
| | thermometer | |
| | irrigator | |
| Expendables | | |
| | Test tubes | |
| | Syringes | |
| | Catheter urethral | |
| | nteric feeding tube | |
| | Bed Pan | |
| | Tube rectal | |
| | Infusional system | |
| | Needle | |
| | Catheter intravenous | |
| | urinal | |
| | ostomy pouching system | |
| | Catheter aspiration | |
| | Tube for an intubation | |
| | bandage | |
| | plait | |
| | dressing | |
| Medication | | |
| | morphine | |
| | adrenaline | |
| | atropine | |
| | physical solution | |

FIG. 138

| AP Name | APSB Name | Keep other Arm in position | Robot side | Grasping status | Header object model name | Header object frame name | Child object model name | Child object frame name | Palm cartesian Trajectory | Time from start | Constraints | Palm joint trajectory | Fingers joint trajectory | Vision command | Appliance command |
|---|---|---|---|---|---|---|---|---|---|---|---|---|---|---|---|
| Get-small-container-L | approach-and-grasp-small-container-L | FALSE | LEFT | GRASP | container_small | handle_center | left_hand | left_palm_fr | | ame | <TrajectoryData | Take image> | 0 | | <Trajectory Dat |
| | lift-small-container-L | FALSE | LEFT | UNCHANGED | container_small | center | container_small | center | <Tr ajectory Data> | 5 | | | | | |
| Get-spoon-R | approach-and-grasp-spoon-R | FALSE | RIGHT | GRASP | spoon | handle_center | right_hand | right_palm_frame | <Tra jectory Data> | 8 | | | <Trajectory Data> | <Take image> | |
| | lift-spoon-R | FALSE | RIGHT | UNCHANGED | spoon | handle_center | spoon | handle_ce nter | <Trajectory Data> | 13 | | | | | |
| Move-contents-from-container-to-pot-L | approach-small-pot-horizontally-with-small-container-L | FALSE | LEFT | UNCHANGED | pot_small | upper_center | container_small | pouring_b order | <Trajectory Data> | 18 | KEEP_ORIENTATION | | | | |
| | tilt-container-small-for-removal-L | FALSE | LEFT | UNCHANGED | container_small | pouring_border | container_small | pouring_border | <Trajectory Data> | 23 | | | | | |
| | remove-sticky-content-of-small-container-R | TRUE | RIGHT | UNCHANGED | container_small | center | spoon | tip | | 35 | | <Trajectory Da ta> | | | |
| Put-back-spoon-R | approach-slot-with-spoon-and-release-R | TRUE | RIGHT | RELEASE | kitchen | spoon_slot | spoon | handle_center | <Trajectory Data> | 40 | | | <Trajectory Data> | | |
| | depart-from-spoon-R | TRUE | RIGHT | UNCHANGED | spoon | handle_center | right_hand | right_palm_frame | <Trajectory Data> | 45 | | | | | |
| Dispose-small-container-L | dispose-small-container-L | FALSE | LEFT | RELEASE | kitchen | sink | container_small | center | <Trajectory Dat a> | 50 | | | <Trajectory Data> | | |

Fig. 148

$$s\begin{bmatrix}u\\v\\1\end{bmatrix}=\begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

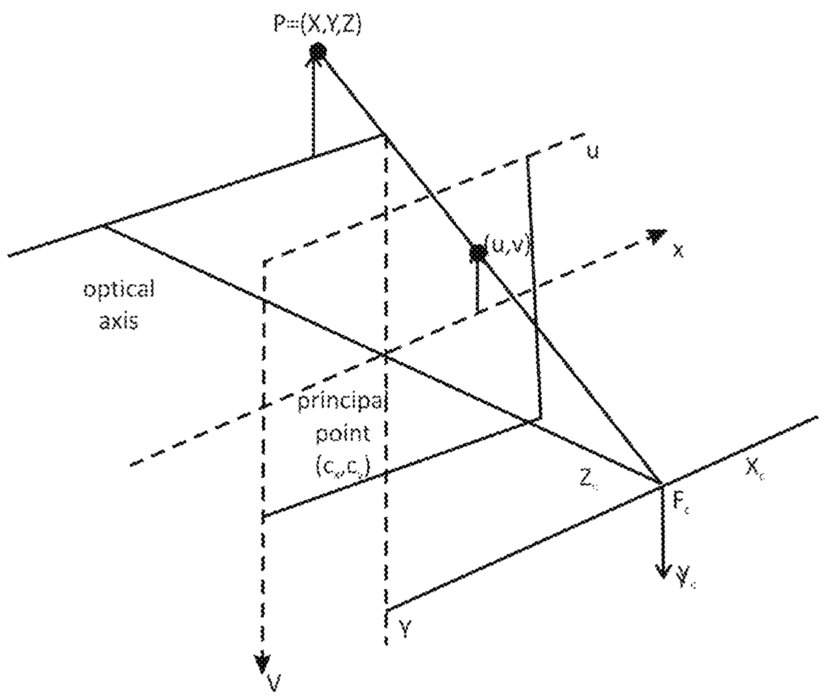

$$\begin{bmatrix}(\cos\varphi*\cos\phi+\sin\varphi*\sin\theta*\sin\phi) & (\sin\varphi*\cos\phi-\cos\varphi*\sin\theta*\sin\phi) & (\cos\theta*\sin\phi) & 0\\(-\sin\varphi*\cos\theta) & (\cos\varphi*\cos\theta) & (\sin\theta) & 0\\(\sin\varphi*\sin\theta*\cos\phi-\cos\varphi*\sin\phi) & (-\cos\varphi*\sin\theta*\cos\phi-\sin\varphi*\sin\phi) & (\cos\theta*\cos\phi) & 0\\0 & 0 & 0 & 1\end{bmatrix}$$

where:

$\theta$=rotation around the x-axis (pitch)

$\phi$=rotation around the y-axis (roll)

$\varphi$=rotation around the z-axis (yaw)

Fig. 158B

Kitchen

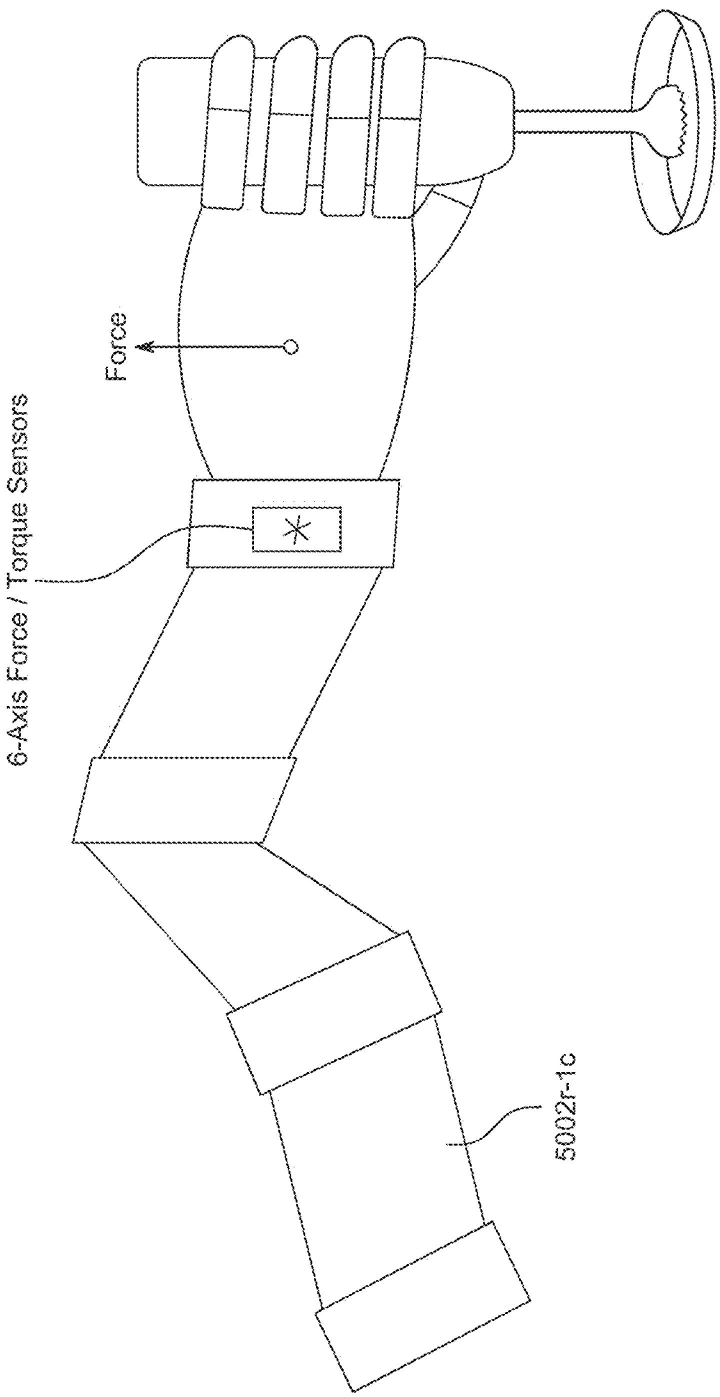
Fig. 164F(1)

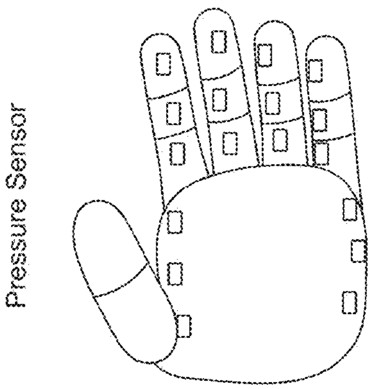
Fig. 164F(3)
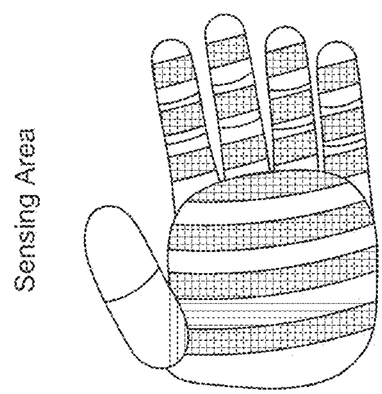
Fig. 164F(4)
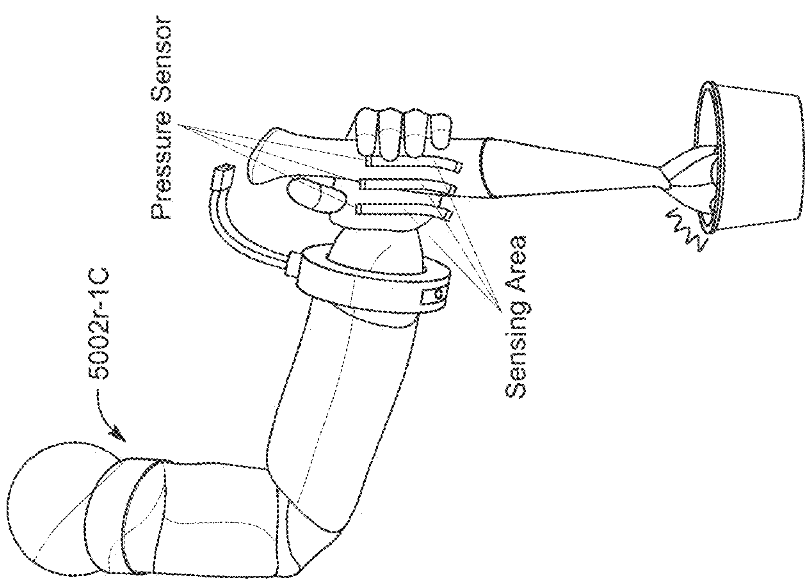
Fig. 164F(2)

Symbols
B - Bottom
T - Top
L - Left
R - Right

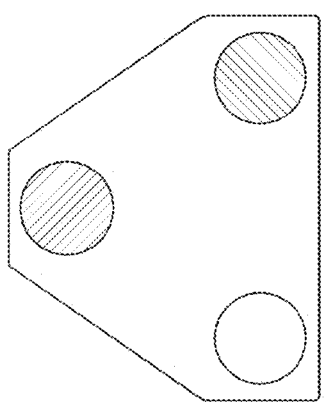
Fig. 176A(1)
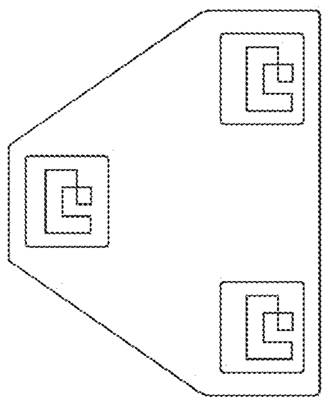
Fig. 176A(2)
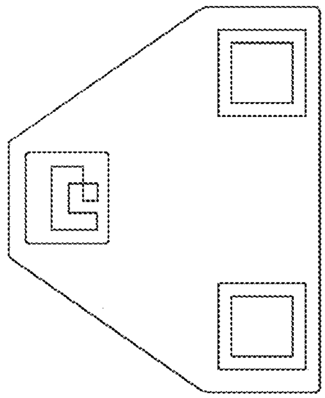
Fig. 176A(3)

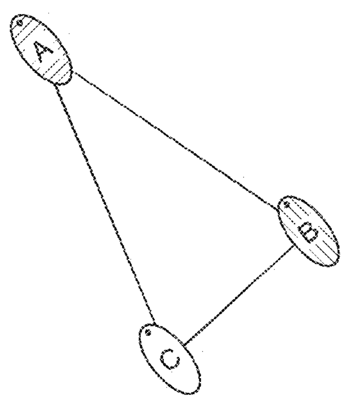
Fig. 176B(2)
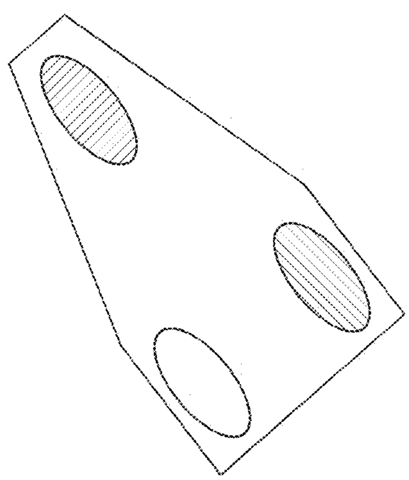
Fig. 176B(1)

SYSTEMS AND METHODS FOR OPERATING A ROBOTIC SYSTEM AND EXECUTING ROBOTIC INTERACTIONS

CROSS REFERENCE TO RELATED APPLICATIONS

This application claims priority to and the benefit of U.S. Provisional Application Ser. No. 62/536,625 entitled "Systems and Methods for Operating Robotic End Effectors," filed on 25 Jul. 2017, U.S. Provisional Application Ser. No. 62/546,022 entitled "Systems and Methods for Operating Robotic End Effectors," filed on 16 Aug. 2017, U.S. Provisional Application Ser. No. 62/597,449 entitled "Systems and Methods for Operating Robotic End Effectors", filed on 12 Dec. 2017, U.S. Provisional Application Ser. No. 62/648,711 entitled "Systems and Methods for Managing the Operation of Robotic Assistants and End Effectors and Executing Robotic Interactions", filed on 27 Mar. 2018, and U.S. Provisional Application Ser. No. 62/678,456 entitled "Systems and Methods for Operating Robotic End Effectors", filed on 31 May 2018, the disclosures of which are incorporated herein by reference in their entireties.

BACKGROUND

Technical Field

The present disclosure relates to fields of robotics and artificial intelligence (AI). More particularly the present disclosure relates to computerized robotic systems employing a coupling device for coupling one or more objects to a robotic system, and a locking mechanism for locking the one or more objects with the robotic system. Further, the present disclosure also relates to integration of marker system with the robotic system, for grasping and interacting with the one or more objects. Furthermore, the present disclosure also relates to integration of electronic libraries of mini-manipulations with transformed robotic instructions for replicating movements, processes, and techniques with real-time electronic adjustments.

Background Art

Research and development in robotics have been undertaken for decades, but the progress has been mostly in the field of heavy industrial applications such as automobile manufacturing automation or military applications. Simple robotics systems have been designed for the consumer markets, but they have not seen a wide application in the home-consumer robotics space, thus far. With advances in technology, combined with a population with higher incomes, the market may be ripe to create opportunities for technological advances to improve people's lives. Robotics has continued to improve automation technology with enhanced artificial intelligence and emulation of human skills and tasks in many forms in operating a robotic apparatus or a humanoid.

The notion of robots replacing humans in certain areas and executing tasks that humans would typically perform is an ideology in continuous evolution since robots were first developed in the 1970s. Manufacturing sectors have long used robots in teach-playback mode, where the robot is taught, via pendant or offline fixed-trajectory generation and download, which motions to copy continuously and without alteration or deviation. Companies have taken the pre-programmed trajectory-execution of computer-taught trajectories and robot motion-playback into such application domains as mixing drinks, welding or painting cars, and others. However, all of these conventional applications use a 1:1 computer-to-robot or tech-playback principle that is intended to have only the robot faithfully execute the motion-commands, which is usually following a taught/pre-computed trajectory without deviation.

Additionally, in conventional robotic systems, one or more objects or manipulators or end-effectors are coupled directly to the robotic systems. In the conventional systems, the coupling devices are often characterized with stability issues, which may render inefficient or inaccurate operation of the robotic systems. Though, there has been improvements in the coupling devices to improve stability and accuracy of the coupling, these systems tend to be cumbersome and complex. Also, the configuration of coupling devices in the conventional systems may require the entire coupling device to be replaced or altered as per the configuration of the one or more objects or manipulators or end-effectors to be coupled to the robotic system, which is undesirable. The present disclosure is directed to overcome one or more limitations stated above.

The information disclosed in this background of the disclosure section is only for enhancement of understanding of the general background of the invention and should not be taken as an acknowledgment or any form of suggestion that this information forms the prior art already known to a person skilled in the art.

SUMMARY

Embodiments of the present disclosure are directed to methods, computer program products, and computer systems of a multi-level robotic system for high speed and high fidelity manipulation operations segmented into, in one embodiment, two physical and logical subsystems made up of instrumented, articulated and controller-actuated subsystems, including a larger and coarser-motion macro-manipulation system operating responsible for operations in larger unconstrained environment workspaces at a reduced endpoint accuracy, and a smaller and finer-motion micro-manipulation system responsible for operations in a smaller workspace and while interacting with tooling and the environment at a higher endpoint motion accuracy, carrying out mini-manipulation trajectory-following tasks based on mini-manipulation commands provided through a dual-level database specific to the macro- and micro-manipulation subsystems, supported by a dedicated and separate distributed processor and sensor architecture operating under an overall real-time operating system communicating with all subsystems over multiple bus interfaces specific to sensor, command and database-elements.

Systems and methods are provided for operating universal robotic assistant systems. In some embodiments, a method for operating robotic assistant system comprises: receiving, by one or more processors configured in a robotic assistant system, environment data corresponding to a current environment, from one or more sensors configured in the robotic assistant system; determining, by the one or more processors, a type of the current environment based on the collected environment data; detecting by the one or more processors, one or more objects in the current environment, wherein the one or more objects are associated with the type of the current environment; identifying, by the one or more processors, for each of the one or more objects, one or more interactions based on type of the one or more objects and the type of the current environment; retrieving, by the one or more processors, interaction data corresponding to the one or more objects from a remote storage associated with the robotic assistant system; and executing, by the one or more processors, the one or more interactions on the corresponding one or more objects, based on the interaction data.

In some embodiments, determining the type of the current environment includes transmitting, by the one or more processors, the environment data to a remote storage associated with the universal robotic assistant systems, wherein the remote storage comprises a library of environment candidates; and receiving, by the one or more processors, in response to the transmitted environment data, the type of the current environment determined based on the environment data, from among the library of environment candidates.

In some embodiments, each of the one or more processors is communicatively connected to a central processor associated with the robotic assistant system.

In some embodiments, the environment data includes position data and image data of the current environment.

In some embodiments, the position data and the image data are obtained from the one or more sensors, wherein the one or more sensors comprises at least one of a navigation system and one or more image capturing devices.

In some embodiments, detecting the one or more objects is based on at least one of the type of the current environment, the environment data corresponding to the current environment, and object data.

In some embodiments, the one or more objects are detected from a plurality of objects associated with the type of the current environment, wherein the plurality of objects are retrieved from a remote storage.

In some embodiments, the object data is collected by the one or more sensors comprising one or more cameras.

In some embodiments, detecting the one or more objects and the type of the one or more objects further comprises analysing features of the one or more objects, wherein the features comprises at least one of shape, size, texture, color, state, material and pose of the one or more objects.

In some embodiments, analyzing the features of the one or more objects includes detecting one or more markers disposed on each of the one or more objects.

In some embodiments, the one or more interactions identified for each of the one or more objects based on the type of objects and the type of the current environment indicates the one or more interactions to be performed by the respective object or on the respective object within the current environment.

In some embodiments, the interaction data of each of the one or more interactions comprises a sequence of motions to be performed by or on the one or more objects and one or more optimal standard positions of one or more manipulation devices, configured to interact with the one or more objects, relative to the corresponding one or more objects.

In some embodiments, executing at least one of the one or more interactions on the corresponding one or more objects includes, for each of the one or more interactions: positioning, by the one or more processors, one or more manipulation devices within a proximity of the corresponding one or more objects; identifying, by the one or more processors, an optimal standard position of the one or more manipulation devices relative to the corresponding one or more objects, wherein the optimal standard position is selected from one or more standard positions of the one or more manipulation devices; positioning, by the one or more processors, the one or more manipulation devices at the identified optimal standard position using one or more positioning techniques; and executing, by the one or more processors, using the one or more manipulation devices, the one or more interactions on the corresponding one or more objects.

In some embodiments, the one or more positioning techniques includes at least one of object template matching technique and marker-based technique, wherein the object template matching technique is used for standard objects and the marker-based technique is used for standard and non-standard objects.

In some embodiments, positioning one or more manipulation devices at an optimal standard position using the object template matching technique includes: retrieving, by the one or more processors, an object template of a target object from a remote storage associated with the universal robotic assistant system, wherein the target object is an object currently being subjected to one or more interactions, wherein the object template comprises at least one of shape, color, surface and material characteristics of the target object; positioning, by the one or more processors, the one or more manipulation devices to a first position proximal to the target object; receiving, by the one or more processors, one or more images, in real-time, of the target object from at least one image capturing device associated with the one or more manipulation devices, wherein the one or more images are captured by at least one image capturing device when the one or more manipulation devices are at the first position; comparing, by the one or more processors, the object template of the target object with the one or more images of the target object; and performing, by the one or more processors, at least one of: adjusting position of the one or more manipulation devices towards the optimal standard position based on position of the one or more manipulation devices in previous iteration and reiterating the steps of receiving and comparing, when the comparison results in mismatch; or inferring that the one or more manipulation devices reached the optimal standard position when the comparison results in a match.

In some embodiments, positioning one or more manipulation devices at optimal standard position using the marker-based technique includes: detecting one or more markers associated with a target object; and adjusting position of the one or more manipulation devices towards the optimal standard position based on the detected one or more markers associated with the target object, wherein the position is adjusted using a real-time image of the target objected received from at least one image capturing device associated with the one or more manipulation devices.

In some embodiments, the one or more markers includes at least one of: a physical marker disposed on the target object; and a virtual marker corresponding to one or more points on the target object, wherein the one or more markers enable computation of position parameters comprising distance, orientation, angle, and slope, of the one or more manipulation devices with respect to the target object.

In some embodiments, the one or more markers associated with the target object are physical markers when the target object is a standard object and the one or more markers associated with the target object are virtual markers when the target object is a non-standard object.

In some embodiments, the one or more markers include the physical marker disposed on the target object, wherein the physical marker is a triangle-shaped marker, and wherein adjusting position of the one or more manipulation devices includes: moving, by the one or more processors, the one or more manipulation devices towards the triangle-shaped marker until at least one side of the triangle-shaped marker has a preferred length; rotating, by the one or more processors, the one or more manipulation devices until a bottom vertex of the triangle-shaped marker is disposed in a bottom position of the real-time image of the target object; shifting, by the one or more processors, the one or more manipulation devices along an X and/or Y axis of the real-time image of the target object until a center of the triangle-shaped marker is in a center position of the real-time image of the target object; and adjusting, by the one or more processors, a slope of the one or more manipulation devices until each angle of the triangle-shaped marker are at least one of equal to approximately 60 degrees or equal to a predetermined maximum difference between the angles that is smaller than their difference prior to initiating the adjustment of the position of the one or more manipulation devices, wherein achieving at least one of the two conditions mentioned above, indicates that the one or more manipulation devices reached the optimal standard position.

In some embodiments, the one or more markers include the physical marker disposed on the target object, wherein the physical marker is a chessboard-shaped marker, and wherein adjusting position of the one or more manipulation devices includes: calibrating, by the one or more processors, each image capturing device associated with the one or more manipulation devices using the chessboard-shaped marker, wherein the calibration comprises estimating at least one of focus length, principal point and distortion coefficients of each image capturing device with respect to the chessboard-shaped marker; identifying, by the one or more processors, in real-time, images of the target object and image co-ordinates of corners of square slots in the chessboard-shaped marker; assigning, by the one or more processors, real-world coordinates to each internal corner among the corners of the square slots in the real-time image based on the image co-ordinates; and determining, by the one or more processors, position of the one or more manipulation devices based on the calibration, image co-ordinates and the real-time co-ordinates with respect to the chessboard-shaped marker, wherein the steps of calibrating, identifying, assigning and determining are repeated until the position of the one or more manipulation devices is equal to the optimal standard position.

In some embodiments, the virtual markers are placed on the target object using at least one of shape analysis technique, particle filtering technique and Convolutional Neural Network (CNN) technique.

In some embodiments, placing the virtual markers using shape analysis technique includes: receiving, by the one or more processors, real-time images of a target object from at least one image capturing device associated with one or more manipulating devices; determining, by the one or more processors, shape of the target object and longest and shortest sides of the target object. The sides of the target object are determined as longest and shortest with reference to length of each side of the target object; determining, by the one or more processors, geometric centre of the target object based on the shape of the target object and, the longest and the shortest sides of the target object; and projecting, by the one or more processors, an equilateral triangle on the target object, wherein each side of the equilateral triangle is equal to half of the shortest side of the target object; the equilateral triangle is oriented along the longest side of the target object; and geometric centre of the equilateral triangle is coinciding with the geometric centre of the target object; and placing, by the one or more processors, the virtual markers at each vertex of the equilateral triangle.

In some embodiments, placing the virtual markers using particle filtering technique includes: retrieving, by the one or more processors, one or more ideal values corresponding to ideal positions of a target object from a remote storage associated with the universal robotic assistant systems; receiving, by the one or more processors, real-time images of the target object from at least one image capturing device associated with one or more manipulating devices; generating, by the one or more processors, special points within boundaries of the target object using the real-time images; determining, by the one or more processors, an estimated value for combination of visual features in neighborhood of each special point, wherein the visual features comprises at least one of histograms of gradients, spatial color distributions and texture features; comparing, by the one or more processors, each estimated value with each of the one or more ideal values to identify respective proximal match; and placing, by the one or more processors, the virtual markers at each position on the target object corresponding to each proximal match.

In some embodiments, placing the virtual markers using the CNN technique includes: downloading, by the one or more processors, a CNN model corresponding to a target object from libraries stored in a remote storage associated with the universal robotic assistant systems; and detecting positions on the target object for placing the virtual markers based on the CNN model.

Hereafter, various embodiments of the present disclosure are explained in terms of a kitchen environment. However, this should not be construed as a limitation of the present disclosure, as the present disclosure may be applicable to any environment other than a kitchen environment.

Embodiments of the present disclosure are directed to methods, computer program products, and computer systems of a robotic apparatus with robotic instructions replicating a food dish with substantially the same result as if a chef had prepared the food dish. In a first embodiment, the robotic assistant system in a standardized robotic kitchen comprises two robotic arms and hands that replicate the precise movements of the chef in same sequence (or substantially the same sequence). The two robotic arms and hands replicate the movements in the same timing (or substantially the same timing) to prepare the food dish based on a previously recorded document (a recipe-script) of the chef's precise movements in preparing the same food dish. In a second embodiment, a computer-controlled cooking apparatus prepares a food dish based on a sensory-curve, such as temperature over time, which was previously recorded in a software file where the chef prepared the same food dish with the cooking apparatus with sensors for which a computer recorded the sensor values over time when the chef previously prepared the food dish on the cooking apparatus fitted with the sensors. In a third embodiment, the kitchen apparatus comprises the robotic arms in the first embodiment and the cooking apparatus with sensors in the second embodiment to prepare a dish that combines both the robotic arms and one or more sensory curves, where the robotic arms are capable of quality-checking a food dish during the cooking process, for such characteristics as taste, smell, and appearance, allowing for any cooking adjustments to the preparation steps of the food dish. In a fourth embodiment, the kitchen apparatus comprises a food storage system with computer-controlled containers and container identifiers for storing and supplying ingredients for a user to prepare the food dish by following the chef's cooking instructions. In a fifth embodiment, a robotic kitchen comprises a robotic assistant system with arms and a kitchen apparatus in which the robotic assistant system moves around the kitchen apparatus to prepare a food dish by emulating a chef's precise cooking movements, including possible real-time modifications/adaptations to the preparation process defined in the recipe-script.

A robotic cooking engine comprises detection, recording, and chef emulation cooking movements, controlling significant parameters, such as temperature and time, and processing the execution with designated appliances, equipment, and tools, thereby reproducing a gourmet dish that tastes identical to the same dish prepared by a chef and served at a specific and convenient time. In one embodiment, a robotic cooking engine provides robotic arms for replicating a chef's identical movements with the same ingredients and techniques to produce an identical tasting dish.

The underlying motivation of the present disclosure centers around humans being monitored with sensors during their natural execution of an activity, and then, being able to use monitoring-sensors, capturing-sensors, computers, and software to generate information and commands to replicate the human activity using one or more robotic and/or automated systems. While one can conceive of multiple such activities (e.g. cooking, painting, playing an instrument, etc.), one aspect of the present disclosure is directed to the cooking of a meal: in essence, a robotic meal preparation application. Monitoring a human chef is carried out in an instrumented application-specific setting (a standardized kitchen in this case), and involves using sensors and computers to watch, monitor, record, and interpret the motions and actions of the human chef, in order to develop a robot-executable set of commands robust to variations and changes in an environment that is capable of allowing a robotic or automated system in a robotic kitchen prepare the same dish to the standards and quality as the dish prepared by the human chef.

The use of multimodal sensing systems is the means by which the necessary raw data is collected. Sensors capable of collecting and providing such data include environment and geometrical sensors, such as two-dimensional (cameras, etc.) and three-dimensional (lasers, sonar, etc.) sensors, as well as human motion-capture systems (human-worn camera-targets, instrumented suits/exoskeletons, instrumented gloves, etc.), as well as instrumented (sensors) and powered (actuators) equipment used during recipe creation and execution (instrumented appliances, cooking-equipment, tools, ingredient dispensers, etc.). All this data is collected by one or more distributed/central computers and processed by various processes. The processors of the distributed/central computers will process and abstract the data to the point that a human and a computer-controlled robotic kitchen can understand the activities, tasks, actions, equipment, ingredients and methods, and processes used by the human, including replication of key skills of a particular chef. The raw data is processed by one or more software abstraction engines to create a recipe-script that is both human-readable and, through further processing, machine-understandable and machine-executable, spelling out all actions and motions for all steps of a particular recipe that a robotic kitchen would have to execute. These commands range in complexity from controlling individual joints, to a particular joint-motion profile over time, to abstraction levels of commands, with lower-level motion-execution commands embedded therein, associated with specific steps in a recipe. Abstraction motion-commands (e.g. "crack an egg into the pan", "sear to a golden color on both sides", etc.) can be generated from the raw data, refined, and optimized through a multitude of iterative learning processes, carried out live and/or off-line, allowing the robotic kitchen systems to successfully deal with measurement-uncertainties, ingredient variations, etc., enabling complex (adaptive) minimanipulation motions using fingered-hands mounted to robot-arms and wrists, based on fairly abstraction/high-level commands (e.g. "grab the pot by the handle", "pour out the contents", "grab the spoon off the countertop and stir the soup", etc.).

The ability to create machine-executable command sequences, now contained within digital files capable of being shared/transmitted, allowing any robotic kitchen to execute them, opens up the option to execute the dish-preparation steps anywhere at any time. Hence, it allows the option to buy/sell recipes online, allowing users to access and distribute recipes on a per-use or subscription basis.

The replication of a dish prepared by a human is performed by a robotic kitchen, which is in essence a standardized replica of the instrumented kitchen used by the human chef during the creation of the dish, except that the human's actions are now carried out by a set of robotic arms and hands, computer-monitored and computer-controllable appliances, equipment, tools, dispensers, etc. The degree of dish-replication fidelity will thus be closely tied to the degree to which the robotic kitchen is a replica of the kitchen (and all its elements and ingredients), in which the human chef was observed while preparing the dish.

Broadly stated, a humanoid having a robot computer controller operated by robot operating system (ROS) with robotic instructions comprises a database having a plurality of electronic minimanipulation libraries, each electronic minimanipulation library including a plurality of minimanipulation elements. The plurality of electronic minimanipulation libraries can be combined to create one or more machine executable application-specific instruction sets, and the plurality of minimanipulation elements within an electronic minimanipulation library can be combined to create one or more machine executable application-specific instruction sets; a robotic structure having an upper body and a lower body connected to a head through an articulated neck, the upper body including torso, shoulder, arms, and hands; and a control system, communicatively coupled to the database, a sensory system, a sensor data interpretation system, a motion planner, and actuators and associated controllers, the control system executing application-specific instruction sets to operate the robotic structure.

In addition, embodiments of the present disclosure are directed to methods, computer program products, and computer systems of a robotic apparatus for executing robotic instructions from one or more libraries of minimanipulations. Two types of parameters, elemental parameters and application parameters, affect the operations of minimanipulations. During the creation phase of a minimanipulation, the elemental parameters provide the variables that test the various combinations, permutations, and the degrees of freedom to produce successful minimanipulations. During the execution phase of minimanipulations, application parameters are programmable or can be customized to tailor one or more libraries of minimanipulations to a particular application, such as food preparation, making sushi, playing piano, painting, picking up a book, and other types of applications.

Minimanipulations comprise a new way of creating a general programmable-by-example platform for humanoid robots. The state of the art largely requires explicit development of control software by expert programmers for each and every step of a robotic action or action sequence. The exception to the above are for very repetitive low-level tasks, such as factory assembly, where the rudiments of learning-by-imitation are present. A minimanipulation library provides a large suite of higher-level sensing-andexecution sequences that are common building blocks for complex tasks, such as cooking, taking care of the infirm, or other tasks performed by the next generation of humanoid robots. More specifically, unlike the previous art, the present disclosure provides the following distinctive features. First, a potentially very large library of pre-defined/pre-learned sensing-and-action sequences are called minimanipulations. Second, each mini-manipulation encodes preconditions required for the sensing-and-action sequences to produce successfully the desired functional results (i.e. the post conditions) with a well-defined probability of success (e.g. 100% or 97% depending on the complexity and difficulty of the minimanipulation). Third, each minimanipulation references a set of variables whose values may be set a-priori or via sensing operations, before executing the minimanipulation actions. Fourth, each minimanipulation changes the value of a set of variables to represent the functional result (the post conditions) of executing the action sequence in the minimanipulation. Fifth, minimanipulations may be acquired by repeated observation of a human tutor (e.g. an expert chef) to determine the sensing-and-action sequence, and to determine the range of acceptable values for the variables. Sixth, minimanipulations may be composed into larger units to perform end-to-end tasks, such as preparing a meal, or cleaning up a room. These larger units are multi-stage applications of minimanipulations either in a strict sequence, in parallel, or respecting a partial order wherein some steps must occur before others, but not in a total ordered sequence (e.g. to prepare a given dish, three ingredients need to be combined in exact amounts into a mixing bowl, and then mixed; the order of putting each ingredient into the bowl is not constrained, but all must be placed before mixing). Seventh, the assembly of minimanipulations into end-to-end-tasks is performed by robotic planning, taking into account the preconditions and post conditions of the component minimanipulations. Eighth, case-based reasoning wherein observation of humans performing end-to-end tasks, or other robots doing so, or the same robot's past experience can be used to acquire a library of reusable robotic plans form cases (specific instances of performing an end-to-end task), both successful ones to replicate, and unsuccessful ones to learn what to avoid.

In a first aspect of the present disclosure, the robotic apparatus performs a task by replicating a human-skill operation, such as food preparation, playing piano, or painting, by accessing one or more libraries of minimanipulations. The replication process of the robotic apparatus emulates the transfer of a human's intelligence or skill set through a pair of hands, such as how a chef uses a pair of hands to prepare a particular dish; or a piano maestro playing a master piano piece through his or her pair of hands (and perhaps through the feet and body motions, as well). In a second aspect of the present disclosure, the robotic apparatus comprises a humanoid for home applications where the humanoid is designed to provide a programmable or customizable psychological, emotional, and/or functional comfortable robot, and thereby providing pleasure to the user. In a third aspect of the present disclosure, one or more minimanipulation libraries are created and executed as, first, one or more general minimanipulation libraries, and second, as one or more application specific minimanipulation libraries. One or more general minimanipulation libraries are created based on the elemental parameters and the degrees of freedom of a humanoid or a robotic apparatus. The humanoid or the robotic apparatus are programmable, so that the one or more general minimanipulation libraries can be programmed or customized to become one or more application specific minimanipulation libraries specific tailored to the user's request in the operational capabilities of the humanoid or the robotic apparatus.

Some embodiments of the present disclosure are directed to the technical features relating to the ability of being able to create complex robotic humanoid movements, actions and interactions with tools and the environment by automatically building movements for the humanoid, actions, and behaviors of the humanoid based on a set of computer-encoded robotic movement and action primitives. The primitives are defined by motion/actions of articulated degrees of freedom that range in complexity from simple to complex, and which can be combined in any form in serial/parallel fashion. These motion-primitives are termed to be Minimanipulations (MMs) and each MM has a clear time-indexed command input-structure, and output behavior-/performance-profile that are intended to achieve a certain function. MMs can range from the simple ('index a single finger joint by 1 degree') to the more involved (such as 'grab the utensil') to the even more complex ('fetch the knife and cut the bread') to the fairly abstract ('play the $1^{st}$ bar of Schubert's piano concerto #1').

Thus, MMs are software-based and represented by input and output data sets and inherent processing algorithms and performance descriptors, akin to individual programs with input/output data files and subroutines, contained within individual run-time source-code, which when compiled generates object-code that can be compiled and collected within various different software libraries, termed as a collection of various Minimanipulation-Libraries (MMLs). MMLs can be grouped in to multiple groupings, whether these be associated to (i) particular hardware elements (finger/hand, wrist, arm, torso, foot, legs, etc.), (ii) behavioral elements (contacting, grasping, handling, etc.), or even (iii) application-domains (cooking, painting, playing a musical instrument, etc.). Furthermore, within each of these groupings, MMLs can be arranged based on multiple levels (simple to complex) relating to the complexity of behavior desired.

It should thus be understood that the concept of Minimanipulation (MM) (definitions and associations, measurement and control variables and their combinations and value-usage and—modification, etc.) and its implementation through usage of multiple MMLs in a near infinite combination, relates to the definition and control of basic behaviors (movements and interactions) of one or more degrees of freedom (movable joints under actuator control) at levels ranging from a single joint (knuckle, etc.) to combinations of joints (fingers and hand, arm, etc.) to ever higher degree of freedom systems (torso, upper-body, etc.) in a sequence and combination that achieves a desirable and successful movement sequence in free space and achieves a desirable degree of interaction with the real world so as to be able to enact a desirable function or output by the robot system, on and with, the surrounding world via tools, utensils, and other items.

Examples for the above definition can range from (i) a simple command sequence for a digit to flick a marble along a table, through (ii) stirring a liquid in a pot using a utensil, to (iii) playing a piece of music on an instrument (violin, piano, harp, etc.). The basic notion is that MMs are represented at multiple levels by a set of MM commands executed in sequence and in parallel at successive points in time, and together create a movement and action/interaction with the outside world to arrive at a desirable function (stirring the liquid, striking the bow on the violin, etc.) to achieve a desirable outcome (cooking pasta sauce, playing a piece of Bach concerto, etc.).

The basic elements of any low-to-high MM sequence comprise movements for each subsystem, and combinations thereof are described as a set of commanded positions/velocities and forces/torques executed by one or more articulating joints under actuator power, in such a sequence as required. Fidelity of execution is guaranteed through a closed-loop behavior described within each MM sequence and enforced by local and global control algorithms inherent to each articulated joint controller and higher-level behavioral controllers.

Implementation of the above movements (described by articulating joint positions and velocities) and environment interactions (described by joint/interface torques and forces) is achieved by having computer playback desirable values for all required variables (positions/velocities and forces/torques) and feeding these to a controller system that faithfully implements them on each joint as a function of time at each time step. These variables and their sequence and feedback loops (hence not just data files, but also control programs), to ascertain the fidelity of the commanded movement/interactions, are all described in data-files that are combined into multi-level MMLs, which can be accessed and combined in multiple ways to allow a humanoid robot to execute multiple actions, such as cooking a meal, playing a piece of classical music on a piano, lifting an infirm person into/out of a bed, etc. There are MMLs that describe simple rudimentary movement/interactions, which are then used as building-blocks for ever higher-level MMLs that describe ever-higher levels of manipulation, such as 'grasp', 'lift', 'cut' to higher level primitives, such as 'stir liquid in pot'/'pluck harp-string to g-flat' or even high-level actions, such as 'make a vinaigrette dressing'/'paint a rural Brittany summer landscape'/'play Bach's Piano-concerto #1', etc. Higher level commands are simply a combination towards a sequence of serial/parallel lower- and mid-level MM primitives that are executed along a common timed stepped sequence, which is overseen by a combination of a set of planners running sequence/path/interaction profiles with feedback controllers to ensure the required execution fidelity (as defined in the output data contained within each MM sequence).

The values for the desirable positions/velocities and forces/torques and their execution playback sequence(s) can be achieved in multiple ways. One possible way is through watching and distilling the actions and movements of a human executing the same task, and distilling from the observation data (video, sensors, modeling software, etc.) the necessary variables and their values as a function of time and associating them with different minimanipulations at various levels by using specialized software algorithms to distill the required MM data (variables, sequences, etc.) into various types of low-to-high MMLs. This approach would allow a computer program to automatically generate the MMLs and define all sequences and associations automatically without any human involvement.

Another way would be (again by way of an automated computer-controlled process employing specialized algorithms) to learn from online data (videos, pictures, sound logs, etc.) how to build a required sequence of actionable sequences using existing low-level MMLs to build the proper sequence and combinations to generate a task-specific MML.

Yet another way, although most certainly more (time-) inefficient and less cost-effective, might be for a human programmer to assemble a set of low-level MM primitives to create an ever-higher level set of actions/sequences in a higher-level MML to achieve a more complex task-sequence, again composed of pre-existing lower-level MMLs.

Modification and improvements to individual variables (meaning joint position/velocities and torques/forces at each incremental time-interval and their associated gains and combination algorithms) and the motion/interaction sequences are also possible and can be effected in many different ways. It is possible to have learning algorithms monitor each and every motion/interaction sequence and perform simple variable-perturbations to ascertain outcome to decide on if/how/when/what variable(s) and sequence(s) to modify in order to achieve a higher level of execution fidelity at levels ranging from low- to high-levels of various MMLs. Such a process would be fully automatic and allow for updated data sets to be exchanged across multiple platforms that are interconnected, thereby allowing for massively parallel and cloud-based learning via cloud computing.

Advantageously, the robotic apparatus in a standardized robotic kitchen has the capabilities to prepare a wide array of cuisines from around the world through a global network and database access, as compared to a chef who may specialize in one type of cuisine. The standardized robotic kitchen also is able to capture and record favorite food dishes for replication by the robotic apparatus whenever desired to enjoy the food dish without the repetitive process of laboring to prepare the same dish repeatedly.

The structures and methods of the present disclosure are disclosed in detail in the description below. This summary does not purport to define the disclosure. The disclosure is defined by the claims. These and other embodiments, features, aspects, and advantages of the disclosure will become better understood with regard to the following description, appended claims, and accompanying drawings.

In some embodiments, an electronic inventory system comprises a storage unit configured to store one or more objects; one or more image capturing devices configured in the storage unit to: capture one or more images of each of the one or more objects, in real-time; and transmit each of the one or more images to a display screen configured on the storage unit and one or more embedded processors configured in the storage unit; one or more sensors configured in the storage unit to provide corresponding sensor data to at least one of the one or more embedded processors associated with position and orientation of each of the one or more objects; one or more light sources configured in the storage unit to facilitate the one or more image capturing devices in capturing one or more images of each of the one or more objects in the storage unit, by providing uniform illumination in the storage unit; one or more embedded processors configured in the storage unit, wherein the one or more embedded processors interact with a central processor of the robotic assistant system through a communication network, configured to: detect each of the one or more objects stored in the storage unit based on the one or more images and the sensor data; and transmit the one or more images and the sensor data to the central processor in real-time or periodically.

In some embodiments, the one or more sensors comprises at least one of a temperature sensor, a humidity sensor, an ultrasound sensor, a laser measurement sensors and SONAR.

In some embodiments, the one or more embedded processors detect each of the one or more objects by detecting presence/absence of the one or more objects, estimating content stored in the one or more objects, detecting position and orientation of each of the one or more objects, reading at least one of visual markers and radio type markers attached to each of the one or more objects and reading object identifiers.

In some embodiments, the one or more embedded processors detect the one or more objects based on Convolutional Neural Network (CNN) techniques.

In some embodiments, the storage unit comprises a display screen fixed on external surface of the storage, configured to display images and videos of the one or more objects and one or more interactions performed on each of the one or more objects, in real-time.

In some embodiments, the display screen enables a user to visualize and locate each of the one or more objects stored in the storage unit, without opening doors of the storage unit.

In some embodiments, the storage unit is further configured with motor devices to enable performing one or more actions on doors of the storage unit, automatically, wherein the one or more actions comprise at least one of opening, closing, locking and unlocking the doors of the storage unit.

In some embodiments, each of the one or more sensors, each of the one or more light sources and each of the one or more image capturing devices of the storage unit are electrically connected to an extension board configured in the storage unit, wherein extension board of each storage unit is connected to a Power over Ethernet (PoE) switch.

In some embodiments, the storage unit is further configured with a fan block for providing air circulation inside the storage unit and a thermoelectric cooler element to cool electric components in the storage unit.

In one non-limiting embodiment of the present disclosure, a coupling device for coupling one or more objects to a robotic system is provided. The coupling device comprising a first coupling member defined onto the robotic system and a second coupling member defined onto the one or more objects, and connectable with the first coupling member. A locking mechanism is defined at an interface of each of the first coupling member and the second coupling member, for coupling the one or more objects with the robotic system.

In an embodiment, the first coupling member is defined by a first connection surface connectable to the robotic system and a first mating surface defined with a plurality of first projections along its periphery.

In an embodiment, the second coupling member is defined by a second connection surface connectable to the one or more objects and a second mating surface defined with a plurality of second projections along its periphery.

In an embodiment, the plurality of first projections and the plurality of second projections are complementary to each other to facilitate coupling of the first coupling member with the second coupling member.

In an embodiment, the first connection surface is connectable with the robotic system by at least one of a mechanical means, an electromechanical means, a vacuum means and a magnetic means.

In an embodiment, the second connection surface is connectable to the one or more objects by at least one of the mechanical means, the electromechanical means, the vacuum means and the magnetic means.

In an embodiment, the material of the first coupling member and the second coupling member are selected to facilitate joining between the first mating surface and the second mating surface.

In an embodiment, the first coupling member is made of either of an electromagnetic material or a ferromagnetic material.

In an embodiment, the second coupling member is made either of the ferromagnetic material or the electromagnetic material.

In an embodiment, an interface port is defined on the first coupling member and interfaced to the robotic system, for peripheral connection between the robotic and the second coupling member, to facilitate manipulation of the one or more objects by the robotic system.

In an embodiment, each of the one or more objects is at least one of a kitchen appliance and a kitchen tool.

In an embodiment, at least one sensor unit is defined in the robotic system, wherein the at least one sensor unit is configured to detect orientation of the plurality of first projections with the plurality of second projections, during coupling of the first coupling member with the second coupling member.

In an embodiment, the locking mechanism comprises at least one notch defined on the first mating surface and at least one protrusion defined on the second mating surface. The at least one protrusion is adapted to engage with the at least one notch for coupling the first mating surface with the second mating surface.

In an embodiment, the at least one protrusion is shaped corresponding to the configuration of the at least one notch.

In an embodiment, the locking mechanism comprises at least one notch defined on the second mating surface and at least one protrusion defined on the first mating surface. The at least one protrusion is adapted to engage with the at least one notch for coupling the first mating surface with the second mating surface.

In an embodiment, the at least one notch is shaped in at least one of a triangular shape, a circular shape, and a polygonal shape.

In another non-limiting embodiment of the present disclosure, a coupling device for coupling one or more objects to a robotic system is provided. The coupling device comprising a first coupling member defined onto the robotic system and a second coupling member defined onto the one or more objects, and connectable with the first coupling member. A locking mechanism is defined at an interface of each of the first coupling member and the second coupling member, for coupling the one or more objects with the robotic system. The locking mechanism comprises at least one triangular notch defined on either of the first coupling member and the second coupling member and at least one triangular protrusion defined on the corresponding first coupling member and the second coupling member. The at least one triangular protrusion is adapted to engage with the at least one triangular notch for coupling the first coupling member with the second coupling member.

In another non-limiting embodiment of the present disclosure, a coupling device for coupling one or more objects to a robotic system is provided. The coupling device comprises a first coupling member defined onto the robotic system and a second coupling member defined onto the one or more objects, and connectable with the first coupling member. A locking mechanism is defined at an interface of each of the first coupling member and the second coupling member, for coupling the one or more objects with the robotic system. The locking mechanism comprises at least one circular notch defined on either of the first coupling member and the second coupling member and at least one circular protrusion defined on the corresponding first coupling member and the second coupling member. The locking mechanism is adapted to engage with the at least one circular notch for coupling the first coupling member with the second coupling member.

In another non-limiting embodiment of the present disclosure, a coupling device for coupling one or more objects to a robotic system is provided. The coupling device comprises a first coupling member defined onto the robotic system and a second coupling member defined onto the one or more objects, and connectable with the first coupling member. A locking mechanism defined at an interface of each of the first coupling member and the second coupling member, for coupling the one or more objects with the robotic system. The locking mechanism comprises at least one notch defined on either of the first coupling member and the second coupling member, wherein each of the at least one notch is configured to receive an electromagnet. Also, at least one protrusion is defined on the corresponding first coupling member and the second coupling member and adapted to engage with the electromagnet in the at least one notch for coupling the first coupling member with the second coupling member.

In an embodiment, the at least one protrusion is made of ferromagnetic material for joining with the electromagnet in the at least one notch.

In an embodiment, the at least one notch includes a groove defined along its periphery.

In an embodiment, the at least one protrusion includes a pin, shaped corresponding to the configuration of the groove in the at least one notch and adapted to engage with the groove for improving stability of the coupling between the first coupling member and the second coupling member.

In an embodiment, a locking mechanism for securing one or more objects to a robotic system is provided. The locking mechanism comprising at least one first locking member fixed on a manipulator of the robotic system and at least one second locking member is mounted on the manipulator and adapted to be operable between a first position and a second position. At least one actuator assembly is associated with the at least one second locking member and adapted to operate the at least one second locking member between the first position and the second position. The at least one actuator operates the at least one second locking member from the first position to the second position, to engage each of the one or more objects between the at least one first locking member and the at least one second locking member, thereby securing the one or more objects with the robotic system.

In an embodiment, the at least one first locking member and the at least one second locking member located in a same plane of the manipulator.

In an embodiment, the at least one actuator assembly is configured on a rear surface of the manipulator.

In an embodiment, the at least one first locking member and the at least one second locking member are located on a front surface of the manipulator.

In an embodiment, each of the one or more objects includes a holding portion, defined with a plurality of slots along its periphery for engaging with the at least one first locking member and the at least one second locking member.

In an embodiment, shape of the plurality of slots corresponds to the configuration of the at least one first locking member and the at least one second locking member.

In an embodiment, the at least one actuator assembly is actuated by the robotic system, to slide the at least one second holding member from the first position to the second position, when the manipulator approaches vicinity of each of the one or more objects.

In an embodiment, the manipulator includes a guideway for guiding each of the at least one second holding member between the first position and the second position.

In an embodiment, the at least one first holding member and the at least one second holding member is a hook member.

In an embodiment, the at least one actuator assembly is selected from at least one of a linear actuator and a rotary actuator.

In an embodiment, the at least one actuator assembly comprises a lead screw mounted onto the manipulator, a motor interfaced with the robotic system and coupled to the lead screw, to axially rotate the lead screw and a nut mounted onto the lead screw and engaged with the at least one second holding means. The nut is configured to traverse along the lead screw during its axial rotation, thereby operating the at least one second holding means between the first position and the second position.

In an embodiment, a lead screw holder is provided for mounting the lead screw on the manipulator, such that the lead screw is aligned along a horizontal axis of the manipulator.

In an embodiment, the lead screw includes a plurality of threads with a lead angle ranging from about 6 degrees to about 12 degrees, to restrict movement of the nut, when the motor ceases to operate.

In an embodiment, the nut is engaged with the at least one second holding means via at least one bracket member.

In an embodiment, the nut is configured to slide the at least one second holding means from the first position to the second position, during clockwise rotation of the lead screw.

In an embodiment, the nut is configured to slide the at least one second holding means from the second position to the first position, during anti-clockwise rotation of the lead screw.

In an embodiment, the nut is configured to slide the at least one second holding means from the first position to the second position, during anti-clockwise rotation of the lead screw.

In an embodiment, the nut is configured to slide the at least one second holding means from the second position to the first position, during clockwise rotation of the lead screw.

In an embodiment, the motor is supported onto the manipulator via a clamp.

In an embodiment, the at least one second holding means, extends from the rear surface of the manipulator and protrudes over the front surface of the manipulator to position itself in the same plane as that of the at least one first holding means.

In an embodiment, the at least one actuator assembly comprises a housing mounted onto the manipulator, the housing includes a solenoid coil configured to be energized by a power source. A plunger is accommodated within the housing and suspended concentrically to the solenoid coil, wherein the plunger is adapted to be actuated by the solenoid coil in an energized condition. A frame member is mounted to the plunger and connected to the at least one second holding means. The frame member is configured to transfer actuation of the plunger to the at least one second holding means during the energized condition of the solenoid coil, thereby operating the at least one second holding means between the first position and the second position.

In an embodiment, the power source for energizing the solenoid coil is selected from at least one of an alternating current and a direct current.

In an embodiment, a damper member is provided such that, one end is fixed to the housing and another end connected to the frame member, to control movement of the frame member.

In an embodiment, the frame member includes one or more link members connected to each of the at least one second holding means.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

The structures and methods of the present disclosure are disclosed in detail in the description below. This summary does not purport to define the disclosure. The disclosure is defined by the claims. These and other embodiments, features, aspects, and advantages of the disclosure will become better understood with regard to the following description, appended claims, and accompanying drawings.

BRIEF DESCRIPTION OF ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

Figure 5A:
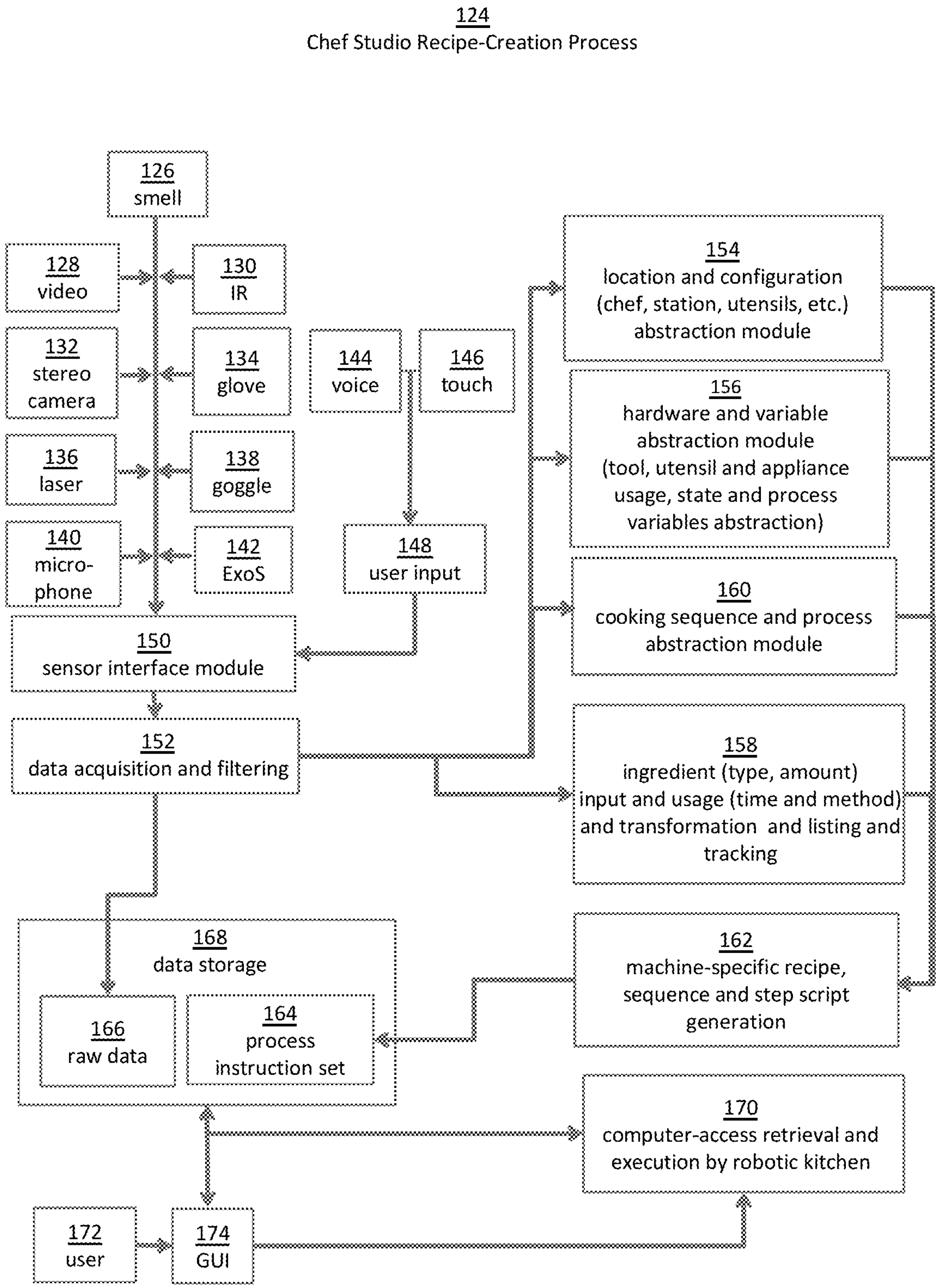
Figure 5B:
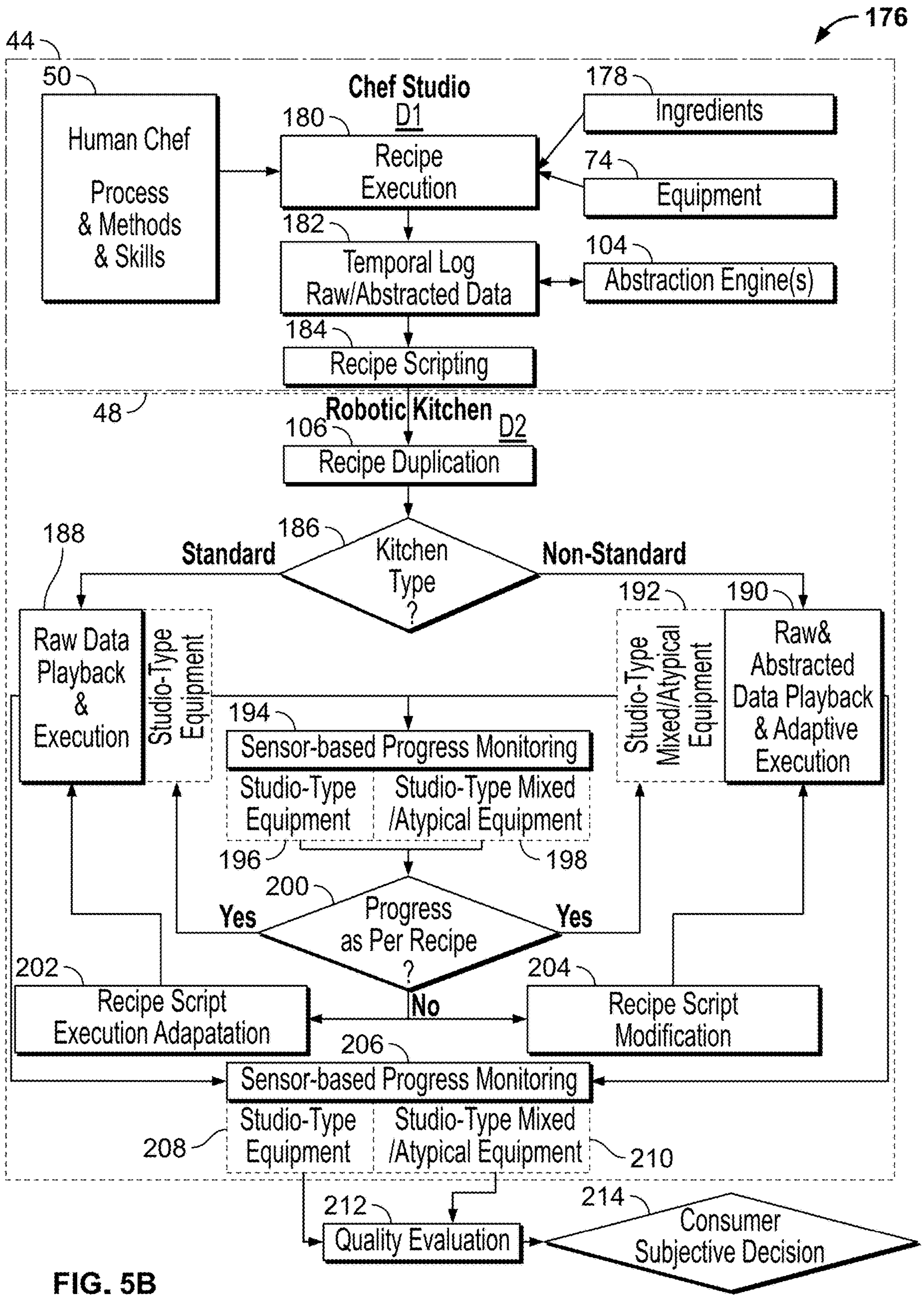
Figure 5C:
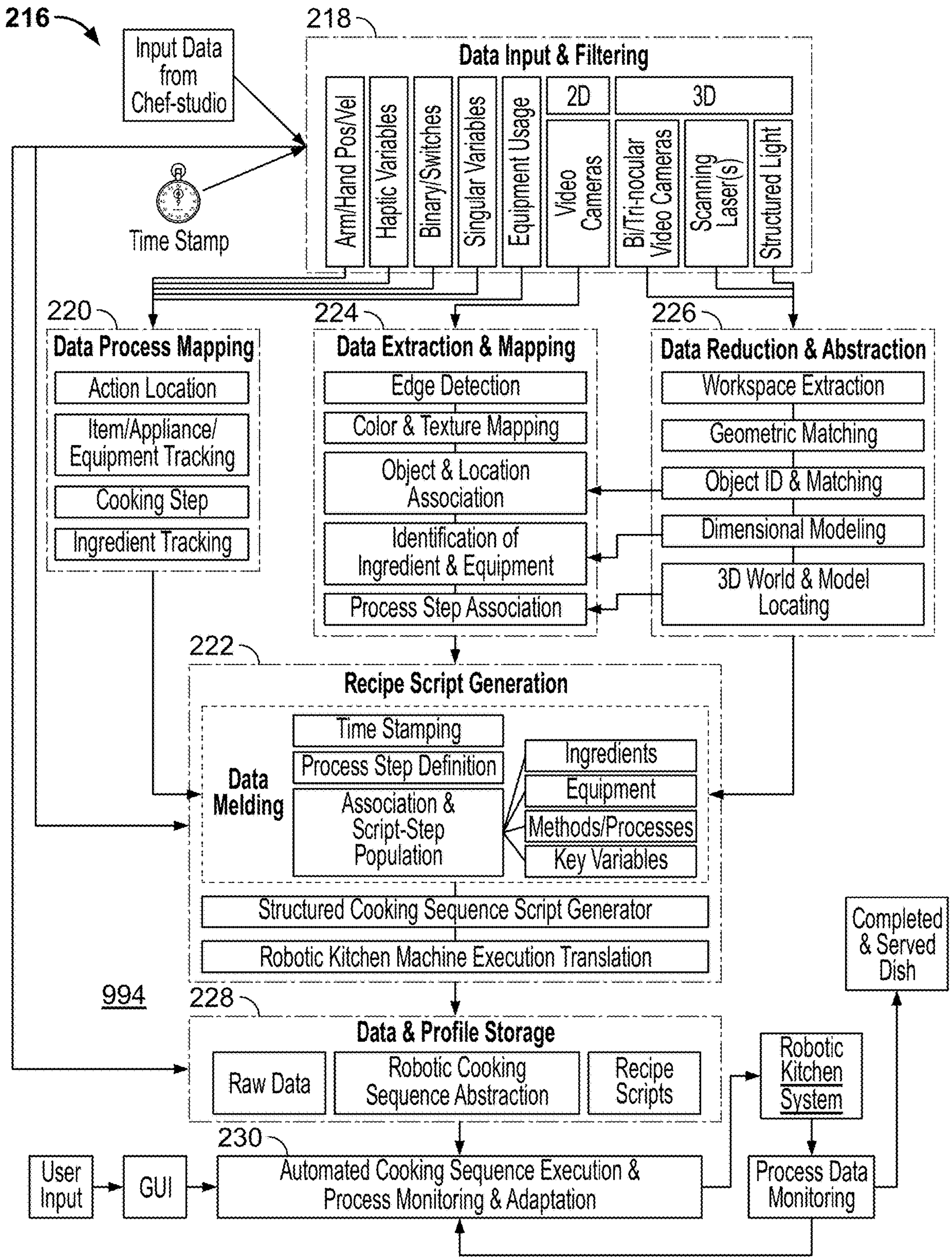
Figure 5D:
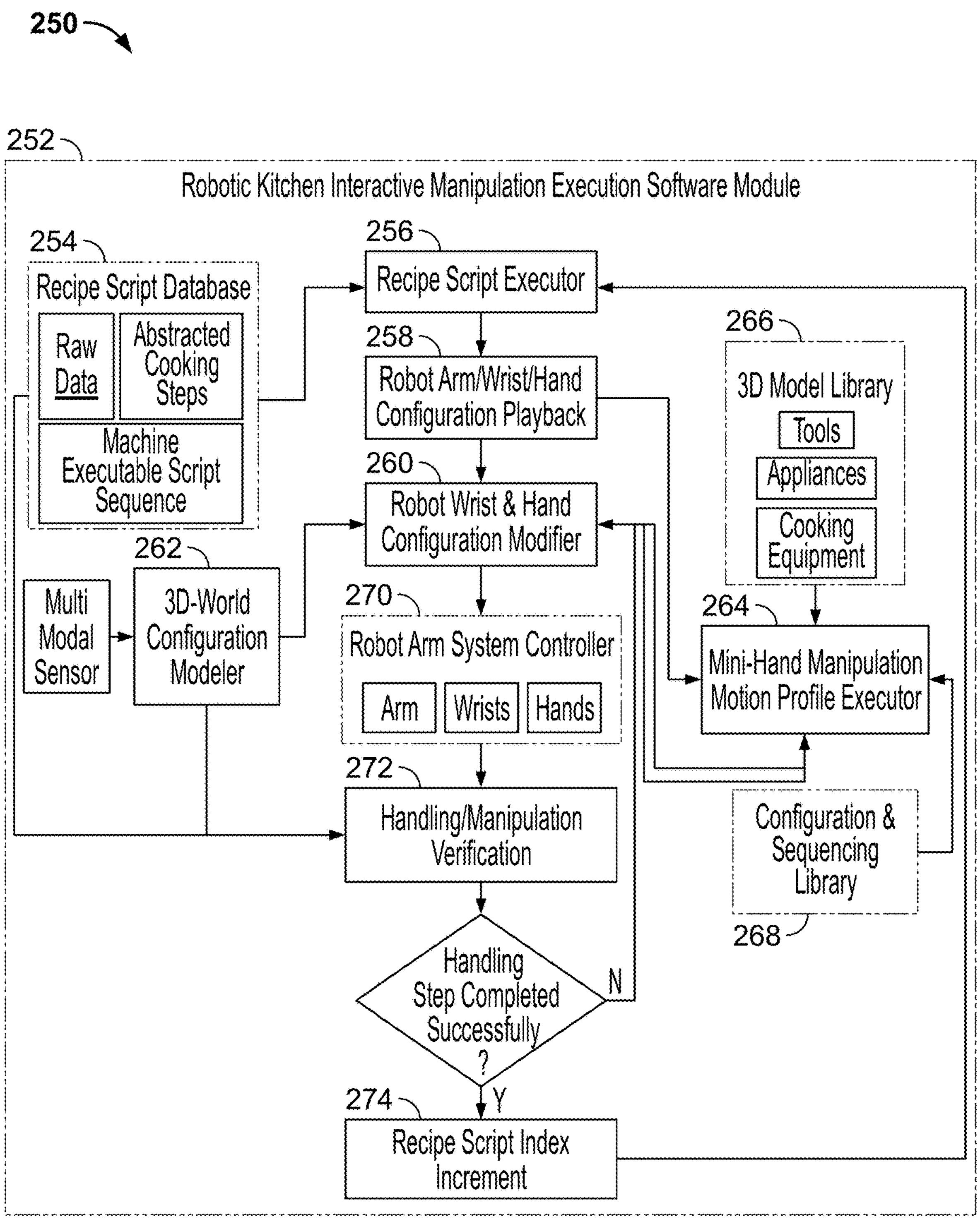

FIG. 5A depicts a block diagram illustrating a chef studio recipe-creation process in accordance with the present disclosure; FIG. 5B depicts block diagram illustrating one embodiment of a standardized teach/playback robotic kitchen in accordance with the present disclosure; FIG. 5C depicts a block diagram illustrating one embodiment of a recipe script generation and abstraction engine in accordance with the present disclosure; and FIG. 5D depicts a block diagram illustrating software elements for object-manipulation in the standardized robotic kitchen in accordance with the present disclosure.

Figure 6:
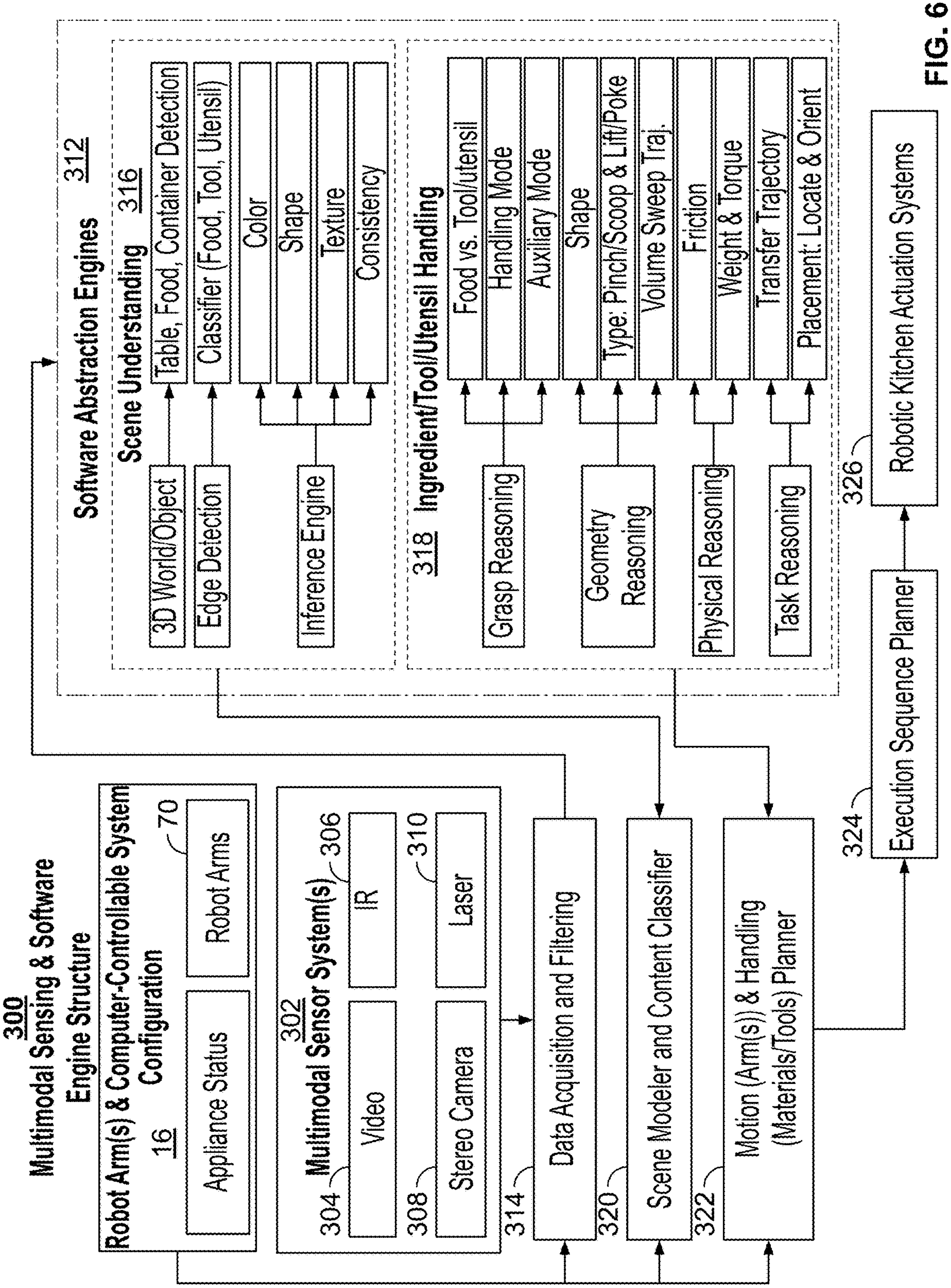

FIG. 6 depicts a block diagram illustrating a multimodal sensing and software engine architecture in accordance with the present disclosure.

Figure 7A:
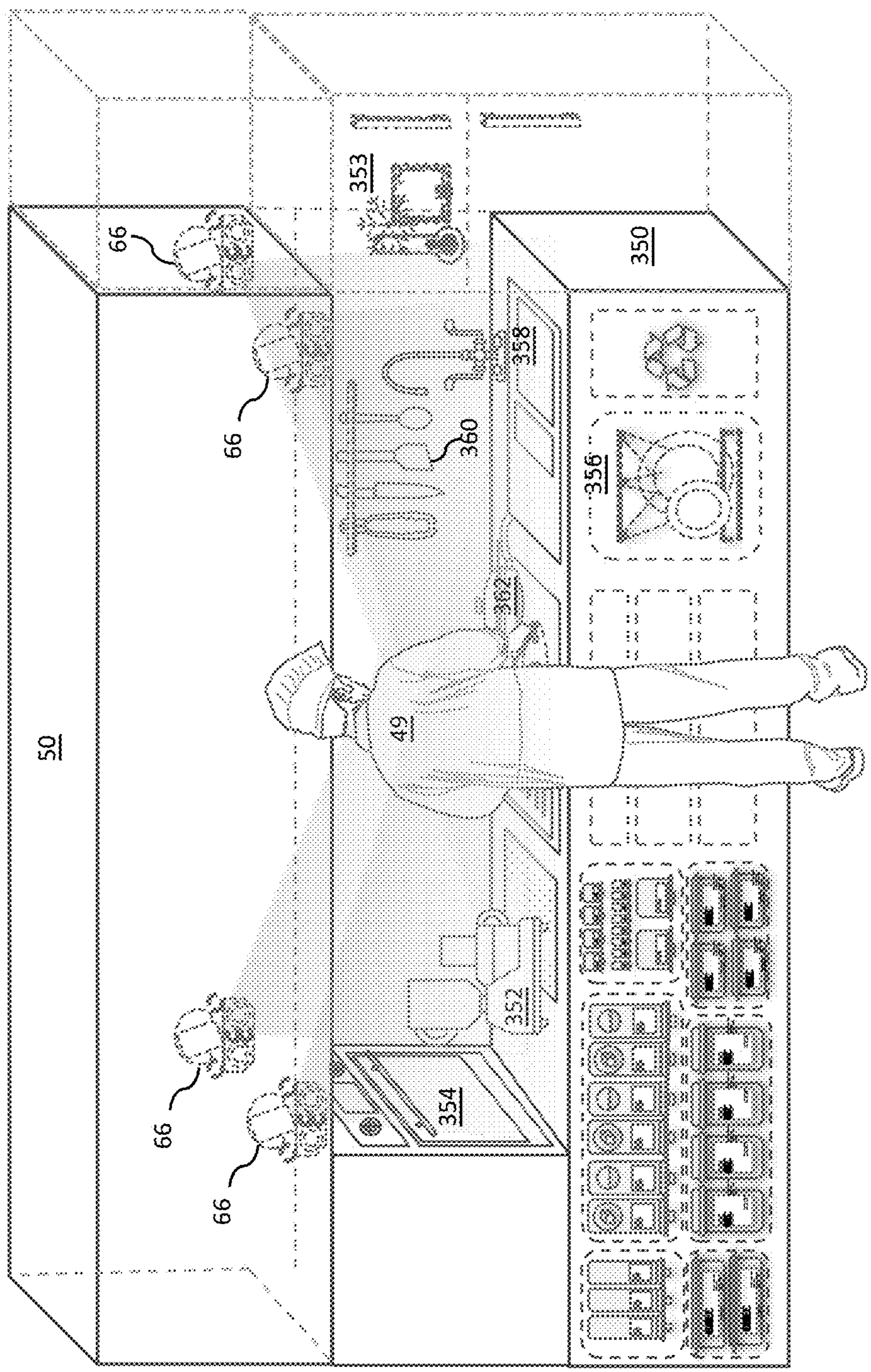
Figure 7B:
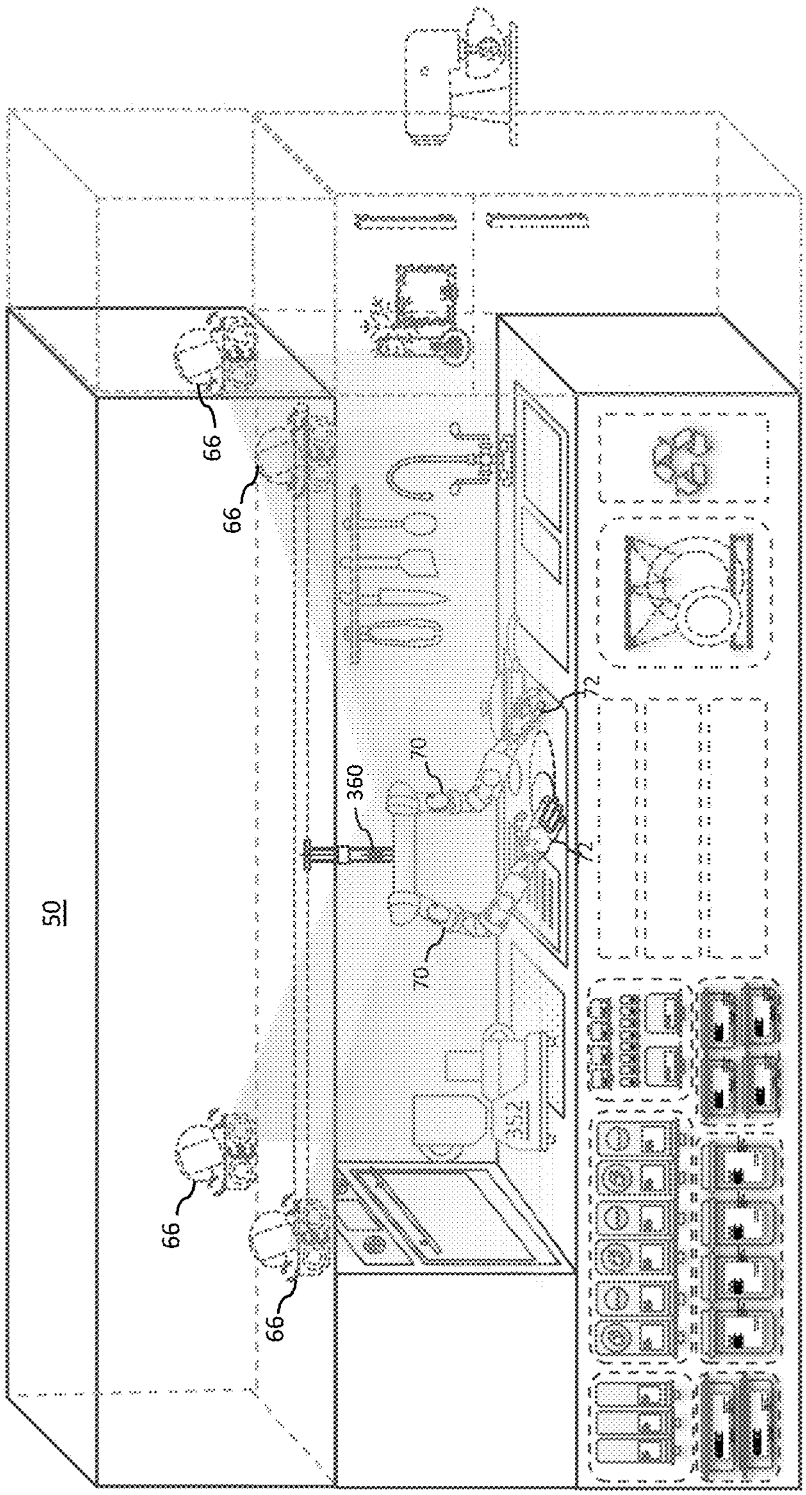
Figure 7C:
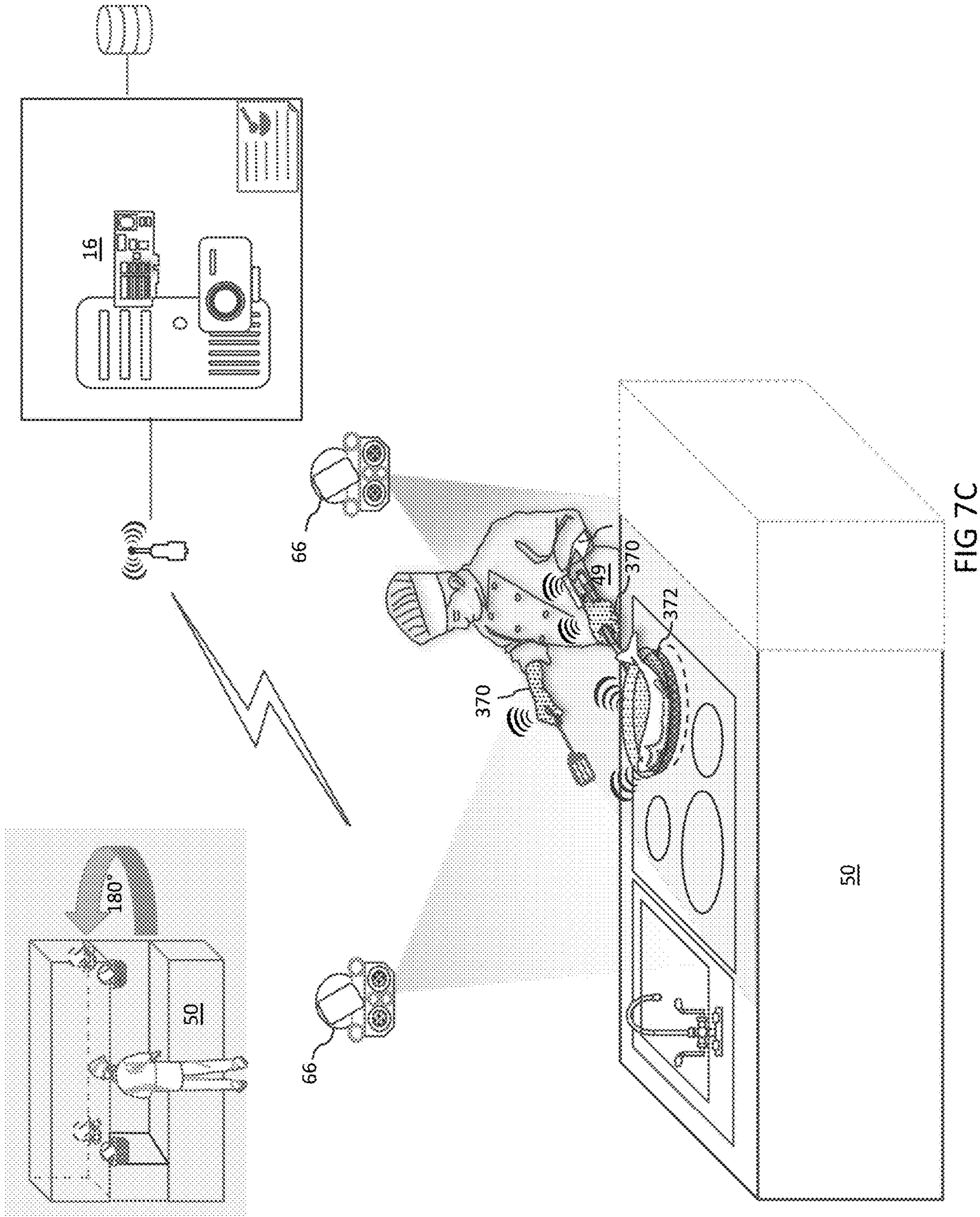
Figure 7D:
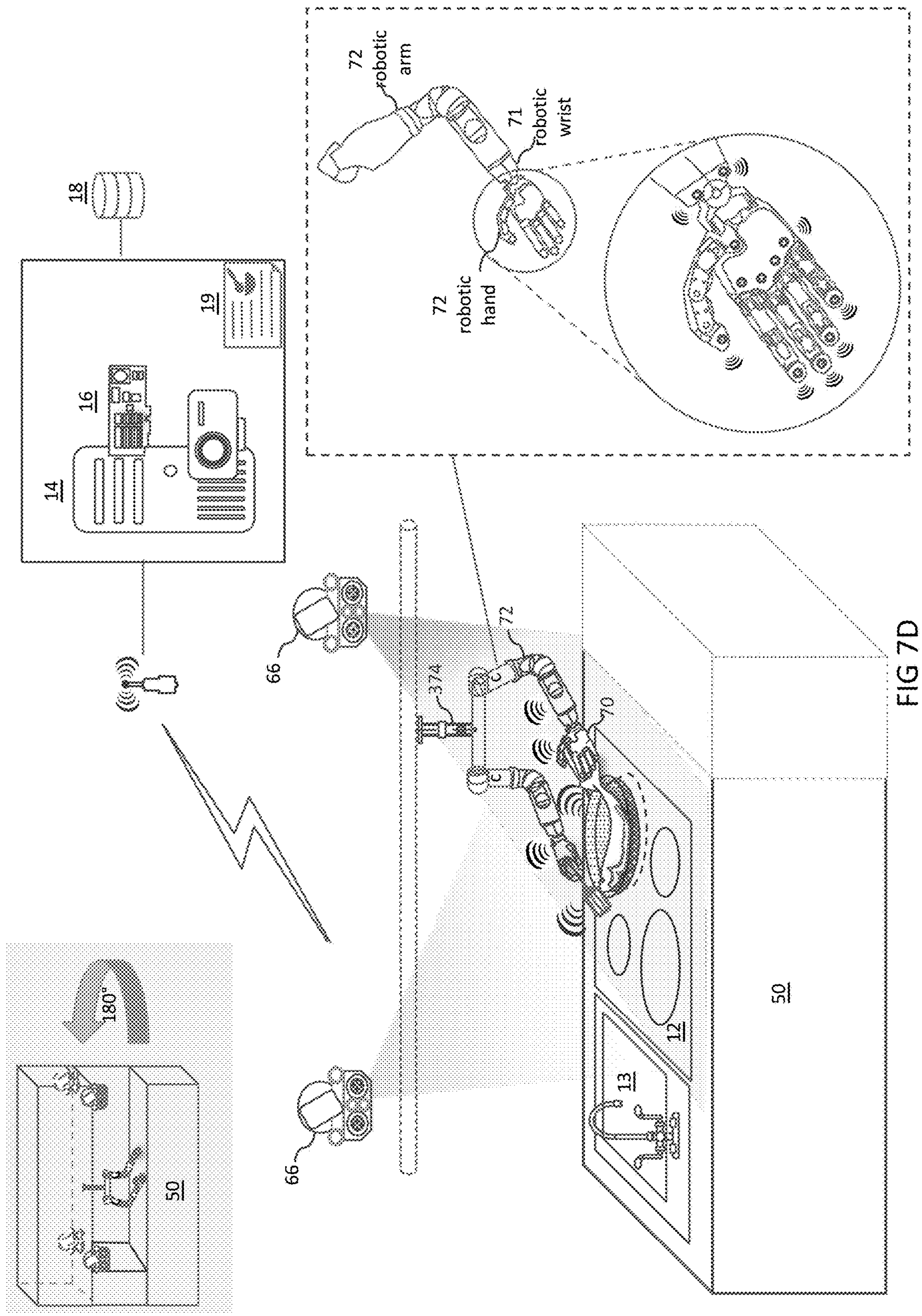
Figure 7E:
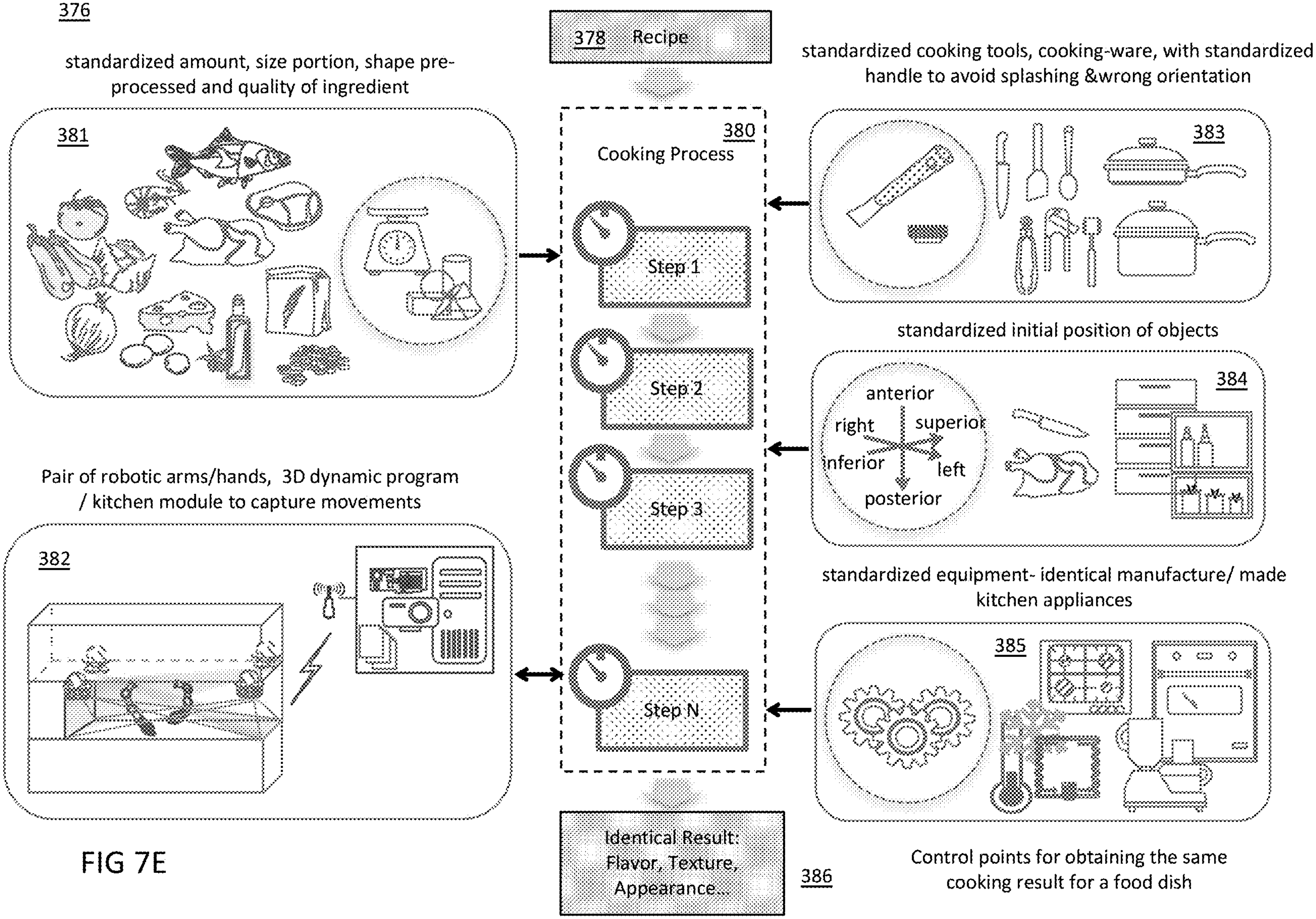

FIG. 7A depicts a block diagram illustrating a standardized robotic kitchen module used by a chef in accordance with the present disclosure; FIG. 7B depicts a block diagram illustrating the standardized robotic kitchen module with a pair of robotic arms and hands in accordance with the present disclosure; FIG. 7C depicts a block diagram illustrating one embodiment of a physical layout of the standardized robotic kitchen module used by a chef in accordance with the present disclosure; FIG. 7D depicts a block diagram illustrating one embodiment of a physical layout of the standardized robotic kitchen module used by a pair of robotic arms and hands in accordance with the present disclosure; FIG. 7E depicts a block diagram illustrating the stepwise flow and methods to ensure that there are control or verification points during the recipe replication process based on the recipe-script when executed by the standardized robotic kitchen in accordance with the present disclosure.

Figure 8A:
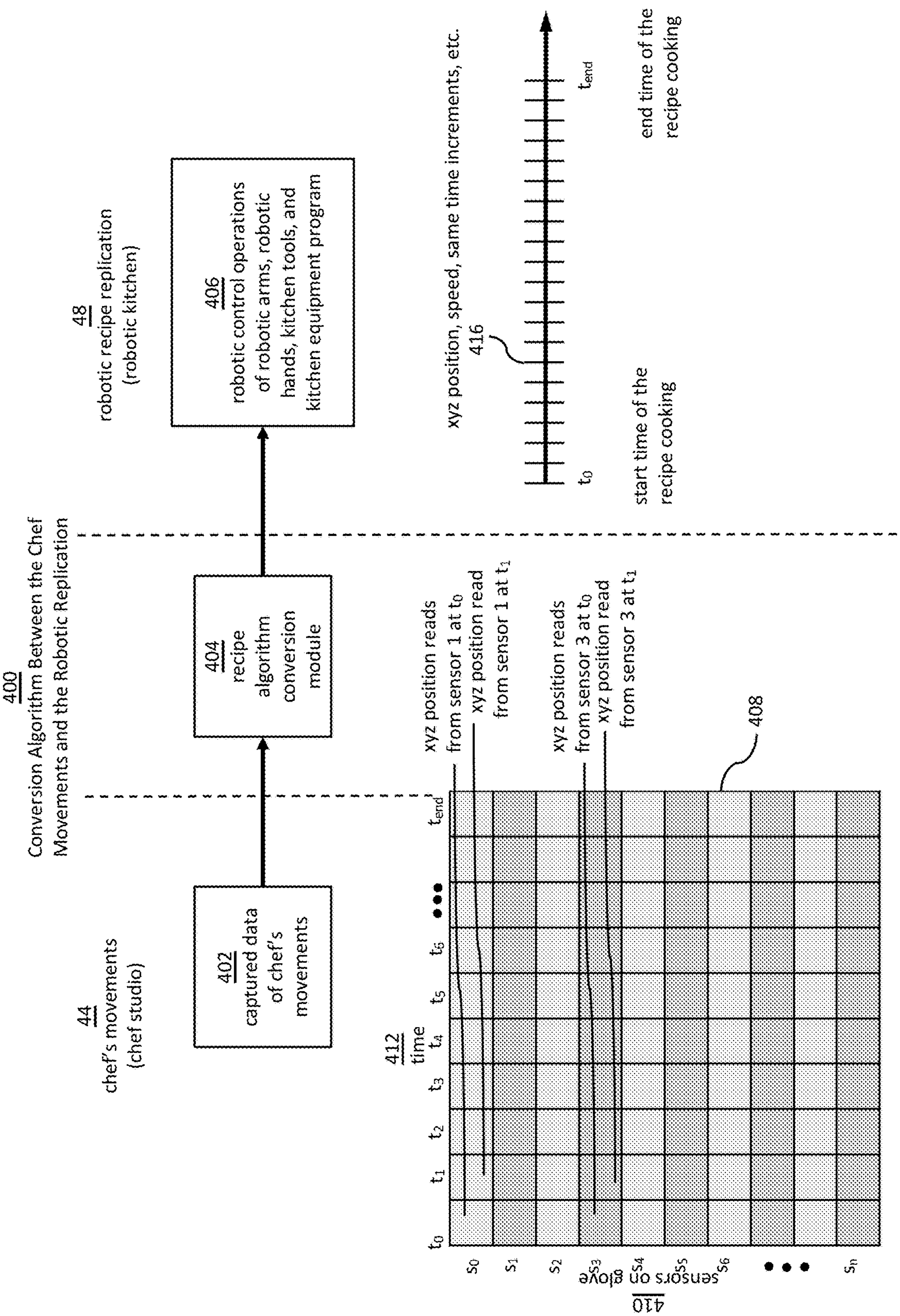
Figure 8B:
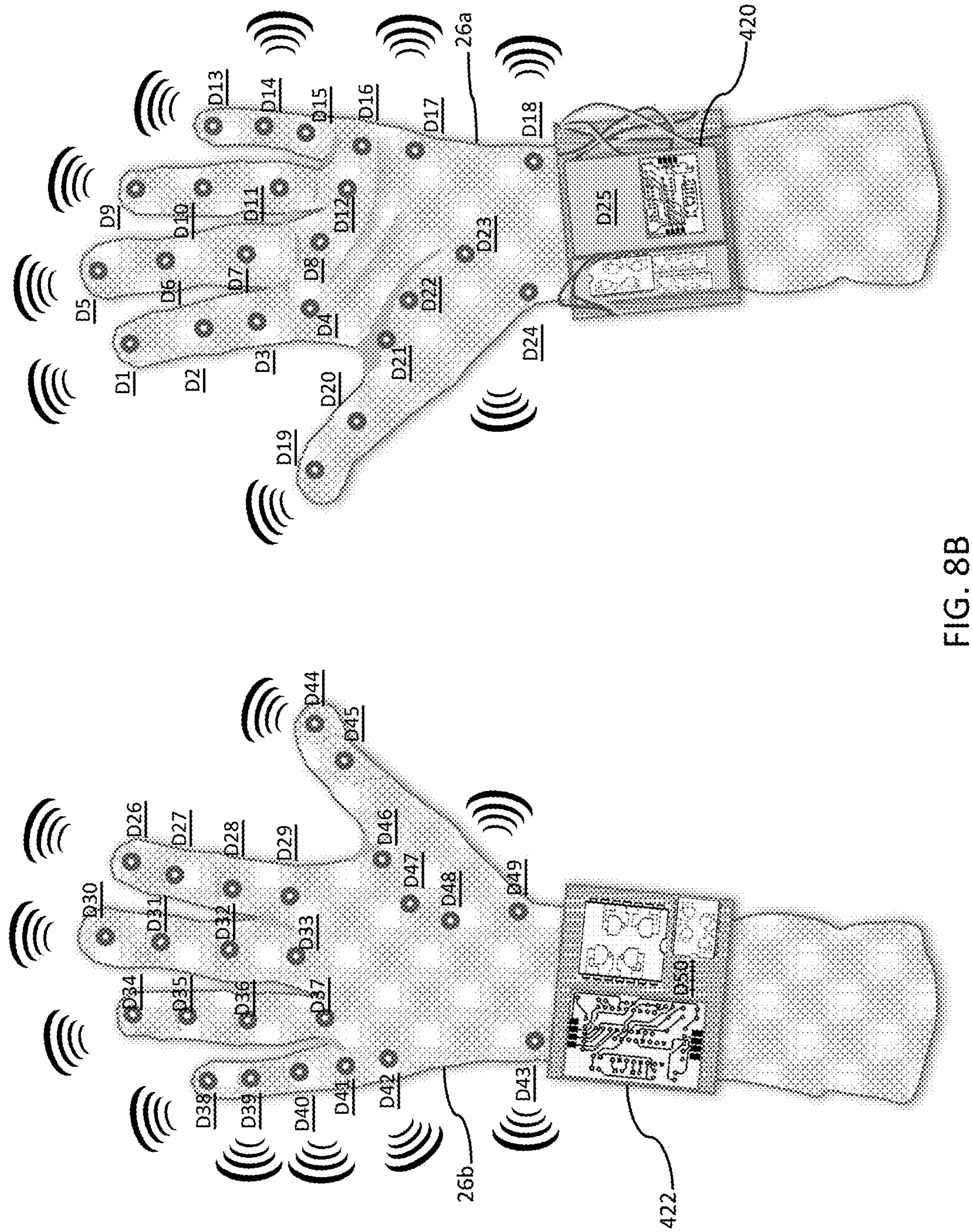
Figure 8C:
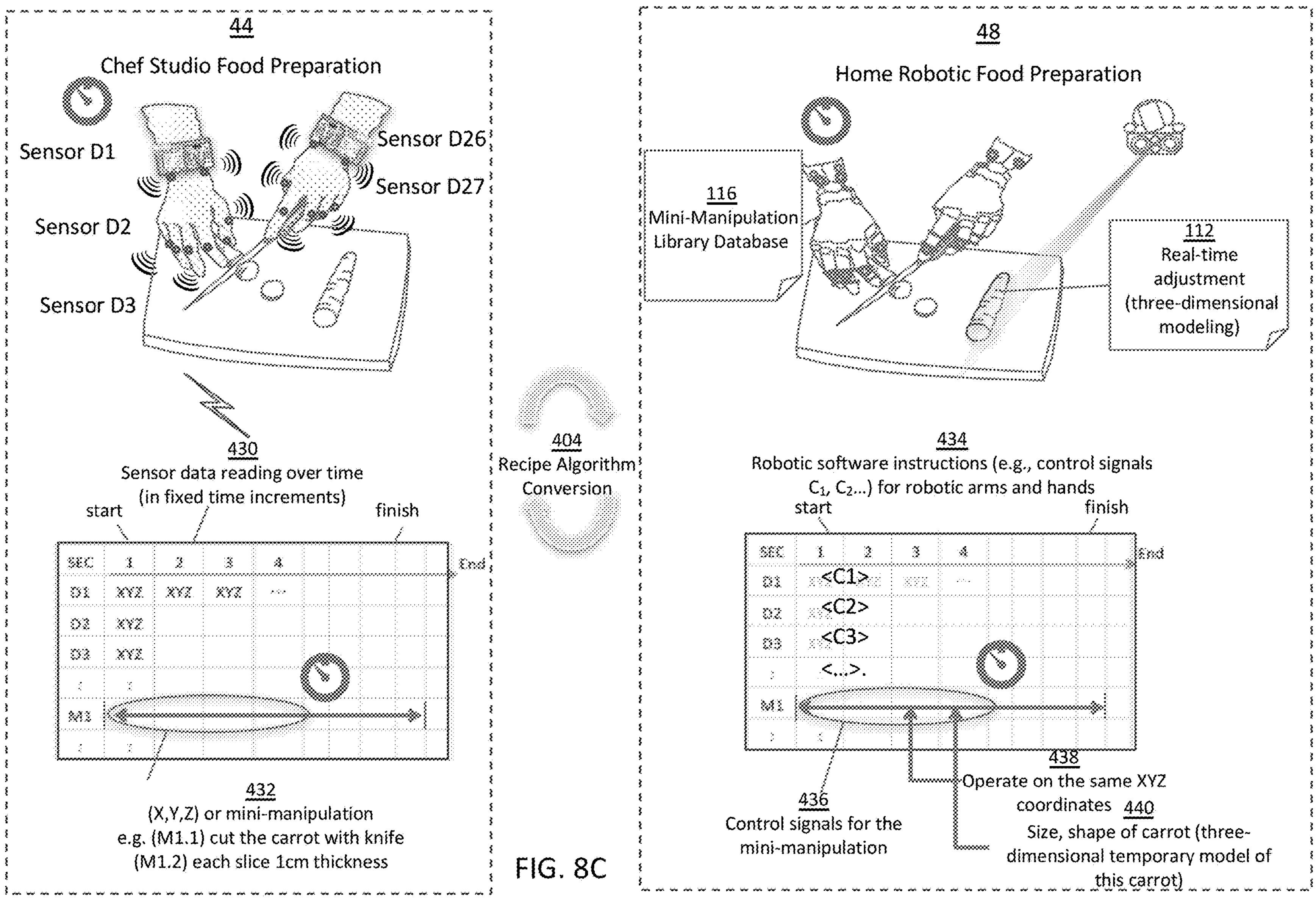
Figure 8D:
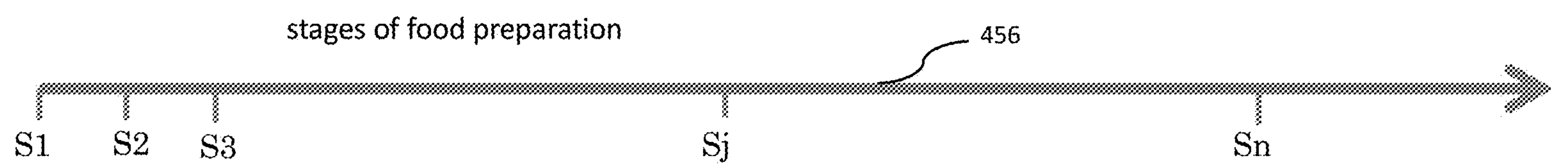
Figure 8E:
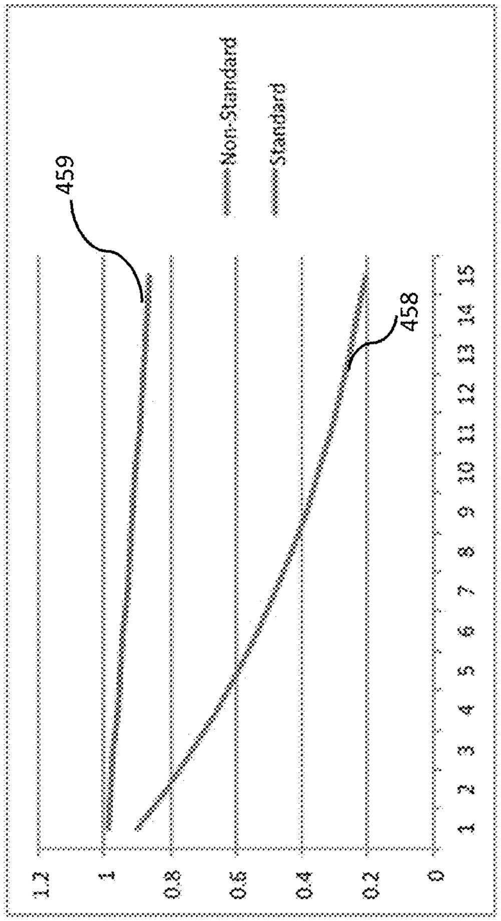
Figure 8F:
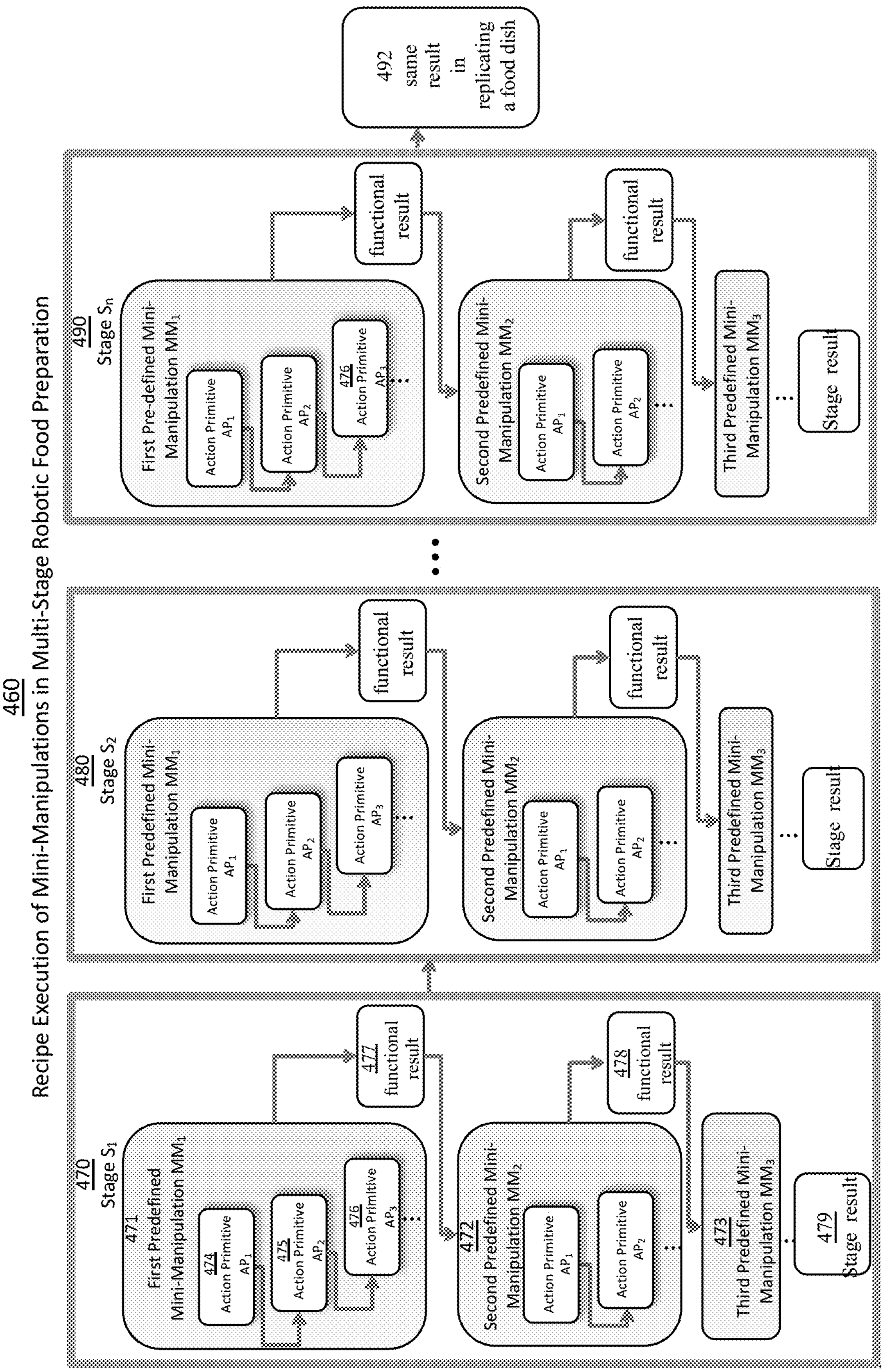

FIG. 8A depicts a block diagram illustrating one embodiment of a conversion algorithm module between the chef movements and the robotic mirror movements in accordance with the present disclosure; FIG. 8B depicts a block diagram illustrating a pair of gloves with sensors worn by the chef for capturing and transmitting the chef's movements; FIG. 8C depicts a block diagram illustrating robotic cooking execution based on the captured sensory data from the chef's gloves in accordance with the present disclosure; FIG. 8D depicts a sequence diagram illustrating the process of food preparation that requires a sequence of steps that are referred to as stages in accordance with the present disclosure; FIG. 8E depicts a graphical diagram illustrating the probability of overall success as a function of the number of stages to prepare a food dish in accordance with the present disclosure; and FIG. 8F depicts a block diagram illustrating the execution of a recipe with multi-stage robotic food preparation with minimanipulations and action primitives.

Figure 9A:
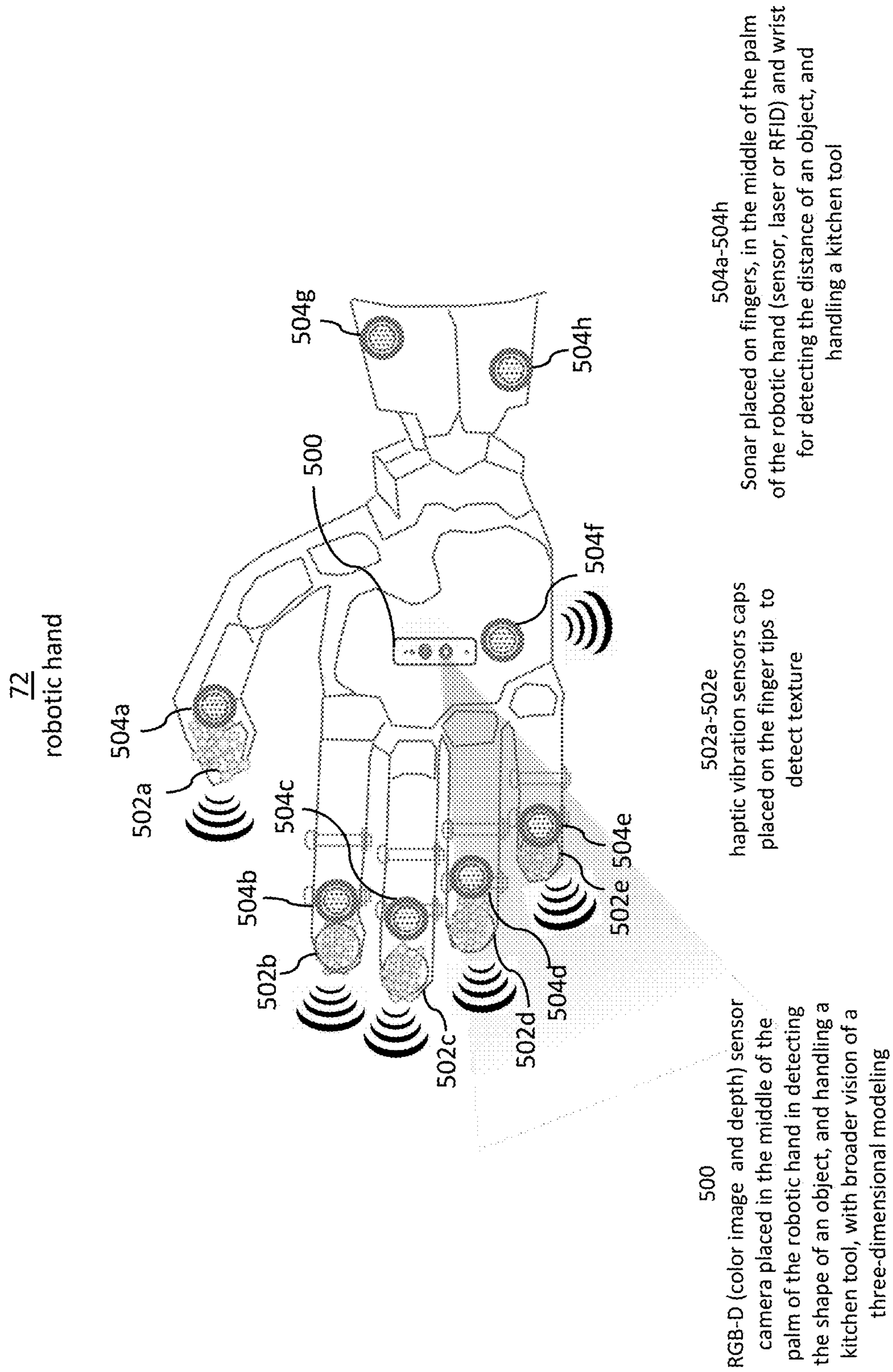
Figure 9B:
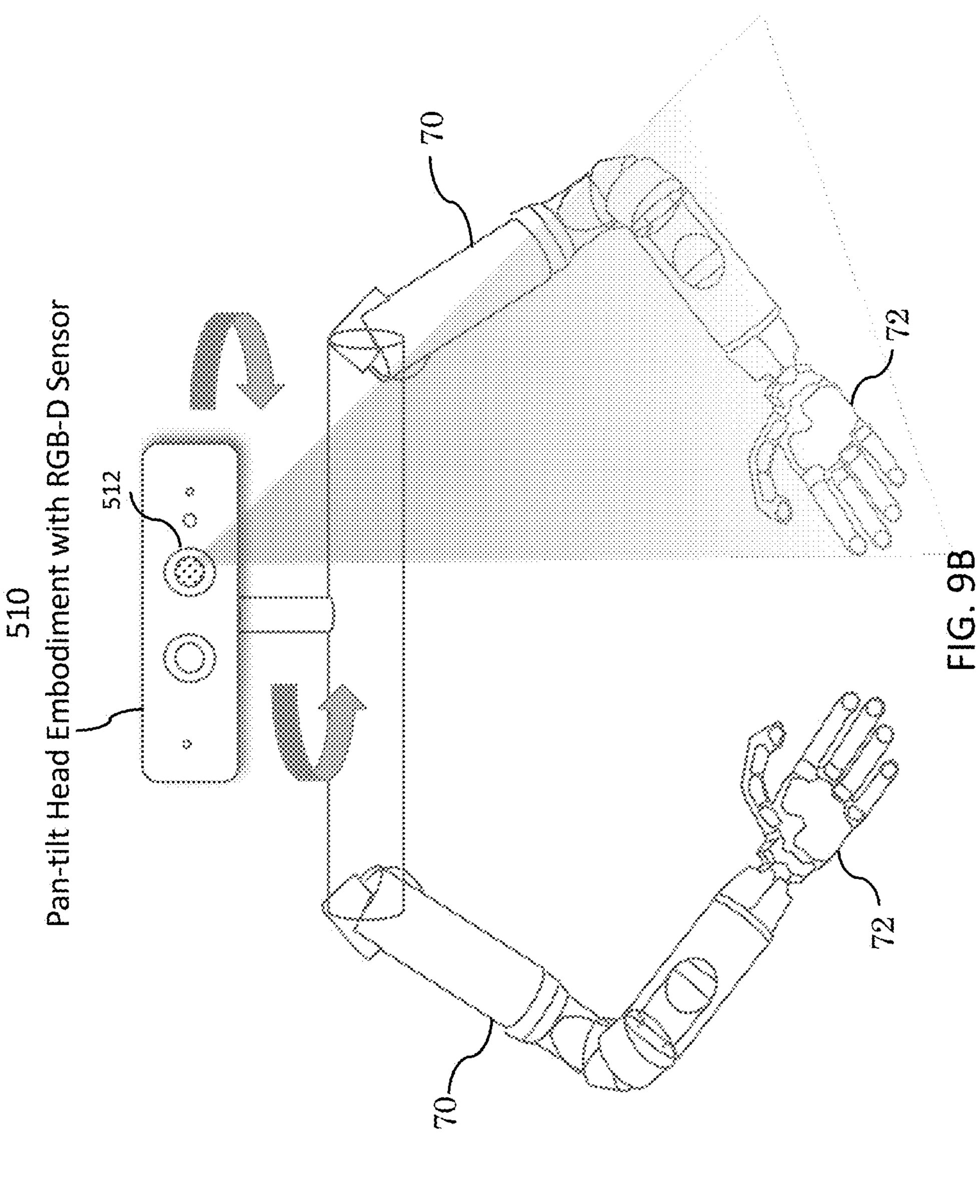
Figure 9C:
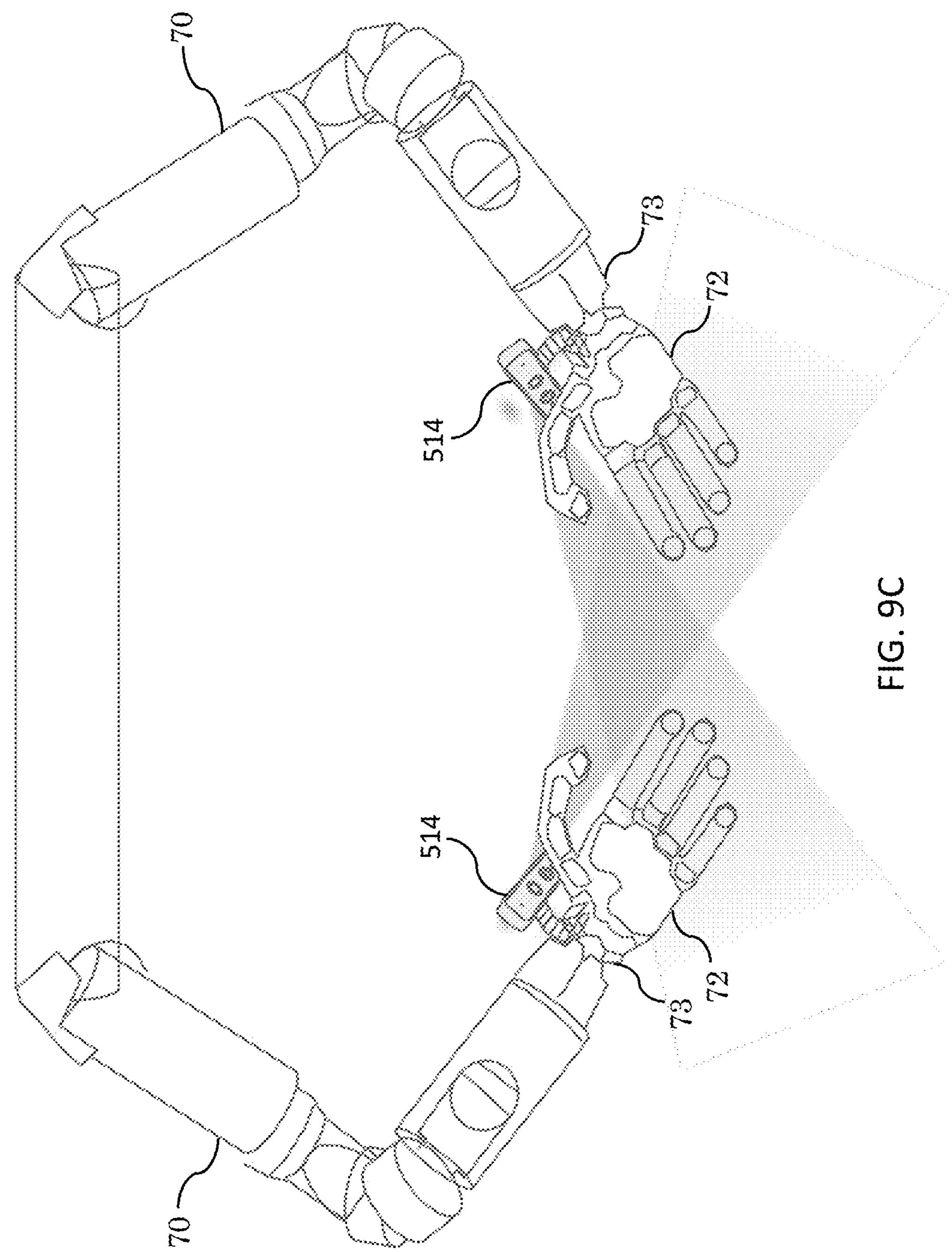
Figure 9D:
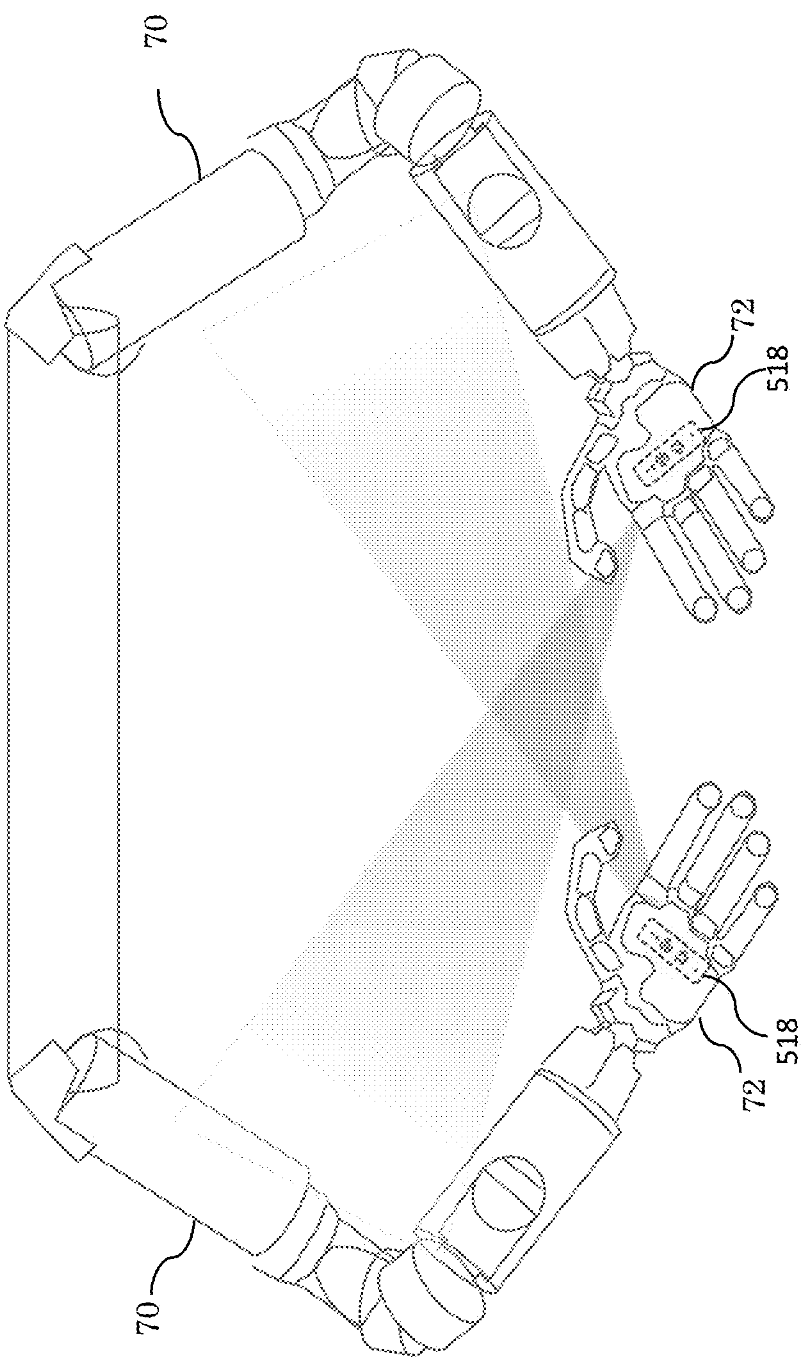
Figure 9E:
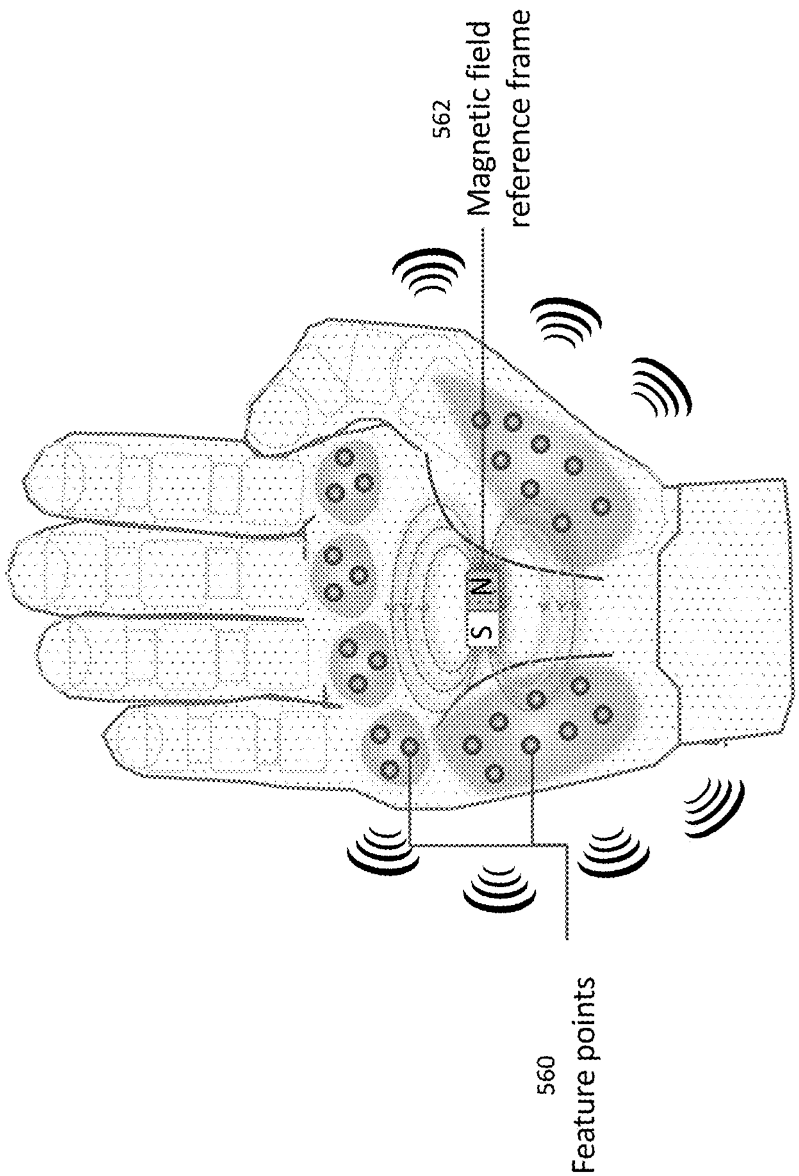

FIG. 9A depicts a block diagram illustrating an example of robotic hand and wrist with haptic vibration, sonar, and camera sensors for detecting and moving a kitchen tool, an object, or a piece of kitchen equipment in accordance with the present disclosure; FIG. 9B depicts a block diagram illustrating a pan-tilt head with sensor camera coupled to a pair of robotic arms and hands for operation in the standardized robotic kitchen in accordance with the present disclosure; FIG. 9C depicts a block diagram illustrating sensor cameras on the robotic wrists for operation in the standardized robotic kitchen in accordance with the present disclosure; FIG. 9D depicts a block diagram illustrating an eye-in-hand on the robotic hands for operation in the standardized robotic kitchen in accordance with the present disclosure; and FIG. 9E depicts pictorial diagrams illustrating aspects of deformable palm in a robotic hand in accordance with the present disclosure.

Figure 10:
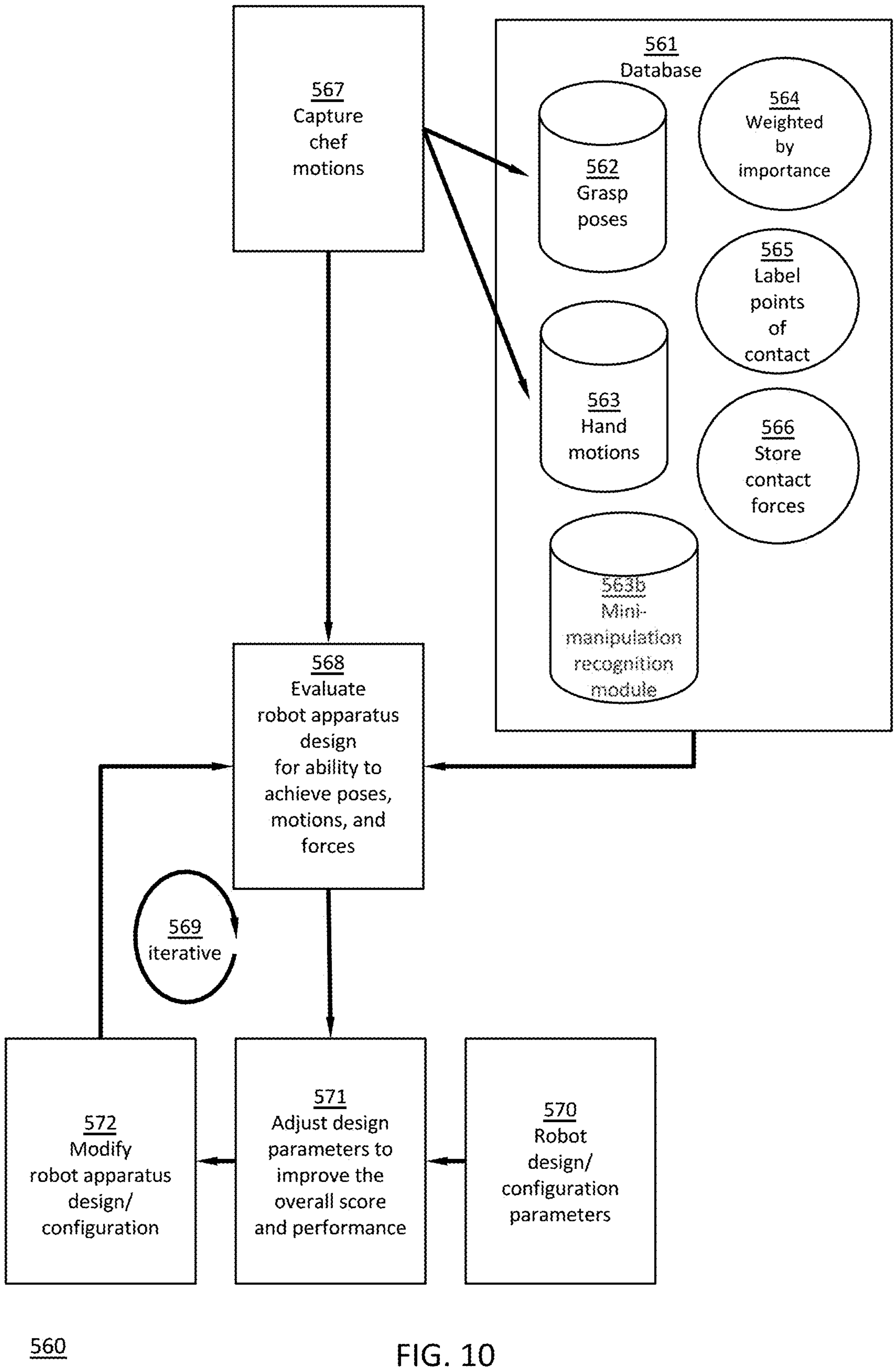

FIG. 10 depicts a flow diagram illustrating one embodiment of the process in evaluating the captured chef's motions with robot poses, motions, and forces in accordance with the present disclosure.

Figure 11A:
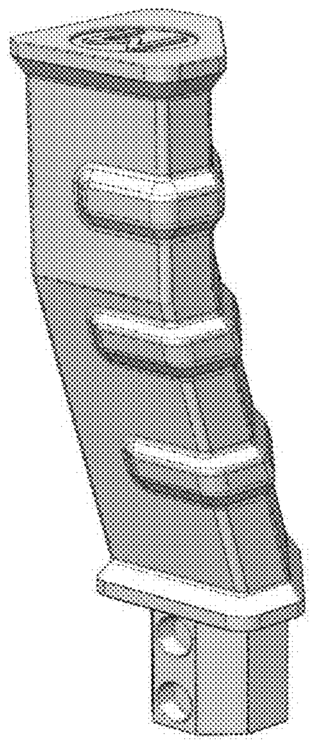
Figure 11B:
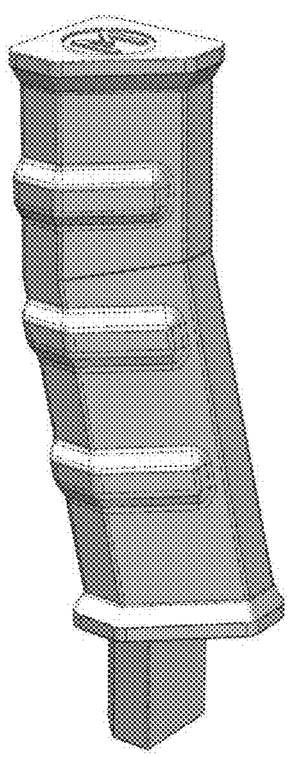
Figure 11C:
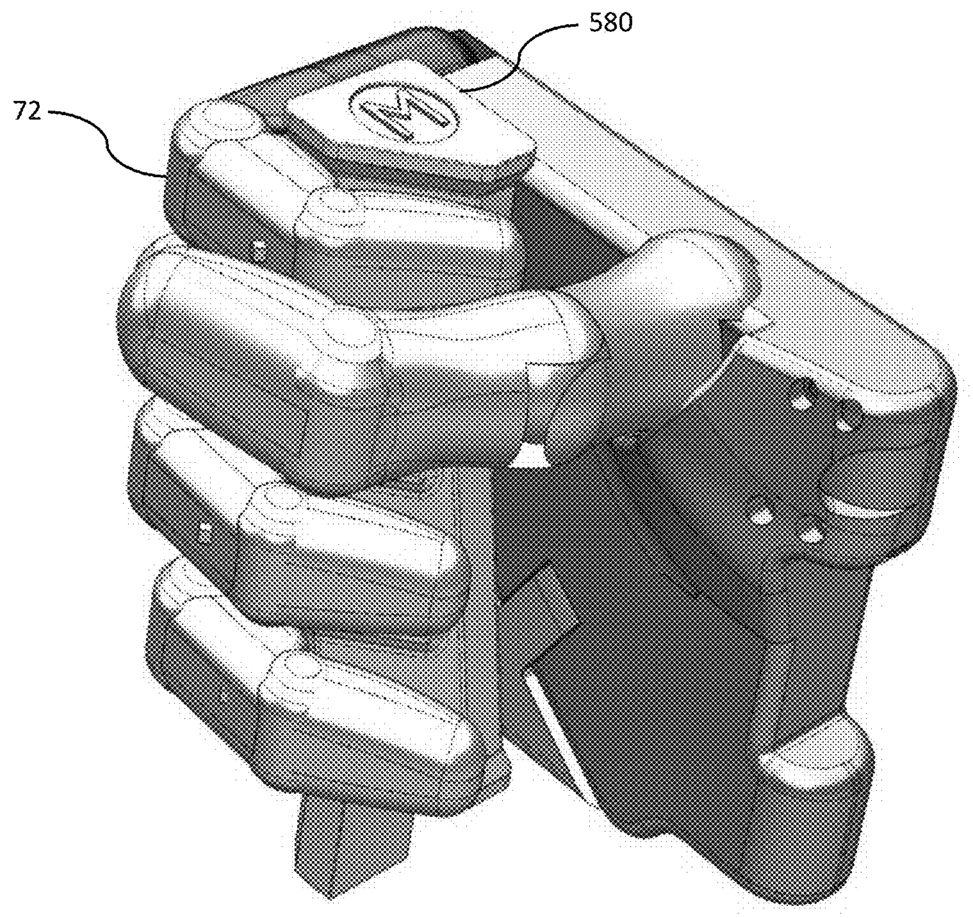

FIGS. 11A-C are block diagrams illustrating one embodiment of a kitchen handle for use with the robotic hand with the palm in accordance with the present disclosure.

Figure 12:
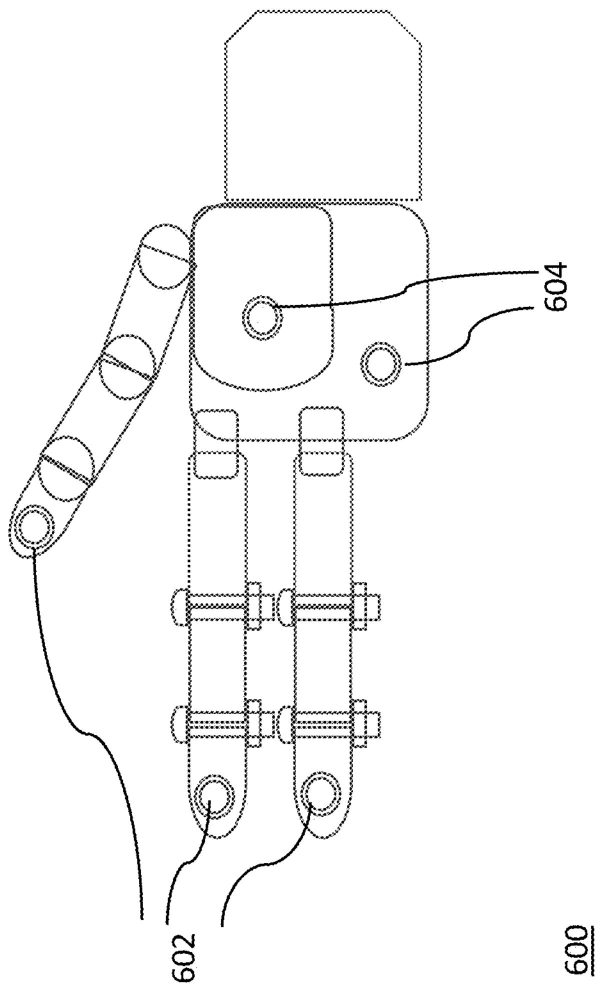

FIG. 12 is a pictorial diagram illustrating an example robotic hand with tactile sensors and distributed pressure sensors in accordance with the present disclosure.

Figure 13:
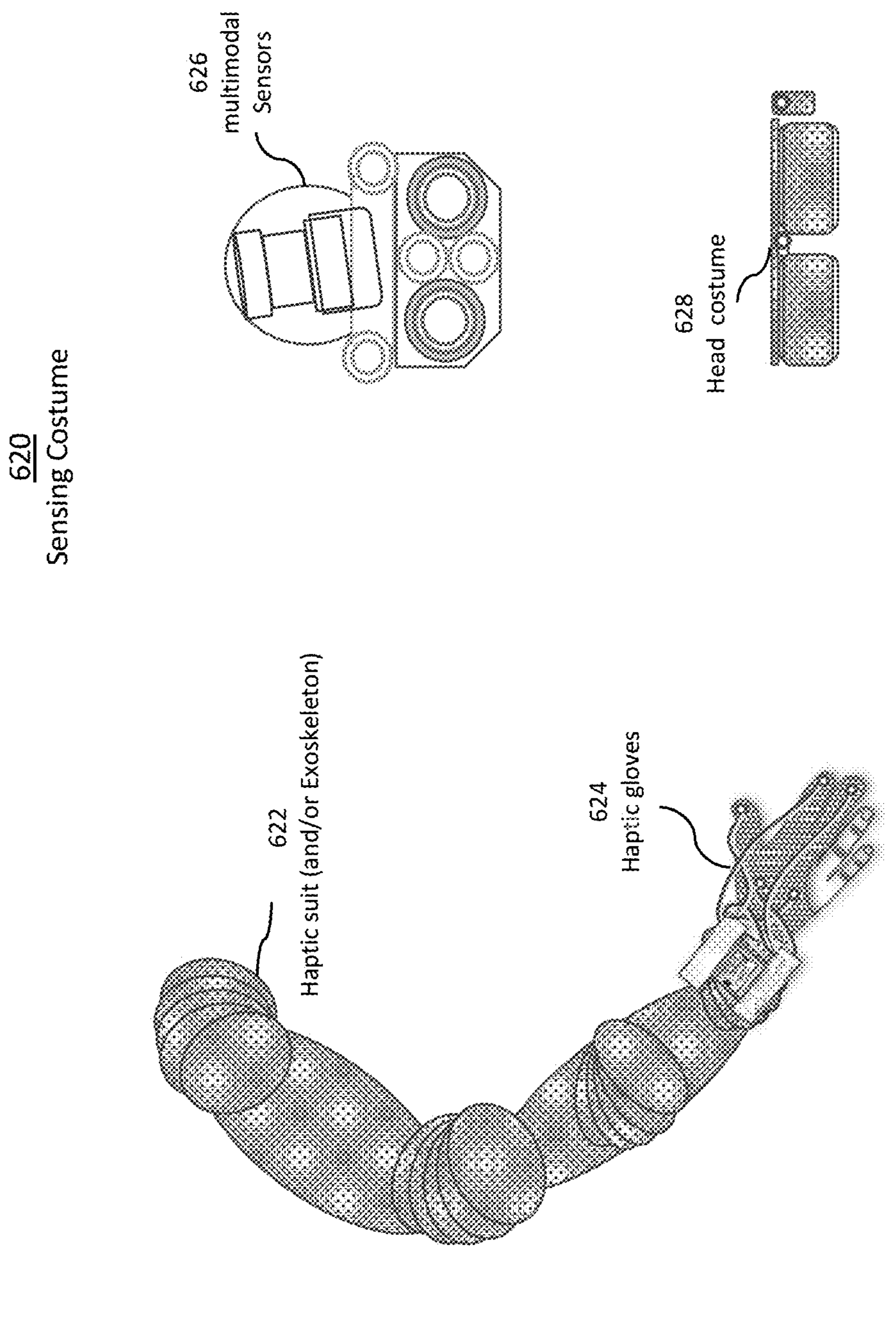

FIG. 13 is a pictorial diagram illustrating an example of a sensing costume for a chef to wear at the robotic cooking studio in accordance with the present disclosure.

Figure 14B:
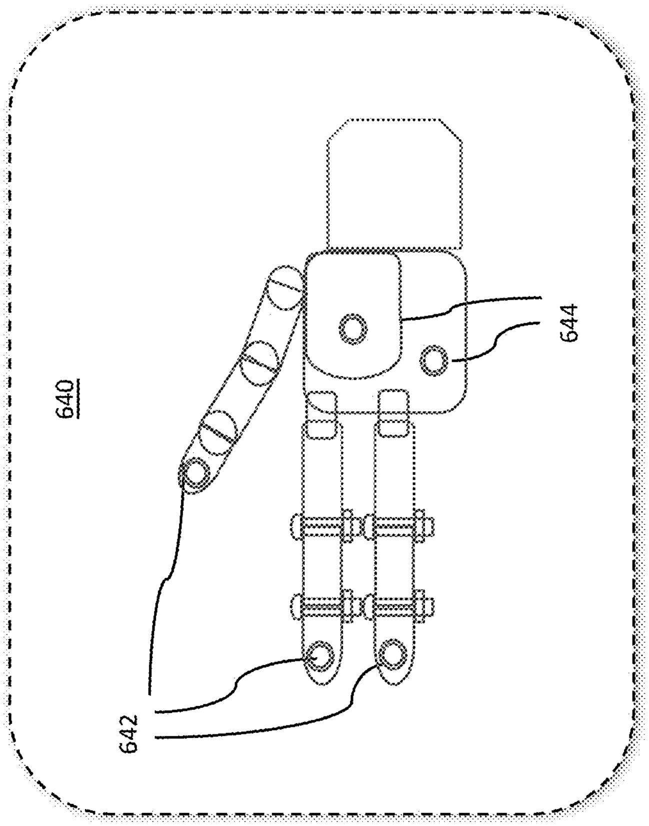
Figure 14A:
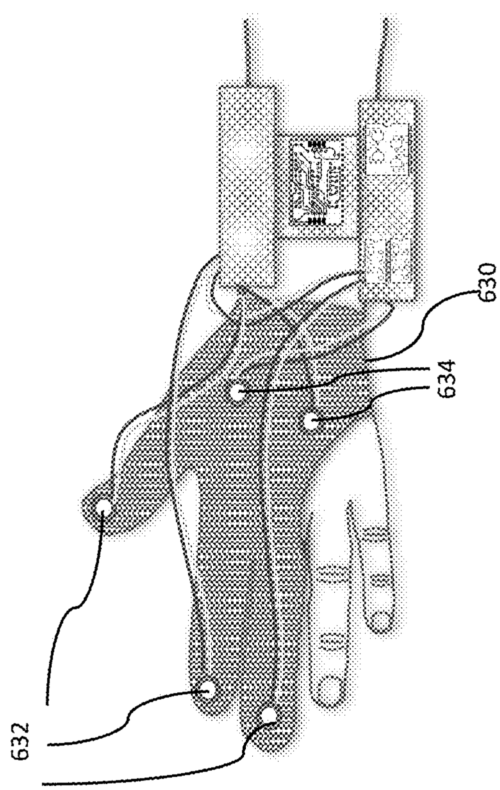
Figure 14C:
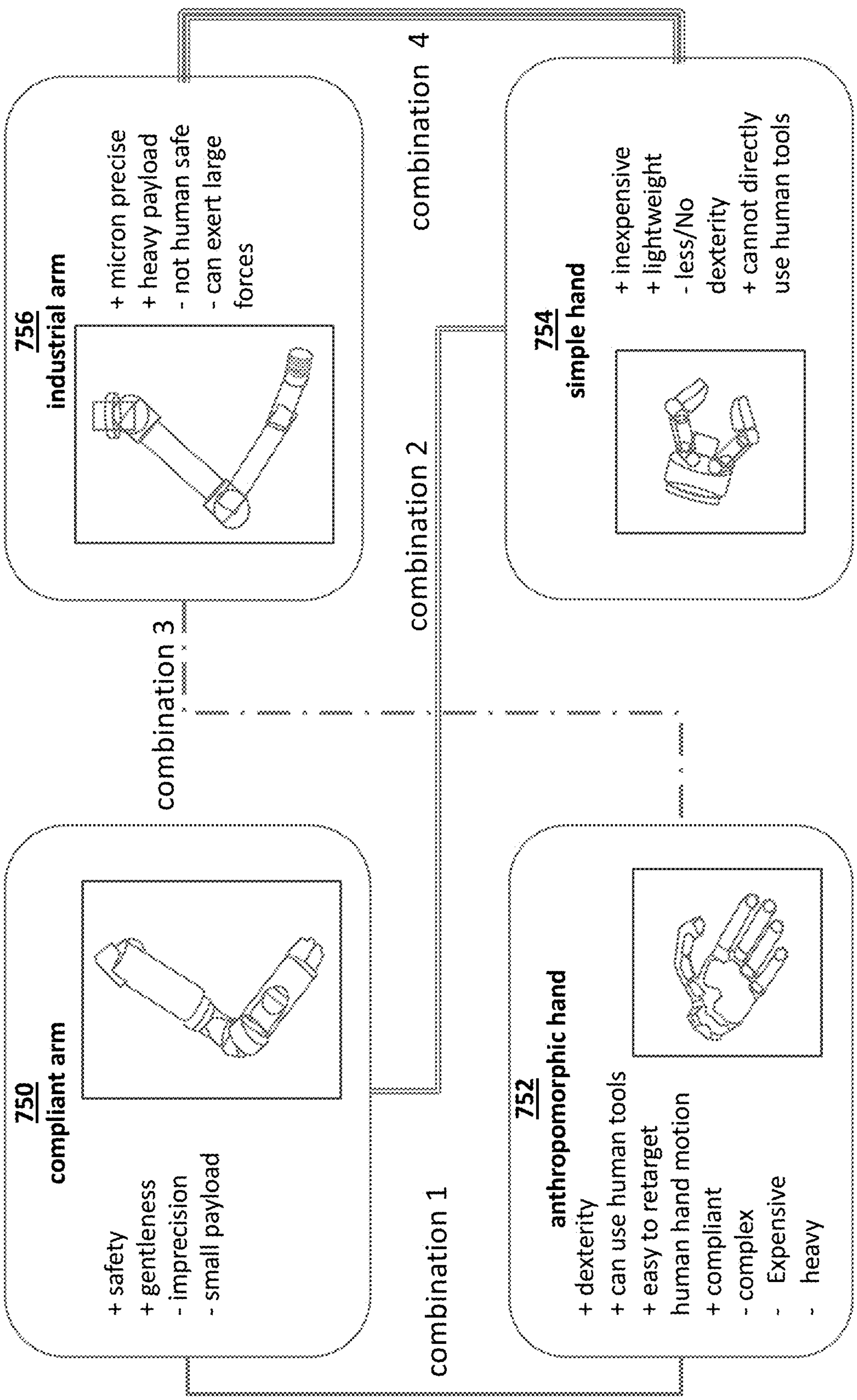
Figure 14D:
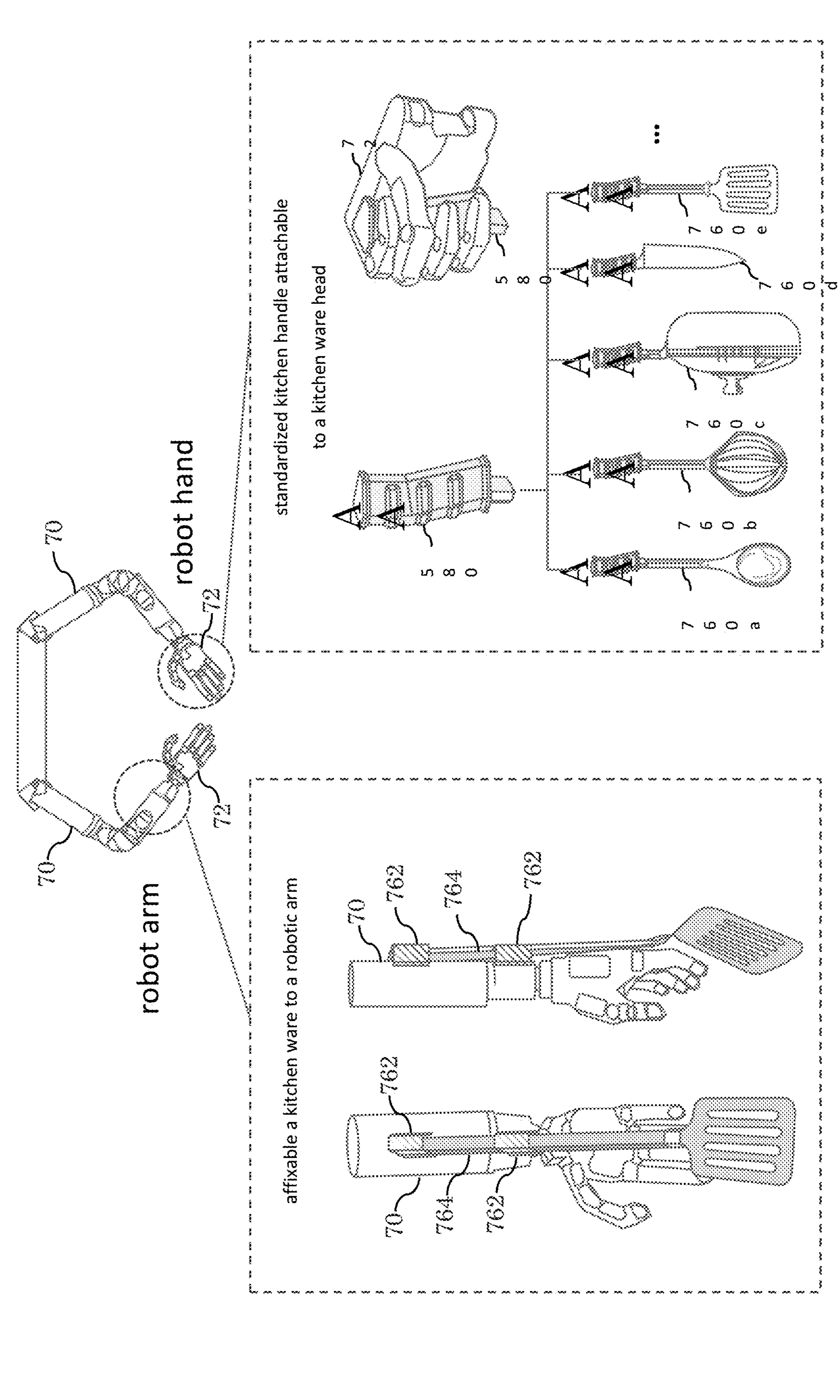

FIGS. 14A-B are pictorial diagrams illustrating one embodiment of a three-fingered haptic glove with sensors for food preparation by the chef and an example of a three-fingered robotic hand with sensors in accordance with the present disclosure; FIG. 14C is a block diagram illustrating one example of the interplay and interactions between a robotic arm and a robotic hand in accordance with the present disclosure; and FIG. 14D is a block diagram illustrating the robotic hand using the standardized kitchen handle that is attachable to a cookware head and the robotic arm attachable to kitchen ware in accordance with the present disclosure.

Figure 15A:
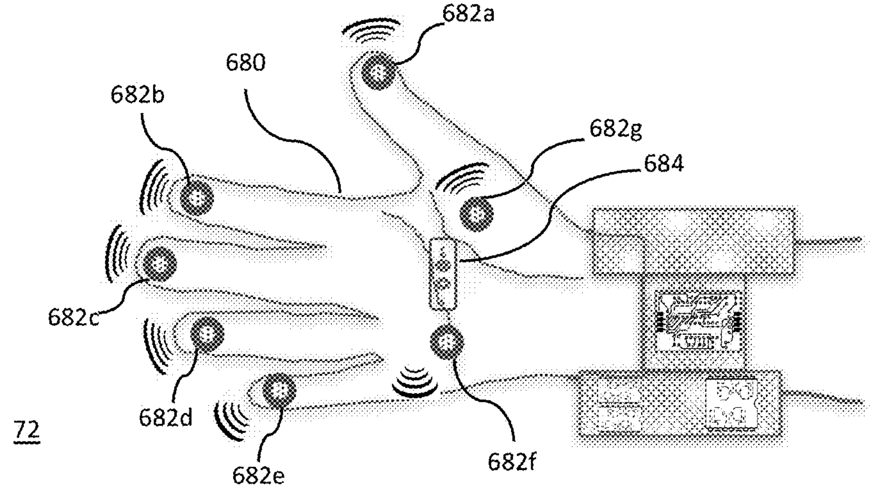
Figure 15B:
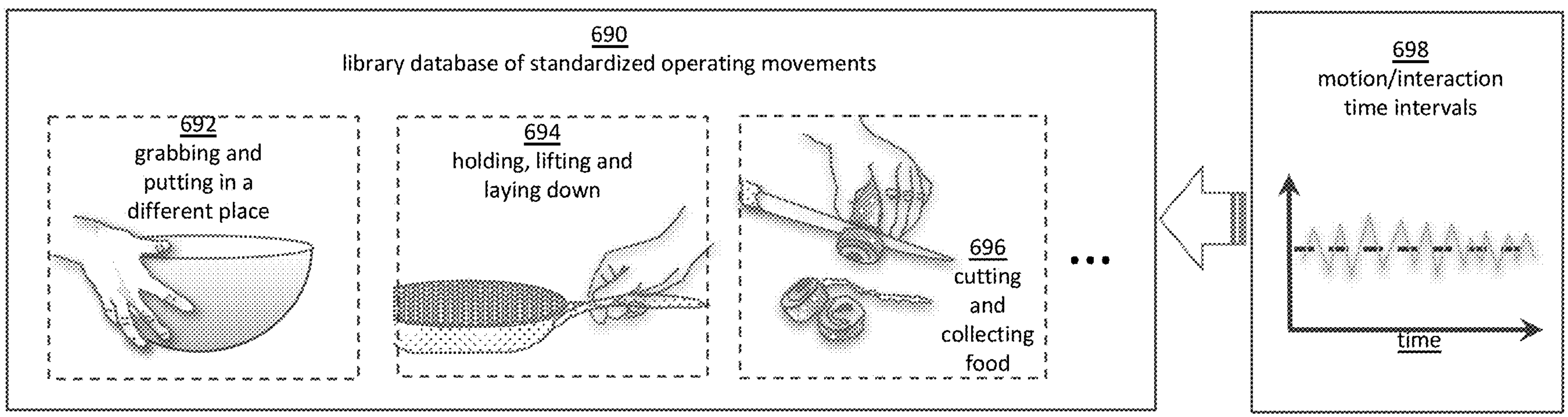

FIG. 15A is a block diagram illustrating a sensing glove used by a chef to execute standardized operating movements in accordance with the present disclosure; and FIG. 15B is a block diagram illustrating a database of standardized operating movements in the robotic kitchen module in accordance with the present disclosure.

Figure 16A:
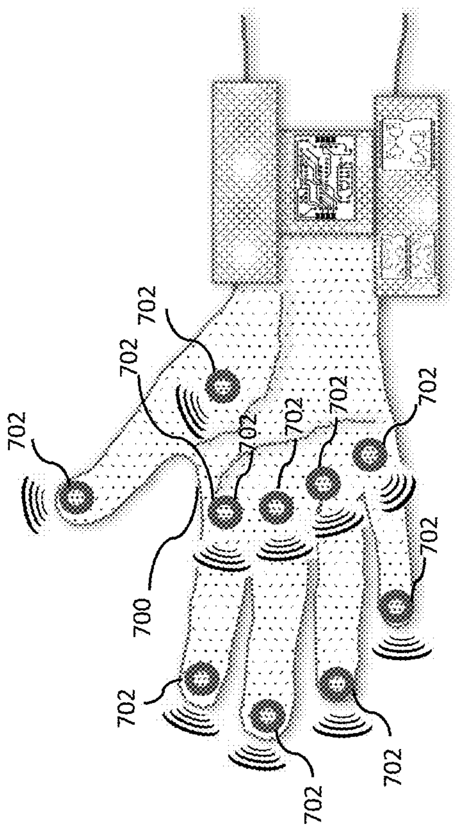
Figure 16B:
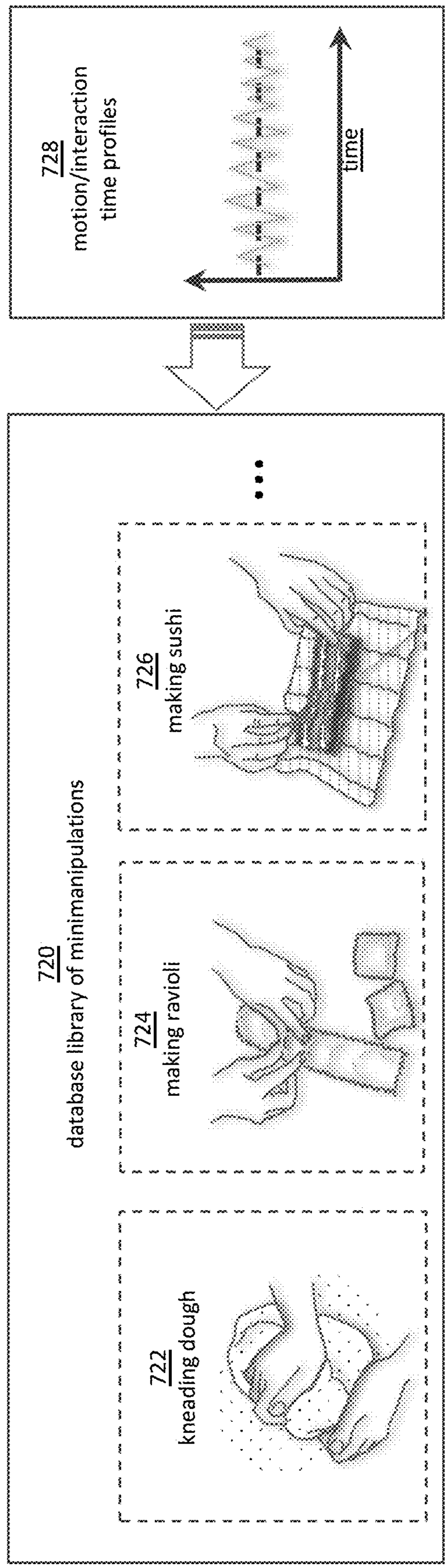
Figure 16C:
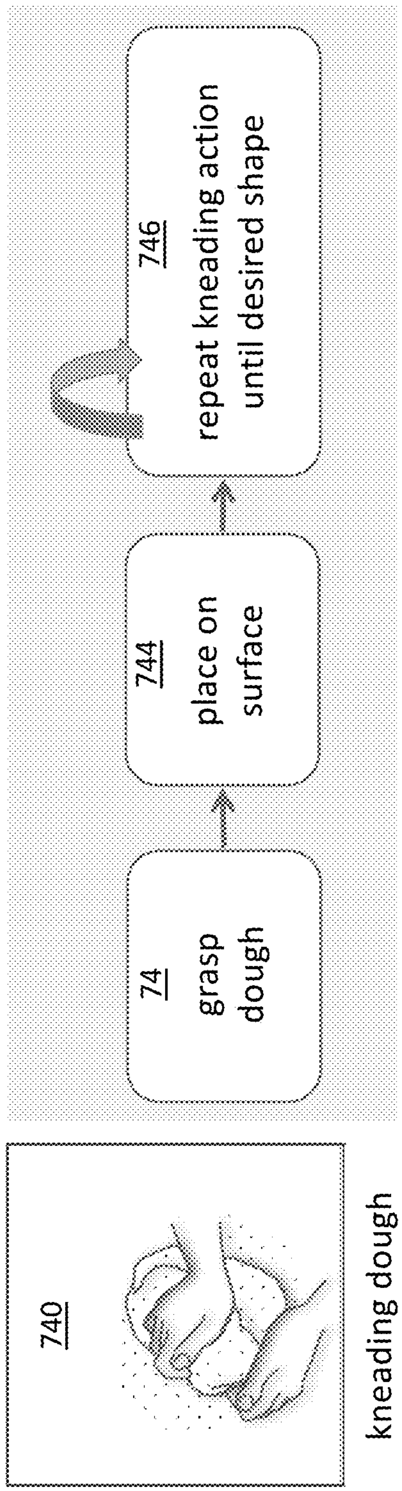

FIG. 16A is a graphical diagram illustrating that each of the robotic hand coated with a artificial human-like soft-skin glove in accordance with the present disclosure; FIG. 16B is a block diagram illustrating robotic hands coated with artificial human-like skin gloves to execute high-level minimanipulations based on a library database of minimanipulations, which have been predefined and stored in the library database, in accordance with the present disclosure; and FIG. 16C is a flow diagram illustrating one embodiment on taxonomy of manipulation actions for food preparation in accordance with the present disclosure.

Figure 17:
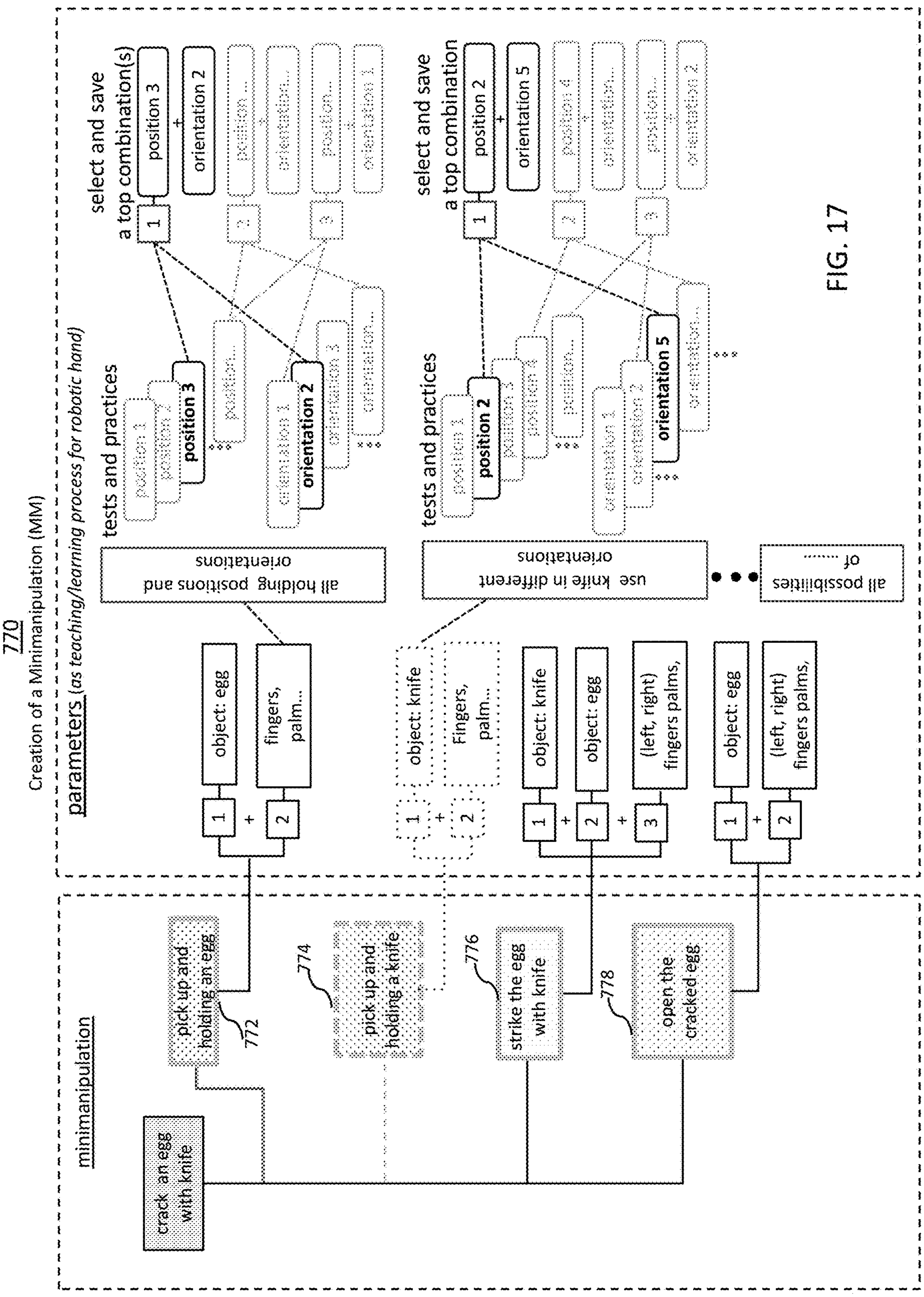

FIG. 17 is a block diagram illustrating the creation of a minimanipulation that results in cracking an egg with a knife, an example in accordance with the present disclosure.

Figure 18:
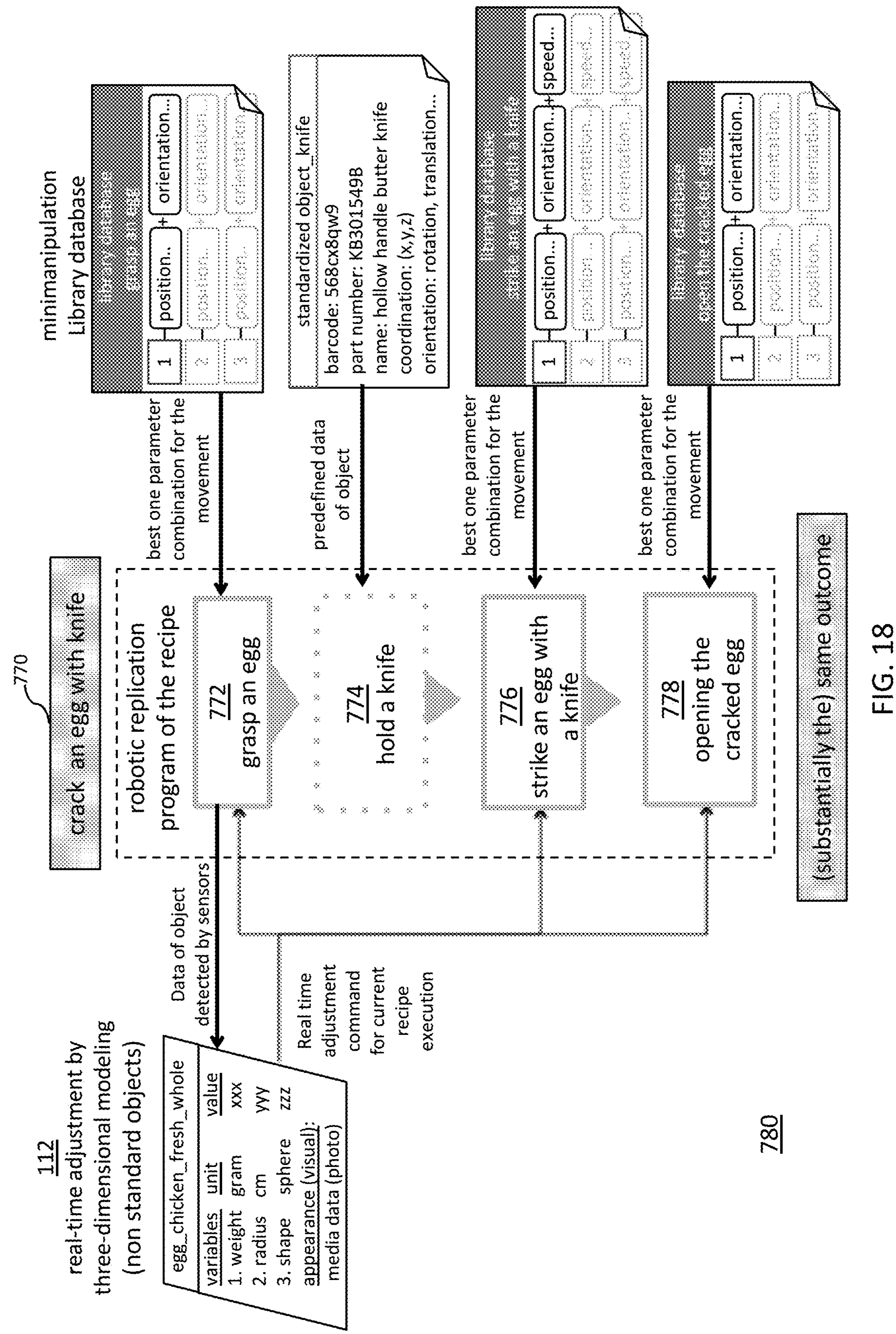

FIG. 18 is a block diagram illustrating an example of recipe execution for a minimanipulation with real-time adjustment in accordance with the present disclosure.

Figure 19:
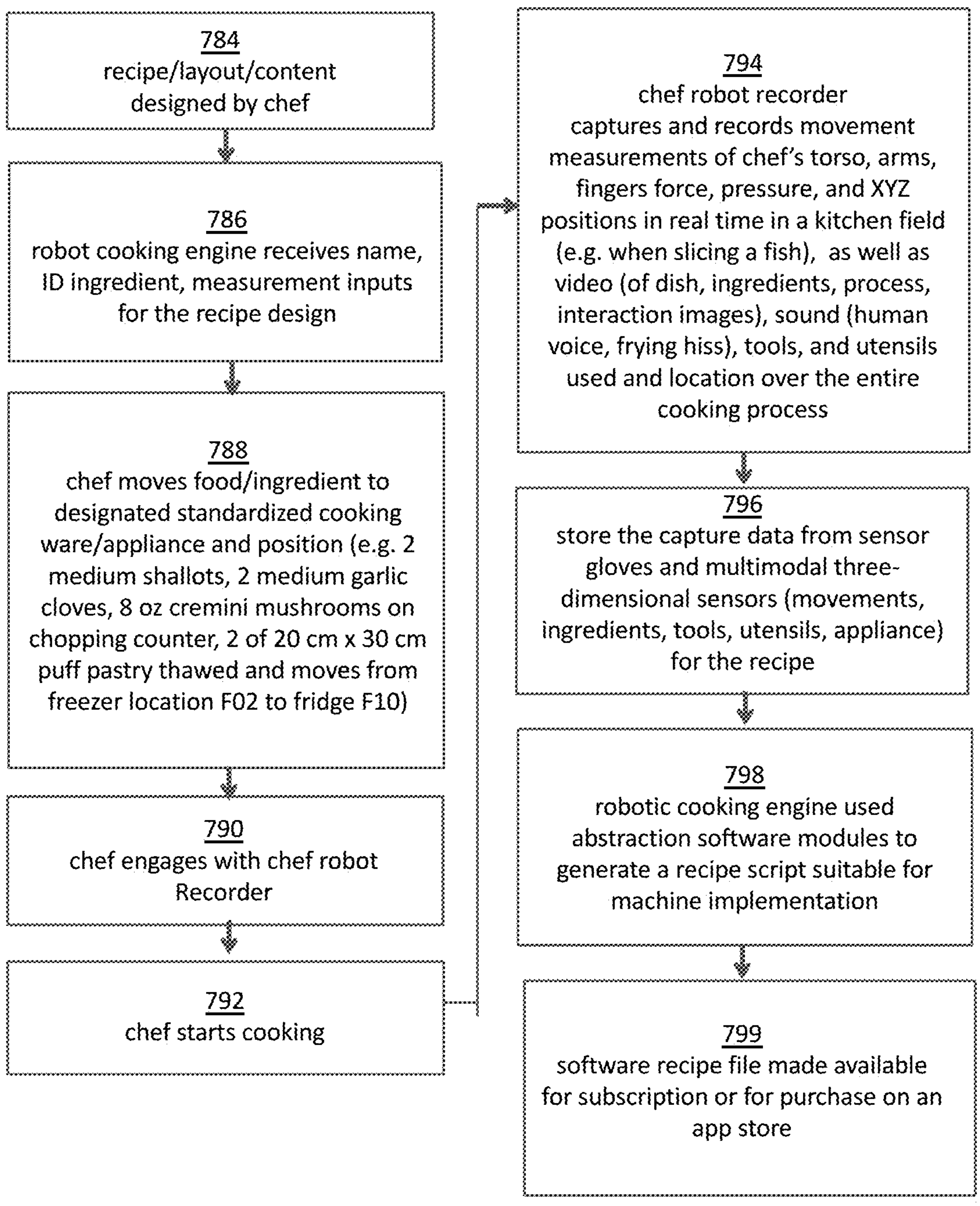

FIG. 19 is a flow diagram illustrating the software process to capture a chef's food preparation movements in a standardized kitchen module in accordance with the present disclosure.

Figure 20:
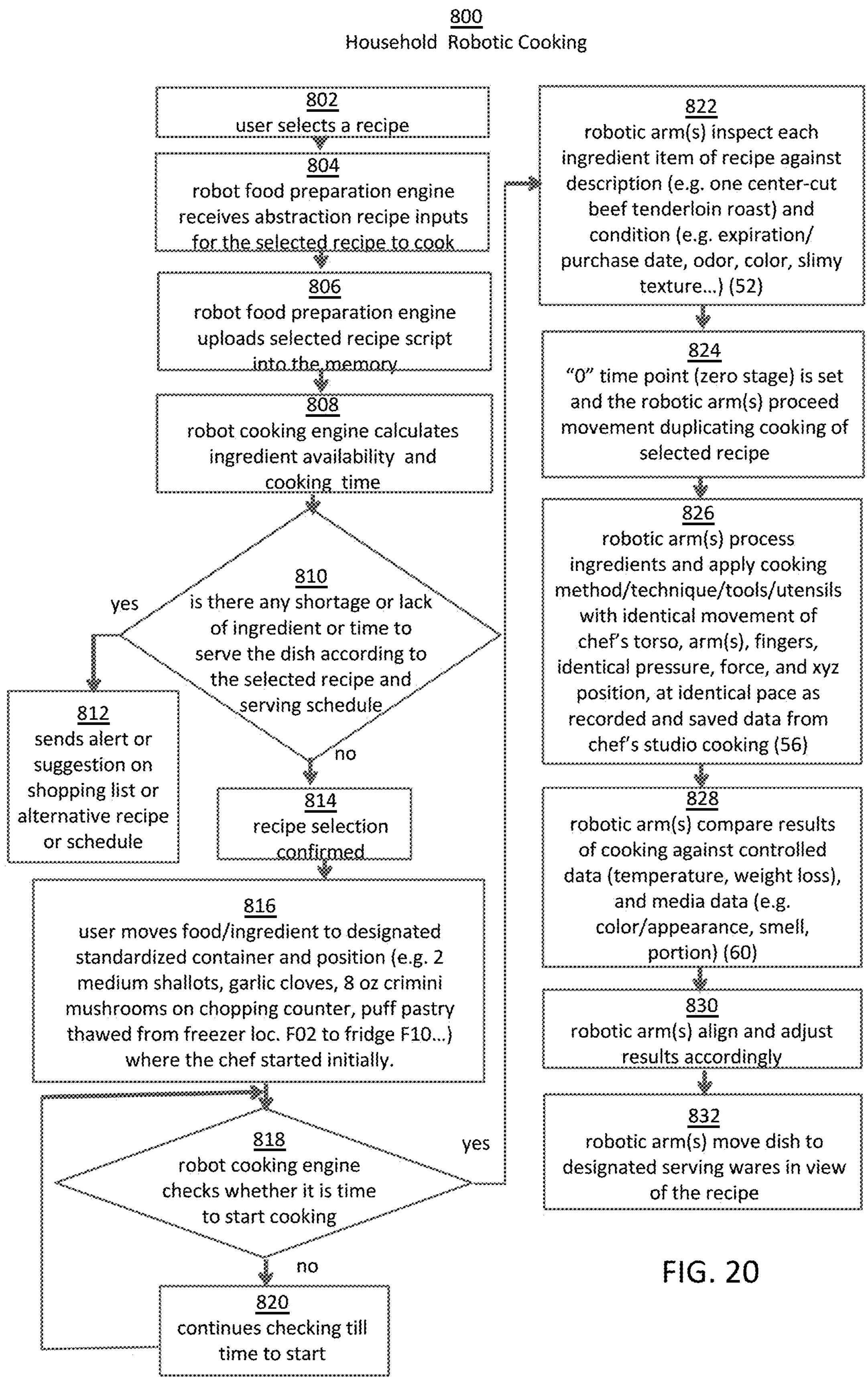

FIG. 20 is a flow diagram illustrating the software process for food preparation by robotic apparatus in the robotic standardized kitchen module in accordance with the present disclosure.

Figure 21:
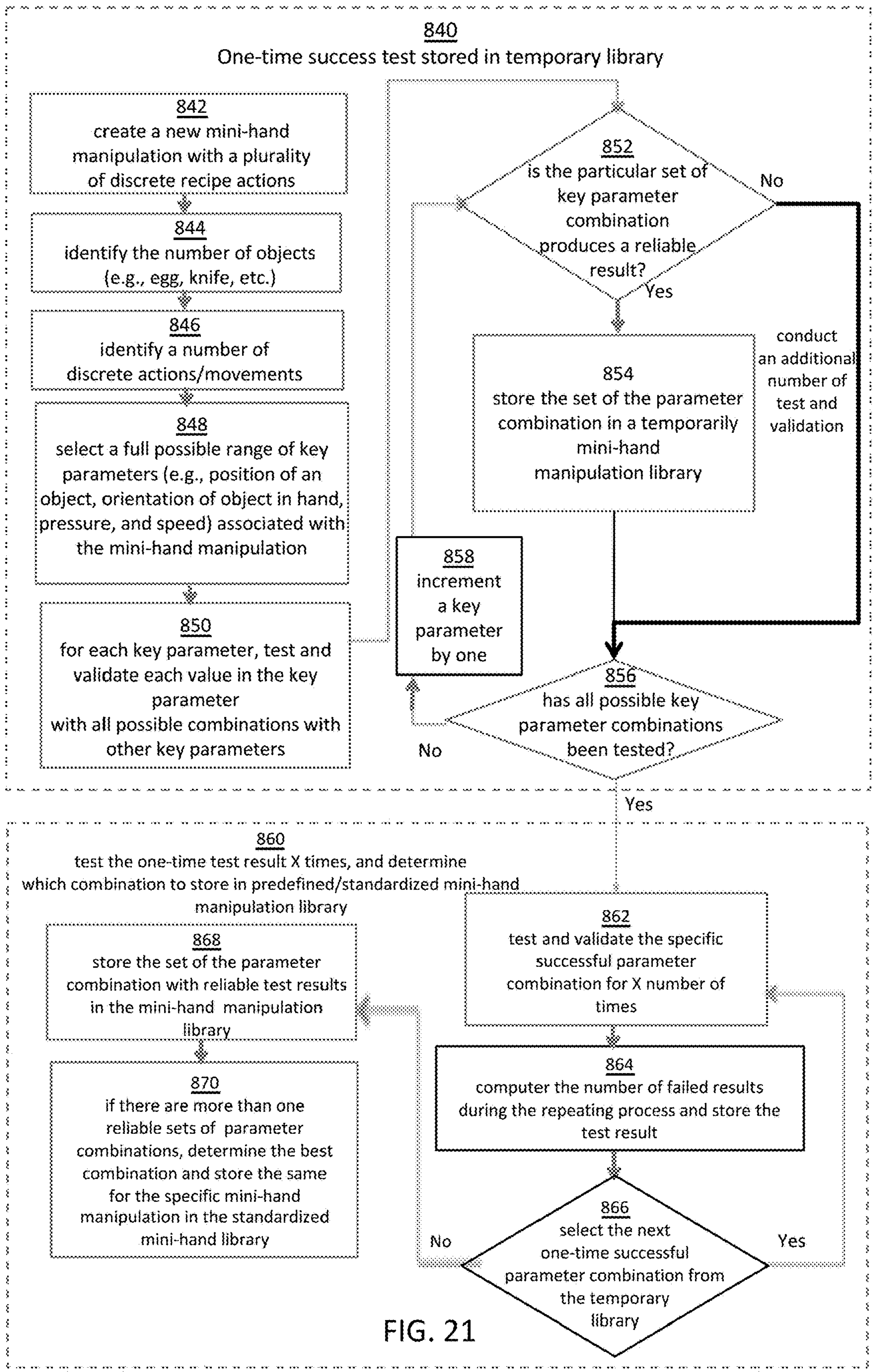

FIG. 21 is a flow diagram illustrating one embodiment of the software process for creating, testing, validating, and storing the various parameter combinations for a minimanipulation system in accordance with the present disclosure.

Figure 22:
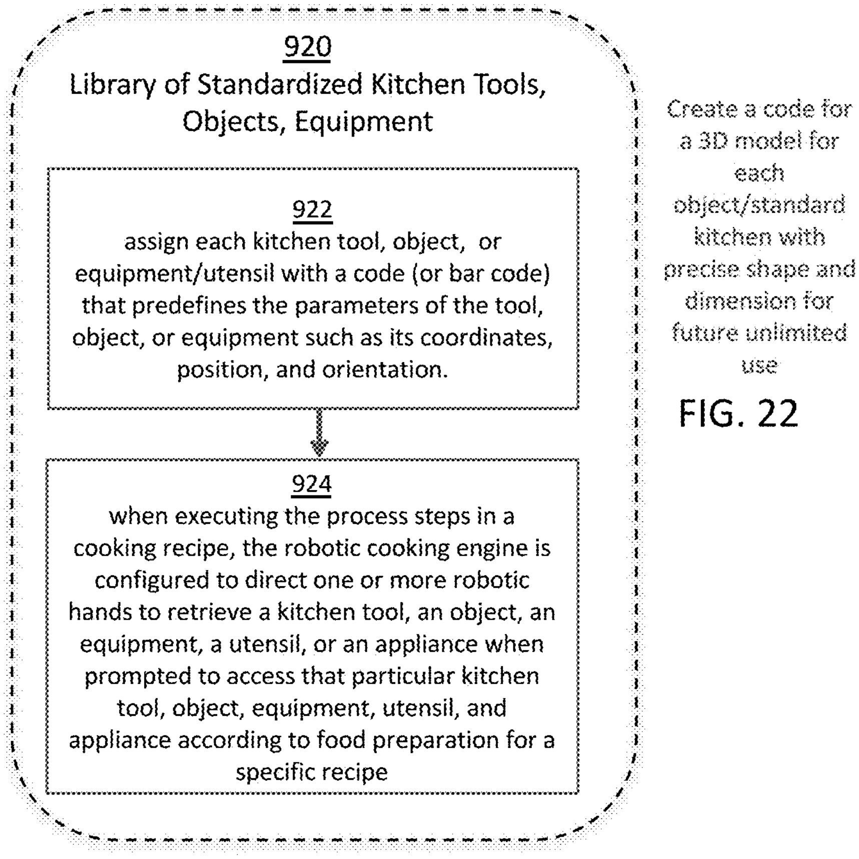

FIG. 22 is a flow diagram illustrating the process of assigning and utilizing a library of standardized kitchen tools, standardized objects, and standardized equipment in a standardized robotic kitchen in accordance with the present disclosure.

Figure 23:
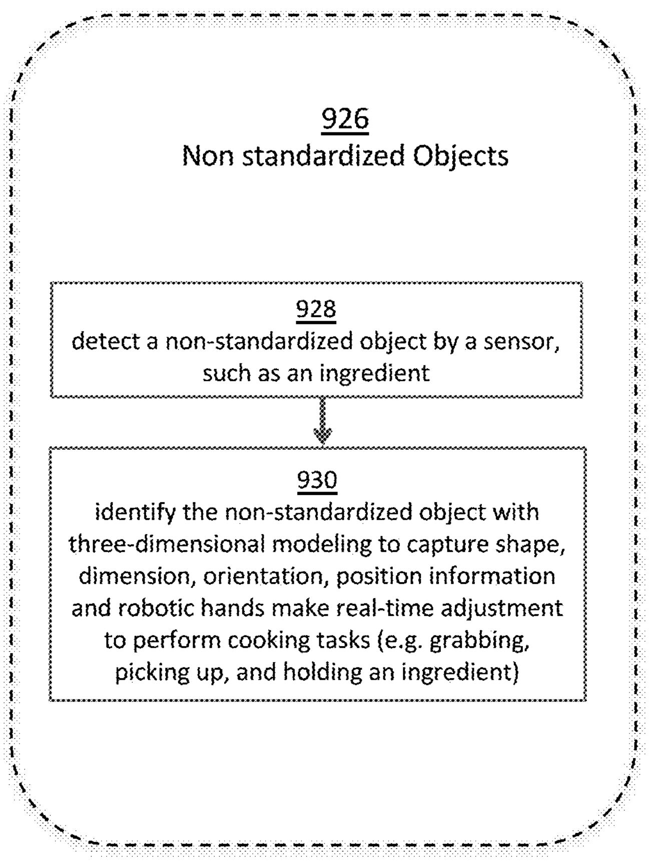

FIG. 23 is a flow diagram illustrating the process of identifying a non-standardized object with three-dimensional modeling in accordance with the present disclosure.

Figure 24:
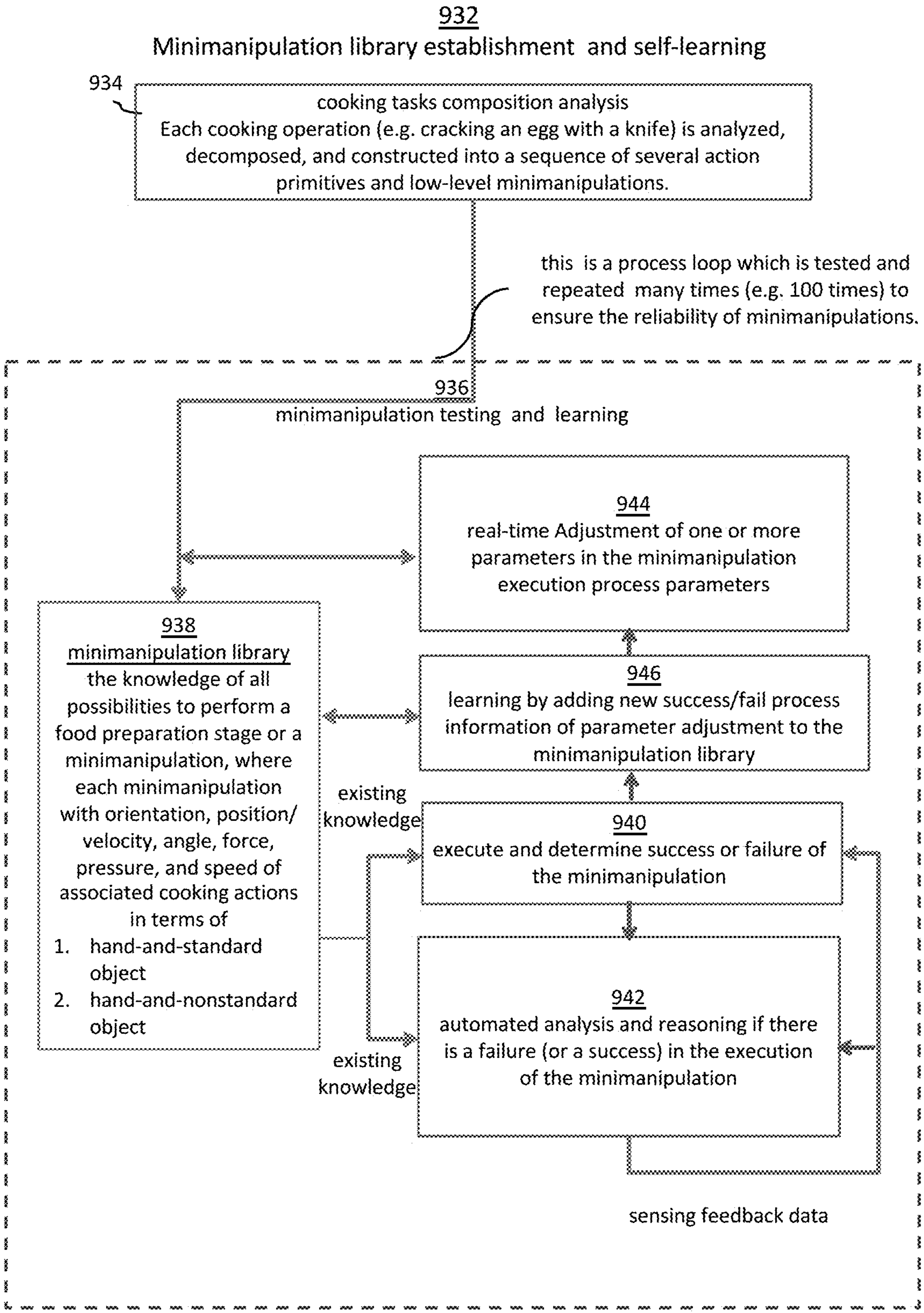

FIG. 24 is a flow diagram illustrating the process for testing and learning of minimanipulations in accordance with the present disclosure.

Figure 25:
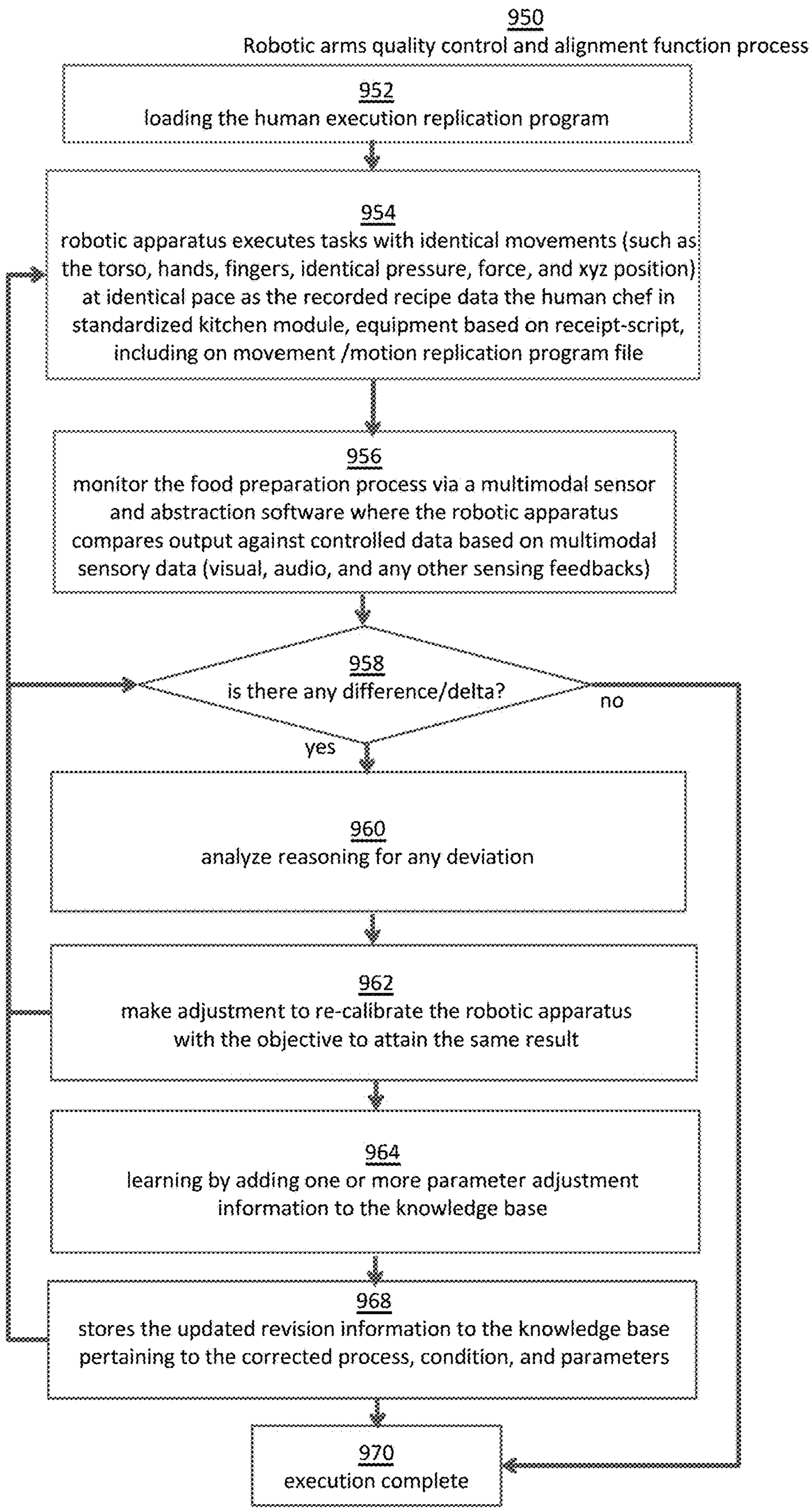

FIG. 25 is a flow diagram illustrating the process for robotic arms quality control and alignment function process in accordance with the present disclosure.

FIG. 26 is a table illustrating a database library structure of minimanipulations objects for use in the standardized robotic kitchen in accordance with the present disclosure.

FIG. 27 is a table illustrating a database library structure of standardized objects for use in the standardized robotic kitchen in accordance with the present disclosure.

Figure 28:
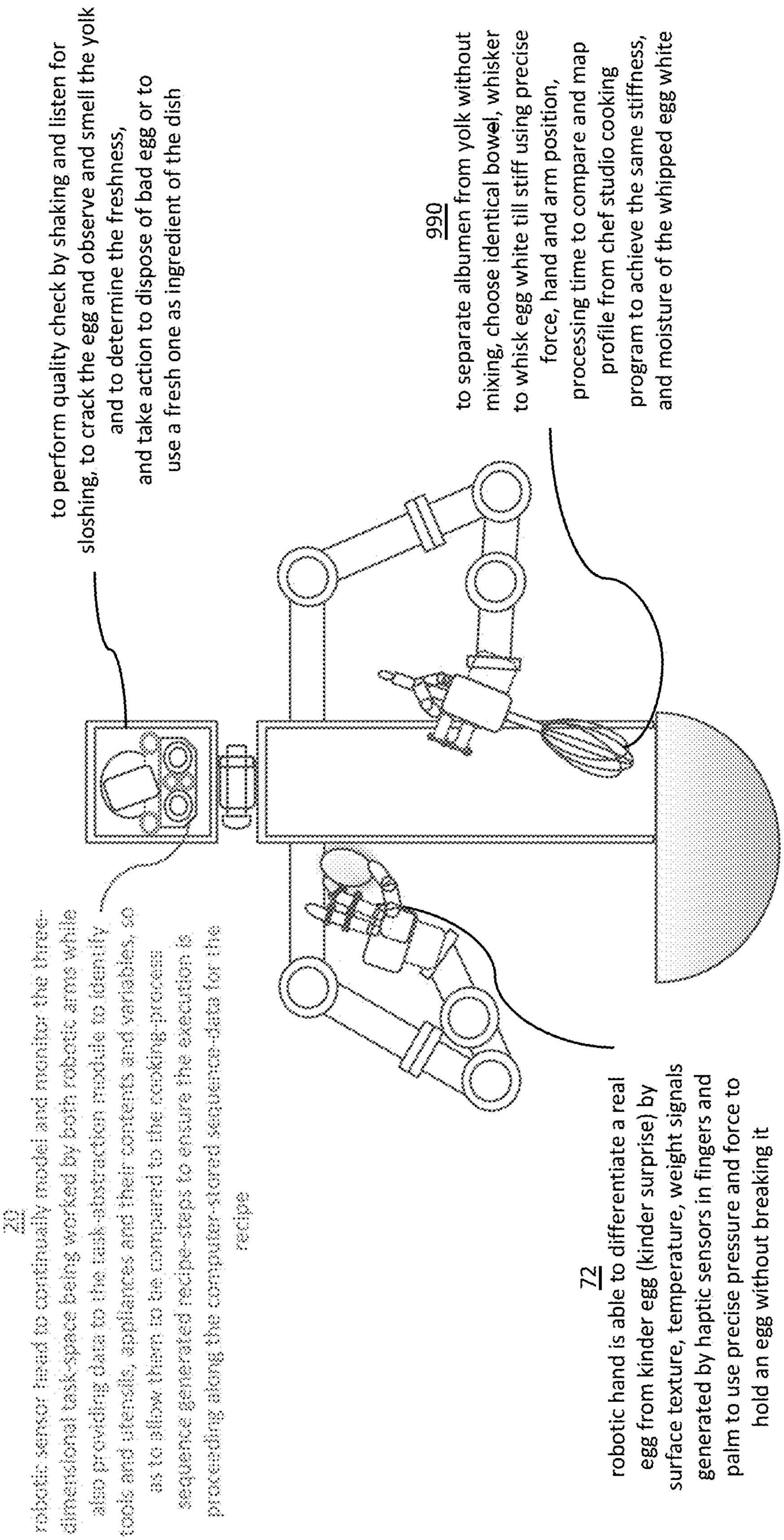

FIG. 28 is a pictorial diagram illustrating a robotic sensor head for conducting quality check in a bowl in accordance with the present disclosure.

Figure 29:
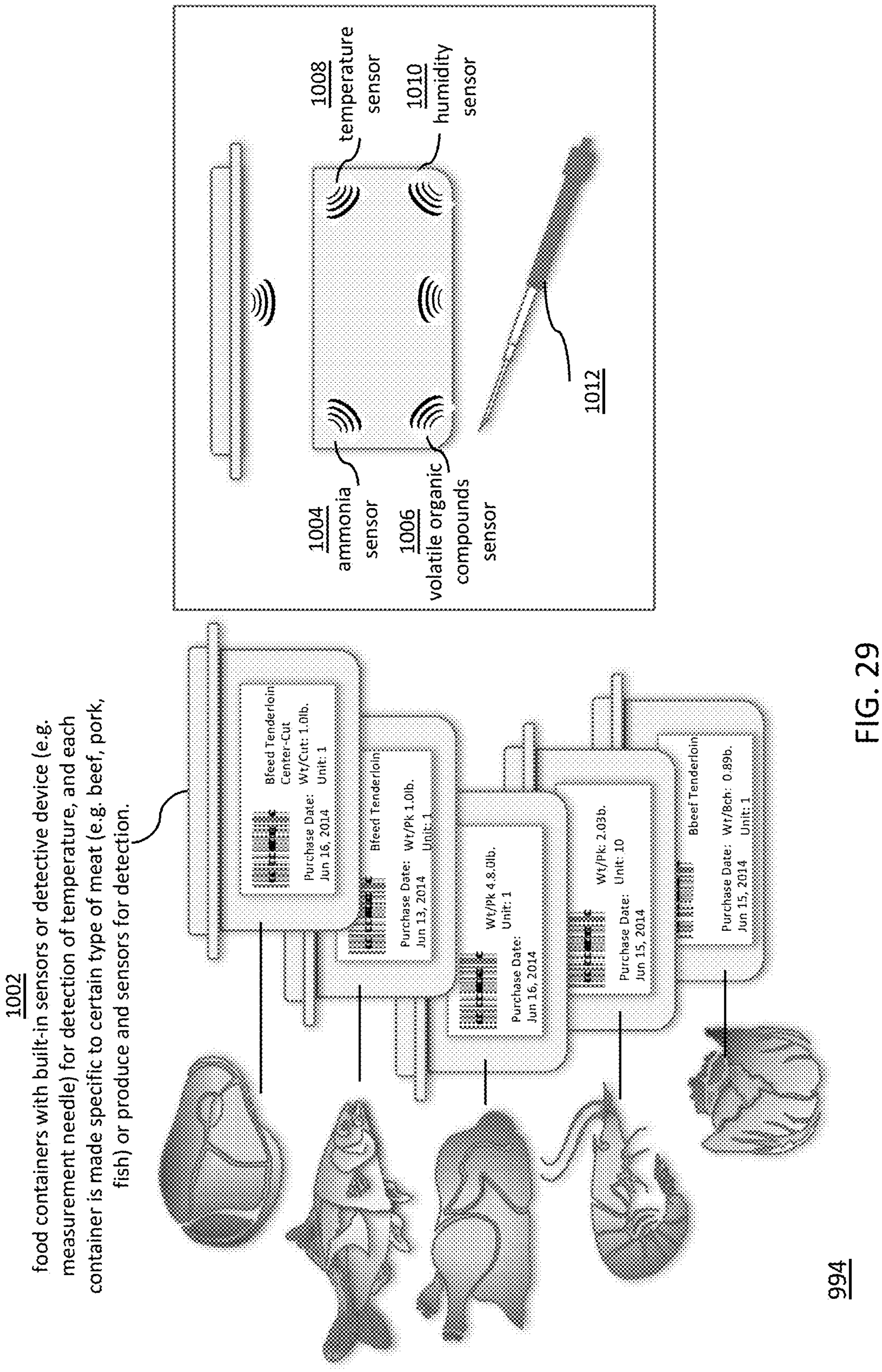

FIG. 29 is a pictorial diagram illustrating a detection device or container with a sensor for determining the freshness and quality of food in accordance with the present disclosure.

Figure 30:
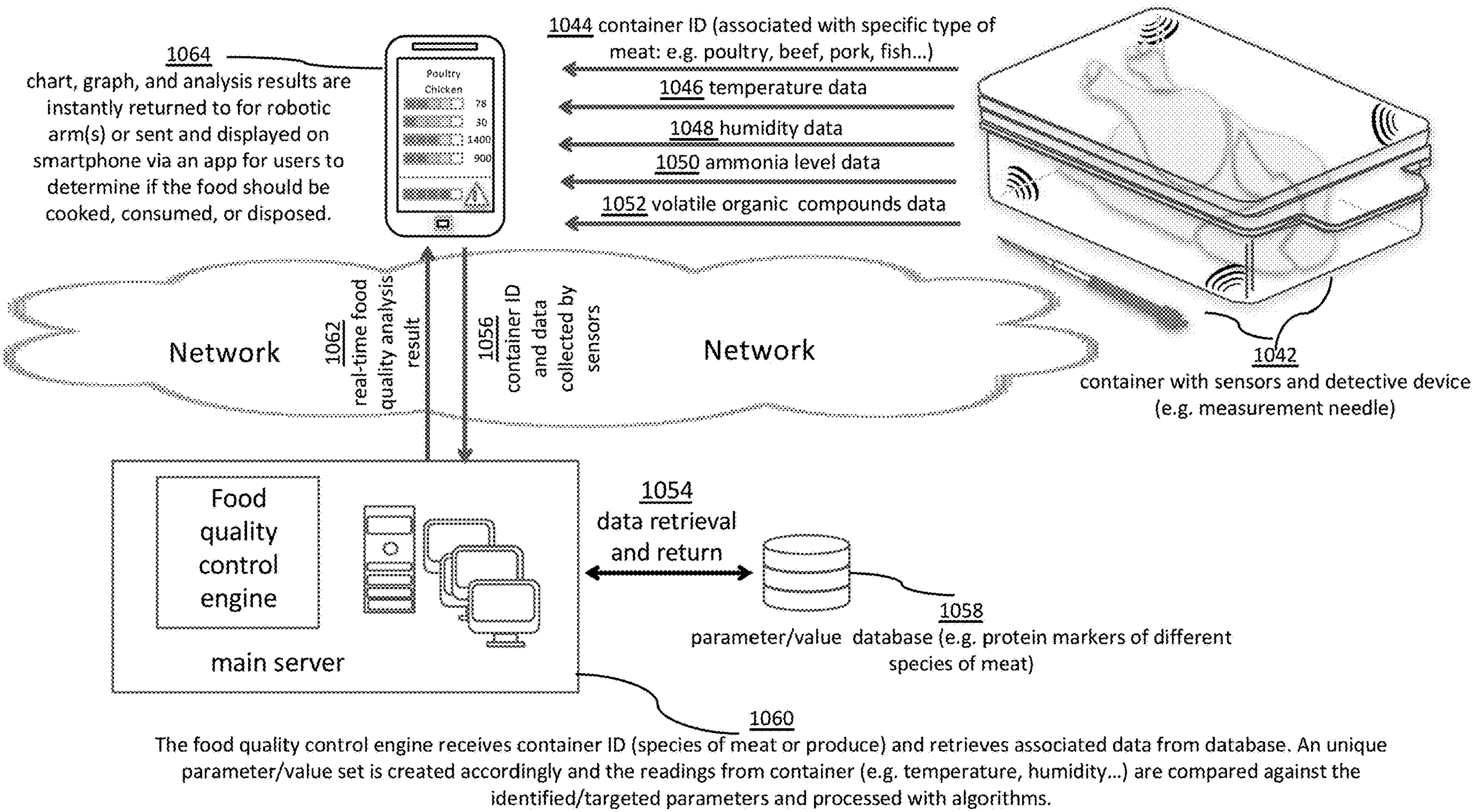

FIG. 30 is a system diagram illustrating an online analysis system for determining the freshness and quality of food in accordance with the present disclosure.

Figure 31:
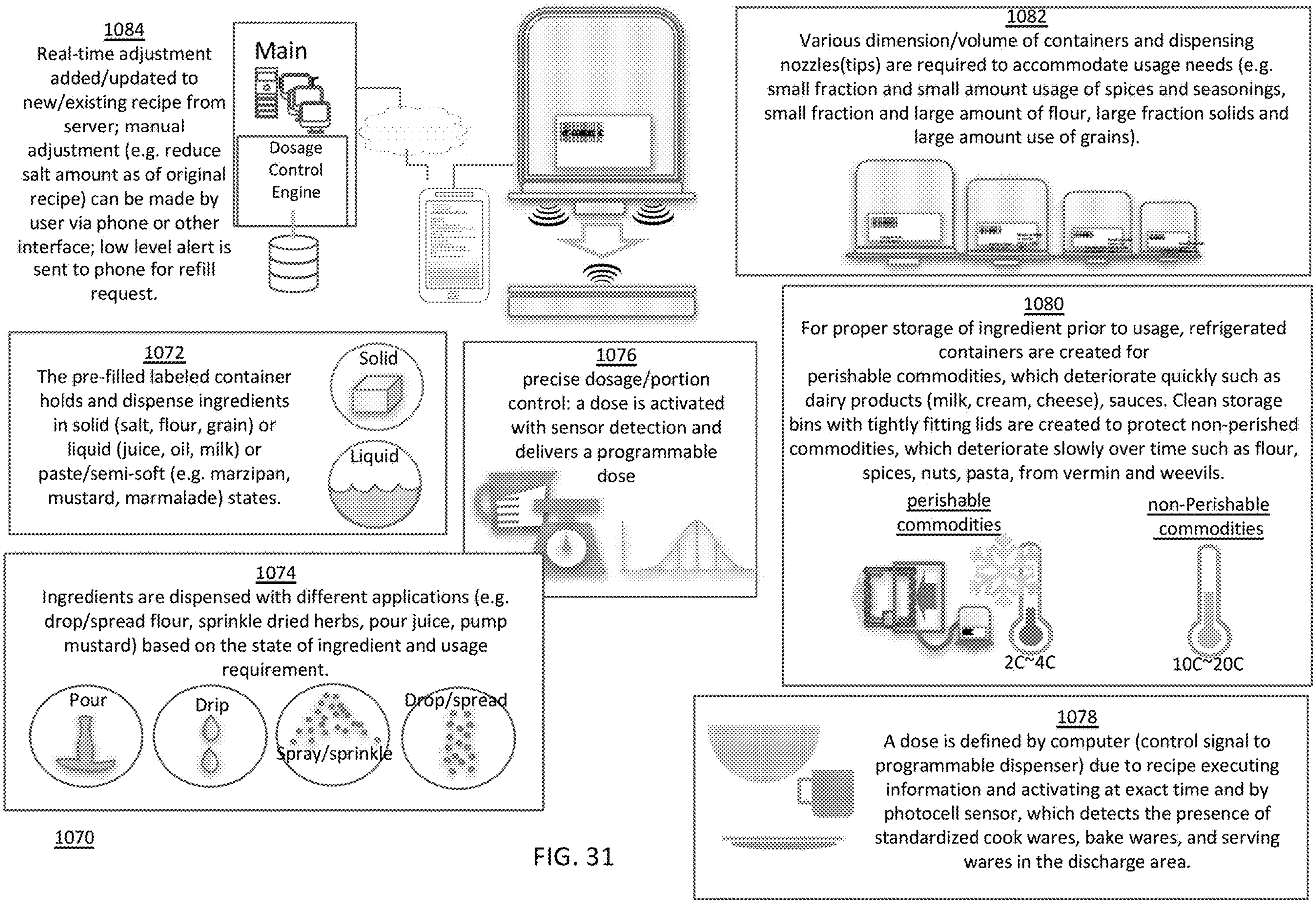

FIG. 31 is a block diagram illustrating pre-filled containers with programmable dispenser control in accordance with the present disclosure.

Figure 32:
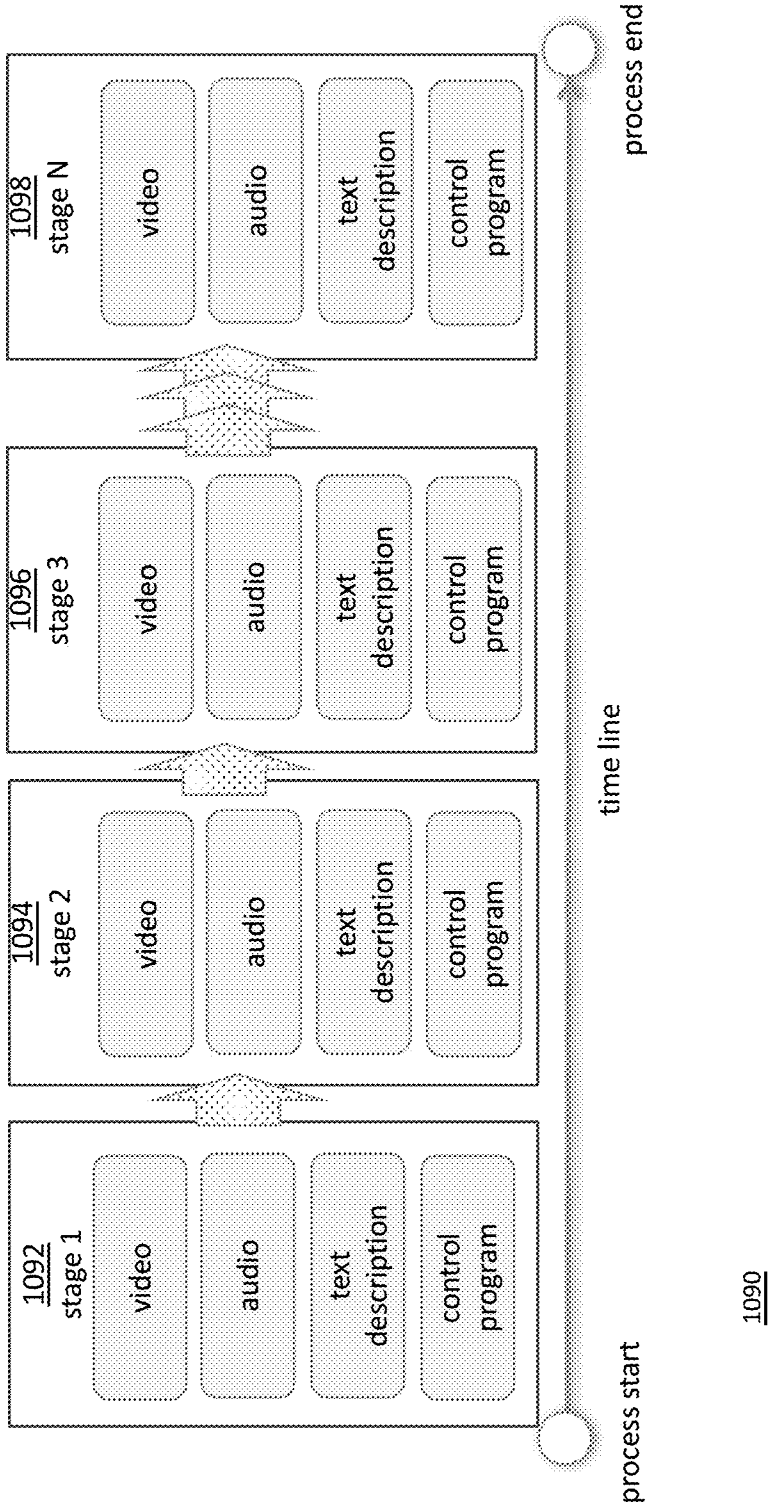

FIG. 32 is a block diagram illustrating recipe structure and process for food preparation in the standardized robotic kitchen in accordance with the present disclosure.

Figure 33:
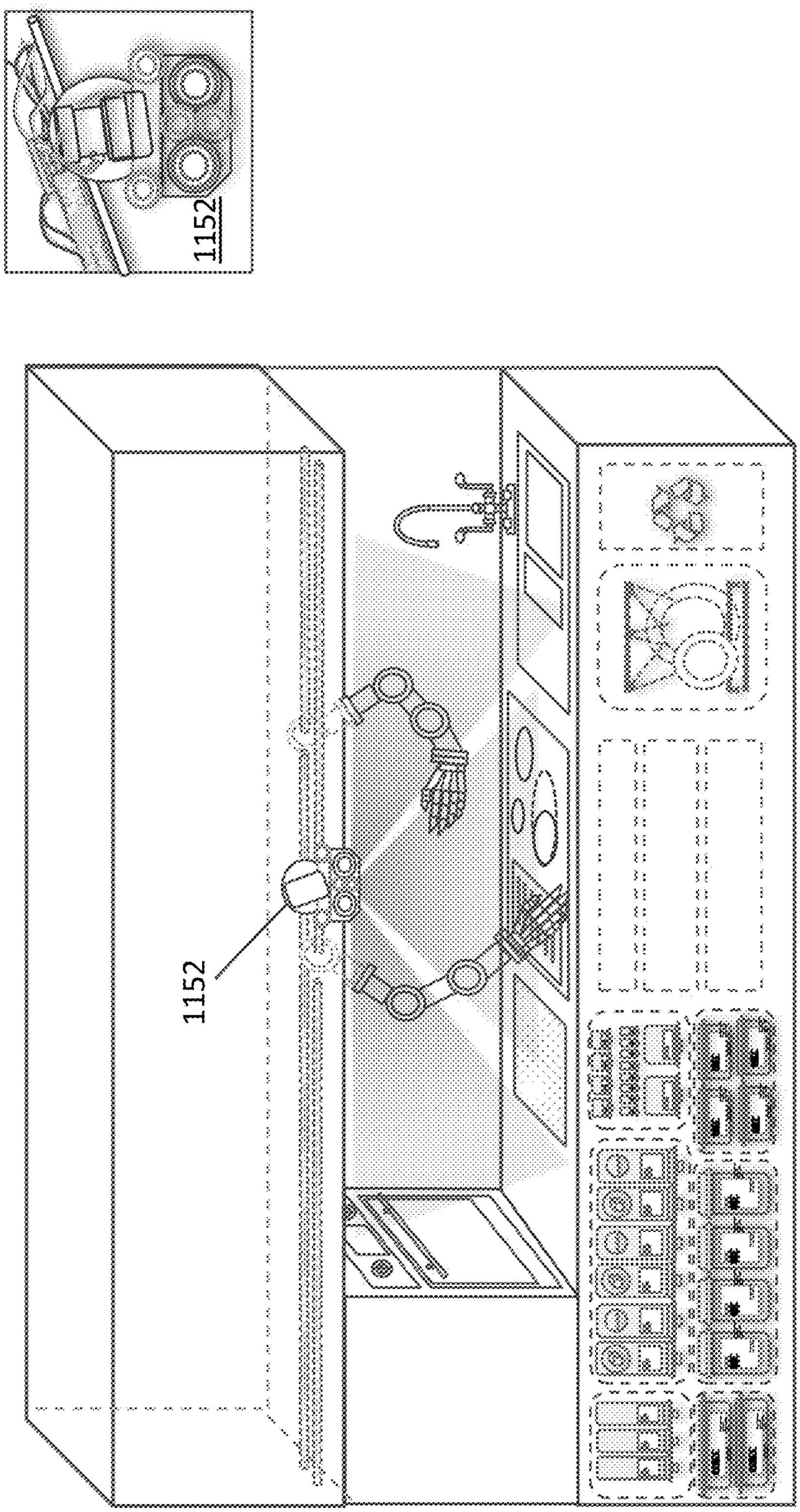

FIG. 33 is a block diagram illustrating the standardized robotic kitchen with an augmented sensor for three-dimensional tracking and reference data generation in accordance with the present disclosure.

Figure 34:
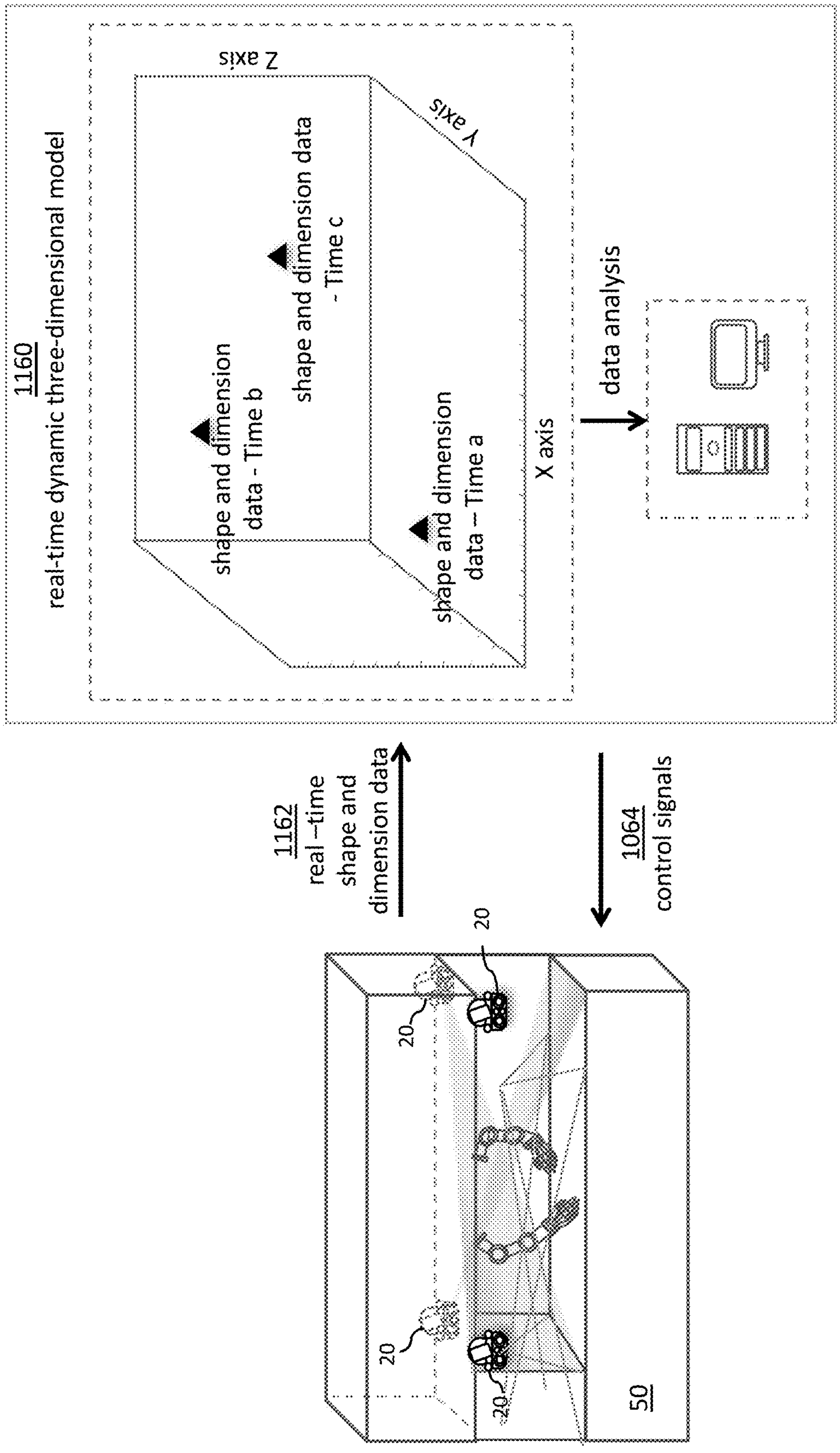

FIG. 34 is a block diagram illustrating the standardized robotic kitchen with multiple sensors for creating real-time three-dimensional modeling in accordance with the present disclosure.

FIGS. 35A-H are block diagrams illustrating the various embodiments and features of the standardized robotic kitchen in accordance with the present disclosure.

Figure 36A:
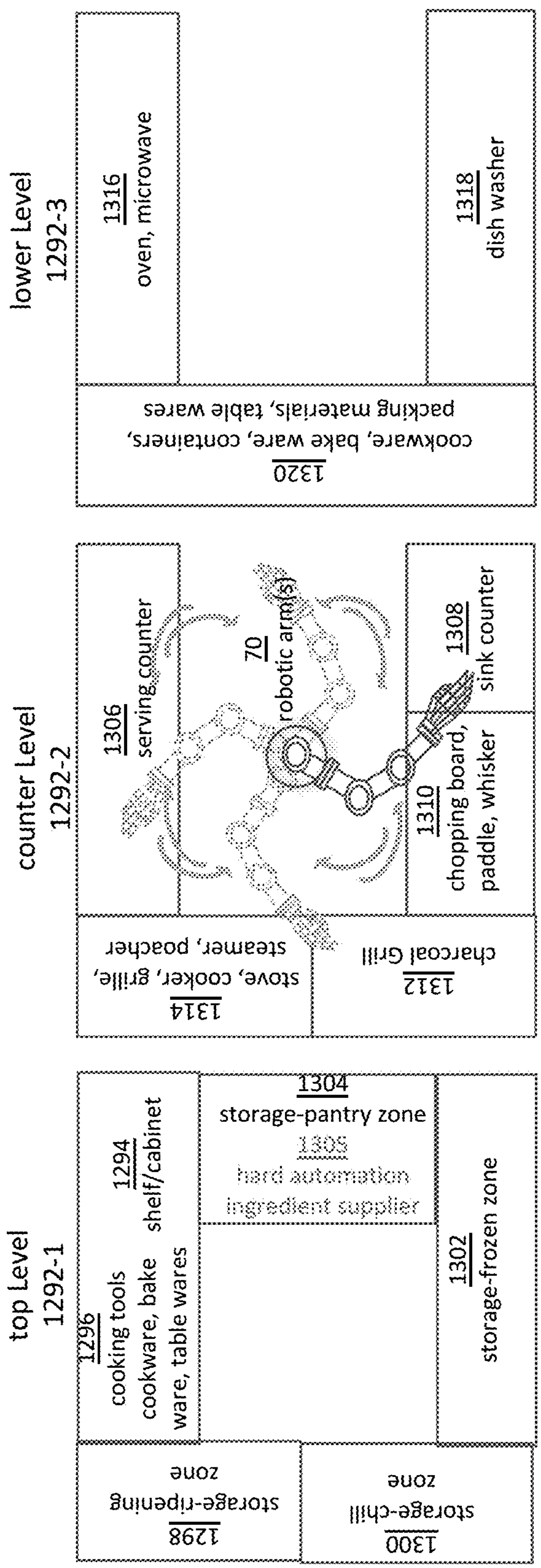
Figure 36B:
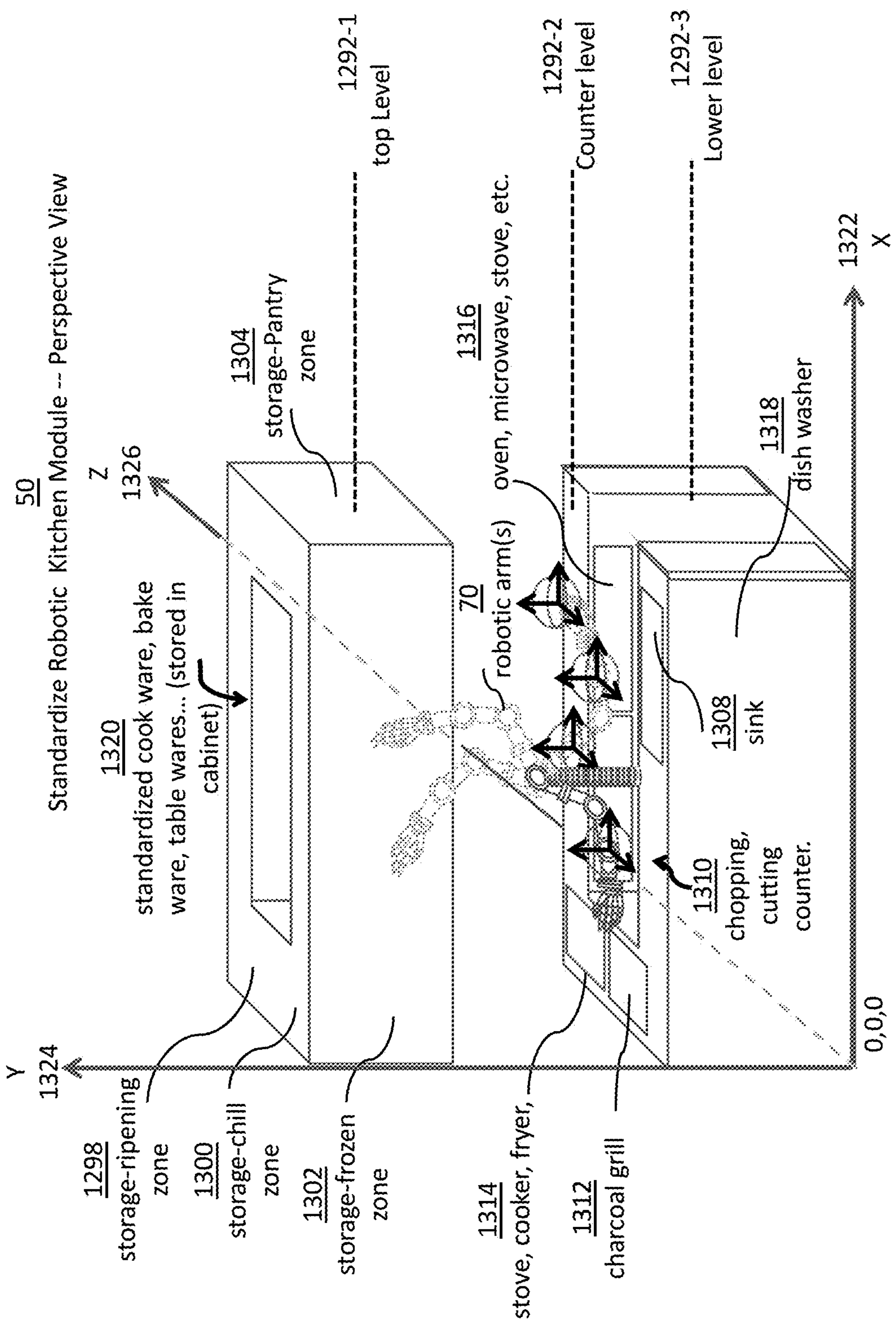

FIG. 36A is block diagram illustrating a top plan view of the standardized robotic kitchen in accordance with the present disclosure; and FIG. 36B is a block diagram illustrating a perspective plan view of the standardized robotic kitchen in accordance with the present disclosure.

Figure 37:
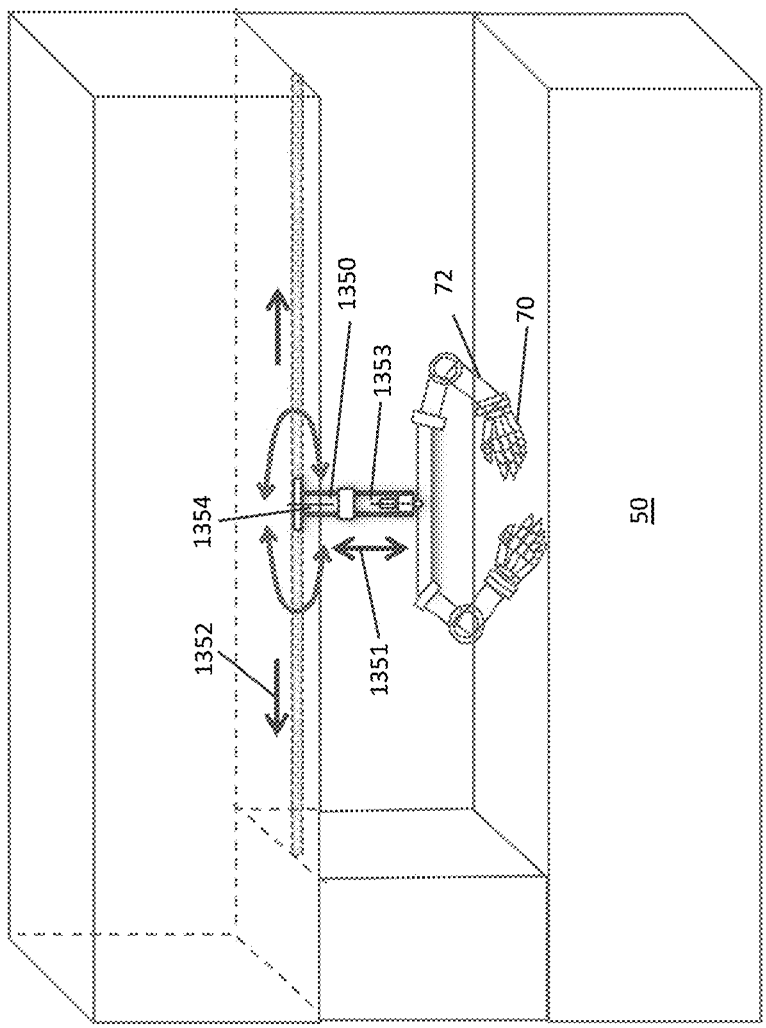

FIG. 37 is a block diagram illustrating the standardized robotic kitchen with a telescopic actuator in accordance with the present disclosure.

Figure 38:
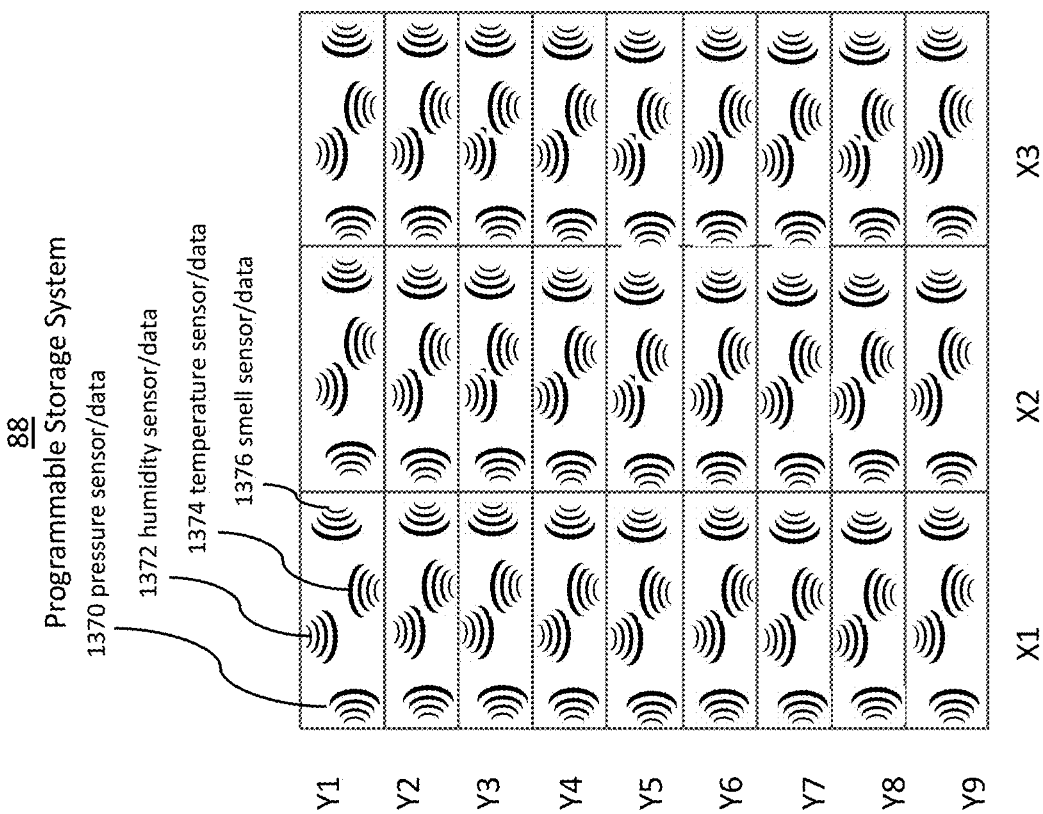

FIG. 38 is a block diagram illustrating a program storage system for use with the standardized robotic kitchen in accordance with the present disclosure.

FIG. 39 is a block diagram illustrating an elevation view of the program storage system for use with the standardized robotic kitchen in accordance with the present disclosure.

Figure 40:
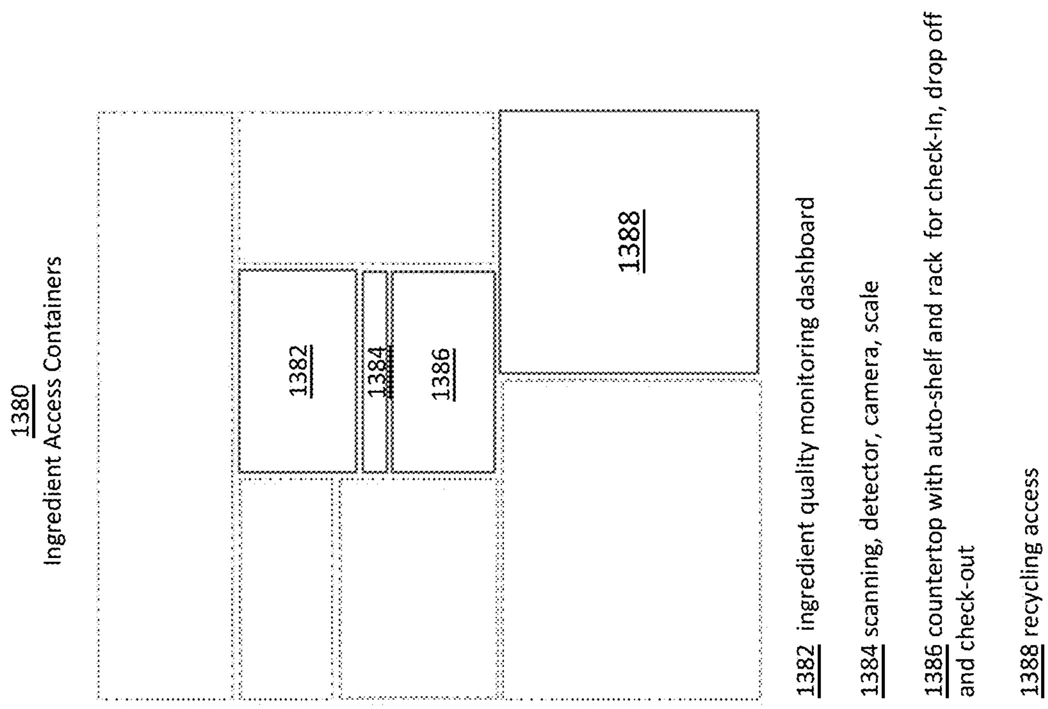

FIG. 40 is a block diagram illustrating an elevation view of ingredient access containers for use with the standardized robotic kitchen in accordance with the present disclosure.

Figure 41:
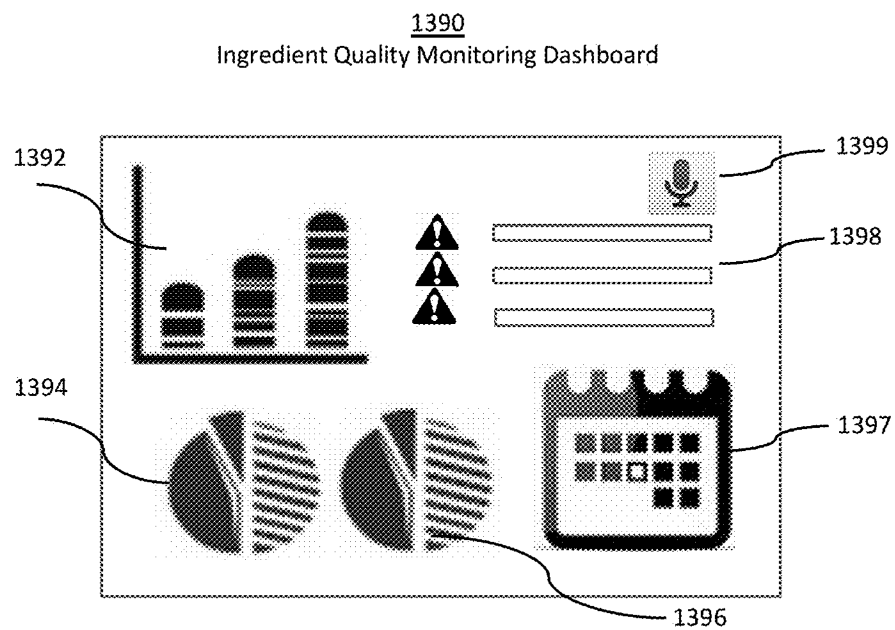

FIG. 41 is a block diagram illustrating an ingredient quality-monitoring dashboard associated with ingredient access containers for use with the standardized robotic kitchen in accordance with the present disclosure.

Figure 42:
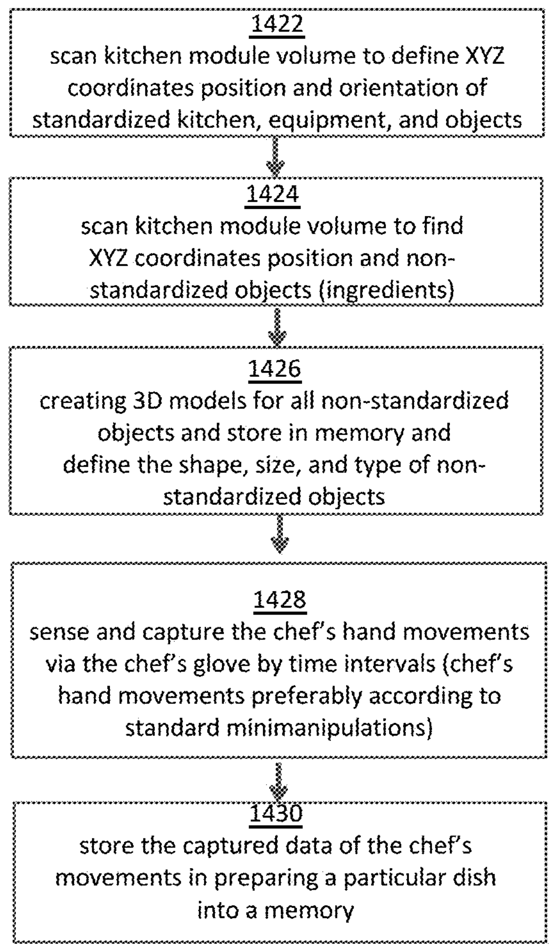

FIG. 42 is a flow diagram illustrating the process of one embodiment of recording a chef's food preparation process in accordance with the present disclosure.

Figure 43:
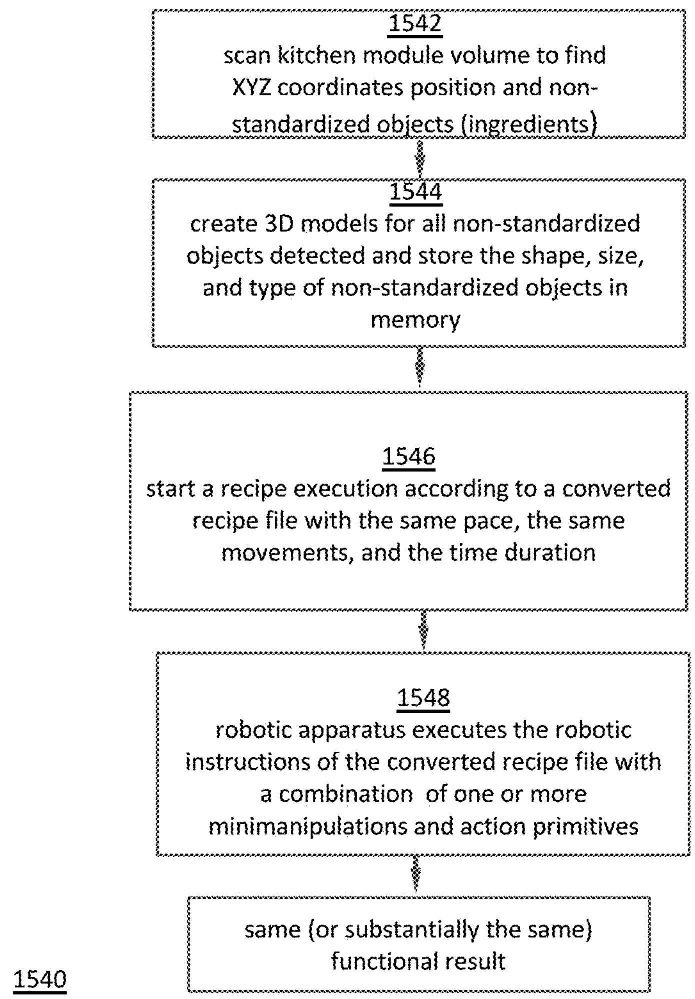

FIG. 43 is a flow diagram illustrating the process of one embodiment of a robotic apparatus preparing a food dish in accordance with the present disclosure.

Figure 44:
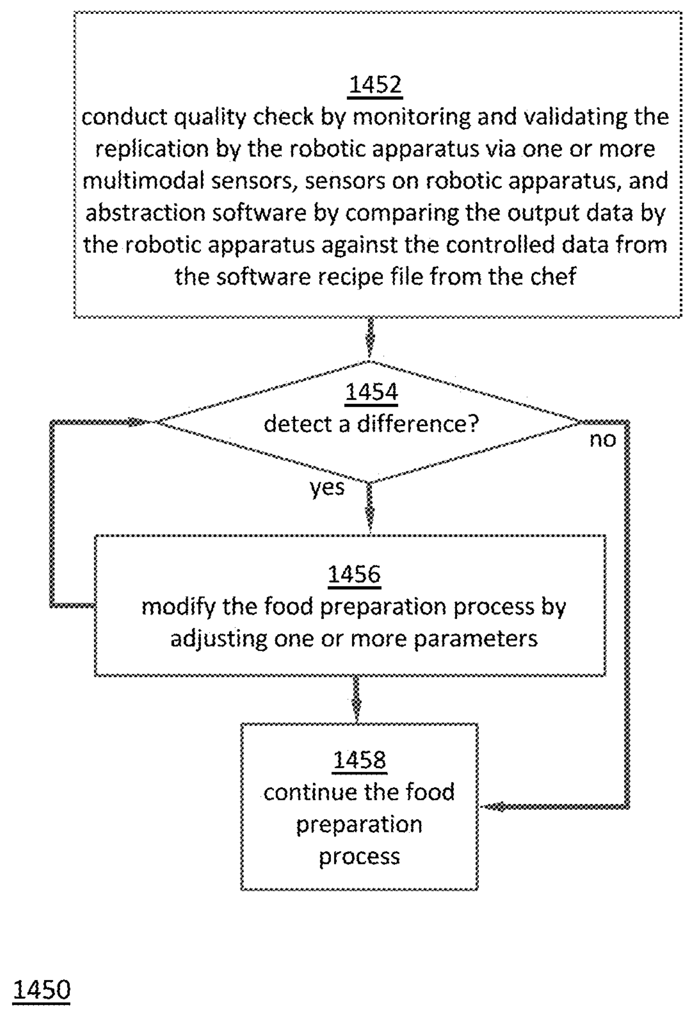

FIG. 44 is a flow diagram illustrating the process of one embodiment in the quality and function adjustment in obtaining the same (or substantially the same result) in a food dish preparation by a robotic relative to a chef in accordance with the present disclosure.

Figure 45:
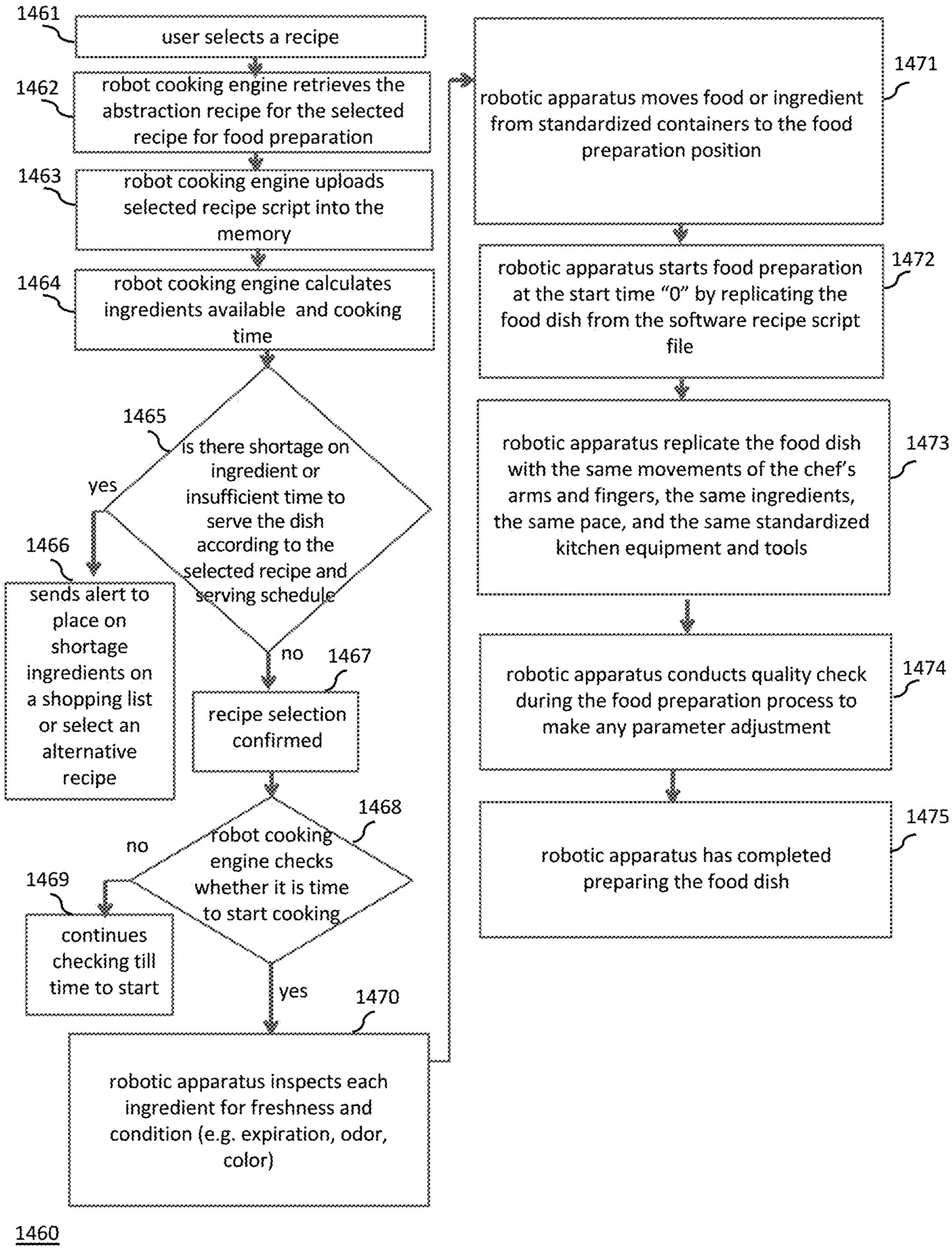

FIG. 45 is a flow diagram illustrating a first embodiment in the process of the robotic kitchen preparing a dish by replicating a chef's movements from a recorded software file in a robotic kitchen in accordance with the present disclosure.

Figure 46:
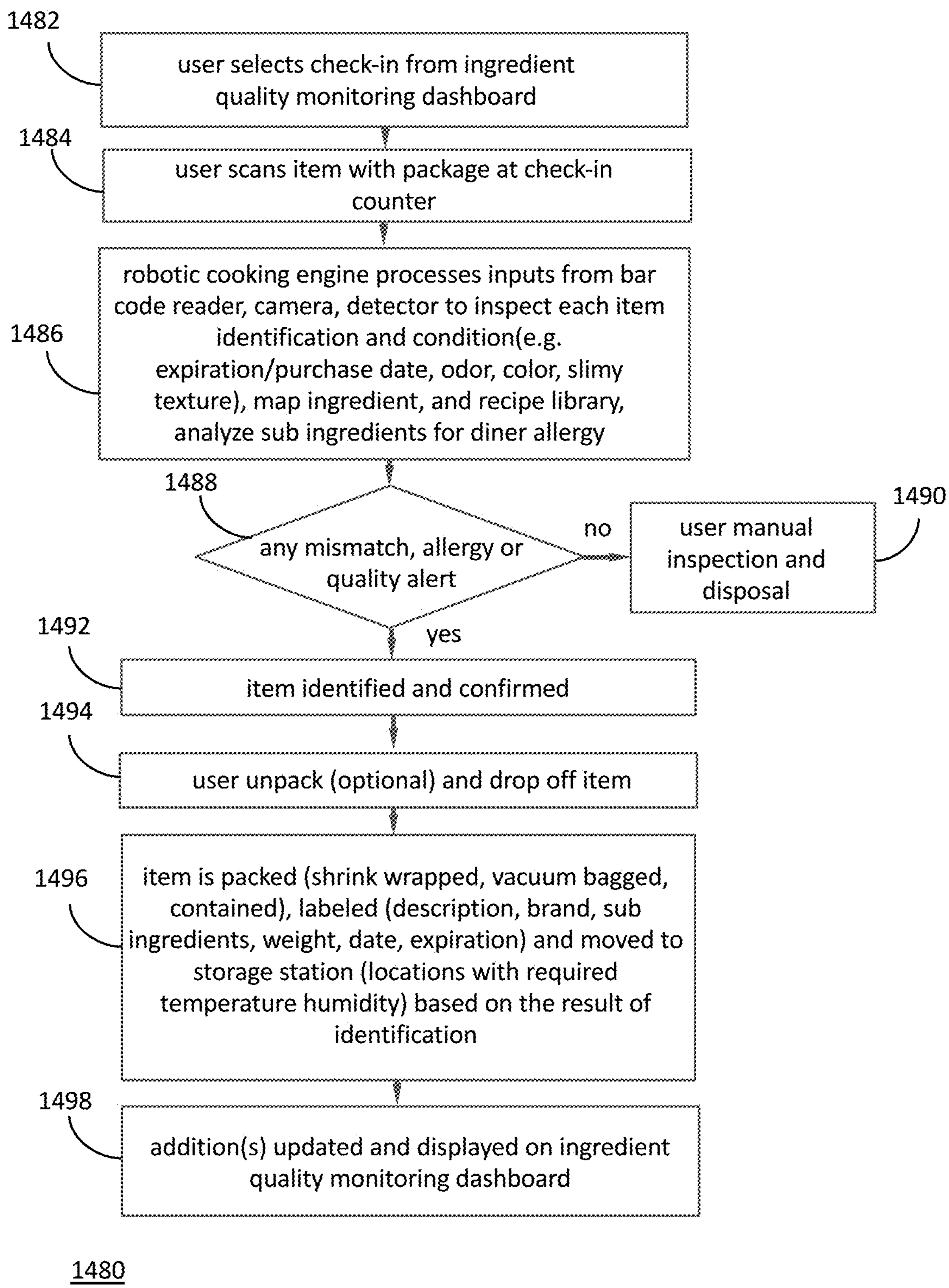

FIG. 46 is a flow diagram illustrating the process of storage check-in and identification in the robotic kitchen in accordance with the present disclosure.

Figure 47:
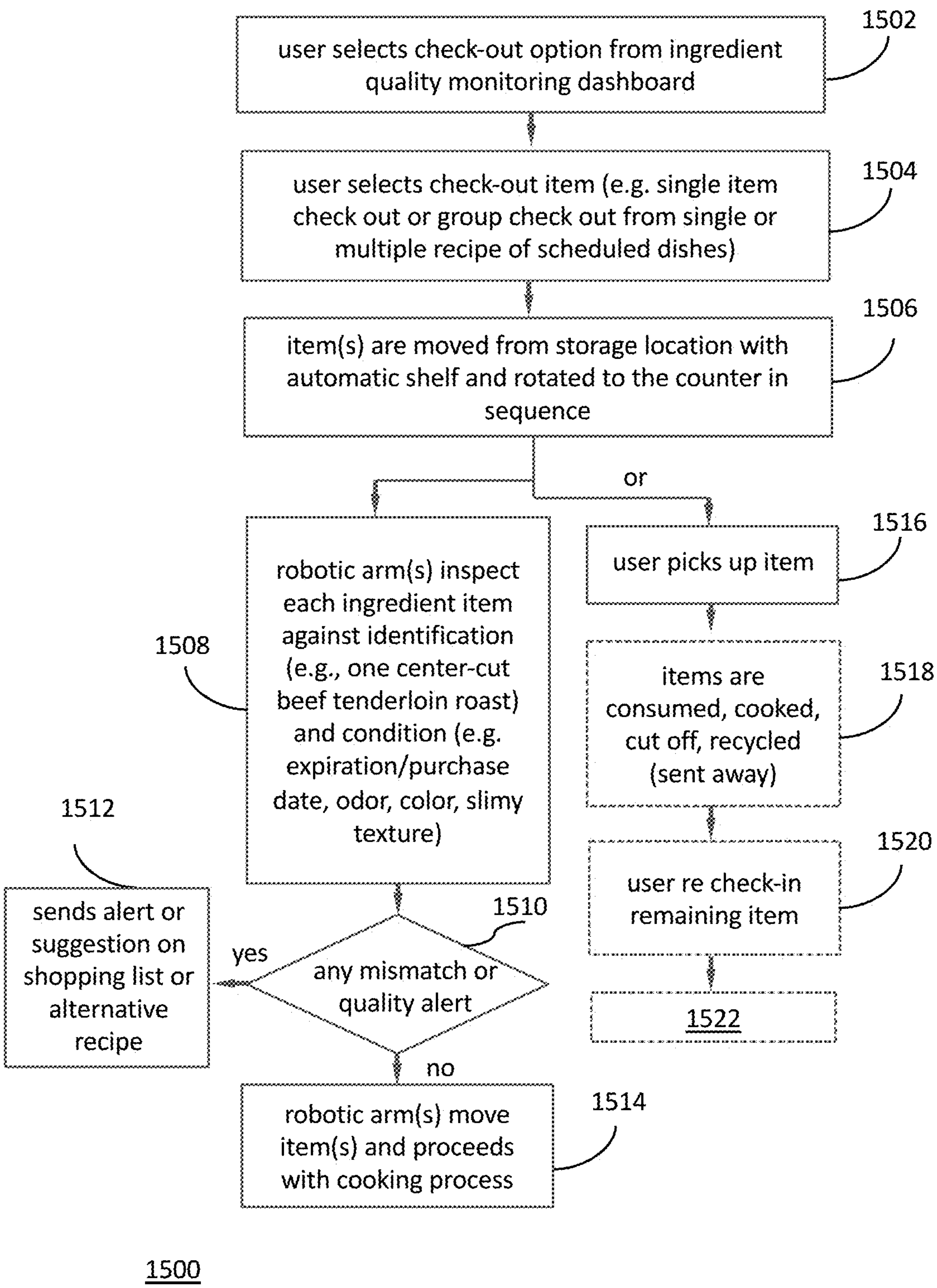

FIG. 47 is a flow diagram illustrating the process of storage checkout and cooking preparation in the robotic kitchen in accordance with the present disclosure.

Figure 48:
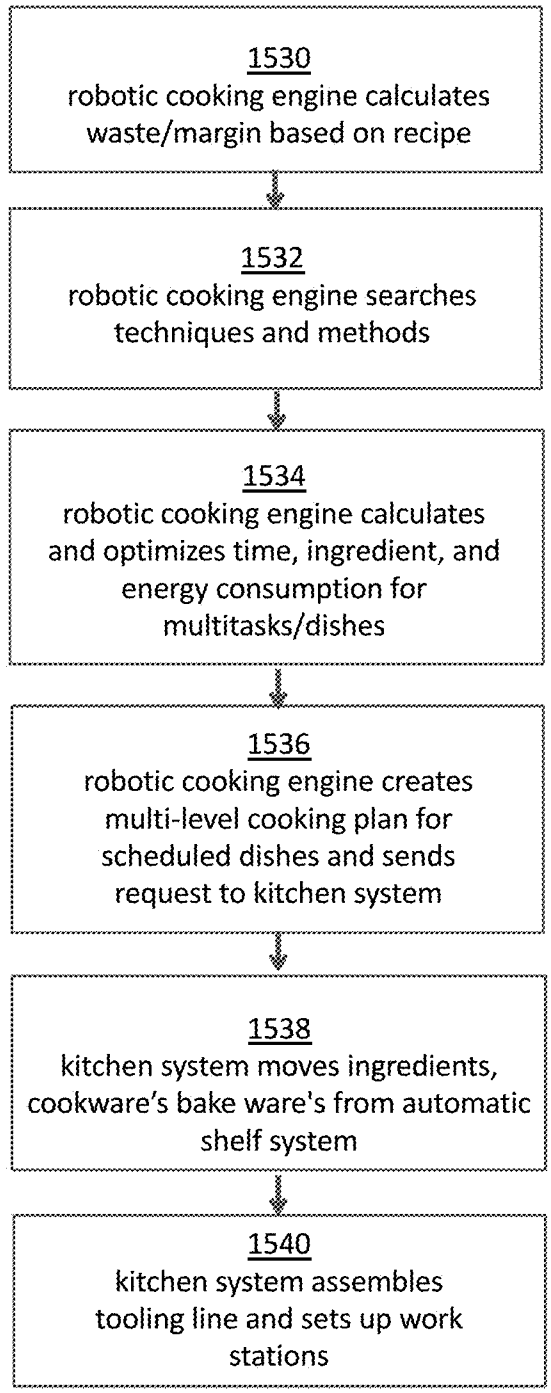

FIG. 48 is a flow diagram illustrating one embodiment of an automated pre-cooking preparation process in the robotic kitchen in accordance with the present disclosure.

Figure 49:
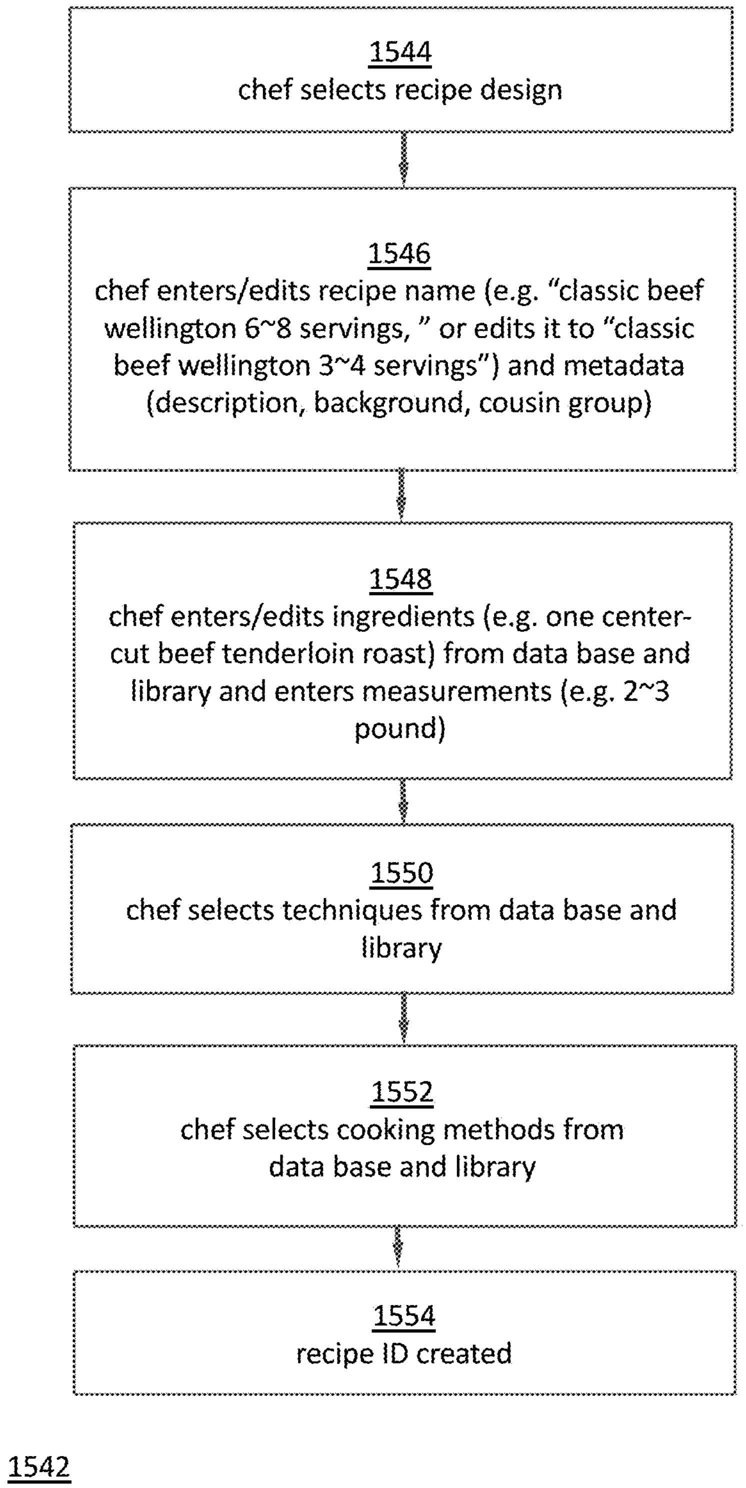

FIG. 49 is a flow diagram illustrating one embodiment of a recipe design and scripting process in the robotic kitchen in accordance with the present disclosure.

Figure 50:
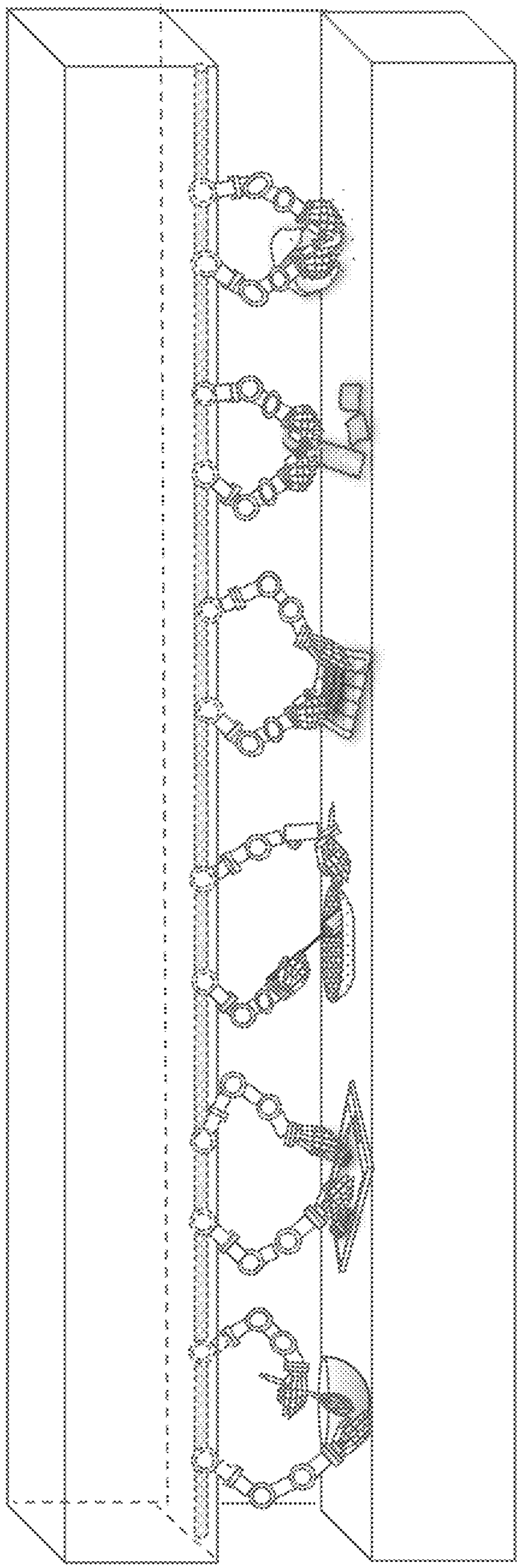

FIG. 50 is a block diagram illustrating a first embodiment of a robotic restaurant kitchen module configured in a rectangular layout with multiple pairs of robotic hands for simultaneous food preparation processing in accordance with the present disclosure.

Figure 51:
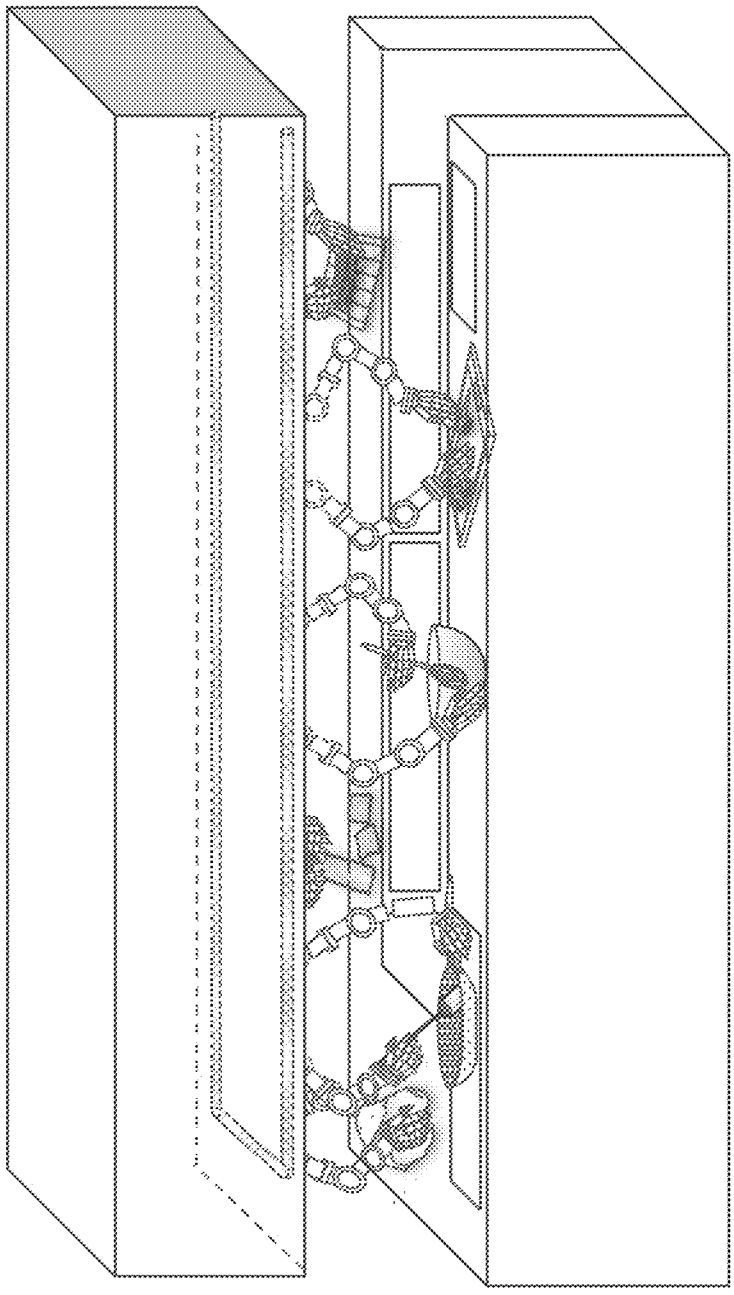

FIG. 51 is a block diagram illustrating a second embodiment of a robotic restaurant kitchen module configured in a U-shape layout with multiple pairs of robotic hands for simultaneous food preparation processing in accordance with the present disclosure.

Figure 52:
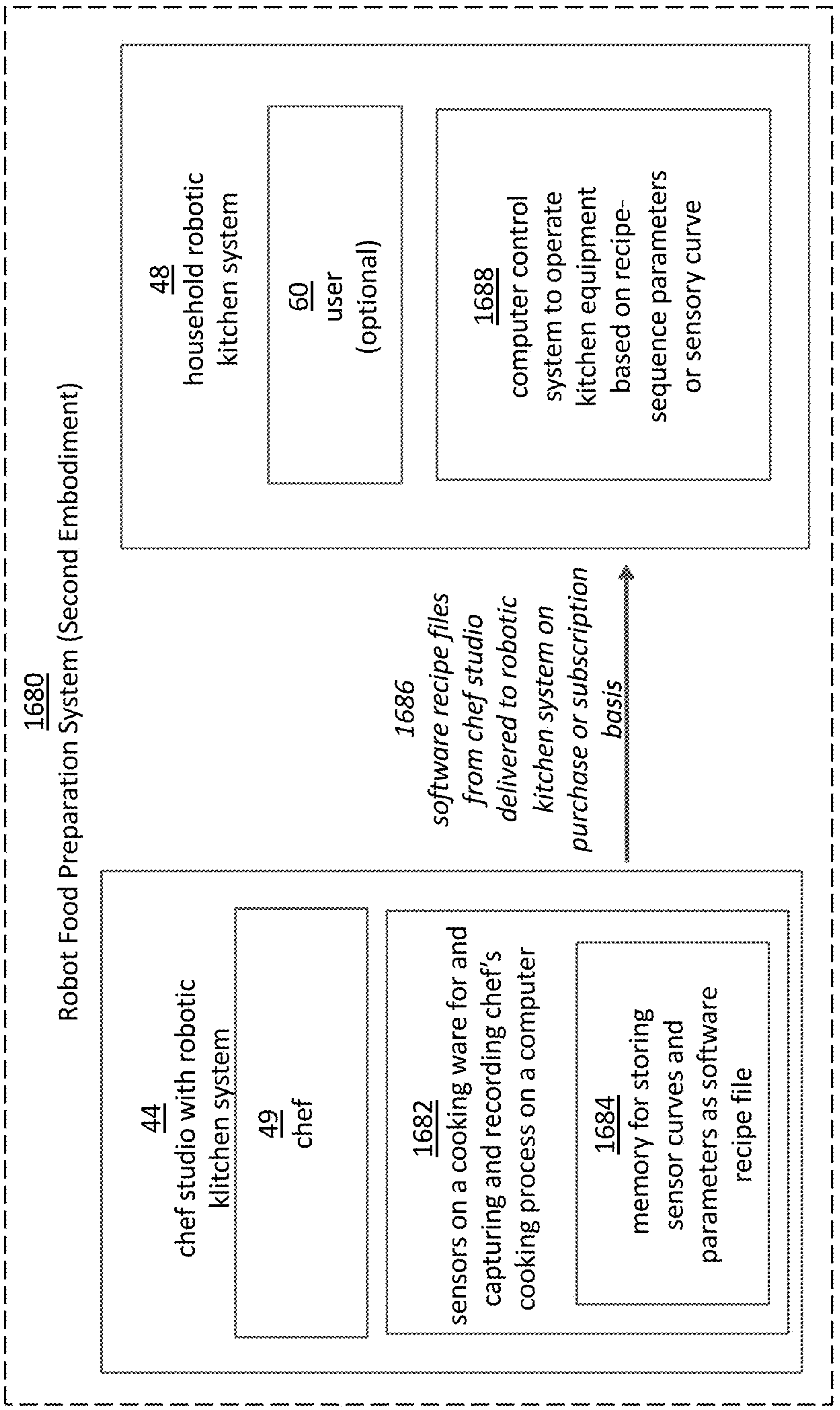

FIG. 52 is a block diagram illustrating a second embodiment of the robotic food preparation system with sensory cookware and curves in accordance with the present disclosure.

Figure 53:
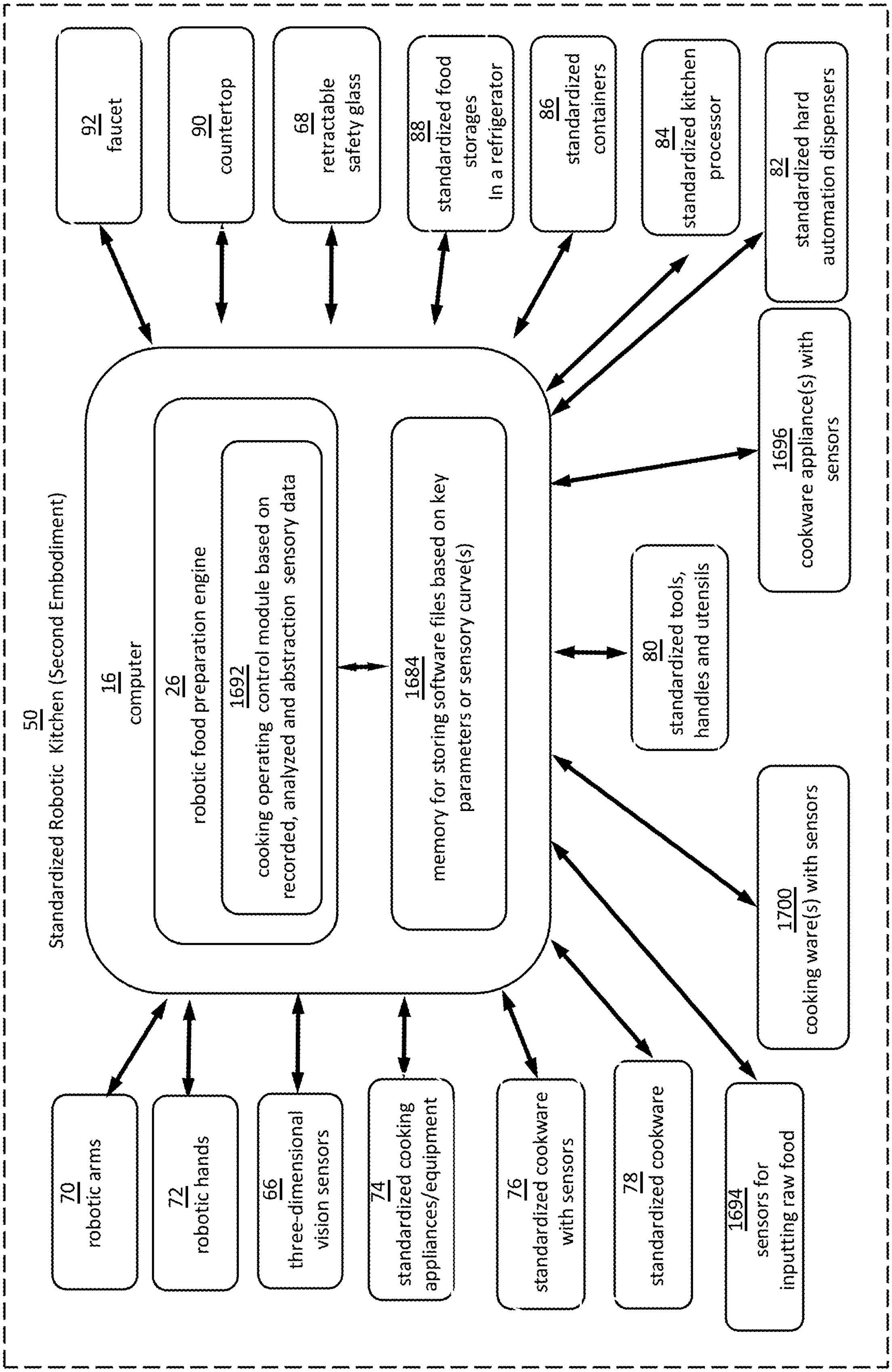

FIG. 53 is a block diagram illustrating some physical elements of a robotic food preparation system in the second embodiment in accordance with the present disclosure.

Figure 54:
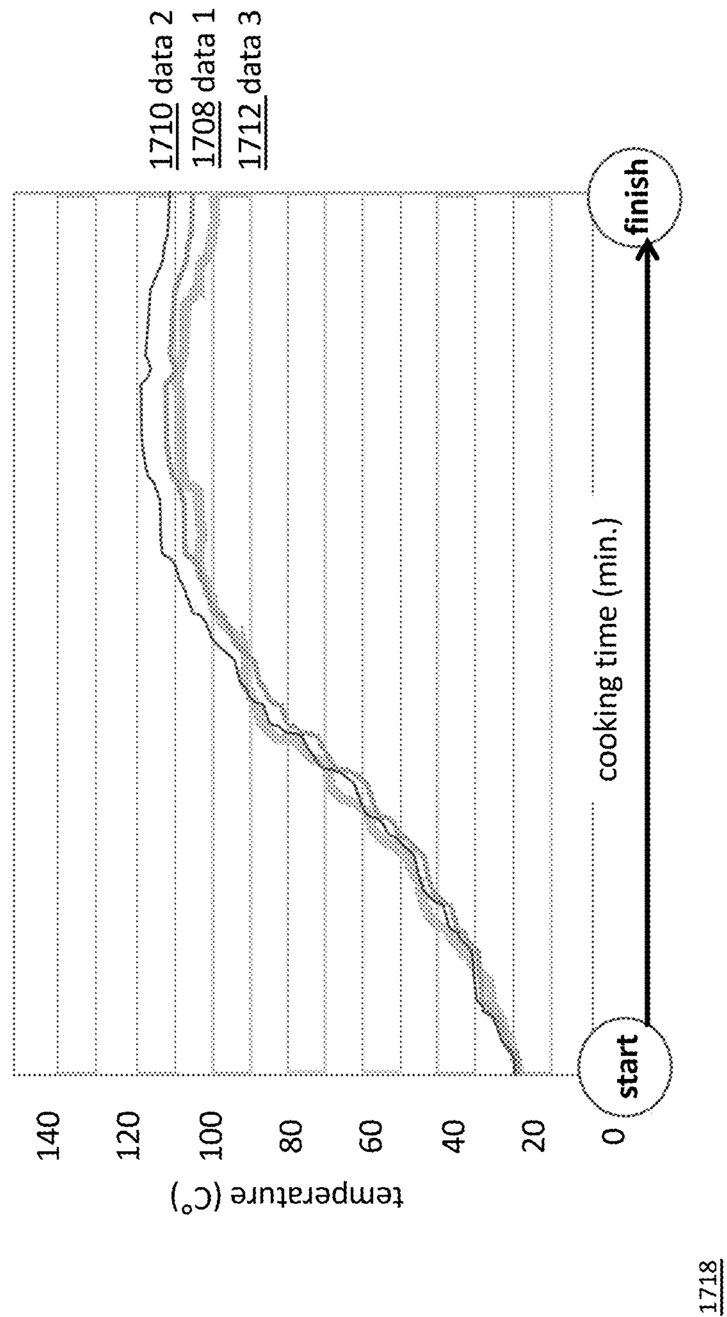

FIG. 54 is a graphical diagram illustrating the recorded temperature curve with multiple data points from the different sensors of the sensory cookware in the chef studio in accordance with the present disclosure.

Figure 55:
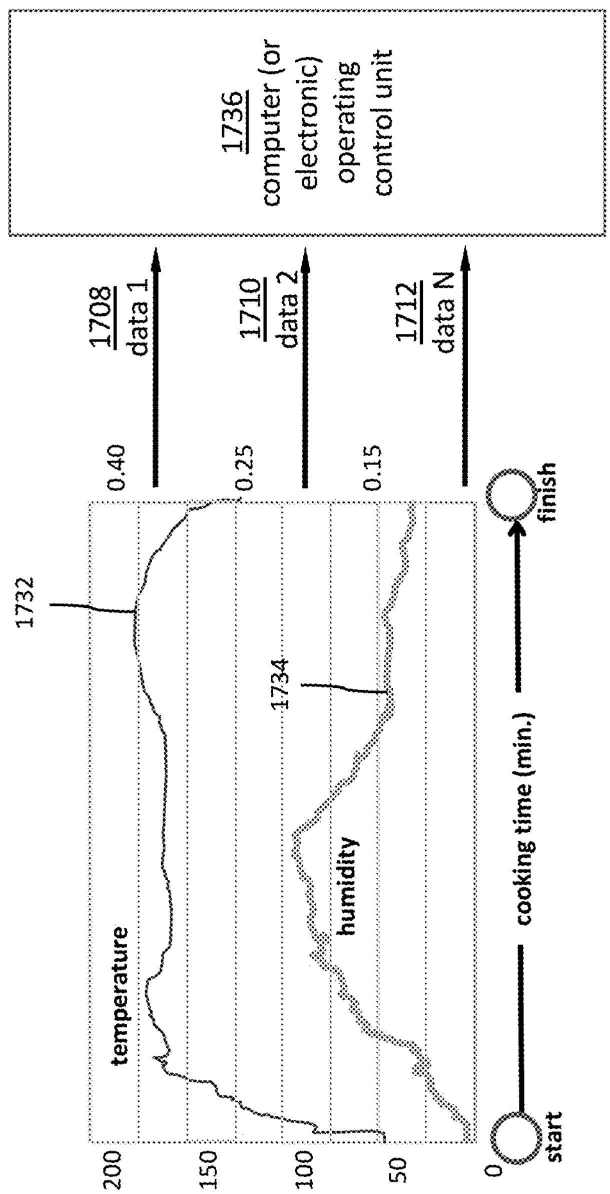

FIG. 55 is a graphical diagram illustrating the recorded temperature and humidity curves from the sensory cookware in the chef studio for transmission to an operating control unit in accordance with the present disclosure.

Figure 56:
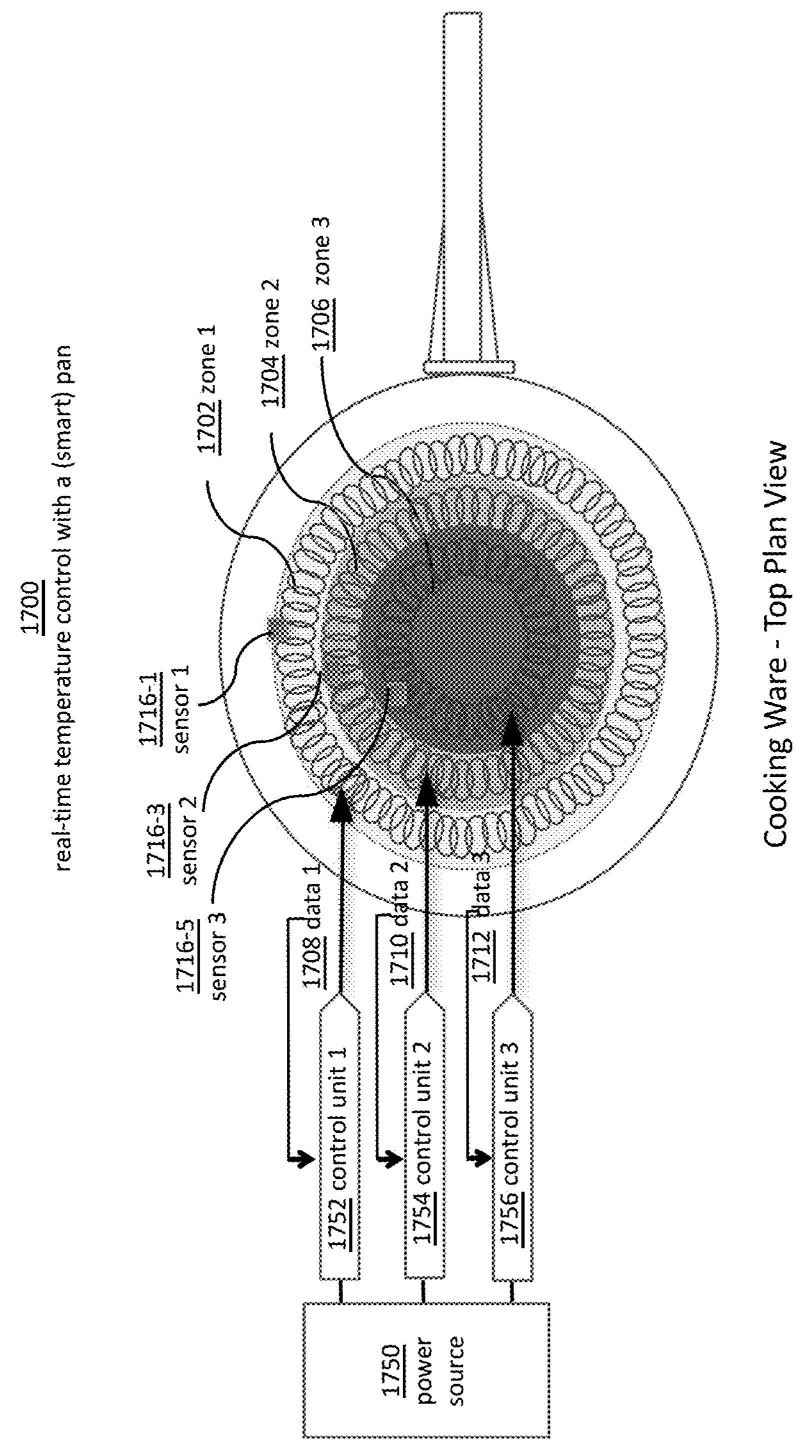

FIG. 56 is a block diagram illustrating sensory cookware for cooking based on the data from a temperature curve for different zones on a pan in accordance with the present disclosure.

Figure 57:
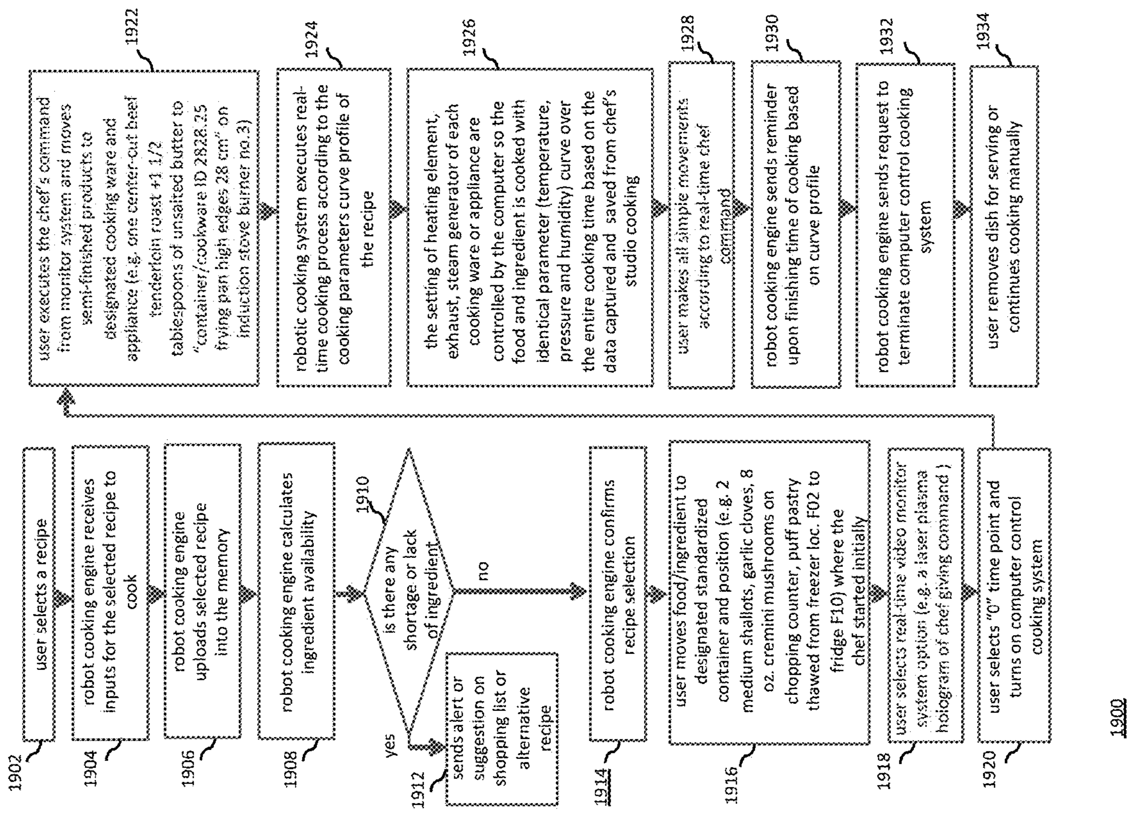

FIG. 57 is a flow diagram illustrating a second embodiment in the process of the robotic kitchen preparing a dish from one or more previously recorded parameter curves in a standardized robotic kitchen in accordance with the present disclosure.

Figure 58:
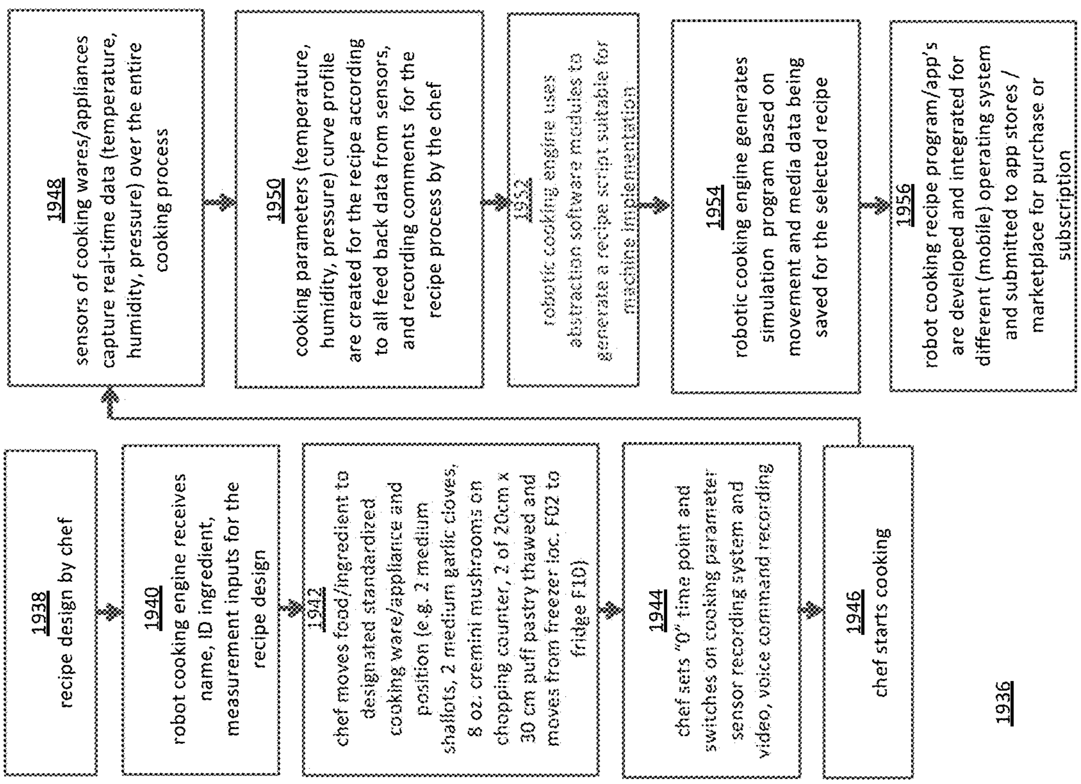

FIG. 58 depicts one embodiment of the sensory data capturing process in the chef studio in accordance with the present disclosure.

Figure 59:
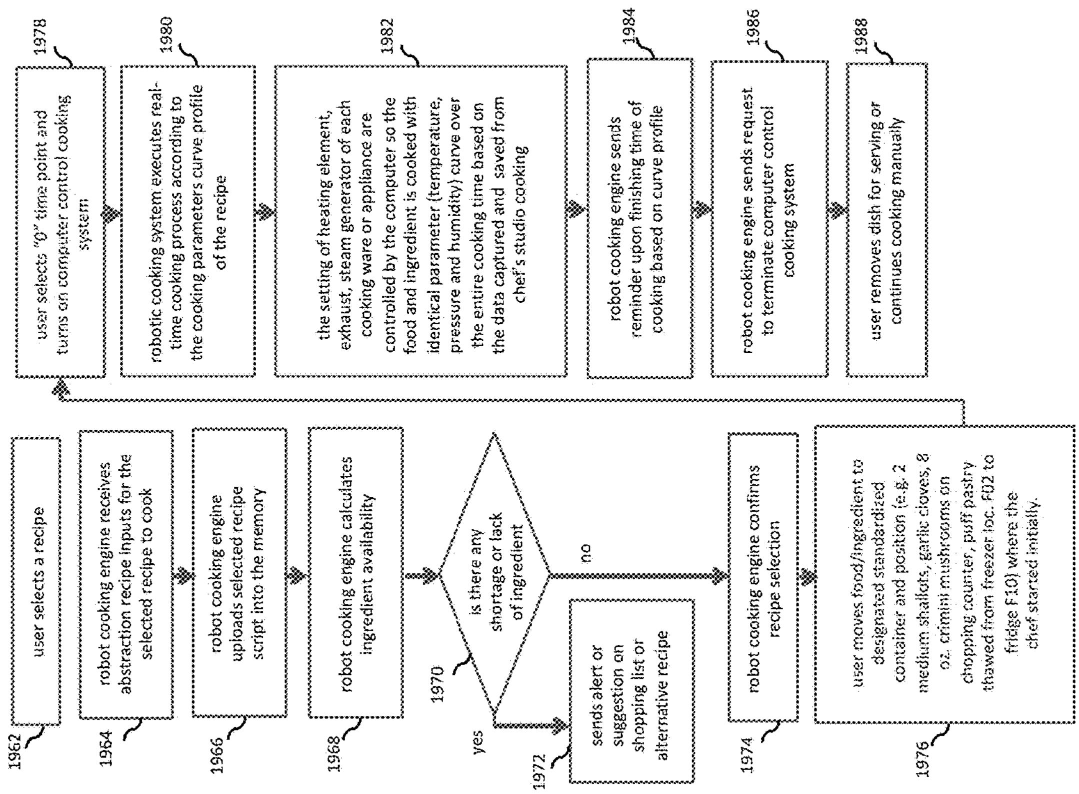

FIG. 59 depicts the process and flow of a household robotic cooking process. The first step involves the user selecting a recipe and acquiring the digital form of the recipe in accordance with the present disclosure.

Figure 60:
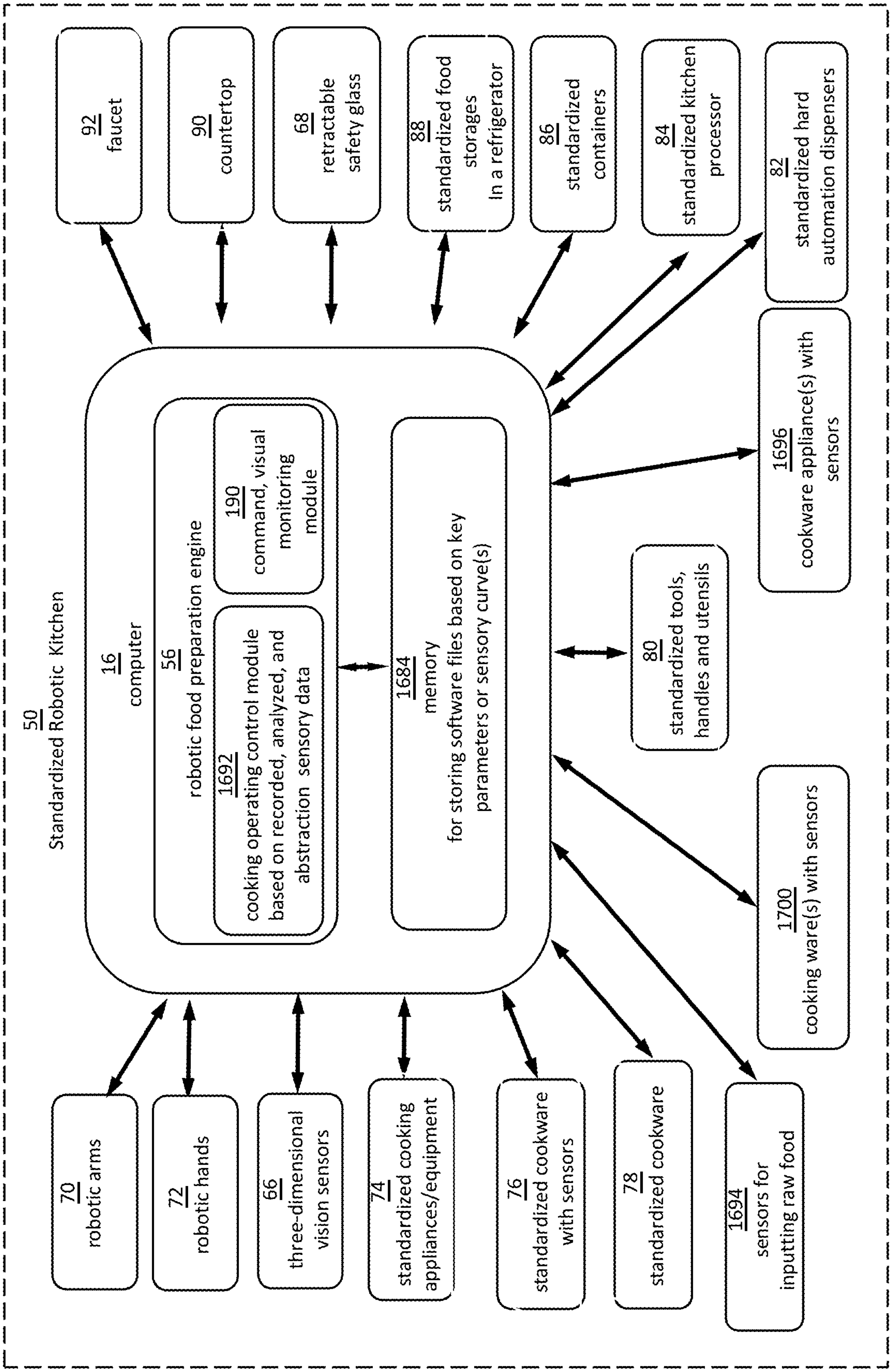

FIG. 60 is a block diagram illustrating a third embodiment of the robotic food preparation kitchen with a cooking operating control module, and a command and visual monitoring module in accordance with the present disclosure.

Figure 61:
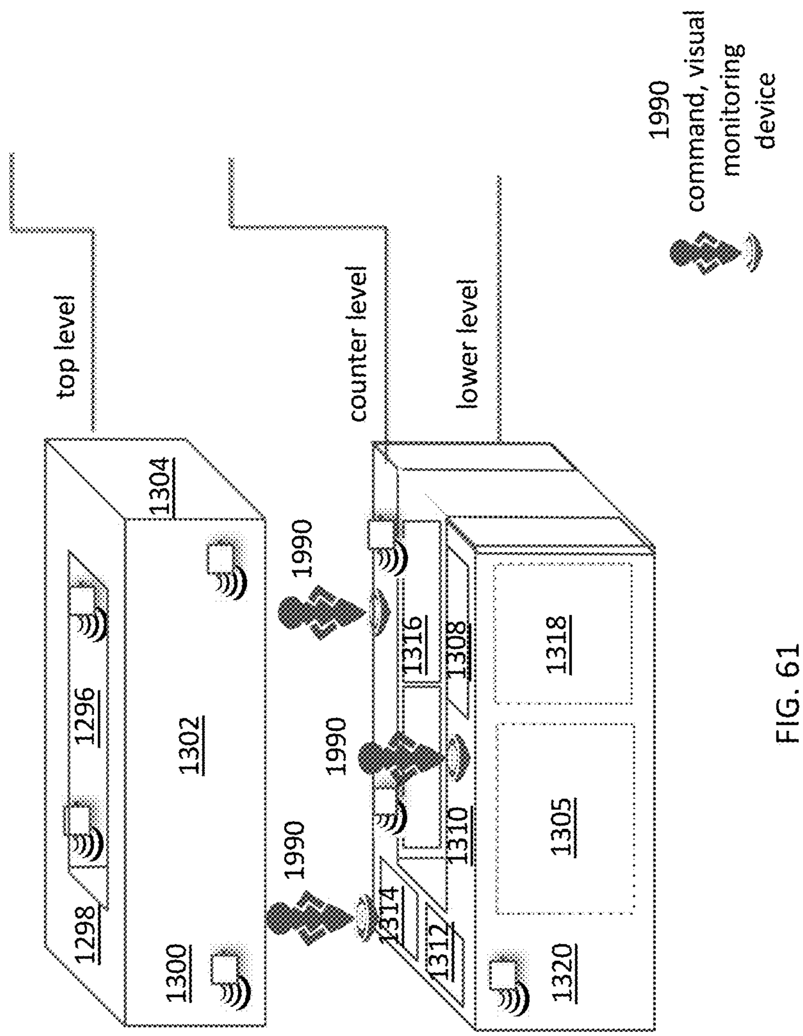

FIG. 61 is a block diagram illustrating a perspective view in the third embodiment of the robotic food preparation kitchen with a command and visual monitoring device in accordance with the present disclosure.

Figure 62A:
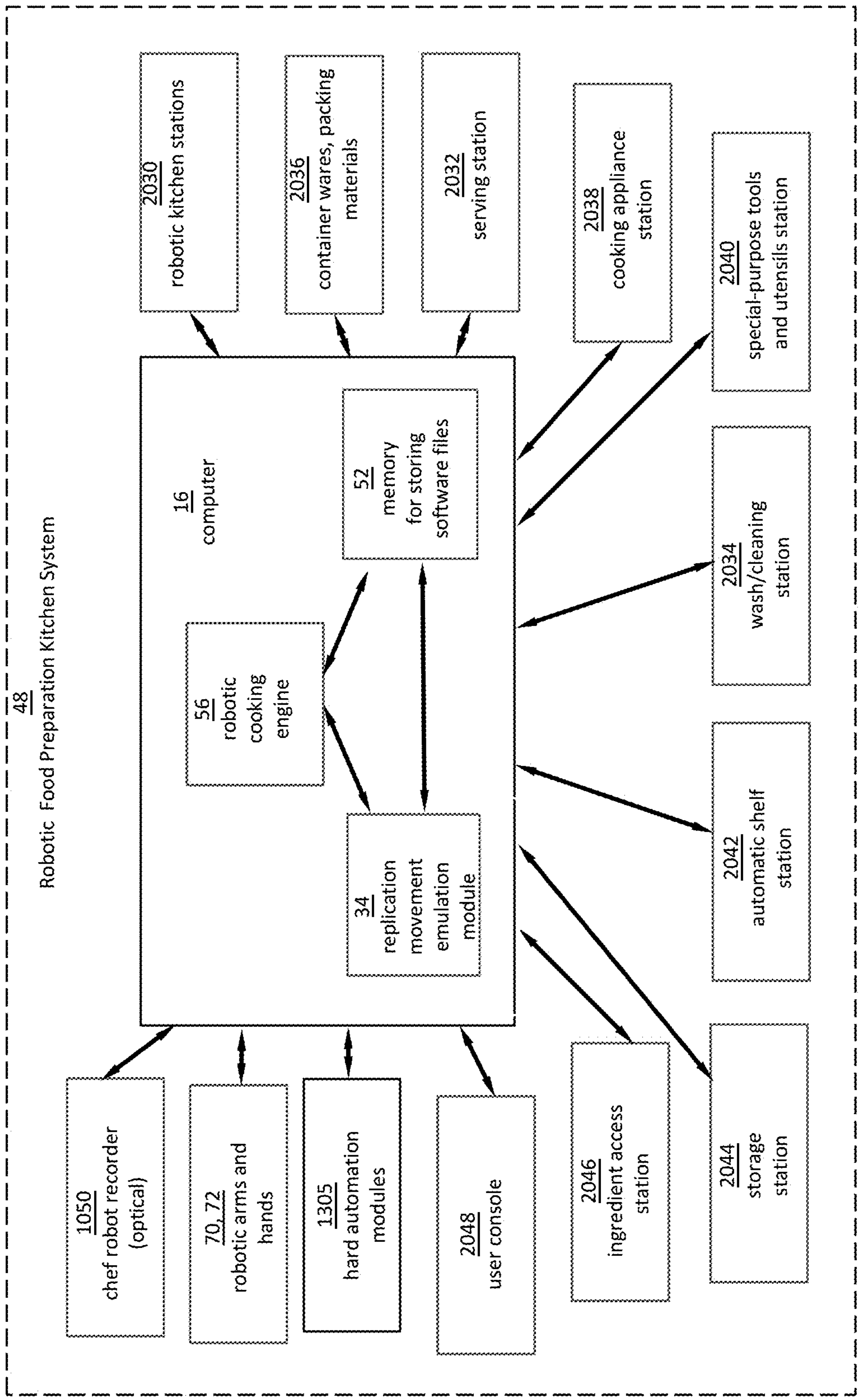
Figure 62C:
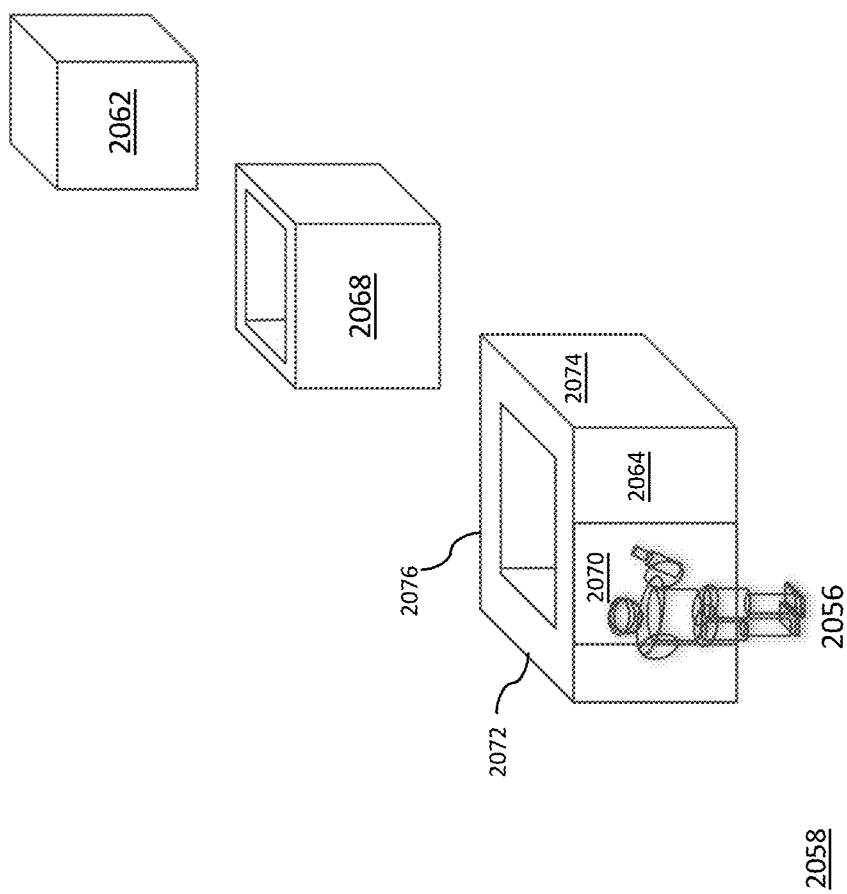

FIG. 62A is a block diagram illustrating a fourth embodiment of the robotic food preparation kitchen with a robot in accordance with the present disclosure; FIG. 62B is a block diagram illustrating a top plan view in the fourth embodiment of the robotic food preparation kitchen with the humanoid robot in accordance with the present disclosure; and FIG. 62C is a block diagram illustrating a perspective plan view in the fourth embodiment of the robotic food preparation kitchen with the humanoid robot in accordance with the present disclosure.

Figure 63:
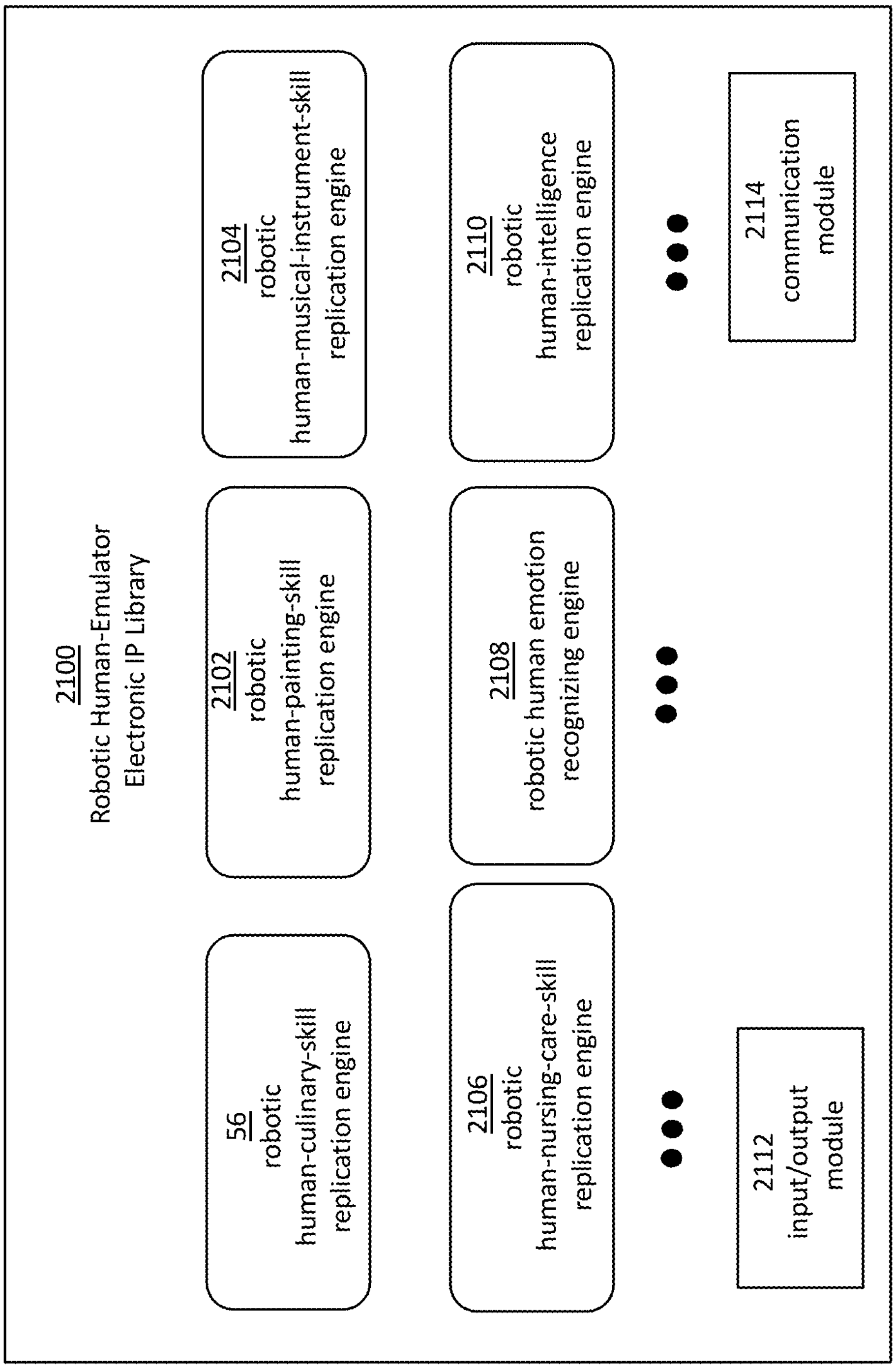

FIG. 63 is a block diagram illustrating a robotic human-emulator electronic intellectual property (IP) library in accordance with the present disclosure.

Figure 64:
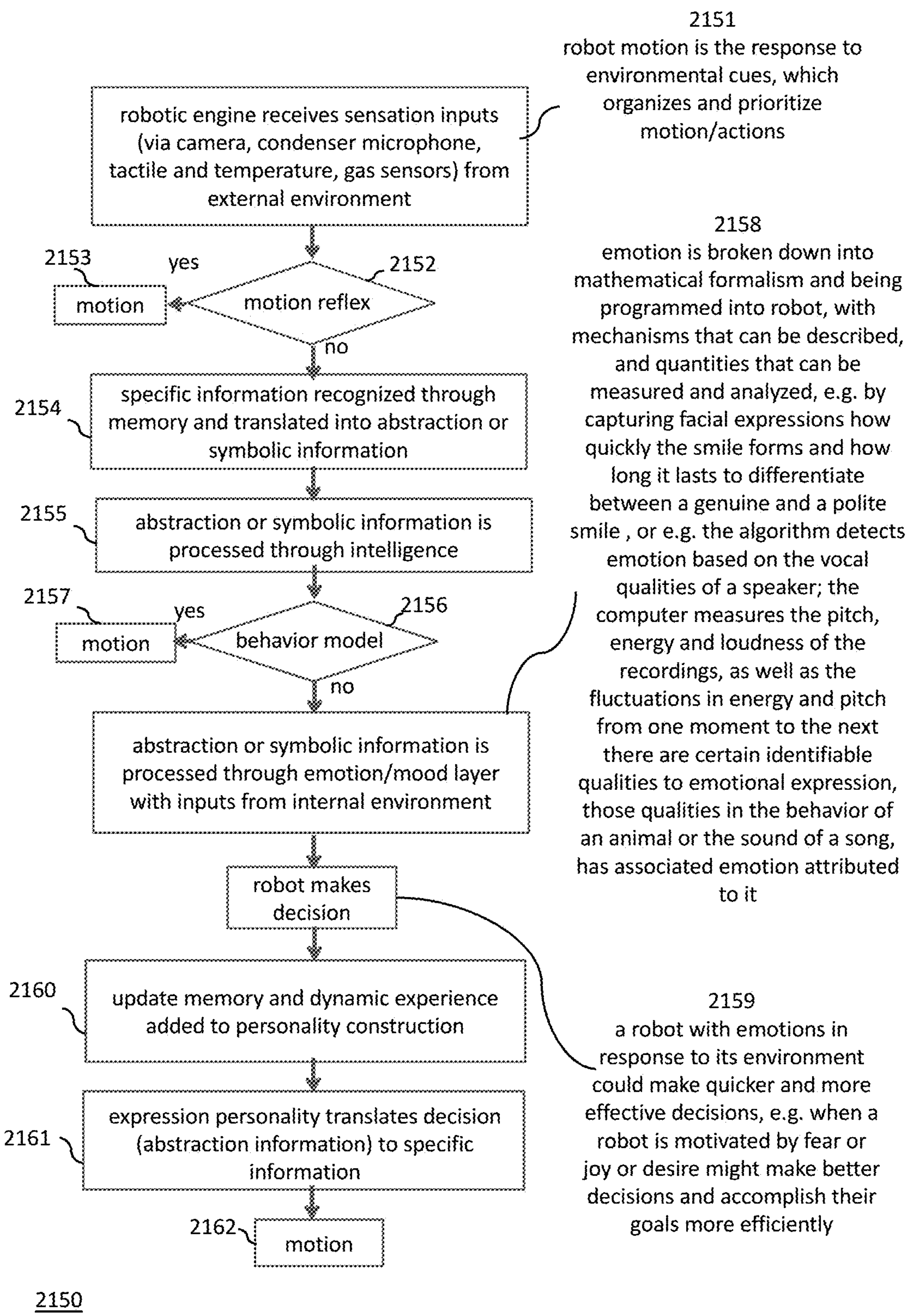

FIG. 64 is a flow diagram illustrating the process of a robotic human emotion engine in accordance with the present disclosure.

Figure 65A:
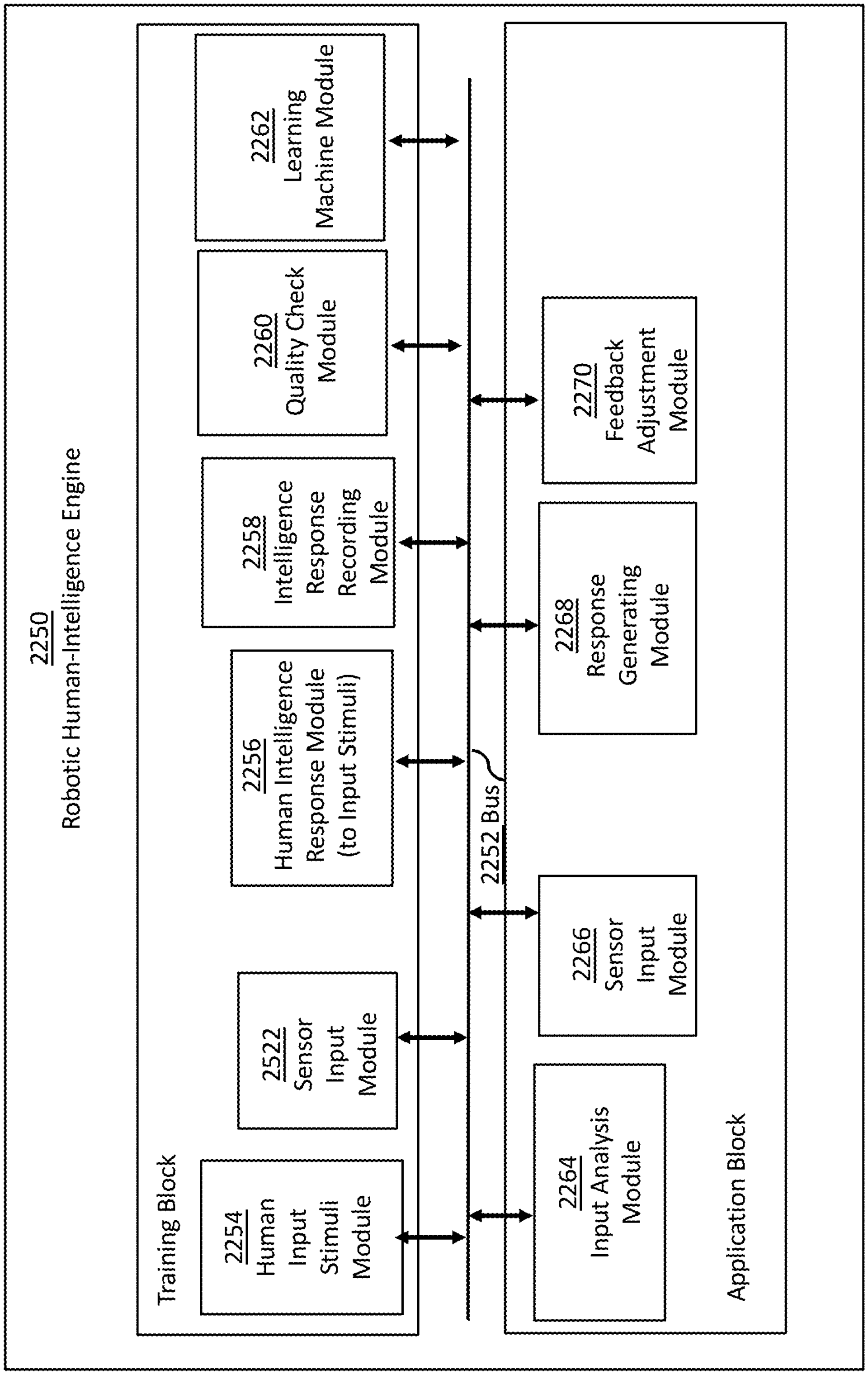
Figure 65B:
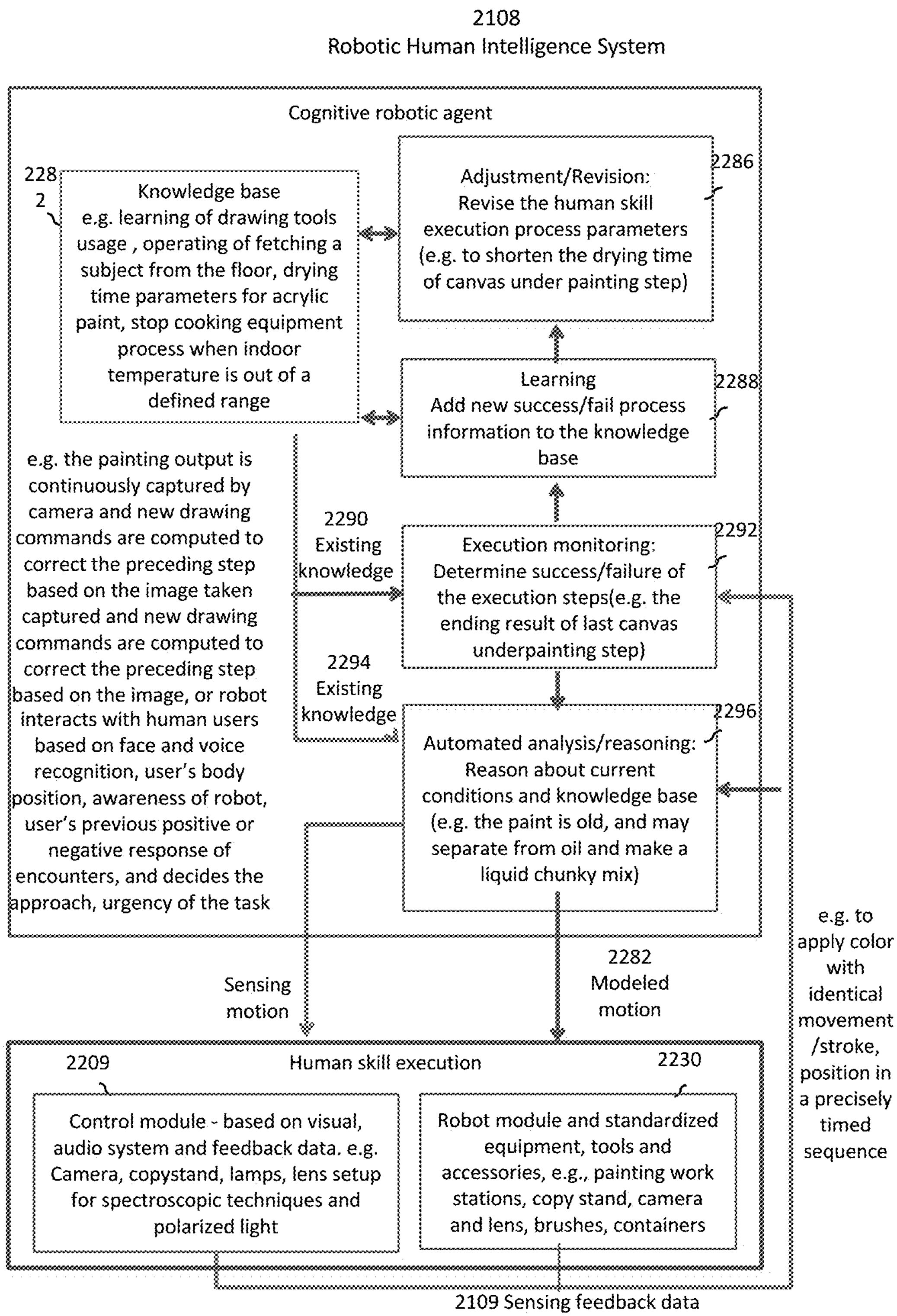

FIG. 65A is a block diagram illustrating a robotic human intelligence engine in accordance with the present disclosure; and FIG. 65B is a flow diagram illustrating the process of a robotic human intelligence engine in accordance with the present disclosure.

Figure 66A:
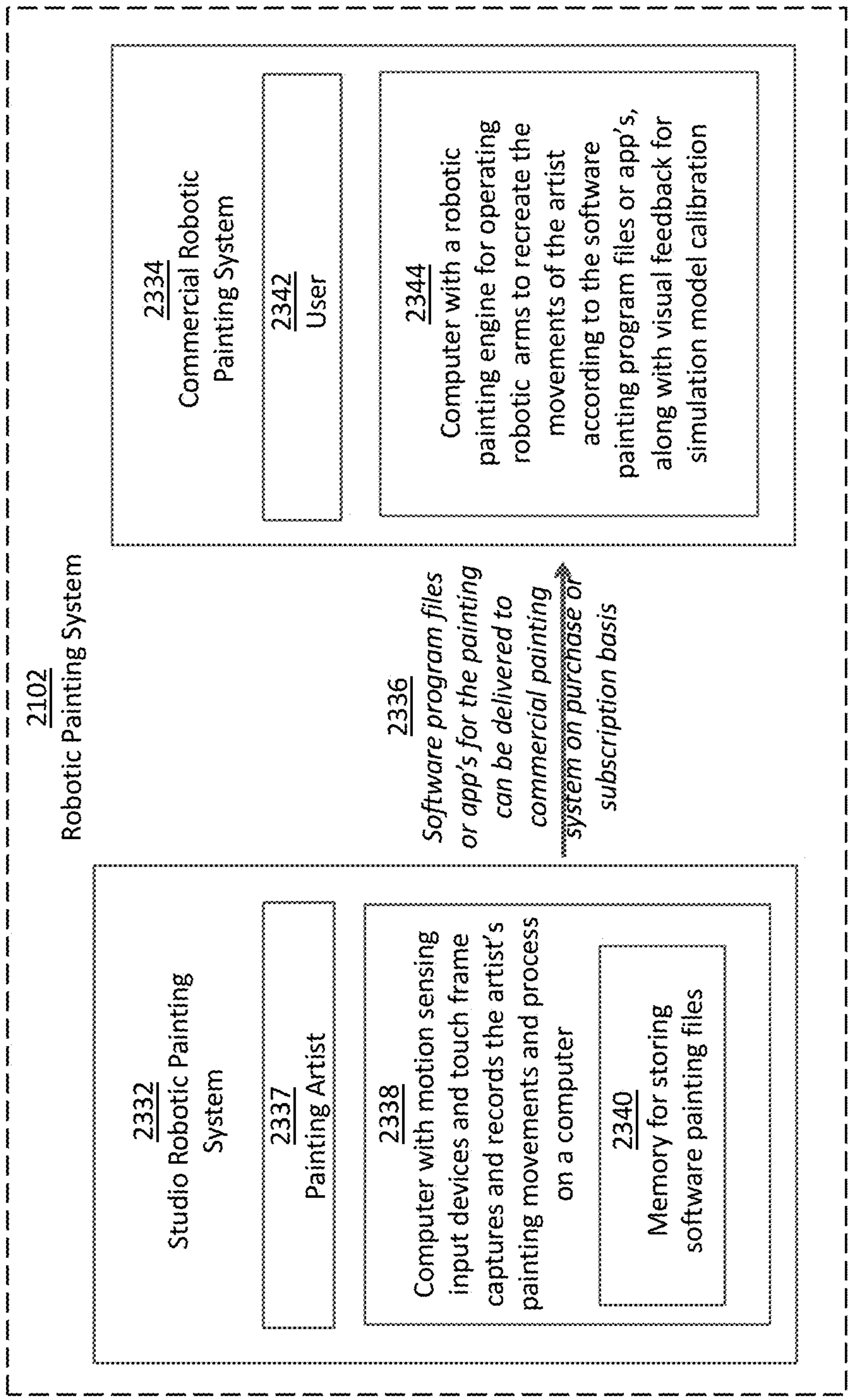
Figure 66B:
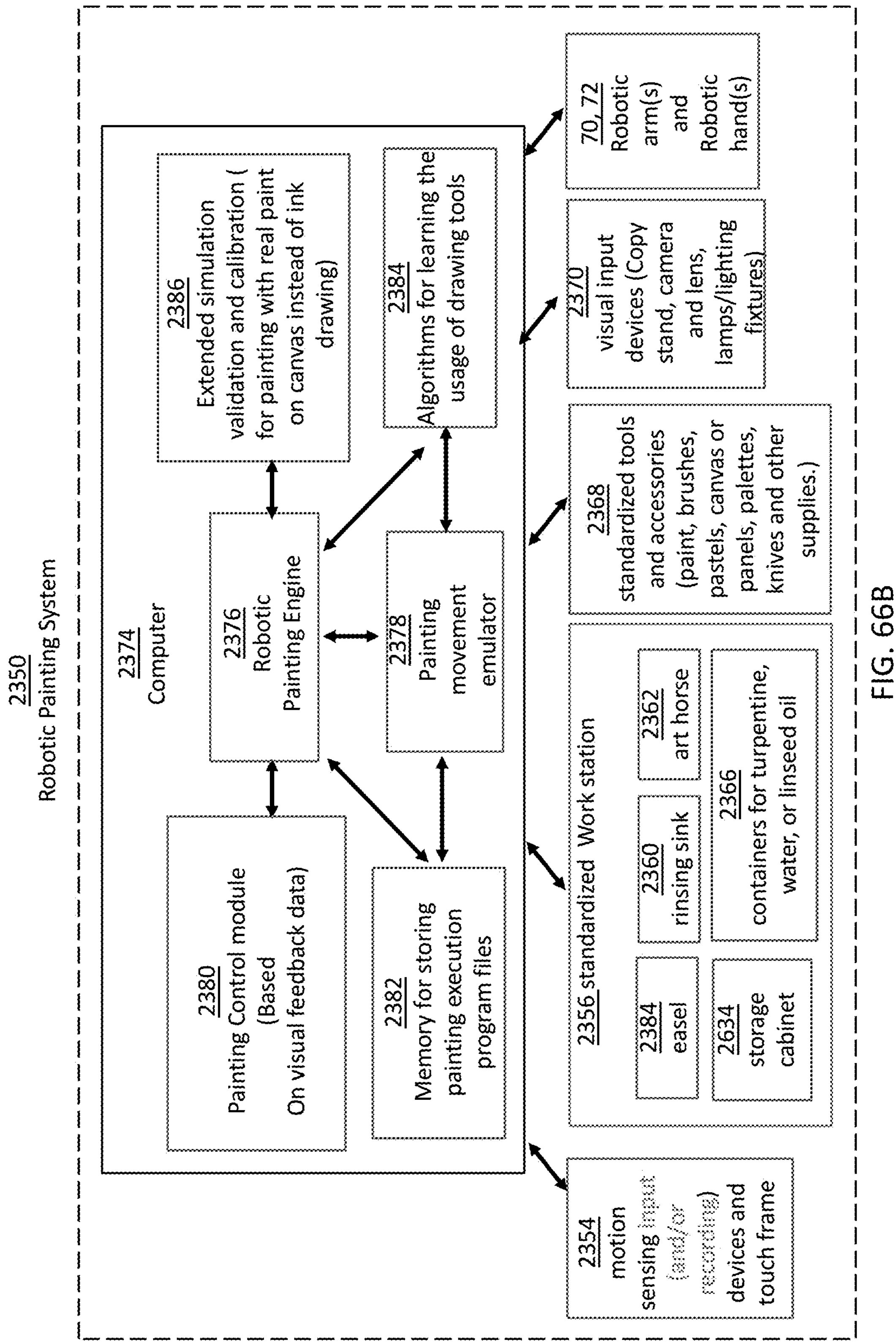
Figure 66C:
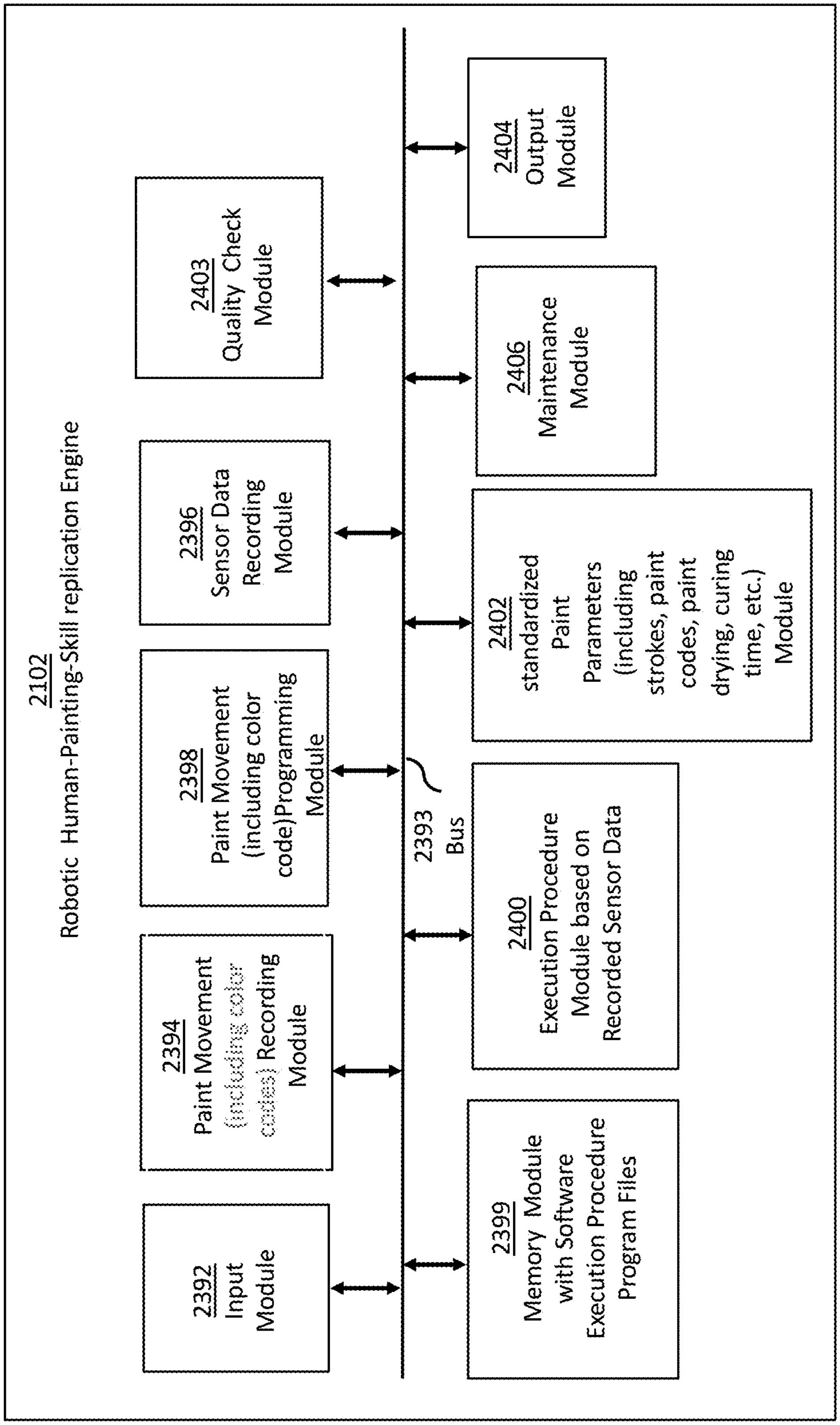

FIG. 66A is a block diagram illustrating a robotic painting system in accordance with the present disclosure; FIG. 66B is a block diagram illustrating the various components of a robotic painting system in accordance with the present disclosure; and FIG. 66C is a block diagram illustrating the robotic human-painting-skill replication engine in accordance with the present disclosure.

Figure 67A:
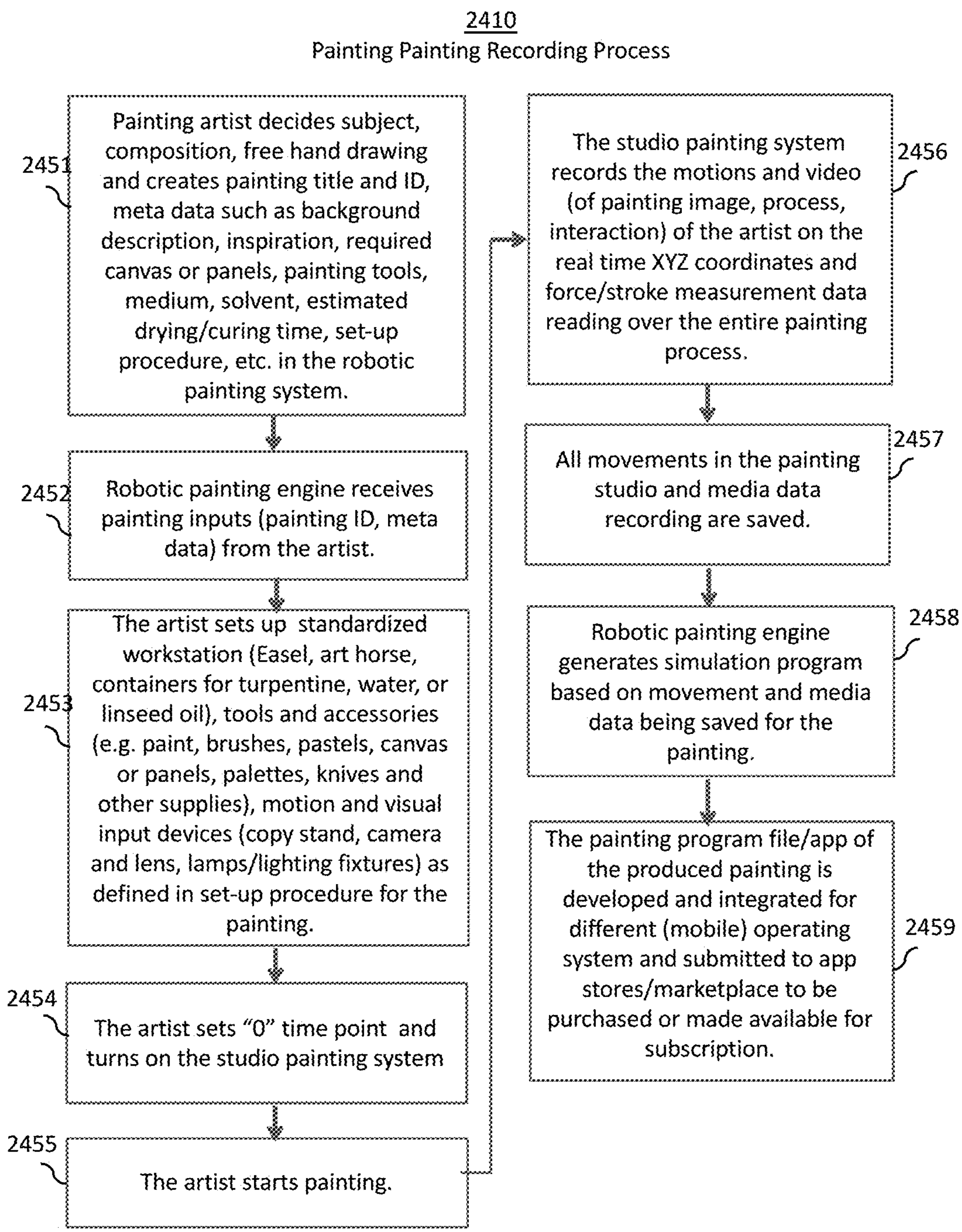
Figure 67B:
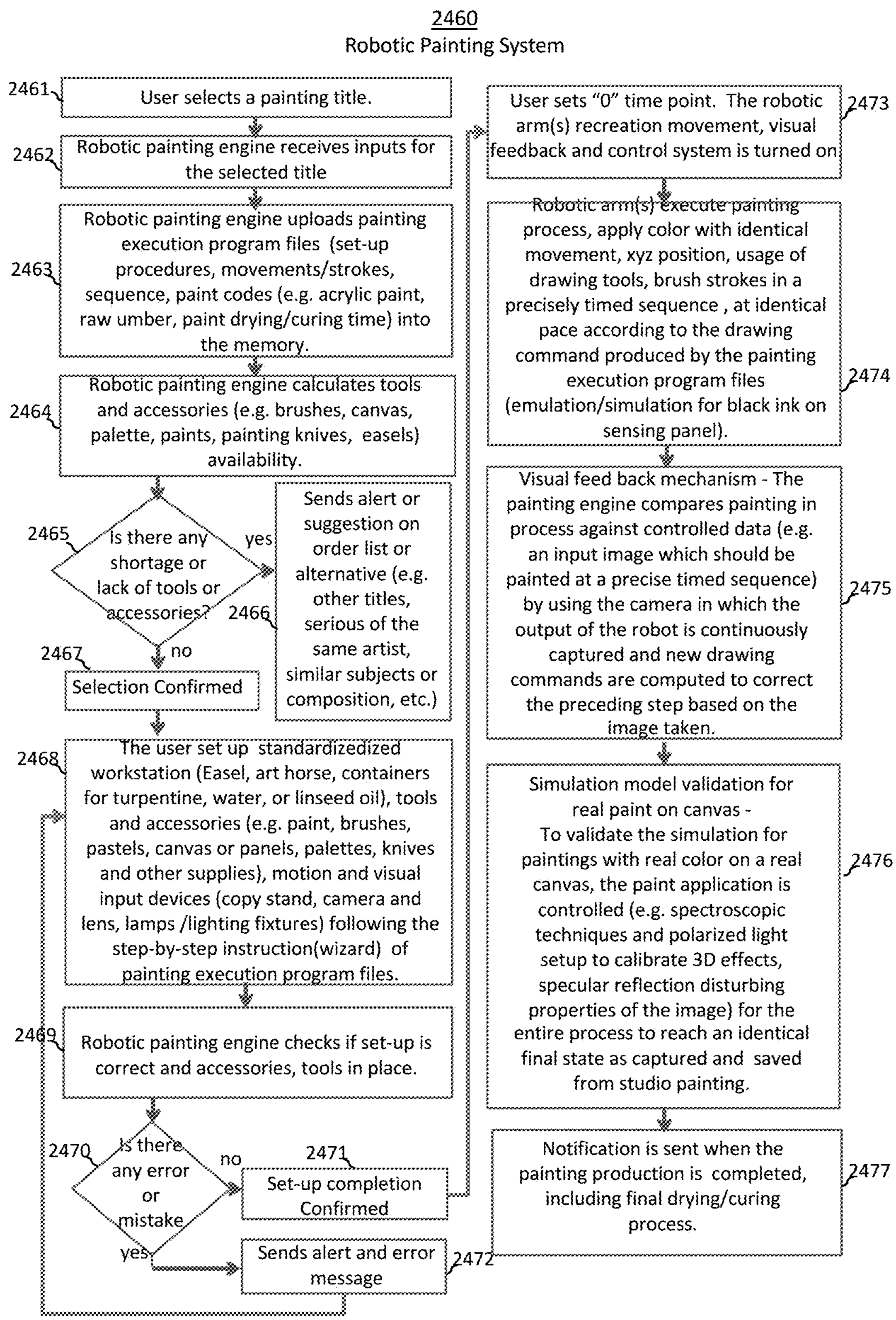

FIG. 67A is a flow diagram illustrating the recording process of an artist at a painting studio in accordance with the present disclosure; and FIG. 67B is a flow diagram illustrating the replication process by a robotic painting system in accordance with the present disclosure.

Figure 68A:
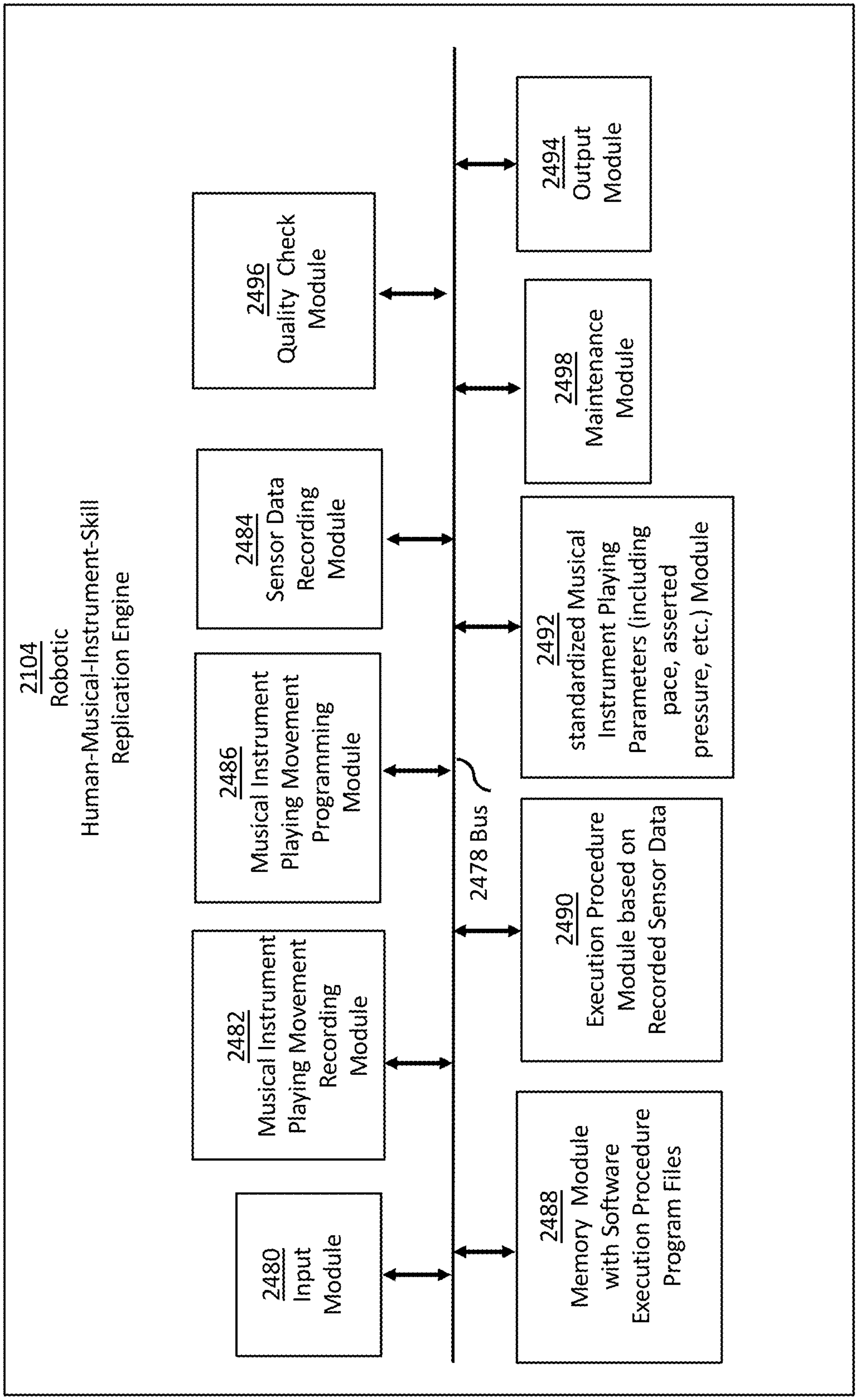
Figure 68B:
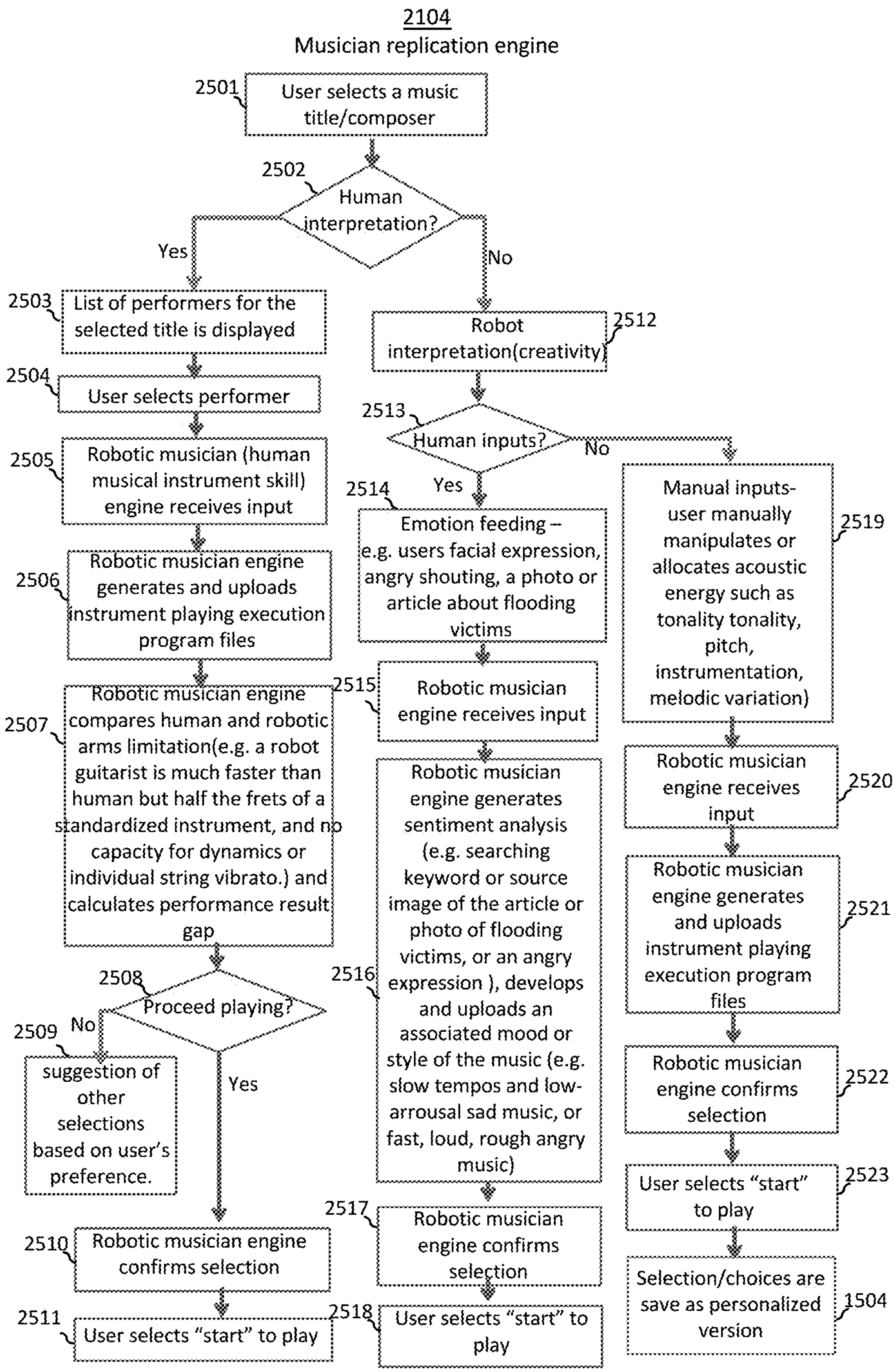

FIG. 68A is block diagram illustrating an embodiment of a musician replication engine in accordance with the present disclosure; and FIG. 68B is block diagram illustrating the process of the musician replication engine in accordance with the present disclosure.

Figure 69:
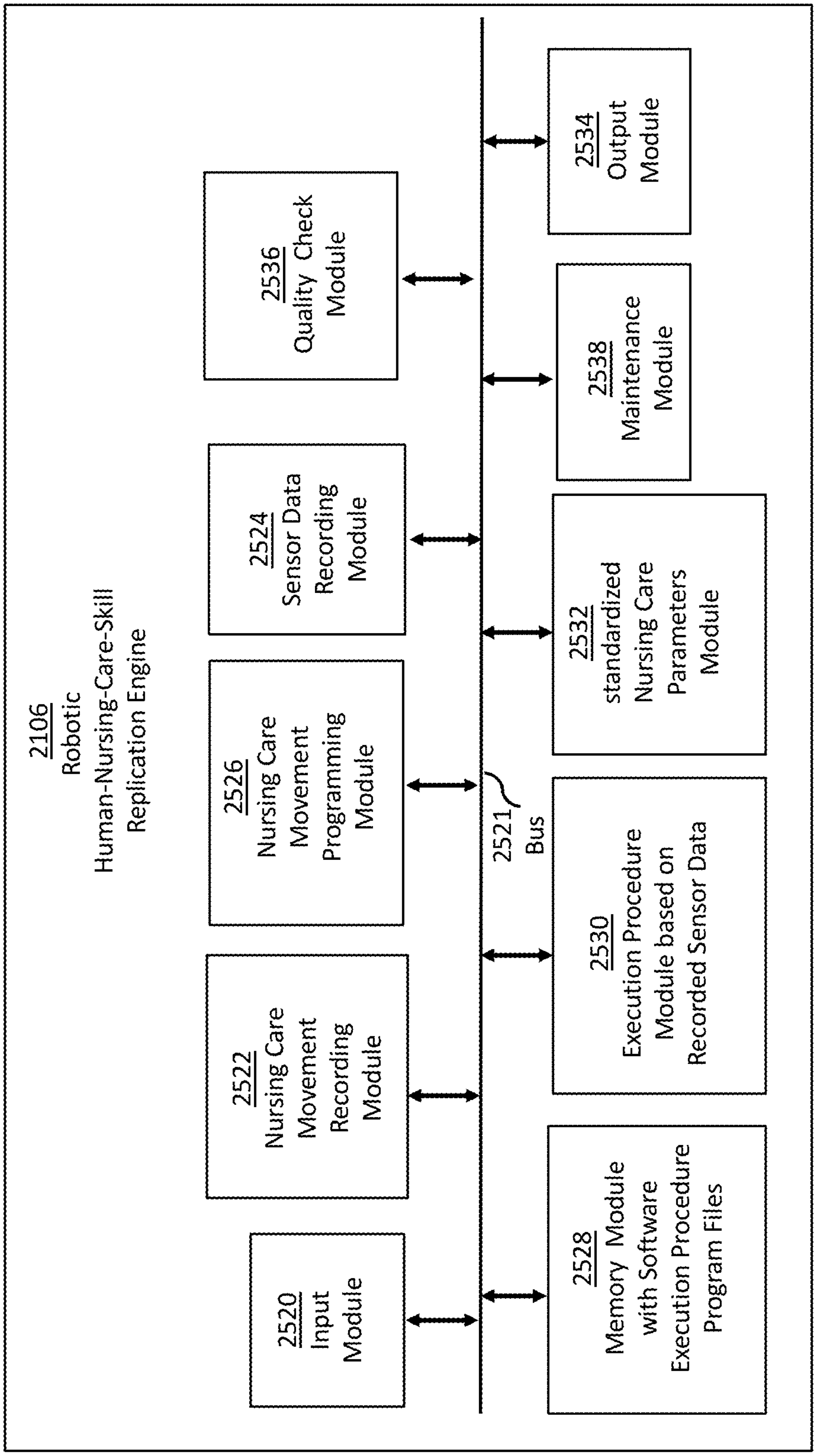

FIG. 69 is block diagram illustrating an embodiment of a nursing replication engine in accordance with the present disclosure.

Figure 70A:
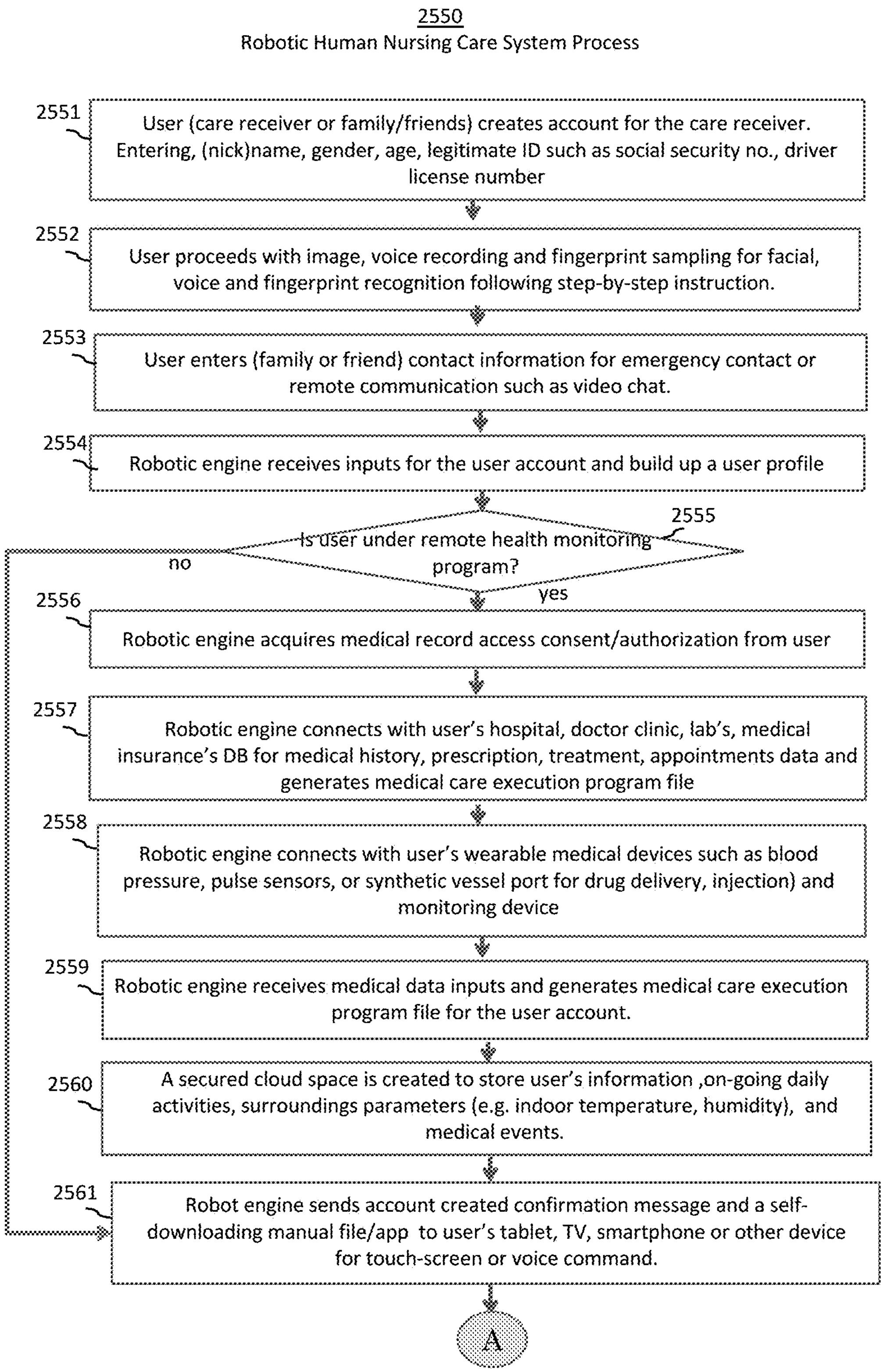
Figure 70B:
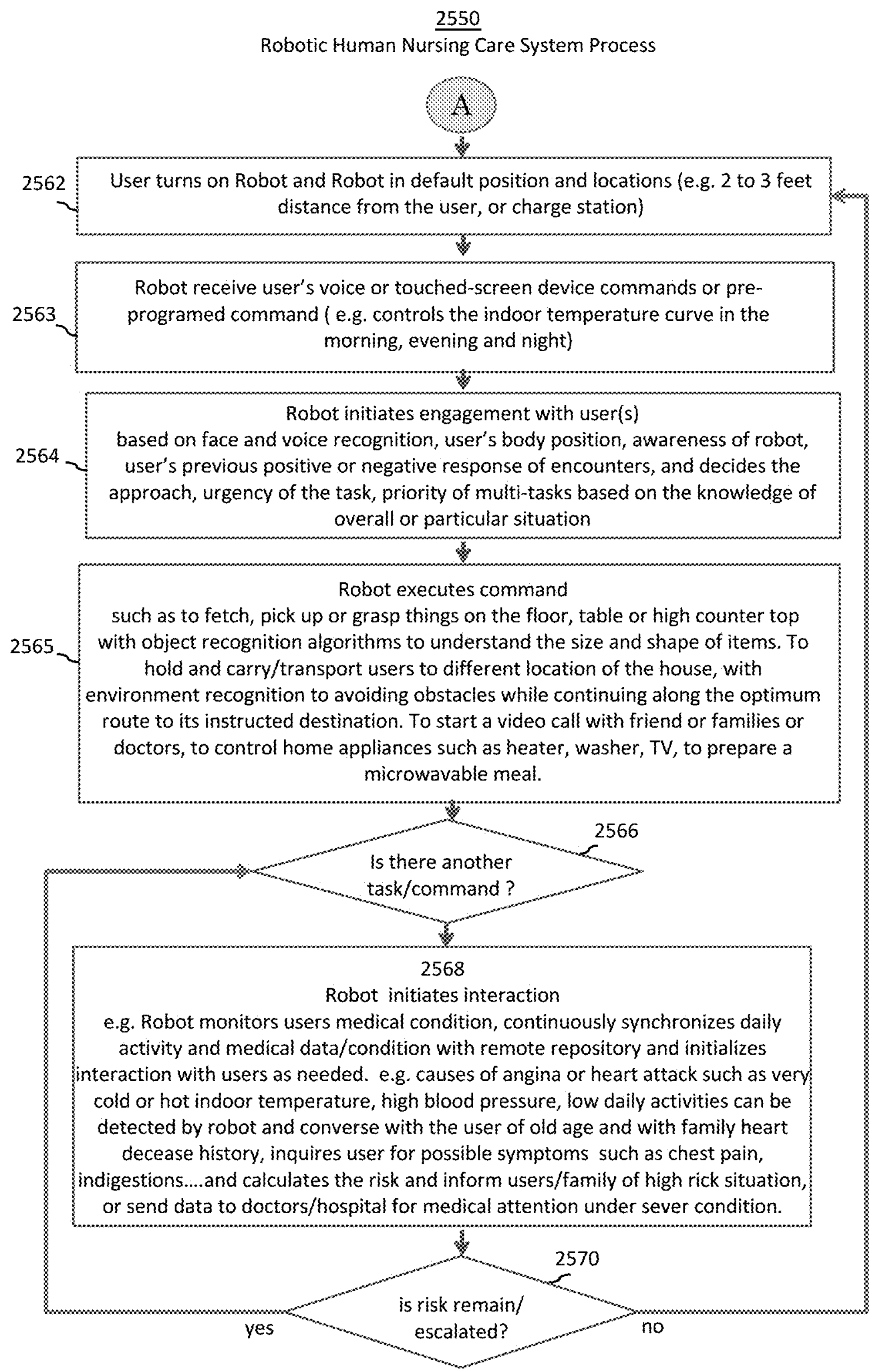

FIGS. 70A-B are flow diagrams illustrating the process of the nursing replication engine in accordance with the present disclosure.

Figure 71:
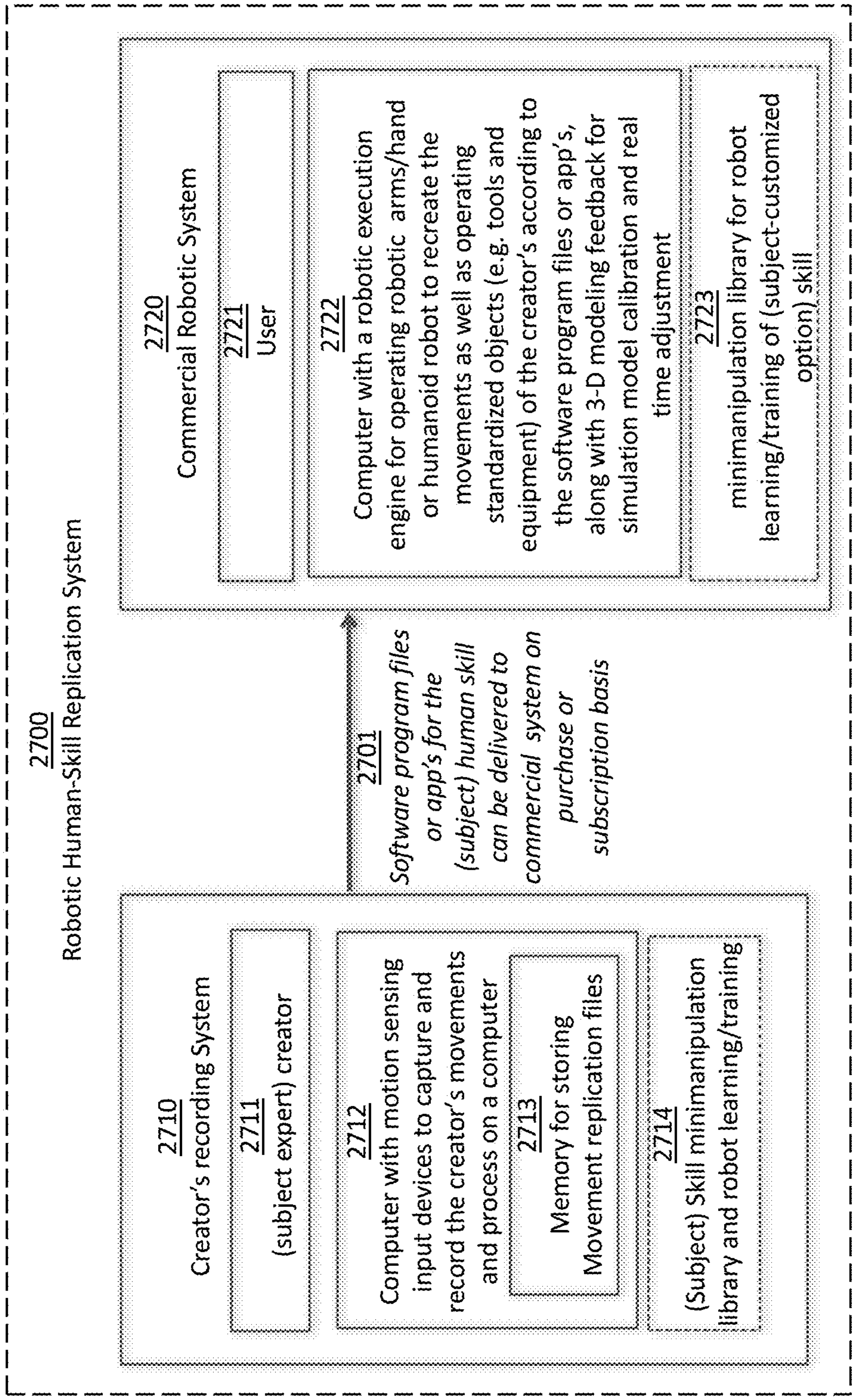

FIG. 71 is a block diagram illustrating the general applicability (or universal) of a robotic human-skill replication system with a creator recording system and a commercial robotic system in accordance with the present disclosure.

Figure 72:
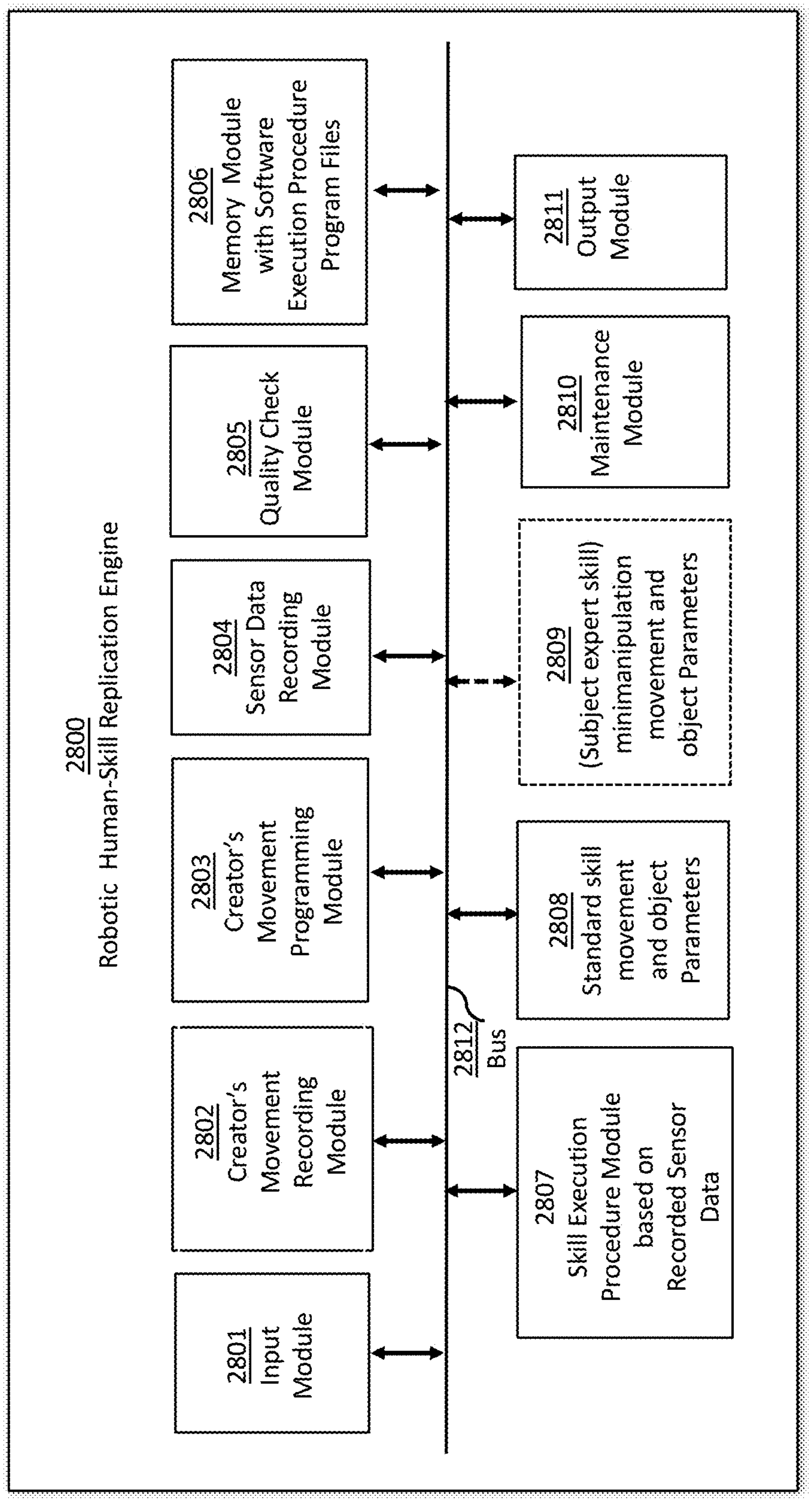

FIG. 72 is a software system diagram illustrating the robotic human-skill replication engine with various modules in accordance with the present disclosure.

Figure 73:
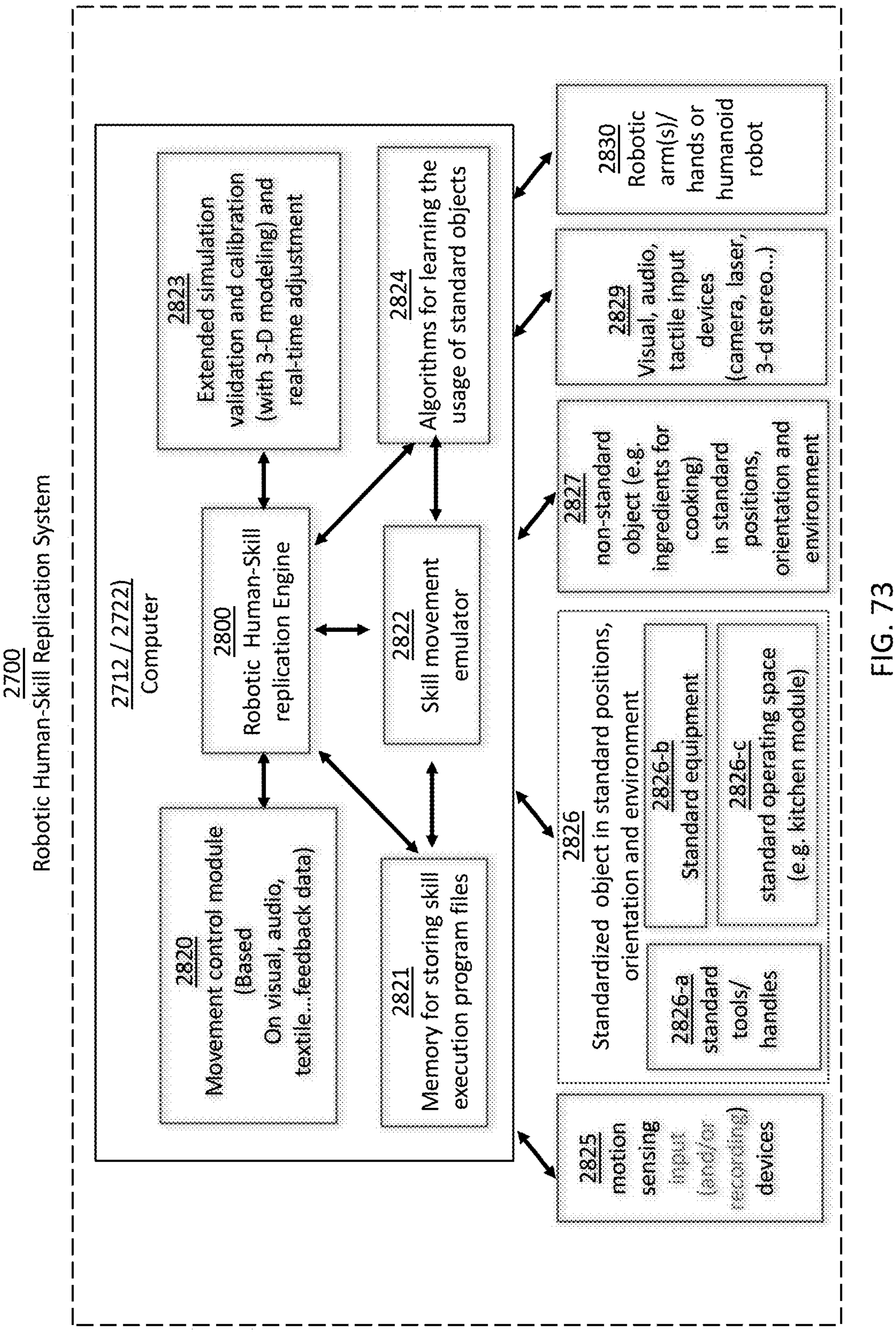

FIG. 73 is a block diagram illustrating one embodiment of the robotic human-skill replication system in accordance with the present disclosure.

Figure 74:
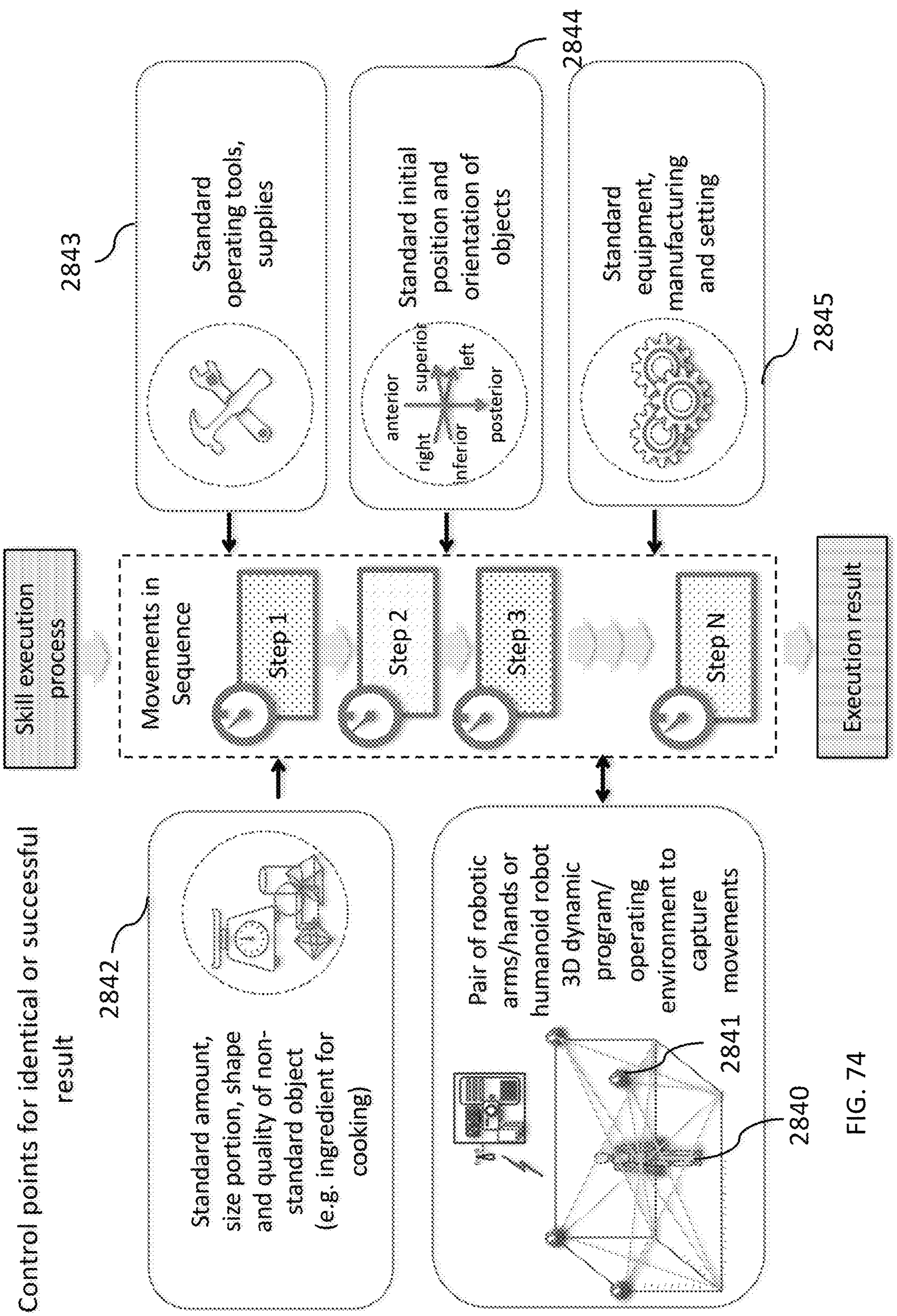

FIG. 74 is a block diagram illustrating a humanoid with controlling points for skill execution or replication process with standardized operating tools, standardized positions, and orientations, and standardized equipment in accordance with the present disclosure.

Figure 75:
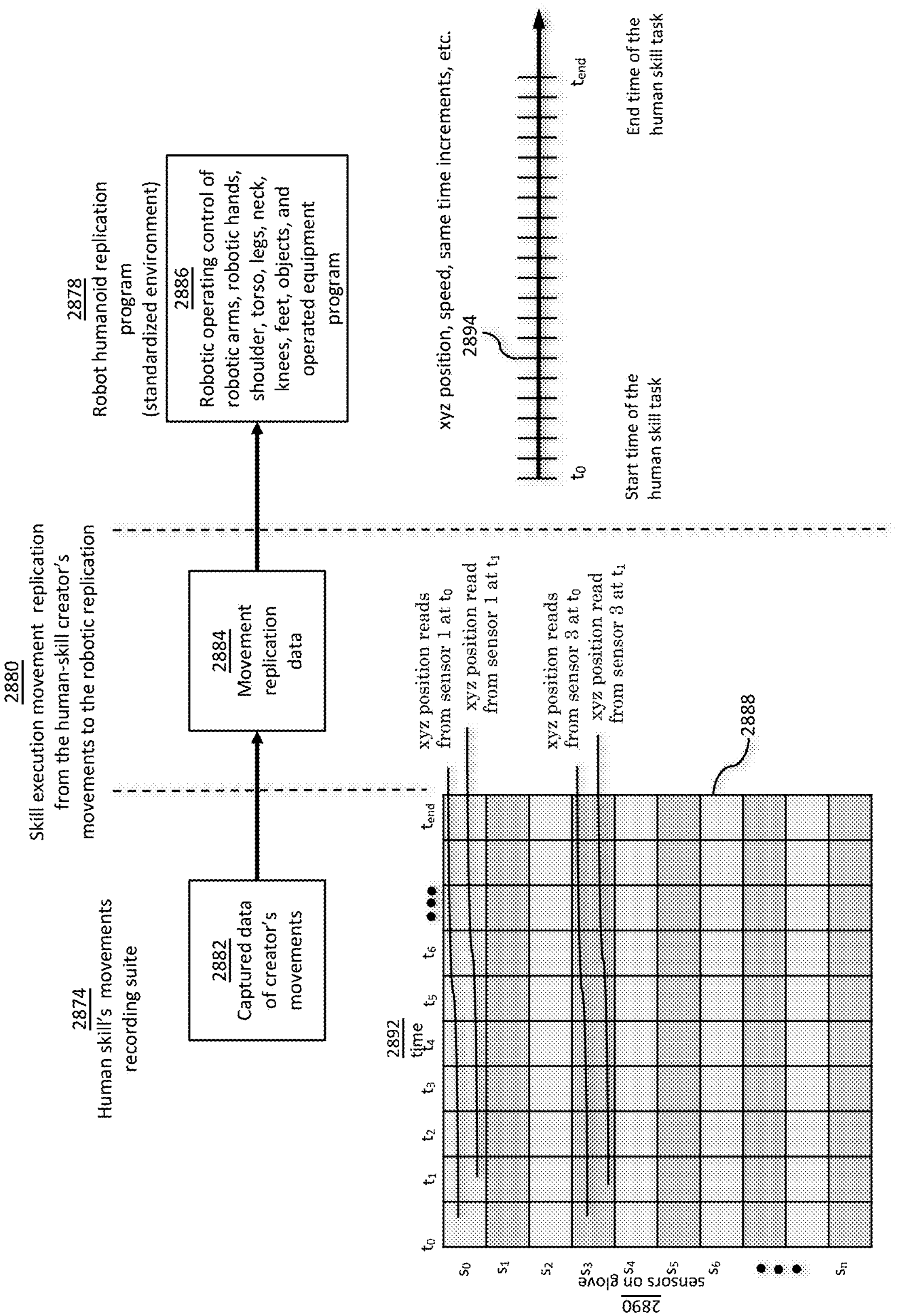

FIG. 75 is a simplified block diagram illustrating a humanoid replication program that replicates the recorded process of human-skill movements by tracking the activity of glove sensors on periodic time intervals in accordance with the present disclosure.

Figure 76:
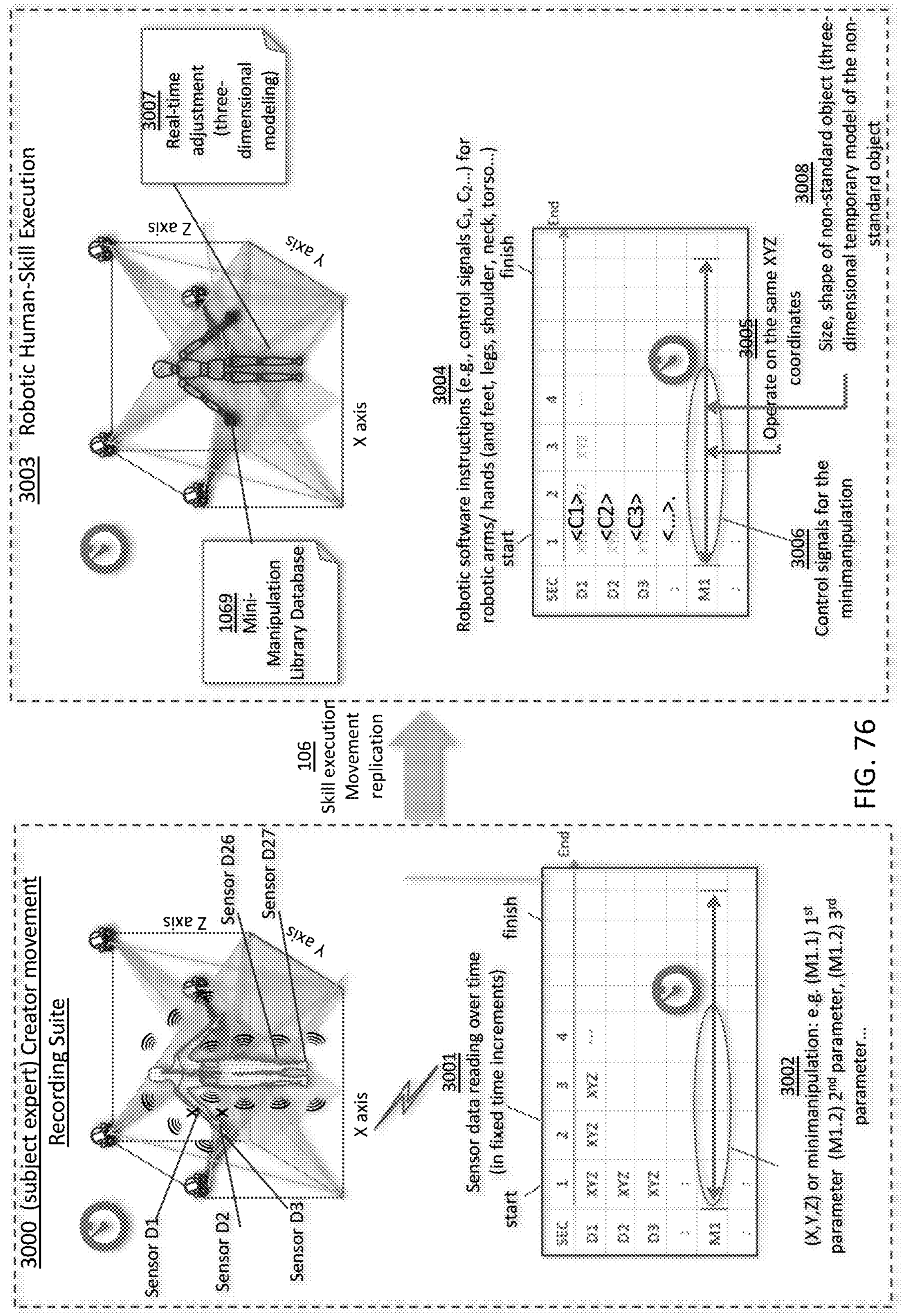

FIG. 76 is a block diagram illustrating the creator movement recording and humanoid replication in accordance with the present disclosure.

Figure 77:
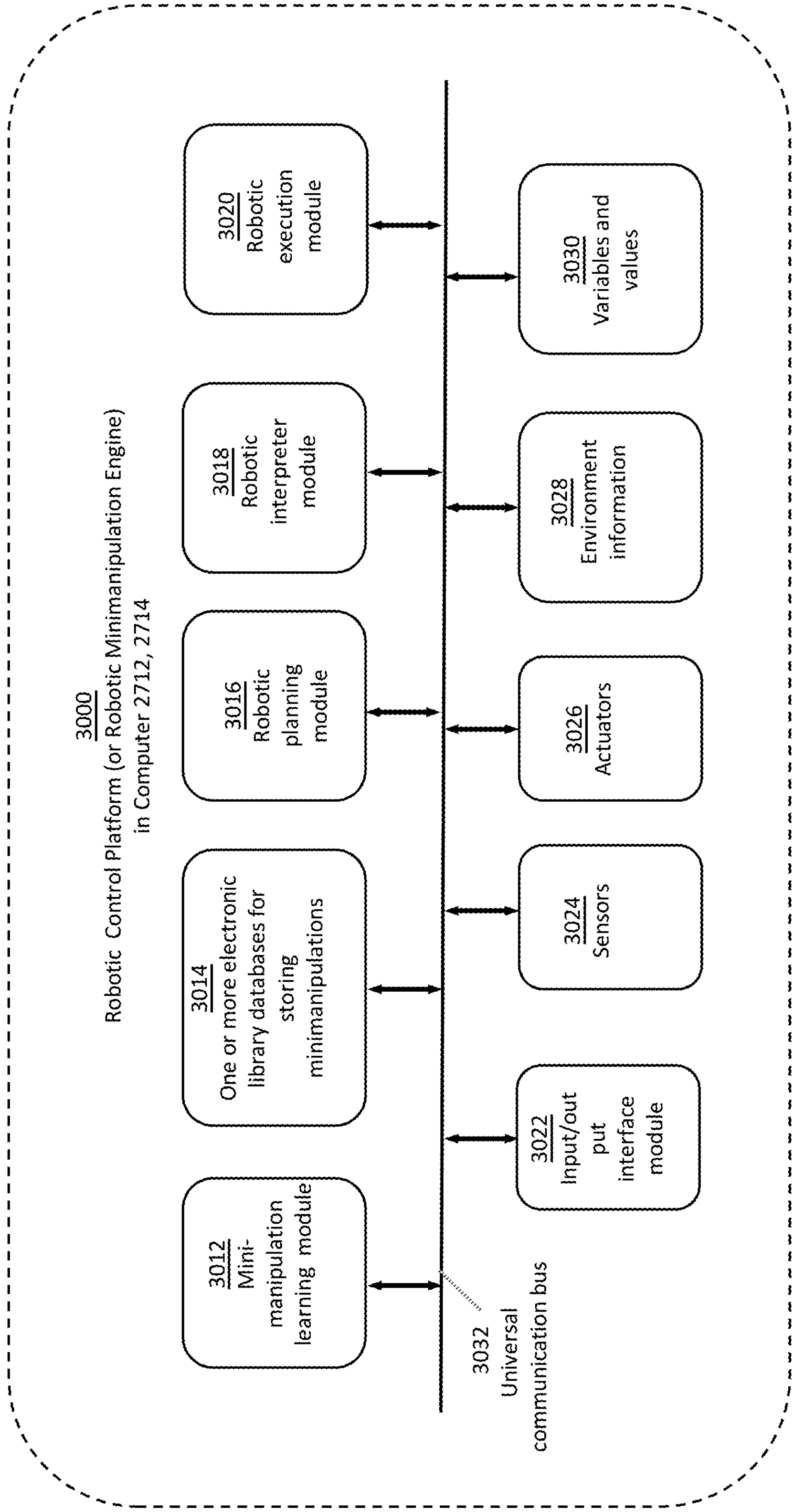

FIG. 77 depicts the overall robotic control platform for a general-purpose humanoid robot at as a high-level description of the functionality of the present disclosure.

Figure 78:
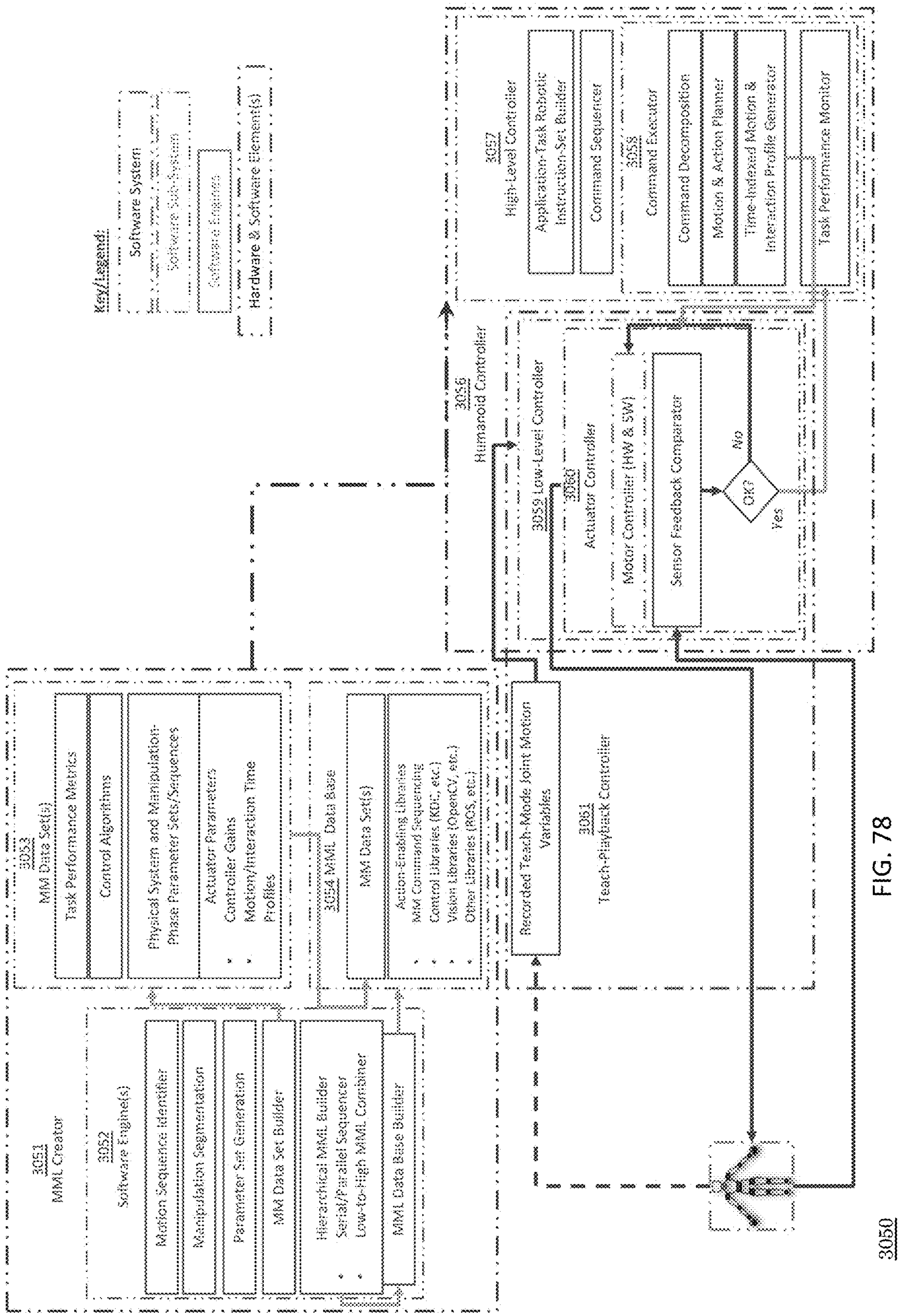

FIG. 78 is a block diagram illustrating the schematic for generation, transfer, implementation, and usage of minimanipulation libraries as part of a humanoid application-task replication process in accordance with the present disclosure.

Figure 79:
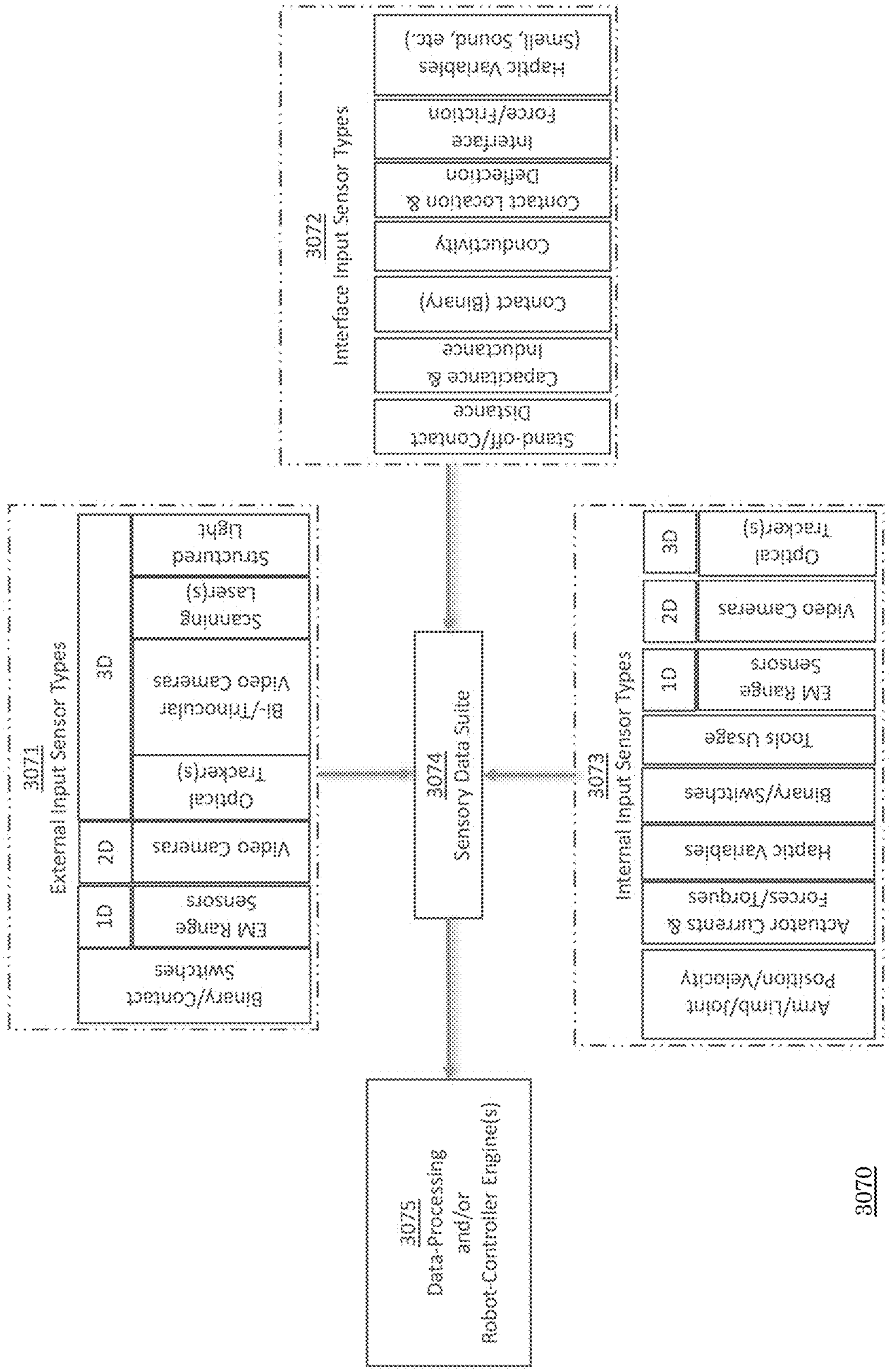

FIG. 79 is a block diagram illustrating studio and robot-based sensory-Data input categories and types in accordance with the present disclosure.

Figure 80:
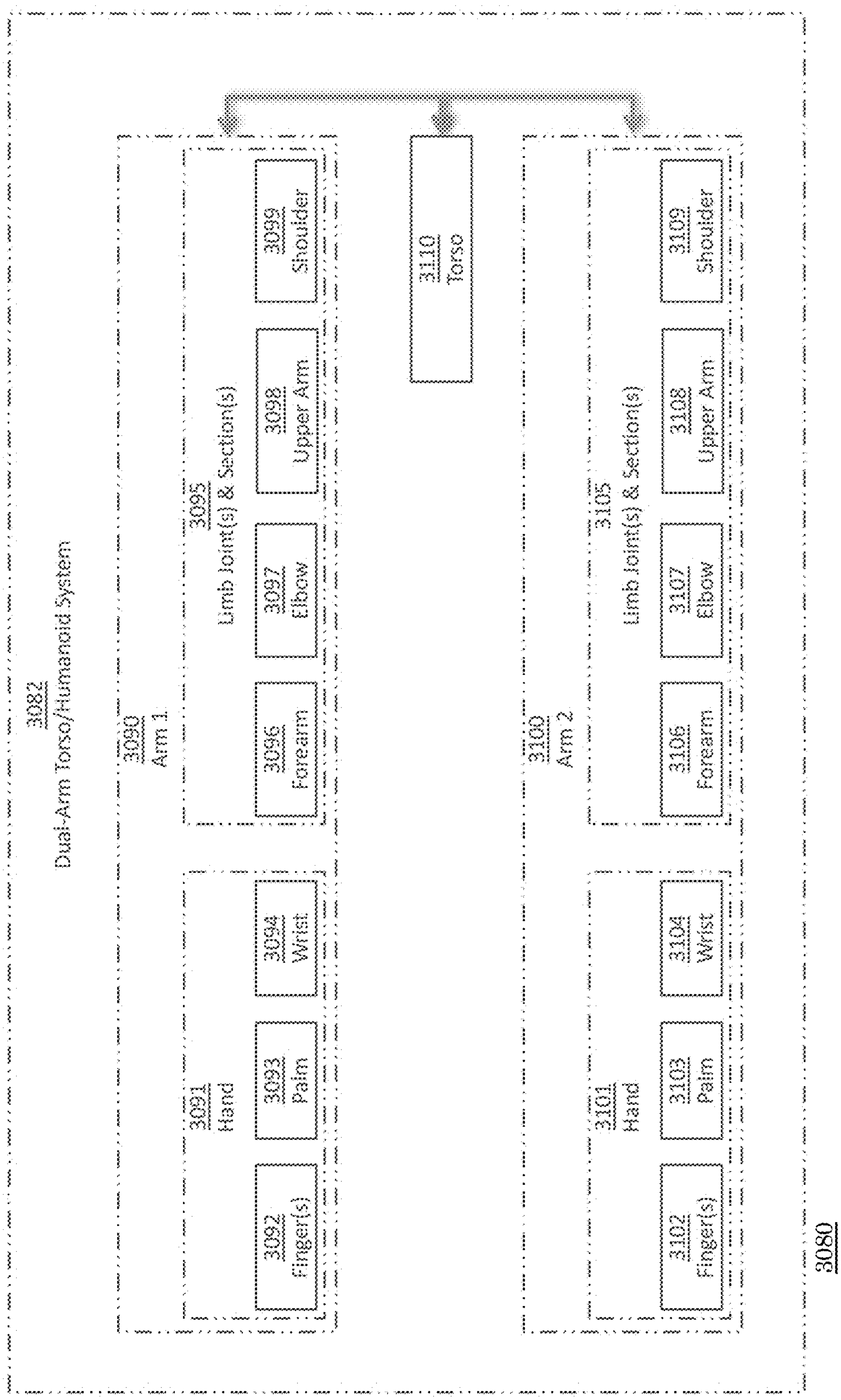

FIG. 80 is a block diagram illustrating physical-/system-based minimanipulation library action-based dual-arm and torso topology in accordance with the present disclosure.

Figure 81:
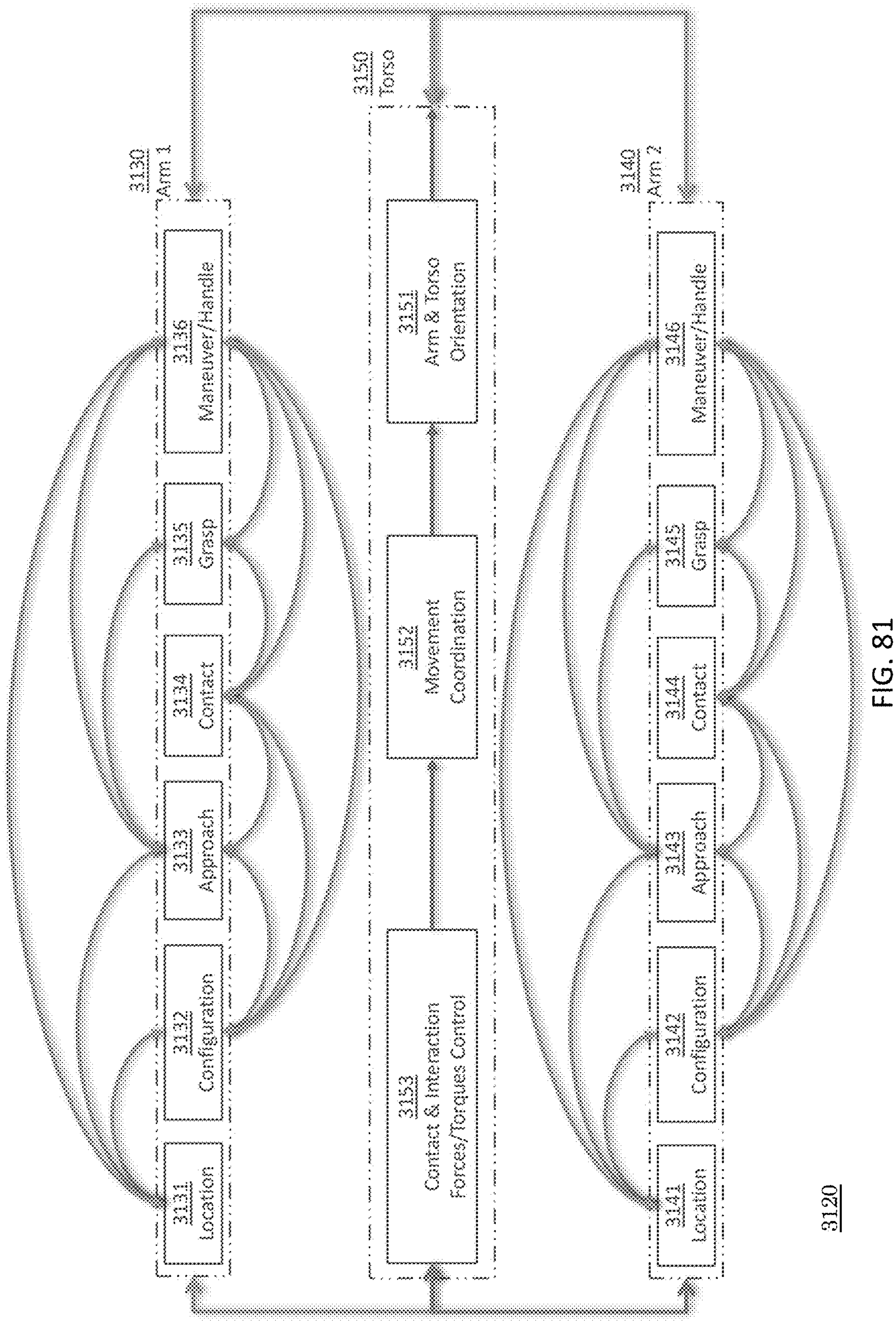

FIG. 81 is a block diagram illustrating minimanipulation library manipulation-phase combinations and transitions for task-specific action-sequences in accordance with the present disclosure.

Figure 82:
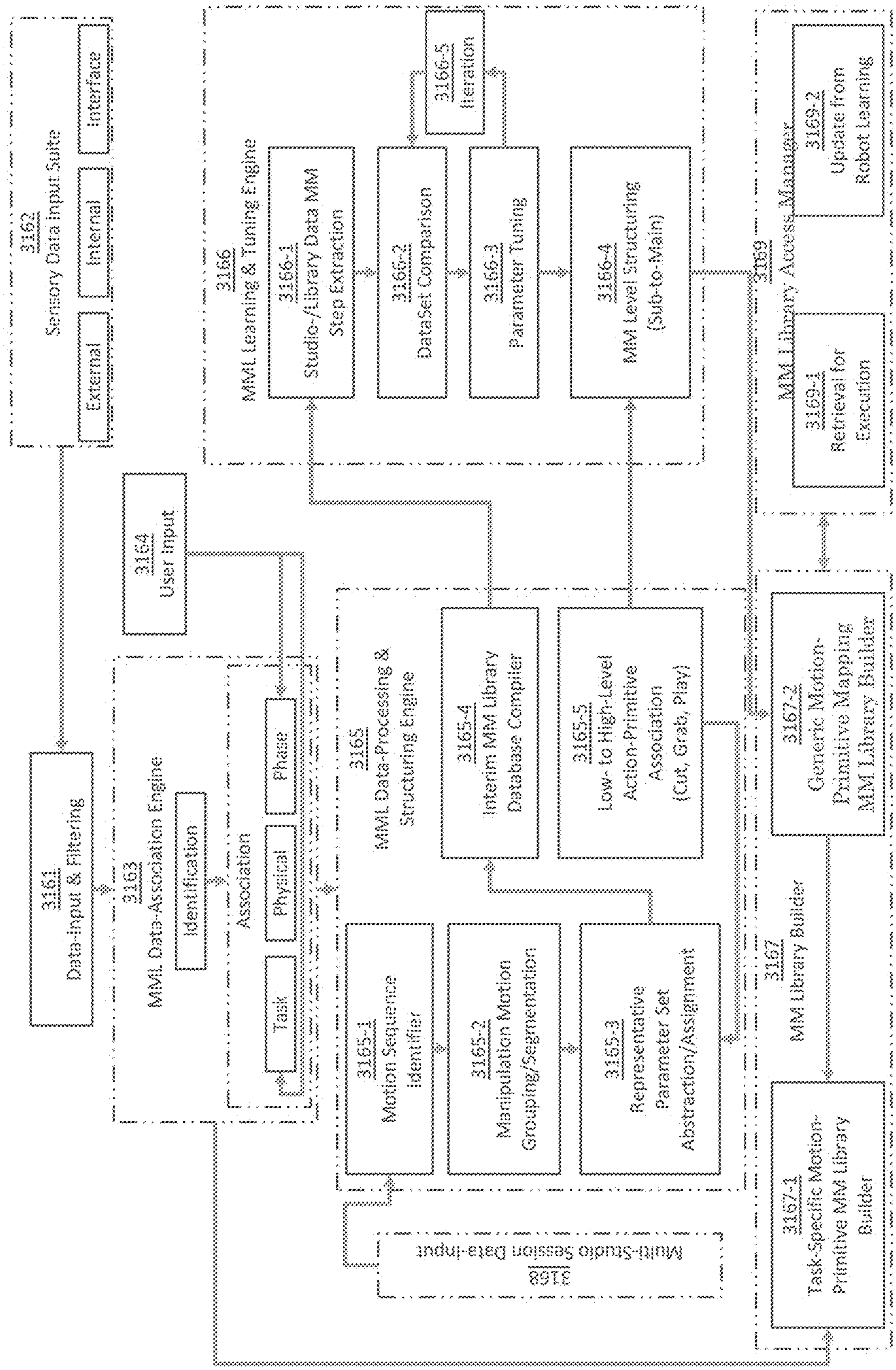

FIG. 82 is a block diagram illustrating one or more minimanipulation libraries, (generic and task-specific) building process from studio data in accordance with the present disclosure.

Figure 83:
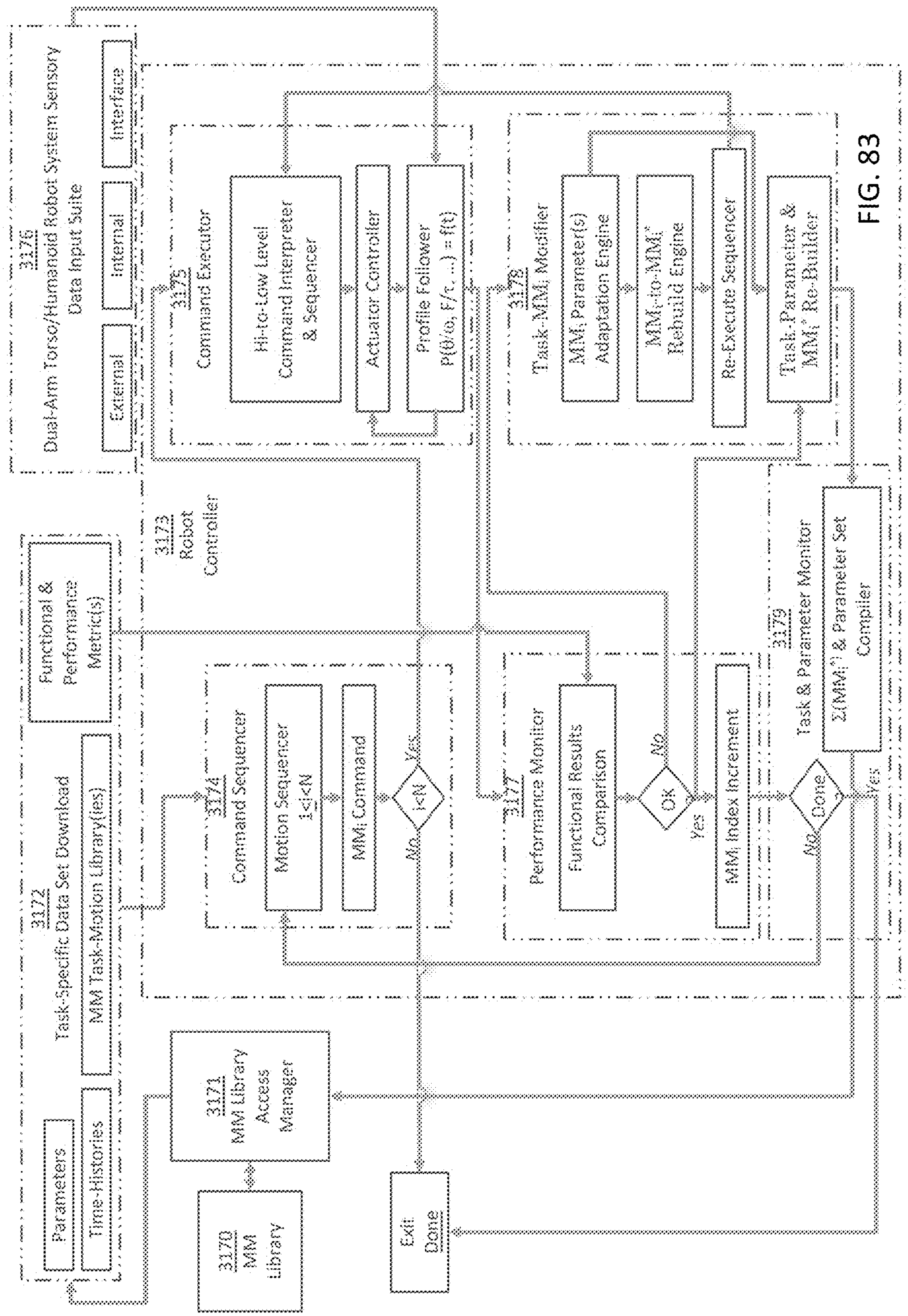

FIG. 83 is a block diagram illustrating robotic task-execution via one or more minimanipulation library data sets in accordance with the present disclosure.

Figure 84:
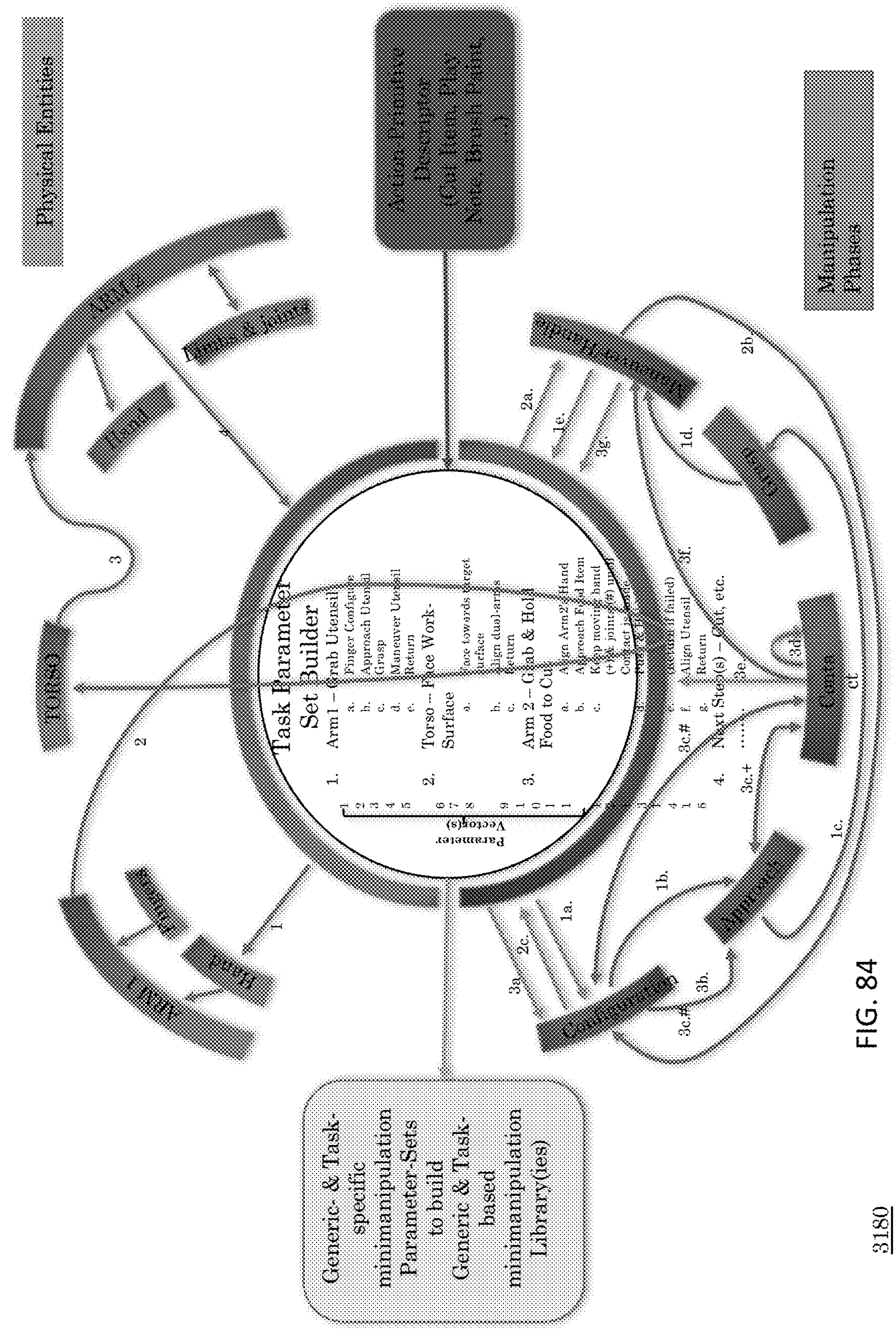

FIG. 84 is a block diagram illustrating a schematic for automated minimanipulation parameter-set building engine in accordance with the present disclosure.

Figure 85A:
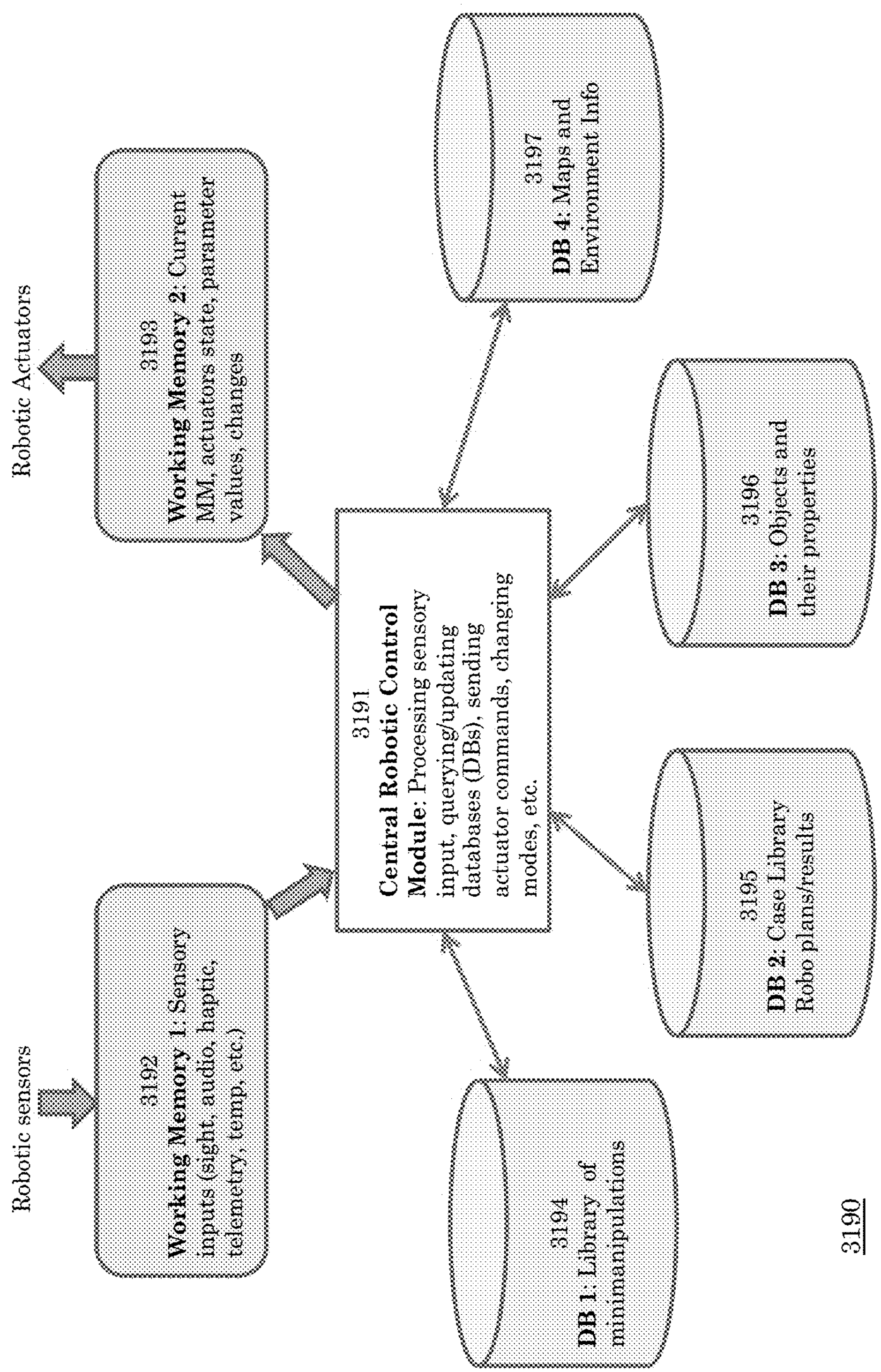

FIG. 85A is a block diagram illustrating a data-centric view of the robotic system in accordance with the present disclosure.

Figure 85B:
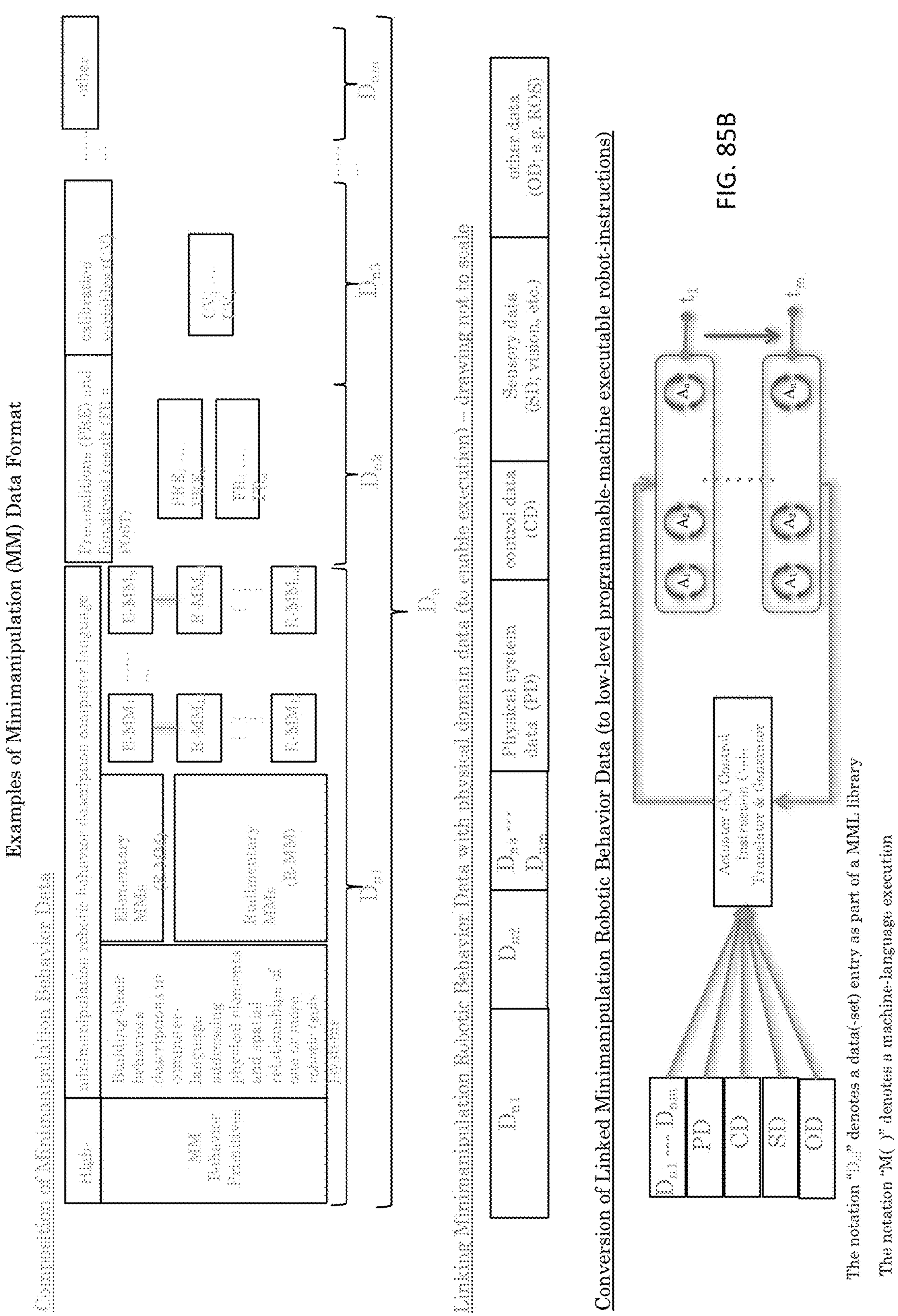

FIG. 85B is a block diagram illustrating examples of various minimanipulation data formats in the composition, linking, and conversion of minimanipulation robotic behavior data accordance with the present disclosure.

Figure 86:
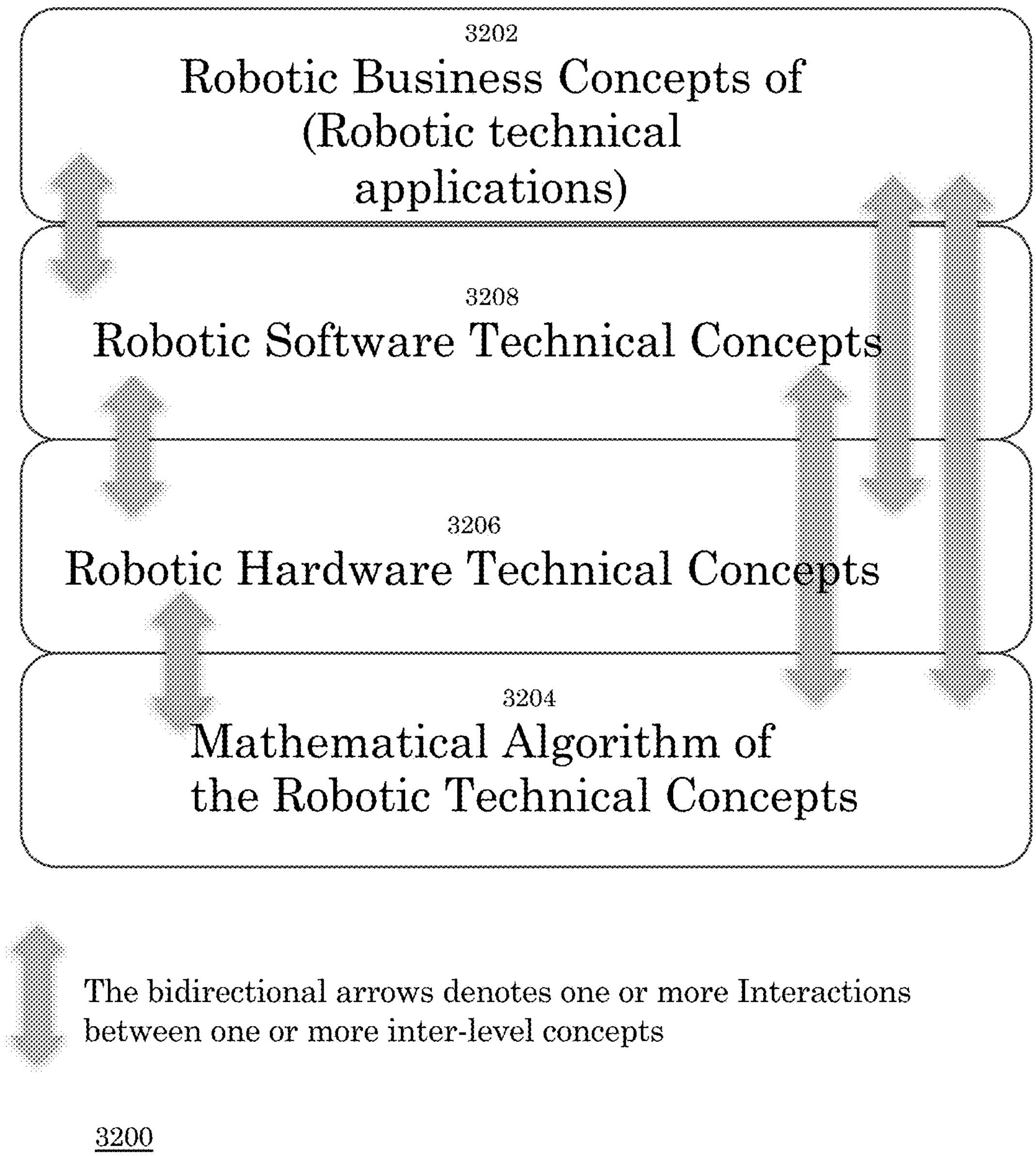

FIG. 86 is a block diagram illustrating the different levels of bidirectional abstractions between the robotic hardware technical concepts, the robotic software technical concepts, the robotic business concepts, and mathematical algorithms for carrying the robotic technical concepts in accordance with the present disclosure.

Figure 87A:
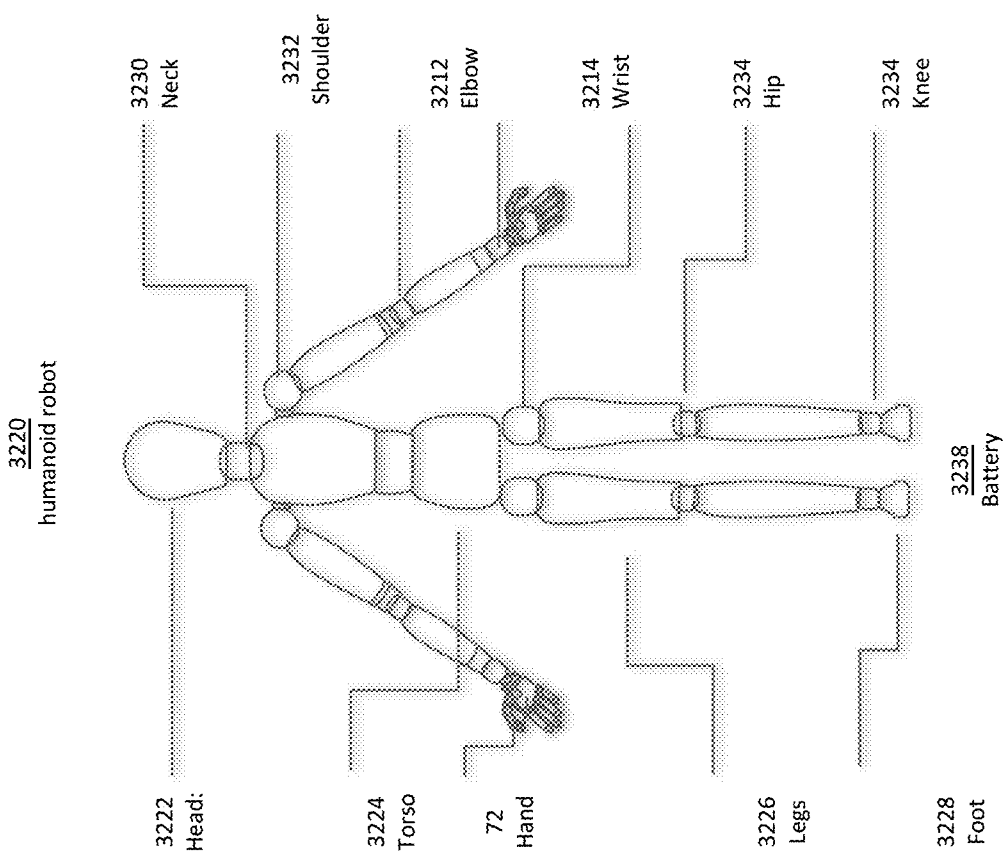
Figure 87B:
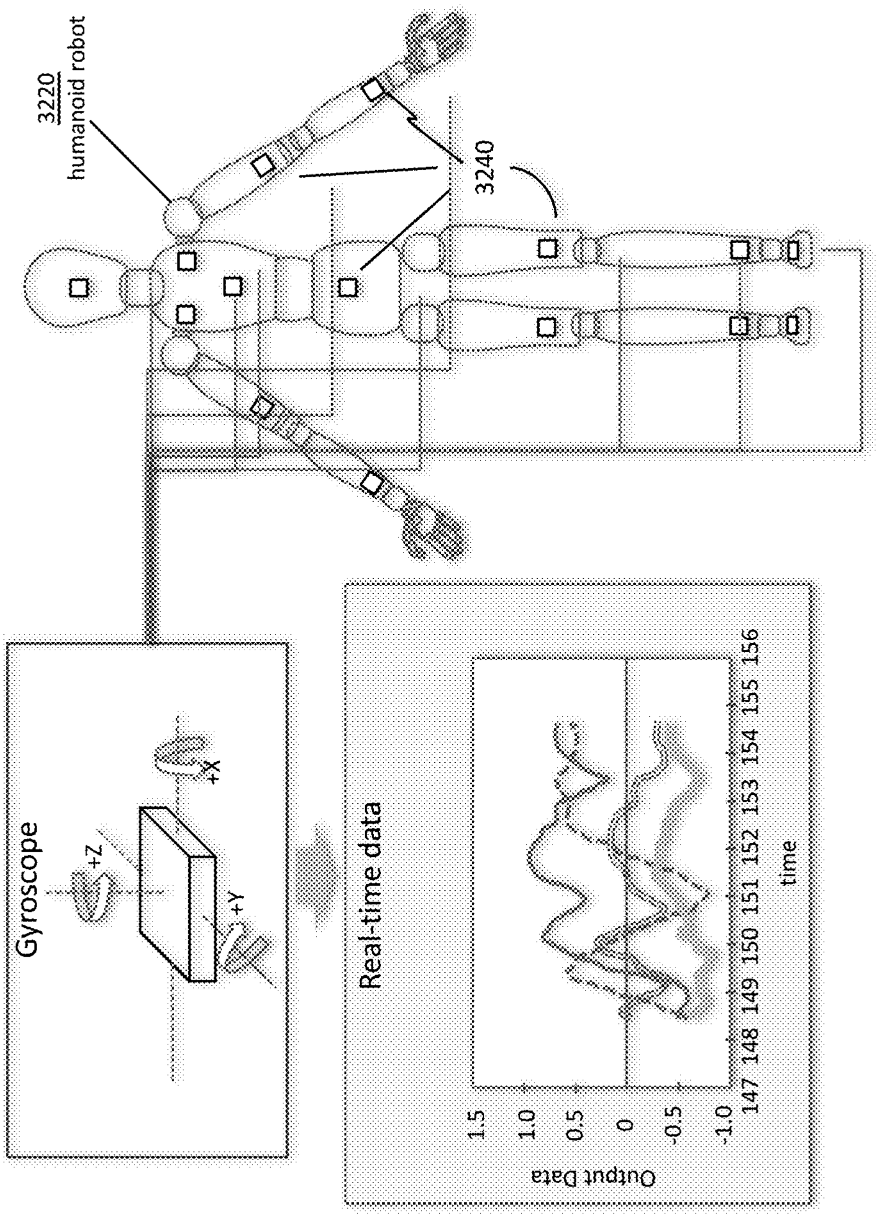
Figure 87C:
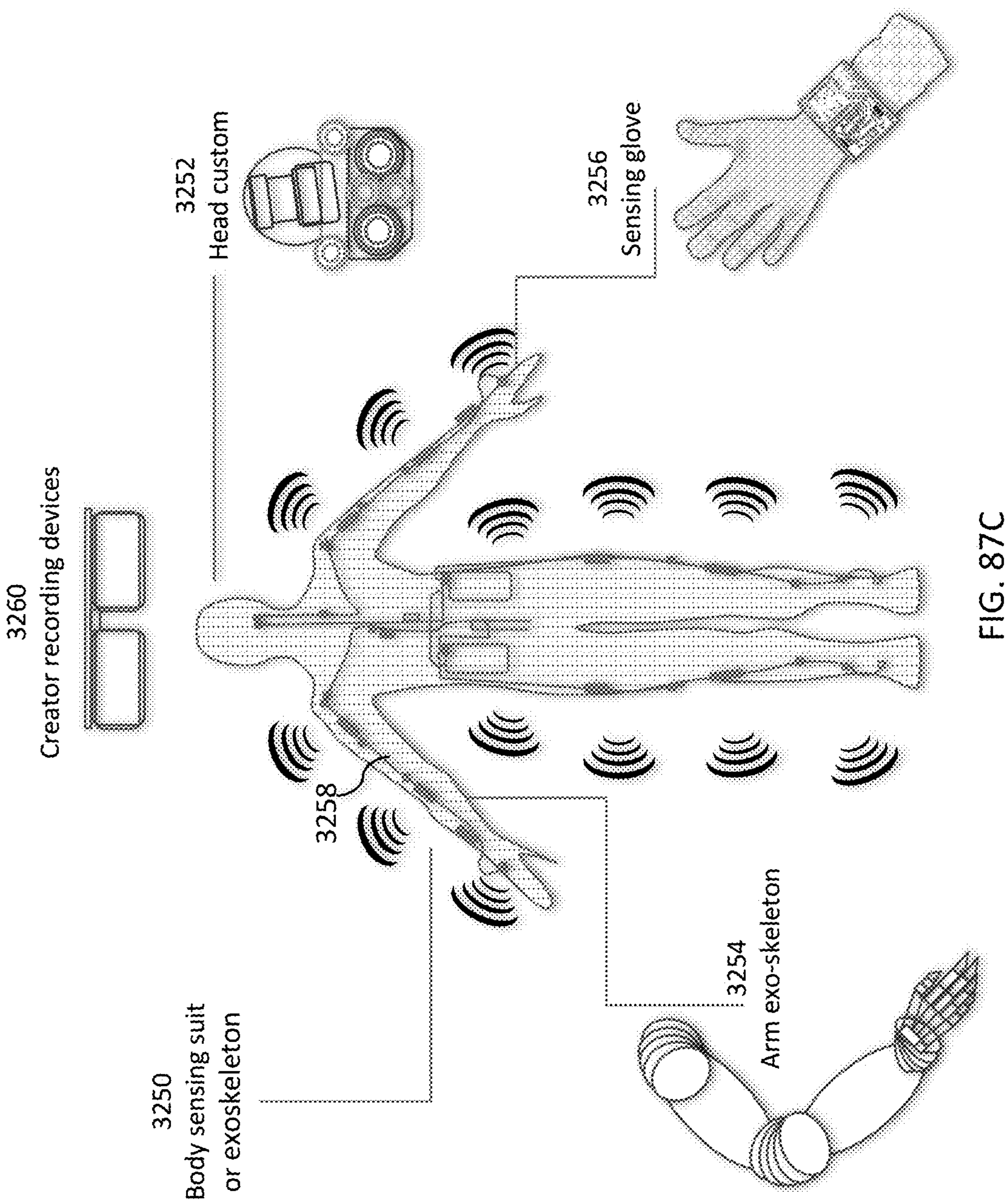

FIG. 87A is a block diagram illustrating one embodiment of a humanoid in accordance with the present disclosure; FIG. 87B is a block diagram illustrating the humanoid embodiment with gyroscopes and graphical data in accordance with the present disclosure; and FIG. 87C is graphical diagram illustrating the creator recording devices on a humanoid, including a body sensing suit, an arm exoskeleton, head gear, and sensing glove in accordance with the present disclosure.

Figure 88:
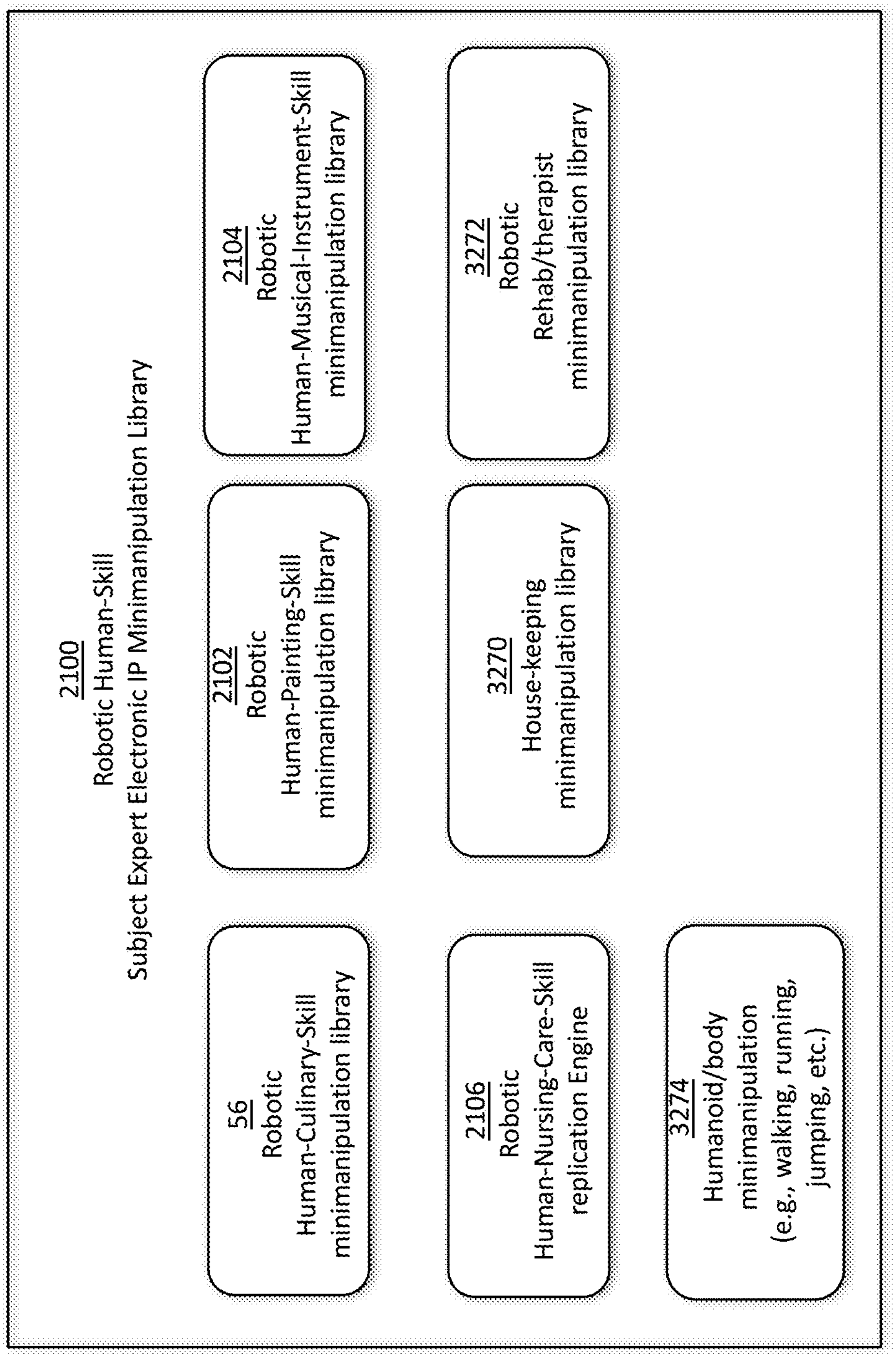

FIG. 88 is a block diagram illustrating a robotic human-skill subject expert minimanipulation library in accordance with the present disclosure.

Figure 89:
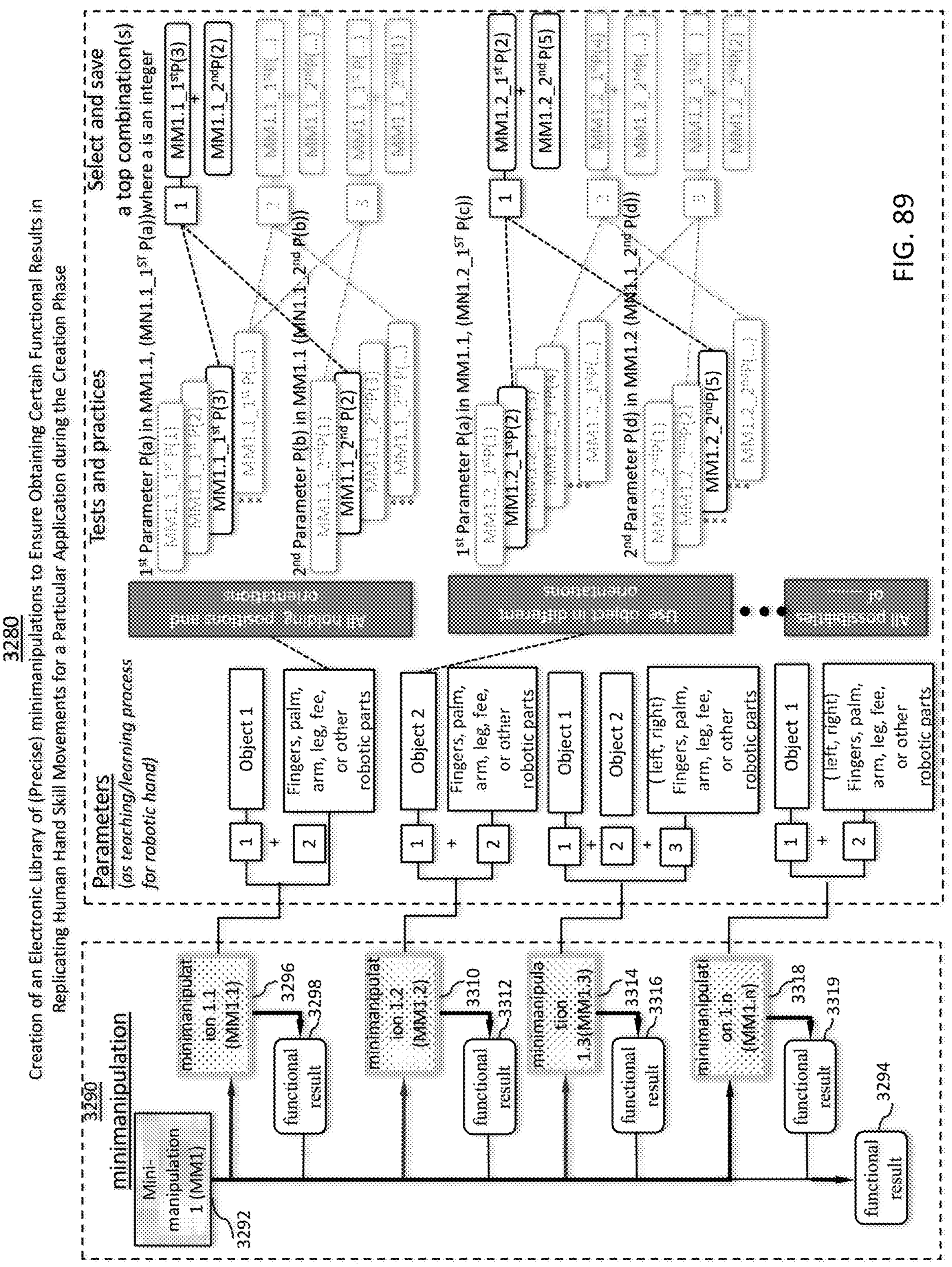

FIG. 89 is a block diagram illustrating the creation process of an electronic library of general minimanipulations for replacing human-hand-skill movements in accordance with the present disclosure.

Figure 90:
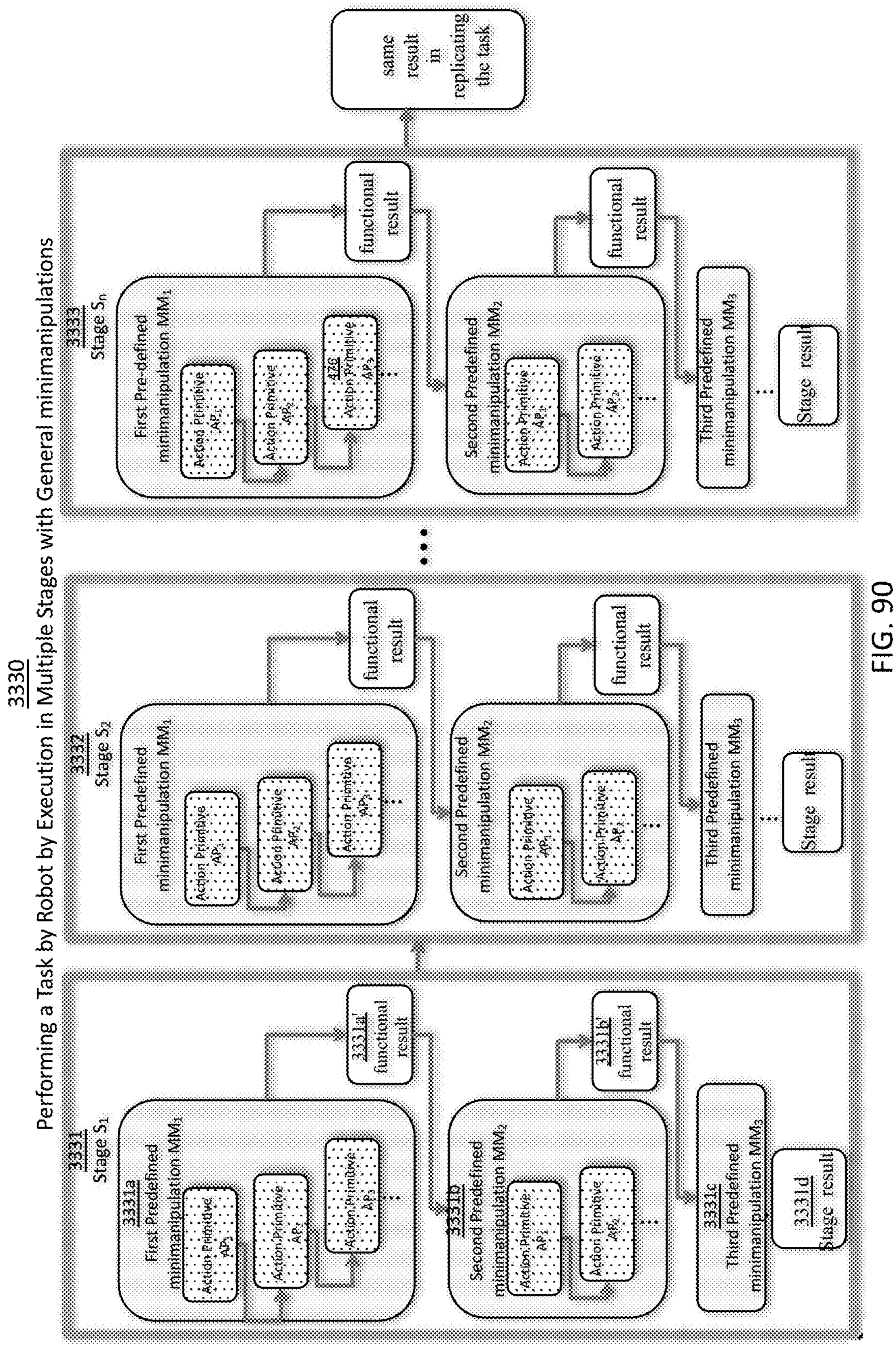

FIG. 90 is a block diagram illustrating performing a task by robot by execution in multiple stages with general minimanipulations in accordance with the present disclosure.

Figure 91:
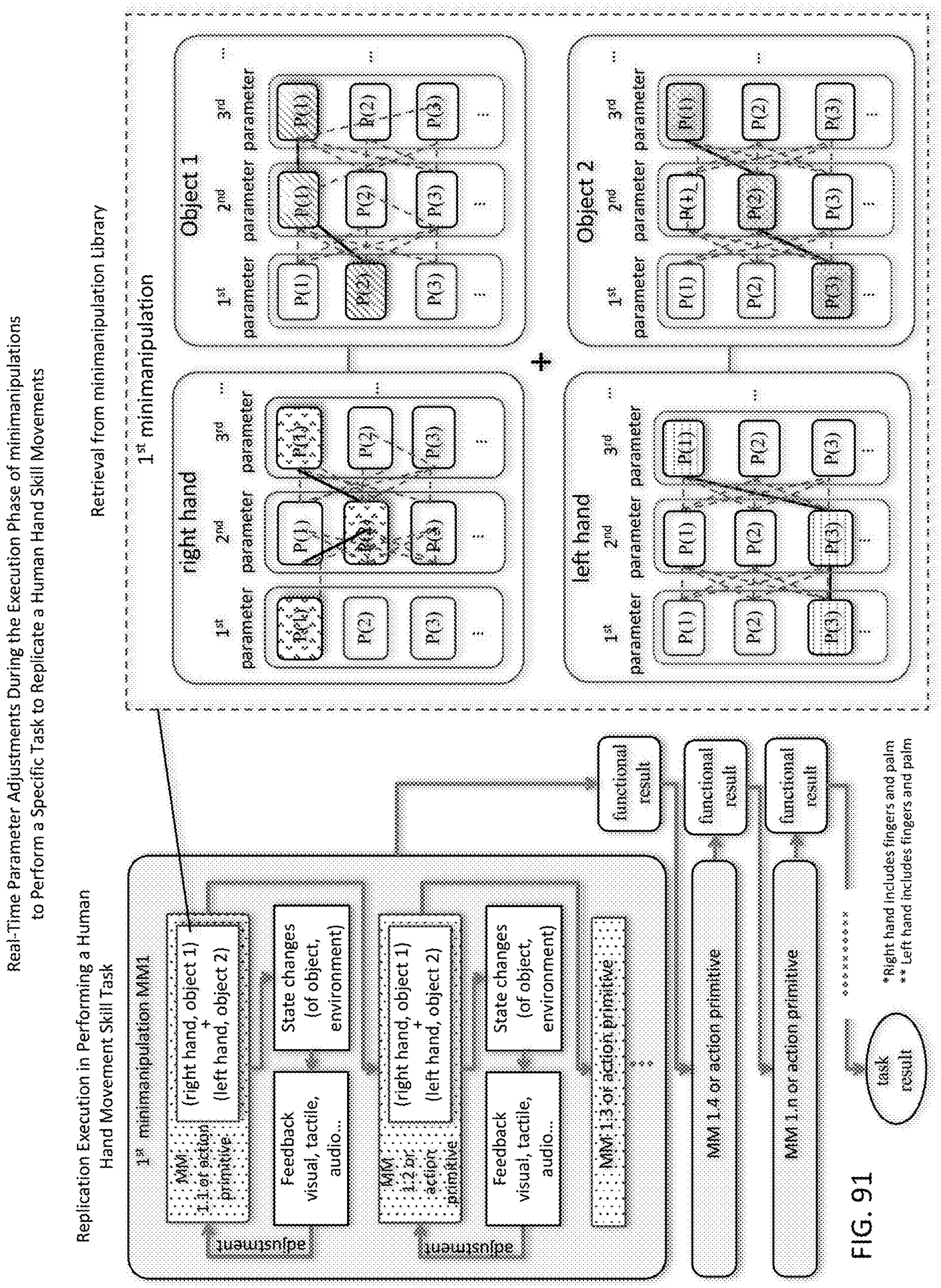

FIG. 91 is a block diagram illustrating the real-time parameter adjustment during the execution phase of minimanipulations in accordance with the present disclosure.

Figure 92:
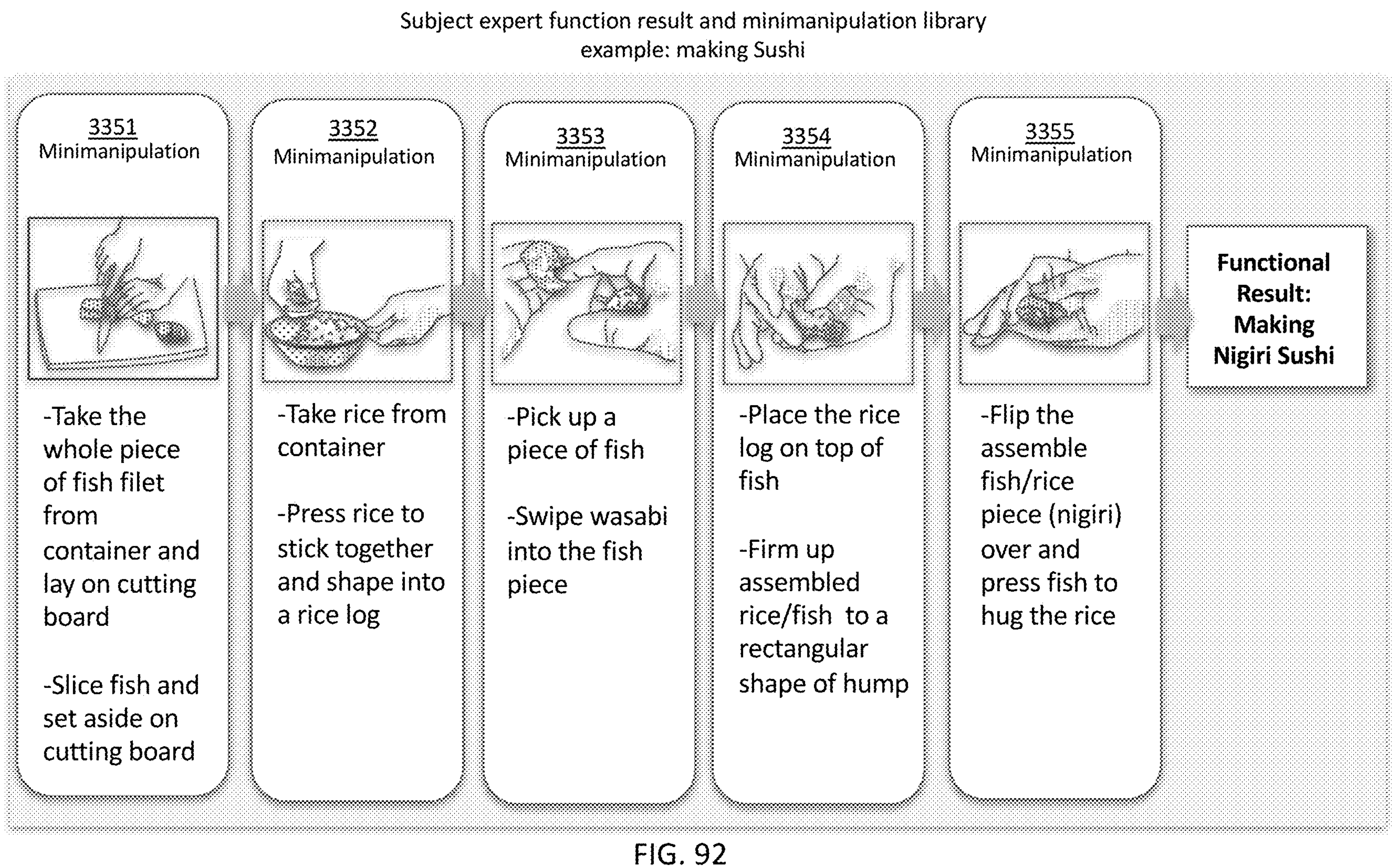

FIG. 92 is a block diagram illustrating a set of minimanipulations for making sushi in accordance with the present disclosure.

FIG. 93 is a block diagram illustrating a first minimanipulation of cutting fish in the set of minimanipulations for making sushi in accordance with the present disclosure.

FIG. 94 is a block diagram illustrating a second minimanipulation of taking rice from a container in the set of minimanipulations for making sushi in accordance with the present disclosure.

FIG. 95 is a block diagram illustrating a third minimanipulation of picking up a piece of fish in the set of minimanipulations for making sushi in accordance with the present disclosure.

FIG. 96 is a block diagram illustrating a fourth minimanipulation of firming up the rice and fish into a desirable shape in the set of minimanipulations for making sushi in accordance with the present disclosure.

FIG. 97 is a block diagram illustrating a fifth minimanipulation of pressing the fish to hug the rice in the set of minimanipulations for making sushi in accordance with the present disclosure.

Figure 98:
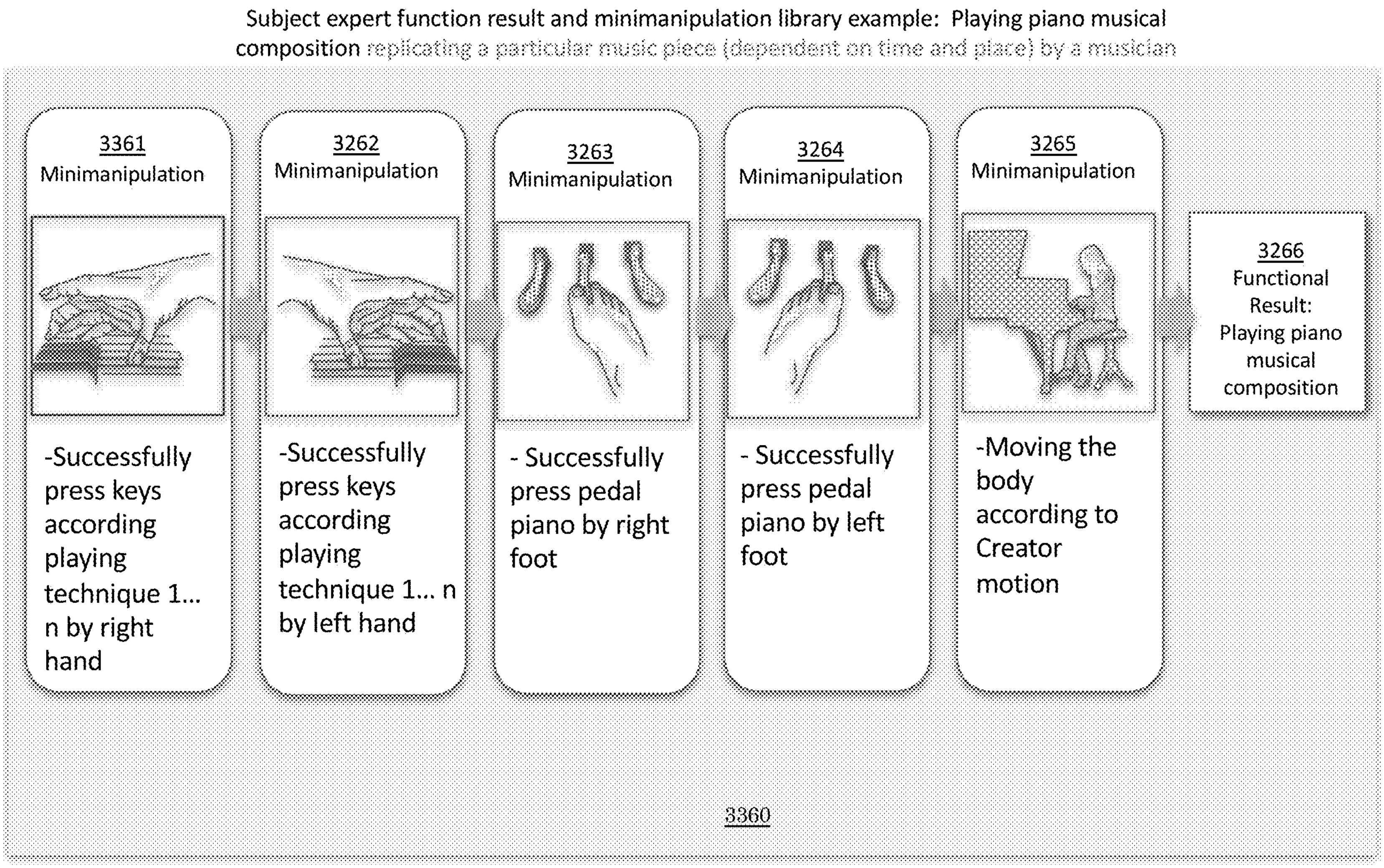

FIG. 98 is a block diagram illustrating a set of minimanipulations for playing piano that occur in any sequence or in any combination in parallel in accordance with the present disclosure.

FIG. 99 is a block diagram illustrating a first minimanipulation for the right hand and a second minimanipulation for the left hand of the set of minimanipulations that occur in parallel for playing piano from the set of minimanipulations for playing piano in accordance with the present disclosure.

FIG. 100 is a block diagram illustrating a third minimanipulation for the right foot and a fourth minimanipulation for the left foot of the set of minimanipulations that occur in parallel from the set of minimanipulations for playing piano in accordance with the present disclosure.

FIG. 101 is a block diagram illustrating a fifth minimanipulation for moving the body that occur in parallel with one or more other minimanipulations from the set of minimanipulations for playing piano in accordance with the present disclosure.

Figure 102:
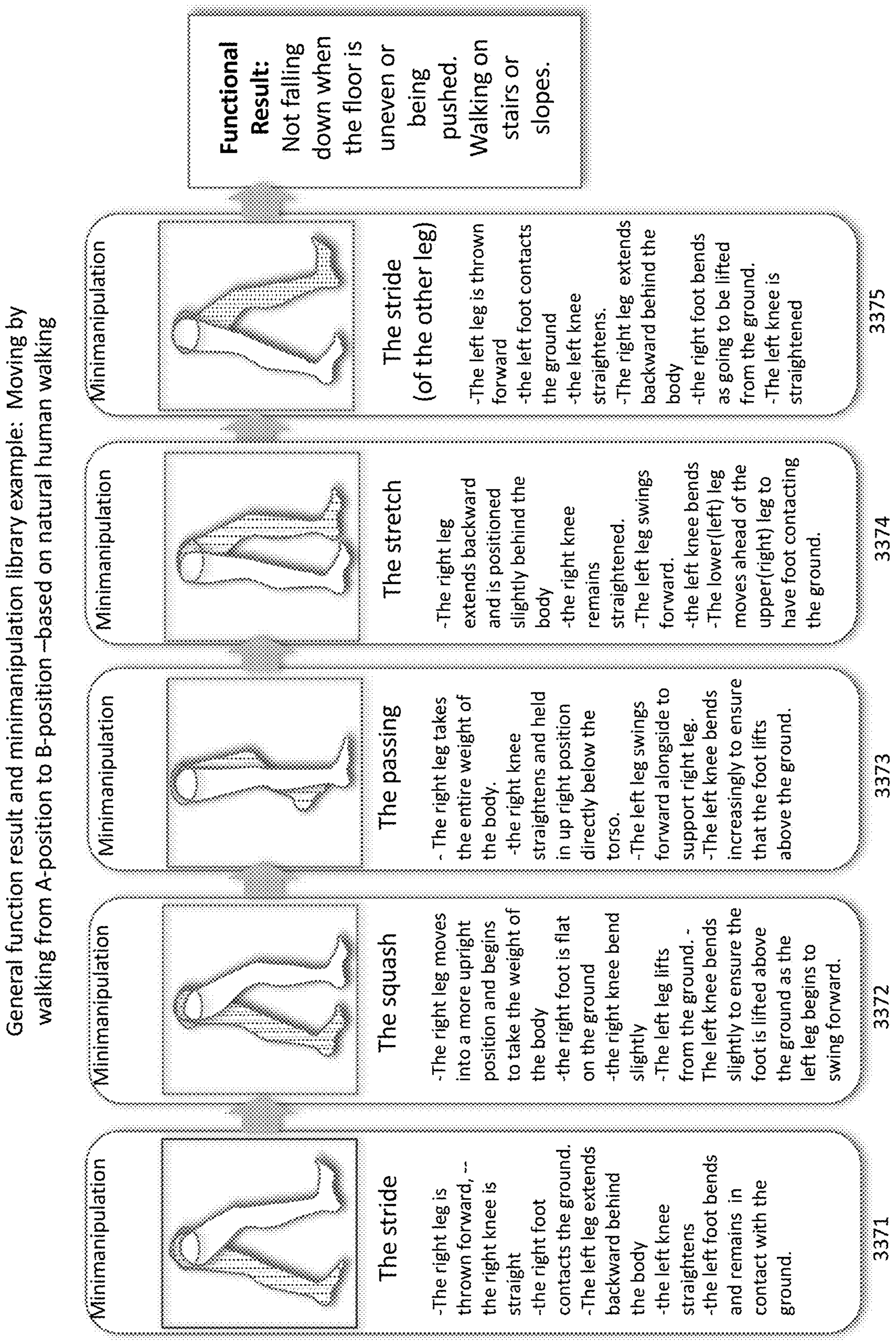

FIG. 102 is a block diagram illustrating a set of minimanipulations for humanoid to walk that occur in any sequence, or in any combination in parallel in accordance with the present disclosure.

FIG. 103 is a block diagram illustrating a first minimanipulation of stride pose with the right leg in the set of minimanipulations for humanoid to walk in accordance with the present disclosure.

FIG. 104 is a block diagram illustrating a second minimanipulation of squash pose with the right leg in the set of minimanipulations for humanoid to walk in accordance with the present disclosure.

FIG. 105 is a block diagram illustrating a third minimanipulation of passing pose with the right leg in the set of minimanipulations for humanoid to walk in accordance with the present disclosure.

FIG. 106 is a block diagram illustrating a fourth minimanipulation of stretch pose with the right leg in the set of minimanipulations for humanoid to walk in accordance with the present disclosure.

FIG. 107 is a block diagram illustrating a fifth minimanipulation of stride pose with the left leg in the set of minimanipulations for humanoid to walk in accordance with the present disclosure.

Figure 108:
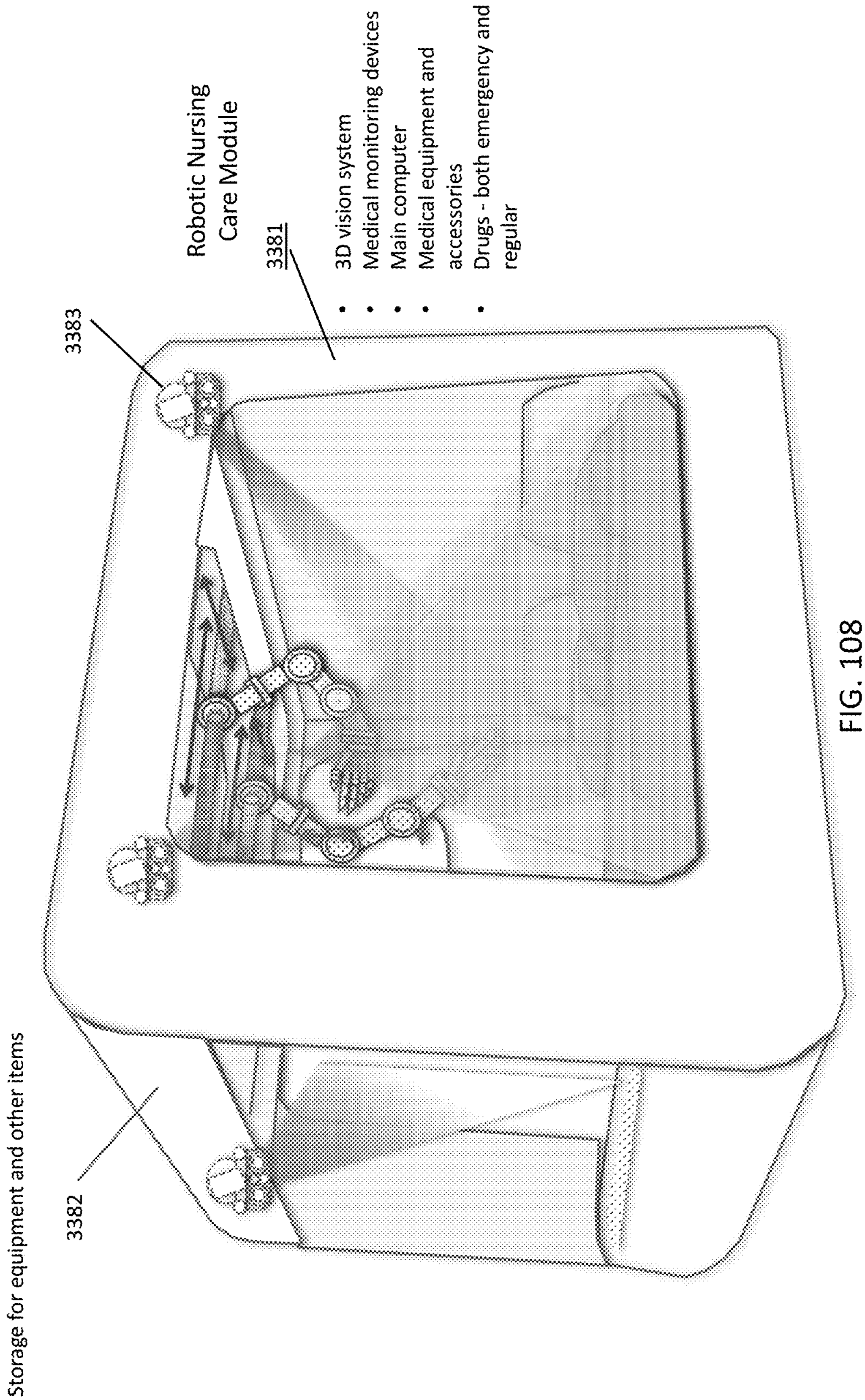

FIG. 108 is a block diagram illustrating a robotic nursing care module with a three-dimensional vision system in accordance with the present disclosure.

Figure 109:
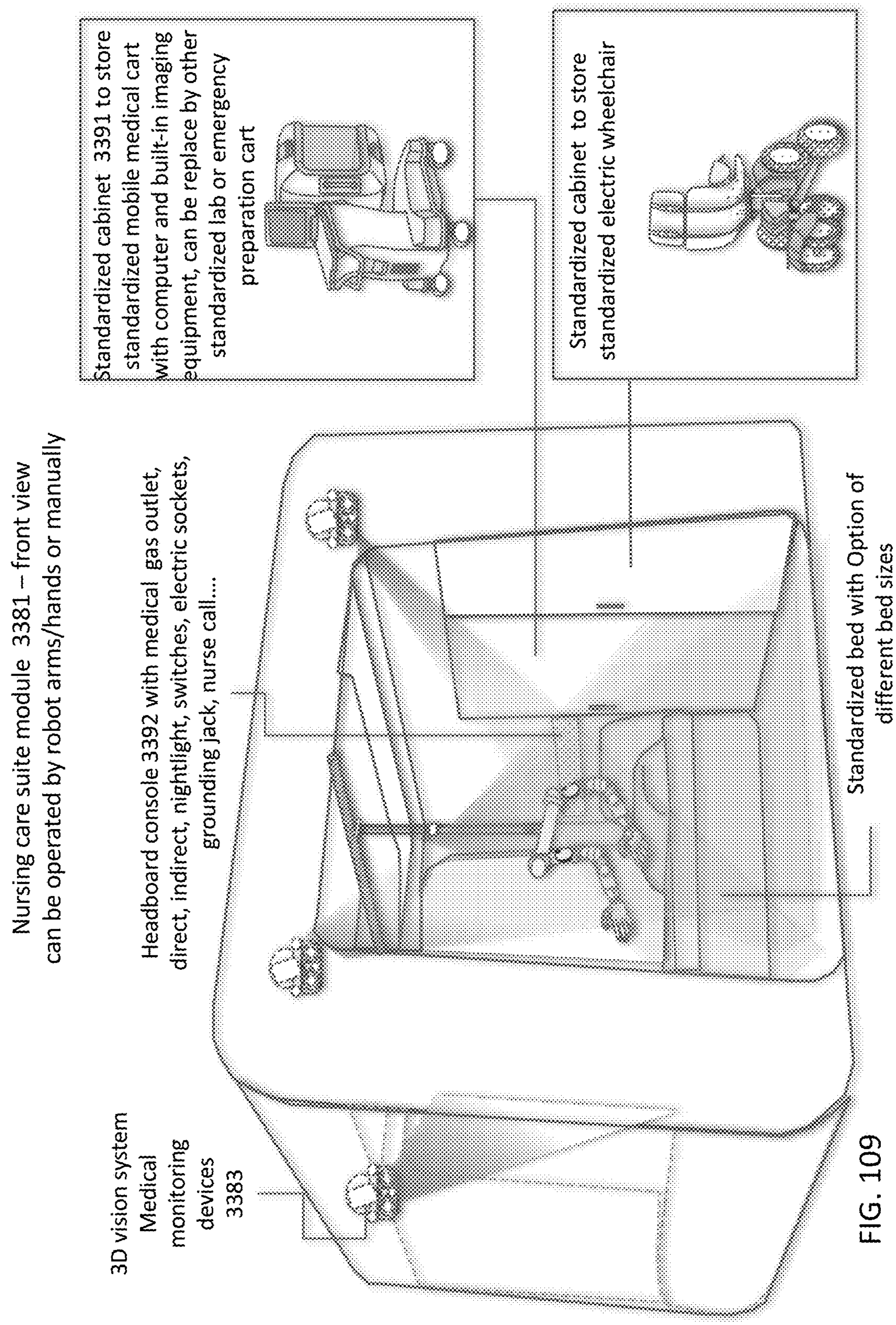

FIG. 109 is a block diagram illustrating a robotic nursing care module with standardized cabinets in accordance with the present disclosure.

Figure 110:
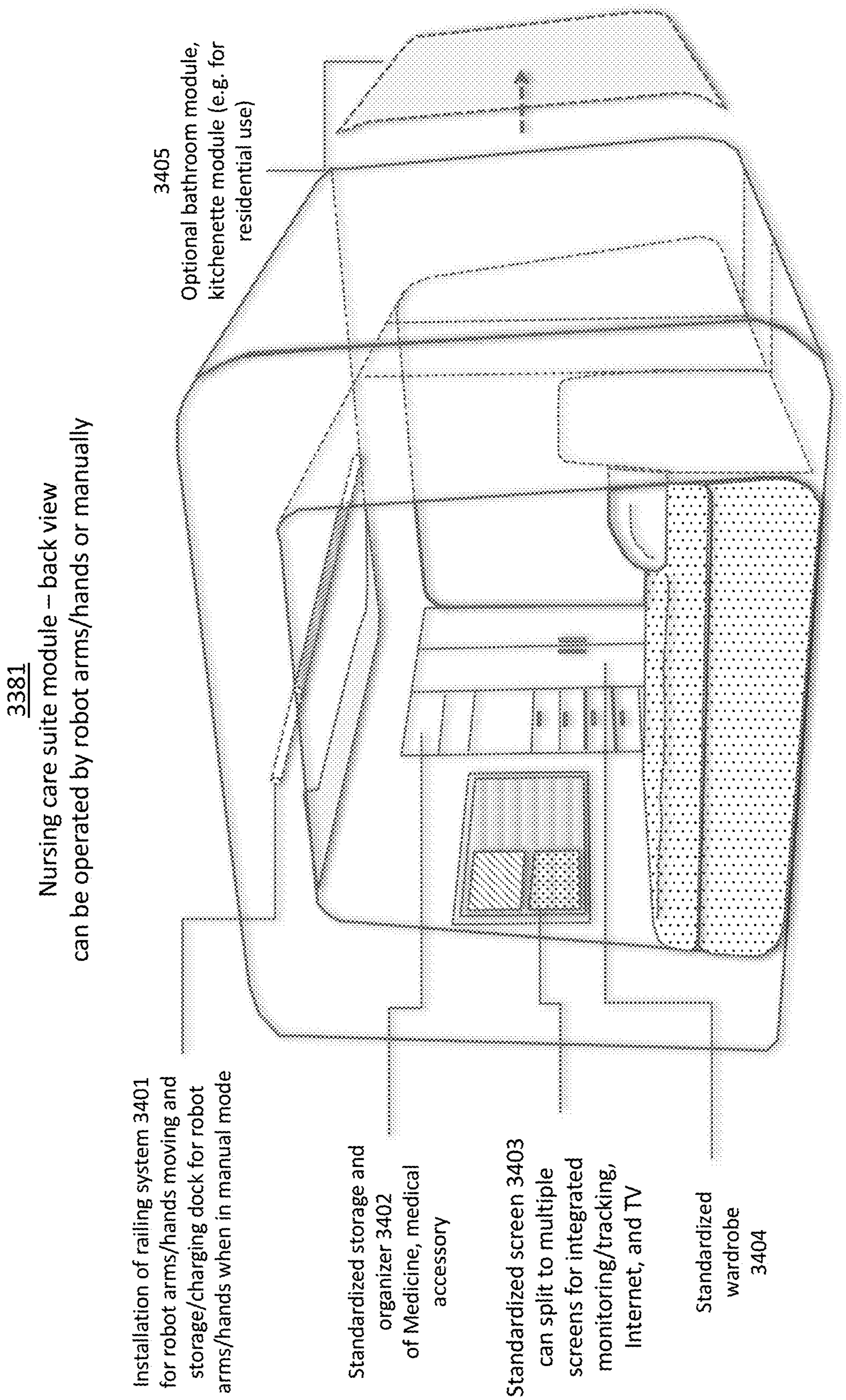

FIG. 110 is a block diagram illustrating a robotic nursing care module with one or more standardized storages, a standardized screen, and a standardized wardrobe in accordance with the present disclosure.

Figure 111:
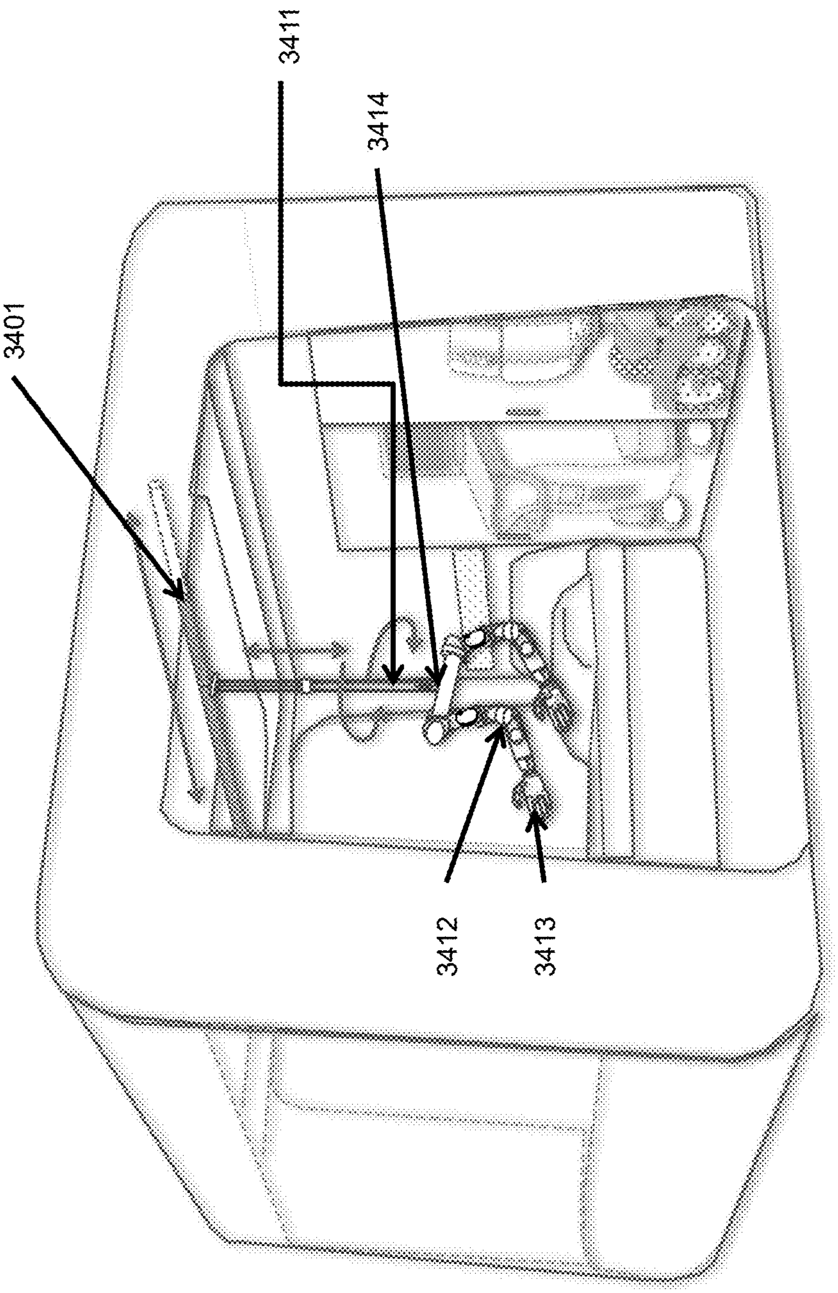

FIG. 111 is a block diagram illustrating a robotic nursing care module with a telescopic body with a pair of robotic arms and a pair of robotic hands in accordance with the present disclosure.

Figure 112:
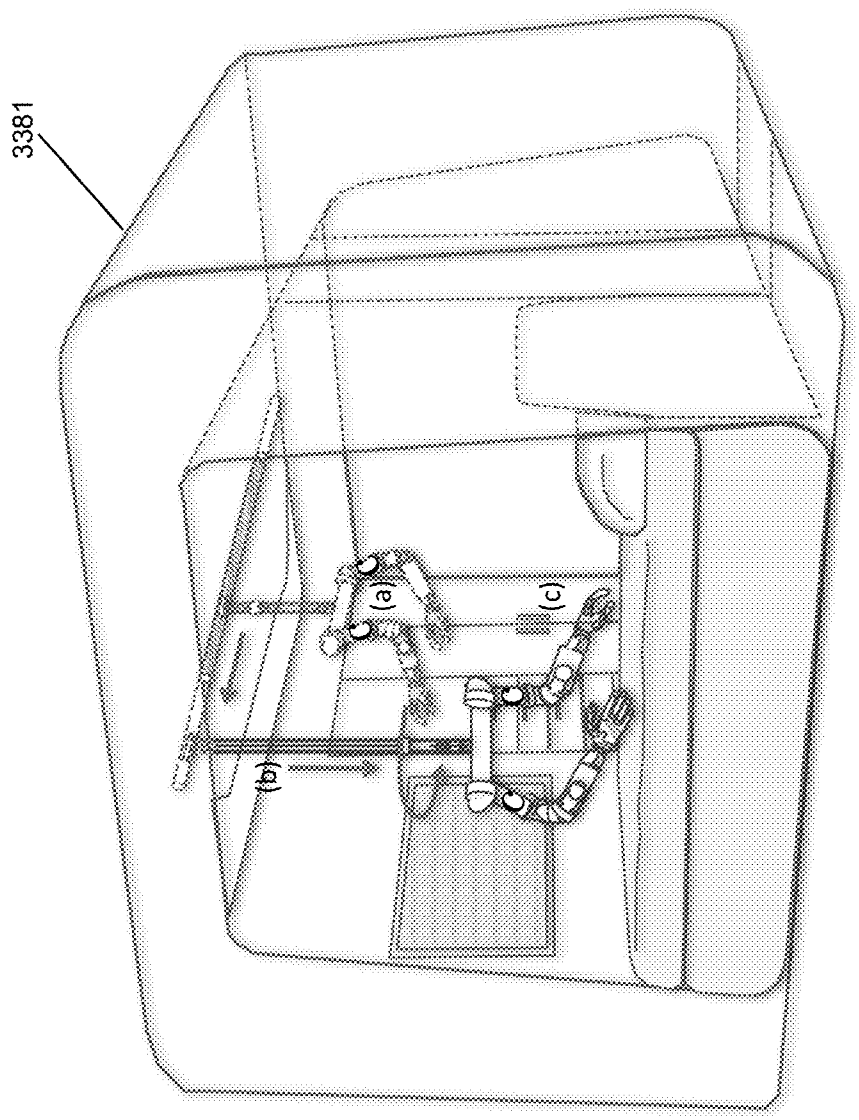

FIG. 112 is a block diagram illustrating a first example of executing a robotic nursing care module with various movements to aid an elderly person in accordance with the present disclosure.

Figure 113:
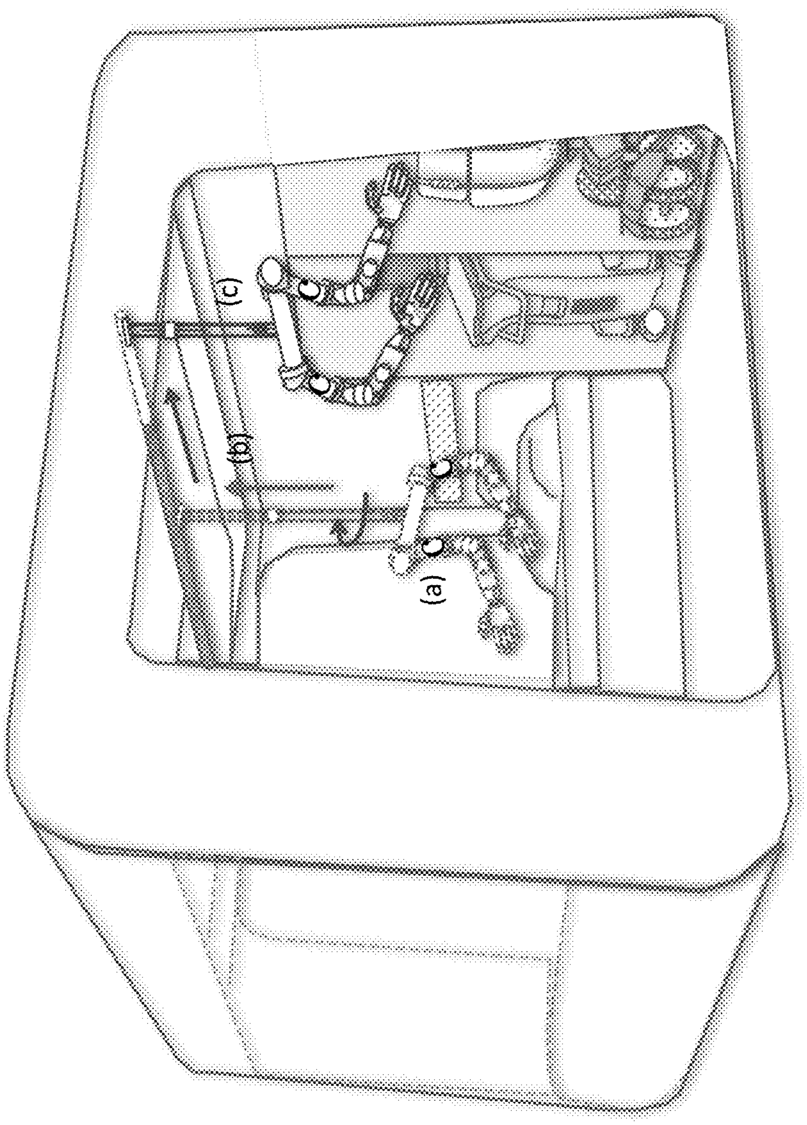

FIG. 113 is a block diagram illustrating a second example of executing a robotic nursing care module with loading and unloading a wheel chair in accordance with the present disclosure.

Figure 114:
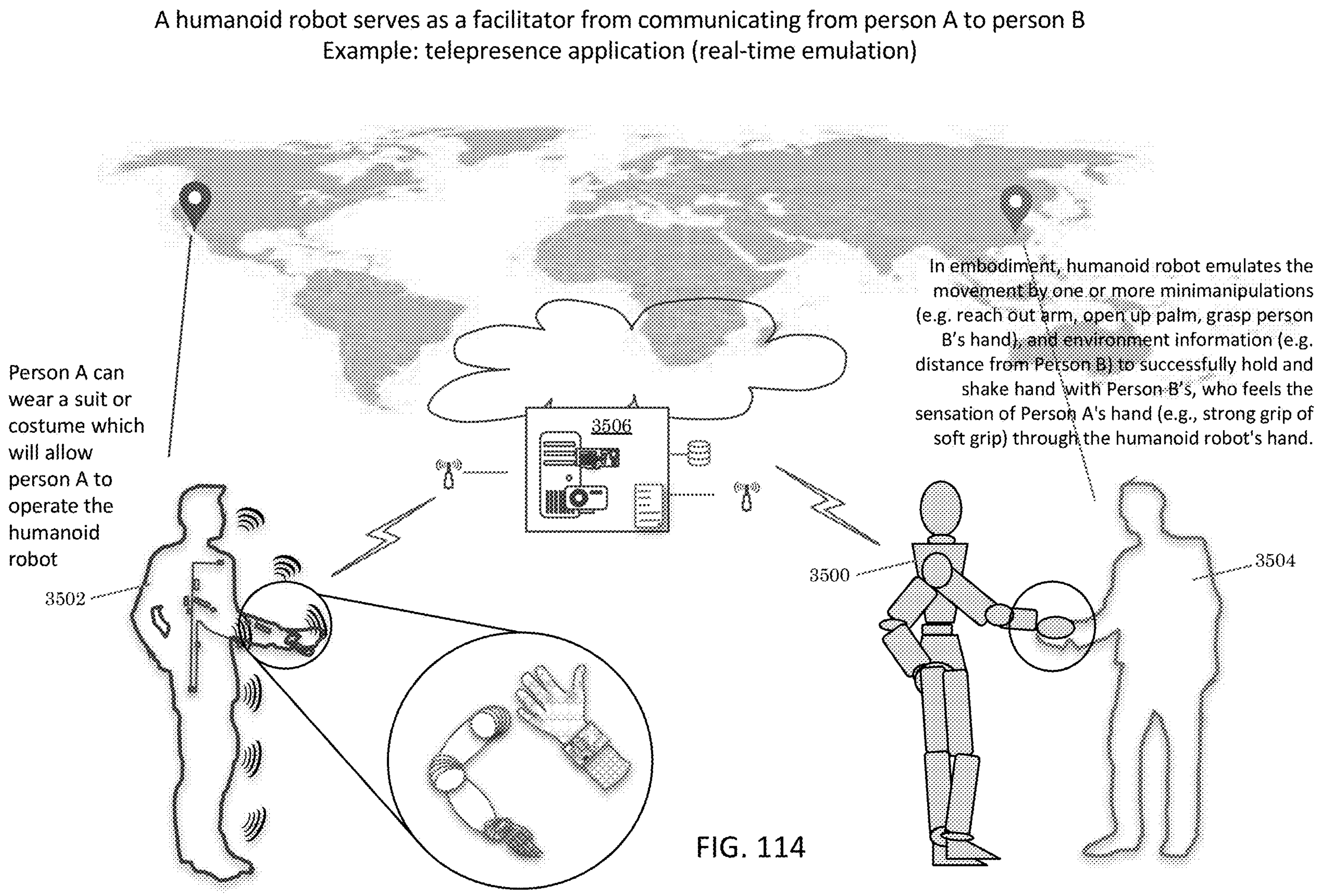

FIG. 114 is a pictorial diagram illustrating a humanoid robot acting as a facilitator between two human sources in accordance with the present disclosure.

Figure 115:
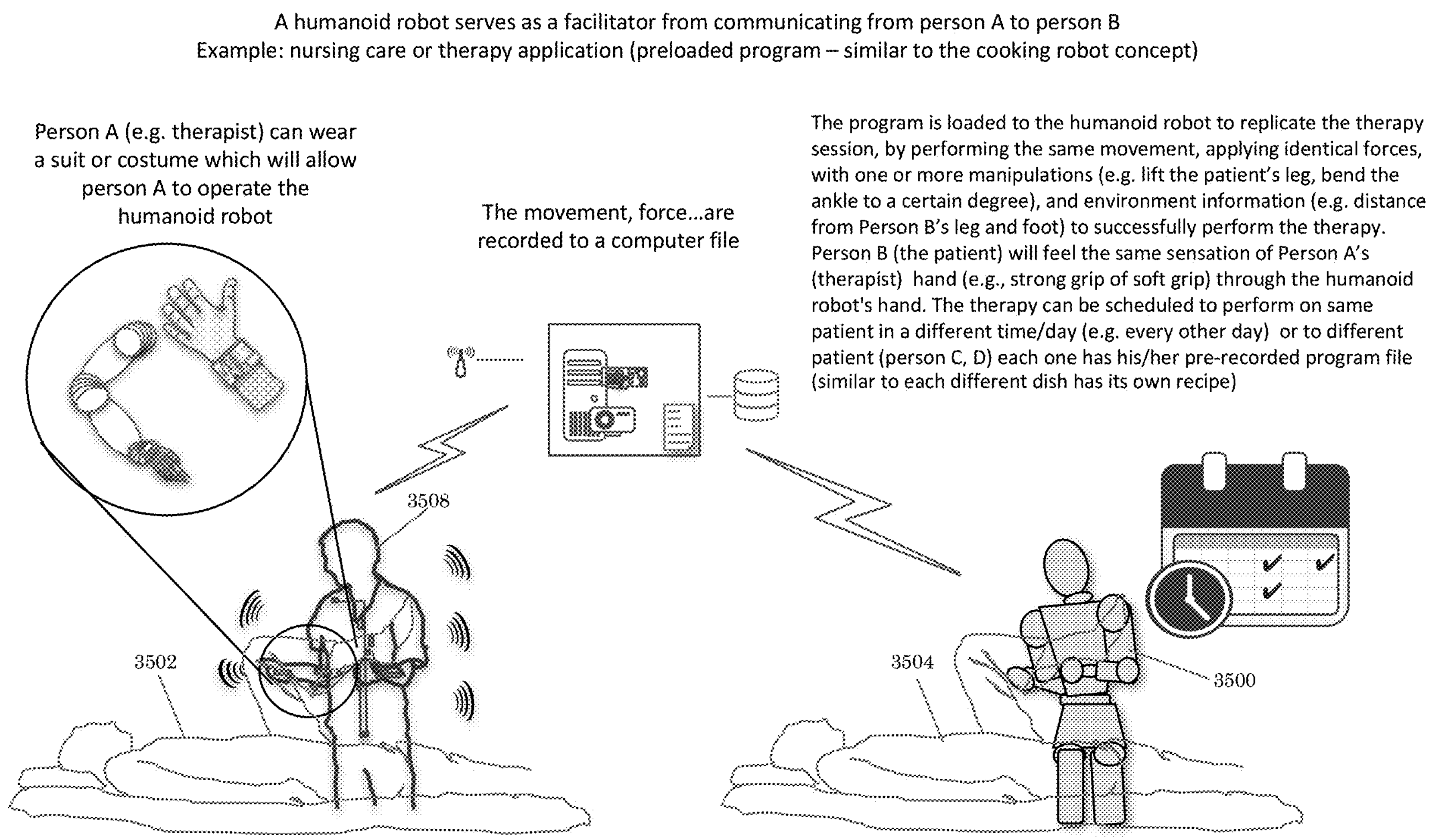

FIG. 115 is a pictorial diagram illustrating a humanoid robot serving as a therapist on person B while under the direct control of person A in accordance with the present disclosure.

Figure 116:
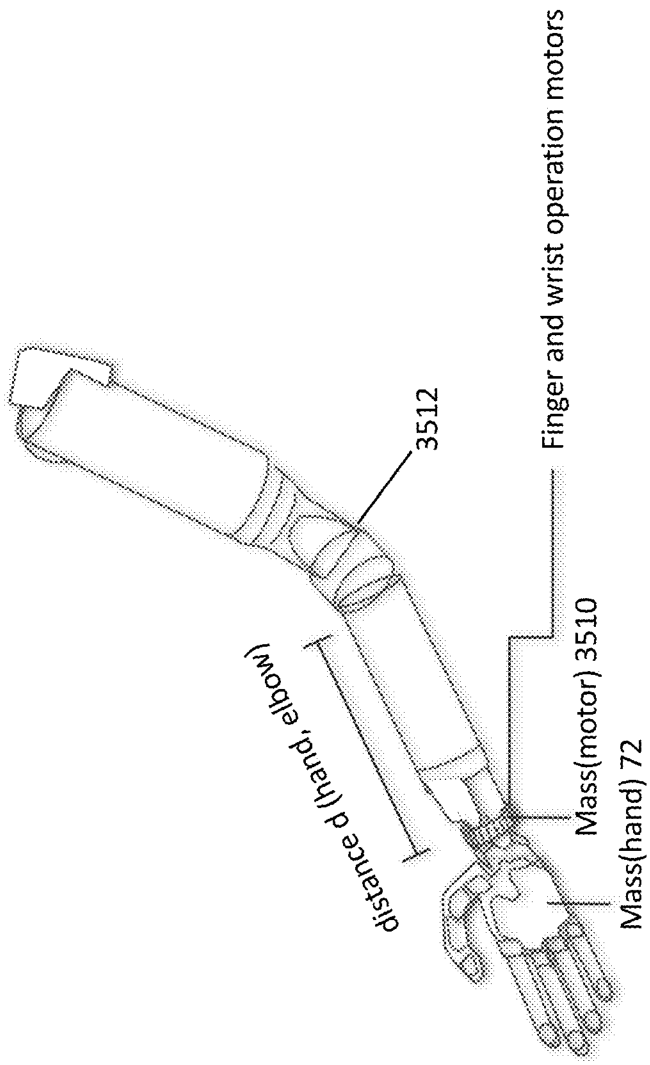

FIG. 116 is a block diagram illustrating the first embodiment in the placement of motors relative to the robotic hand and arm with full torque require moving the arm in accordance with the present disclosure.

Figure 117:
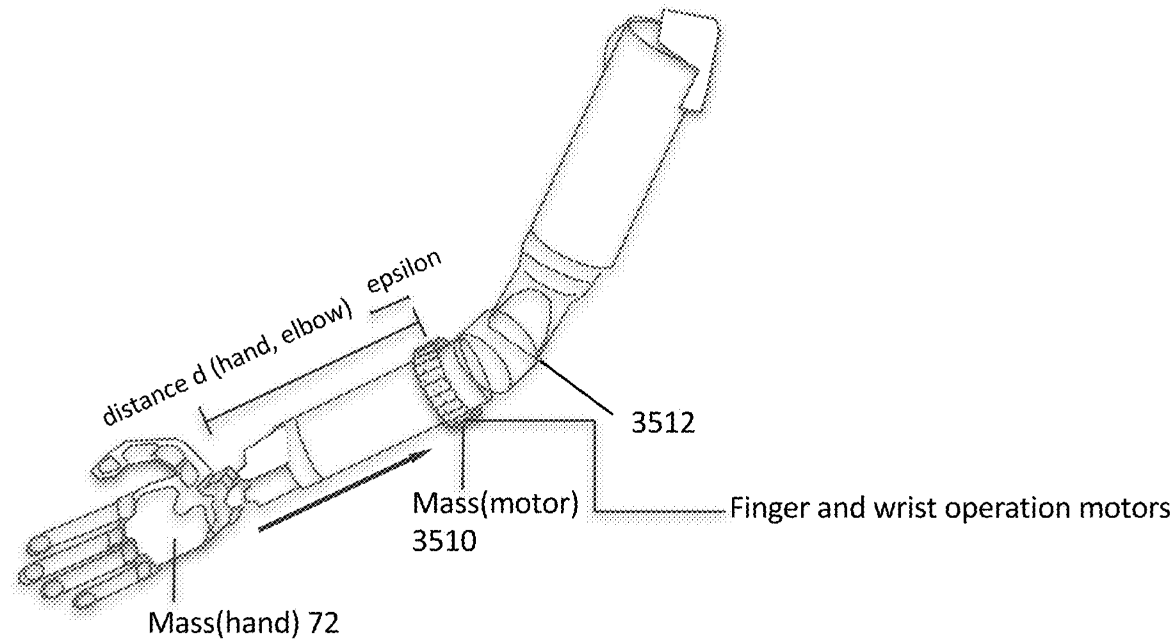

FIG. 117 is a block diagram illustrating the second embodiment in the placement of motors relative to the robotic hand and arm with a reduced torque require moving the arm in accordance with the present disclosure.

Figure 118A:
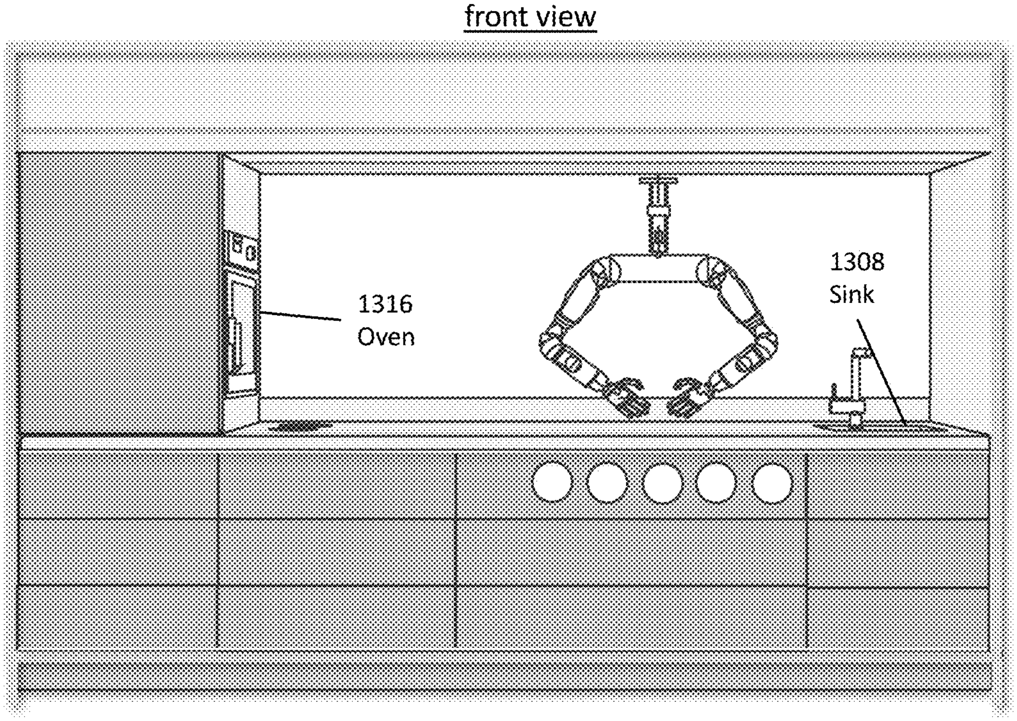
Figure 118B:
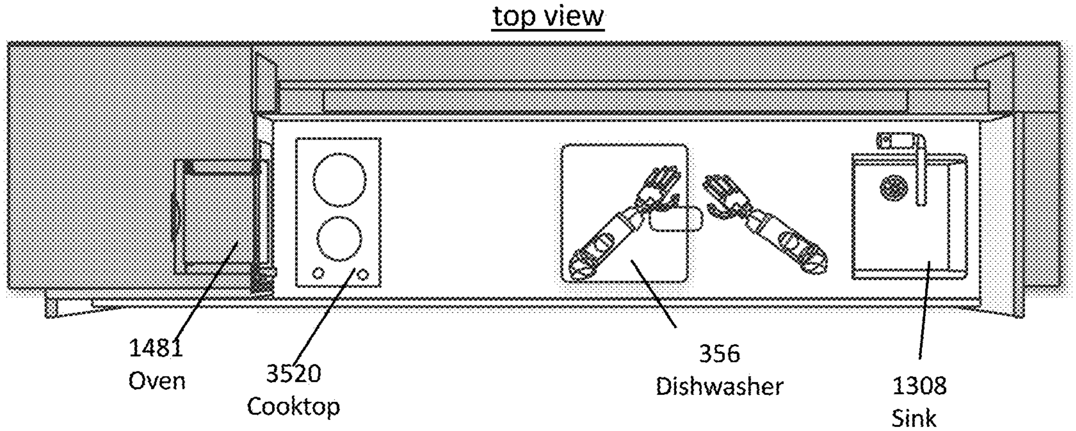

FIG. 118A is a pictorial diagram illustrating a front view of robotic arms extending from an overhead mount for use in a robotic kitchen with an oven in accordance with the present disclosure; and FIG. 118B is a pictorial diagram illustrating a top view of robotic arms extending from an overhead mount for use in a robotic kitchen with an oven in accordance with the present disclosure.

Figure 119A:
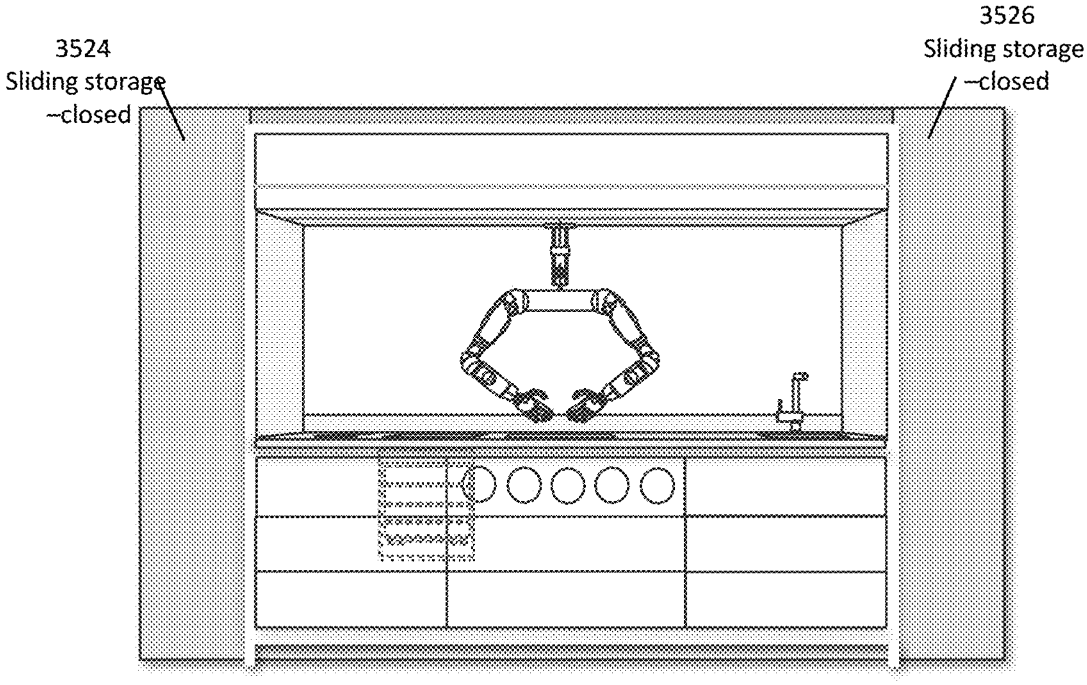
Figure 119B:
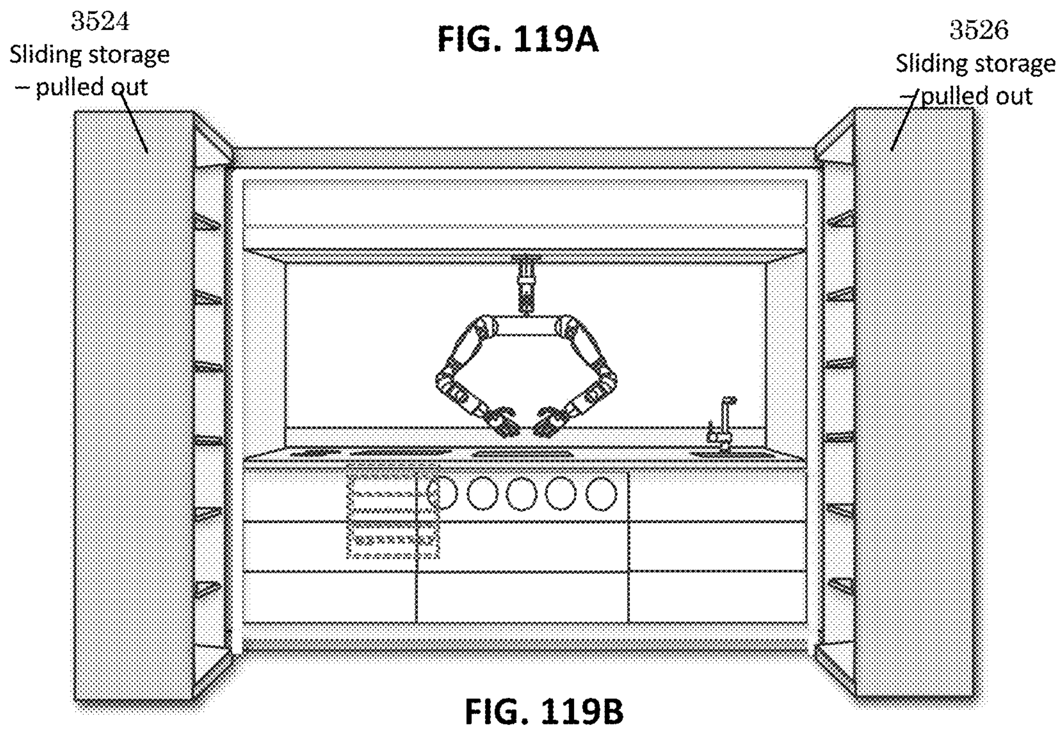

FIGS. 119A-B are pictorial diagrams illustrating two front views of robotic arms extending from an overhead mount for use in a robotic kitchen with sliding storages having shelves in accordance with the present disclosure.

FIGS. 120-129 are pictorial diagrams of the various embodiments of robotic gripping options in accordance with the present disclosure.

FIGS. 130A-H are pictorial diagrams illustrating a cookware handle suitable for the robotic hand to attach to various kitchen utensils and cookware in accordance with the present disclosure.

Figure 131:
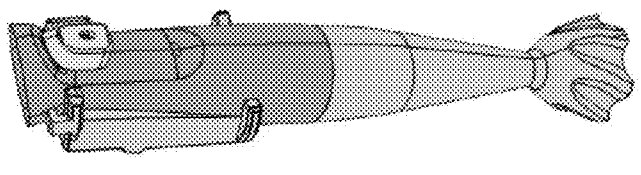

FIG. 131 is a pictorial diagram of a blender portion for use in the robotic kitchen in accordance with the present disclosure.

Figure 132:
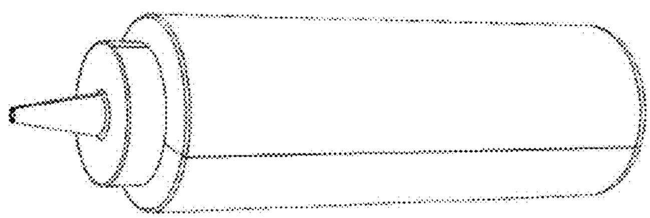

FIG. 132 are pictorial diagrams illustrating the various kitchen holders for use in the robotic kitchen in accordance with the present disclosure.

FIGS. 133A-C illustrate sample minimanipulations that a robot executes including a robot making sushi, a robot playing piano, a robot moving a robot by moving from a first position to a second position, a robot jumping from a first position to a second position, a humanoid taking a book from book shelf, a humanoid bringing a bag from a first position to a second position, a robot opening a jar, and a robot putting food in a bowl for a cat to consume in accordance with the present disclosure.

FIGS. 134A-I illustrate sample multi-level minimanipulations for a robot to perform including measurement, lavage, supplemental oxygen, maintenance of body temperature, catheterization, physiotherapy, hygienic procedures, feeding, sampling for analyses, care of stoma and catheters, care of a wound, and methods of administering drugs in accordance with the present disclosure.

FIG. 135 illustrates sample multi-level minimanipulations for a robot to perform intubation, resuscitation/cardiopulmonary resuscitation, replenishment of blood loss, hemostasis, emergency manipulation on trachea, fracture of bone, and wound closure in accordance with the present disclosure.

FIG. 136 illustrates a list of sample medical equipment and medical device list in accordance with the present disclosure.

FIGS. 137A-B illustrate a sample nursery service with minimanipulations in accordance with the present disclosure FIG. 138 illustrates another equipment list in accordance with the present disclosure.

Figure 139:
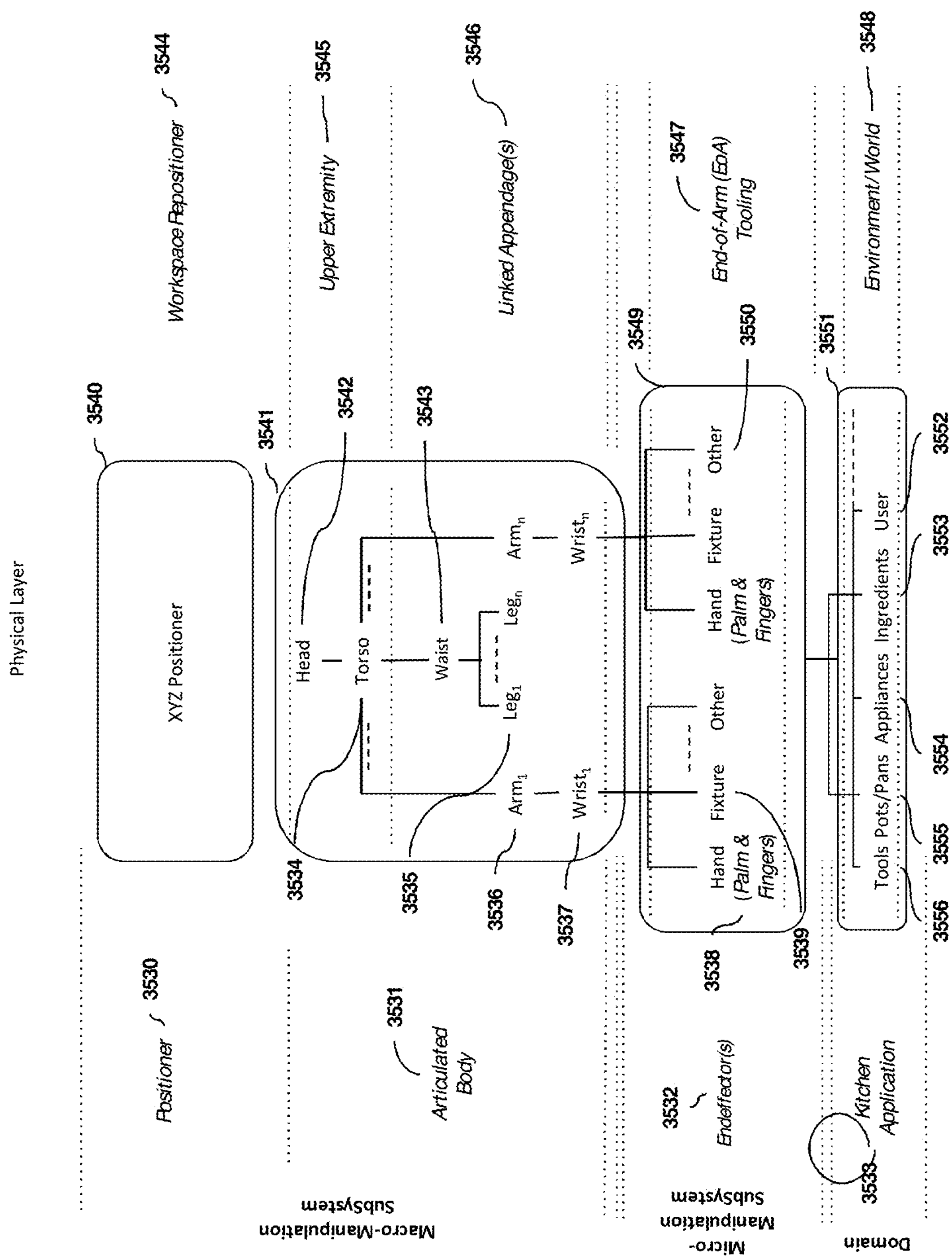

FIG. 139 depicts a block diagram illustrating one embodiment of the physical layer structured as a macro-manipulation/micro-manipulation in accordance with the present disclosure.

Figure 140:
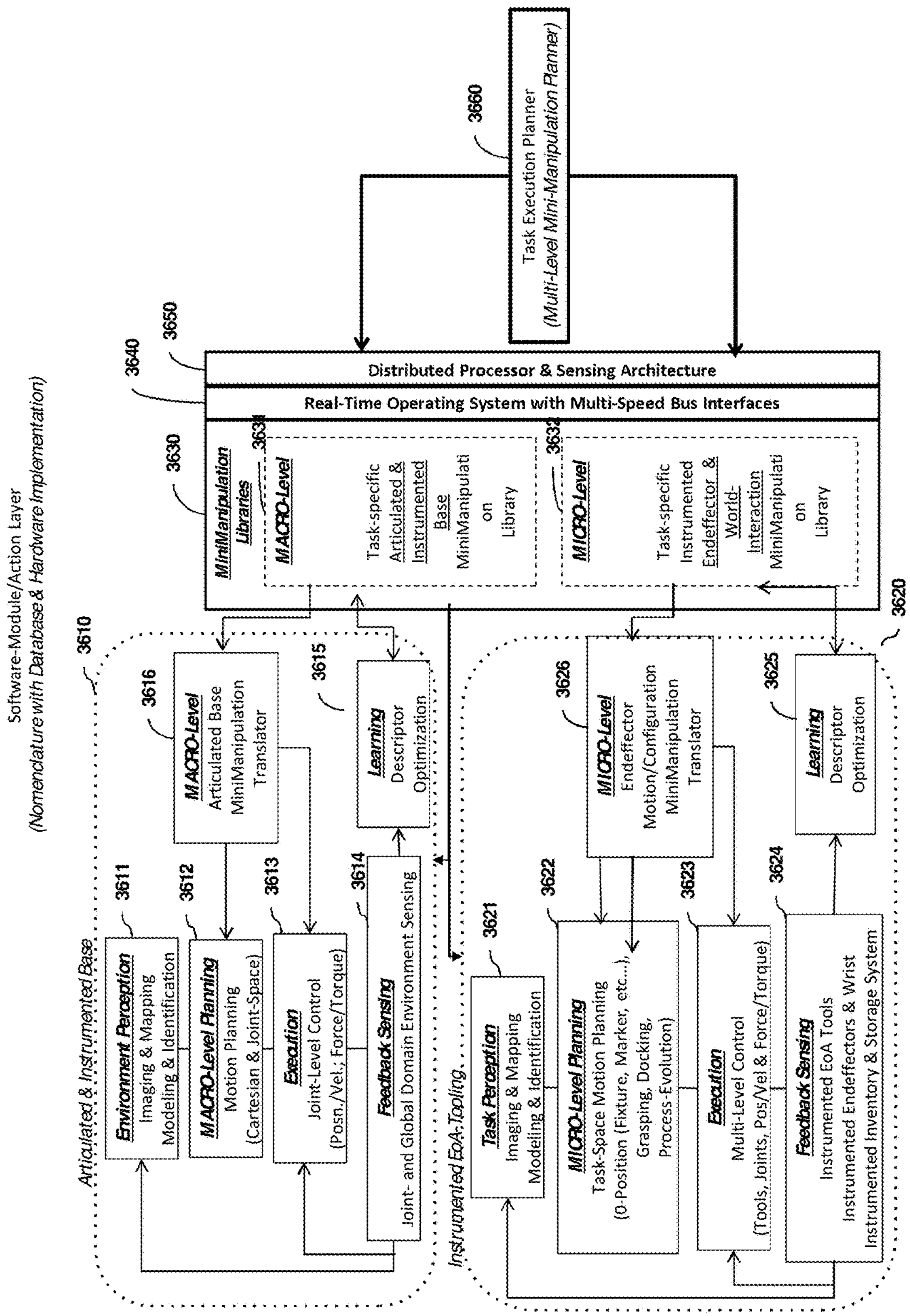

FIG. 140 depicts a logical diagram of main action blocks in the software-module/action layer within the macro-manipulation and micro-manipulation subsystems and the associated mini-manipulation libraries dedicated to each in accordance with the present disclosure.

Figure 141:
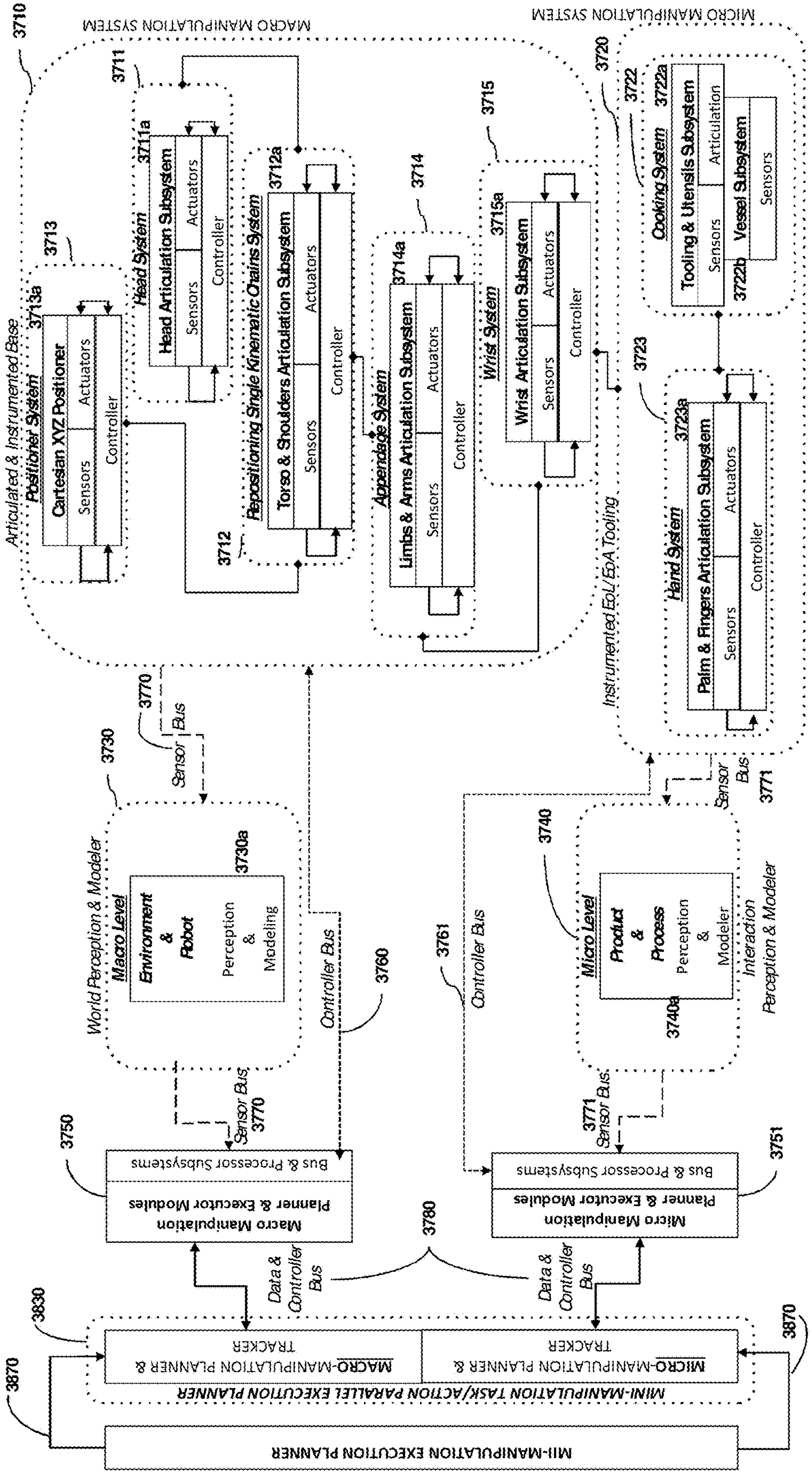

FIG. 141 depicts a block diagram illustrating the macro-manipulation and micro-manipulation physical subsystems and their associated sensors, actuators and controllers with their interconnections to their respective high-level and subsystem planners and controllers as well as world and interaction perception and modelling systems in accordance with the present disclosure.

Figure 142:
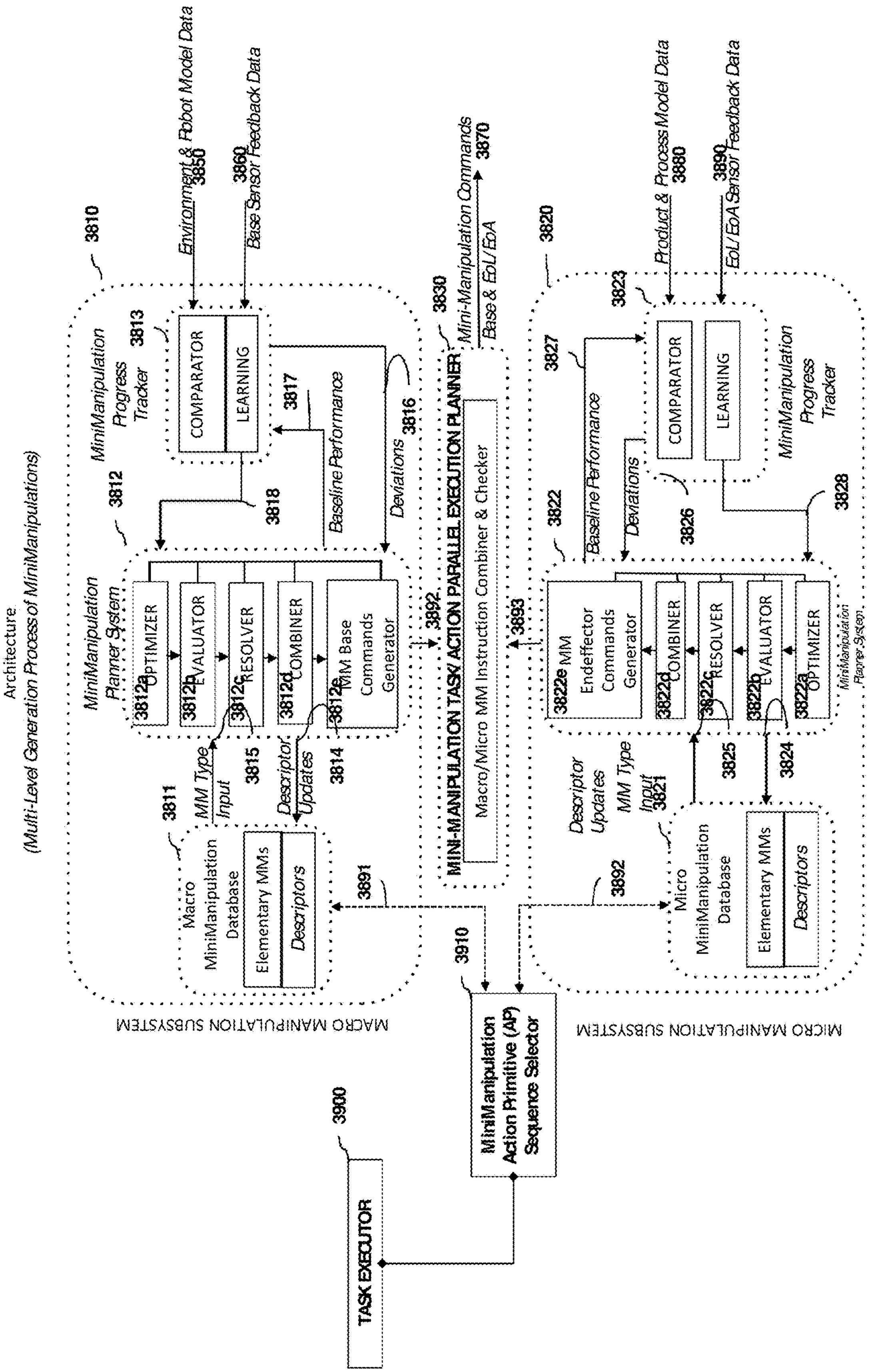

FIG. 142 depicts a block diagram illustrating one embodiment of an architecture for multi-level generation process of minimanipulations and commends based on perception and model data, sensor feedback data as well as mini-manipulation commands based on action-primitive components, combined and checked prior to being furnished to the mini-manipulation task execution planner responsible for the macro- and micro manipulation subsystems in accordance with the present disclosure.

Figure 143:
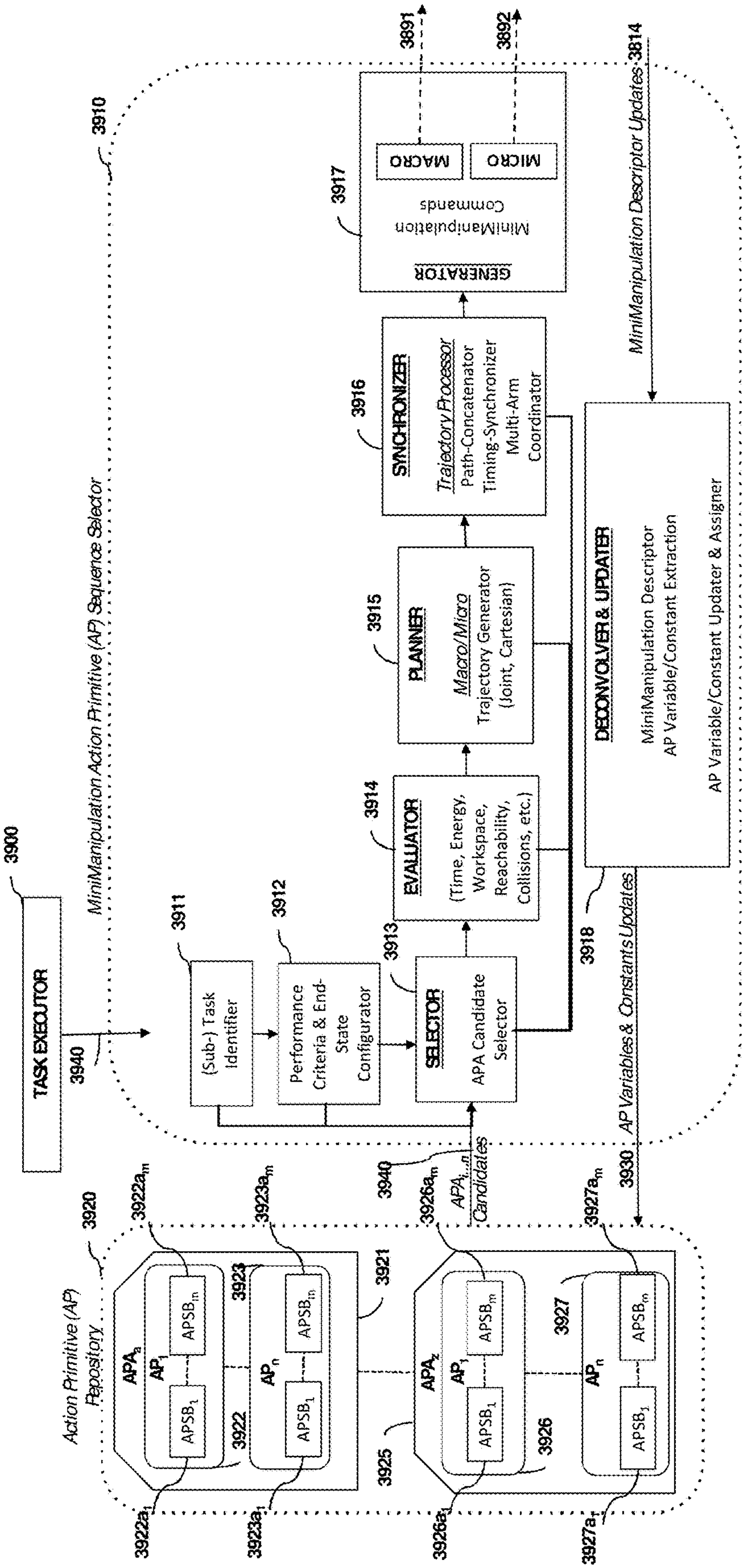

FIG. 143 depicts the process by which mini-manipulation command-stack sequences are generated for any robotic system, in this case deconstructed to generate two such command sequences for a single robotic system that has been physically and logically split into a macro- and micro-manipulation subsystem in accordance with the present disclosure.

Figure 144:
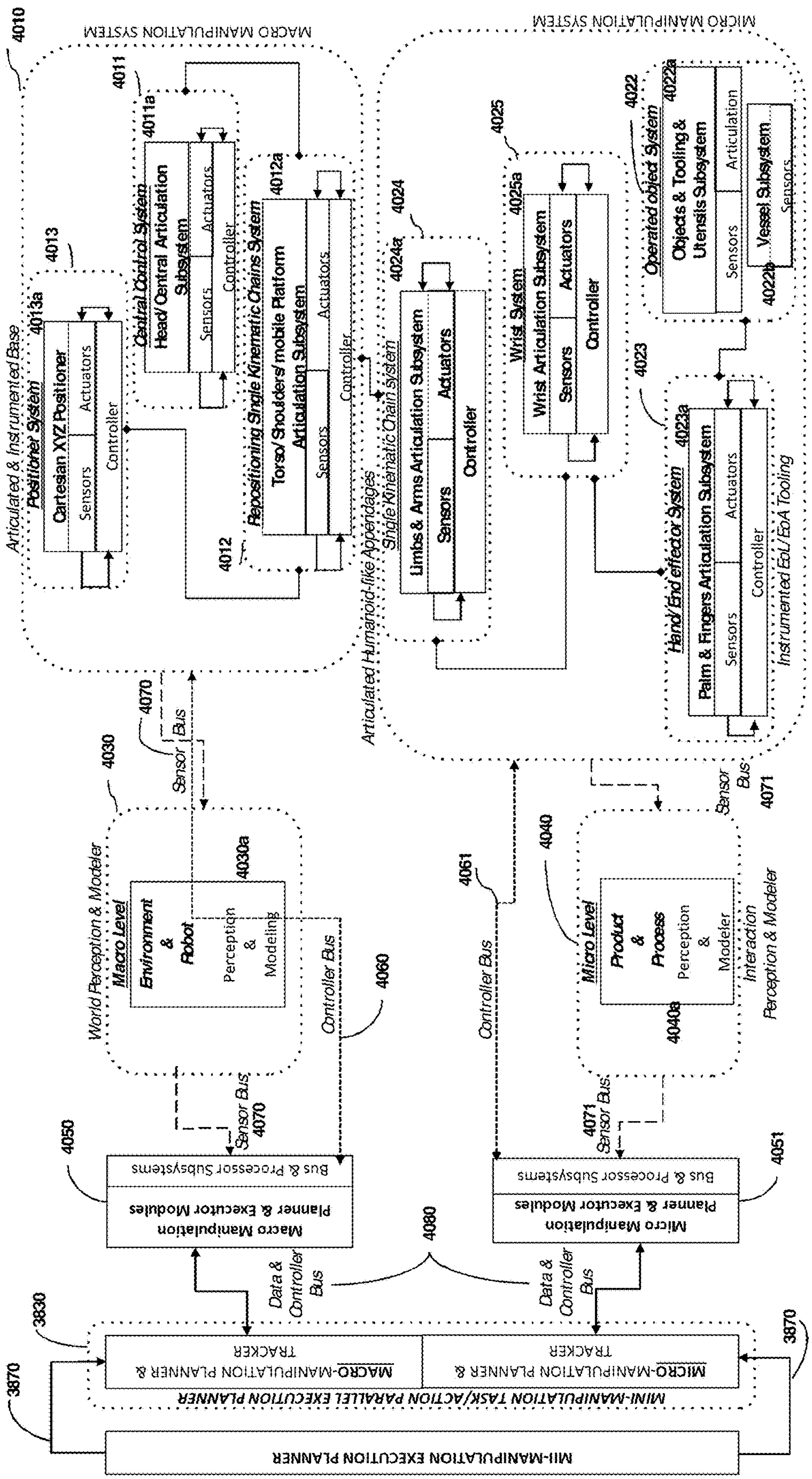

FIG. 144 depicts a block diagram illustrating another embodiment of the physical layer structured as a macro-manipulation/micro-manipulation in accordance with the present disclosure.

Figure 145:
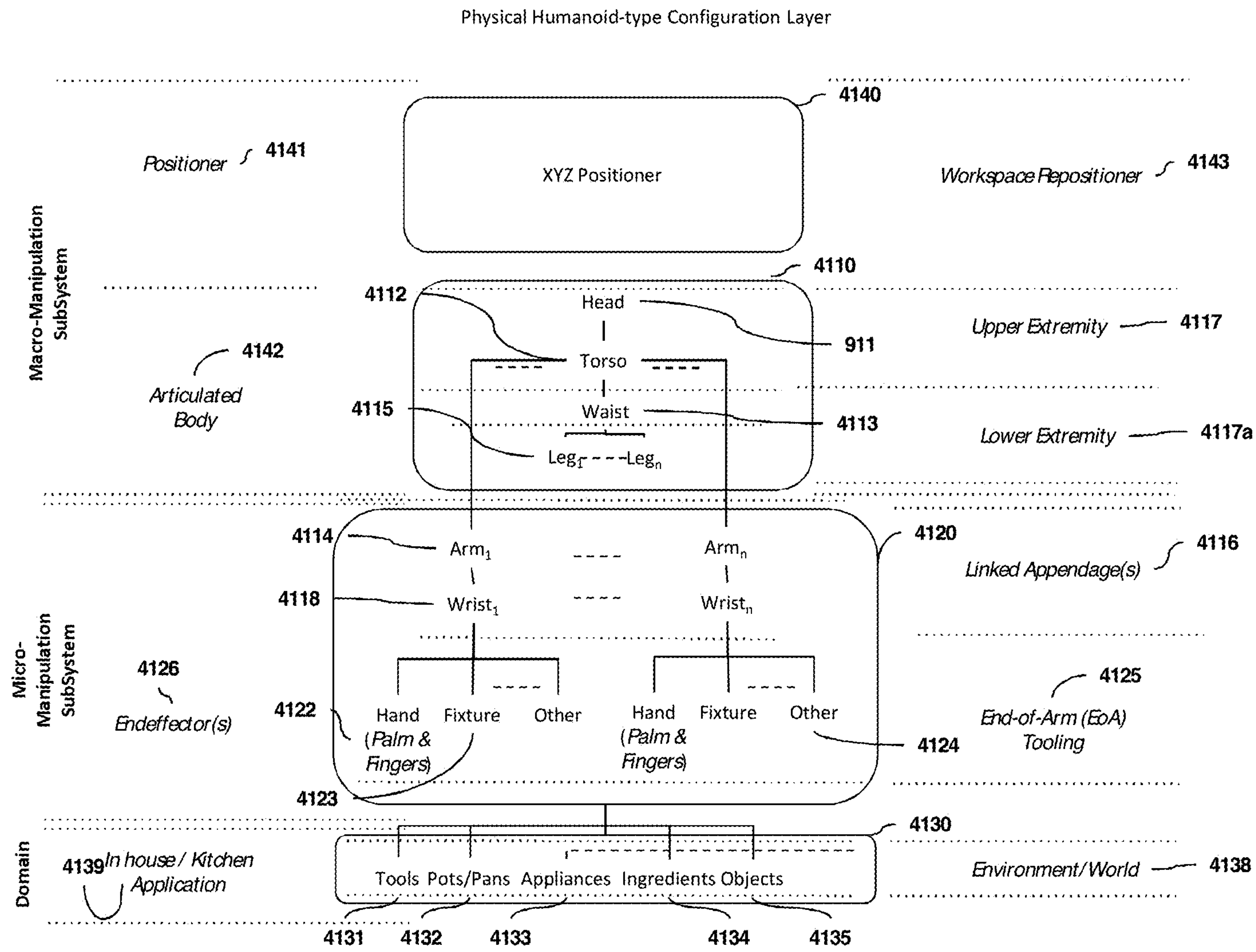

FIG. 145 depicts a block diagram illustrating another embodiment of an architecture for multi-level generation process of minimanipulations and commends based on perception and model data, sensor feedback data as well as mini-manipulation commands based on action-primitive components, combined and checked prior to being furnished to the mini-manipulation task execution planner responsible for the macro- and micro manipulation subsystems in accordance with the present disclosure.

Figure 146:
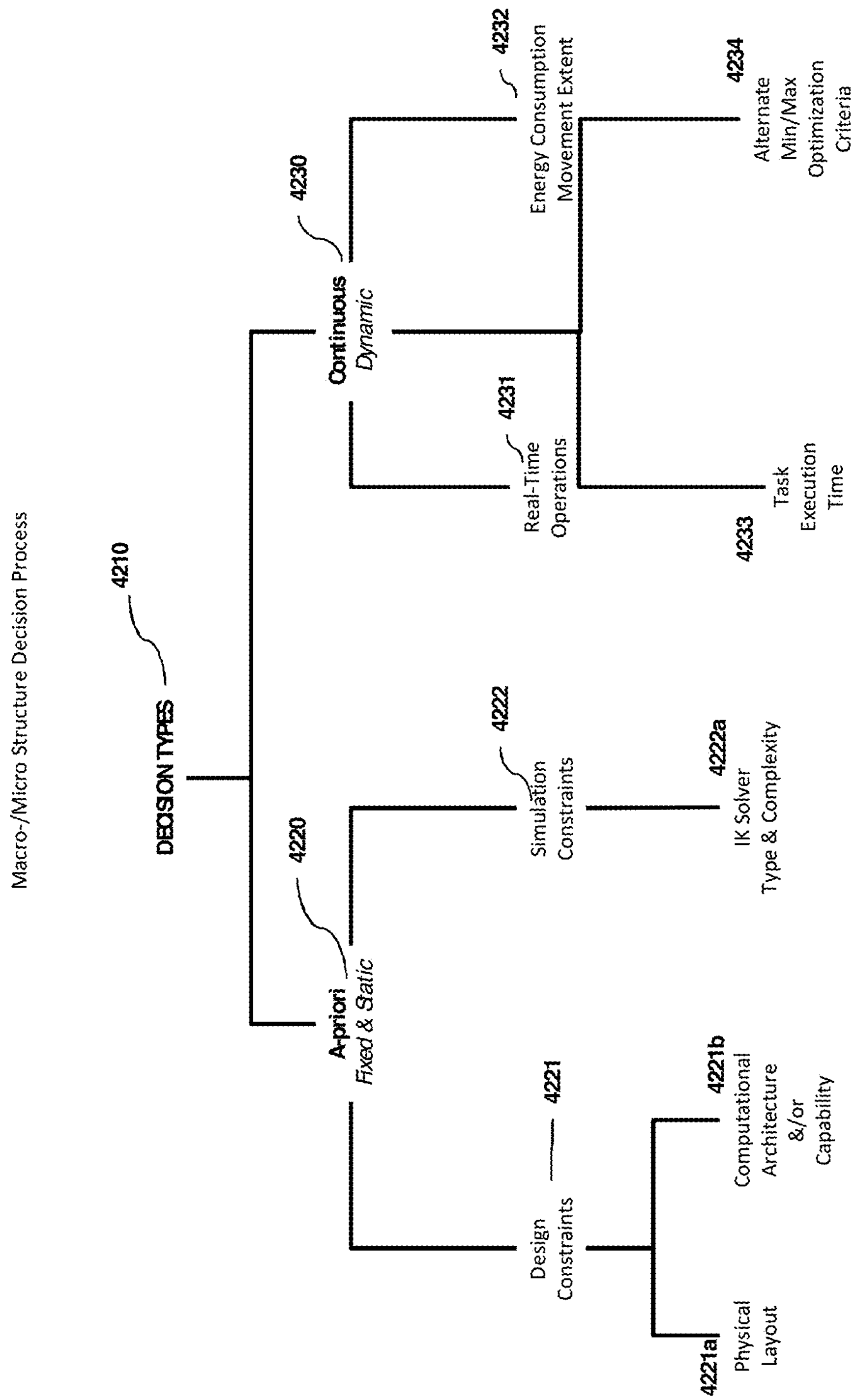

FIG. 146 depicts one embodiment of a decision structure for deciding on a macro/micro logical and physical breakdown of a system for high fidelity control in accordance with the present disclosure.

Figure 147:
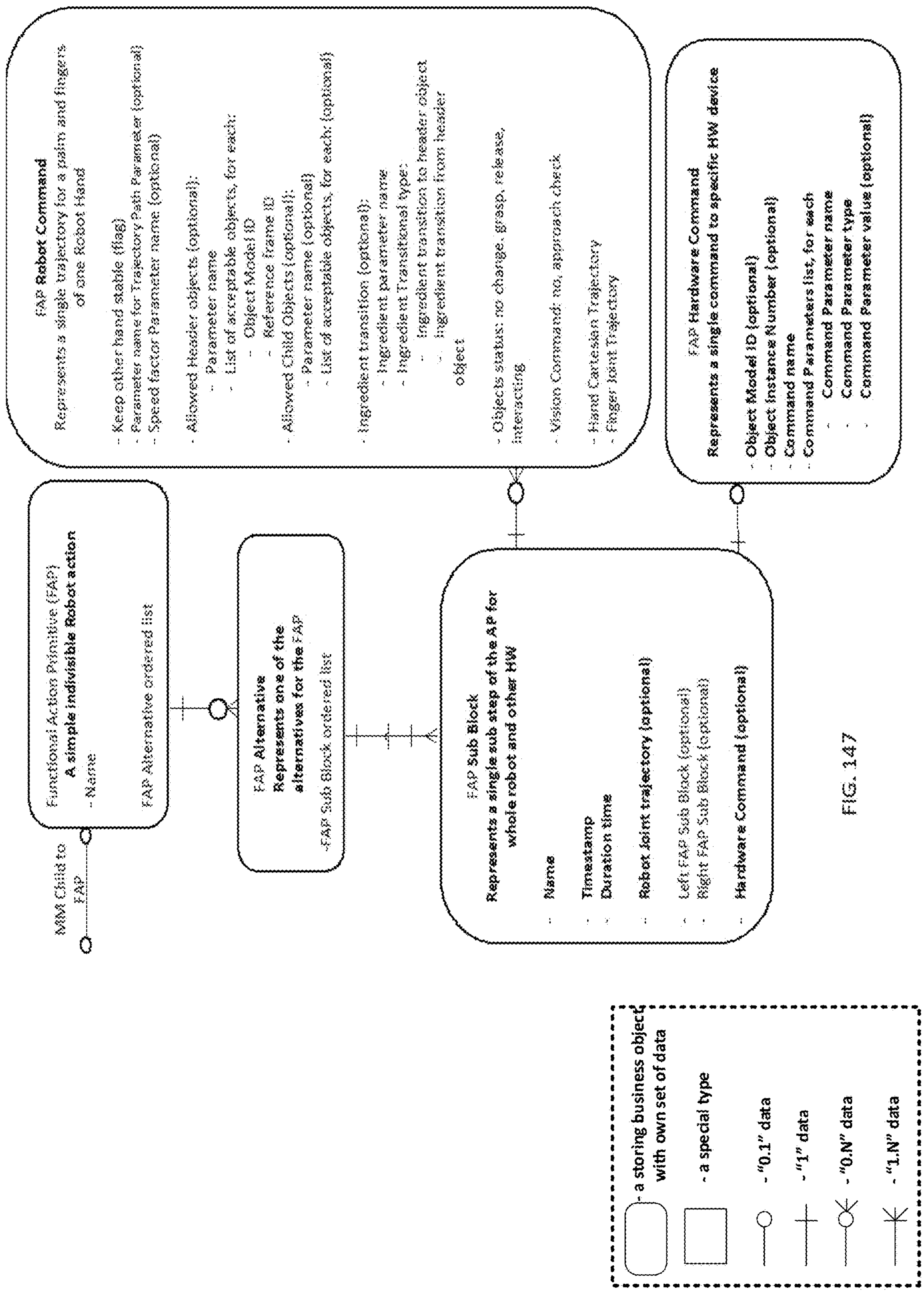

FIG. 147 illustrates an AP data, according to an exemplary environment.

FIG. 148 illustrates a table comprising exemplary micromanipulations, according to an exemplary environment.

Figure 149:
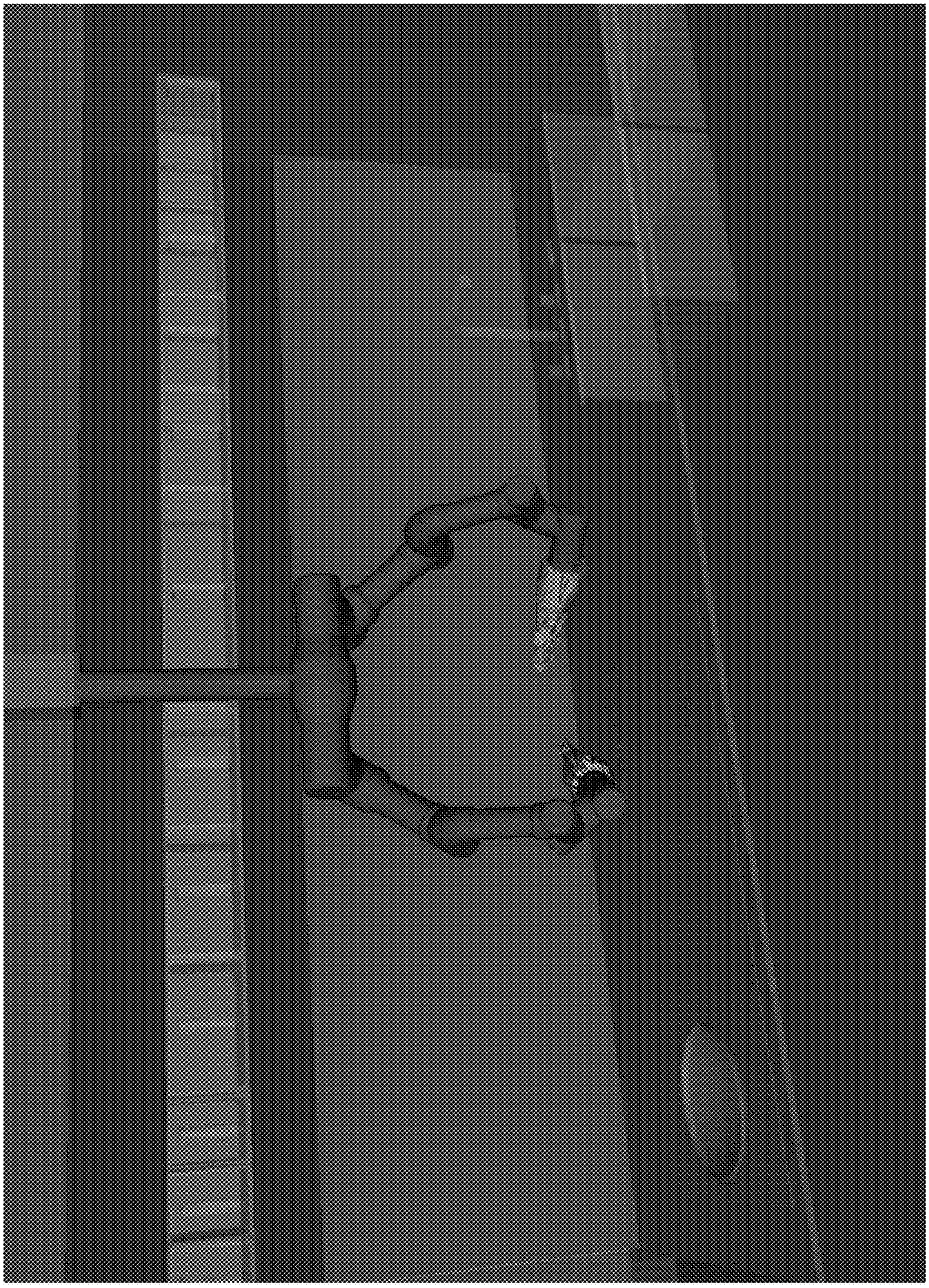

FIG. 149 illustrates a humanoid robot, according to an exemplary environment.

Figure 150:
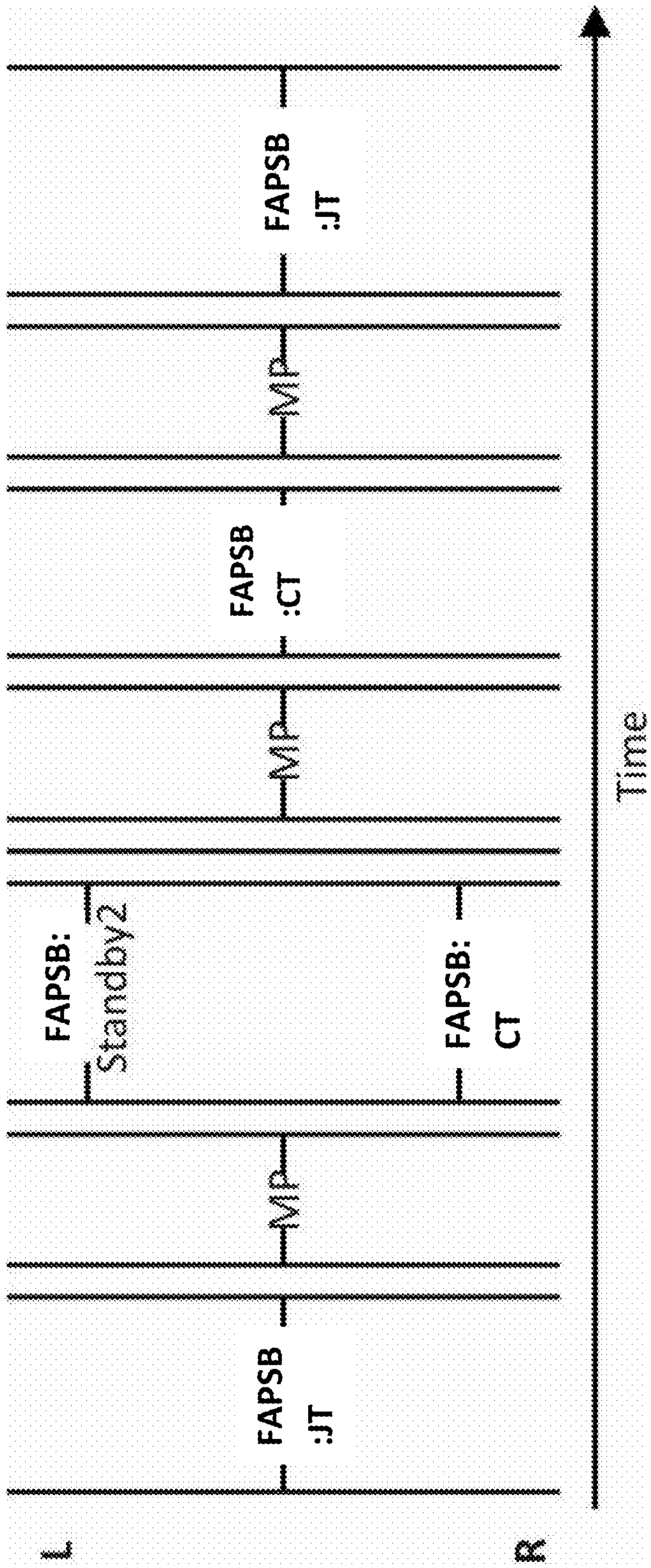

FIG. 150 illustrates an exemplary AP comprising multiple APSBs, according to an exemplary environment.

Figure 151:
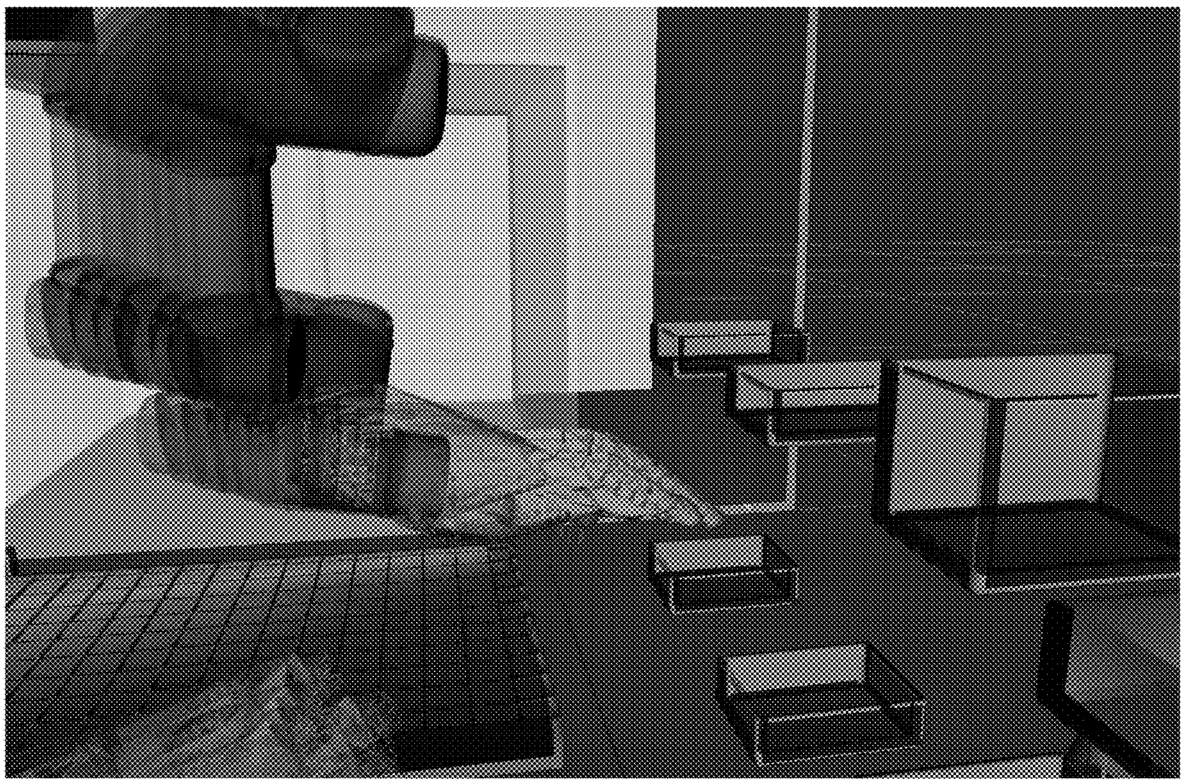

FIG. 151 illustrates a trajectory trail for a robotic assistant system, according to an exemplary environment.

Figure 152:
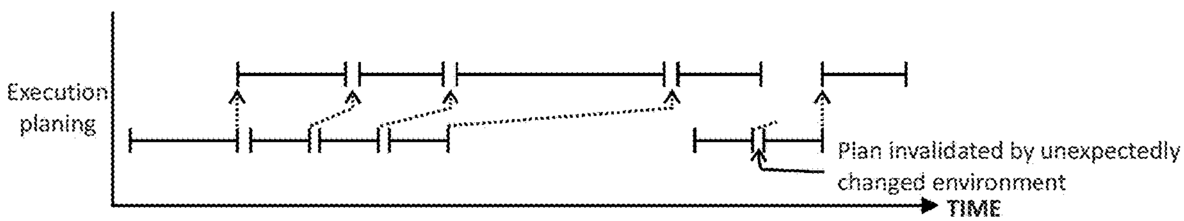

FIG. 152 illustrates a timing diagram, according to an exemplary environment.

Figure 153:
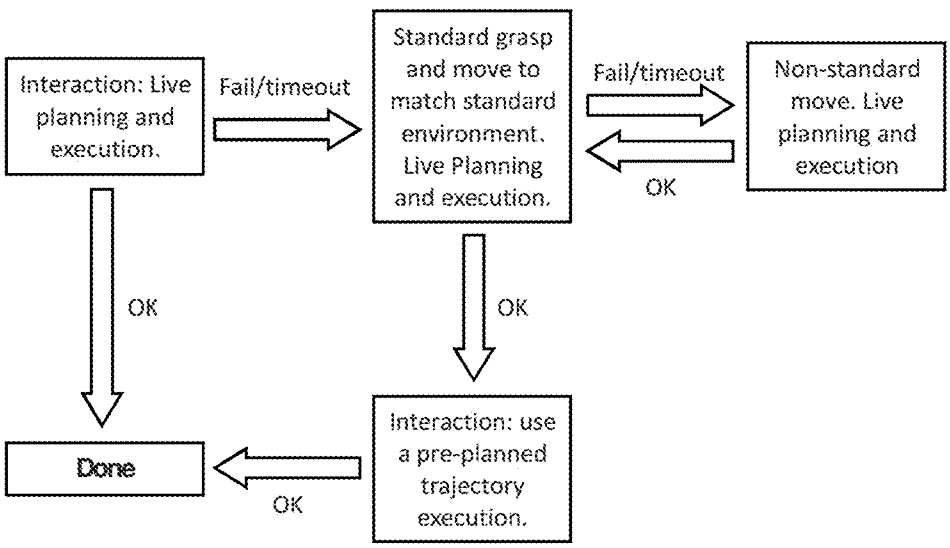

FIG. 153 illustrates object interactions in an unstructured environment, according to an exemplary environment.

Figure 154:
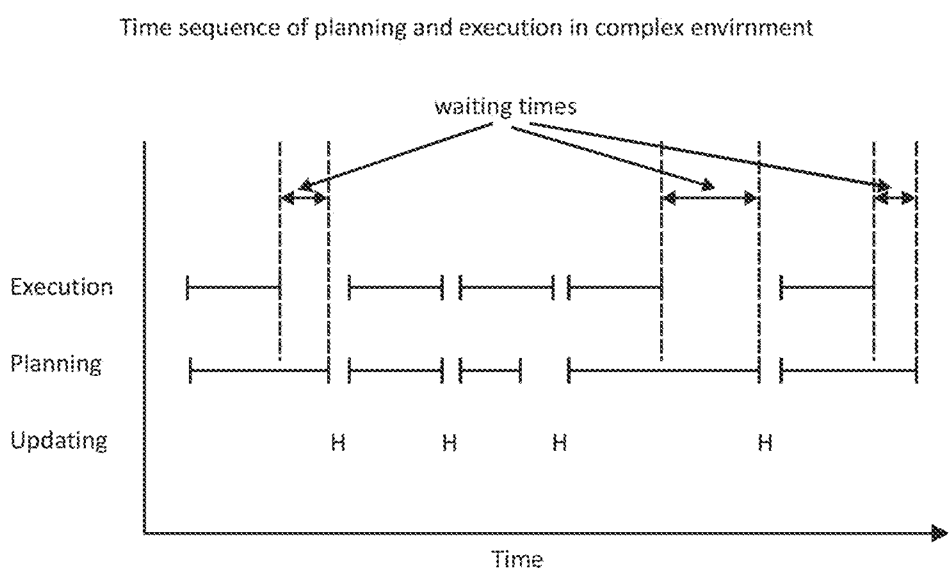

FIG. 154 illustrates shows a time sequence of planning and execution in a complex environment, according to an exemplary environment.

Figure 155:
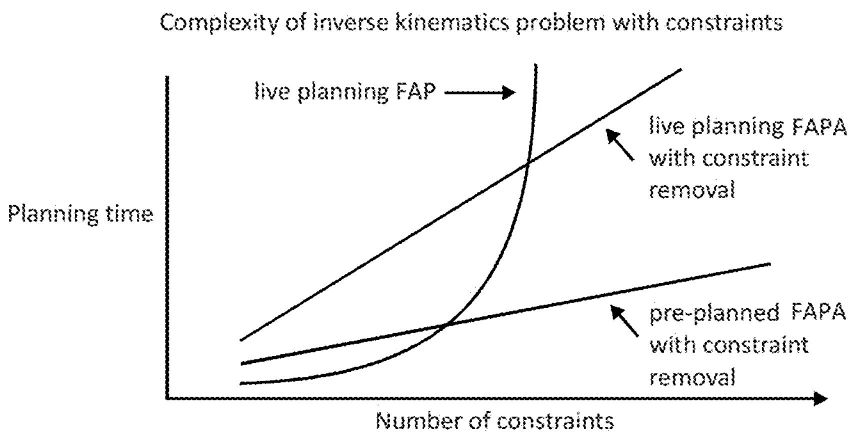

FIG. 155 illustrates a graph for indicating linear dependency of the total waiting time on the number of constraints, according to an exemplary environment.

Figure 156:
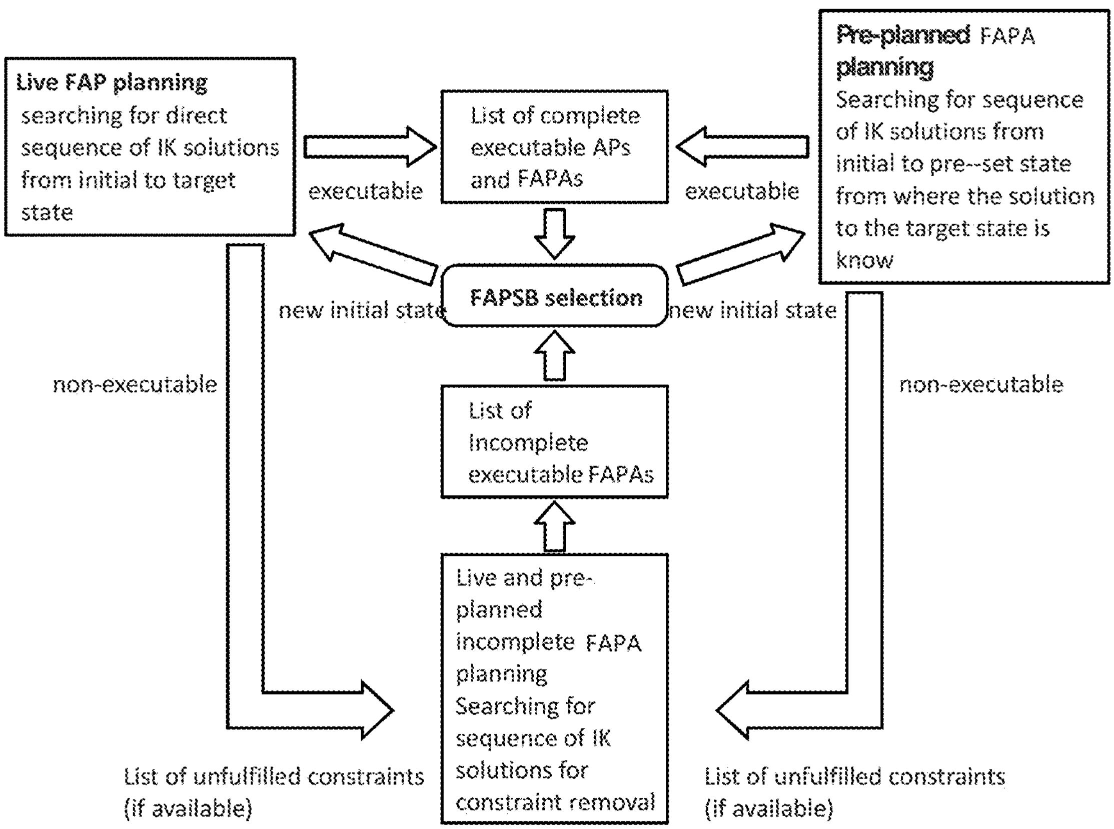

FIG. 156 illustrates information flow and generation of incomplete APAs, according to an exemplary environment.

Figure 157:
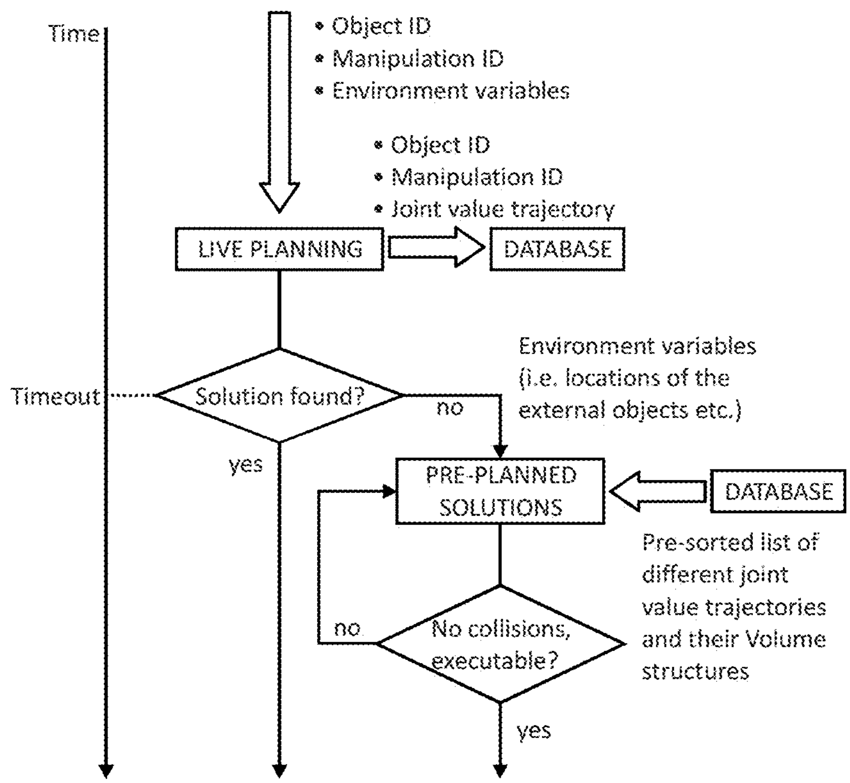

FIG. 157 is a block diagram illustrating write-in and read-out scheme for a database of pre-planned solutions.

Figure 158A:
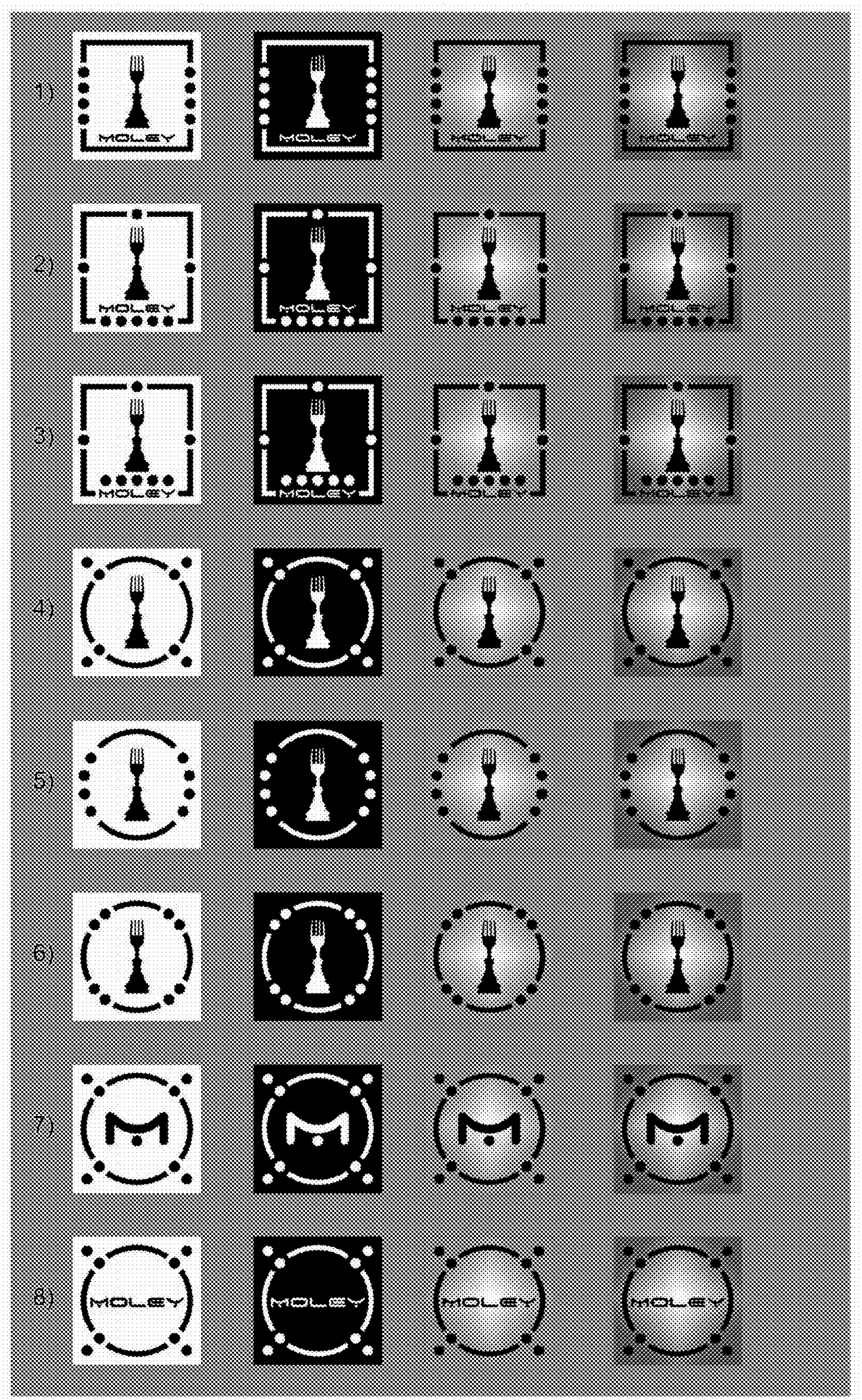

FIG. 158A is a pictorial diagram illustrating examples of markers; and FIG. 158B illustrates some sample mathematical representations in computing the marker positions.

Figure 159:
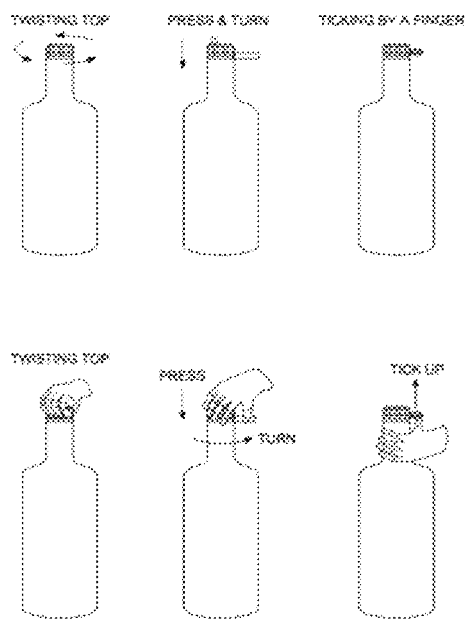

FIG. 159 is pictorial diagram illustrating opening of a bottle with one or more markers.

Figure 160:
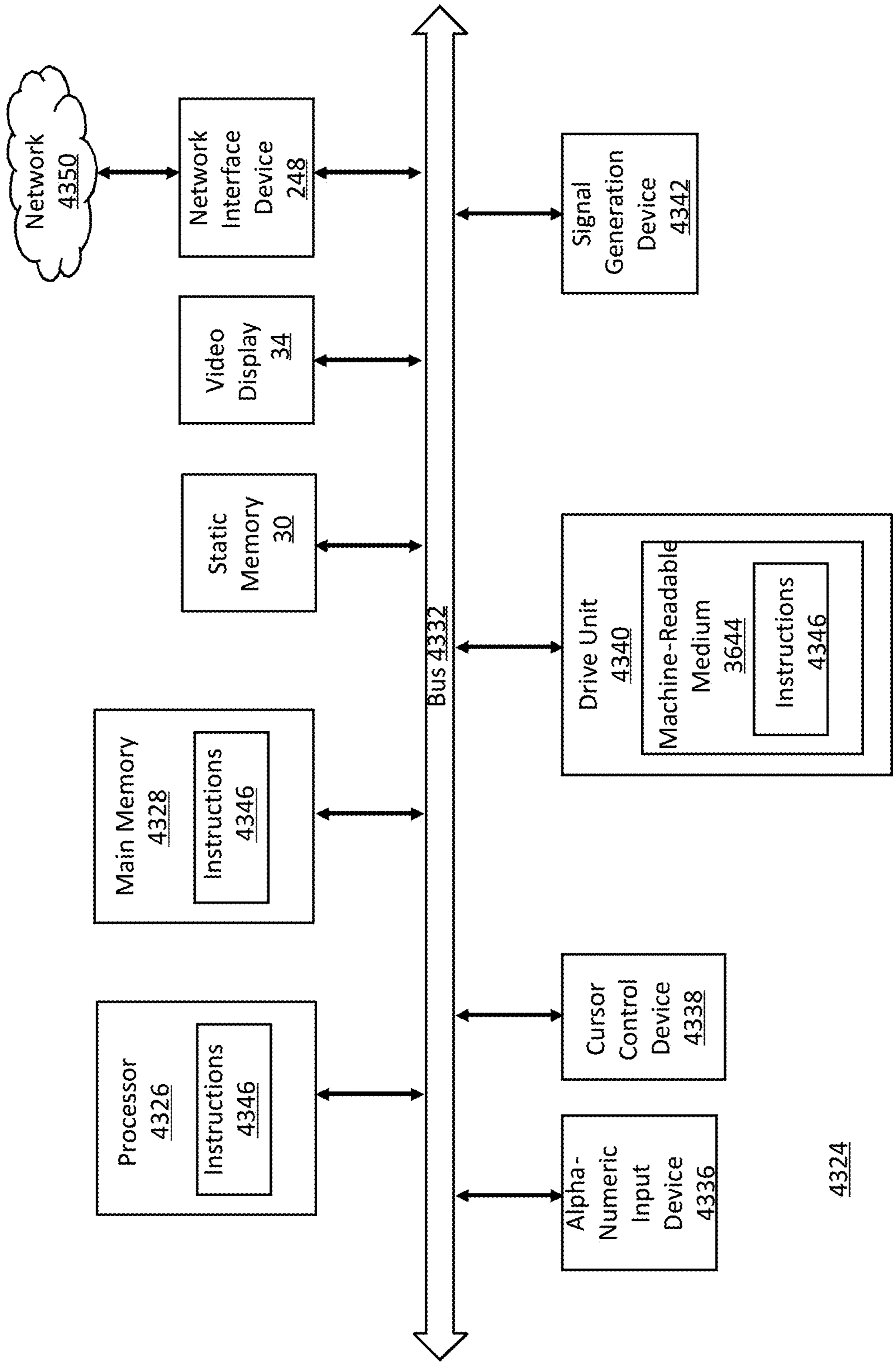

FIG. 160 is a block diagram illustrating an example of a computer device on which computer-executable instructions perform the robotic methodologies discussed herein and which may be installed and executed.

Figure 161:
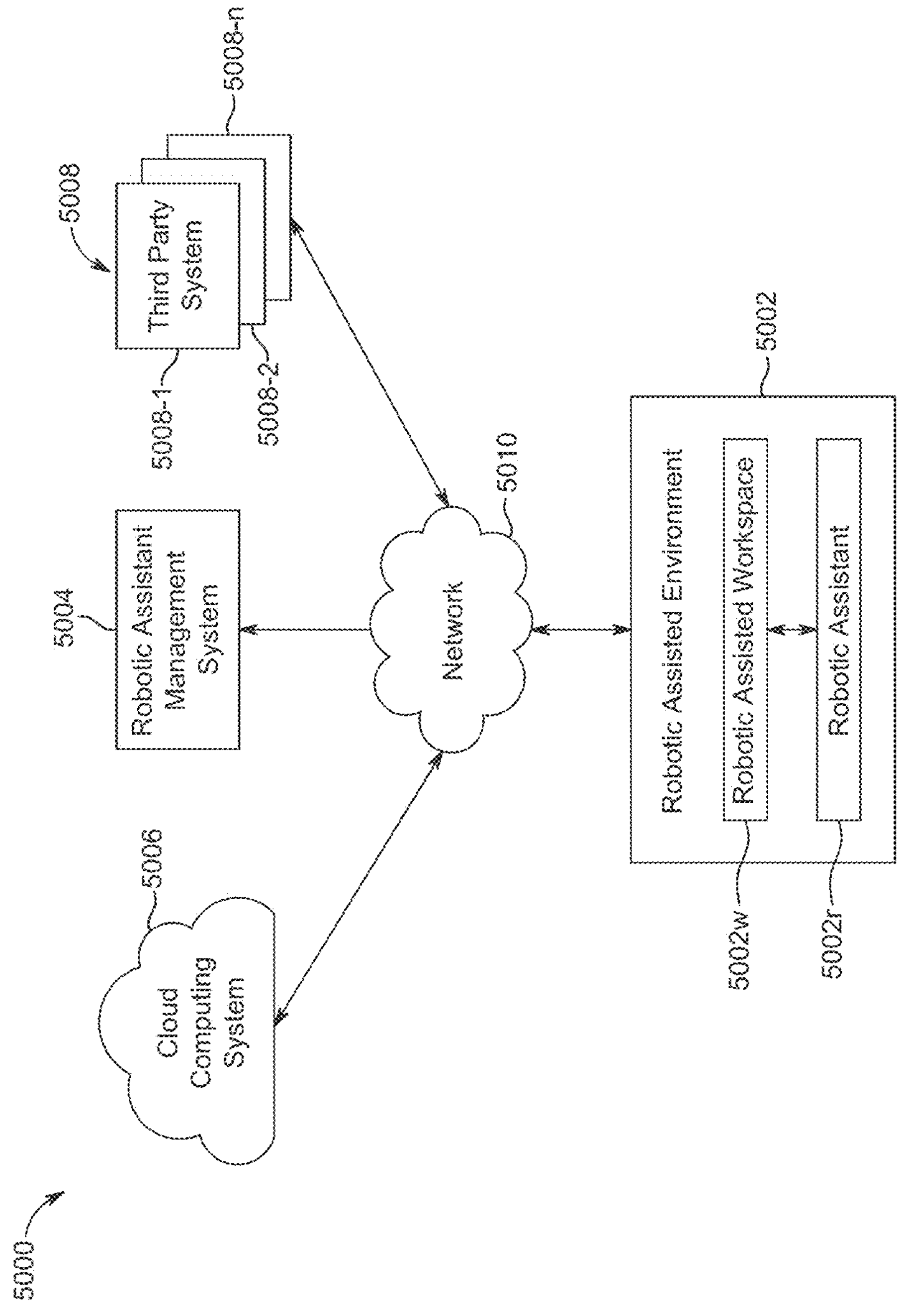

FIG. 161 illustrates a robotic operation ecosystem for deploying a robotic assistant, according to an exemplary embodiment.

Figure 162A:
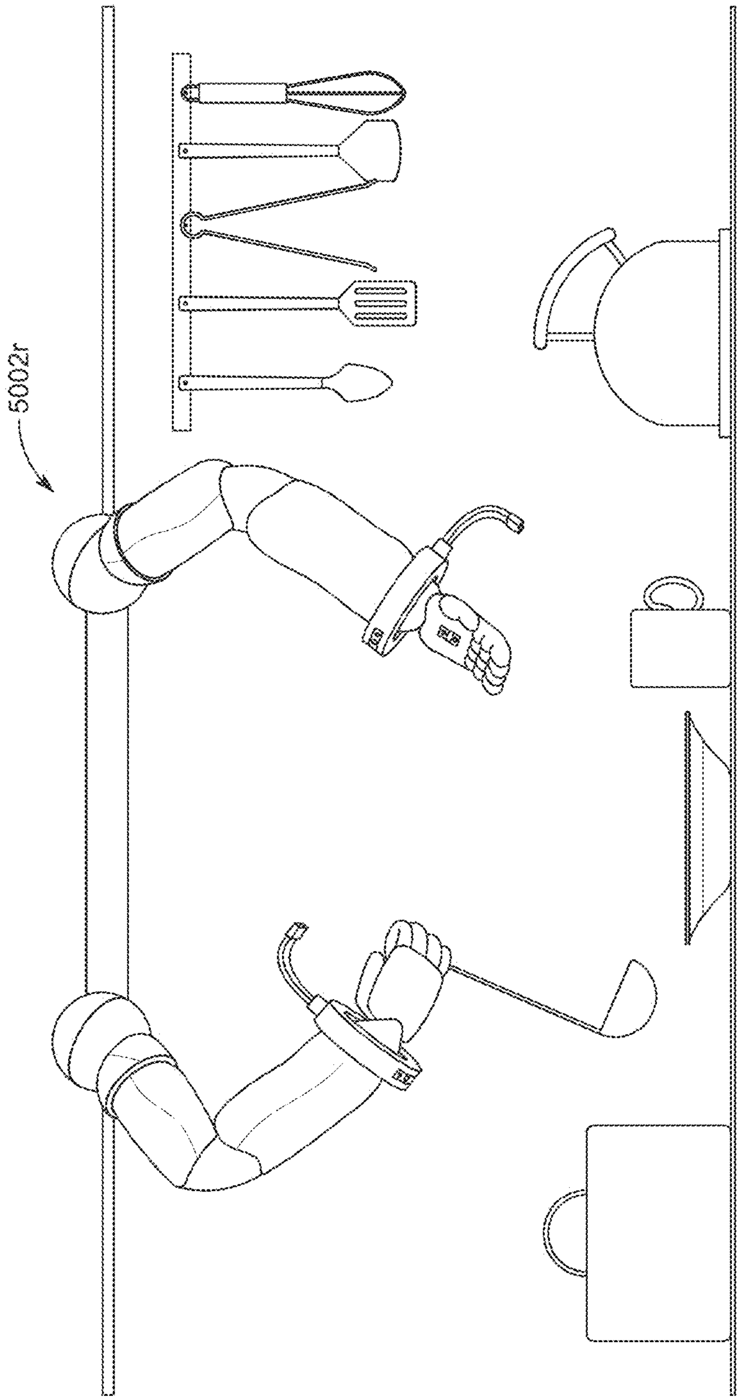
Figure 179:
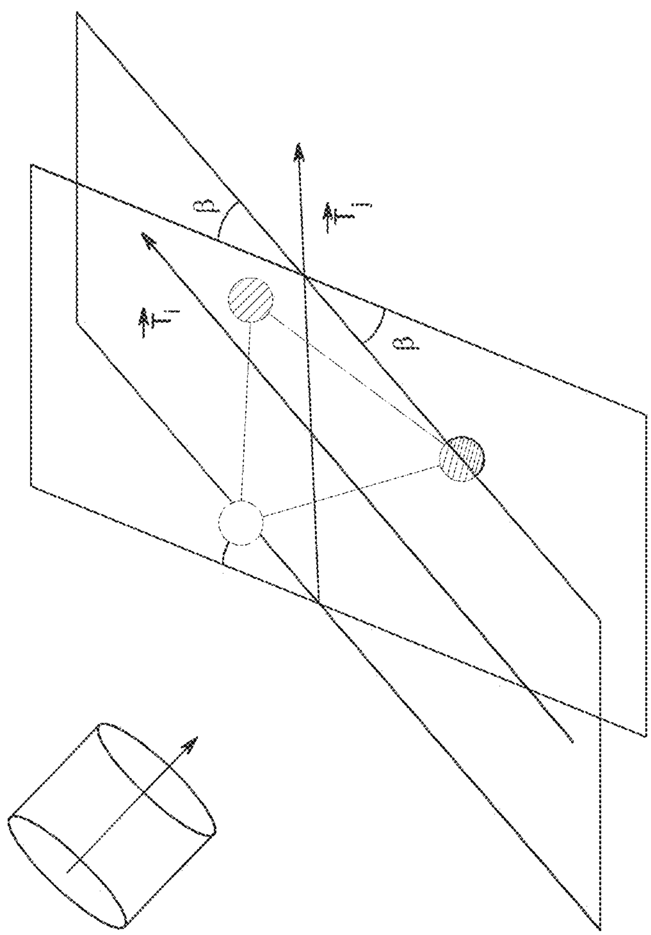

FIG. 162A illustrates front perspective views of one configuration of the robotic assistant of FIG. 179 in a kitchen, according to an exemplary embodiment.

Figure 162B:
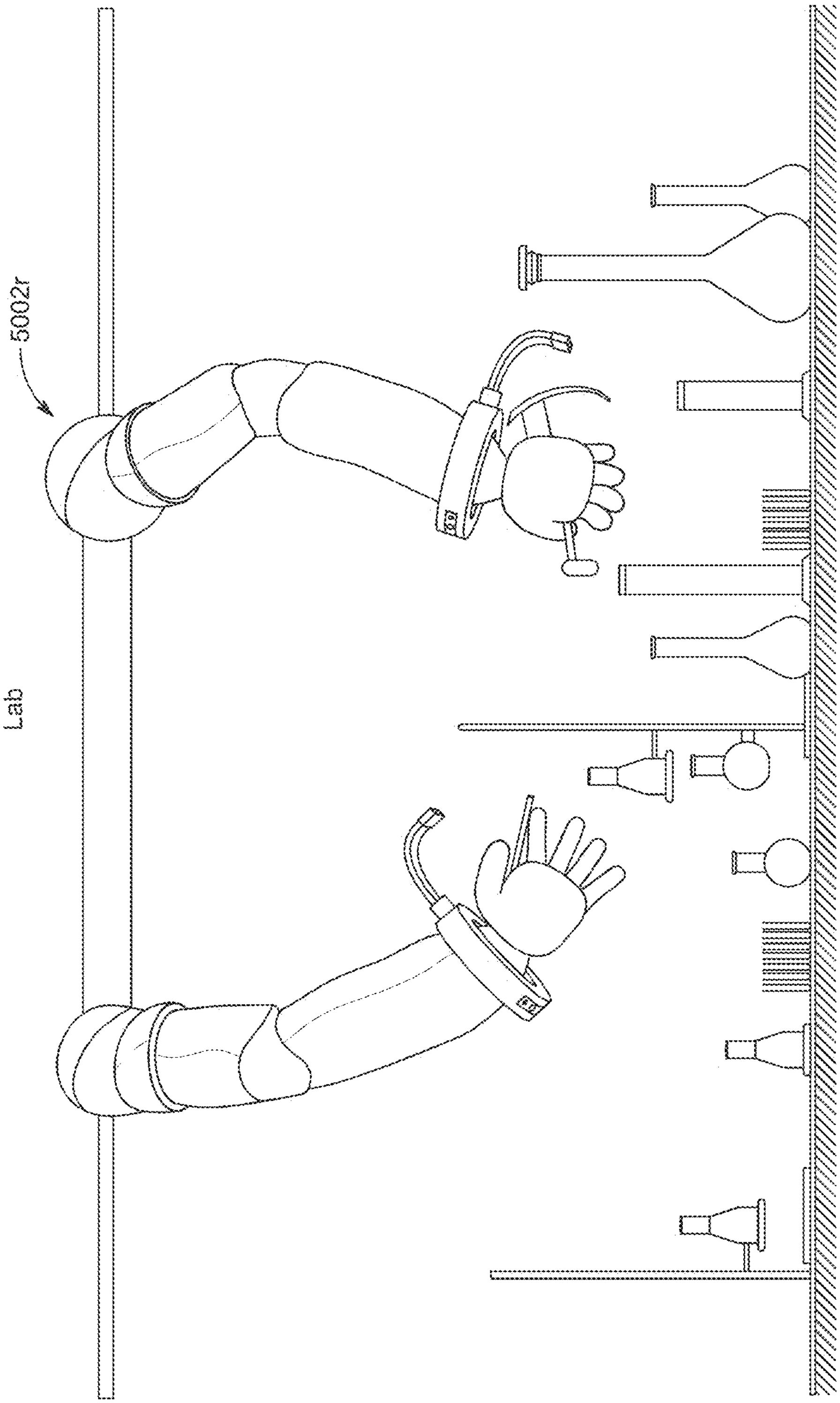

FIG. 162B illustrates front perspective views of one configuration of the robotic assistant of FIG. 179 in a laboratory, according to an exemplary embodiment.

Figure 162C:
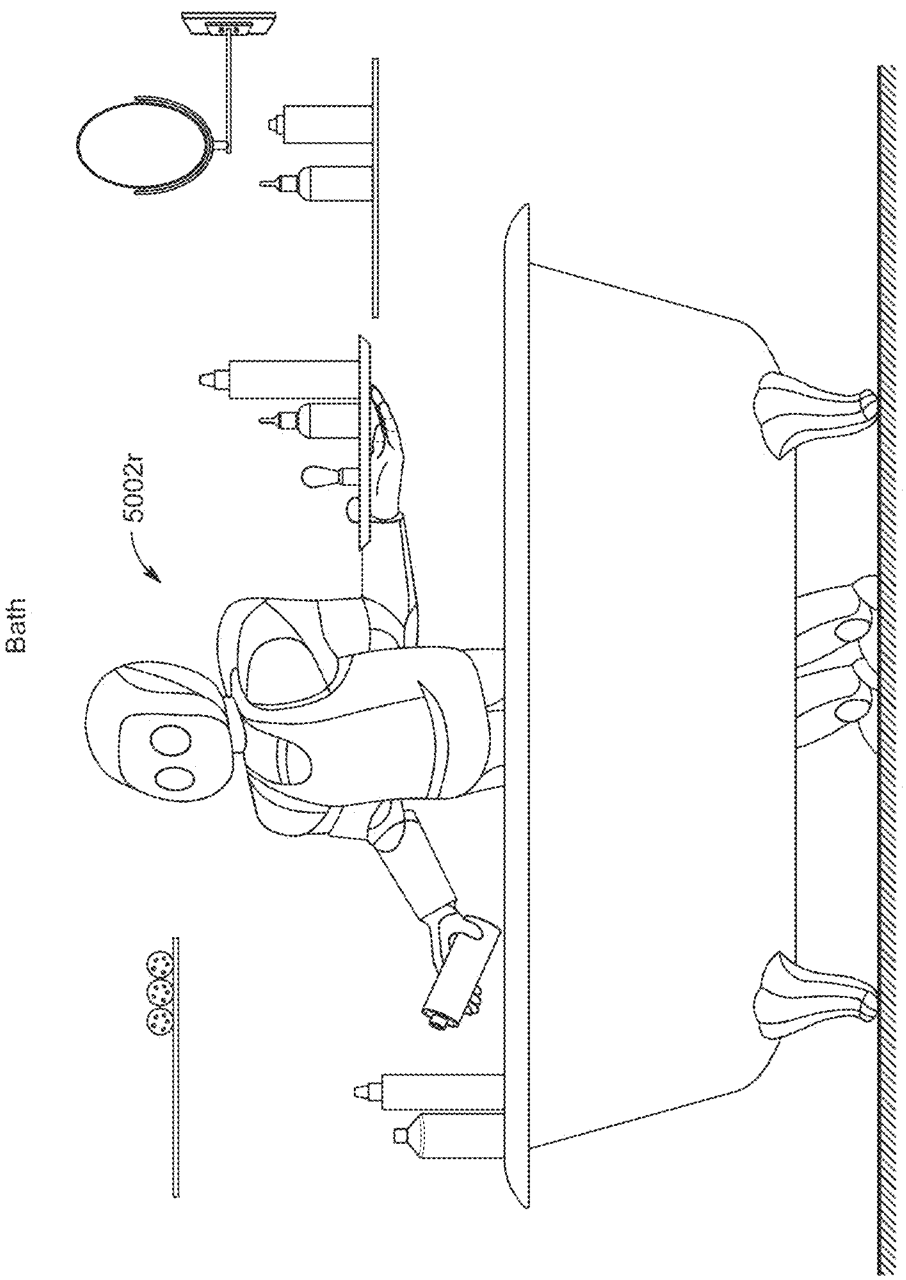

FIG. 162C illustrates front perspective views of one configuration of the robotic assistant of FIG. 179 in a bathroom, according to an exemplary embodiment.

Figure 162D:
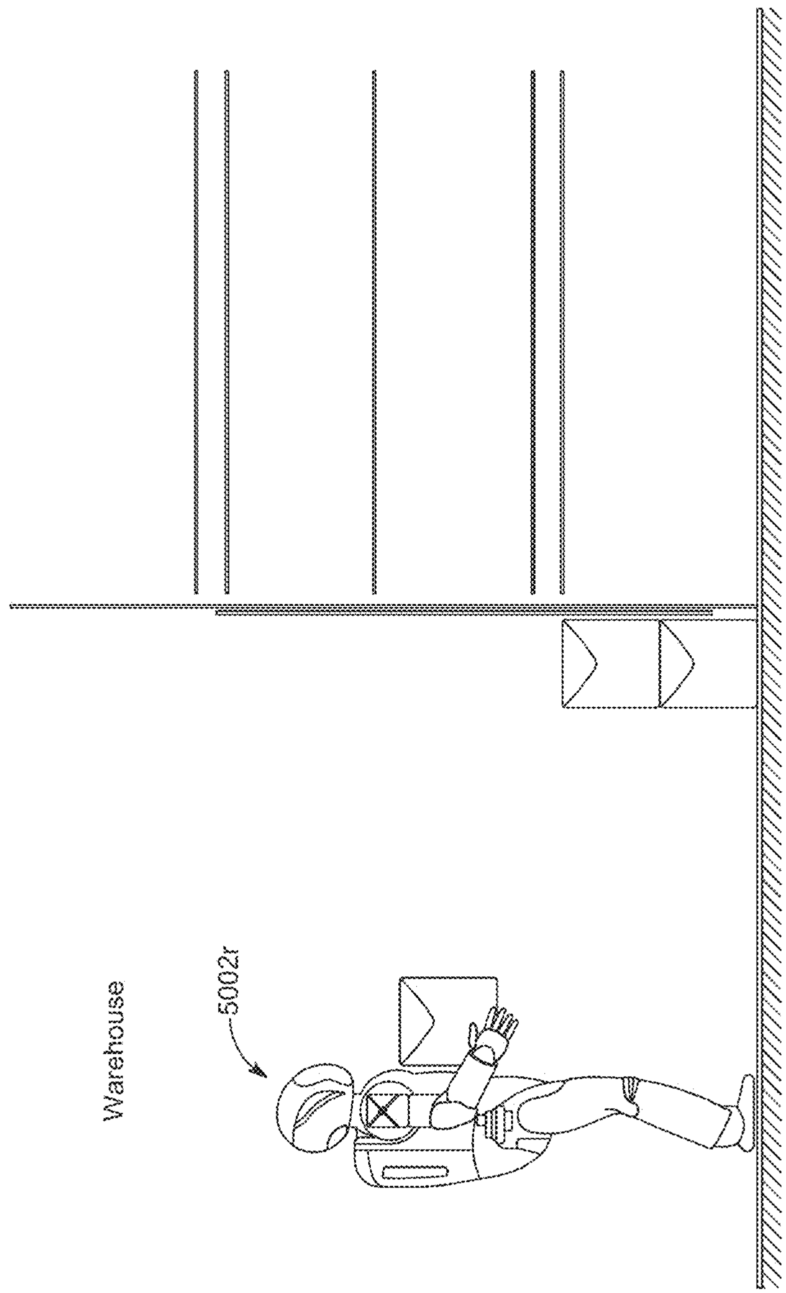

FIG. 162D illustrates front perspective views of one configuration of the robotic assistant of FIG. 179 in a warehouse, according to an exemplary embodiment.

Figure 163:
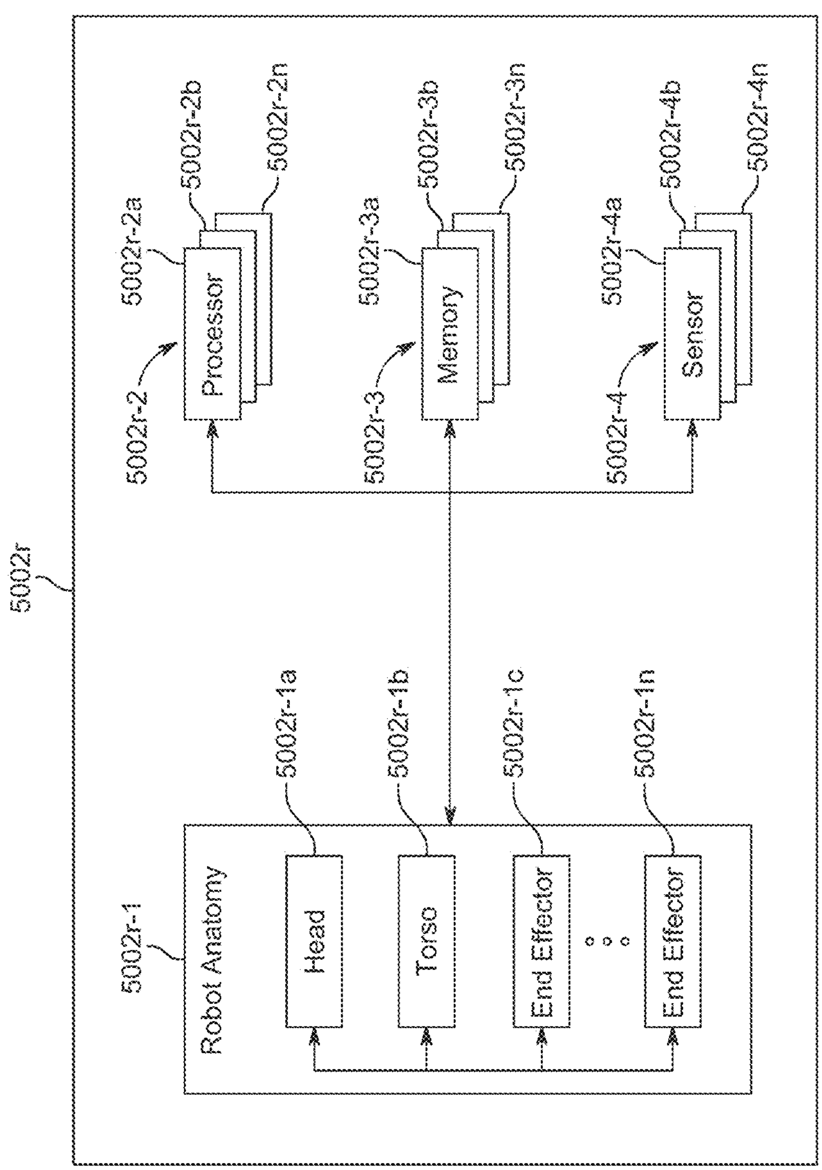

FIG. 163 illustrates an architecture of the robotic assistant of FIG. 179, according to an exemplary embodiment.

Figure 164A:
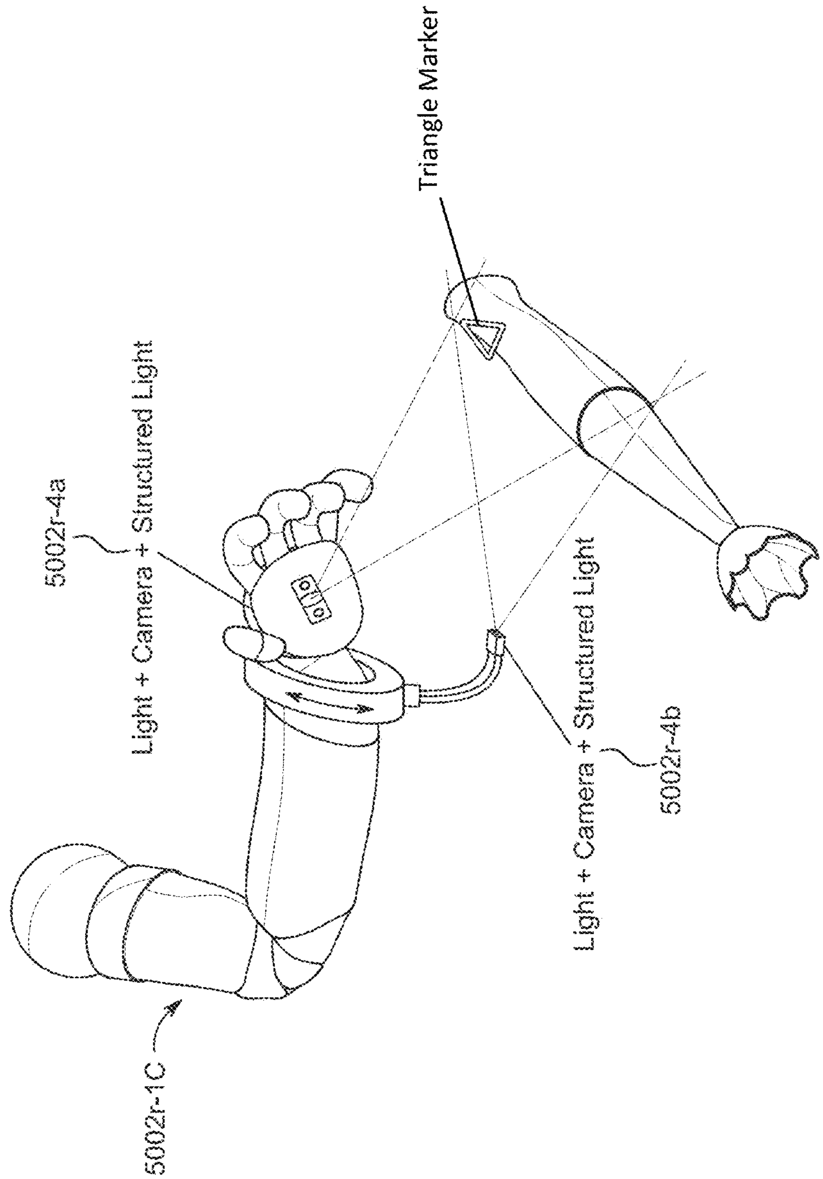

FIG. 164A illustrates an end effector of the robotic assistant of FIG. 161 including lights and cameras, according to an exemplary embodiment.

Figure 164B:
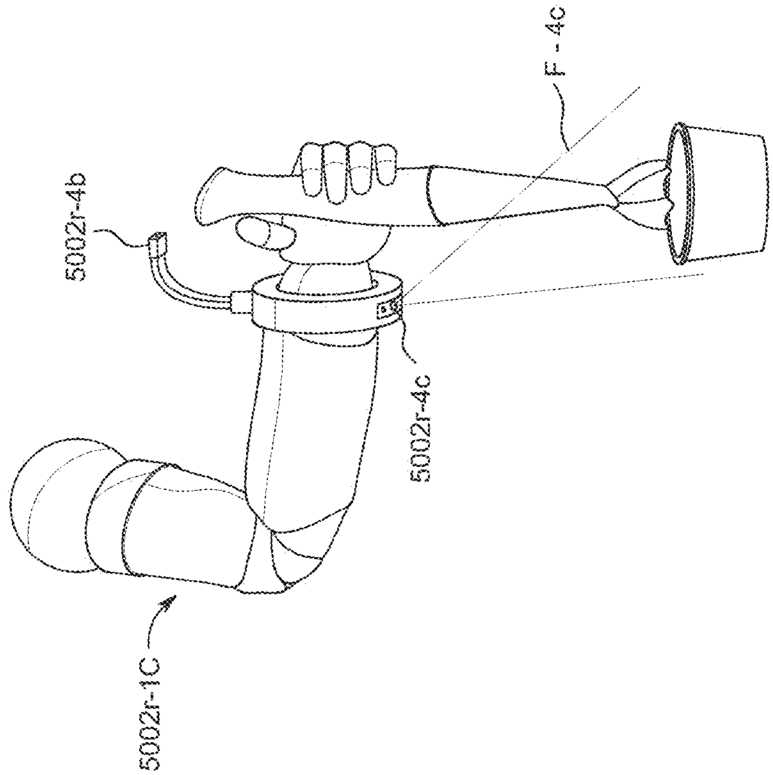

FIG. 164B illustrates an end effector of the robotic assistant of FIG. 161 including lights and cameras, according to an exemplary embodiment.

Figure 164C:
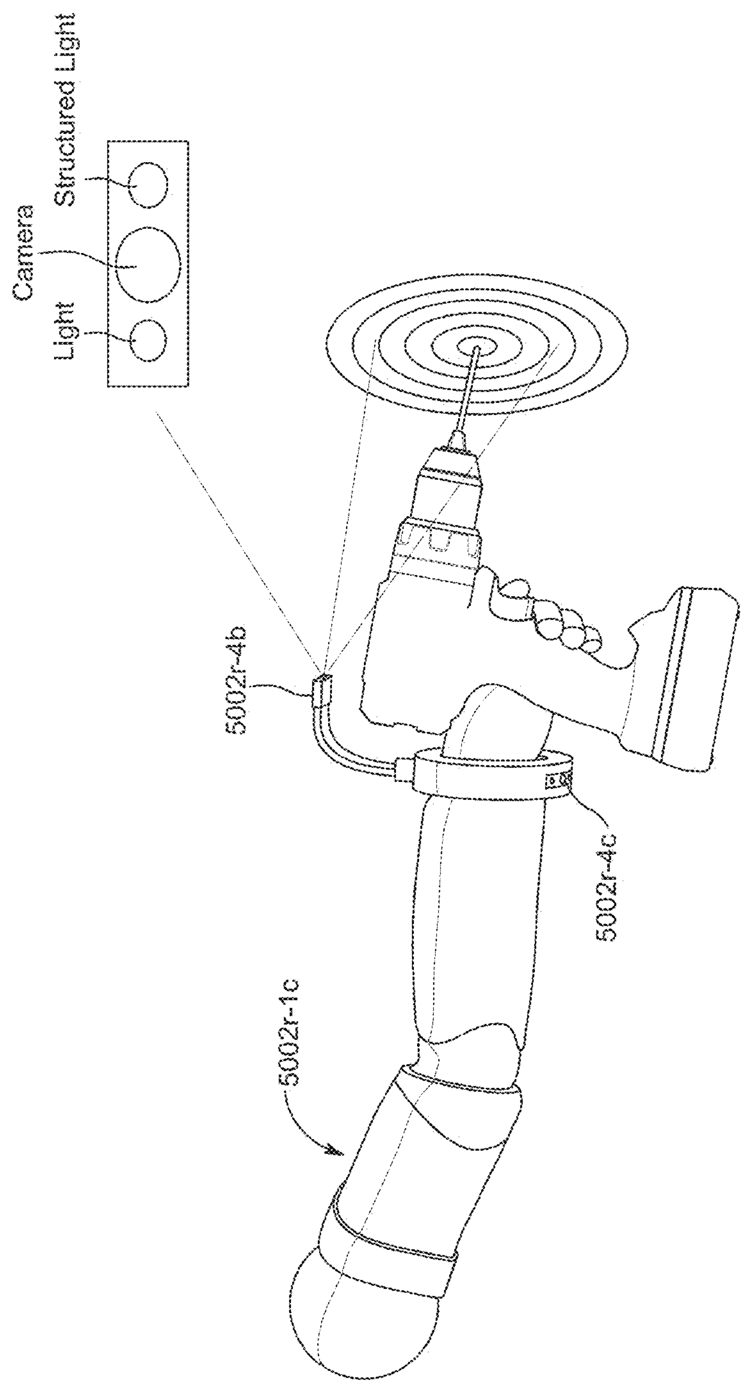

FIG. 164C illustrates an end effector of the robotic assistant of FIG. 161 including lights and cameras, according to an exemplary embodiment.

Figure 164D:
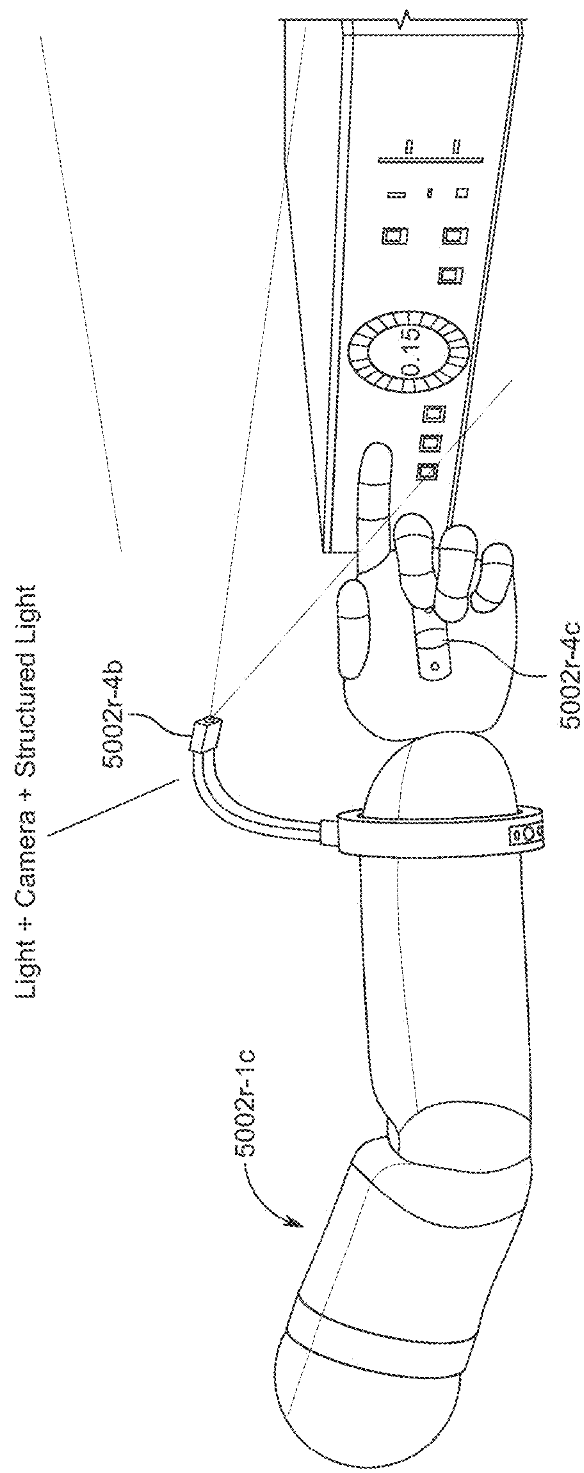

FIG. 164D illustrates an end effector of the robotic assistant of FIG. 161 including lights and cameras, according to an exemplary embodiment.

Figure 164E:
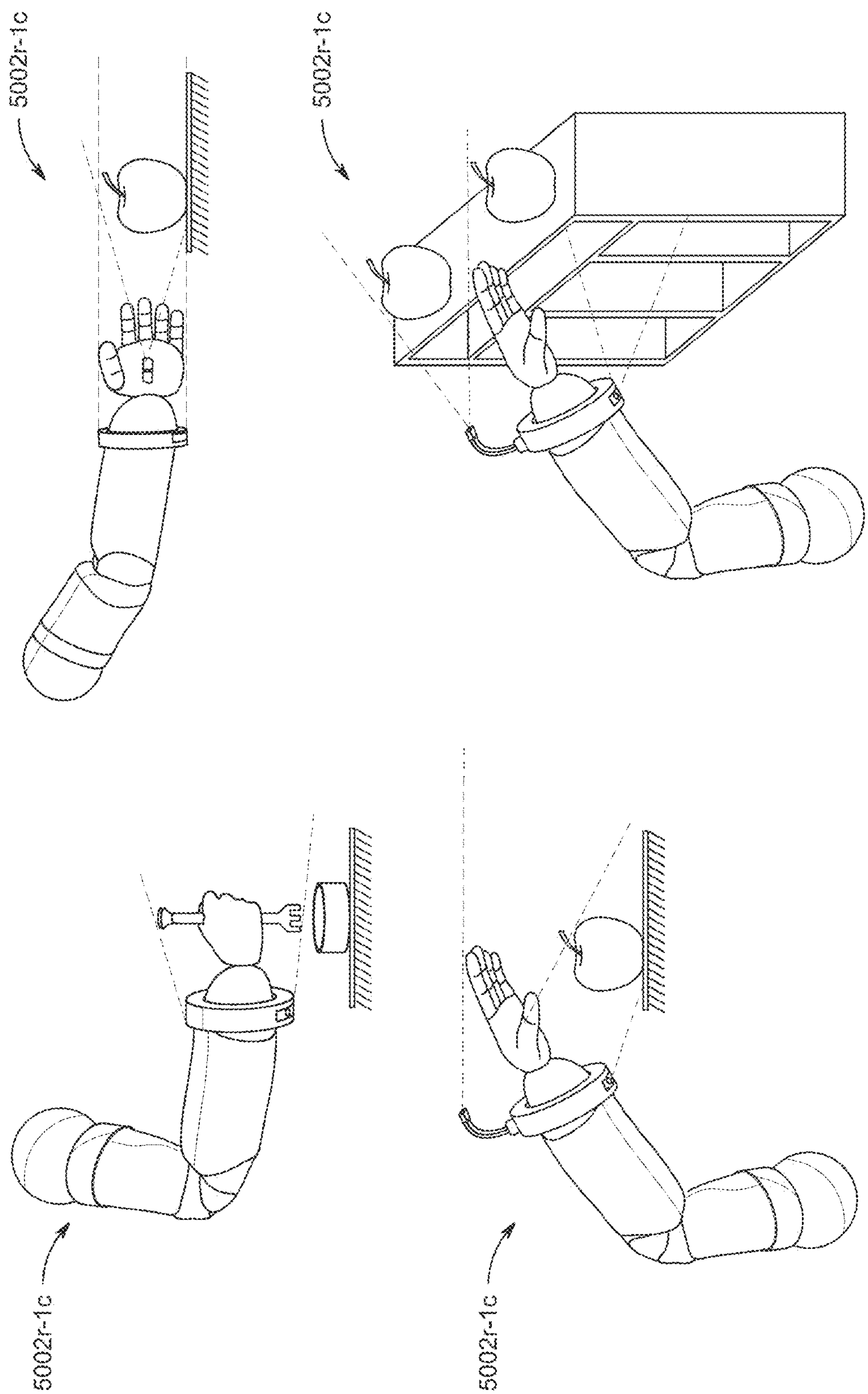

FIG. 164E illustrates various views of an end effector of the robotic assistant of FIG. 161, according to exemplary embodiments.

FIG. 164F(1) illustrates an end effector of the robotic assistant of FIG. 161 including pressure sensors, according to an exemplary embodiment.

FIG. 164F(2) illustrates an end effector of the robotic assistant of FIG. 161 including pressure sensors, according to an exemplary embodiment.

FIG. 164F(3) illustrates pressure sensors of the hand of the end effector of the robotic assistant of FIG. 164F(2), according to an exemplary embodiment.

FIG. 164F(4) illustrates a sensing area of the hand of the end effector of the robotic assistant of FIG. 162F(2, according to an exemplary embodiment.

Figure 165:
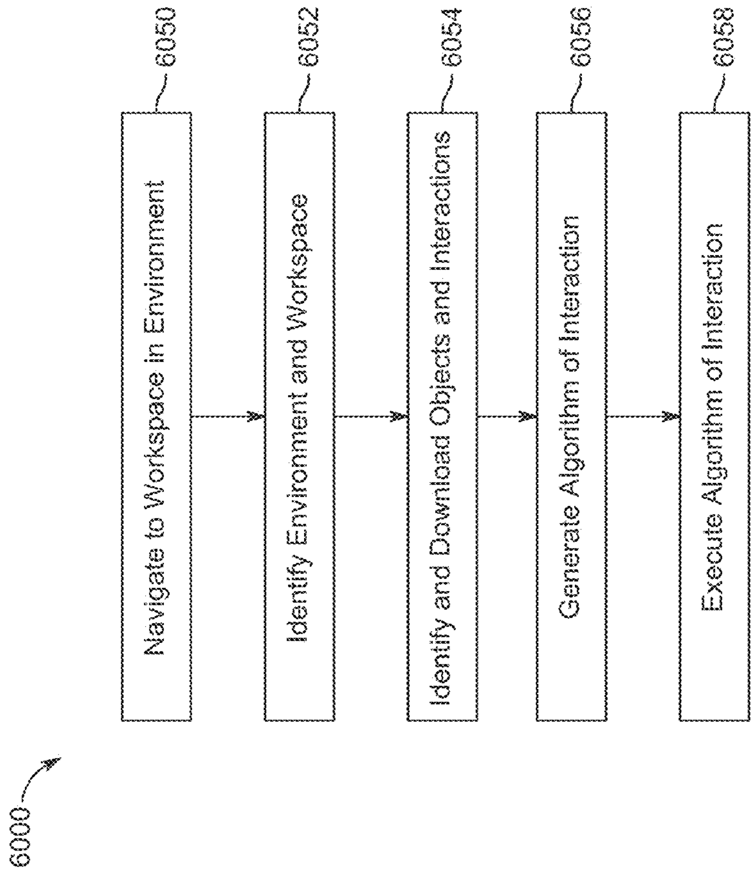

FIG. 165 is a flow chart illustrating a process for executing an interaction using the robotic assistant of FIG. 163, according to an exemplary embodiment.

Figure 166:
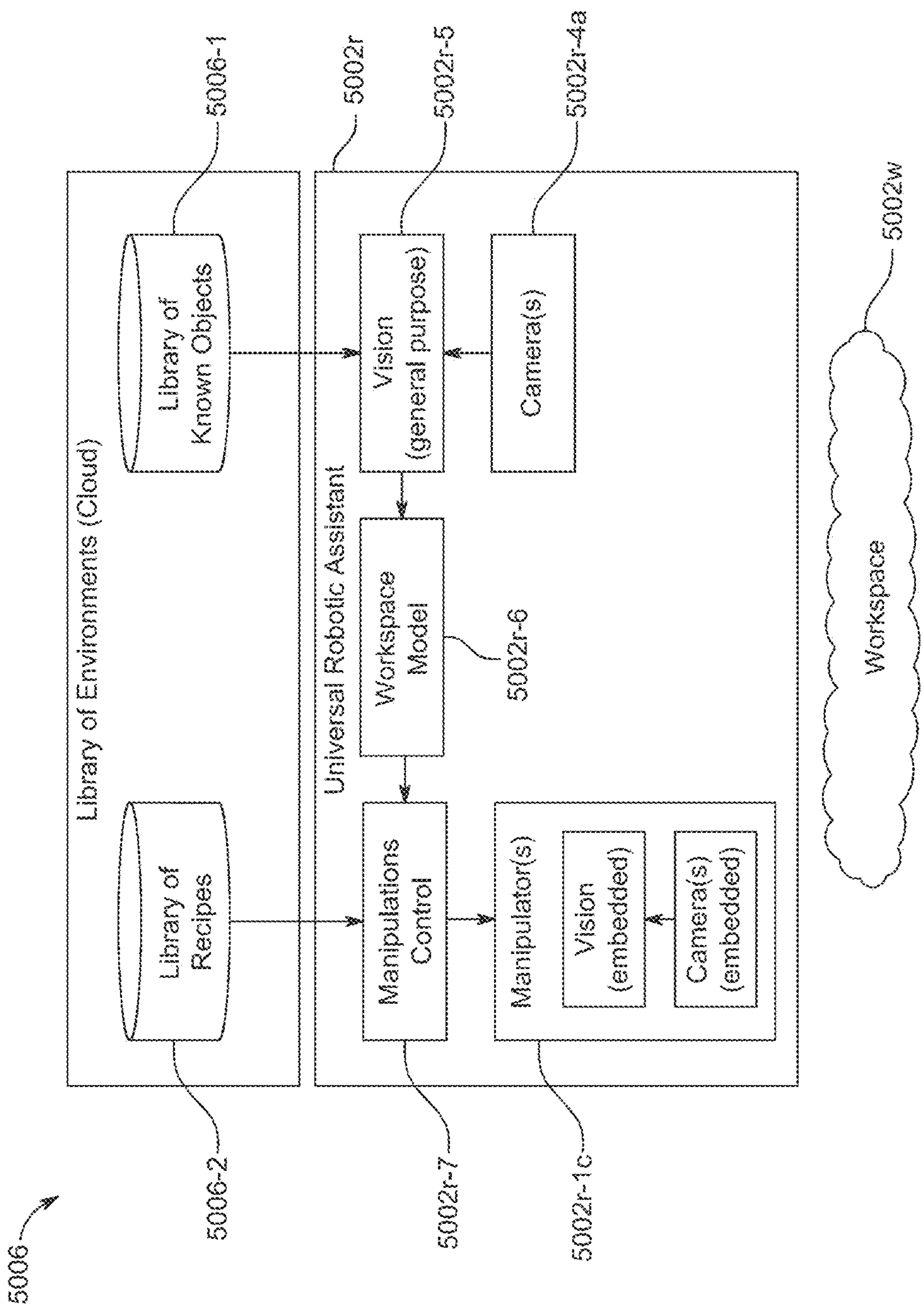

FIG. 166 is an architecture diagram illustrating portions of the ecosystem of FIG. 161, according to an exemplary embodiment.

Figure 167:
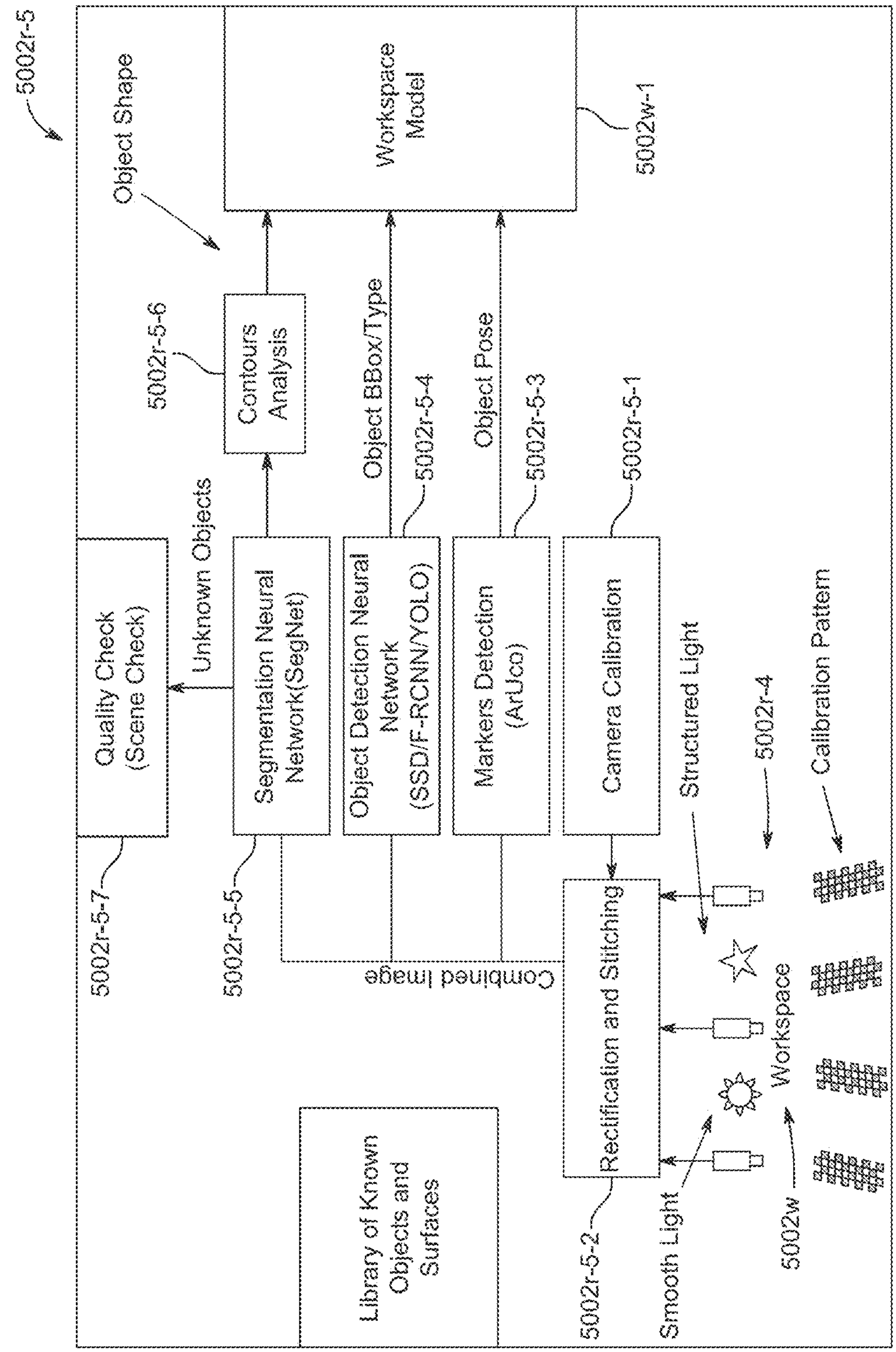

FIG. 167 illustrates an architecture of a general-purpose vision subsystem **5002*r*-5 of the robotic assistant of FIG. 163**, according to an exemplary embodiment.

Figure 168A:
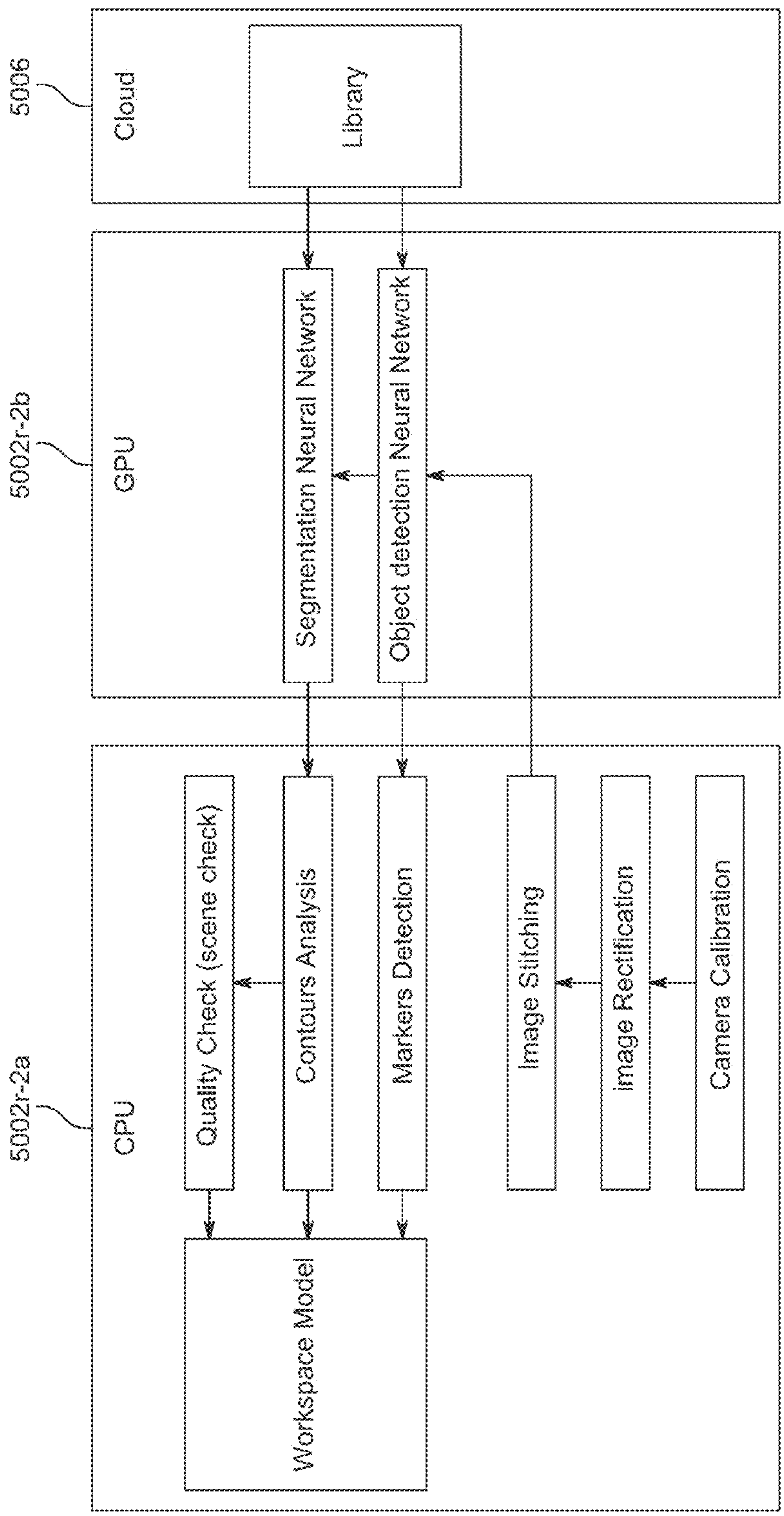

FIG. 168A illustrates an architecture for identifying objects using the general-purpose vision subsystem of FIG. 167, according to an exemplary embodiment.

Figure 168B:
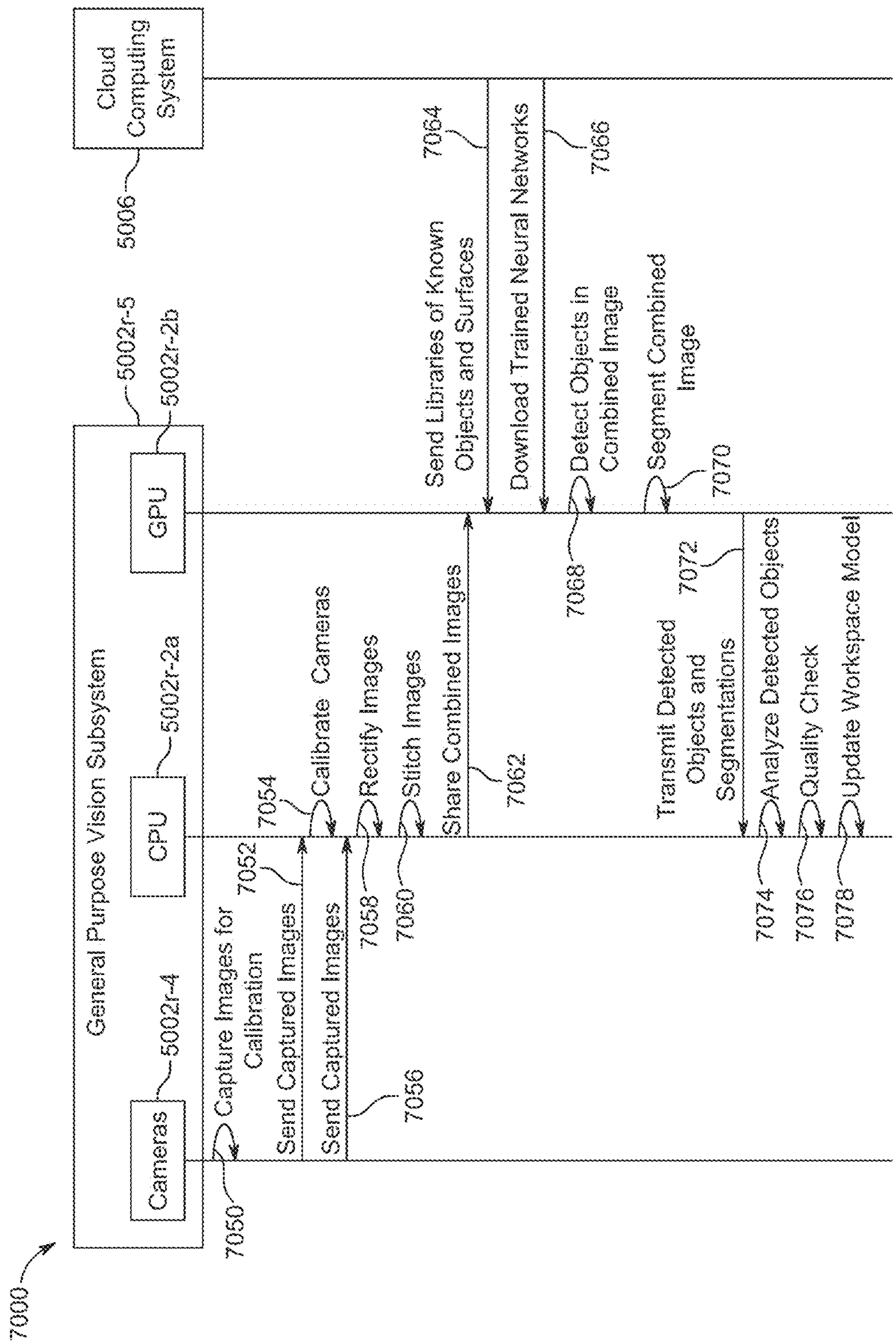

FIG. 168B illustrates a sequence diagram of a process for identifying objects in an environment or workspace using the robotic assistant of FIG. 161, according to an exemplary embodiment.

Figure 169A:
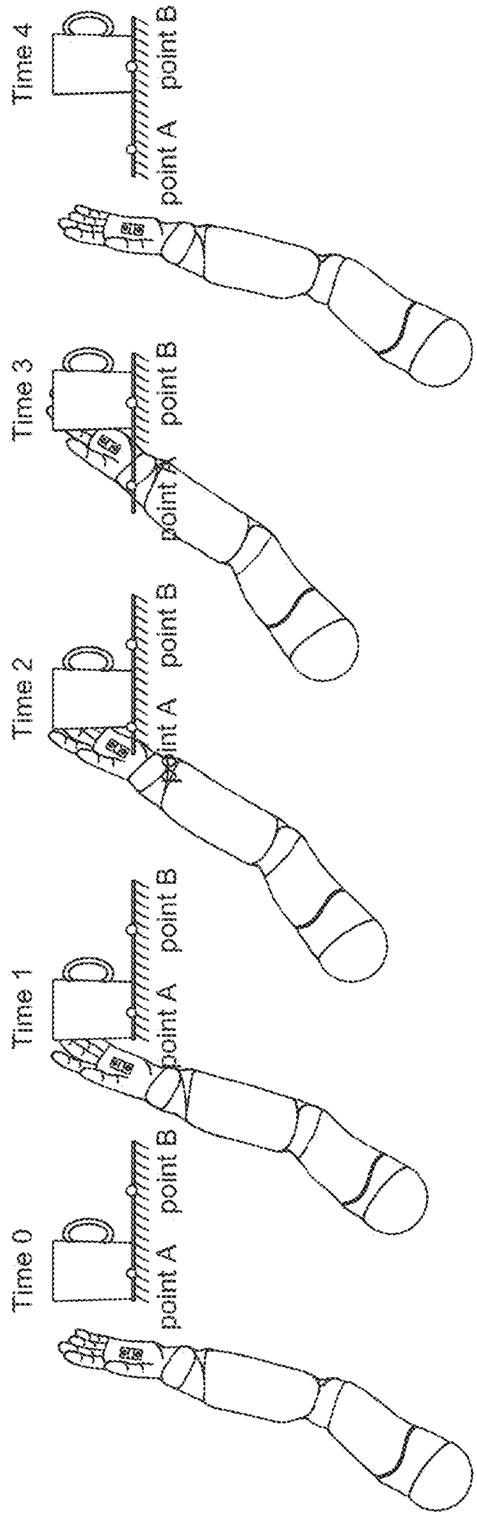

FIG. 169A illustrates an interaction between a robotic arm of the robotic assistant of FIG. 163 and a standard object, according to an exemplary embodiment.

Figure 169B:
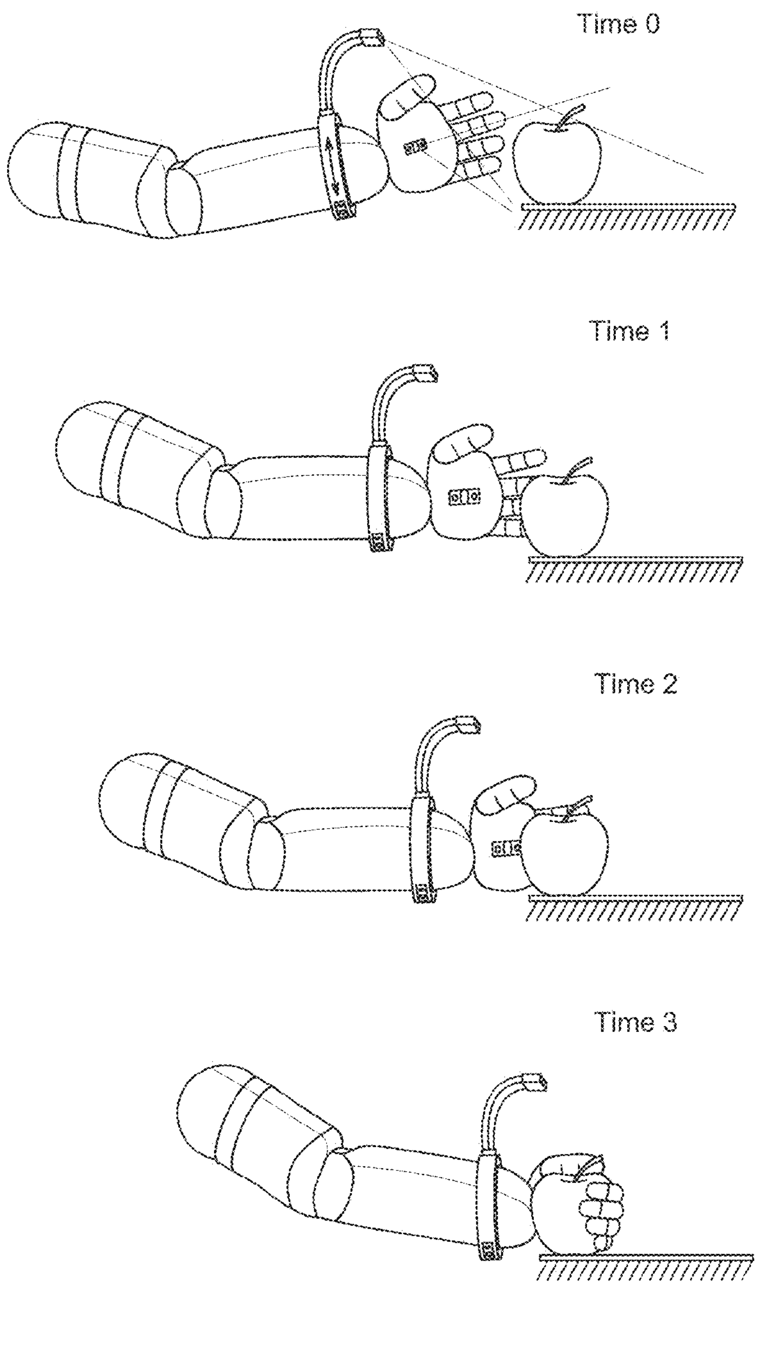

FIG. 169B illustrates an interaction between a robotic arm of the robotic assistant of FIG. 163 and a non-standard object, according to an exemplary embodiment.

Figure 169C:
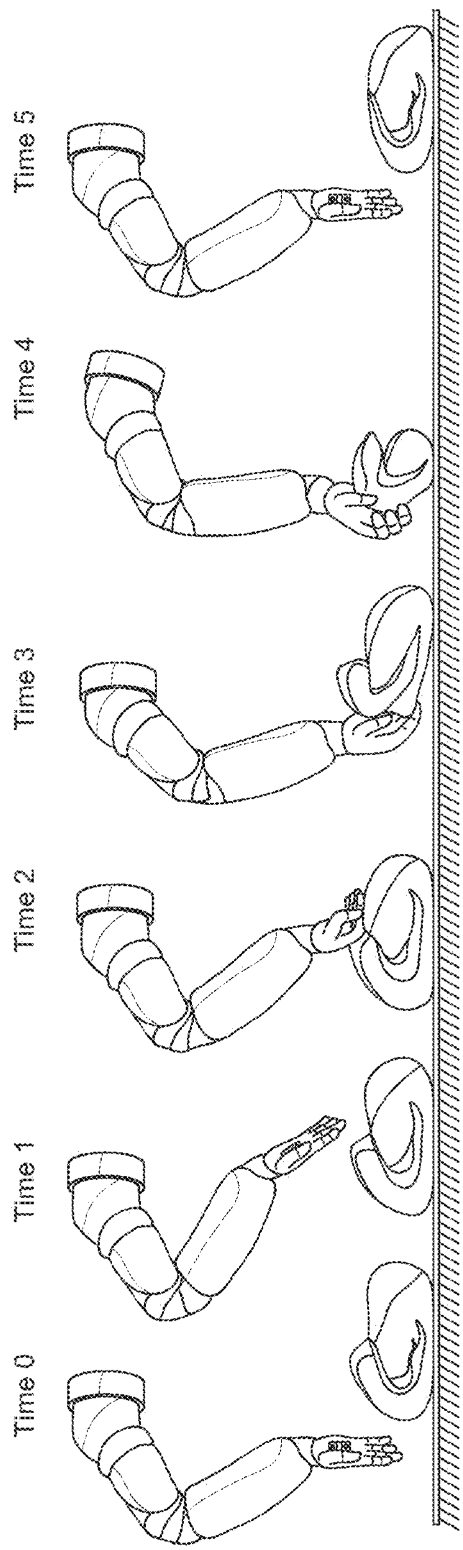

FIG. 169C illustrates an interaction between a robotic arm of the robotic assistant of FIG. 163 and a non-standard object, according to an exemplary embodiment.

Figure 169D:
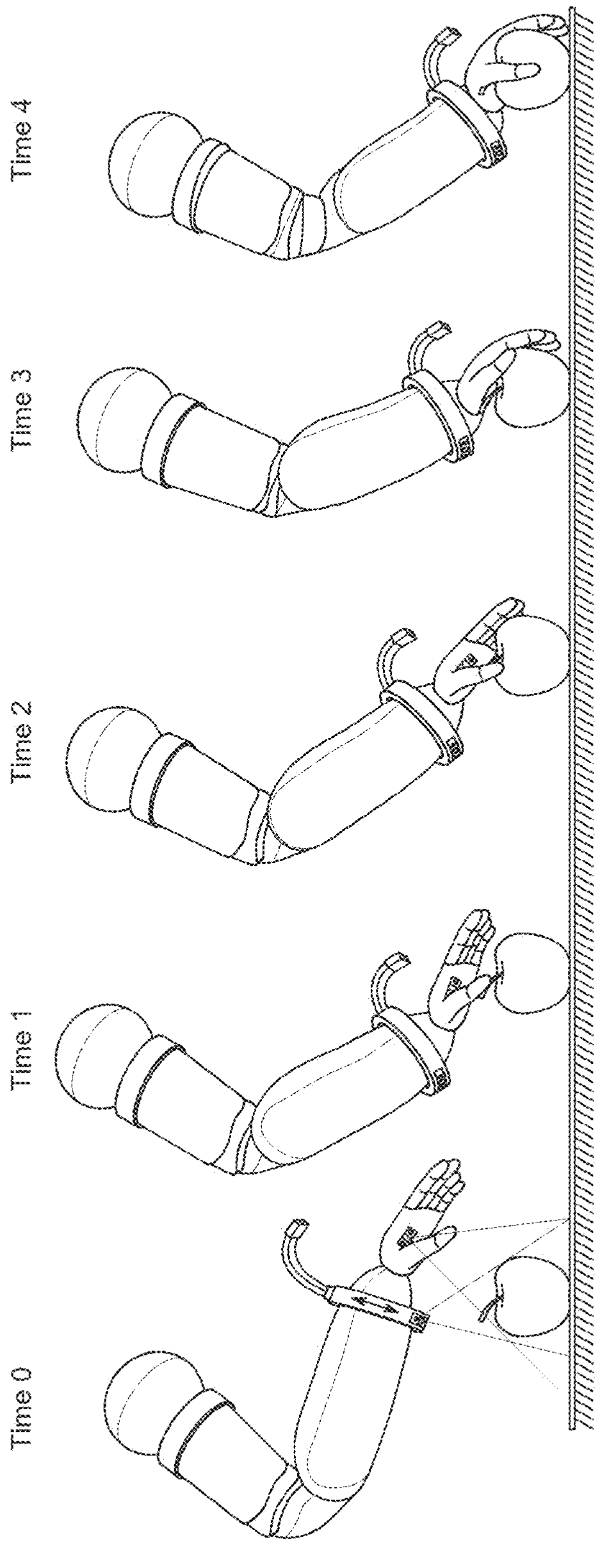

FIG. 169D illustrates an interaction between a robotic arm of the robotic assistant of FIG. 163 and a non-standard object, according to an exemplary embodiment.

Figure 169E:
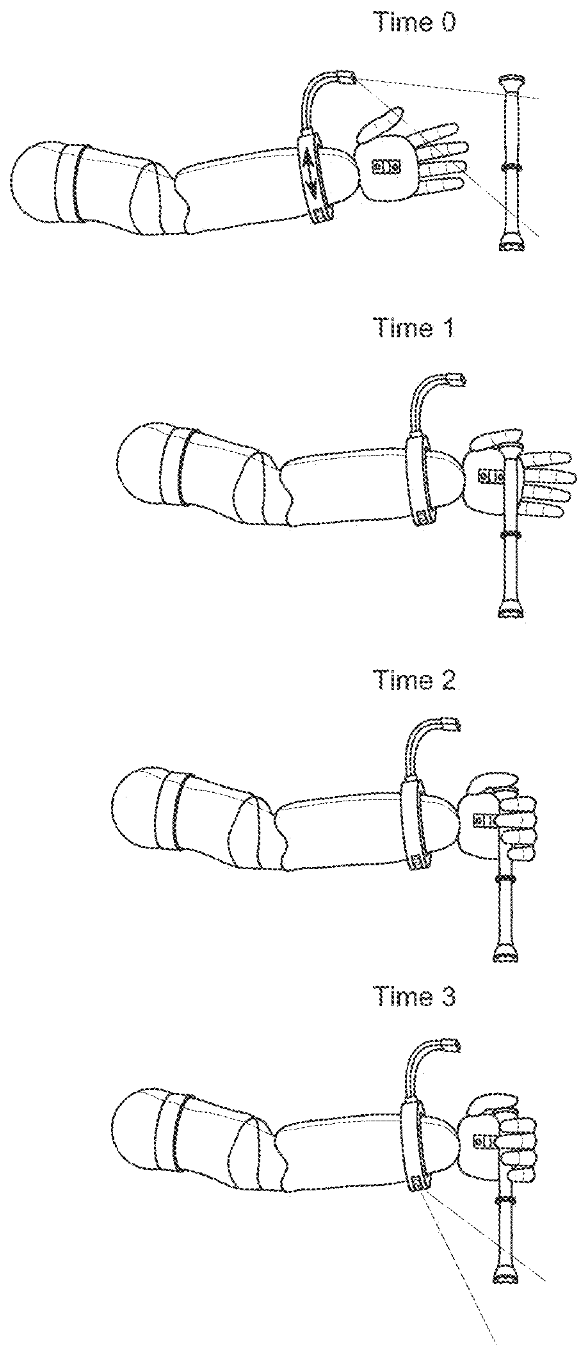

FIG. 169E illustrates an interaction between a robotic arm of the robotic assistant of FIG. 163 and a standard object, according to an exemplary embodiment.

Figure 170:
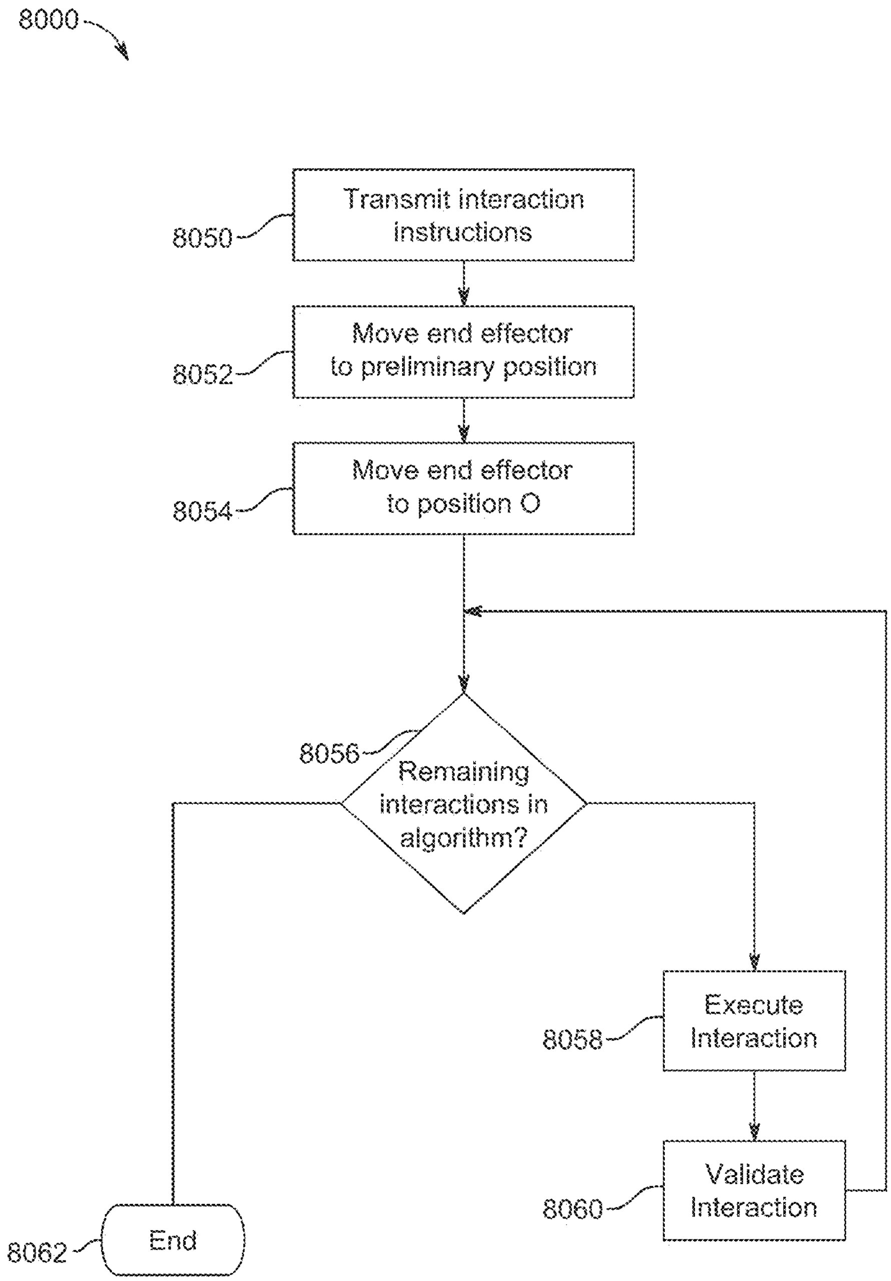

FIG. 170 illustrates a flow chart of a process for executing an interaction using the robotic assistant of FIG. 163, according to an exemplary embodiment.

Figure 171A:
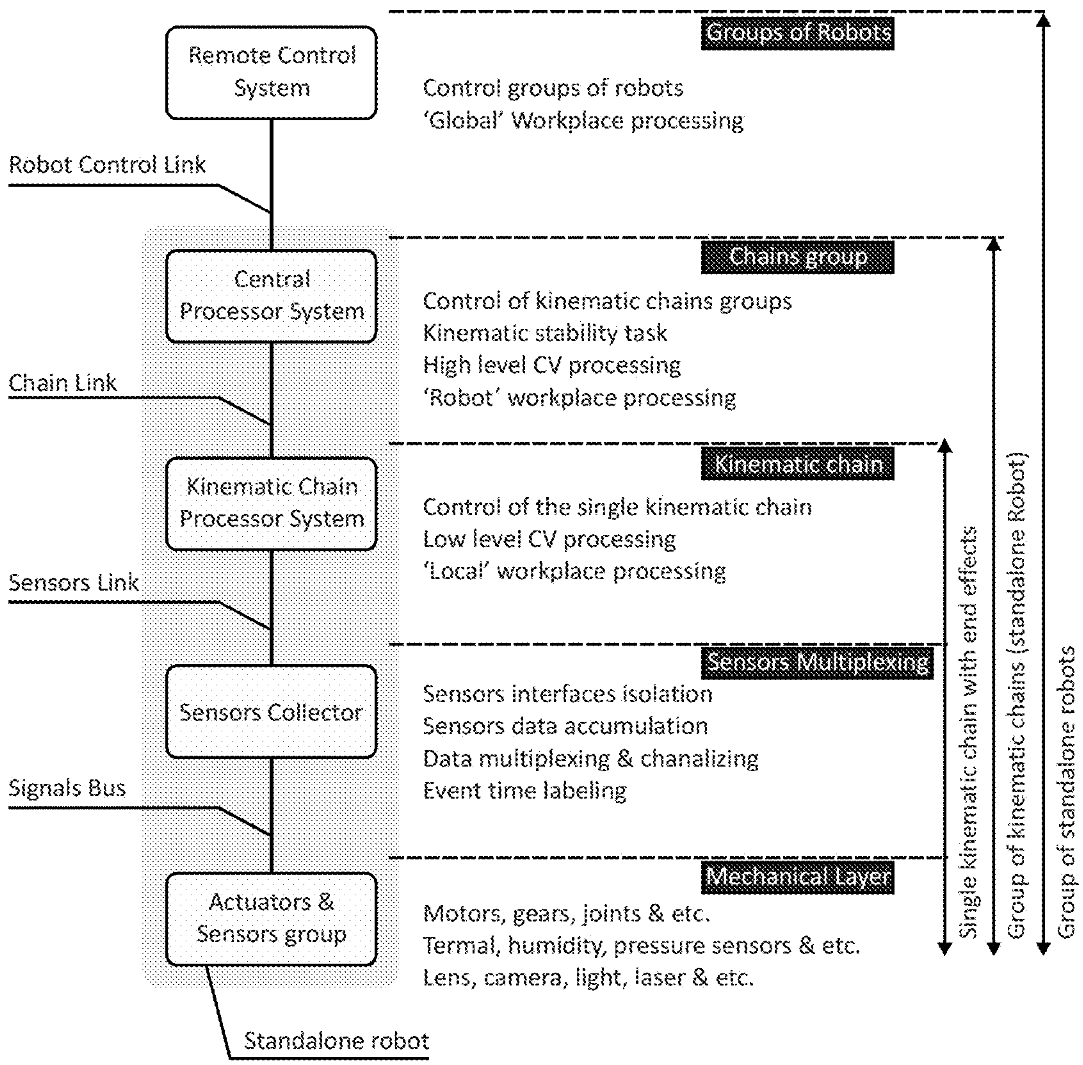

FIG. 171A illustrates a complete hierarchy or architecture of the robotic assistant system, according to an exemplary environment.

Figure 171B:
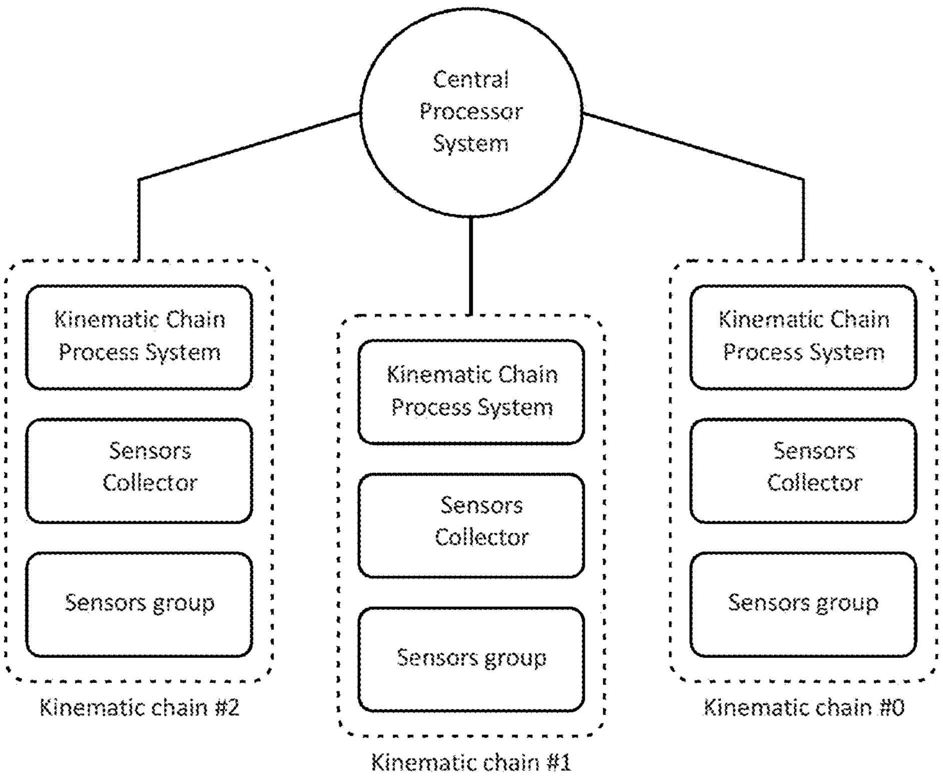

FIG. 171B illustrates connections between actuators and sensors group, sensors collector, kinematic chain, processor system and the central processor in accordance with architecture of the robotic system, according to an exemplary environment.

Figure 171C:
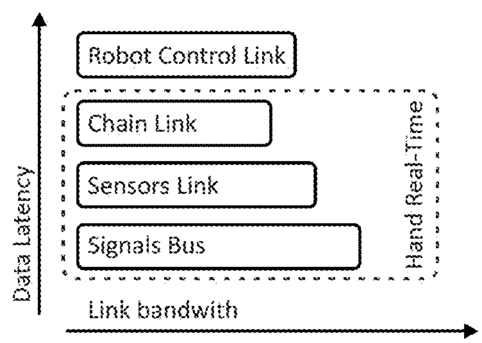

FIG. 171C illustrates a scheme representing connection between the bandwidth and latency in a hard real-time environment, according to an exemplary environment, according to an exemplary environment.

Figure 172A:
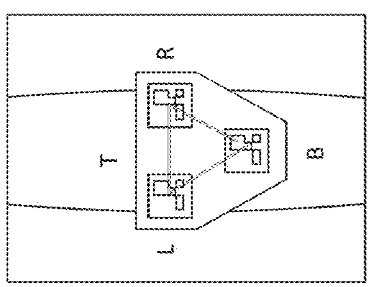

FIG. 172A illustrates a triangle marker made up of three 2D binary code markers, according to an exemplary embodiment.

Figure 172B:
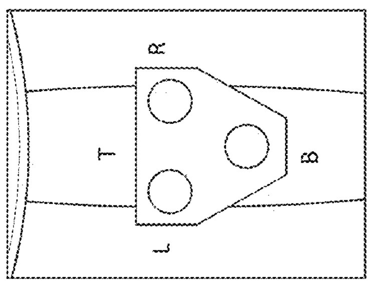

FIG. 172B illustrates a triangle marker made up of three colored circle shapes, according to an exemplary embodiment.

Figure 172C:
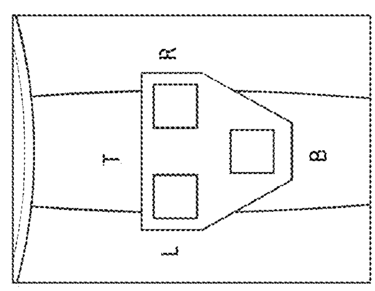

FIG. 172C illustrates a triangle marker made up of three colored square shapes, according to an exemplary embodiment.

Figure 172D:
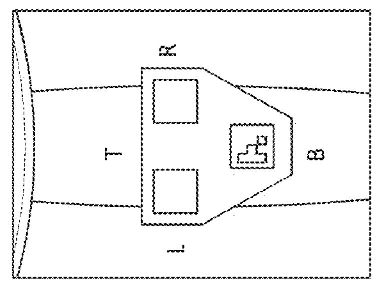

FIG. 172D illustrates a triangle marker made up of both binary code markers and colored shape markers, according to an exemplary embodiment.

Figure 173:
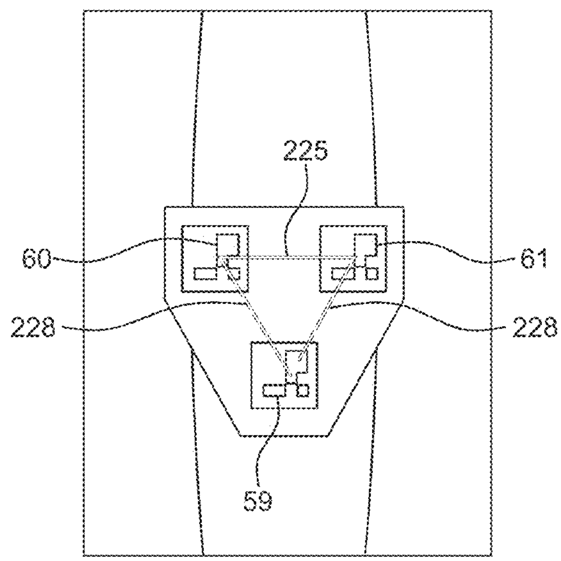

FIG. 173 illustrates a triangle marker according to an exemplary embodiment.

Figure 174A:
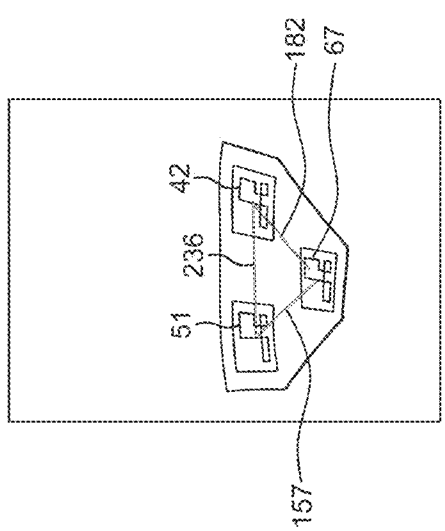

FIG. 174A illustrates a triangle marker according to an exemplary embodiment.

Figure 174B:
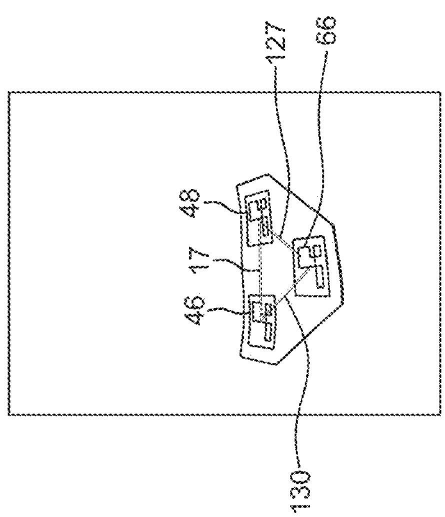

FIG. 174B illustrates a triangle marker according to an exemplary embodiment.

Figure 175B:
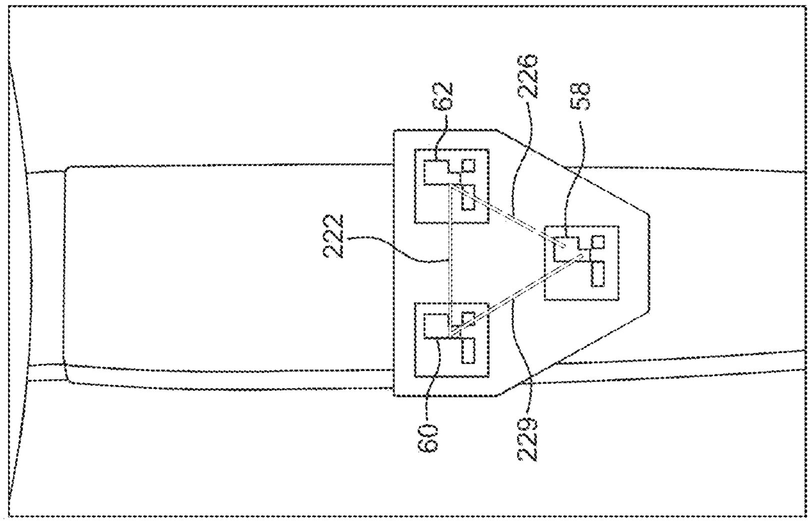
Figure 175A:
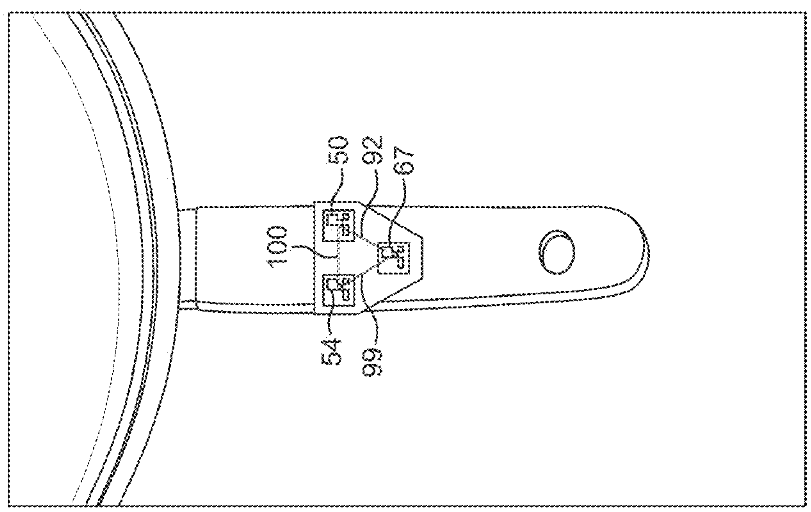

FIG. 175A illustrates a triangle marker according to an exemplary embodiment.

FIG. 175B illustrates a triangle marker according to an exemplary embodiment.

Figure 175C:
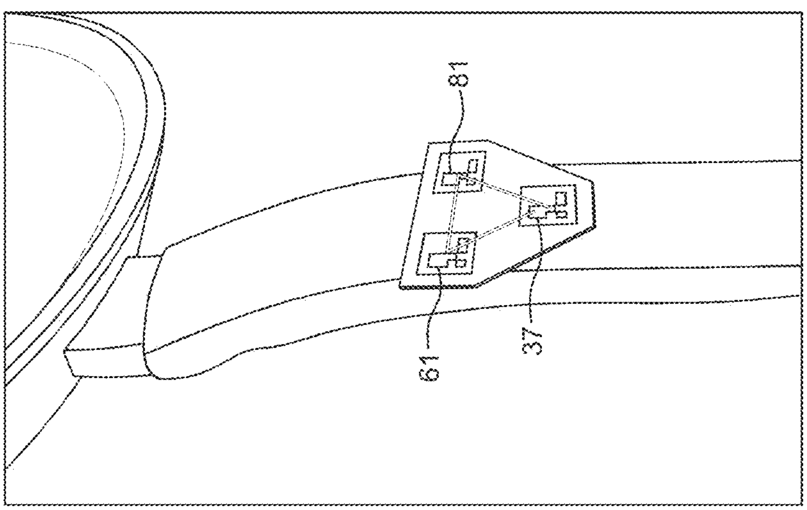

FIG. 175C illustrates a triangle marker according to an exemplary embodiment.

Figure 175D:
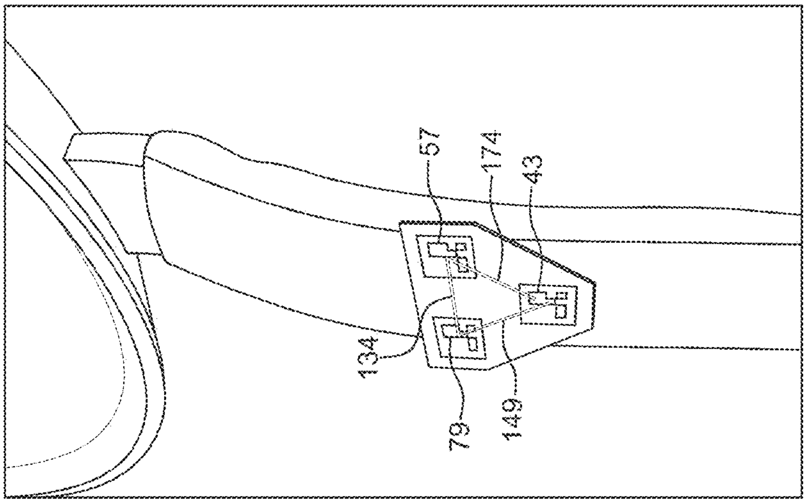

FIG. 175D illustrates a triangle marker according to an exemplary embodiment.

FIG. 176A(1) illustrates a triangle marker according to an exemplary embodiment.

FIG. 176A(2) illustrates a triangle marker and ArUco marker according to an exemplary embodiment.

FIG. 176A(3) illustrates a triangle marker and ArUco marker according to an exemplary embodiment.

FIG. 176B(1) illustrates a triangle marker according to an exemplary embodiment.

FIG. 176B(2) illustrates a triangle marker according to an exemplary embodiment.

Figure 177:
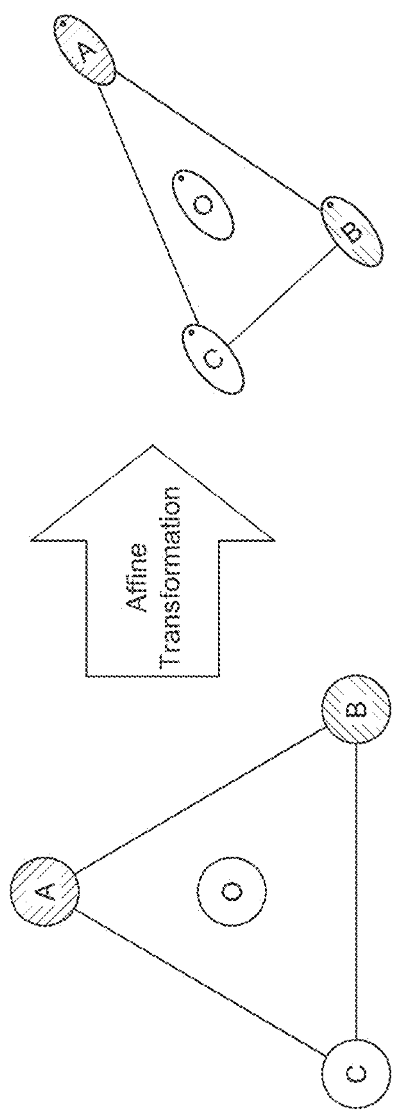

FIG. 177 illustrates an affine transformation using a triangle marker according to an exemplary embodiment.

Figure 178:
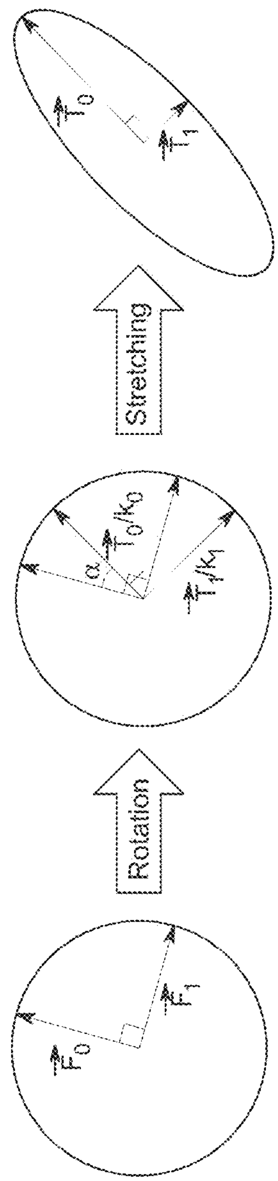

FIG. 178 illustrates the parameters of the rotation and stretching parts of the affine transformation, prior to the rotation, after the rotation, and after the stretching, according to an exemplary embodiment.

FIG. 179 illustrates imaging of a triangle of a triangle marker by the camera of an end effector, according to an exemplary embodiment.

Figure 180:
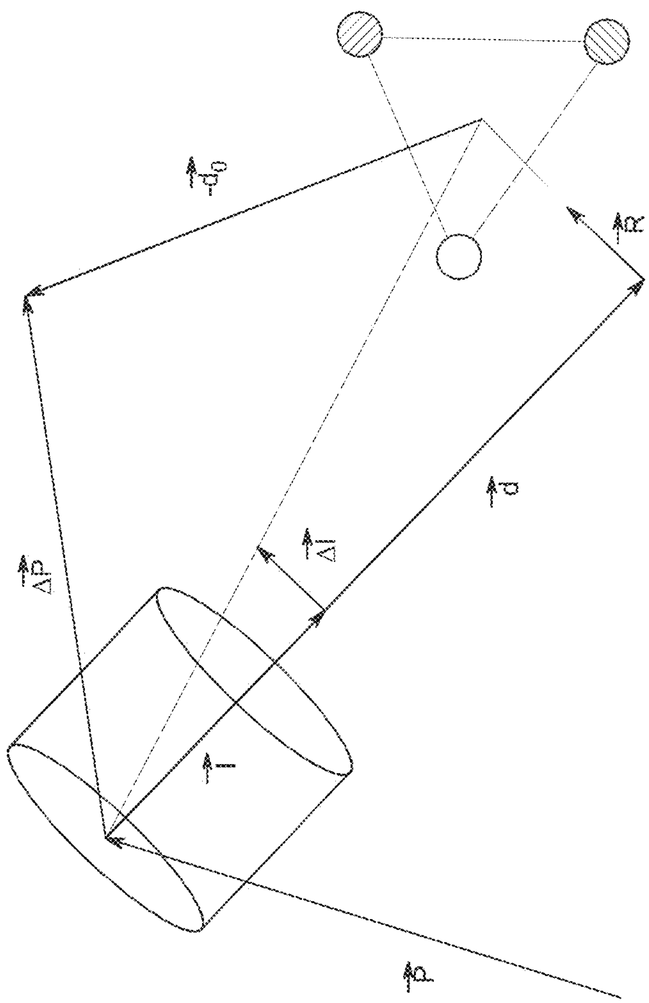

FIG. 180 illustrates the imaging of a triangle marker by a camera of an end effector, for calculating required movement of the camera, according to an exemplary embodiment.

Figure 181:
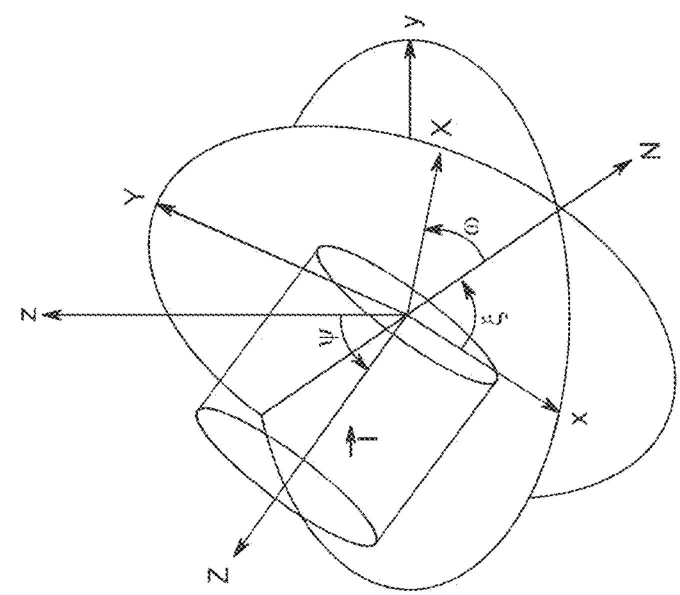

FIG. 181 illustrates the calculated angles used to translate from the camera's relative coordinate system to an absolute coordinate system, according to an exemplary embodiment.

Figure 182:
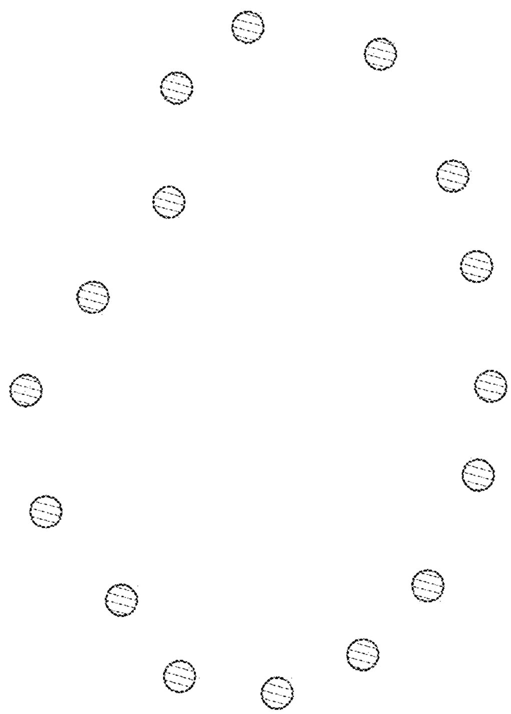

FIG. 182 illustrates a series of points defining a part of an object to be interacted with by an end effector, according to an exemplary embodiment.

Figure 183:
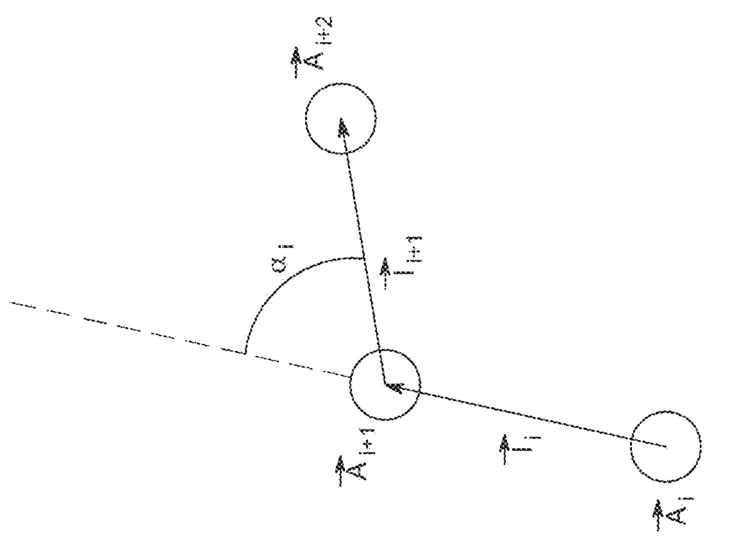

FIG. 183 illustrates parameters of an exemplary equation for finding the vectors of polygon sides and calculating their length and angles between consequent sides, with relation to three points from a series of points of an object's contour, according to an exemplary embodiment.

Figure 184:
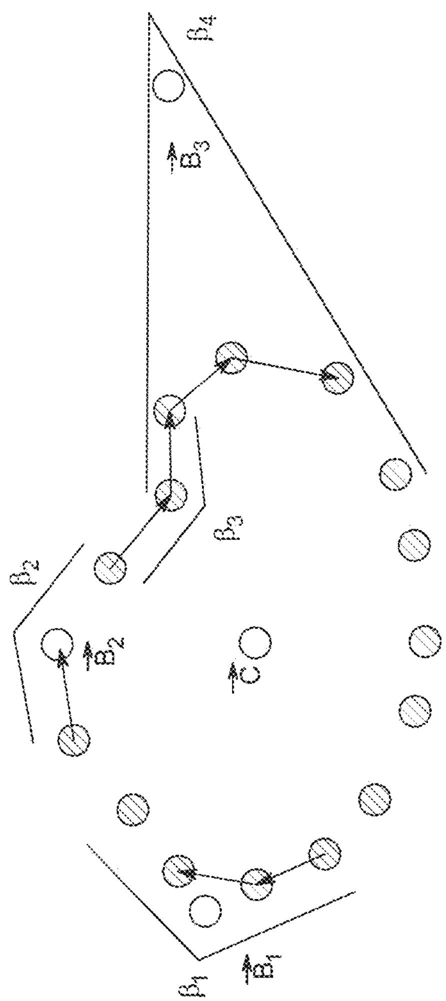

FIG. 184 illustrates a bend sequence made up of multiple bends, according to an exemplary embodiment.

Figure 185A:
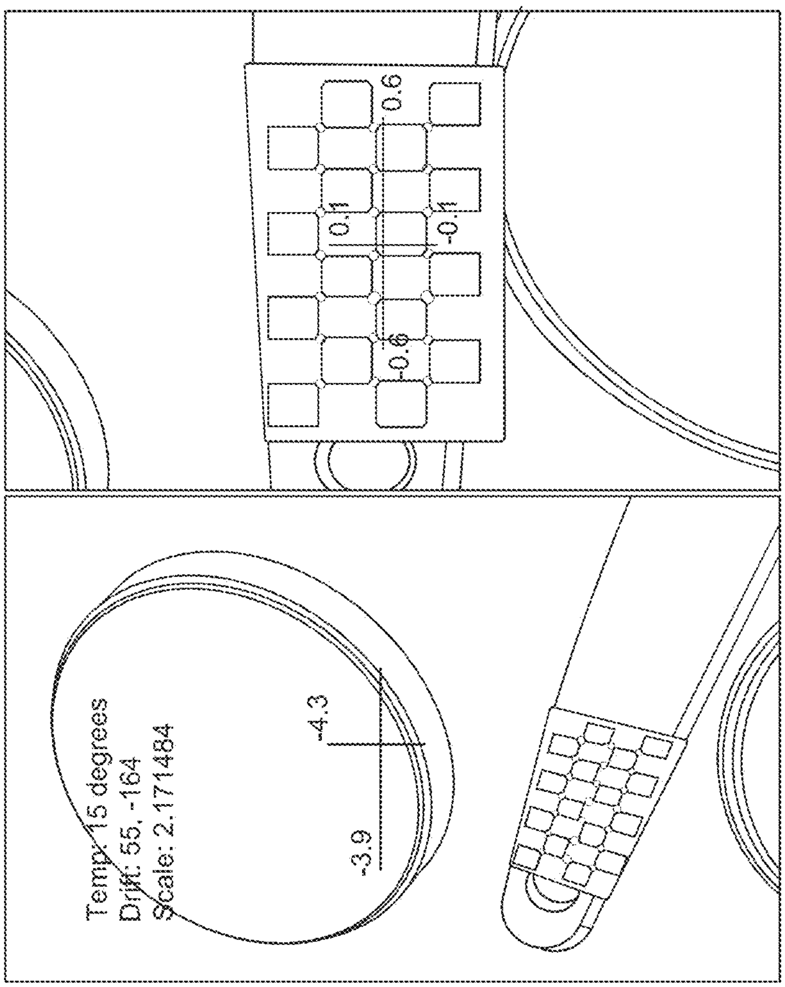

FIG. 185A illustrates a chessboard or checkerboard marker, according to an exemplary embodiment.

Figure 185B:
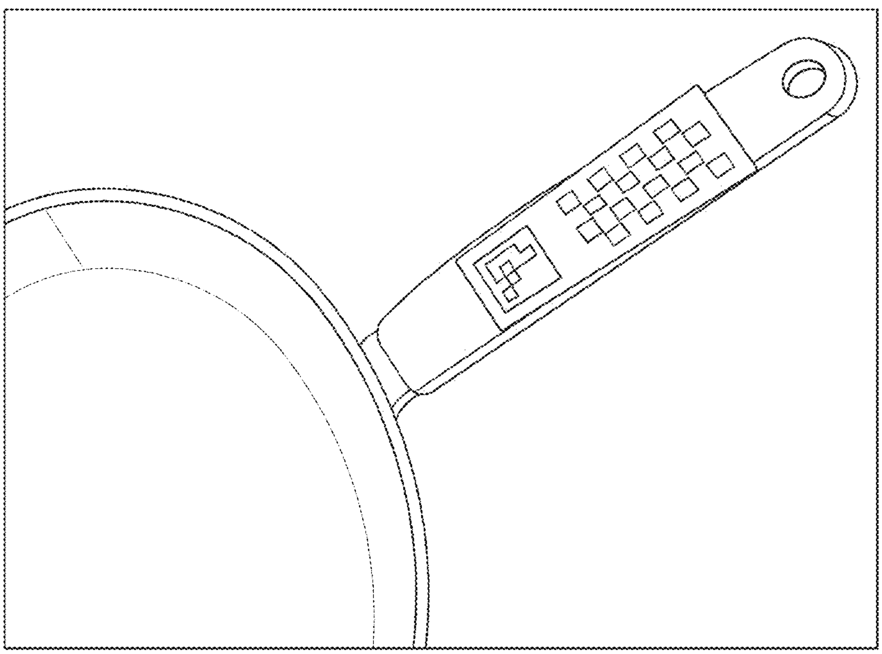

FIG. 185B illustrates a combination marker made up of a chessboard or checkerboard marker and an ArUco marker, according to an exemplary embodiment.

Figure 186:
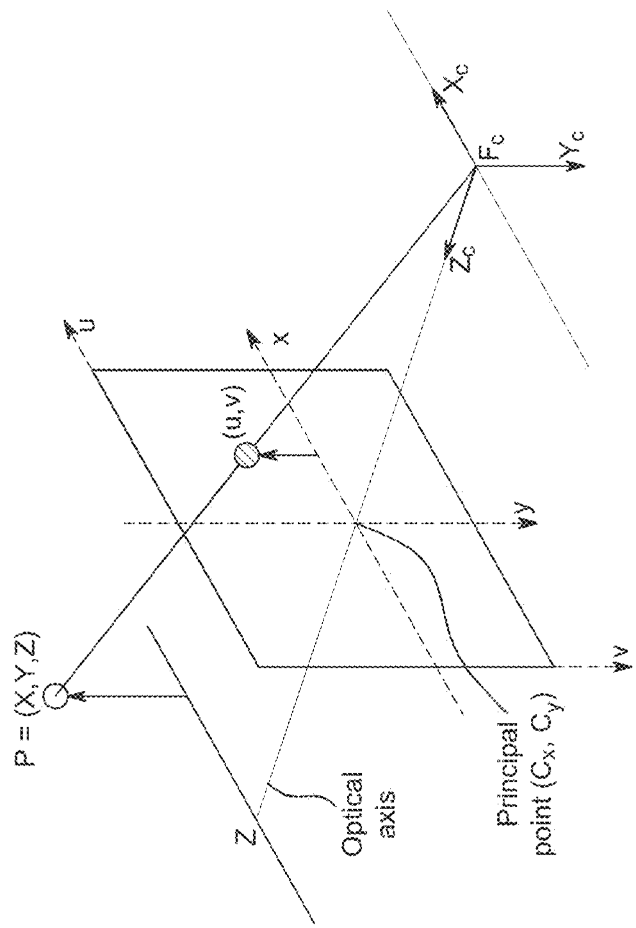

FIG. 186 illustrates exemplary angles, coordinates and measurements for performing marker based positioning, according to an exemplary embodiment.

Figure 187A:
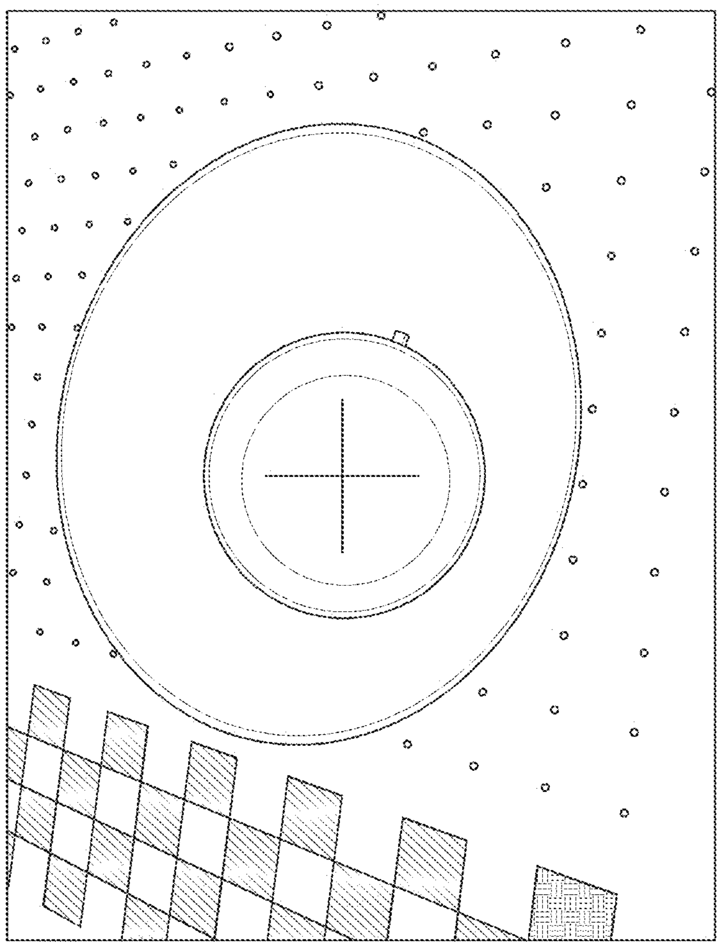

FIG. 187A illustrates exemplary features of a non-standard object identified using a feature analysis algorithm, according to an exemplary embodiment.

Figure 187B:
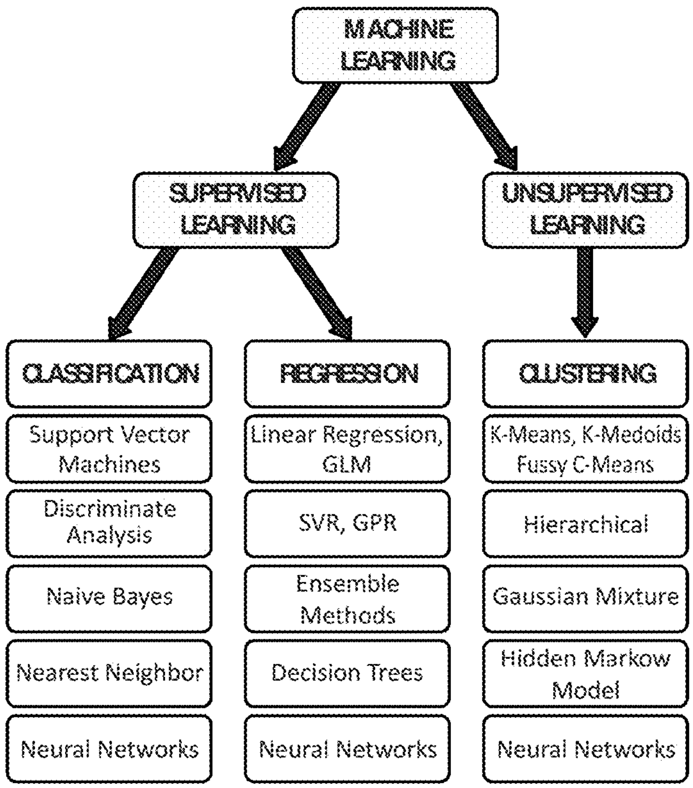

FIG. 187B illustrates broad classification of machine learning algorithms, according to an exemplary environment.

Figure 187C:
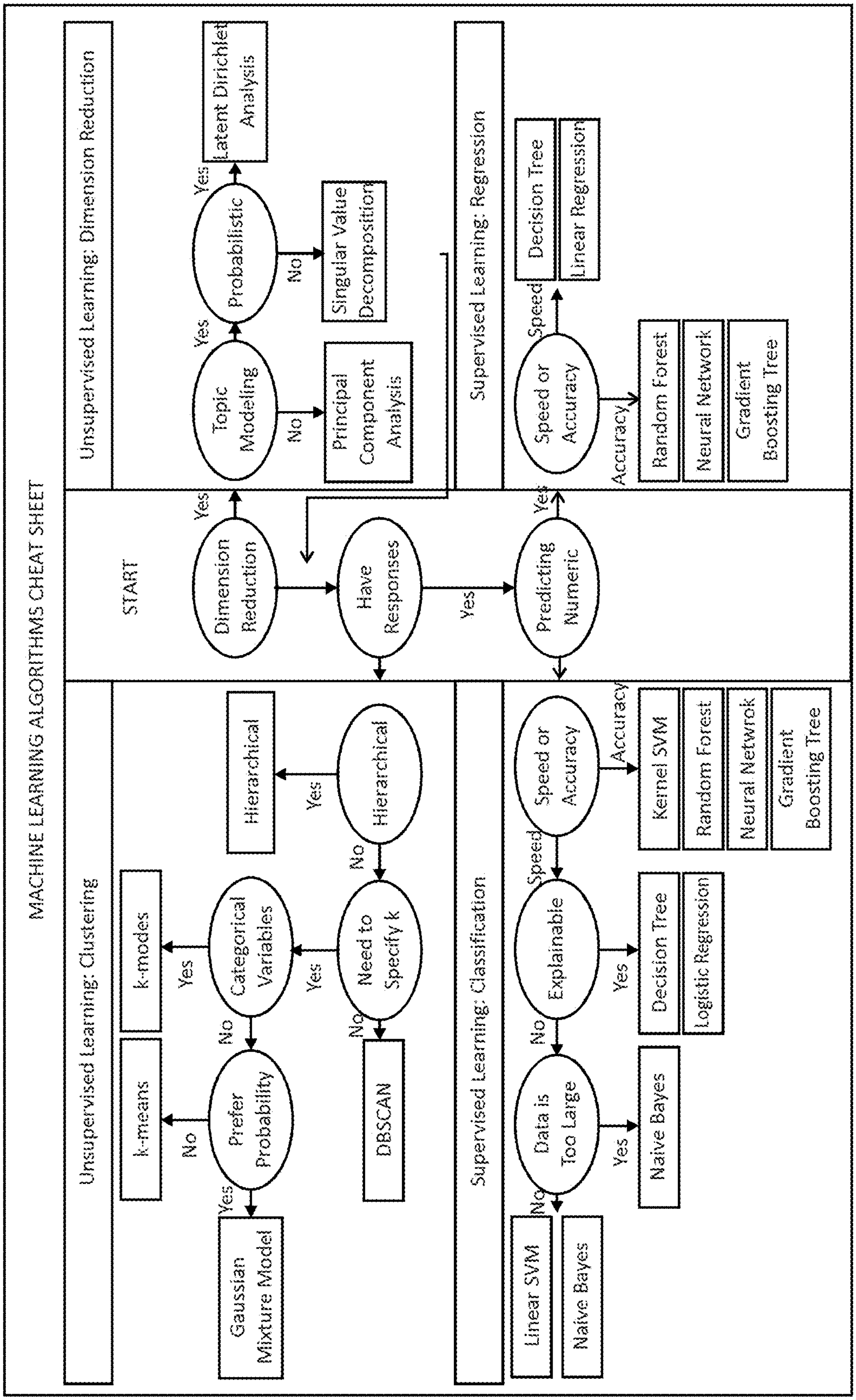

FIG. 187C illustrates essentials of a machine learning algorithm, according to an exemplary environment.

Figure 188:
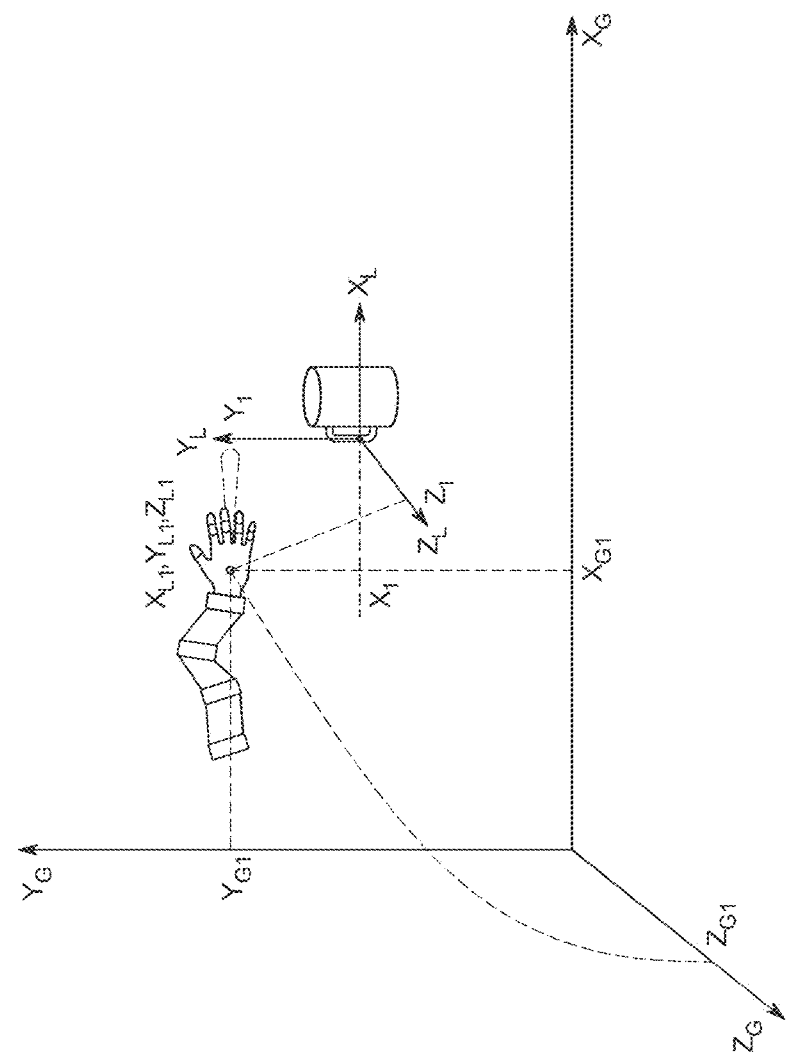

FIG. 188 illustrates movements on a local and a global coordinate system, according to an exemplary embodiment.

Figure 189:
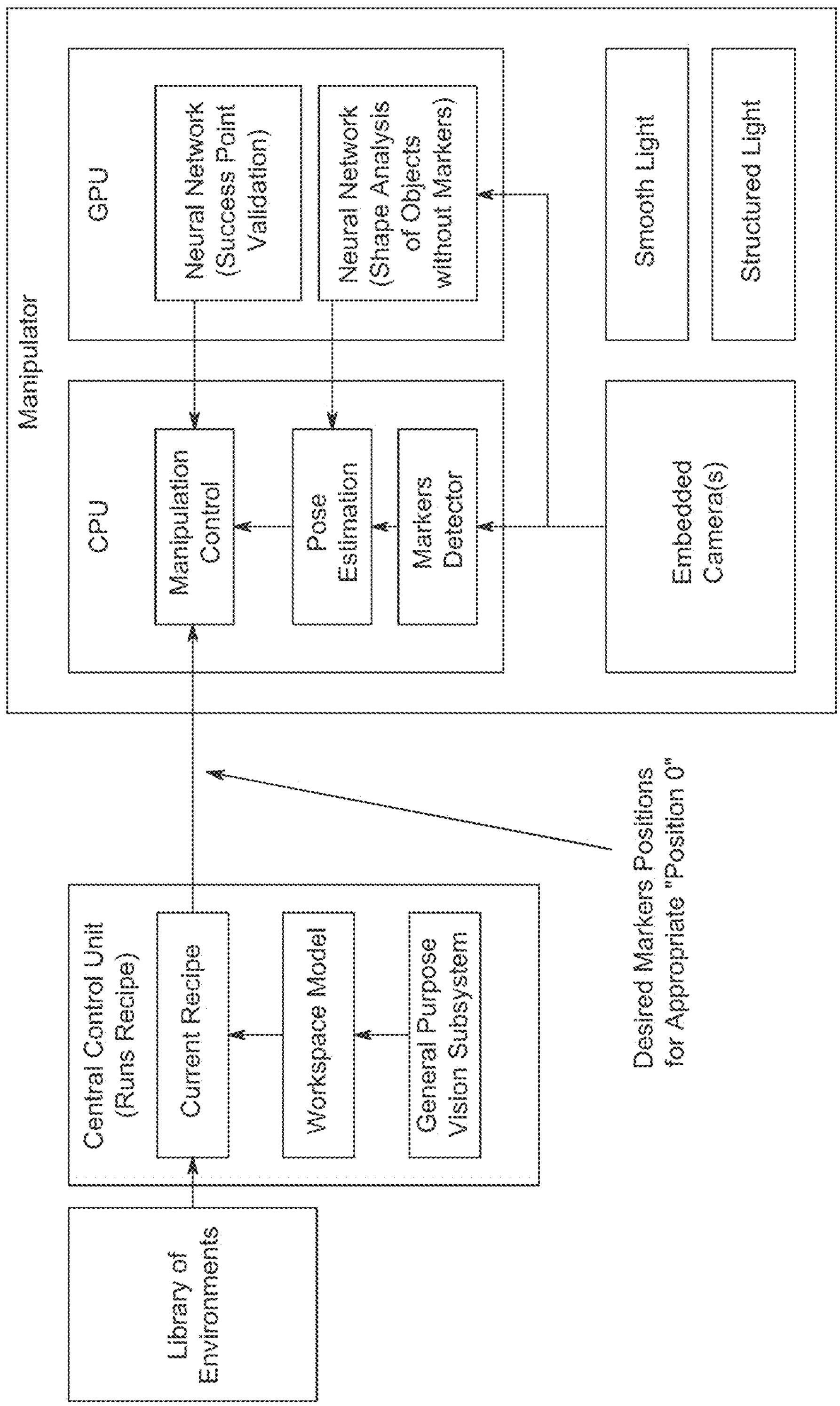

FIG. 189 is a system diagram of an embedded vision subsystem of a robotic assistant, according to an exemplary embodiment.

FIG. 190A-FIG. 190D illustrates exemplary embodiments of a storage unit (drawers) of an electronic inventory system, according to an exemplary environment.

Figure 190A:
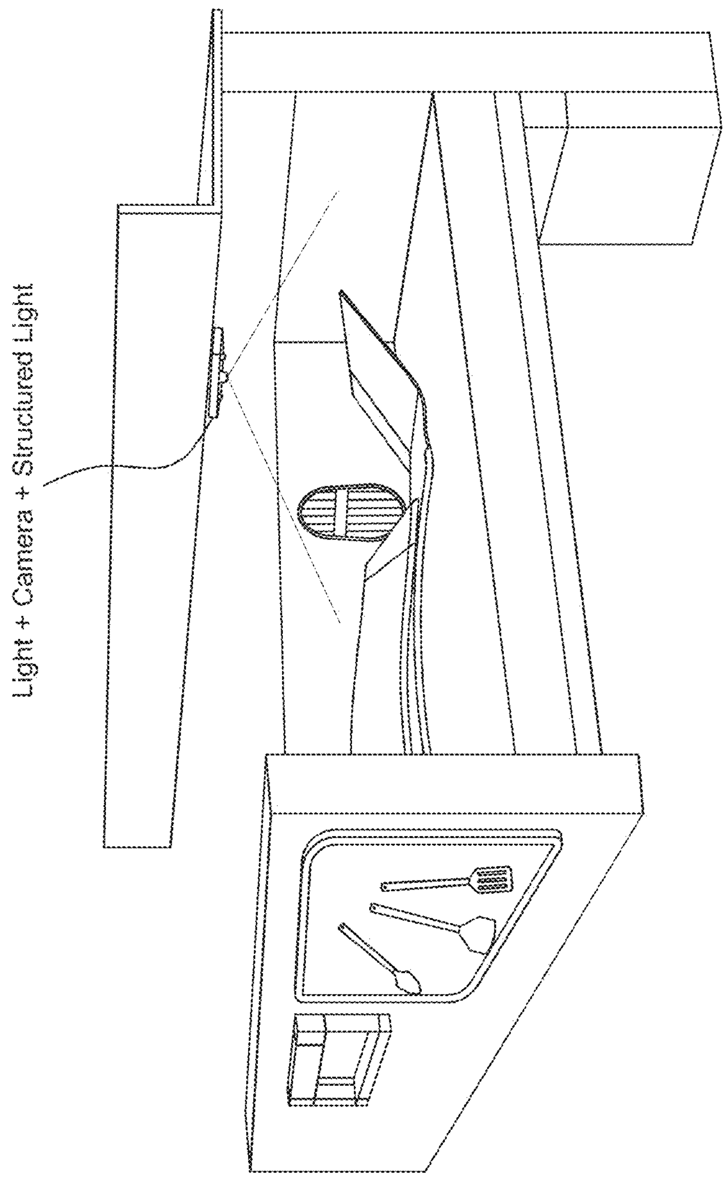
Figure 190B:
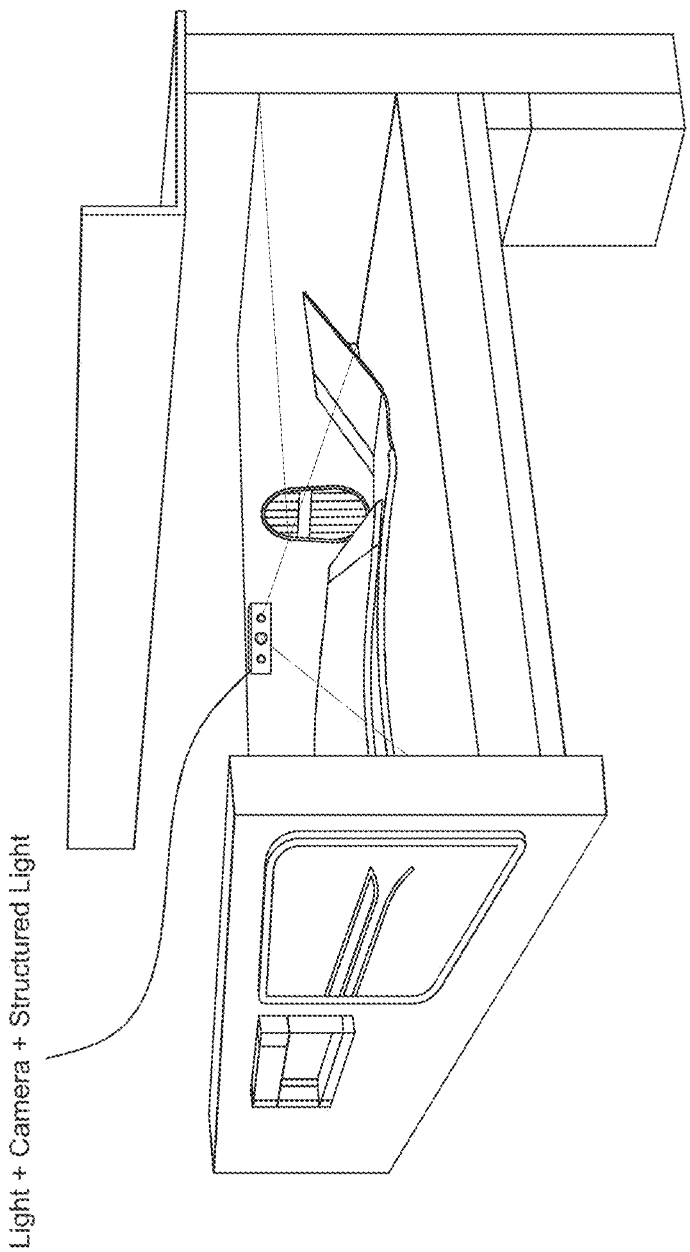
Figure 190C:
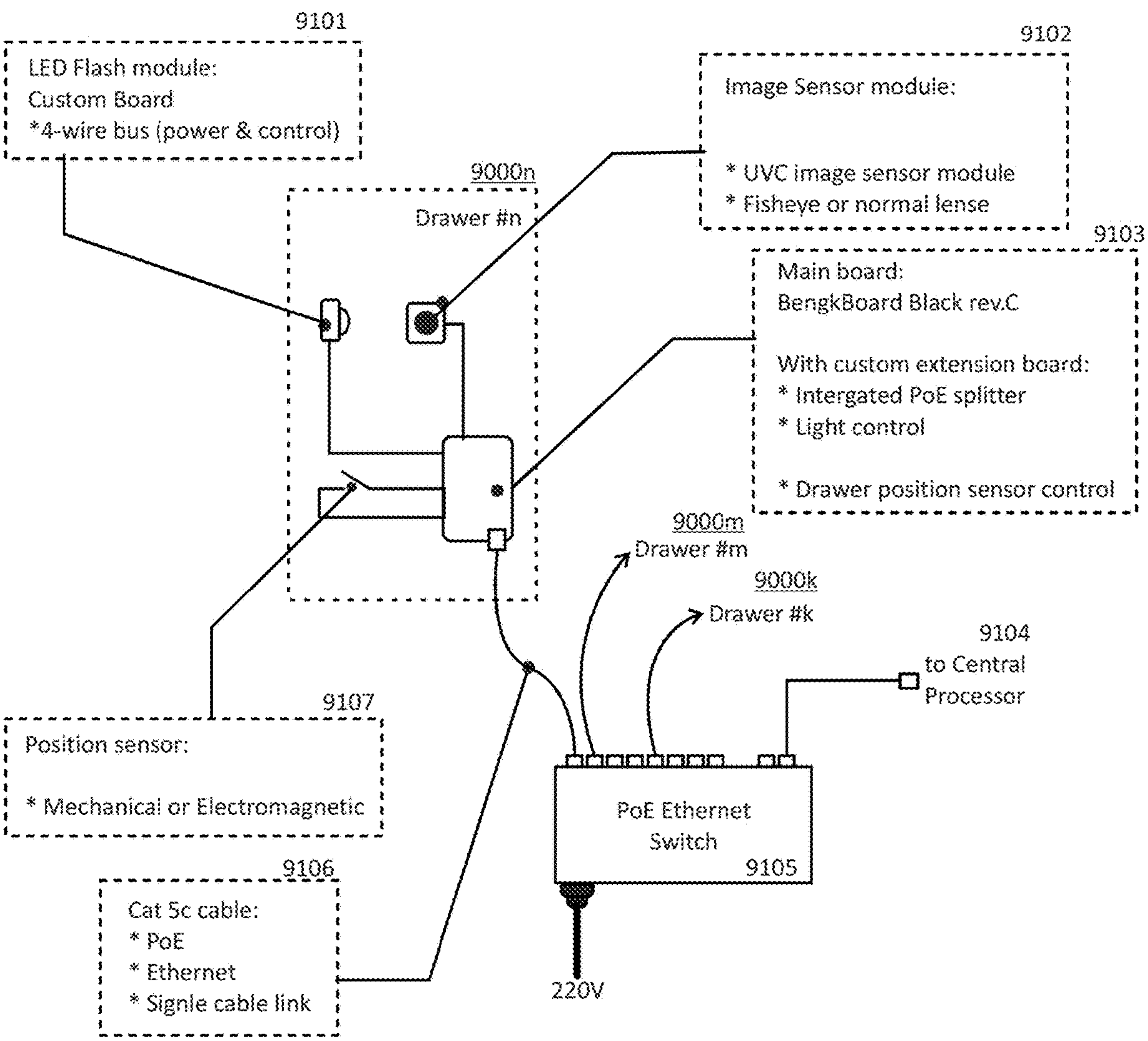
Figure 190D:
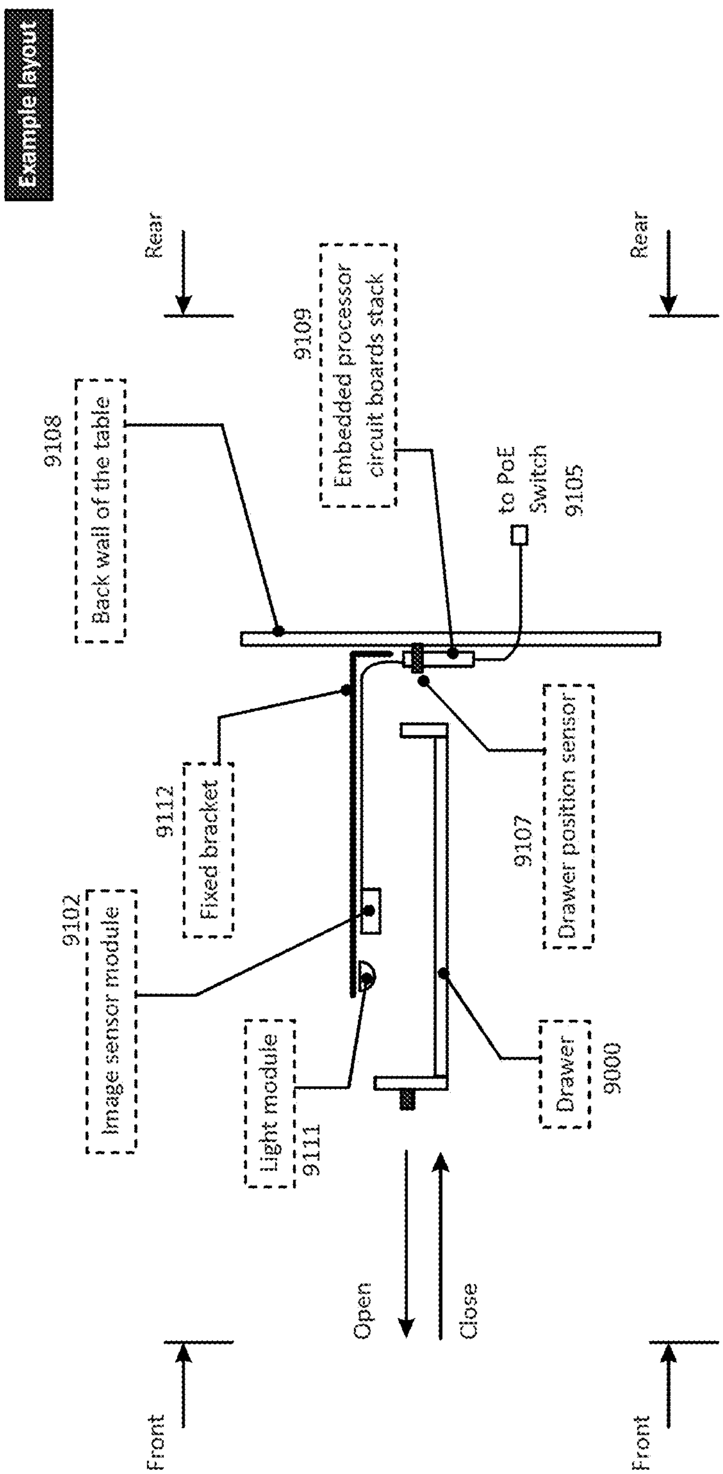
Figure 190E:
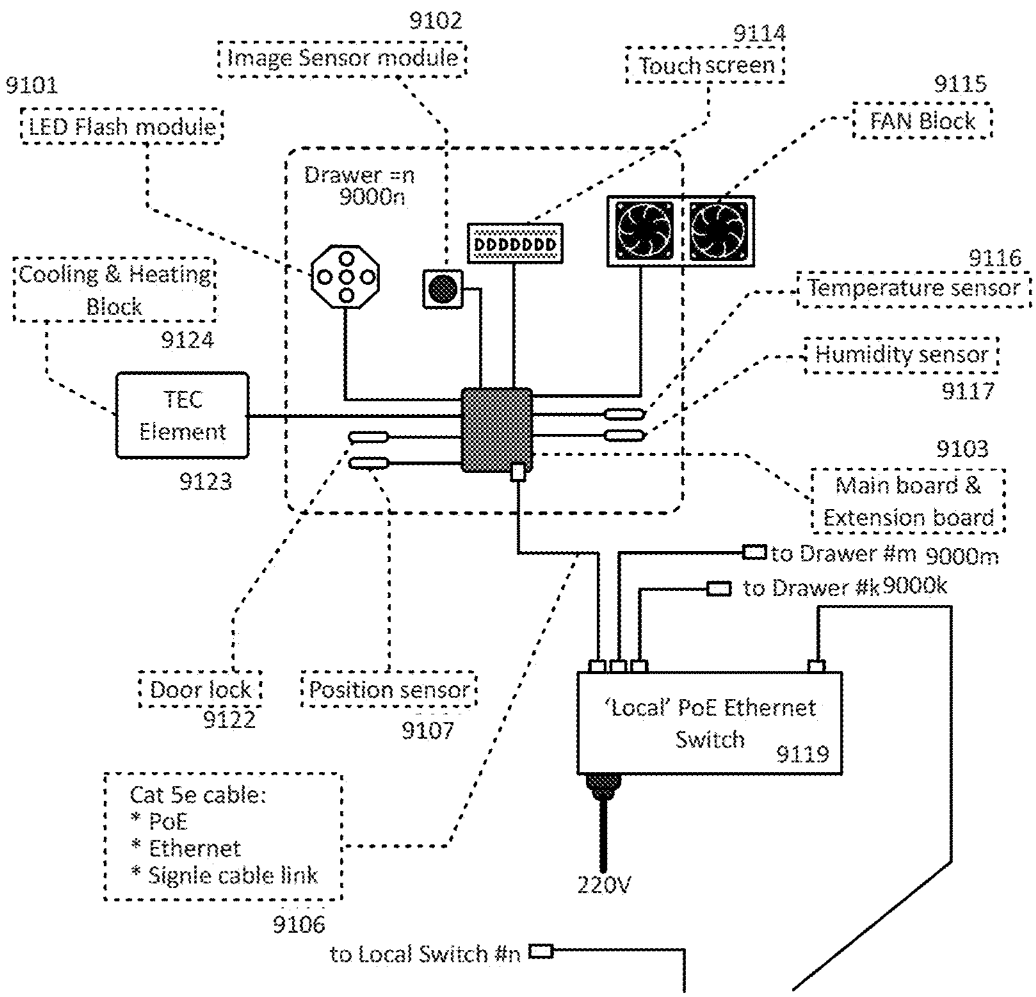

FIG. 190E illustrates an example scheme of main components of a storage unit (drawers) of an electronic inventory system, according to an exemplary environment.

Figure 190F:
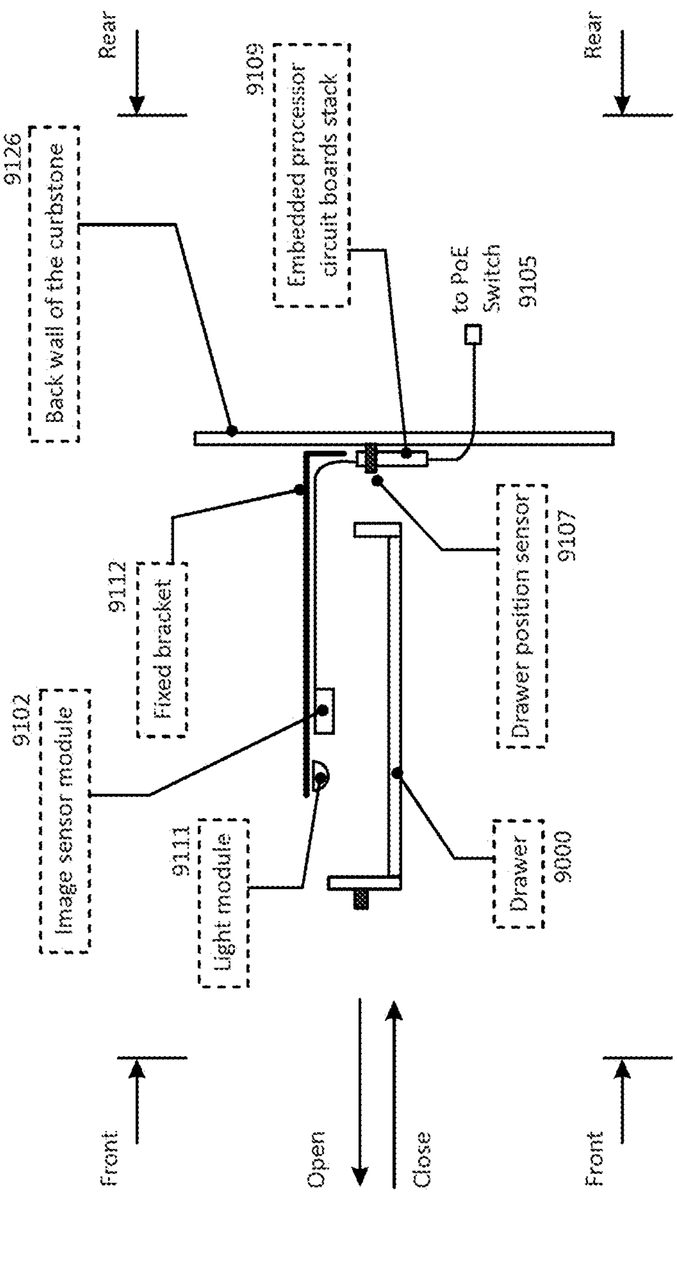

FIG. 190F illustrates an exemplary constructive arrangement of the modules of the one or more embedded processors in the storage unit, according to an exemplary environment.

Figure 190G:
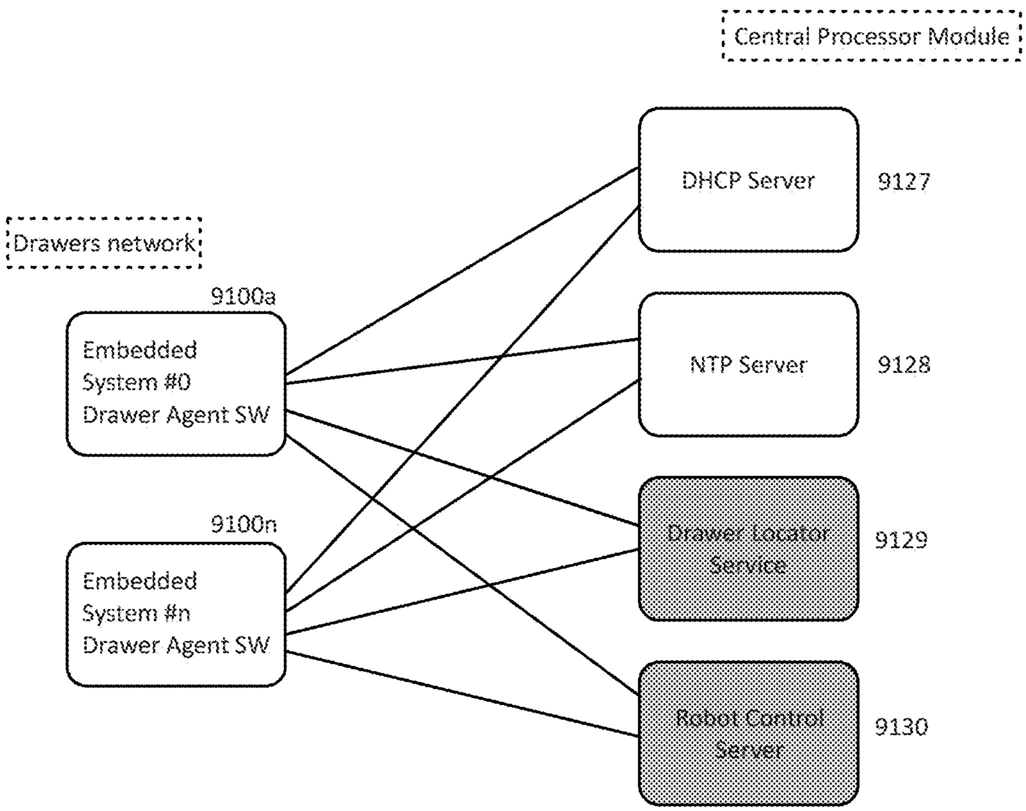

FIG. 190G illustrates various components of the client-server environment in an electronic inventory system, according to an exemplary environment.

Figure 191A:
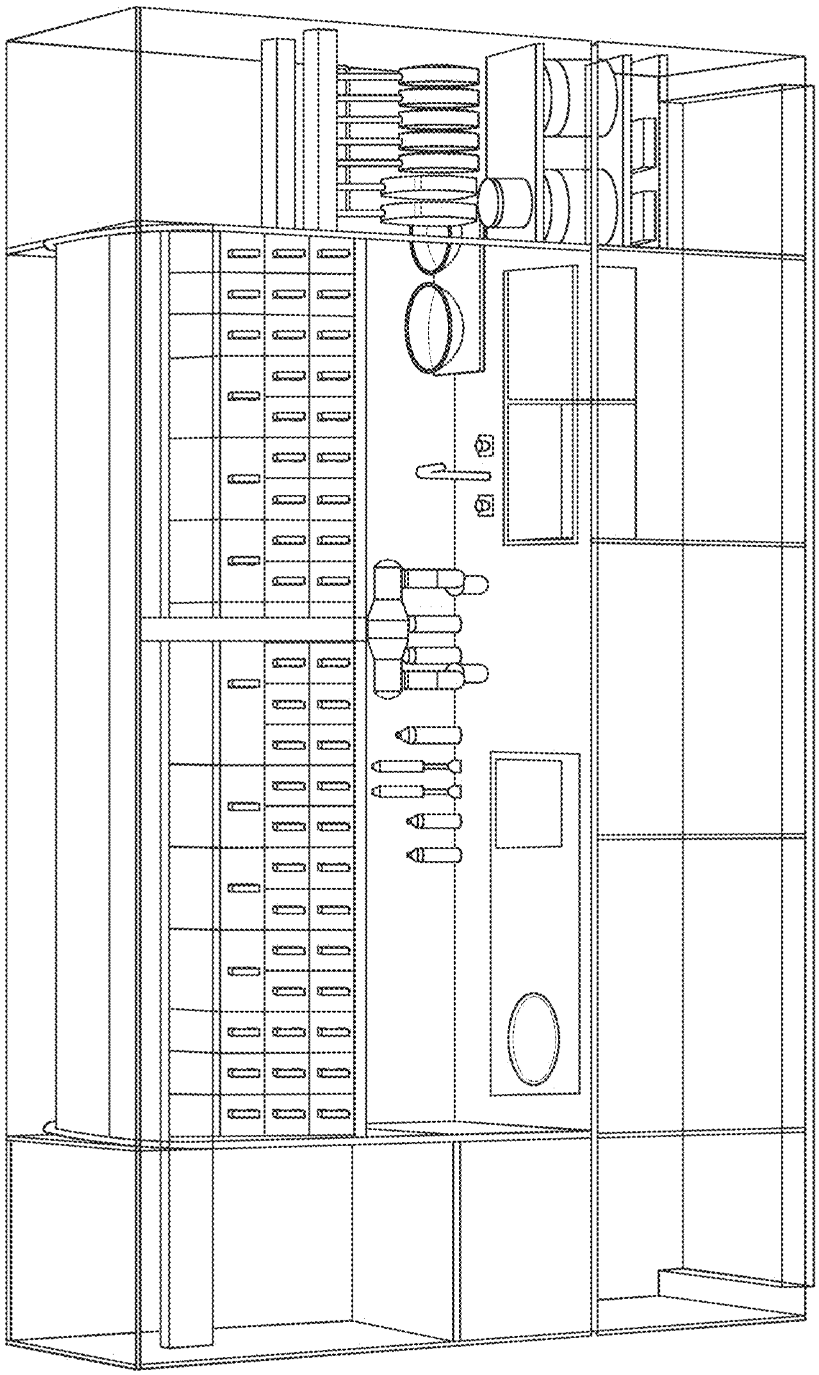

FIG. 191A is a perspective view of a computer-controlled kitchen, according to an exemplary embodiment.

Figure 191B:
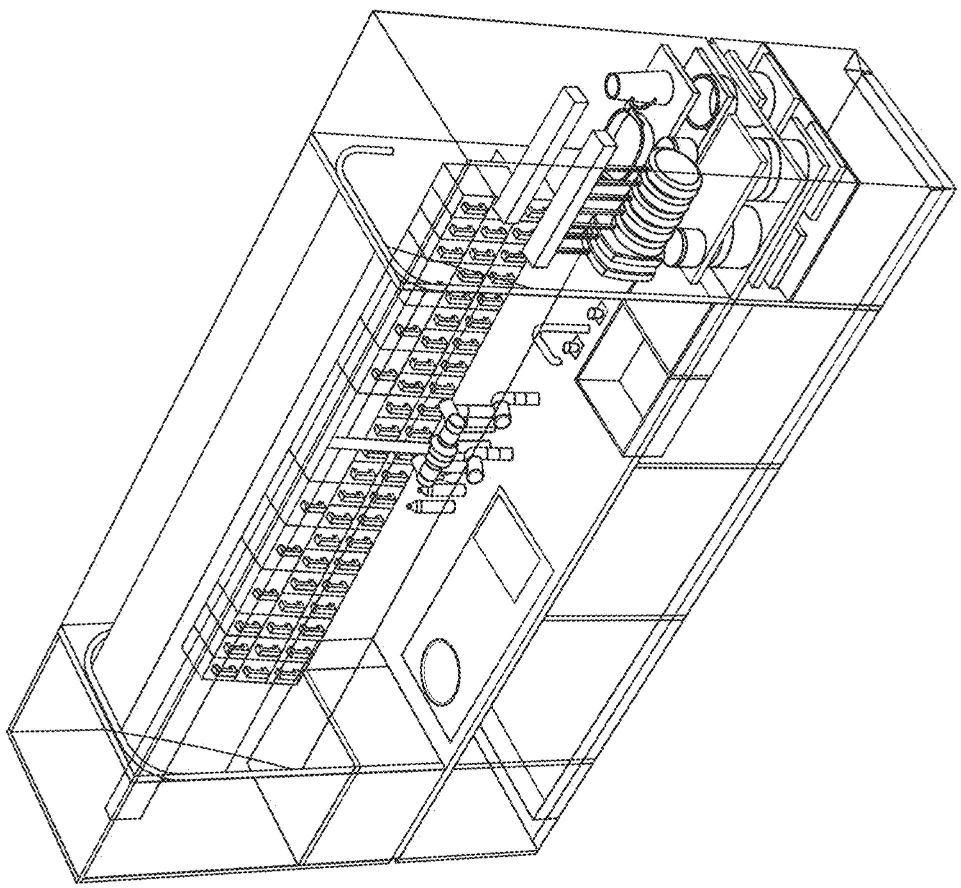

FIG. 191B is a perspective view of a computer-controlled kitchen, according to an exemplary embodiment.

Figure 191C:
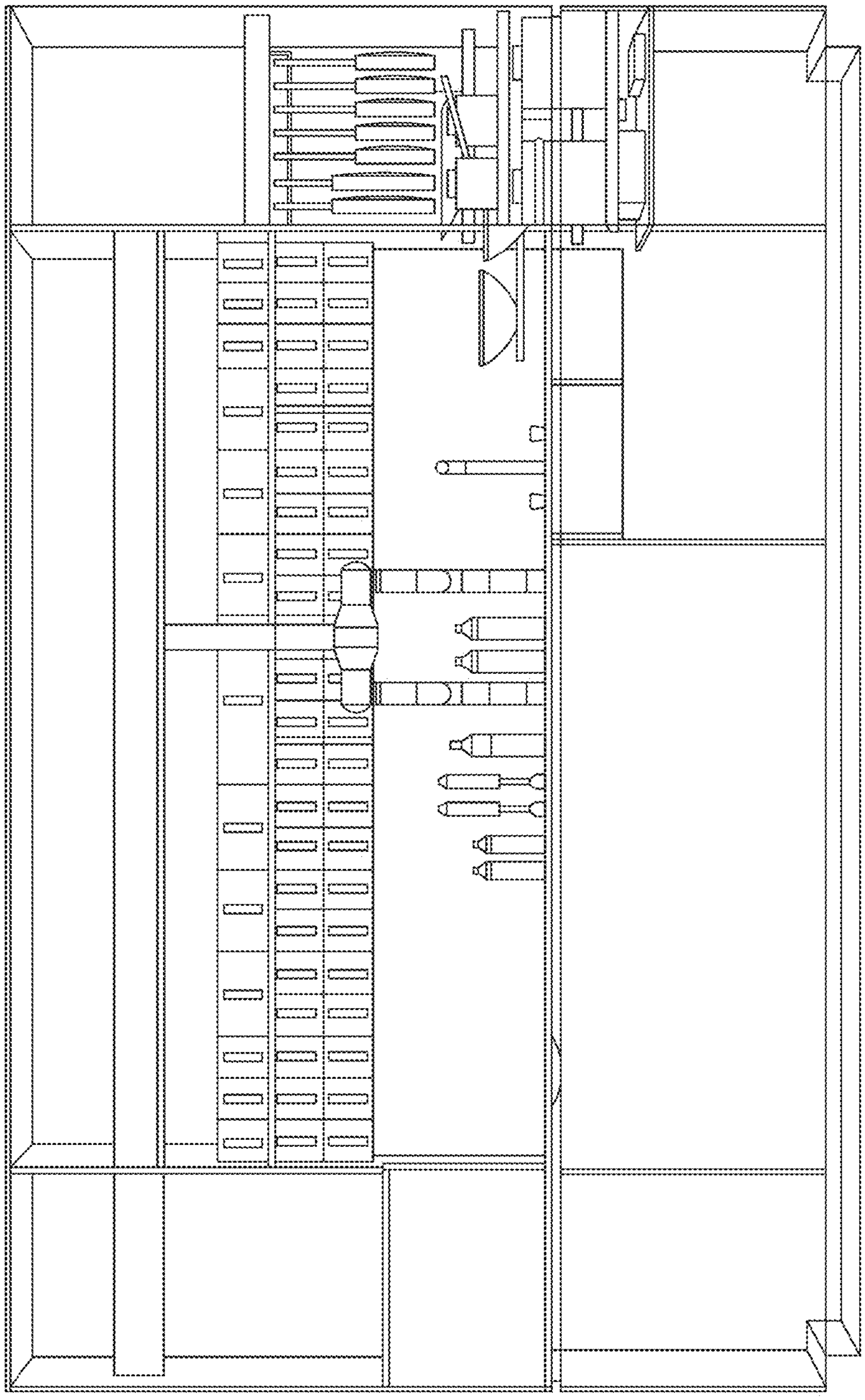

FIG. 191C is a front view of a computer-controlled kitchen, according to an exemplary embodiment.

Figure 191D:
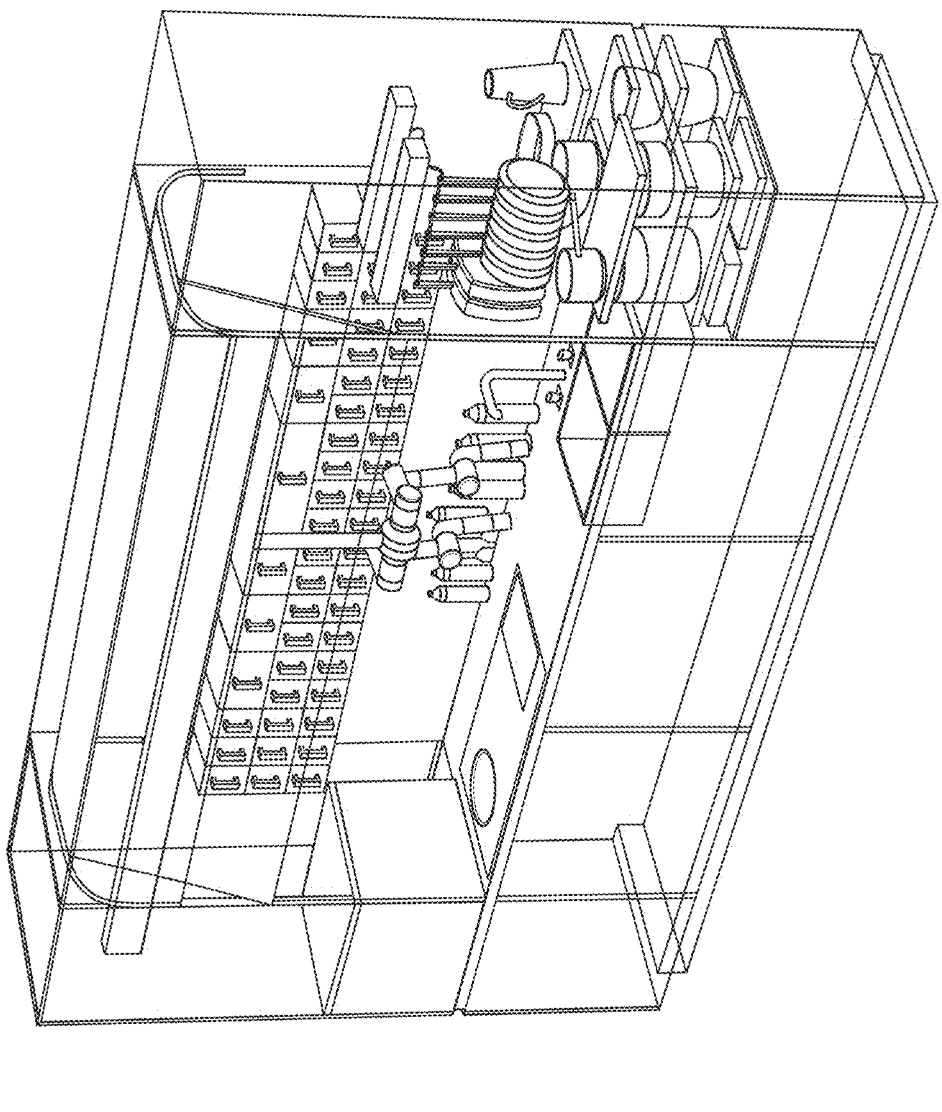

FIG. 191D is a perspective view of a computer-controlled kitchen, according to an exemplary embodiment.

Figure 192A:
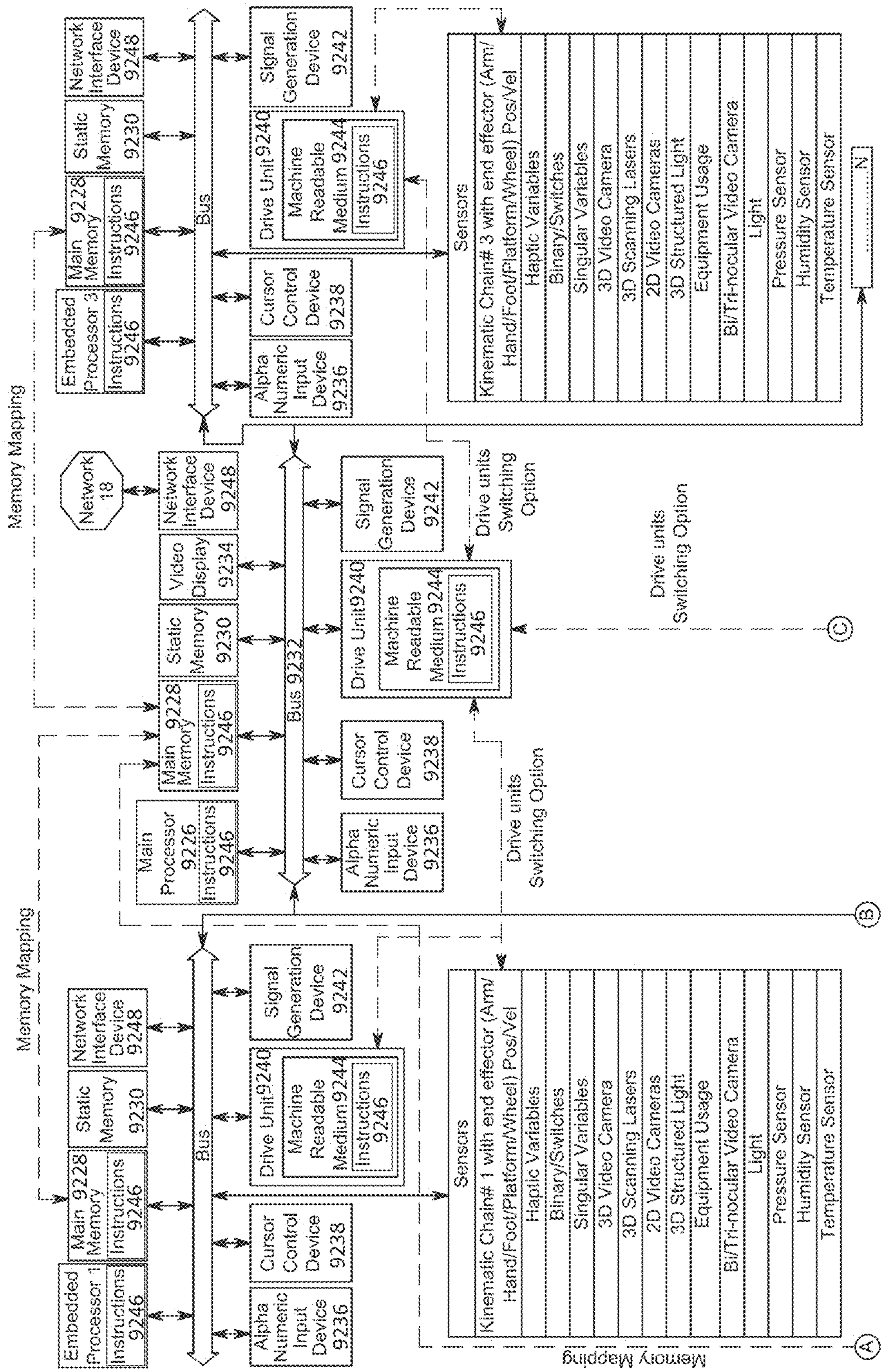
Figure 192B:
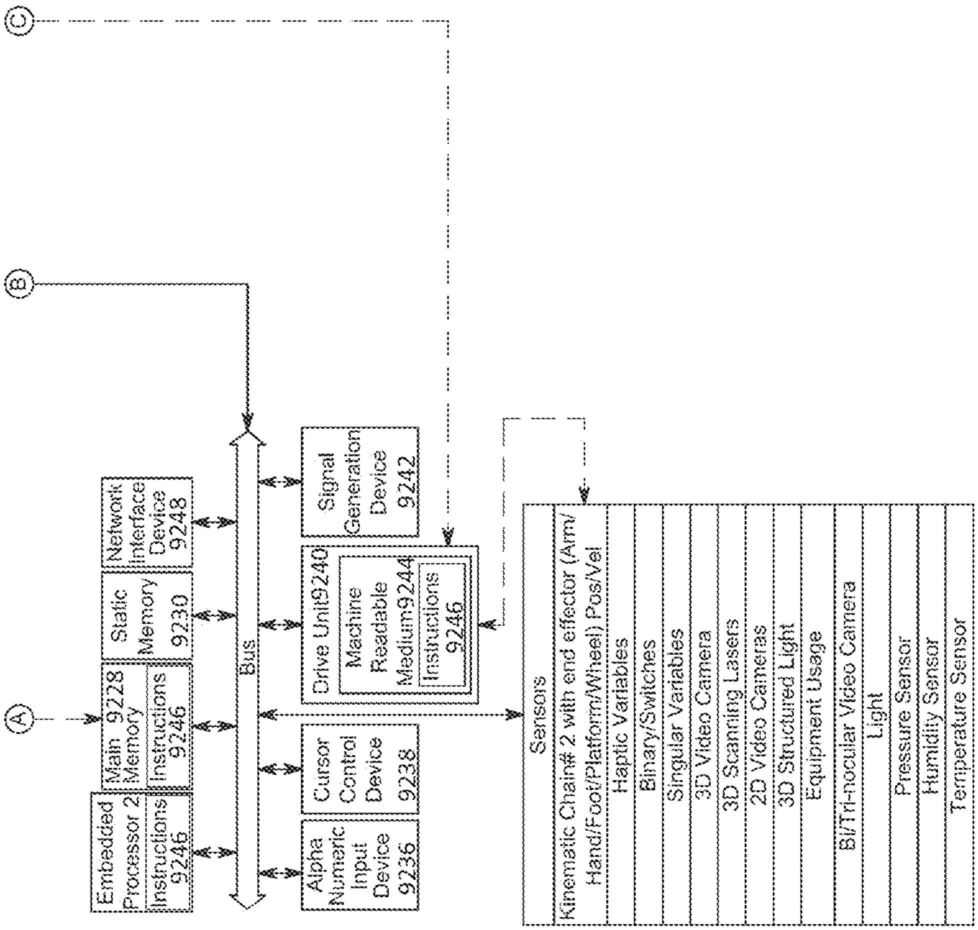

FIGS. 192A and 192B are a block diagram of the components of a robotic assistant, according to an exemplary embodiment.

Figure 192C:
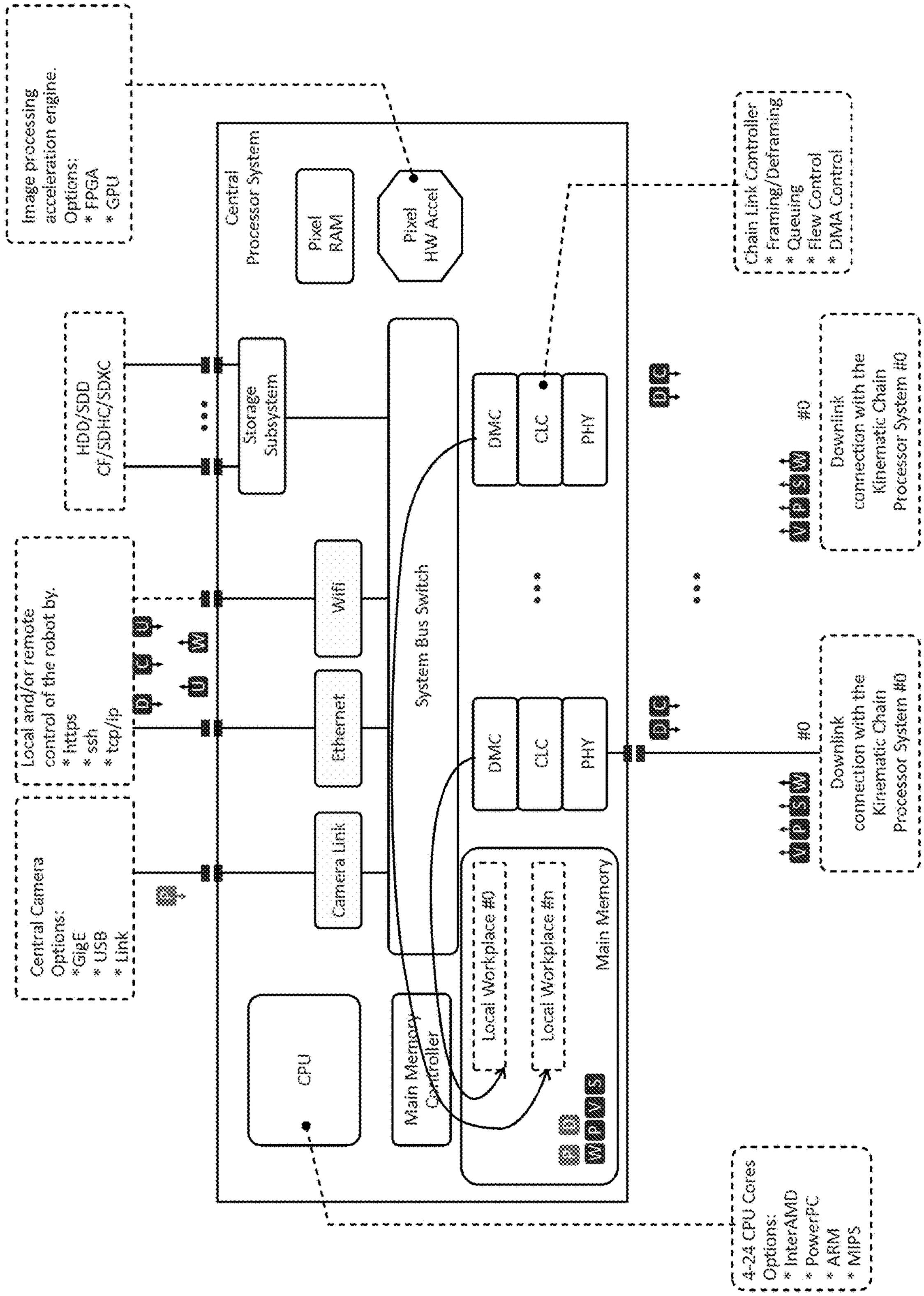
Figure 192D:
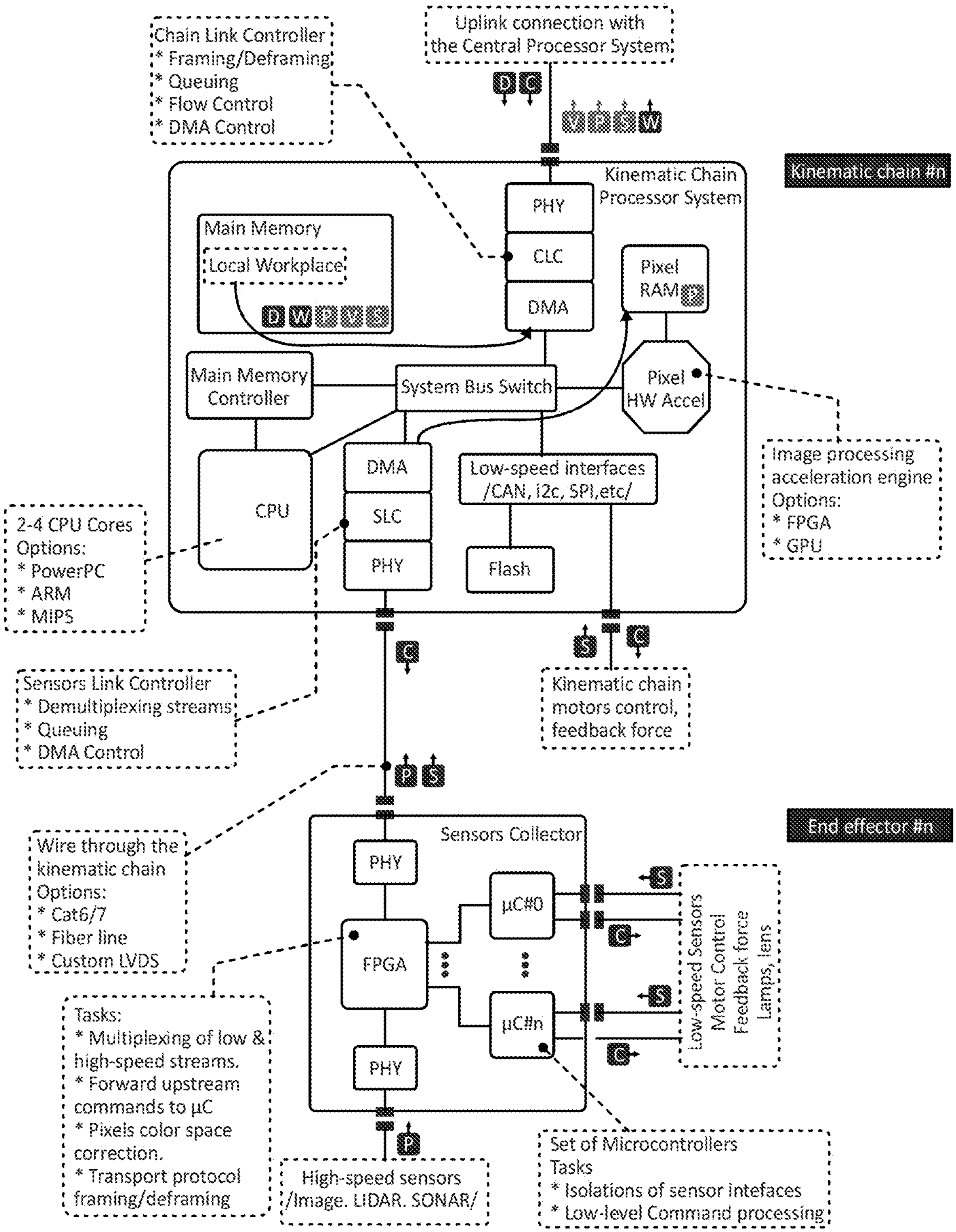

FIGS. 192C-FIG. 192D illustrates three-tier composition 1 and composition 2 of top-level subsystems of a robotic assistant system, according to an exemplary environment.

Figure 193:
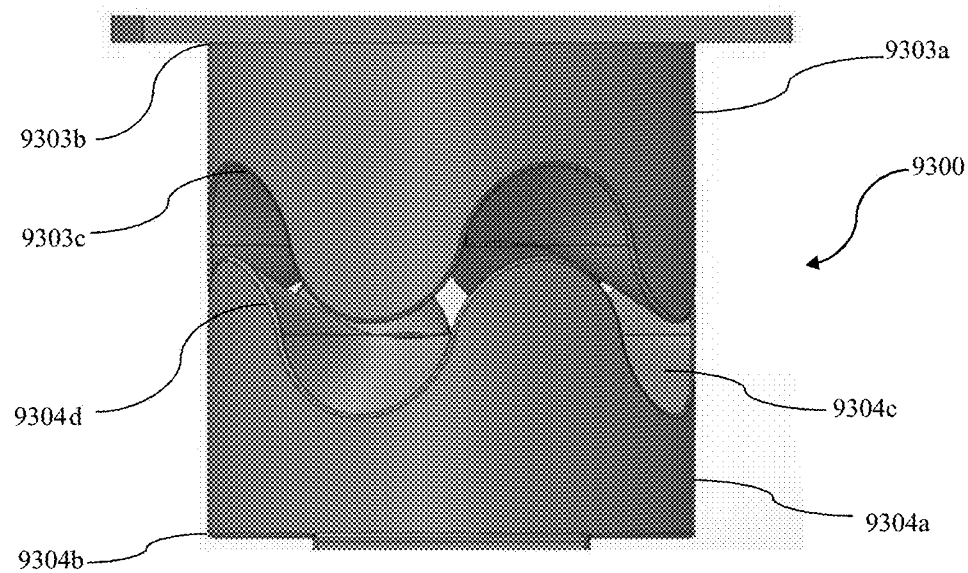

FIG. 193 illustrates an exploded view of a coupling device for coupling one or more objects with a robotic system, according to an embodiment of the present disclosure.

Figure 194:
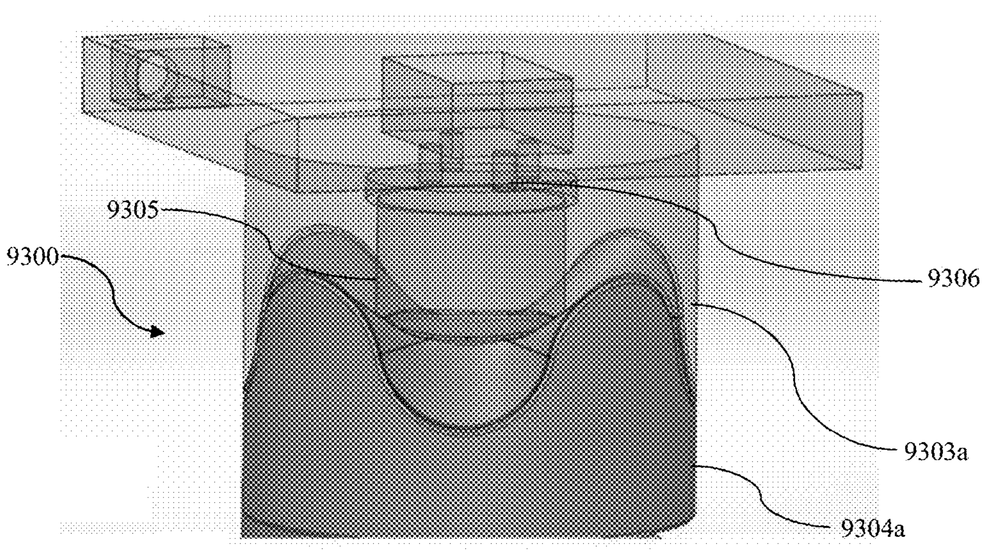

FIG. 194 illustrates a perspective view of the coupling device of FIG. 1*a*, with a first coupling member and a second coupling member coupled to each other.

Figure 195A:
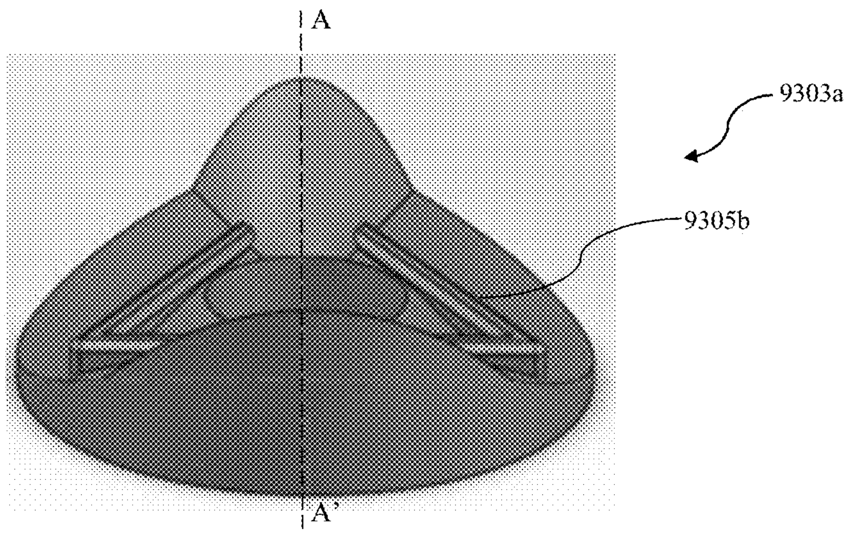

FIG. 195*a* illustrates a perspective view of the first coupling member with at least one protrusion, according to an embodiment of the present disclosure.

Figure 195B:
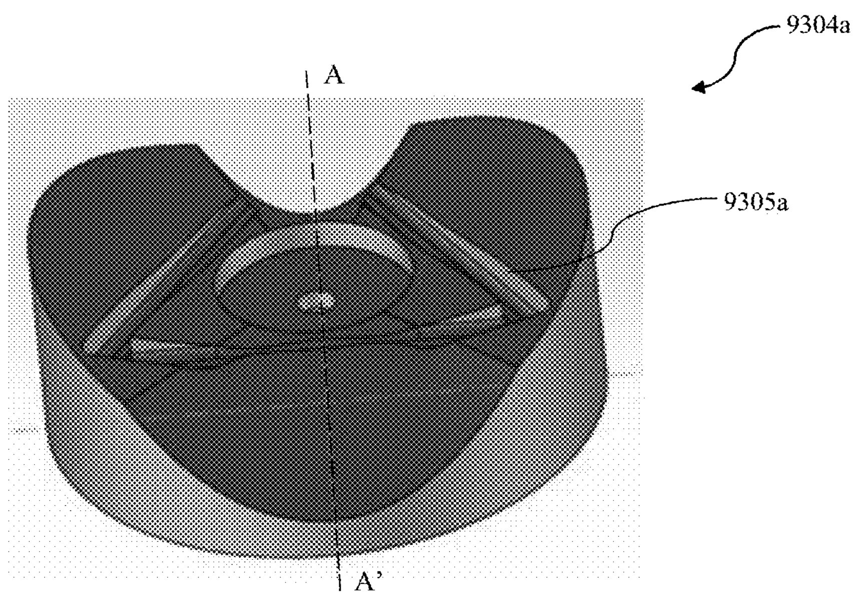

FIG. 195*b* illustrates a perspective view of the second coupling member with at least one notch, according to an embodiment of the present disclosure.

Figure 195C:
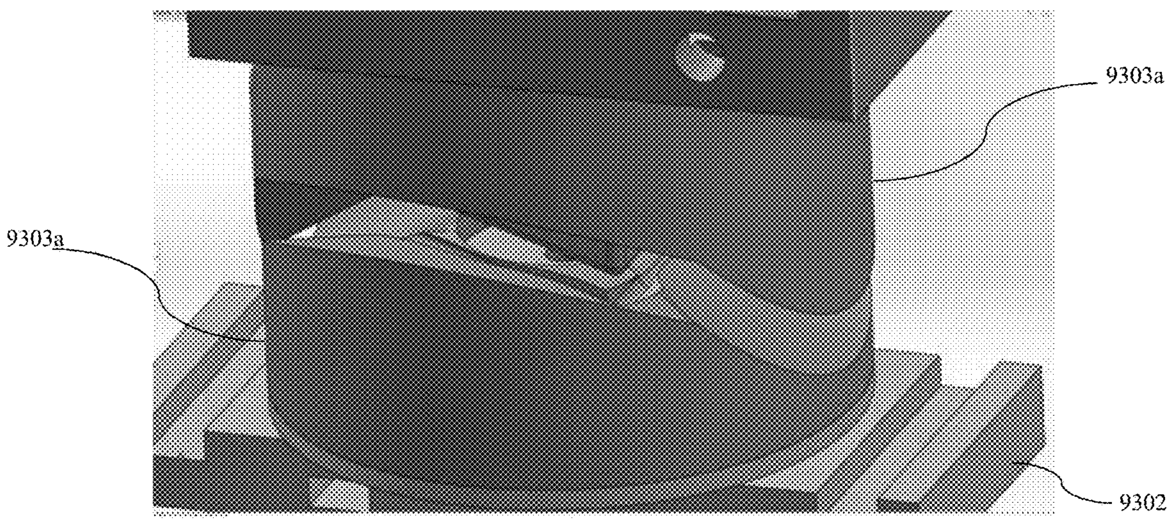

FIG. 195*c* illustrates a perspective view of engagement of the first coupling member of FIG. 195*a*, with the second coupling member of FIG. 195*b*, according to an embodiment of the present disclosure.

Figure 195D:
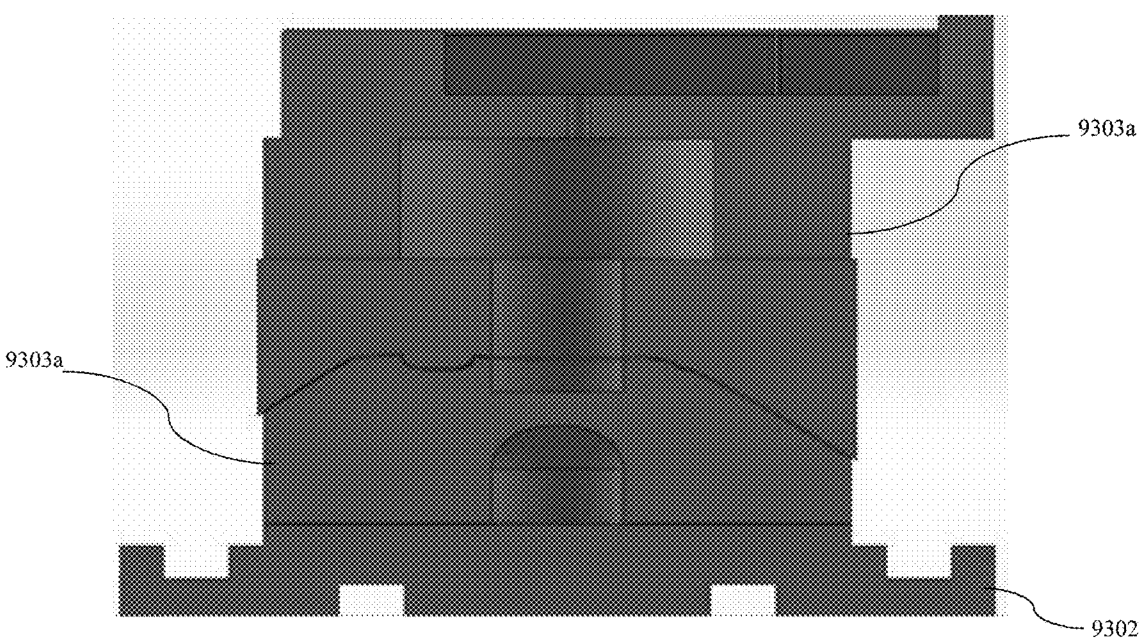
Figure 195E:
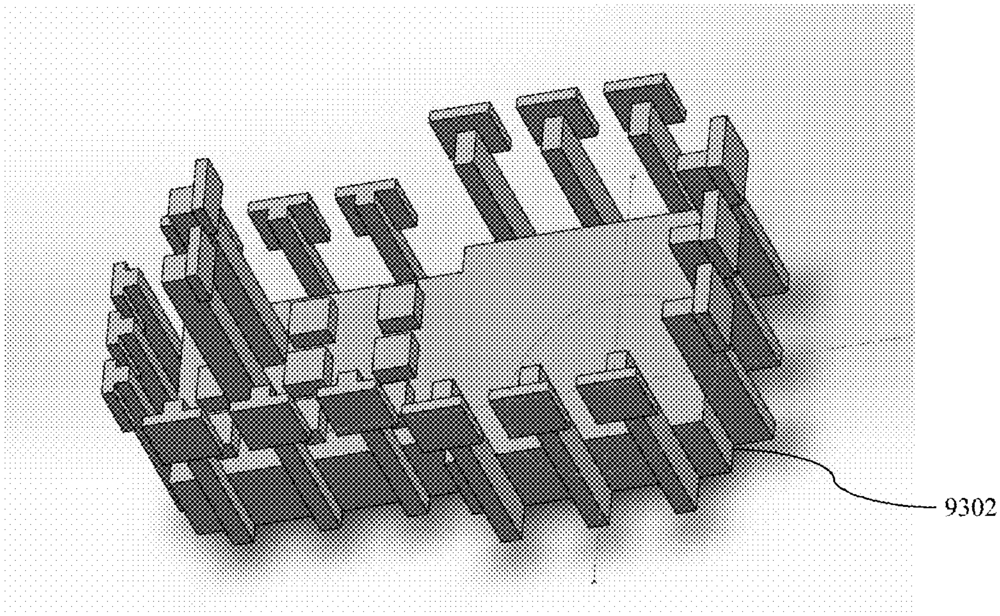

FIG. 195*d* illustrates a side view of the first coupling member of FIG. 195*a* coupled with the second coupling member of FIG. 195*b*, according to an embodiment of the present disclosure. FIG. 195*e* illustrates a perspective view of the one or more objects for simulation, according to an embodiment of the present disclosure.

Figure 195F:
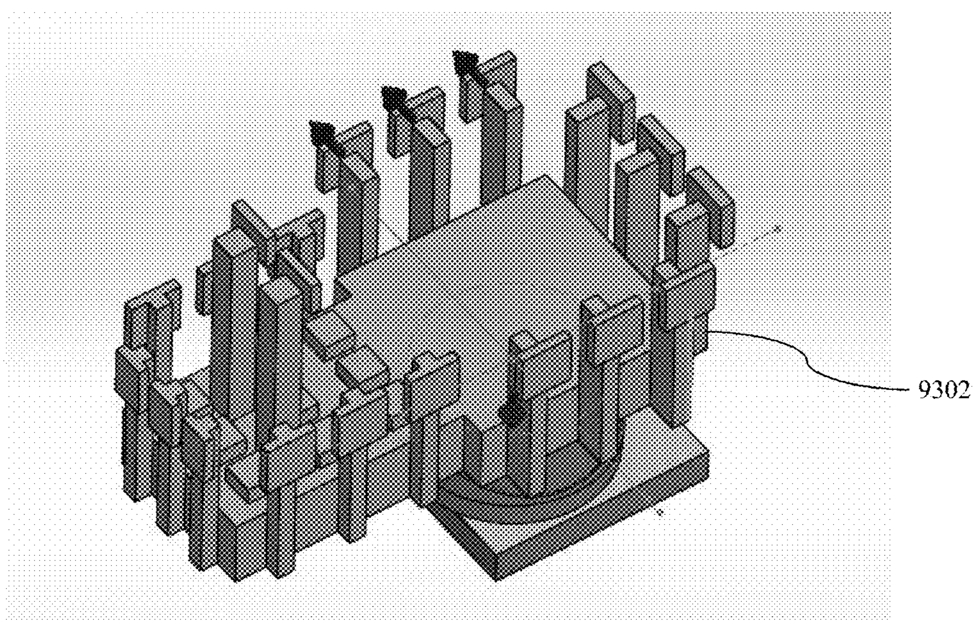
Figure 195G:
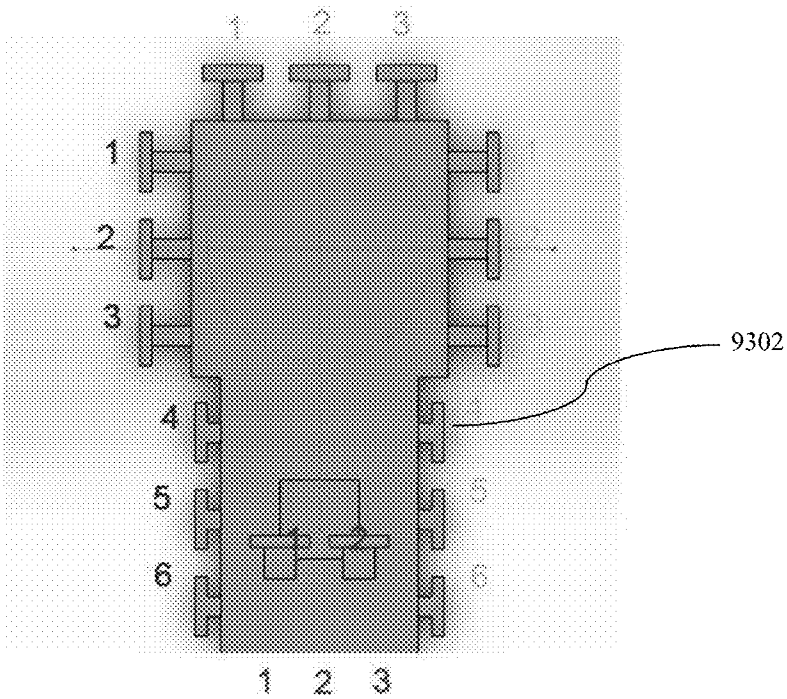

FIG. 195*f* illustrates a perspective view of the one or more objects of FIG. 3*e* subjected to loads at different locations, according to an embodiment of the present disclosure. FIG. 195*g* illustrates a top view of the one or more objects of FIG. 3*e* subjected to loads at different locations, according to an embodiment of the present disclosure. FIG. 196*a*-196*d* illustrate an embodiment of the coupling device with circular locking mechanism, according to another embodiment of the present disclosure.

FIGS. 197*a*-197*e* illustrate an embodiment of the coupling device with electromagnetic locking mechanism, according to another embodiment of the present disclosure.

FIGS. 198*a*-198*d* illustrate pictorial representation of kitchen appliances with the second coupling member, according to an embodiment of the present disclosure.

Figure 199A:
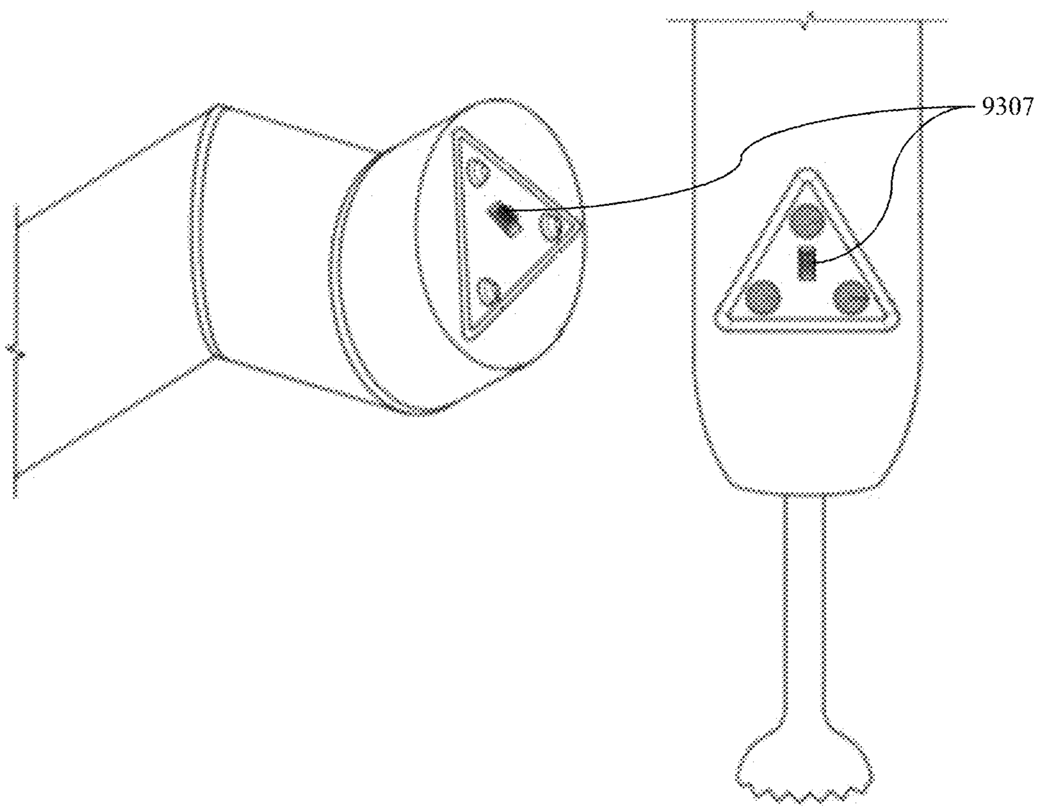
Figure 199B:
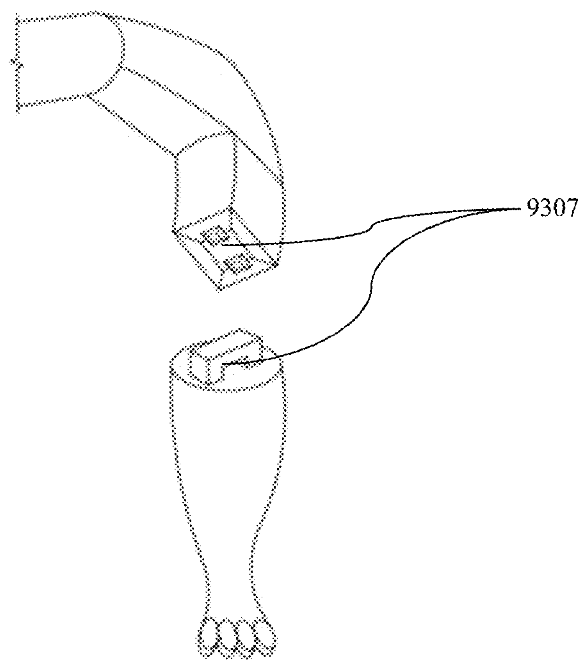
Figure 199C:
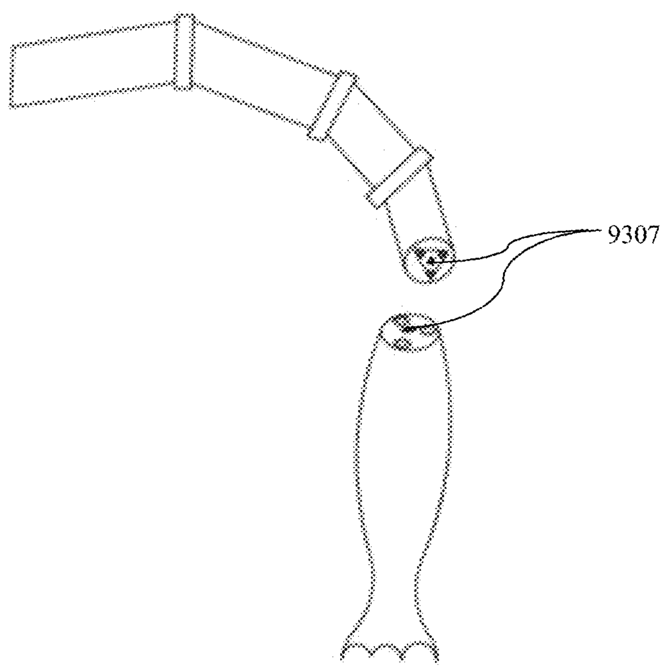

FIGS. 199*a*-199*c* illustrate pictorial representation of connection between the robotic system and the one or more objects, according to an embodiment of the present disclosure.

FIGS. 200*a*-200*e* illustrate pictorial representation of locking mechanism in lead-screw configuration, according to an embodiment of the present disclosure.

Figure 201:
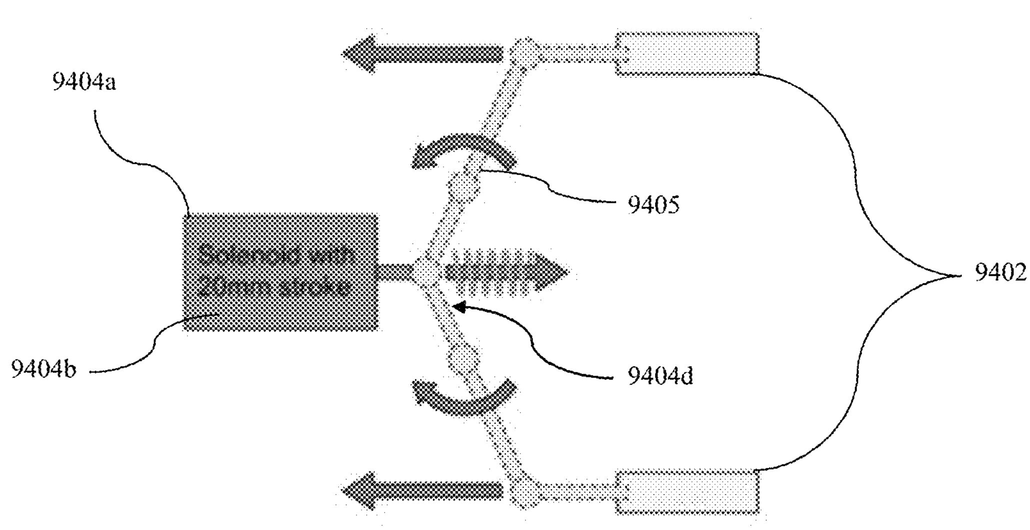

FIG. 201 illustrates a mechanism of solenoid coil configuration, according to an embodiment of the present disclosure.

FIGS. 202*a*-202*d* illustrate graphical representation of force calculation for locking mechanism of solenoid coil configuration, according to an embodiment of the present disclosure.

FIG. 203*a*-203*e* illustrate wall locking mechanism, according to an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

Figure 1:
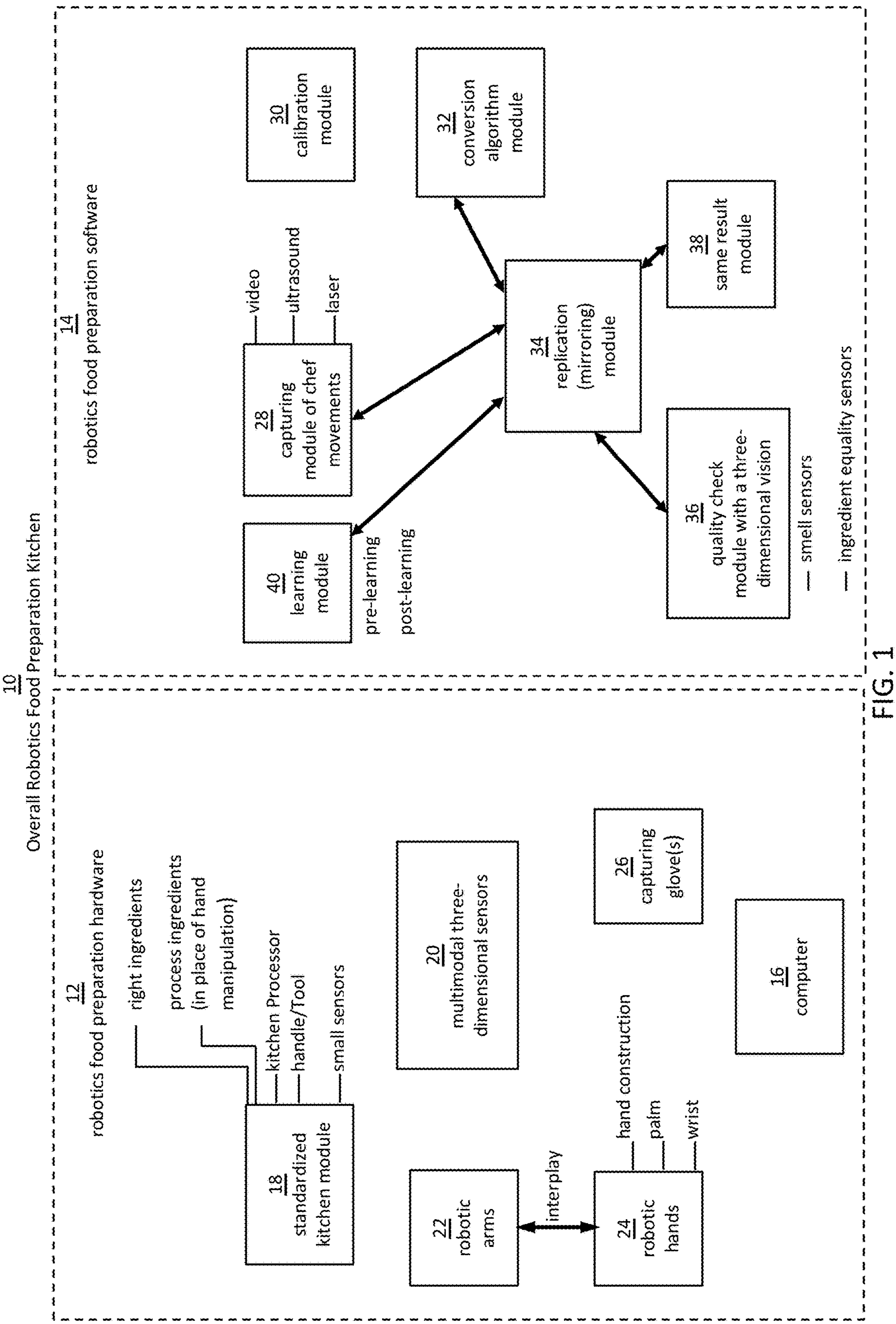
FIG. 1 depicts a system diagram illustrating an overall robotic food preparation kitchen with hardware and software in accordance with the present disclosure.
Figure 203A:
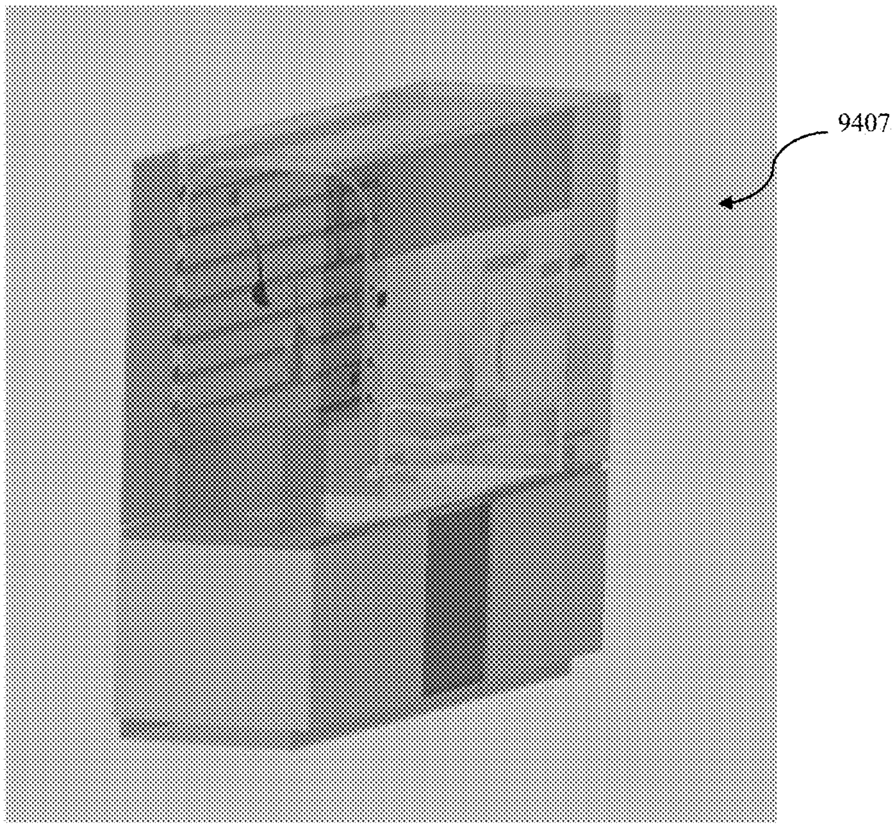
Figure 203B:
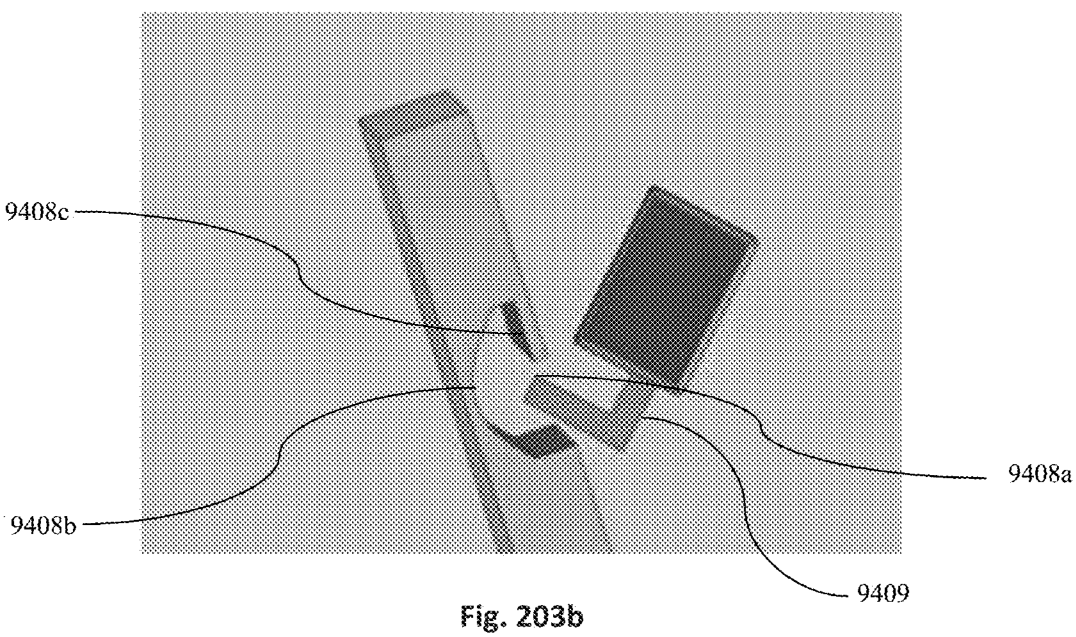
Figure 203C:
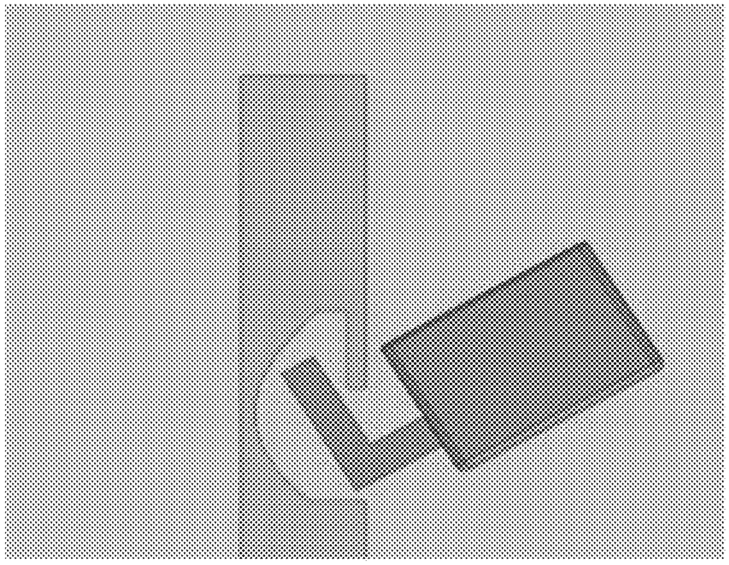
Figure 203D:
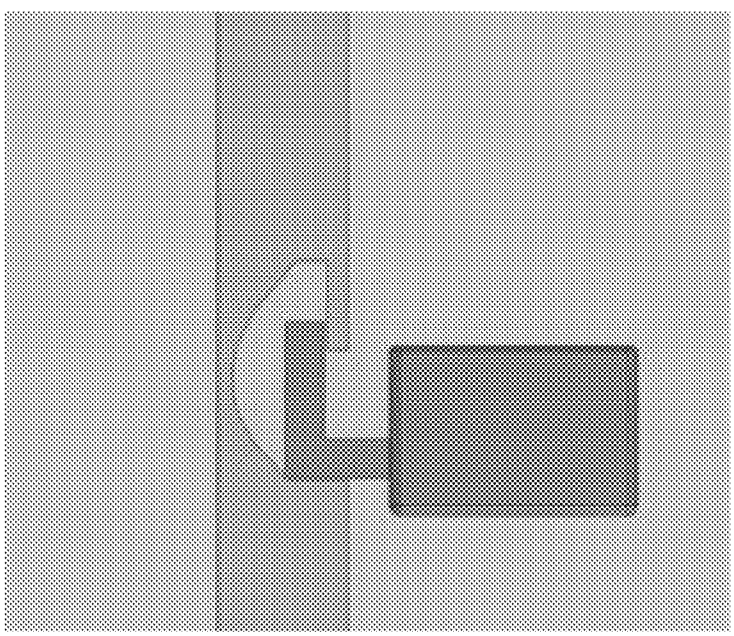
Figure 203E:
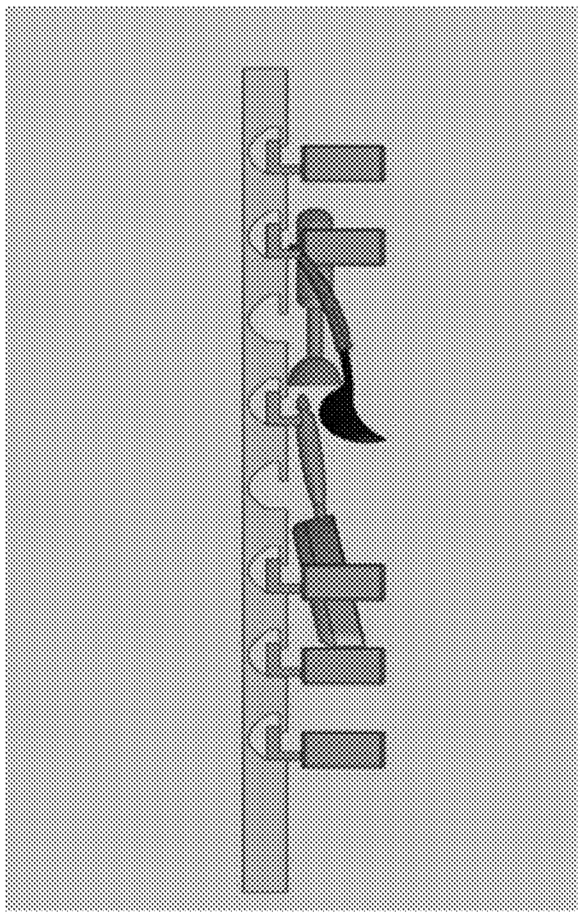

A description of structural embodiments and methods of the present disclosure is provided with reference to FIGS. 1-203*e*. It is to be understood that there is no intention to limit the disclosure to the specifically disclosed embodiments but that the disclosure may be practiced using other features, elements, methods, and embodiments. Like elements in various embodiments are commonly referred to with like reference numerals.

The following definitions apply to the elements and steps described herein. These terms may likewise be expanded upon.

Abstraction Data—refers to the abstraction recipe of utility for machine-execution, which has many other data-elements that a machine needs to know for proper execution and replication. This so-called meta-data, or additional data corresponding to a particular step in the cooking process, whether it be direct sensor-data (clock-time, water-temperature, camera-image, utensil or ingredient used, etc.) or data generated through interpretation or abstraction of larger data-sets (such as a 3-Dimensional range cloud from a laser used to extract the location and types of objects in the image, overlaid with texture and color maps from a camera-picture, etc.). The meta-data is time-stamped and used by the robotic kitchen to set, control, and monitor all processes and associated methods and equipment needed at every point in time as it steps through the sequence of steps in the recipe.

Abstraction Recipe—refers to a representation of a chef's recipe, which a human knows as represented by the use of certain ingredients, in certain sequences, prepared and combined through a sequence of processes and methods, as well as skills of the human chef. An abstraction recipe used by a machine for execution in an automated way requires different types of classifications and sequences. While the overall steps carried out are identical to those of the human chef, the abstraction recipe of utility to the robotic kitchen requires that additional meta-data be a part of every step in the recipe. Such meta-data includes the cooking time and variables, such as temperature (and its variations over time), oven-setting, tool/equipment used, etc. Basically a machine-executable recipe-script needs to have all possible measured variables of import to the cooking process (all measured and stored while the human chef was preparing the recipe in the chef studio) correlated to time, both overall and that within each process-step of the cooking-sequence. Hence, the abstraction recipe is a representation of the cooking steps mapped into a machine-readable representation or domain, which takes the required process from the human-domain to that of the machine-understandable and machine-executable domain through a set of logical abstraction steps.

Acceleration—refers to the maximum rate of speed-change at which a robotic arm can accelerate around an axis or along a space-trajectory over a short distance.

Accuracy—refers to how closely a robot can reach a commanded position. Accuracy is determined by the difference between the absolute positions of the robot compared to the commanded position. Accuracy can be improved, adjusted, or calibrated with external sensing, such as sensors on a robotic hand or a real-time three-dimensional model using multiple (multi-mode) sensors.

Action Primitive—in one embodiment, the term refers to an indivisible robotic action, such as moving the robotic apparatus from location X1 to location X2, or sensing the distance from an object (for food preparation) without necessarily obtaining a functional outcome. In another embodiment, the term refers to an indivisible robotic action in a sequence of one or more such units for accomplishing a minimanipulation. These are two aspects of the same definition. (smallest functional subblock—lower level minimanpualtion Alternative Functional Action Primitive (AFAP)—refers to an alternative functional action primitive, rather than a particular functional action primitive, by changing the initial parameters (including initial position, initial orientation, and/or the way how the robot moves in order to obtain a functional result) of the robot relative to an operated object or the operating environment, to accomplish the same functional result of that particular functional action primitive.

Automated Dosage System—refers to dosage containers in a standardized kitchen module where a particular size of food chemical compounds (such as salt, sugar, pepper, spice, any kind of liquids, such as water, oil, essences, ketchup, etc.) is released upon application.

Automated Storage and Delivery System—refers to storage containers in a standardized kitchen module that maintain a specific temperature and humidity for storing food; each storage container is assigned a code (e.g., a bar code) for the robotic kitchen to identify and retrieve where a particular storage container delivers the food contents stored therein.

Coarse—refers to movements whose magnitude is within 75% of the maximum workspace dimension achievable of a particular subsystem. As an example, a coarse movement for a manipulator arm would be any motion that is within 75% of the largest dimension contained within the volume described by the maximum three-dimensional reach of the robot arm itself in all possible directions. Furthermore the resolution of motion typical (due to many factors such as sensor-resolution, controller discretization, mechanical tolerances, assembly slop, etc.) for such systems is at best 1/100 to 1/200 of said maximum workspace dimension. So if a human-arm sized robot arm can reach anywhere within a 6-foot diameter half-sphere, its maximum resolvable (and thus controllable) motion-increment, would lie somewhere between 0.072 in to 0.14 in at full reach.

Data Cloud—refers to a collection of sensor or data-based numerical measurement values from a particular space (three-dimensional laser/acoustic range measurement, RGB-values from a camera image, etc.) collected at certain intervals and aggregated based on a multitude of relationships, such as time, location, etc.

Dedicated—refers to hardware elements such as processors, sensors, actuators and buses, that are solely used by a particular element or subsystem. In particular, each subsystem within the macro- and micro-manipulation systems, contain elements that utilize their own processors and sensor and actuators that re solely responsible for the movements of the hardware element (shoulder, arm-joint, wrist, finger, etc.) they are associated with.

Degree of Freedom ("DOF")—refers to a defined mode and/or direction in which a mechanical device or system can move. The number of degrees of freedom is equal to the total number of independent displacements or aspects of motion. The total number of degrees of freedom is doubled for two robotic arms.

Direct Environment—refers to a defined working space that is reachable from the current position of the robot.

Direct Standard Environment—refers to direct environment that is in a defined and known state.

Edge Detection—refers to a software-based computer program(s) capable of identifying the edges of multiple objects that may be overlapping in a two-dimensional-image of a camera yet successfully identifying their boundaries to aid in object identification and planning for grasping and handling.

Environment—refers to collection of any kind of physical objects that the robot can interact or collide with, including structures, movable objects, other robots, humans, tools, etc.

Equilibrium Value—refers to the target position of a robotic appendage, such as a robotic arm where the forces acting upon it are in equilibrium, i.e. there is no net force and thus no net movement.

Execution Sequence Planner—refers to a software-based computer program(s) capable of creating a sequence of execution scripts or commands for one or more elements or systems capable of being computer controlled, such as arm(s), dispensers, appliances, etc.

Fine—refers to movements that are within 75% of the largest dimension of the three-dimensional workspace of a micro-manipulation subsystem. As an example, the workspace of a multi-fingered hand could be described as a three-dimensional ellipsoid or sphere; the largest dimension (major-axis for ellipsoid or diameter for a sphere) would represent the largest dimension of a fine motion. Furthermore the resolution of motion typical for (due to many factors such as sensor-resolution, controller discretization, mechanical tolerances, assembly slop, etc.) such sized systems is at best 1/500 to 1/1,000 of said maximum workspace dimension. So if a human-sized robot hand can reach anywhere within a 6-inch diameter half-sphere, its maximum resolvable (and thus controllable) motion-increment, would lie somewhere between 0.0125 in to 0.006 in at full reach.

Food Execution Fidelity—refers to a robotic kitchen, which is intended to replicate the recipe-script generated in the chef studio by watching, measuring, and understanding the steps, variables, methods, and processes of the human chef, thereby trying to emulate his/her techniques and skills. The fidelity of how close the execution of the dish-preparation comes to that of the human-chef is measured by how close the robotically-prepared dish resembles the human-prepared dish as measured by a variety of subjective elements, such as consistency, color, taste, etc. The notion is that the more closely the dish prepared by the robotic kitchen is to that prepared by the human chef, the higher the fidelity of the replication process.

Food Preparation Stage (also referred to as "Cooking Stage")—refers to a combination, either sequential or in parallel, of one or more minimanipulations including action primitives, and computer instructions for controlling the various kitchen equipment and appliances in the standardized kitchen module. One or more food preparation stages collectively represent the entire food preparation process for a particular recipe.

Functional Action Primitive (FAP)—refers to an indivisible action primitive that obtains a necessary functional outcome.

Functional Action Primitive Subblocks (FAPSBs)—refers to either robot trajectories, vision system commands or appliance commands.

Geometric Reasoning—refers to a software-based computer program(s) capable of using a two-dimensional (2D)/three-dimensional (3D) surface, and/or volumetric data to reason as to the actual shape and size of a particular volume. The ability to determine or utilize boundary information also allows for inferences as to the start and end of a particular geometric element and the number present in an image or model.

Grasp Reasoning—refers to a software-based computer program(s) capable of relying on geometric and physical reasoning to plan a multi-contact (point/area/volume) interaction between a robotic end-effector (gripper, link, etc.), or even tools/utensils held by the end-effector, so as to successfully contact, grasp, and hold the object in order to manipulate it in a three-dimensional space.

Hardware Automation Device—fixed process device capable of executing pre-programmed steps in succession without the ability to modify any of them; such devices are used for repetitive motions that do not need any modulation.

Ingredient Management and Manipulation—refers to defining each ingredient in detail (including size, shape, weight, dimensions, characteristics, and properties), one or more real-time adjustments in the variables associated with the particular ingredient that may differ from the previous stored ingredient details (such as the size of a fish fillet, the dimensions of an egg, etc.), and the process in executing the different stages for the manipulation movements to an ingredient.

Kitchen Module (or Kitchen Volume)—a standardized full-kitchen module with standardized sets of kitchen equipment, standardized sets of kitchen tools, standardized sets of kitchen handles, and standardized sets of kitchen containers, with predefined space and dimensions for storing, accessing, and operating each kitchen element in the standardized full-kitchen module. One objective of a kitchen module is to predefine as much of the kitchen equipment, tools, handles, containers, etc. as possible, so as to provide a relatively fixed kitchen platform for the movements of robotic arms and hands. Both a chef in the chef kitchen studio and a person at home with a robotic kitchen (or a person at a restaurant) uses the standardized kitchen module, so as to maximize the predictability of the kitchen hardware, while minimizing the risks of differentiations, variations, and deviations between the chef kitchen studio and a home robotic kitchen. Different embodiments of the kitchen module are possible, including a standalone kitchen module and an integrated kitchen module. The integrated kitchen module is fitted into a conventional kitchen area of a typical house. The kitchen module operates in at least two modes, a robotic mode and a normal (manual) mode.

Live Planning—refers to plans that are created just before execution, usually dependent on the direct environment.

Machine Learning—refers to the technology wherein a software component or program improves its performance based on experience and feedback. One kind of machine learning often used in robotics is reinforcement learning, where desirable actions are rewarded and undesirable ones are penalized. Another kind is case-based learning, where previous solutions, e.g. sequences of actions by a human teacher or by the robot itself are remembered, together with any constraints or reasons for the solutions, and then are applied or reused in new settings. There are also additional kinds of machine learning, such as inductive and transductive methods.

Minimanipulation (MM)—generally, MM refers to one or more behaviors or task-executions in any number or combinations and at various levels of descriptive abstraction, by a robotic apparatus that executes commanded motion-sequences under sensor-driven computer-control, acting through one or more hardware-based elements and guided by one or more software-controllers at multiple levels, to achieve a required task-execution performance level to arrive at an outcome approaching an optimal level within an acceptable execution fidelity threshold. The acceptable fidelity threshold is task-dependent and therefore defined for each task (also referred to as "domain-specific application"). In the absence of a task-specific threshold, a typical threshold would be 0.001 (0.1%) of optimal performance.

In one embodiment from a robotic technology perspective, the term MM refers to a well-defined pre-programmed sequence of actuator actions and collection of sensory feedback in a robot's task-execution behavior, as defined by performance and execution parameters (variables, constants, controller-type and -behaviors, etc.), used in one or more low-to-high level control-loops to achieve desired motion/interaction behavior for one or more actuators ranging from individual actuations to a sequence of serial and/or parallel multi-actuator coordinated motions (position and velocity)/interactions (force and torque) to achieve a specific task with desirable performance metrics. MMs can be combined in various ways by combining lower-level MM behaviors in serial and/or parallel to achieve ever-higher and higher-level more-and-more complex application-specific task behaviors with an ever higher level of (task-descriptive) abstraction.

In another embodiment from a software/mathematical perspective, the term MM refers to a combination (or a sequence) of one or more steps that accomplish a basic functional outcome within a threshold value of the optimal outcome (examples of threshold value as within 0.1, 0.01, 0.001, or 0.0001 of the optimal value with 0.001 as the preferred default). Each step can be an action primitive, corresponding to a sensing operation or an actuator movement, or another (smaller) MM, similar to a computer program comprised of basic coding steps and other computer programs that may stand alone or serve as sub-routines. For instance, a MM can be grasping an egg, comprised of the motor actions required to sense the location and orientation of the egg, then reaching out a robotic arm, moving the robotic fingers into the right configuration, and applying the correct delicate amount of force for grasping: all primitive actions. Another MM can be breaking-an-egg-with-a-knife, including the grasping MM with one robotic hand, followed by grasping-a-knife MM with the other hand, followed by the primitive action of striking the egg with the knife using a predetermined force at a predetermined location.

High-Level Application-specific Task Behaviors—refers to behaviors that can be described in natural human-understandable language and are readily recognizable by a human as clear and necessary steps in accomplishing or achieving a high-level goal. It is understood that many other lower-level behaviors and actions/movements need to take place by a multitude of individually actuated and controlled degrees of freedom, some in serial and parallel or even cyclical fashion, in order to successfully achieve a higher-level task-specific goal. Higher-level behaviors are thus made up of multiple levels of low-level MMs in order to achieve more complex, task-specific behaviors. As an example, the command of playing on a harp the first note of the 1st bar of a particular sheet of music, presumes the note is known (i.e., g-flat), but now lower-level MMs have to take place involving actions by a multitude of joints to curl a particular finger, move the whole hand or shape the palm so as to bring the finger into contact with the correct string, and then proceed with the proper speed and movement to achieve the correct sound by plucking/strumming the cord. All these individual MMs of the finger and/or hand/palm in isolation can all be considered MMs at various low levels, as they are unaware of the overall goal (extracting a particular note from a specific instrument). While the task-specific action of playing a particular note on a given instrument so as to achieve the necessary sound, is clearly a higher-level application-specific task, as it is aware of the overall goal and need to interplay between behaviors/motions and is in control of all the lower-level MMs required for a successful completion. One could even go as far as defining playing a particular musical note as a lower-level MM to the overall higher-level applications-specific task behavior or command, spelling out the playing of an entire piano-concerto, where playing individual notes could each be deemed as low-level MM behaviors structured by the sheet music as the composer intended.

Low-Level Minimanipulation Behaviors—refers to movements that are elementary and required as basic building blocks for achieving a higher-level task-specific motion/movement or behavior. The low-level behavioral blocks or elements can be combined in one or more serial or parallel fashion to achieve a more complex medium or a higher-level behavior. As an example, curling a single finger at each finger joint is a low-level behavior, as it can be combined with curling each of the other fingers on the same hand in a certain sequence and triggered to start/stop based on contact/force-thresholds to achieve the higher-level behavior of grasping, whether this be a tool or a utensil. Hence, the higher-level task-specific behavior of grasping is made up of a serial/parallel combination of sensory-data driven low-level behaviors by each of the five fingers on a hand. All behaviors can thus be broken down into rudimentary lower levels of motions/movements, which when combined in certain fashion achieve a higher-level task behavior. The breakdown or boundary between low-level and high-level behaviors can be somewhat arbitrary, but one way to think of it is that movements or actions or behaviors that humans tend to carry out without much conscious thinking (such as curling ones fingers around a tool/utensil until contact is made and enough contact-force is achieved) as part of a more human-language task-action (such as "grab the tool"), can and should be considered low-level. In terms of a machine-language execution language, all actuator-specific commands, which are devoid of higher-level task awareness, are certainly considered low-level behaviors.

Model Elements and Classification—refers to one or more software-based computer program(s) capable of understanding elements in a scene as being items that are used or needed in different parts of a task; such as a bowl for mixing and the need for a spoon to stir, etc. Multiple elements in a scene or a world-model may be classified into groupings allowing for faster planning and task-execution.

Motion Primitives—refers to motion actions that define different levels/domains of detailed action steps, e.g. a high-level motion primitive would be to grab a cup, and a low-level motion primitive would be to rotate a wrist by five degrees.

Multimodal Sensing Unit—refers to a sensing unit comprised of multiple sensors capable of sensing and detecting multiple modes or electromagnetic bands or spectra: particularly, capable of capturing three-dimensional position and/or motion information. The electromagnetic spectrum can range from low to high frequencies and does not need to be limited to that perceived by a human being. Additional modes might include, but are not limited to, other physical senses such as touch, smell, etc.

Number of Axes—three axes are required to reach any point in space. To fully control the orientation of the end of the arm (i.e. the wrist), three additional rotational axes (yaw, pitch, and roll) are required.

Parameters—refers to variables that can take numerical values or ranges of numerical values. Three kinds of parameters are particularly relevant: parameters in the instructions to a robotic device (e.g. the force or distance in an arm movement), user-settable parameters (e.g. prefers meat well done vs. medium), and chef-defined parameters (e.g. set oven temperature to 350 F).

Parameter Adjustment—refers to the process of changing the values of parameters based on inputs. For instance changes in the parameters of instructions to the robotic device can be based on the properties (e.g. size, shape, orientation) of, but not limited to, the ingredients, position/orientation of kitchen tools, equipment, appliances, speed, and time duration of a minimanipulation.

Payload or Carrying Capacity—refers to how much weight a robotic arm can carry and hold (or even accelerate) against the force of gravity as a function of its endpoint location.

Physical Reasoning—refers to a software-based computer program(s) capable of relying on geometrically-reasoned data and using physical information (density, texture, typical geometry, and shape) to assist an inference-engine (program) to better model the object and also predict its behavior in the real world, particularly when grasped and/or manipulated/handled.

Properly Sequenced—refers to a set of consecutive instructions, in our case namely time-based motion instructions that are consecutive in time, issued to one or more robotic actuation elements within each of the manipulation subsystems. The implication of a "properly sequenced" set of instructions, carries with it the knowledge that a high-level planner has created said instructions and concatenated and placed them in a sequence, so as to ensure that each actuated element within each of the addressed subsystems will carry out said instructions, thereby achieving a properly synchronized set of motions that achieve the desired task execution result.

Pre-planning—refers to a type of planning where plans are made in advance of execution in a direct environment, which the pre-planning data and direct environment data are saved together.

Raw Data—refers to all measured and inferred sensory-data and representation information that is collected as part of the chef-studio recipe-generation process while watching/monitoring a human chef preparing a dish. Raw data can range from a simple data-point such as clock-time, to oven temperature (over time), camera-imagery, three-dimensional laser-generated scene representation data, to appliances/equipment used, tools employed, ingredients (type and amount) dispensed and when, etc. All the information the studio-kitchen collects from its built-in sensors and stores in raw, time-stamped form, is considered raw data. Raw data is then used by other software processes to generate an even higher level of understanding and recipe-process understanding, turning raw data into additional time-stamped processed/interpreted data.

Robotic Apparatus—refers the set of robotic sensors and effectors. The effectors comprise one or more robotic arms and one or more robotic hands for operation in the standardized robotic kitchen. The sensors comprise cameras, range sensors, and force sensors (haptic sensors) that transmit their information to the processor or set of processors that control the effectors.

Recipe Cooking Process—refers to a robotic script containing abstract and detailed levels of instructions to a collection of programmable and hard-automation devices, to allow computer-controllable devices to execute a sequenced operation within its environment (e.g. a kitchen replete with ingredients, tools, utensils, and appliances).

Recipe Script—refers to a recipe script as a sequence in time containing a structure and a list of commands and execution primitives (simple to complex command software) that, when executed by the robotic kitchen elements (robot-arm, automated equipment, appliances, tools, etc.) in a given sequence, should result in the proper replication and creation of the same dish as prepared by the human chef in the studio-kitchen. Such a script is sequential in time and equivalent to the sequence employed by the human chef to create the dish, albeit in a representation that is suitable and understandable by the computer-controlled elements in the robotic kitchen.

Recipe Speed Execution—refers to managing a timeline in the execution of recipe steps in preparing a food dish by replicating a chef's movements, where the recipe steps include standardized food preparation operations (e.g., standardized cookware, standardized equipment, kitchen processors, etc.), MMs, and cooking of non-standardized objects.

Repeatability—refers to an acceptable preset margin in how accurately the robotic arms/hands can repeatedly return to a programmed position. If the technical specification in a control memory requires the robotic hand to move to a certain X-Y-Z position and within +/−0.1 mm of that position, then the repeatability is measured for the robotic hands to return to within +/−0.1 mm of the taught and desired/commanded position.

Robotic Recipe Script—refers to a computer-generated sequence of machine-understandable instructions related to the proper sequence of robotically/hard-automation execution of steps to mirror the required cooking steps in a recipe to arrive at the same end-product as if cooked by a chef.

Robotic Costume—External instrumented device(s) or clothing, such as gloves, clothing with camera-tractable markers, jointed exoskeleton, etc., used in the chef studio to monitor and track the movements and activities of the chef during all aspects of the recipe cooking process(es).

Scene Modeling—refers to a software-based computer program(s) capable of viewing a scene in one or more cameras' fields of view and being capable of detecting and identifying objects of importance to a particular task. These objects may be pre-taught and/or be part of a computer library with known physical attributes and usage-intent.

Smart Kitchen Cookware/Equipment—refers to an item of kitchen cookware (e.g., a pot or a pan) or an item of kitchen equipment (e.g., an oven, a grill, or a faucet) with one or more sensors that prepares a food dish based on one or more graphical curves (e.g., a temperature curve, a humidity curve, etc.).

Software Abstraction Food Engine—refers to a software engine that is defined as a collection of software loops or programs, acting in concert to process input data and create a certain desirable set of output data to be used by other software engines or an end-user through some form of textual or graphical output interface. An abstraction software engine is a software program(s) focused on taking a large and vast amount of input data from a known source in a particular domain (such as three-dimensional range measurements that form a data-cloud of three-dimensional measurements as seen by one or more sensors), and then processing the data to arrive at interpretations of the data in a different domain (such as detecting and recognizing a table-surface in a data-cloud based on data having the same vertical data value, etc.), in order to identify, detect, and classify data-readings as pertaining to an object in three-dimensional space (such as a table-top, cooking pot, etc.). The process of abstraction is basically defined as taking a large data set from one domain and inferring structure (such as geometry) in a higher level of space (abstracting data points), and then abstracting the inferences even further and identifying objects (pots, etc.) out of the abstraction data-sets to identify real-world elements in an image, which can then be used by other software engines to make additional decisions (handling/manipulation decisions for key objects, etc.). A synonym for "software abstraction engine" in this application could be also "software interpretation engine" or even "computer-software processing and interpretation algorithm".

Task Reasoning—refers to a software-based computer program(s) capable of analyzing a task-description and breaking it down into a sequence of multiple machine-executable (robot or hard-automation systems) steps, to achieve a particular end result defined in the task description.

Three-dimensional World Object Modeling and Understanding—refers to a software-based computer program(s) capable of using sensory data to create a time-varying three-dimensional model of all surfaces and volumes, to enable it to detect, identify, and classify objects within the same and understand their usage and intent.

Torque Vector—refers to the torsion force upon a robotic appendage, including its direction and magnitude.

Volumetric Object Inference (Engine)—refers to a software-based computer program(s) capable of using geometric data and edge-information, as well as other sensory data (color, shape, texture, etc.), to allow for identification of three-dimensionality of one or more objects to aid in the object identification and classification process.

Robotic assistants and/or robotic apparatuses, including the interactions or minimanipulations performed thereby are described in further detail, for example, in the following applications: U.S. patent application Ser. No. 14/627,900 entitled "Methods and Systems for Food Preparation in a Robotic Cooking Kitchen," filed 20 Feb. 2015; U.S. Provisional Application Ser. No. 62/202,030 entitled "Robotic Manipulation Methods and Systems Based on Electronic Mini-Manipulation Libraries," filed 6 Aug. 2015; U.S. Provisional Application Ser. No. 62/189,670 entitled "Robotic Manipulation Methods and Systems Based on Electronic Minimanipulation Libraries," filed 7 Jul. 2015; U.S. Provisional Application Ser. No. 62/166,879 entitled "Robotic Manipulation Methods and Systems Based on Electronic Minimanipulation Libraries," filed 27 May 2015; U.S. Provisional Application Ser. No. 62/161,125 entitled "Robotic Manipulation Methods and Systems Based on Electronic Minimanipulation Libraries," filed 13 May 2015; U.S. Provisional Application Ser. No. 62/146,367 entitled "Robotic Manipulation Methods and Systems Based on Electronic Minimanipulation Libraries," filed 12 Apr. 2015; U.S. Provisional Application Ser. No. 62/116,563 entitled "Method and System for Food Preparation in a Robotic Cooking Kitchen," filed 16 Feb. 2015; U.S. Provisional Application Ser. No. 62/113,516 entitled "Method and System for Food Preparation in a Robotic Cooking Kitchen," filed 8 Feb. 2015; U.S. Provisional Application Ser. No. 62/109,051 entitled "Method and System for Food Preparation in a Robotic Cooking Kitchen," filed 28 Jan. 2015; U.S. Provisional Application Ser. No. 62/104,680 entitled "Method and System for Robotic Cooking Kitchen," filed 16 Jan. 2015; U.S. Provisional Application Ser. No. 62/090,310 entitled "Method and System for Robotic Cooking Kitchen," filed 10 Dec. 2014; U.S. Provisional Application Ser. No. 62/083,195 entitled "Method and System for Robotic Cooking Kitchen," filed 22 Nov. 2014; U.S. Provisional Application Ser. No. 62/073,846 entitled "Method and System for Robotic Cooking Kitchen," filed 31 Oct. 2014; U.S. Provisional Application Ser. 62/055,799 entitled "Method and System for Robotic Cooking Kitchen," filed 26 Sep. 2014; U.S. Provisional Application Ser. No. 62/044,677, entitled "Method and System for Robotic Cooking Kitchen," filed 2 Sep. 2014; U.S. Provisional Application Ser. No. 62/116,563 entitled "Method and System for Food Preparation in a Robotic Cooking Kitchen," filed 16 Feb. 2015; U.S. Provisional Application Ser. No. 62/113,516 entitled "Method and System for Food Preparation in a Robotic Cooking Kitchen," filed 8 Feb. 2015; U.S. Provisional Application Ser. No. 62/109,051 entitled "Method and System for Food Preparation in a Robotic Cooking Kitchen," filed 28 Jan. 2015; U.S. Provisional Application Ser. No. 62/104,680 entitled "Method and System for Robotic Cooking Kitchen," filed 16 Jan. 2015; U.S. Provisional Application Ser. No. 62/090,310 entitled "Method and System for Robotic Cooking Kitchen," filed 10 Dec. 2014, U.S. Provisional Application Ser. No. 62/083,195 entitled "Method and System for Robotic Cooking Kitchen," filed 22 Nov. 2014; U.S. Provisional Application Ser. No. 62/073,846 entitled "Method and System for Robotic Cooking Kitchen," filed 31 Oct. 2014; U.S. Provisional Application Ser. 62/055,799 entitled "Method and System for Robotic Cooking Kitchen," filed 26 Sep. 2014; U.S. Provisional Application Ser. No. 62/044,677, entitled "Method and System for Robotic Cooking Kitchen," filed 2 Sep. 2014; U.S. Provisional Application Ser. No. 62/024,948 entitled "Method and System for Robotic Cooking Kitchen," filed 15 Jul. 2014; U.S. Provisional Application Ser. No. 62/013,691 entitled "Method and System for Robotic Cooking Kitchen," filed 18 Jun. 2014; U.S. Provisional Application Ser. No. 62/013,502 entitled "Method and System for Robotic Cooking Kitchen," filed 17 Jun. 2014; U.S. Provisional Application Ser. No. 62/013,190 entitled "Method and System for Robotic Cooking Kitchen," filed 17 Jun. 2014; U.S. Provisional Application Ser. No. 61/990,431 entitled "Method and System for Robotic Cooking Kitchen," filed 8 May 2014; U.S. Provisional Application Ser. No. 61/987,406 entitled "Method and System for Robotic Cooking Kitchen," filed 1 May 2014; U.S. Provisional Application Ser. No. 61/953,930 entitled "Method and System for Robotic Cooking Kitchen," filed 16 Mar. 2014; and U.S. Provisional Application Ser. No. 61/942,559 entitled "Method and System for Robotic Cooking Kitchen," filed 20 Feb. 2014.

For additional information on replication by a robotic apparatus and minimanipulation library, see the pending U.S. non-provisional patent application Ser. No. 14/627,900, now U.S. Pat. No. 9,815,191, entitled "Methods and Systems for Food Preparation in Robotic Cooking Kitchen," and the pending U.S. nonprovisional patent application Ser. No. 14/829,579, entitled "Robotic Manipulation Methods and Systems for Executing a Domain-Specific Application in an Instrumented Environment with Electronic Manipulation Libraries," the disclosures of which are incorporated herein by reference in their entireties. For additional information on containers in a domain-specific application in an instrumented environment, see pending U.S. non-provisional patent application Ser. No. 15/382,369, entitled, "Robotic Manipulation Methods and Systems for Executing a Domain-Specific Application in an Instrumented Environment with Containers and Electronic Manipulation Libraries," the disclosure of which is incorporated herein by reference in its entirety.

FIG. 1 is a system diagram illustrating an overall robotics food preparation kitchen 10 with robotic hardware 12 and robotic software 14. The overall robotics food preparation kitchen 10 comprises a robotics food preparation hardware 12 and robotics food preparation software 14 that operate together to perform the robotics functions for food preparation. The robotic food preparation hardware 12 includes a computer 16 that controls the various operations and movements of a standardized kitchen module 18 (which generally operate in an instrumented environment with one or more sensors), multimodal three-dimensional sensors 20, robotic arms 22, robotic hands 24 and capturing gloves 26. The robotic food preparation software 14 operates with the robotics food preparation hardware 12 to capture a chef's movements in preparing a food dish and replicating the chef's movements via robotics arms and hands to obtain the same result or substantially the same result (e.g., taste the same, smell the same, etc.) of the food dish that would taste the same or substantially the same as if the food dish was prepared by a human chef.

The robotic food preparation software 14 includes the multimodal three-dimensional sensors 20, a capturing module 28, a calibration module 30, a conversion algorithm module 32, a replication module 34, a quality check module 36 with a three-dimensional vision system, a same result module 38, and a learning module 40. The capturing module 28 captures the movements of the chef as the chef prepares a food dish. The calibration module 30 calibrates the robotic arms 22 and robotic hands 24 before, during, and after the cooking process. The conversion algorithm module 32 is configured to convert the recorded data from a chef's movements collected in the chef studio into recipe modified data (or transformed data) for use in a robotic kitchen where robotic hands replicate the food preparation of the chef's dish. The replication module 34 is configured to replicate the chef's movements in a robotic kitchen. The quality check module 36 is configured to perform quality check functions of a food dish prepared by the robotic kitchen during, prior to, or after the food preparation process. The same result module 38 is configured to determine whether the food dish prepared by a pair of robotic arms and hands in the robotic kitchen would taste the same or substantially the same as if prepared by the chef. The learning module 40 is configured to provide learning capabilities to the computer 16 that operates the robotic arms and hands.

Figure 2:
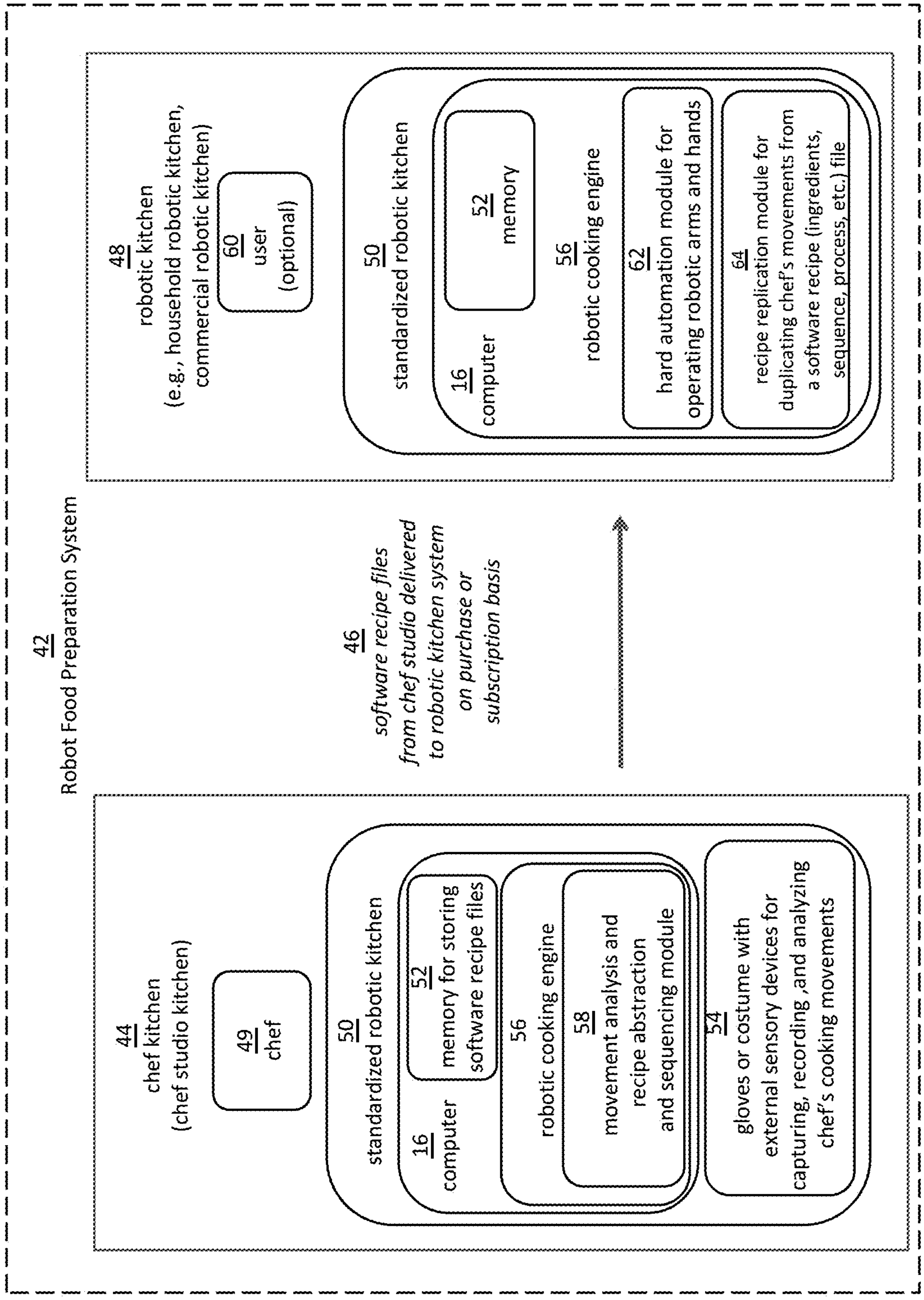
FIG. 2 depicts a system diagram illustrating a first embodiment of a food robot cooking system that includes a chef studio system and a household robotic kitchen system in accordance with the present disclosure.

FIG. 2 is a system diagram illustrating a first embodiment of a food robot cooking system that includes a chef studio system and a household robotic kitchen system for preparing a dish by replicating a chef's recipe process and movements. The robot food preparation system 42 comprises a chef kitchen 44 (also referred to as "chef studio-kitchen"), which transfers one or more software recorded recipe files 46 to a robotic kitchen 48 (also referred to as "household robotic kitchen"). In one embodiment, both the chef kitchen 44 and the robotic kitchen 48 use the same standardized robotic kitchen module 50 (also referred as "robotic kitchen module", "robotic kitchen volume", or "kitchen module", or "kitchen volume") to maximize the precise replication of preparing a food dish, which reduces the variables that may contribute to deviations between the food dish prepared at the chef kitchen 44 and the one prepared by the robotic kitchen 46. A chef 52 wears robotic gloves or a costume with external sensory devices for capturing and recording the chef's cooking movements. The standardized robotic kitchen 50 comprises a computer 16 for controlling various computing functions, where the computer 16 includes a memory 52 for storing one or more software recipe files from the sensors of the gloves or costumes 54 for capturing a chef's movements, and a robotic cooking engine (software) 56. The robotic cooking engine 56 includes a movement analysis and recipe abstraction and sequencing module 58. The robotic kitchen 48 typically operates autonomously with a pair of robotic arms and hands, with an optional user 60 to turn on or program the robotic kitchen 46. The computer 16 in the robotic kitchen 48 includes a hard automation module 62 for operating robotic arms and hands, and a recipe replication module 64 for replicating a chef's movements from a software recipe (ingredients, sequence, process, etc.) file.

The standardized robotic kitchen 50 is designed for detecting, recording, and emulating a chef's cooking movements, controlling significant parameters such as temperature over time, and process execution at robotic kitchen stations with designated appliances, equipment, and tools. The chef kitchen 44 provides a computing kitchen environment 16 with gloves with sensors or a costume with sensors for recording and capturing a chef's 50 movements in the food preparation for a specific recipe. Upon recording the movements and recipe process of the chef 49 for a particular dish into a software recipe file in memory 52, the software recipe file is transferred from the chef kitchen 44 to the robotic kitchen 48 via a communication network 46, including a wireless network and/or a wired network connected to the Internet, so that the user (optional) 60 can purchase one or more software recipe files or the user can be subscribed to the chef kitchen 44 as a member that receives new software recipe files or periodic updates of existing software recipe files. The household robotic kitchen system 48 serves as a robotic computing kitchen environment at residential homes, restaurants, and other places in which the kitchen is built for the user 60 to prepare food. The household robotic kitchen system 48 includes the robotic cooking engine 56 with one or more robotic arms and hard-automation devices for replicating the chef's cooking actions, processes, and movements based on a received software recipe file from the chef studio system 44.

The chef studio 44 and the robotic kitchen 48 represent an intricately linked teach-playback system, which has multiple levels of fidelity of execution. While the chef studio 44 generates a high-fidelity process model of how to prepare a professionally cooked dish, the robotic kitchen 48 is the execution/replication engine/process for the recipe-script created through the chef working in the chef studio. Standardization of a robotic kitchen module is a means to increase performance fidelity and success/guarantee.

The varying levels of fidelity for recipe-execution depend on the correlation of sensors and equipment (besides of course the ingredients) between those in the chef studio 44 and that in the robotic kitchen 48. Fidelity can be defined as a dish tasting identical to that prepared by a human chef (indistinguishably so) at one of the (perfect replication/execution) ends of the spectrum, while at the opposite end the dish could have one or more substantial or fatal flaws with implications to quality (overcooked meat or pasta), taste (burnt elements), edibility (incorrect consistency) or even health-implications (undercooked meat such as chicken/pork with *salmonella* exposure, etc.).

A robotic kitchen that has identical hardware and sensors and actuation systems that can replicate the movements and processes akin to those by the chef that were recorded during the chef-studio cooking process is more likely to result in a higher fidelity outcome. The implication here is that the setups need to be identical, and this has a cost and volume implication. The robotic kitchen 48 can, however, still be implemented using more standardized non-computer-controlled or computer-monitored elements (pots with sensors, networked appliances, such as ovens, etc.), requiring more sensor-based understanding to allow for more complex execution monitoring. Since uncertainty has now increased as to key elements (correct amount of ingredients, cooking temperatures, etc.) and processes (use of stirrer/masher in case a blender is not available in a robotic home kitchen), the guarantees of having an identical outcome to that from the chef will undoubtedly be lower.

An emphasis in the present disclosure is that the notion of a chef studio 44 coupled with a robotic kitchen is a generic concept. The level of the robotic kitchen 48 is variable all the way from a home-kitchen outfitted with a set of arms and environmental sensors, all the way to an identical replica of the studio-kitchen, where a set of arms and articulated motions, tools, and appliances and ingredient-supply can replicate the chef's recipe in an almost identical fashion. The only variable to contend with will be the quality-degree of the end-result or dish in terms of quality, looks, taste, edibility, and health.

A potential method to mathematically describe this correlation between the recipe-outcome and the input variables in the robotic kitchen can best be described by the function below:

$$F_{recipe\text{-}outcome}=F_{studio}(I,E,P,M,V)+F_{RobKit}(E_f,I,R_e,P_{mf})$$

where $F_{studio}$=Recipe Script Fidelity of Chef-Studio $F_{RobKit}$=Recipe Script Execution by Robotic Kitchen I=Ingredients E=Equipment P=Processes M=Methods V=Variables (Temperature, Time, Pressure, etc.)

$E_f$=Equipment Fidelity $R_e$=Replication Fidelity $P_{mf}$=Process Monitoring Fidelity The above equation relates the degree to which the outcome of a robotically-prepared recipe matches that a human chef would prepare and serve ($F_{recipe\text{-}outcome}$) to the level that the recipe was properly captured and represented by the chef studio 44 ($F_{studio}$) based on the ingredients (I) used, the equipment (E) available to execute the chef's processes (P) and methods (M) by properly capturing all the key variables (V) during the cooking process; and how the robotic kitchen is able to represent the replication/execution process of the robotic recipe script by a function ($F_{RobKit}$) that is primarily driven by the use of the proper ingredients (I), the level of equipment fidelity ($E_f$) in the robotic kitchen compared to that in the chef studio, the level to which the recipe-script can be replicated ($R_e$) in the robotic kitchen, and to what extent there is an ability and need to monitor and execute corrective actions to achieve the highest process monitoring fidelity ($P_{mf}$) possible.

The functions ($F_{studio}$) and ($F_{RobKit}$) can be any combination of linear or non-linear functional formulas with constants, variables, and any form of algorithmic relationships. An example for such algebraic representations for both functions could be:

$$F_{studio}=I(fct.\ \sin(\text{Temp}))+E(fct.\text{Cooptop1*5})+P(fct.\text{Circle(spoon)}+V(fct.0.5\text{*time})$$

Delineating that the fidelity of the preparation process is related to the temperature of the ingredient, which varies over time in the refrigerator as a sinusoidal function, the speed with which an ingredient can be heated on the cooktop on specific station at a particular multiplicative rate, and related to how well a spoon can be moved in a circular path of a certain amplitude and period, and that the process needs to be carried out at no less than ½ the speed of the human chef for the fidelity of the preparation process to be maintained.

$$F_{RobKit}=E_{f_p}(\text{Cooktop2,Size})+I(1.25\text{*Size+Linear}(\text{Temp}))+R_e(\text{Motion-Profile})+P_{mf}(\text{Sensor-Suite Correspondence})$$

Delineating that the fidelity of the replication process in the robotic kitchen is related to the appliance type and layout for a particular cooking-area and the size of the heating-element, the size and temperature profile of the ingredient being seared and cooked (thicker steak requiring more cooking time), while also preserving the motion-profile of any stirring and bathing motions of a particular step like searing or mousse-beating, and whether the correspondence between sensors in the robotic kitchen and the chef-studio is sufficiently high to trust the monitored sensor data to be accurate and detailed enough to provide a proper monitoring fidelity of the cooking process in the robotic kitchen during all steps in a recipe.

The outcome of a recipe is not only a function of what fidelity the human chef's cooking steps/methods/process/skills were captured with by the chef studio, but also with what fidelity these can be executed by the robotic kitchen, where each of them has key elements that impact their respective subsystem performance.

Figure 3:
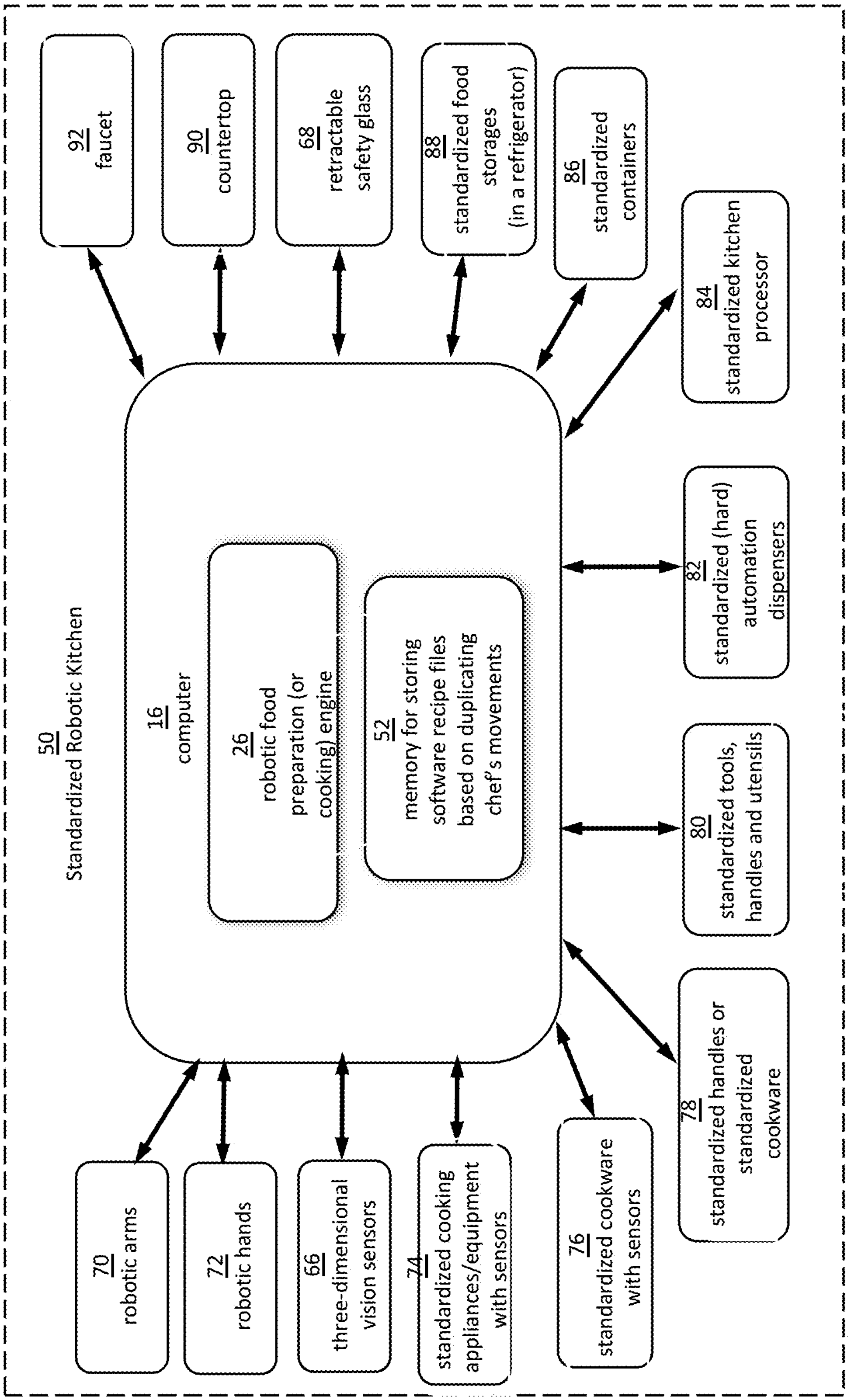
FIG. 3 depicts system diagram illustrating one embodiment of the standardized robotic kitchen for preparing a dish by replicating a chef's recipe process, techniques, and movements in accordance with the present disclosure.

FIG. 3 is a system diagram illustrating one embodiment of the standardized robotic kitchen 50 for food preparation by recording a chef's movement in preparing and replicating a food dish by robotic arms and hands. In this context, the term "standardized" (or "standard") means that the specifications of the components or features are presets, as will be explained below. The computer 16 is communicatively coupled to multiple kitchen elements in the standardized robotic kitchen 50, including a three-dimensional vision sensor 66, a retractable safety screen 68 (e.g., glass, plastic, or other types of protective material), robotic arms 70, robotic hands 72, standardized cooking appliances/equipment 74, standardized cookware with sensors 76, standardized handle(s) or standardized cookware 78, standardized handles and utensils 80, standardized hard automation dispenser(s) 82 (also referred to as "robotic hard automation module(s)"), a standardized kitchen processor 84, standardized containers 86, and a standardized food storage in a refrigerator 88.

The standardized (hard) automation dispenser(s) 82 is a device or a series of devices that is/are programmable and/or controllable via the cooking computer 16 to feed or provide pre-packaged (known) amounts or dedicated feeds of key materials for the cooking process, such as spices (salt, pepper, etc.), liquids (water, oil, etc.), or other dry materials (flour, sugar, etc.). The standardized hard automation dispensers 82 may be located at a specific station or may be able to be robotically accessed and triggered to dispense according to the recipe sequence. In other embodiments, a robotic hard automation module may be combined or sequenced in series or parallel with other modules, robotic arms, or cooking utensils. In this embodiment, the standardized robotic kitchen 50 includes robotic arms 70 and robotic hands 72; robotic hands, as controlled by the robotic food preparation engine 56 in accordance with a software recipe file stored in the memory 52 for replicating a chef's precise movements in preparing a dish to produce the same tasting dish as if the chef had prepared it himself or herself. The three-dimensional vision sensors 66 provide the capability to enable three-dimensional modeling of objects, providing a visual three-dimensional model of the kitchen activities, and scanning the kitchen volume to assess the dimensions and objects within the standardized robotic kitchen 50. The retractable safety glass 68 comprises a transparent material on the robotic kitchen 50, which when in an ON state extends the safety glass around the robotic kitchen to protect surrounding human beings from the movements of the robotic arms 70 and hands 72, hot water and other liquids, steam, fire and other dangers influents. The robotic food preparation engine 56 is communicatively coupled to an electronic memory 52 for retrieving a software recipe file previously sent from the chef studio system 44 for which the robotic food preparation engine 56 is configured to execute processes in preparing and replicating the cooking method and processes of a chef as indicated in the software recipe file. The combination of robotic arms 70 and robotic hands 72 serves to replicate the precise movements of the chef in preparing a dish, so that the resulting food dish will taste identical (or substantially identical) to the same food dish prepared by the chef. The standardized cooking equipment 74 includes an assortment of cooking appliances 46 that are incorporated as part of the robotic kitchen 50, including, but not limited to, a stove/induction/cooktop (electric cooktop, gas cooktop, induction cooktop), an oven, a grill, a cooking steamer, and a microwave oven. The standardized cookware and sensors 76 are used as embodiments for the recording of food preparation steps based on the sensors on the cookware and cooking a food dish based on the cookware with sensors, which include a pot with sensors, a pan with sensors, an oven with sensors, and a charcoal grill with sensors. The standardized cookware 78 includes frying pans, sauté pans, grill pans, multi-pots, roasters, woks, and braisers. The robotic arms 70 and the robotic hands 72 operate the standardized handles and utensils 80 in the cooking process. In one embodiment, one of the robotic hands 72 is fitted with a standardized handle, which is attached to a fork head, a knife head, and a spoon head for selection as required. The standardized hard automation dispensers 82 are incorporated into the robotic kitchen 50 to provide for expedient (via both robot arms 70 and human use) key and common/repetitive ingredients that are easily measured/dosed out or pre-packaged. The standardized containers 86 are storage locations that store food at room temperature. The standardized refrigerator containers 88 refer to, but are not limited to, a refrigerator with identified containers for storing fish, meat, vegetables, fruit, milk, and other perishable items. The containers in the standardized containers 86 or standardized storages 88 can be coded with container identifiers from which the robotic food preparation engine 56 is able to ascertain the type of food in a container based on the container identifier. The standardized containers 86 provide storage space for non-perishable food items such as salt, pepper, sugar, oil, and other spices. Standardized cookware with sensors 76 and the cookware 78 may be stored on a shelf or a cabinet for use by the robotic arms 70 for selecting a cooking tool to prepare a dish. Typically, raw fish, raw meat, and vegetables are pre-cut and stored in the identified standardized storages 88. The kitchen countertop 90 provides a platform for the robotic arms 70 to handle the meat or vegetables as needed, which may or may not include cutting or chopping actions. The kitchen faucet 92 provides a kitchen sink space for washing or cleaning food in preparation for a dish. When the robotic arms 70 have completed the recipe process to prepare a dish and the dish is ready for serving, the dish is placed on a serving counter 90, which further allows for the dining environment to be enhanced by adjusting the ambient setting with the robotic arms 70, such as placement of utensils, wine glasses, and a chosen wine compatible with the meal. One embodiment of the equipment in the standardized robotic kitchen module 50 is a professional series to increase the universal appeal to prepare various types of dishes.

The standardized robotic kitchen module 50 has as one objective: the standardization of the kitchen module 50 and various components with the kitchen module itself to ensure consistency in both the chef kitchen 44 and the robotic kitchen 48 to maximize the preciseness of recipe replication while minimizing the risks of deviations from precise replication of a recipe dish between the chef kitchen 44 and the robotic kitchen 48. One main purpose of having the standardization of the kitchen module 50 is to obtain the same result of the cooking process (or the same dish) between a first food dish prepared by the chef and a subsequent replication of the same recipe process via the robotic kitchen. Conceiving a standardized platform in the standardized robotic kitchen module 50 between the chef kitchen 44 and the robotic kitchen 48 has several key considerations: same timeline, same program or mode, and quality check. The same timeline in the standardized robotic kitchen 50 where the chef prepares a food dish at the chef kitchen 44 and the replication process by the robotic hands in the robotic kitchen 48 refers to the same sequence of manipulations, the same initial and ending time of each manipulation, and the same speed of moving an object between handling operations. The same program or mode in the standardized robotic kitchen 50 refers to the use and operation of standardized equipment during each manipulation recording and execution step. The quality check refers to three-dimensional vision sensors in the standardized robotic kitchen 50, which monitor and adjust in real time each manipulation action during the food preparation process to correct any deviation and avoid a flawed result. The adoption of the standardized robotic kitchen module 50 reduces and minimizes the risks of not obtaining the same result between the chef's prepared food dish and the food dish prepared by the robotic kitchen using robotic arms and hands. Without the standardization of a robotic kitchen module and the components within the robotic kitchen module, the increased variations between the chef kitchen 44 and the robotic kitchen 48 increase the risks of not being able to obtain the same result between the chef's prepared food dish and the food dish prepared by the robotic kitchen because more elaborate and complex adjustment algorithms will be required with different kitchen modules, different kitchen equipment, different kitchenware, different kitchen tools, and different ingredients between the chef kitchen 44 and the robotic kitchen 48.

The standardized robotic kitchen module 50 includes the standardization of many aspects. First, the standardized robotic kitchen module 50 includes standardized positions and orientations (in the XYZ coordinate plane) of any type of kitchenware, kitchen containers, kitchen tools, and kitchen equipment (with standardized fixed holes in the kitchen module and device positions). Second, the standardized robotic kitchen module 50 includes a standardized cooking volume dimension and architecture. Third, the standardized robotic kitchen module 50 includes standardized equipment sets, such as an oven, a stove, a dishwasher, a faucet, etc. Fourth, the standardized robotic kitchen module 50 includes standardized kitchenware, standardized cooking tools, standardized cooking devices, standardized containers, and standardized food storage in a refrigerator, in terms of shape, dimension, structure, material, capabilities, etc. Fifth, in one embodiment, the standardized robotic kitchen module 50 includes a standardized universal handle for handling any kitchenware, tools, instruments, containers, and equipment, which enable a robotic hand to hold the standardized universal handle in only one correct position, while avoiding any improper grasps or incorrect orientations. Sixth, the standardized robotic kitchen module 50 includes standardized robotic arms and hands with a library of manipulations. Seventh, the standardized robotic kitchen module 50 includes a standardized kitchen processor for standardized ingredient manipulations. Eighth, the standardized robotic kitchen module 50 includes standardized three-dimensional vision devices for creating dynamic three-dimensional vision data, as well as other possible standard sensors, for recipe recording, execution tracking, and quality check functions. Ninth, the standardized robotic kitchen module 50 includes standardized types, standardized volumes, standardized sizes, and standardized weights for each ingredient during a particular recipe execution.

Figure 4:
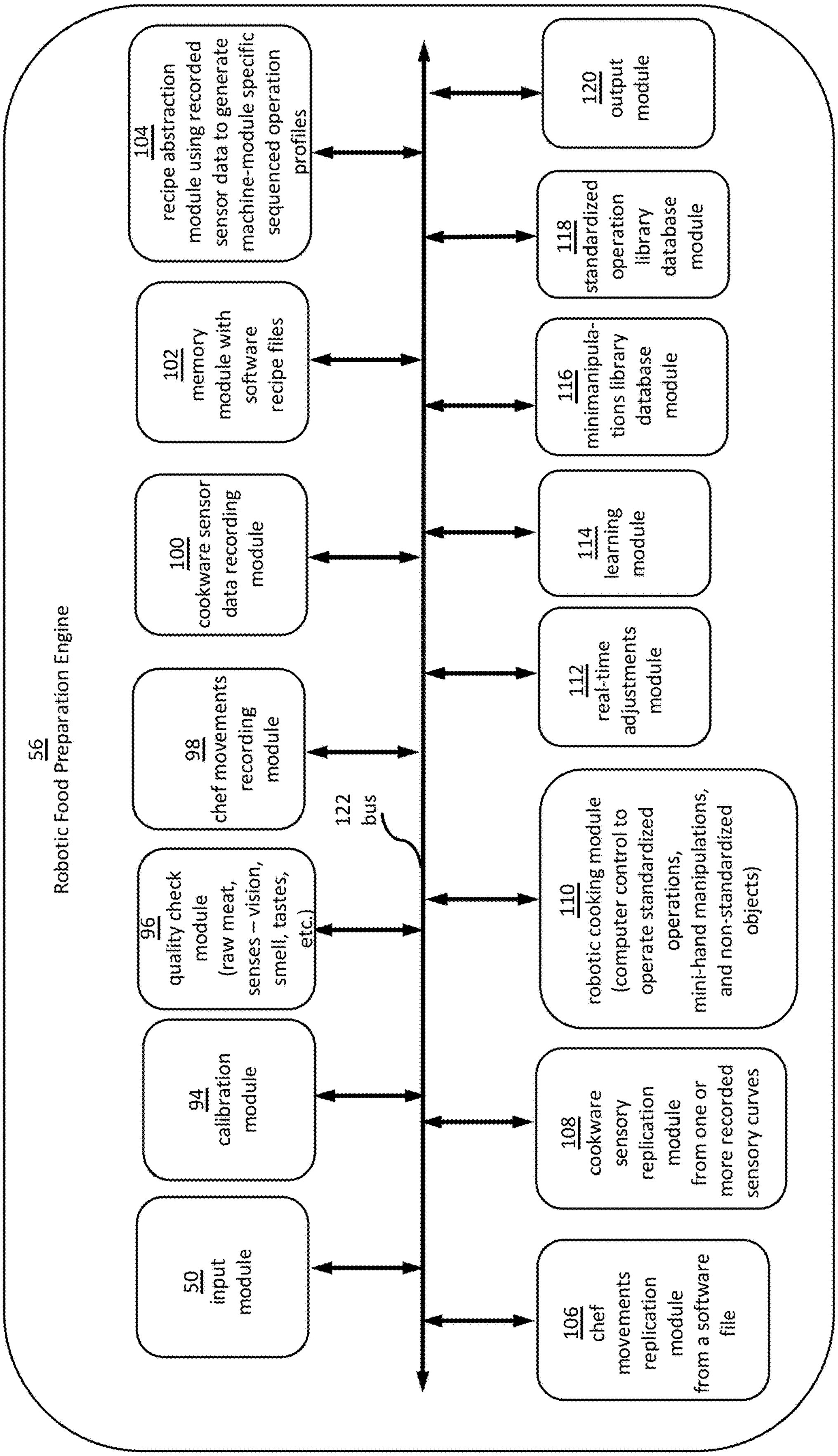
FIG. 4 depicts a system diagram illustrating one embodiment of a robotic food preparation engine for use with the computer in the chef studio system and the household robotic kitchen system in accordance with the present disclosure.

FIG. 4 is a system diagram illustrating one embodiment of the robotic cooking engine 56 (also referred to as "robotic food preparation engine") for use with the computer 16 in the chef studio system 44 and the household robotic kitchen system 48. Other embodiments may have modifications, additions, or variations of the modules in the robotic cooking engine 16, in the chef kitchen 44, and robotic kitchen 48. The robotic cooking engine 56 includes an input module 50, a calibration module 94, a quality check module 96, a chef movement recording module 98, a cookware sensor data recording module 100, a memory module 102 for storing software recipe files, a recipe abstraction module 104 using recorded sensor data to generate machine-module specific sequenced operation profiles, a chef movements replication software module 106, a cookware sensory replication module 108 using one or more sensory curves, a robotic cooking module 110 (computer control to operate standardized operations, minimanipulations, and non-standardized objects), a real-time adjustment module 112, a learning module 114, a minimanipulation library database module 116, a standardized kitchen operation library database module 118, and an output module 120. These modules are communicatively coupled via a bus 122.

The input module 50 is configured to receive any type of input information, such as software recipe files sent from another computing device. The calibration module 94 is configured to calibrate itself with the robotic arms 70, the robotic hands 72, and other kitchenware and equipment components within the standardized robotic kitchen module 50. The quality check module 96 is configured to determine the quality and freshness of raw meat, raw vegetables, milk-associated ingredients, and other raw foods at the time that the raw food is retrieved for cooking, as well as checking the quality of raw foods when receiving the food into the standardized food storage 88. The quality check module 96 can also be configured to conduct quality testing of an object based on senses, such as the smell of the food, the color of the food, the taste of the food, and the image or appearance of the food. The chef movements recording module 98 is configured to record the sequence and the precise movements of the chef when the chef prepares a food dish. The cookware sensor data recording module 100 is configured to record sensory data from cookware equipped with sensors (such as a pan with sensors, a grill with sensors, or an oven with sensors) placed in different zones within the cookware, thereby producing one or more sensory curves. The result is the generation of a sensory curve, such as temperature curve (and/or humidity), that reflects the temperature fluctuation of cooking appliances over time for a particular dish. The memory module 102 is configured as a storage location for storing software recipe files, for either replication of chef recipe movements or other types of software recipe files including sensory data curves. The recipe abstraction module 104 is configured to use recorded sensor data to generate machine-module specific sequenced operation profiles. The chef movements replication module 106 is configured to replicate the chef's precise movements in preparing a dish based on the stored software recipe file in the memory 52. The cookware sensory replication module 108 is configured to replicate the preparation of a food dish by following the characteristics of one or more previously recorded sensory curves, which were generated when the chef 49 prepared a dish by using the standardized cookware with sensors 76. The robotic cooking module 110 is configured to control and operate autonomously standardized kitchen operations, minimanipulations, non-standardized objects, and the various kitchen tools and equipment in the standardized robotic kitchen 50. The real time adjustment module 112 is configured to provide real-time adjustments to the variables associated with a particular kitchen operation or a mini operation to produce a resulting process that is a precise replication of the chef movement or a precise replication of the sensory curve. The learning module 114 is configured to provide learning capabilities to the robotic cooking engine 56 to optimize the precise replication in preparing a food dish by robotic arms 70 and the robotic hands 72, as if the food dish was prepared by a chef, using a method such as case-based (robotic) learning. The minimanipulation library database module 116 is configured to store a first database library of minimanipulations. The standardized kitchen operation library database module 117 is configured to store a second database library of standardized kitchenware and information on how to operate this standardized kitchenware. The output module 118 is configured to send output computer files or control signals external to the robotic cooking engine.

FIG. 5A is a block diagram illustrating a chef studio recipe-creation process 124, showcasing several main functional blocks supporting the use of expanded multimodal sensing to create a recipe instruction-script for a robotic kitchen. Sensor-data from a multitude of sensors, such as (but not limited to) smell 126, video cameras 128, infrared scanners and rangefinders 130, stereo (or even trinocular) cameras 132, haptic gloves 134, articulated laser-scanners 136, virtual-world goggles 138, microphones 140 or an exoskeleton motion suit 142, human voice 144, touch-sensors 146, and even other forms of user input 148, are used to collect data through a sensor interface module 150. The data is acquired and filtered 152, including possible human user input 148 (e.g., chef, touch-screen and voice input), after which a multitude of (parallel) software processes utilize the temporal and spatial data to generate the data that is used to populate the machine-specific recipe-creation process. Sensors may not be limited to capturing human position and/or motion but may also capture position, orientation, and/or motion of other objects in the standardized robotic kitchen 50.

These individual software modules generate such information (but are not thereby limited to only these modules) as (i) chef-location and cooking-station ID via a location and configuration module 154, (ii) configuration of arms (via torso), (iii) tools handled, when and how, (iv) utensils used and locations on the station through the hardware and variable abstraction module 156, (v) processes executed with them, and (vi) variables (temperature, lid y/n, stirring, etc.) in need of monitoring through the process module 158, (vii) temporal (start/finish, type) distribution and (viii) types of processes (stir, fold, etc.) being applied, and (ix) ingredients added (type, amount, state of prep, etc.) through the cooking sequence and process abstraction module 160.

All this information is then used to create a machine-specific (not just for the robotic-arms, but also ingredient dispensers, tools, and utensils, etc.) set of recipe instructions through the stand-alone module 162, which are organized as script of sequential/parallel overlapping tasks to be executed and monitored. This recipe-script is stored 164 alongside the entire raw data set 166 in the data storage module 168 and is made accessible to either a remote robotic cooking station through the robotic kitchen interface module 170 or a human user 172 via a graphical user interface (GUI) 174.

FIG. 5B is a block diagram illustrating one embodiment of the standardized chef studio 44 and robotic kitchen 50 with teach/playback process 176. The teach/playback process 176 describes the steps of capturing a chef's recipe-implementation processes/methods/skills 49 in the chef studio 44 where he/she carries out the recipe execution 180, using a set of chef-studio standardized equipment 74 and recipe-required ingredients 178 to create a dish while being logged and monitored 182. The raw sensor data is logged (for playback) in 182 and processed to generate information at different abstraction levels (tools/equipment used, techniques employed, times/temperatures started/ended, etc.), and then used to create a recipe-script 184 for execution by the robotic kitchen 48. The robotic kitchen 48 engages in a recipe replication process 106, whose profile depends on whether the kitchen is of a standardized or non-standardized type, which is checked by a process 186.

The robotic kitchen execution is dependent on the type of kitchen available to the user. If the robotic kitchen uses the same/identical (at least functionally) equipment as used in the in the chef studio, the recipe replication process is primarily one of using the raw data and playing it back as part of the recipe-script execution process. Should the kitchen however differ from the ideal standardized kitchen, the execution engine(s) will have to rely on the abstraction data to generate kitchen-specific execution sequences to try to achieve a similar step-by-step result.

Since the cooking process is continually monitored by all sensor units in the robotic kitchen via a monitoring process 194, regardless of whether the known studio equipment 196 or the mixed/atypical non-chef studio equipment 198 is being used, the system is able to make modifications as needed depending on a recipe progress check 200. In one embodiment of the standardized kitchen, raw data is typically played back through an execution module 188 using chef-studio type equipment, and the only adjustments that are expected are adaptations 202 in the execution of the script (repeat a certain step, go back to a certain step, slow down the execution, etc.) as there is a one-to-one correspondence between taught and played-back data-sets. However, in the case of the non-standardized kitchen, the chances are very high that the system will have to modify and adapt the actual recipe itself and its execution, via a recipe script modification module 204, to suit the available tools/appliances 192 which differ from those in the chef studio 44 or the measured deviations from the recipe script (meat cooking too slowly, hot-spots in pot burning the roux, etc.). Overall recipe-script progress is monitored using a similar process 206, which differs depending on whether chef-studio equipment 208 or mixed/atypical kitchen equipment 210 is being used.

A non-standardized kitchen is less likely to result in a close-to-human chef cooked dish, as compared to using a standardized robotic kitchen that has equipment and capabilities reflective of those used in the studio-kitchen. The ultimate subjective decision is of course that of the human (or chef) tasting, or a quality evaluation 212, which yields to a (subjective) quality decision 214.

FIG. 5C is a block diagram illustrating one embodiment 216 of a recipe script generation and abstraction engine that pertains to the structure and flow of the recipe-script generation process as part of the chef-studio recipe walk-through by a human chef. The first step is for all available data measurable in the chef studio 44, whether it be ergonomic data from the chef (arms/hands positions and velocities, haptic finger data, etc.), status of the kitchen appliances (ovens, fridges, dispensers, etc.), specific variables (cooktop temperature, ingredient temperature, etc.), appliance or tools being used (pots/pans, spatulas, etc.), or two-dimensional and three-dimensional data collected by multi-spectrum sensory equipment (including cameras, lasers, structured light systems, etc.), to be input and filtered by the central computer system and also time-stamped by a main process 218.

A data process-mapping algorithm 220 uses the simpler (typically single-unit) variables to determine where the process action is taking place (cooktop and/or oven, fridge, etc.) and assigns a usage tag to any item/appliance/equipment being used whether intermittently or continuously. It associates a cooking step (baking, grilling, ingredient-addition, etc.) to a specific time-period and tracks when, where, which, and how much of what ingredient was added. This (time-stamped) information dataset is then made available for the data-melding process during the recipe-script generation process 222.

The data extraction and mapping process 224 is primarily focused on taking two-dimensional information (such as from monocular/single-lensed cameras) and extracting key information from the same. In order to extract the important and more abstraction descriptive information from each successive image, several algorithmic processes have to be applied to this dataset. Such processing steps can include (but are not limited to) edge-detection, color and texture-mapping, and then using the domain-knowledge in the image, coupled with object-matching information (type and size) extracted from the data reduction and abstraction process 226, to allow for the identification and location of the object (whether an item of equipment or ingredient, etc.), again extracted from the data reduction and abstraction process 226, allowing one to associate the state (and all associated variables describing the same) and items in an image with a particular process-step (frying, boiling, cutting, etc.). Once this data has been extracted and associated with a particular image at a particular point in time, it can be passed to the recipe-script generation process 222 to formulate the sequence and steps within a recipe.

The data-reduction and abstraction engine (set of software routines) 226 is intended to reduce the larger three-dimensional data sets and extract from them key geometric and associative information. A first step is to extract from the large three-dimensional data point-cloud only the specific workspace area of importance to the recipe at that particular point in time. Once the data set has been trimmed, key geometric features will be identified by a process known as template matching. This allows for the identification of such items as horizontal tabletops, cylindrical pots and pans, arm and hand locations, etc. Once typical known (template) geometric entities are determined in a data-set a process of object identification and matching proceeds to differentiate all items (pot vs. pan, etc.) and associates the proper dimensionality (size of pot or pan, etc.) and orientation of the same, and places them within the three-dimensional world model being assembled by the computer. All this abstraction/extracted information are then also shared with the data-extraction and mapping engine 224, prior to all being fed to the recipe-script generation engine 222.

The recipe-script generation engine process 222 is responsible for melding (blending/combining) all the available data and sets into a structured and sequential cooking script with clear process-identifiers (prepping, blanching, frying, washing, plating, etc.) and process-specific steps within each, which can then be translated into robotic-kitchen machine-executable command-scripts that are synchronized based on process-completion and overall cooking time and cooking progress. Data melding will at least involve, but will not solely be limited to, the ability to take each (cooking) process step and populating the sequence of steps to be executed with the properly associated elements (ingredients, equipment, etc.), methods and processes to be used during the process steps, and the associated key control (set oven/cooktop temperatures/settings), and monitoring-variables (water or meat temperature, etc.) to be maintained and checked to verify proper progress and execution. The melded data is then combined into a structured sequential cooking script that will resemble a set of minimally descriptive steps (akin to a recipe in a magazine) but with a much larger set of variables associated with each element (equipment, ingredient, process, method, variable, etc.) of the cooking process at any one point in the procedure. The final step is to take this sequential cooking script and transform it into an identically structured sequential script that is translatable by a set of machines/robot/equipment within a robotic kitchen 48. It is this script the robotic kitchen 48 uses to execute the automated recipe execution and monitoring steps.

All raw (unprocessed) and processed data as well as the associated scripts (both structure sequential cooking-sequence script and the machine-executable cooking-sequence script) are stored in the data and profile storage unit/process 228 and time-stamped. It is from this database that the user, by way of a GUI, can select and cause the robotic kitchen to execute a desired recipe through the automated execution and monitoring engine 230, which is continually monitored by its own internal automated cooking process, with necessary adaptations and modifications to the script generated by the same and implemented by the robotic-kitchen elements, in order to arrive at a completely plated and served dish.

FIG. 5D is a block diagram illustrating software elements for object-manipulation (or object handling) in the standardized robotic kitchen 50, which shows the structure and flow 250 of the object-manipulation portion of the robotic kitchen execution of a robotic script, using the notion of motion-replication coupled-with/aided-by minimanipulation steps. In order for automated robotic-arm/-hand-based cooking to be viable, it is insufficient to monitor every single joint in the arm and hands/fingers. In many cases just the position and orientation of the hand/wrist are known (and able to be replicated), but then manipulating an object (identifying location, orientation, pose, grab-location, grabbing-strategy and task-execution) requires that local-sensing and learned behaviors and strategies for the hand and fingers be used to complete the grabbing/manipulating task successfully. These motion-profiles (sensor-based/-driven) behaviors and sequences are stored within the mini hand-manipulation library software repository in the robotic-kitchen system. The human chef could be wearing complete arm-exoskeleton or an instrumented/target-fitted motion-vest allowing the computer via built-in sensors or though camera-tracking to determine the exact 3D position of the hands and wrists at all times. Even if the ten fingers on both hands had all their joints instrumented (more than 30 DoFs (Degrees of Freedom) for both hands and very awkward to wear and use, and thus unlikely to be used), a simple motion-based playback of all joint positions would not guarantee successful (interactive) object manipulation.

The minimanipulation library is a command-software repository, where motion behaviors and processes are stored based on an off-line learning process, where the arm/wrist/finger motions and sequences to successfully complete a particular abstract task (grab the knife and then slice; grab the spoon and then stir; grab the pot with one hand and then use other hand to grab spatula and get under meat and flip it inside the pan; etc.). This repository has been built up to contain the learned sequences of successful sensor-driven motion-profiles and sequenced behaviors for the hand/wrist (and sometimes also arm-position corrections), to ensure successful completions of object (appliance, equipment, tools) and ingredient manipulation tasks that are described in a more abstract language, such as “grab the knife and slice the vegetable”, “crack the egg into the bowl”, “flip the meat over in the pan”, etc. The learning process is iterative and is based on multiple trials of a chef-taught motion-profile from the chef studio, which is then executed and iteratively modified by the offline learning algorithm module, until an acceptable execution-sequence can be shown to have been achieved. The minimanipulation library (command software repository) is intended to have been populated (a-priori and offline) with all the necessary elements to allow the robotic-kitchen system to successfully interact with all equipment (appliances, tools, etc.) and main ingredients that require processing (steps beyond just dispensing) during the cooking process. While the human chef wore gloves with embedded haptic sensors (proximity, touch, contact-location/-force) for the fingers and palm, the robotic hands are outfitted with similar sensor-types in locations to allow their data to be used to create, modify and adapt motion-profiles to execute successfully the desired motion-profiles and handling-commands.

The object-manipulation portion of the robotic-kitchen cooking process (robotic recipe-script execution software module for the interactive manipulation and handling of objects in the kitchen environment) 252 is further elaborated below. Using the robotic recipe-script database 254 (which contains data in raw, abstraction cooking-sequence and machine-executable script forms), the recipe script executor module 256 steps through a specific recipe execution-step. The configuration playback module 258 selects and passes configuration commands through to the robot arm system (torso, arm, wrist and hands) controller 270, which then controls the physical system to emulate the required configuration (joint-positions/-velocities/-torques, etc.) values.

The notion of being able to carry out proper environment interaction manipulation and handling tasks faithfully is made possible through a real-time process-verification by way of (i) 3D world modeling as well as (ii) minimanipulation. Both the verification and manipulation steps are carried out through the addition of the robot wrist and hand configuration modifier 260. This software module uses data from the 3D world configuration modeler 262, which creates a new 3D world model at every sampling step from sensory data supplied by the multimodal sensor(s) unit(s), in order to ascertain that the configuration of the robotic kitchen systems and process matches that required by the recipe script (database); if not, it enacts modifications to the commanded system-configuration values to ensure the task is completed successfully. Furthermore, the robot wrist and hand configuration modifier 260 also uses configuration-modifying input commands from the minimanipulation motion profile executor 264. The hand/wrist (and potentially also arm) configuration modification data fed to the configuration modifier 260 are based on the minimanipulation motion profile executor 264 knowing what the desired configuration playback should be from 258, but then modifying it based on its 3D object model library 266 and the a-priori learned (and stored) data from the configuration and sequencing library 268 (which was built based on multiple iterative learning steps for all main object handling and processing steps).

While the configuration modifier 260 continually feeds modified commanded configuration data to the robot arm system controller 270, it relies on the handling/manipulation verification software module 272 to verify not only that the operation is proceeding properly but also whether continued manipulation/handling is necessary. In the case of the latter (answer 'N' to the decision), the configuration modifier 260 re-requests configuration-modification (for the wrist, hands/fingers and potentially the arm and possibly even torso) updates from both the world modeler 262 and the minimanipulation profile executor 264. The goal is simply to verify that a successful manipulation/handling step or sequence has been successfully completed. The handling/manipulation verification software module 272 carries out this check by using the knowledge of the recipe script database F2 and the 3D world configuration modeler 262 to verify the appropriate progress in the cooking step currently being commanded by the recipe script executor 256. Once progress has been deemed successful, the recipe script index increment process 274 notifies the recipe script executor 256 to proceed to the next step in the recipe-script execution.

FIG. 6 is a block diagram illustrating a multimodal sensing and software engine architecture 300 in accordance with the present disclosure. One of the main autonomous cooking features allowing for planning, execution and monitoring of a robotic cooking script requires the use of multimodal sensory input 302 that is used by multiple software modules to generate data needed to (i) understand the world, (ii) model the scene and materials, (iii) plan the next steps in the robotic cooking sequence, (iv) execute the generated plan and (v) monitor the execution to verify proper operations—all of these steps occurring in a continuous/repetitive closed loop fashion.

The multimodal sensor-unit(s) 302, comprising, but not limited to, video cameras 304, IR cameras and rangefinders 306, stereo (or even trinocular) camera(s) 308 and multi-dimensional scanning lasers 310, provide multi-spectral sensory data to the main software abstraction engines 312 (after being acquired & filtered in the data acquisition and filtering module 314). The data is used in a scene understanding module 316 to carry out multiple steps such as (but not limited to) building high- and lower-resolution (laser: high-resolution; stereo-camera: lower-resolution) three-dimensional surface volumes of the scene, with superimposed visual and IR-spectrum color and texture video information, allowing edge-detection and volumetric object-detection algorithms to infer what elements are in a scene, allowing the use of shape-/color-/texture- and consistency-mapping algorithms to run on the processed data to feed processed information to the Kitchen Cooking Process Equipment Handling Module 318. In the module 318, software-based engines are used for the purpose of identifying and three-dimensionally locating the position and orientation of kitchen tools and utensils and identifying and tagging recognizable food elements (meat, carrots, sauce, liquids, etc.) so as to generate data to let the computer build and understand the complete scene at a particular point in time so as to be used for next-step planning and process monitoring. Engines required to achieve such data and information abstraction include, but are not limited to, grasp reasoning engines, robotic kinematics and geometry reasoning engines, physical reasoning engines and task reasoning engines. Output data from both engines 316 and 318 are then used to feed the scene modeler and content classifier 320, where the 3D world model is created with all the key content required for executing the robotic cooking script executor. Once the fully-populated model of the world is understood, it can be used to feed the motion and handling planner 322 (if robotic-arm grasping and handling are necessary, the same data can be used to differentiate and plan for grasping and manipulating food and kitchen items depending on the required grip and placement) to allow for planning motions and trajectories for the arm(s) and attached end-effector(s) (grippers, multi-fingered hands). A follow-on Execution Sequence planner 324 creates the proper sequencing of task-based commands for all individual robotic/automated kitchen elements, which are then used by the robotic kitchen actuation systems 326. The entire sequence above is repeated in a continuous closed loop during the robotic recipe-script execution and monitoring phase.

FIG. 7A depicts the standardized kitchen 50 which in this case plays the role of the chef-studio, in which the human chef 49 carries out the recipe creation and execution while being monitored by the multi-modal sensor systems 66, so as to allow the creation of a recipe-script. Within the standardized kitchen, are contained multiple elements necessary for the execution of a recipe, including the main cooking module 350, which includes such as equipment as utensils 360, a cooktop 362, a kitchen sink 358, a dishwasher 356, a table-top mixer and blender (also referred to as a "kitchen blender") 352, an oven 354 and a refrigerator/freezer combination unit 364.

FIG. 7B depicts the standardized kitchen 50, which in this case is configured as the standardized robotic kitchen, with a dual-arm robotics system with vertical telescoping and rotating torso joint 366, outfitted with two arms 70, and two wristed and fingered hands 72, carries out the recipe replication processes defined in the recipe-script. The multimodal sensor systems 66 continually monitor the robotically executed cooking steps in the multiple stages of the recipe replication process.

FIG. 7C depicts the systems involved in the creation of a recipe-script by monitoring a human chef 49 during the entire recipe execution process. The same standardized kitchen 50 is used in a chef studio mode, with the chef able to operate the kitchen from either side of the work-module. Multi-modal sensors 66 monitor and collect data, as well as through the haptic gloves 370 worn by the chef and instrumented cookware 372 and equipment, relaying all collected raw data wirelessly to a processing computer 16 for processing and storage.

FIG. 7D depicts the systems involved in a standardized kitchen 50 for the replication of a recipe script 19 through the use of a dual-arm system with telescoping and rotating torso 374, comprised of two arms 72, two robotic wrists 71 and two multi-fingered hands 72 with embedded sensory skin and point-sensors. The robotic dual-arm system uses the instrumented arms and hands with a cooking utensil and an instrumented appliance and cookware (pan in this image) on a cooktop 12, while executing a particular step in the recipe replication process, while being continuously monitored by the multi-modal sensor units 66 to ensure the replication process is carried out as faithfully as possible to that created by the human chef. All data from the multi-modal sensors 66, dual-arm robotics system comprised of torso 74, arms 72, wrists 71 and multi-fingered hands 72, utensils, cookware and appliances, is wirelessly transmitted to a computer 16, where it is processed by an onboard processing unit 16 in order to compare and track the replication process of the recipe to as faithfully as possible follow the criteria and steps as defined in the previously created recipe script 19 and stored in media 18.

Some suitable robotic hands that can be modified for use with the robotic kitchen 48 include Shadow Dexterous Hand and Hand-Lite designed by Shadow Robot Company, located in London, the United Kingdom; a servo-electric 5-finger gripping hand SVH designed by SCHUNK GmbH & Co. KG, located in Lauffen/Neckar, Germany; and DLR HIT HAND II designed by DLR Robotics and Mechatronics, located in Cologne, Germany.

Several robotic arms 72 are suitable for modification to operate with the robotic kitchen 48, which include UR3 Robot and UR5 Robot by Universal Robots A/S, located in Odense S, Denmark, Industrial Robots with various payloads designed by KUKA Robotics, located in Augsburg, Bavaria, Germany, Industrial Robot Arm Models designed by Yaskawa Motoman, located in Kitakyushu, Japan.

FIG. 7E is a block diagram depicting the stepwise flow and methods 376 to ensure that there are control or verification points during the recipe replication process based on the recipe-script when executed by the standardized robotic kitchen 50, that ensures as nearly identical as possible a cooking result for a particular dish as executed by the standardized robotic kitchen 50, when compared to the dish prepared by the human chef 49. Using a recipe 378, as described by the recipe-script and executed in sequential steps in the cooking process 380, the fidelity of execution of the recipe by the robotic kitchen 50 will depend largely on considering the following main control items. Key control items include the process of selecting and utilizing a standardized portion amount and shape of a high-quality and pre-processed ingredient 382, the use of standardized tools and utensils, cook-ware with standardized handles to ensure proper and secure grasping with a known orientation 384, standardized equipment 386 (oven, blender, fridge, fridge, etc.) in the standardized kitchen that is as identical as possible when comparing the chef studio kitchen where the human chef 49 prepares the dish and the standardized robotic kitchen 50, location and placement 388 for ingredients to be used in the recipe, and ultimately a pair of robotic arms, wrists and multi-fingered hands in the robotic kitchen module 50 continually monitored by sensors with computer-controlled actions 390 to ensure successful execution of each step in every stage of the replication process of the recipe-script for a particular dish. In the end, the task of ensuring an identical result 392 is the ultimate goal for the standardized robotic kitchen 50.

FIG. 7F depicts a block diagram of a cloud-based recipe software for facilitating between the chef studio, the robotic kitchen, and other sources. The various types of data communicated, modified, and stored on a cloud computing 396 between the chef kitchen 44, which operates a standardized robotic kitchen 50 and the robotic kitchen 48, which operates a standardized robotic kitchen 50. The cloud computing 394 provides a central location to store software files, including operation of the robot food preparation 56, which can conveniently retrieve and upload software files through a network between the chef kitchen 44 and the robotic kitchen 48. The chef kitchen 44 is communicatively coupled to the cloud computing 395 through a wired or wireless network 396 via the Internet, wireless protocols, and short distance communication protocols, such as BlueTooth. The robotic kitchen 48 is communicatively coupled to the cloud computing 395 through a wired or wireless network 397 via the Internet, wireless protocols, and short distance communication protocols, such as BlueTooth. The cloud computing 395 includes computer storage locations to store a task library 398*a* with actions, recipe, and minimanipulations; a user profile/data 398*b* with login information, ID, and subscriptions; a recipe meta data 398*c* with text, voice media, etc.; an object recognition module 398*d* with standard images, non-standard images, dimensions, weight, and orientations; an environment/instrumented map 398*e* for navigation of object positions, locations, and the operating environment; and a controlling software files 398*f* for storing robotic command instructions, high-level software files, and low-level software files. In another embodiment, the Internet of Things (IoT) devices can be incorporated to operate with the chef kitchen 44, the cloud computing 396 and the robotic kitchen 48.

FIG. 8A is a block diagram illustrating one embodiment of a recipe conversion algorithm module 400 between the chef's movements and the robotic replication movements. A recipe algorithm conversion module 404 converts the captured data from the chef's movements in the chef studio 44 into a machine-readable and machine-executable language 406 for instructing the robotic arms 70 and the robotic hands 72 to replicate a food dish prepared by the chef's movement in the robotic kitchen 48. In the chef studio 44, the computer 16 captures and records the chef's movements based on the sensors on a glove 26 that the chef wears, represented by a plurality of sensors $S_0$, $S_1$, $S_2$, $S_3$, $S_4$, $S_5$, $S_6$ . . . $S_n$ in the vertical columns, and the time increments $t_0$, $t_1$, $t_2$, $t_3$, $t_4$, $t_5$ $t_6$ . . . $t_{end}$ in the horizontal rows, in a table 408. At time $t_0$, the computer 16 records the xyz coordinate positions from the sensor data received from the plurality of sensors $S_0$, $S_1$, $S_2$, $S_3$, $S_4$, $S_5$, $S_6$ . . . $S_n$. At time $t_1$, the computer 16 records the xyz coordinate positions from the sensor data received from the plurality of sensors $S_0$, $S_1$, $S_2$, $S_3$, $S_4$, $S_5$, $S_6$ . . . $S_n$. At time $t_2$, the computer 16 records the xyz coordinate positions from the sensor data received from the plurality of sensors $S_0$, $S_1$, $S_2$, $S_3$, $S_4$, $S_5$, $S_6$ . . . $S_n$. This process continues until the entire food preparation is completed at time tend. The duration for each time units to, $t_1$, $t_2$, $t_3$, $t_4$, $t_5$, $t_6$ . . . $t_{end}$ is the same. As a result of the captured and recorded sensor data, the table 408 shows any movements from the sensors $S_0$, $S_1$, $S_2$, $S_3$, $S_4$, $S_5$, $S_6$ . . . $S_n$ in the glove 26 in xyz coordinates, which would indicate the differentials between the xyz coordinate positions for one specific time relative to the xyz coordinate positions for the next specific time. Effectively, the table 408 records how the chef's movements change over the entire food preparation process from the start time, $t_0$, to the end time, $t_{end}$. The illustration in this embodiment can be extended to two gloves 26 with sensors, which the chef 49 wears to capture the movements while preparing a food dish. In the robotic kitchen 48, the robotic arms 70 and the robotic hands 72 replicate the recorded recipe from the chef studio 44, which is then converted to robotic instructions, where the robotic arms 70 and the robotic hands 72 replicate the food preparation of the chef 49 according to the timeline 416. The robotic arms 70 and hands 72 carry out the food preparation with the same xyz coordinate positions, at the same speed, with the same time increments from the start time, $t_0$, to the end time, $t_{end}$, as shown in the timeline 416.

In some embodiments, a chef performs the same food preparation operation multiple times, yielding values of the sensor reading, and parameters in the corresponding robotic instructions that vary somewhat from one time to the next. The set of sensor readings for each sensor across multiple repetitions of the preparation of the same food dish provides a distribution with a mean, standard deviation and minimum and maximum values. The corresponding variations on the robotic instructions (also called the effector parameters) across multiple executions of the same food dish by the chef also define distributions with mean, standard deviation, minimum and maximum values. These distributions may be used to determine the fidelity (or accuracy) of subsequent robotic food preparations.

In one embodiment the estimated average accuracy of a robotic food preparation operation is given by:

$$A(C, R) = 1 - \frac{1}{n} \sum_{n=1,\ldots n} \frac{|c_i - p_i|}{(|c_{i,t} - p_{i,t}|}$$

Where C represents the set of Chef parameters ($1^{st}$ through $n^{th}$) and R represents the set of Robotic Apparatus parameters (correspondingly ($1^{st}$ through $n^{th}$). The numerator in the sum represents the difference between robotic and chef parameters (i.e. the error) and the denominator normalizes for the maximal difference). The sum gives the total normalized cumulative error $$\text{(i.e. } \sum_{n=1,\ldots n} \frac{|c_i - p_i|}{\max(|c_{i,t} - p_{i,t}|}\text{),}$$

and multiplying by 1/n gives the average error. The complement of the average error corresponds to the average accuracy.

Another version of the accuracy calculation weighs the parameters for importance, where each coefficient (each $\alpha_i$) represents the importance of the $i^{th}$ parameter, the normalized cumulative error is $$\sum_{n=1,\ldots n} \frac{\alpha_i |c_i - p_i|}{\max(|c_{i,t} - p_{i,t}|}$$

and the estimated average accuracy is given by:

$$A(C, R) = 1 - \left( \sum_{n=1,\ldots n} \frac{\alpha_i |c_i - p_i|}{\max(|c_{i,t} - p_{i,t}|} \right) \Big/ \sum_{i=1,\ldots n} \alpha_i$$

FIG. 8B is a block diagram illustrating the pair of gloves 26*a* and 26*b* with sensors worn by the chef 49 for capturing and transmitting the chef's movements. In this illustrative example, which is intended to show one example without limiting effects, a right hand glove 26*a* Includes 25 sensors to capture the various sensor data points D1, D2, D3, D4, D5, D6, D7, D8, D9, D10, D11, D12, D13, D14, D15, D16, D17, D18, D19, D20, D21, D22, D23, D24, and D25, on the glove 26*a*, which may have optional electronic and mechanical circuits 420. A left hand glove 26*b* Includes 25 sensors to capture the various sensor data points D26, D27, D28, D29, D30, D31, D32, D33, D34, D35, D36, D37, D38, D39, D40, D41, D42, D43, D44, D45, D46, D47, D48, D49, D50, on the glove 26*b*, which may have optional electronic and mechanical circuits 422.

FIG. 8C is a block diagram illustrating robotic cooking execution steps based on the captured sensory data from the chef's sensory capturing gloves 26*a* and 26*b*. In the chef studio 44, the chef 49 wears gloves 26*a* and 26*b* with sensors for capturing the food preparation process, where the sensor data are recorded in a table 430. In this example, the chef 49 is cutting a carrot with a knife in which each slice of the carrot is about 1 centimeter in thickness. These action primitives by the chef 49, as recorded by the gloves 26*a*, 26*b*, may constitute a minimanipulation 432 that take place over time slots 1, 2, 3 and 4. The recipe algorithm conversion module 404 is configured to convert the recorded recipe file from the chef studio 44 to robotic instructions for operating the robotic arms 70 and the robotic hands 72 in the robotic kitchen 28 according to a software table 434. The robotic arms 70 and the robotic hands 72 prepare the food dish with control signals 436 for the minimanipulation, as pre-defined in the minimanipulation library 116, of cutting the carrot with knife in which each slice of the carrot is about 1 centimeter in thickness. The robotic arms 70 and the robotic hands 72 operate autonomously with the same xyz coordinates 438 and with possible real-time adjustment on the size and shape of a particular carrot by creating a temporary three-dimensional model 440 of the carrot from the real-time adjustment devices 112

As depicted in FIG. 8D, the process of cooking requires a sequence of steps that are referred to as a plurality of stages $S_1$, $S_2$, $S_3$ . . . $S_j$ . . . $S_n$ of food preparation, as shown in a timeline 456. These may require strict linear/sequential ordering or some may be performed in parallel; either way we have a set of stages $\{S_1, S_2, \ldots, S_i, \ldots, S_n\}$, all of which must be completed successfully to achieve overall success.

If the probability of success for each stage is $P(s_i)$ and there are n stages, then the probability of overall success is estimated by the product of the probability of success at each stage:

$$P(S) = \prod_{S_i \in S} P(s_i)$$

A person of skill in the art will appreciate that the probability of overall success can be low even if the probability of success of individual stages is relatively high. For instance, given 10 stages and a probability of success of each stage being 90%, the probability of overall success is $(0.9)^{10}$, 0.28 or 28%.

A stage in preparing a food dish comprises one or more minimanipulations, where each minimanipulation comprises one or more robotic actions leading to a well-defined intermediate result. For instance, slicing a vegetable can be a minimanipulation comprising grasping the vegetable with one hand, grasping a knife with the other, and applying repeated knife movements until the vegetable is sliced. A stage in preparing a dish can comprise one or multiple slicing minimanipulations.

The probability of success formula applies equally well at the level of stages and at the level of minimanipulations, so long as each minimanipulation is relatively independent of other minimanipulations.

In one embodiment, in order to mitigate the problem of reduced certainty of success due to potential compounding errors, standardized methods for most or all of the minimanipulations in all of the stages are recommended. Standardized operations are ones that can be pre-programmed, pre-tested, and if necessary pre-adjusted to select the sequence of operations with the highest probability of success. Hence, if the probability of standardized methods via the minimanipulations within stages is very high, so will be the overall probability of success of preparing the food dish, due to the prior work, until all of the steps have been perfected and tested. For instance, to return to the above example, if each stage utilizes reliable standardized methods, and its success probability is 99% (instead of 90% as in the earlier example), then the overall probability of success will be $(0.99)^{10}$=90.4%, assuming there are 10 stages as before. This is clearly better than 28% probability of an overall correct outcome.

In another embodiment, more than one alternative method is provided for each stage, wherein, if one alternative fails, another alternative is tried. This requires dynamic monitoring to determine the success or failure of each stage, and the ability to have an alternate plan. The probability of success for that stage is the complement of the probability of failure for all of the alternatives, which mathematically is written as:

$$P(s_i \mid A(s_i)) = 1 - \prod_{a_j \in A(s_i)} (1 - P(s_i \mid a_j))$$

In the above expression, $s_i$ is the stage and $A(s_i)$ is the set of alternatives for accomplishing $s_i$. The probability of failure for a given alternative is the complement of the probability of success for that alternative, namely $1-P(s_i|a_i)$, and the probability of all the alternatives failing is the product in the above formula. Hence, the probability that not all will fail is the complement of the product. Using the method of alternatives, the overall probability of success can be estimated as the product of each stage with alternatives, namely:

$$P(S) = \prod_{S_i \in S} P(s_i \mid A(s_i))$$

With this method of alternatives, if each of the 10 stages had 4 alternatives, and the expected success of each alternative for each stage was 90%, then the overall probability of success would be $(1-(1-(0.9))^4)^{10}$=0.99 or 99% versus just 28% without the alternatives. The method of alternatives transforms the original problem from a chain of stages with multiple single points of failure (if any stage fails) to one without single points of failure, since all the alternatives would need to fail in order for any given stage to fail, providing more robust outcomes.

In another embodiment, both standardized stages, comprising of standardized minimanipulations and alternate means of the food dish preparation stages, are combined, yielding a behavior that is even more robust. In such a case, the corresponding probability of success can be very high, even if alternatives are only present for some of the stages or minimanipulations.

In another embodiment only the stages with lower probability of success are provided alternatives, in case of failure, for instance stages for which there is no very reliable standardized method, or for which there is potential variability, e.g. depending on odd-shaped materials. This embodiment reduces the burden of providing alternatives to all stages.

FIG. 8E is a graphical diagram showing the probability of overall success (y-axis) as a function of the number of stages needed to cook a food dish (x-axis) for a first curve 458 illustrating a non-standardized kitchen 458 and a second curve 459 illustrating the standardized kitchen 50. In this example, the assumption made is that the individual probability of success per food preparation stage was 90% for a non-standardized operation and 99% for a standardized pre-programmed stage. The compounded error is much worse in the former case, as shown in the curve 458 compared to the curve 459.

FIG. 8F is a block diagram illustrating the execution of a recipe 460 with multi-stage robotic food preparation with minimanipulations and action primitives. Each food recipe 460 can be divided into a plurality of food preparation stages: a first food preparation stage $S_1$ 470, a second food preparation stage $S_2$ . . . an n-stage food preparation stage $S_n$ 490, as executed by the robotic arms 70 and the robotic hands 72. The first food preparation stage $S_1$ 470 comprises one or more minimanipulations $MM_1$ 471, $MM_2$472, and $MM_3$473. Each minimanipulation includes one or more action primitives, which obtains a functional result. For example, the first minimanipulation $MM_1$ 471 includes a first action primitive $AP_1$ 474, a second action primitive $AP_2$ 475, and a third action primitive $AP_3$ 475, which then achieves a functional result 477. The one or more minimanipulations $MM_1$471, $MM_2$472, $MM_3$473 in the first stage $S_1$ 470 then accomplish a stage result 479. The combination of one or more food preparation stage $S_1$ 470, the second food preparation stage $S_2$ and the n-stage food preparation stage $S_n$ 490 produces substantially the same or the same result by replicating the food preparation process of the chef 49 as recorded in the chef studio 44.

A predefined minimanipulation is available to achieve each functional result (e.g., the egg is cracked). Each minimanipulation comprises of a collection of action primitives which act together to accomplish the functional result. For example, the robot may begin by moving its hand towards the egg, touching the egg to localize its position and verify its size, and executing the movements and sensing actions necessary to grasp and lift the egg into the known and predetermined configuration.

Multiple minimanipulations may be collected into stages such as making a sauce for convenience in understanding and organizing the recipe. The end result of executing all of the minimanipulations to complete all of the stages is that a food dish has been replicated with a consistent result each time.

FIG. 9A is a block diagram illustrating an example of the robotic hand 72 with five fingers and a wrist with RGB-D sensor, camera sensors and sonar sensor capabilities for detecting and moving a kitchen tool, an object, or an item of kitchen equipment. The palm of the robotic hand 72 includes an RGB-D sensor 500, a camera sensor or a sonar sensor 504*f*. Alternatively, the palm of the robotic hand 450 includes both the camera sensor and the sonar sensor. The RGB-D sensor 500 or the sonar sensor 504*f* is capable of detecting the location, dimensions and shape of the object to create a three-dimensional model of the object. For example, the RGB-D sensor 500 uses structured light to capture the shape of the object, three-dimensional mapping and localization, path planning, navigation, object recognition and people tracking. The sonar sensor 504*f* uses acoustic waves to capture the shape of the object. In conjunction with the camera sensor 452 and/or the sonar sensor 454, the video camera 66 placed somewhere in the robotic kitchen, such as on a railing, or on a robot, provides a way to capture, follow, or direct the movement of the kitchen tool as used by the chef 49, as illustrated in FIG. 7A. The video camera 66 is positioned at an angle and some distance away from the robotic hand 72, and therefore provides a higher-level view of the robotic hand's 72 gripping of the object, and whether the robotic hand has gripped or relinquished/released the object. A suitable example of RGB-D (a red light beam, a green light beam, a blue light beam, and depth) sensor is the Kinect system by Microsoft, which features an RGB camera, depth sensor and multi-array microphone running on software, which provide full-body 3D motion capture, facial recognition and voice recognition capabilities.

The robotic hand 72 has the RGB-D sensor 500 placed in or near the middle of the palm for detecting the distance and shape of an object, as well as the distance of the object, and for handling a kitchen tool. The RGB-D sensor 500 provides guidance to the robotic hand 72 in moving the robotic hand 72 toward the direction of the object and to make necessary adjustments to grab an object. Second, a sonar sensor 502*f* and/or a tactile pressure sensor are placed near the palm of the robotic hand 72, for detecting the distance and shape, and subsequent contact, of the object. The sonar sensor 502*f* can also guide the robotic hand 72 to move toward the object. Additional types of sensors in the hand may include ultrasonic sensors, lasers, radio frequency identification (RFID) sensors, and other suitable sensors. In addition, the tactile pressure sensor serves as a feedback mechanism so as to determine whether the robotic hand 72 continues to exert additional pressure to grab the object at such point where there is sufficient pressure to safely lift the object. In addition, the sonar sensor 502*f* in the palm of the robotic hand 72 provides a tactile sensing function to grab and handle a kitchen tool. For example, when the robotic hand 72 grabs a knife to cut beef, the amount of pressure that the robotic hand exerts on the knife and applies to the beef can be detected by the tactile sensor when the knife finishes slicing the beef, i.e. when the knife has no resistance, or when holding an object. The pressure distributed is not only to secure the object, but also not to break it (e.g. an egg).

Furthermore, each finger on the robotic hand 72 has haptic vibration sensors 502*a-e* and sonar sensors 504*a-e* on the respective fingertips, as shown by a first haptic vibration sensor 502*a* and a first sonar sensor 504*a* on the fingertip of the thumb, a second haptic vibration sensor 502*b* and a second sonar sensor 504*b* on the fingertip of the index finger, a third haptic vibration sensor 502*c* and a third sonar sensor 504*c* on the fingertip of the middle finger, a fourth haptic vibration sensor 502*d* and a fourth sonar sensor 504*d* on the fingertip of the ring finger, and a fifth haptic vibration sensor 502*e* and a fifth sonar sensor 504*e* on the fingertip of the pinky. Each of the haptic vibration sensors 502*a*, 502*b*, 502*c*, 502*d* and 502*e* can simulate different surfaces and effects by varying the shape, frequency, amplitude, duration and direction of a vibration. Each of the sonar sensors 504*a*, 504*b*, 504*c*, 504*d* and 504*e* provides sensing capability on the distance and shape of the object, sensing capability for the temperature or moisture, as well as feedback capability. Additional sonar sensors 504*g* and 504*h* are placed on the wrist of the robotic hand 72.

FIG. 9B is a block diagram illustrating one embodiment of a pan-tilt head 510 with a sensor camera 512 coupled to a pair of robotic arms and hands for operation in the standardized robotic kitchen. The pan-tilt head 510 has an RGB-D sensor 512 for monitoring, capturing or processing information and three-dimensional images within the standardized robotic kitchen 50. The pan-tilt head 510 provides good situational awareness, which is independent of arm and sensor motions. The pan-tilt head 510 is coupled to the pair of robotic arms 70 and hands 72 for executing food preparation processes, but the pair of robotic arms 70 and hands 72 may cause occlusions. In one embodiment, a robotic apparatus comprises one or more robotic arms 70 and one or more robotic hands (or robotic grippers) 72.

FIG. 9C is a block diagram illustrating sensor cameras 514 on the robotic wrists 73 for operation in the standardized robotic kitchen 50. One embodiment of the sensor cameras 514 is an RGB-D sensor that provides color image and depth perception mounted to the wrists 73 of the respective hand 72. Each of the camera sensors 514 on the respective wrist 73 provides limited occlusions by an arm, while generally not occluded when the robotic hand 72 grasps an object. However, the RGB-D sensors 514 may be occluded by the respective robotic hand 72.

FIG. 9D is a block diagram illustrating an eye-in-hand 518 on the robotic hands 72 for operation in the standardized robotic kitchen 50. Each hand 72 has a sensor, such as an RGD-D sensor for providing an eye-in-hand function by the robotic hand 72 in the standardized robotic kitchen 50. The eye-in-hand 518 with RGB-D sensor in each hand provides high image details with limited occlusions by the respective robotic arm 70 and the respective robotic hand 72. However, the robotic hand 72 with the eye-in-hand 518 may encounter occlusions when grasping an object.

The shape of the deformable palm will be described using locations of feature points relative to a fixed reference frame, as shown in FIG. 9E. Each feature point is represented as a vector of x, y, and z coordinate positions over time. Feature point locations are marked on the sensing glove worn by the chef and on the sensing glove worn by the robot. A reference frame is also marked on the glove, as illustrated in FIG. 9E. Feature points are defined on a glove relative to the position of the reference frame.

Feature points are measured by calibrated cameras mounted in the workspace as the chef performs cooking tasks. Trajectories of feature points in time are used to match the chef motion with the robot motion, including matching the shape of the deformable palm. Trajectories of feature points from the chef's motion may also be used to inform robot deformable palm design, including shape of the deformable palm surface and placement and range of motion of the joints of the robot hand.

As illustrated in FIG. 9E, the feature points 560 in the embodiments are represented by the sensors, such as Hall effect sensors, in the different regions (the hypothenar eminence 534, the thenar eminence 532, and the MCP pad 536 of the palm. The feature points are identifiable in their respective locations relative to the reference frame, which in this implementation is a magnet. The magnet produces magnetic fields that are readable by the sensors. The sensors in this embodiment are embedded underneath the glove.

FIG. 9*l* shows the robot hand 72 with embedded sensors and one or more magnets 562 that may be used as an alternative mechanism to determine the locations of three-dimensional shape feature points. One shape feature point is associated with each embedded sensor. The locations of these shape feature points 560 provide information about the shape of the palm surface as the palm joints move and as the palm surface deforms in response to applied forces.

Shape feature point locations are determined based on sensor signals. The sensors provide an output that allows calculation of distance in a reference frame, which is attached to the magnet, which furthermore is attached to the hand of the robot or the chef.

The three-dimensional location of each shape feature point is calculated based on the sensor measurements and known parameters obtained from sensor calibration. The shape of the deformable palm is comprised of a vector of three-dimensional shape feature points, all of which are expressed in the reference coordinate frame, which is fixed to the hand of the robot or the chef. For additional information on common contact regions on the human hand and function in grasping, see the material from Kamakura, Noriko, Michiko Matsuo, Harumi Ishii, Fumiko Mitsuboshi, and Yoriko Miura. "Patterns of static pretension in normal hands." American Journal of Occupational Therapy 34, no. 7 (1980): 437-445, which this reference is incorporated by reference herein in its entirety.

FIG. 10 is a flow diagram illustrating one embodiment of the process 560 in evaluating the captured of chef's motions with robot poses, motions and forces. A database 561 stores predefined (or predetermined) grasp poses 562 and predefined hand motions by the robotic arms 72 and the robotic hands 72, which are weighted by importance 564, labeled with points of contact 565, and stored contact forces 565. At operation 567, the chef movements recording module 98 is configured to capture the chef's motions in preparing a food dish based in part on the predefined grasp poses 562 and the predefined hand motions 563. At operation 568, the robotic food preparation engine 56 is configured to evaluate the robot apparatus configuration for its ability to achieve poses, motions and forces, and to accomplish minimanipulations. Subsequently, the robot apparatus configuration undergoes an iterative process 569 in assessing the robot design parameters 570, adjusting design parameters to improve the score and performance 571, and modifying the robot apparatus configuration 572.

FIGS. 11A-C are block diagrams illustrating one embodiment of a kitchen handle 580 for use with the robotic hand 72 with the palm 520. The design of the kitchen handle 580 is intended to be universal (or standardized) so that the same kitchen handle 580 can attach to any type of kitchen utensils or tools, e.g. a knife, a spatula, a skimmer, a ladle, a draining spoon, a turner, etc. Different perspective views of the kitchen handle 580 are shown in FIGS. 12A-B. The robotic hand 72 grips the kitchen handle 580 as shown in FIG. 11C. Other types of standardized (or universal) kitchen handles may be designed without departing from the spirit of the present disclosure.

FIG. 12 is a pictorial diagram illustrating an example robotic hand 600 with tactile sensors 602 and distributed pressure sensors 604. During the food preparation process, the robotic apparatus 75 uses touch signals generated by sensors in the fingertips and the palms of a robot's hands to detect force, temperature, humidity and toxicity as the robot replicates step-by-step movements and compares the sensed values with the tactile profile of the chef's studio cooking program. Visual sensors help the robot to identify the surroundings and take appropriate cooking actions. The robotic apparatus 75 analyzes the image of the immediate environment from the visual sensors and compares it with the saved image of the chef's studio cooking program, so that appropriate movements are made to achieve identical results. The robotic apparatus 75 also uses different microphones to compare the chef's instructional speech to background noise from the food preparation processes to improve recognition performance during cooking. Optionally, the robot may have an electronic nose (not shown) to detect odor or flavor and surrounding temperature. For example, the robotic hand 600 is capable of differentiating a real egg by surface texture, temperature and weight signals generated by haptic sensors in the fingers and palm, and is thus able to apply the proper amount of force to hold an egg without breaking it, as well as performing a quality check by shaking and listening for sloshing, cracking the egg and observing and smelling the yolk and albumen to determine the freshness. The robotic hand 600 then may take action to dispose of a bad egg or select a fresh egg. The sensors 602 and 604 on hands, arms, and head enable the robot to move, touch, see and hear to execute the food preparation process using external feedback and obtain a result in the food dish preparation that is identical to the chef's studio cooking result.

FIG. 13 is a pictorial diagram illustrating an example of a sensing costume 620 (for the chef 49 to wear at the standardized robotic kitchen 50. During the food preparation of a food dish, as recorded by a software file 46, the chef 49 wears the sensing costume 620 for capturing the real-time chef's food preparation movements in a time sequence. The sensing costume 620 may include, but is not limited to, a haptic suit 622 (shown one full-length arm and hand costume)[again, no number like that in there], haptic gloves 624, a multimodal sensor(s) 626 [no such number], a head costume 628. The haptic suit 622 with sensors is capable of capturing data from the chef's movements and transmitting captured data to the computer 16 to record the xyz coordinate positions and pressure of human arms 70 and hands/fingers 72 in the XYZ-coordinate system with a time-stamp. The sensing costume 620 also senses and the computer 16 records the position, velocity and forces/torques and end-point contact behavior of human arms 70 and hands/fingers 72 in a robot-coordinate frame with and associates them with a system timestamp, for correlating with the relative positions in the standardized robotic kitchen 50 with geometric sensors (laser, 3D stereo, or video sensors). The haptic glove 624 with sensors is used to capture, record and save force, temperature, humidity, and toxicity signals detected by tactile sensors in the gloves 624. The head costume 628 includes feedback devices with vision camera, sonar, laser, or radio frequency identification (RFID) and a custom pair of glasses that are used to sense, capture, and transmit the captured data to the computer 16 for recording and storing images that the chef 48 observes during the food preparation process. In addition, the head costume 628 also includes sensors for detecting the surrounding temperature and smell signatures in the standardized robotic kitchen 50. Furthermore, the head costume 628 also includes an audio sensor for capturing the audio that the chef 49 hears, such as sound characteristics of frying, grinding, chopping, etc.

FIGS. 14A-B are pictorial diagrams illustrating one embodiment of a three-finger haptic glove 630 with sensors for food preparation by the chef 49 and an example of a three-fingered robotic hand 640 with sensors. The embodiment illustrated herein shows the simplified robotic hand 640, which has less than five fingers for food preparation. Correspondingly, the complexity in the design of the simplified robotic hand 640 would be significantly reduced, as well as the cost to manufacture the simplified robotic hand 640. Two finger grippers or four-finger robotic hands, with or without an opposing thumb, are also possible alternate implementations. In this embodiment, the chef's hand movements are limited by the functionalities of the three fingers, thumb, index finder and middle finger, where each finger has a sensor 632 for sensing data of the chef's movement with respect to force, temperature, humidity, toxicity or tactile-sensation. The three-finger haptic glove 630 also includes point sensors or distributed pressure sensors in the palm area of the three-finger haptic glove 630. The chef's movements in preparing a food dish wearing the three-finger haptic glove 630 using the thumb, the index finger, and the middle fingers are recorded in a software file. Subsequently, the three-fingered robotic hand 640 replicates the chef's movements from the converted software recipe file into robotic instructions for controlling the thumb, the index finger and the middle finger of the robotic hand 640 while monitoring sensors 642*b* on the fingers and sensors 644 on the palm of the robotic hand 640. The sensors 642 include a force, temperature, humidity, toxicity or tactile sensor, while the sensors 644 can be implemented with point sensors or distributed pressure sensors.

FIG. 14C is a block diagram illustrating one example of the interplay and interactions between the robotic arm 70 and the robotic hand 72. A compliant robotic arm 750 provides a smaller payload, higher safety, more gentle actions, but less precision. An anthropomorphic robotic hand 752 provides more dexterity, capable of handling human tools, is easier to retarget for a human hand motion, more compliant, but the design requires more complexity, increase in weight, and higher product cost. A simple robotic hand 754 is lighter in weight, less expensive, with lower dexterity, and not able to use human tools directly. An industrial robotic arm 756 is more precise, with higher payload capacity but generally not considered safe around humans and can potentially exert a large amount of force and cause harm. One embodiment of the standardized robotic kitchen 50 is to utilize a first combination of the compliant arm 750 with the anthropomorphic hand 752. The other three combinations are generally less desirable for implementation of the present disclosure.

FIG. 14D is a block diagram illustrating the robotic hand 72 using the standardized kitchen handle 580 to attach to a custom cookware head and the robotic arm 70 affixable to kitchen ware. In one technique to grab a kitchen ware, the robotic hand 72 grabs the standardized kitchen tool 580 for attaching to any one of the custom cookware heads from the illustrated choices of 760*a*, 760*b*, 760*c*, 760*d*, 760*e*, and others. For example, the standardized kitchen handle 580 is attached to the custom spatula head 760*e* for use to stir-fry the ingredients in a pan. In one embodiment, the standardized kitchen handle 580 can be held by the robotic hand 72 in just one position, which minimizes the potential confusion in different ways to hold the standardized kitchen handle 580. In another technique to grab a kitchen ware, the robotic arm has one or more holders 762 that are affixable to a kitchen ware 762, where the robotic arm 70 is able to exert more forces if necessary in pressing the kitchen ware 762 during the robotic hand motion.

FIG. 15A is a block diagram illustrating a sensing glove 680 used by the chef 49 to sense and capture the chef's movements while preparing a food dish. The sensing glove 680 has a plurality of sensors 682*a*, 682*b*, 682*c*, 682*d*, 682*e* on each of the fingers, and a plurality of sensors 682*f*, 682*g*, in the palm area of the sensing glove 680. In one embodiment, the at least 5 pressure sensors 682*a*, 682*b*, 682*c*, 682*d*, 682*e* inside the soft glove are used for capturing and analyzing the chef's movements during all hand manipulations. The plurality of sensors 682*a*, 682*b*, 682*c*, 682*d*, 682*e*, 682*f*, and 682*g* in this embodiment are embedded in the sensing glove 680 but transparent to the material of the sensing glove 680 for external sensing. The sensing glove 680 may have feature points associated with the plurality of sensors 682*a*, 682*b*, 682*c*, 682*d*, 682*e*, 682*f*, 682*g* that reflect the hand curvature (or relief) of various higher and lower points in the sensing glove 680. The sensing glove 680, which is placed over the robotic hand 72, is made of soft materials that emulate the compliance and shape of human skin. Additional description elaborating on the robotic hand 72 can be found in FIG. 9A.

The robotic hand 72 includes a camera sensor 684, such as an RGB-D sensor, an imaging sensor or a visual sensing device, placed in or near the middle of the palm for detecting the distance and shape of an object, as well as the distance of the object, and for handling a kitchen tool. The imaging sensor 682*f* provides guidance to the robotic hand 72 in moving the robotic hand 72 towards the direction of the object and to make necessary adjustments to grab an object. In addition, a sonar sensor, such as a tactile pressure sensor, may be placed near the palm of the robotic hand 72, for detecting the distance and shape of the object. The sonar sensor 682*f* can also guide the robotic hand 72 to move toward the object. Each of the sonar sensors 682*a*, 682*b*, 682*c*, 682*d*, 682*e*, 682*f*, 682*g* includes ultrasonic sensors, laser, radio frequency identification (RFID), and other suitable sensors. In addition, each of the sonar sensors 682*a*, 682*b*, 682*c*, 682*d*, 682*e*, 682*f*, 682*g* serves as a feedback mechanism to determine whether the robotic hand 72 continues to exert additional pressure to grab the object at such point where there is sufficient pressure to grab and lift the object. In addition, the sonar sensor 682*f* in the palm of the robotic hand 72 provides tactile sensing function to handle a kitchen tool. For example, when the robotic hand 72 grabs a knife to cut beef, the amount of pressure that the robotic hand 72 exerts on the knife and applies to the beef, allows the tactile sensor to detect when the knife finishes slicing the beef, i.e., when the knife has no resistance. The distributed pressure is not only to secure the object, but also so as not to exert too much pressure so as to, for example, not to break an egg). Furthermore, each finger on the robotic hand 72 has a sensor on the finger tip, as shown by the first sensor 682_a_ on the finger tip of the thumb, the second sensor 682_b_ on the finger tip of the index finger, the third sensor 682_c_ on the finger tip of the middle finger, the fourth sensor 682_d_ on the finger tip of the ring finger, and the fifth sensor 682_f_ on the finger tip of the pinky. Each of the sensors 682_a_, 682_b_, 682_c_, 682_d_, 682_e_ provide sensing capability on the distance and shape of the object, sensing capability for temperature or moisture, as well as tactile feedback capability.

The RGB-D sensor 684 and the sonar sensor 682_f_ in the palm, plus the sonar sensors 682_a_, 682_b_, 682_c_, 682_d_, 682_e_ in the fingertip of each finger, provide a feedback mechanism to the robotic hand 72 as a means to grab a non-standardized object, or a non-standardized kitchen tool. The robotic hands 72 may adjust the pressure to a sufficient degree to grab ahold of the non-standardized object. A program library 690 that stores sample grabbing functions 692, 694, 696 according to a specific time interval for which the robotic hand 72 can draw from in performing a specific grabbing function, is illustrated in FIG. 15B. FIG. 15B is a block diagram illustrating a library database 690 of standardized operating movements in the standardized robotic kitchen module 50. Standardized operating movements, which are predefined and stored in the library database 690, include grabbing, placing, and operating a kitchen tool or a piece of kitchen equipment, with motion/interaction time profiles 698.

FIG. 16A is a graphical diagram illustrating that each of the robotic hands 72 is coated with a artificial human-like soft-skin glove 700. The artificial human-like soft-skin glove 700 includes a plurality of embedded sensors that are transparent and sufficient for the robot hands 72 to perform high-level minimanipulations. In one embodiment, the soft-skin glove 700 includes ten or more sensors to replicate a chef's hand movements.

FIG. 16B is a block diagram illustrating robotic hands coated with artificial human-like skin gloves to execute high-level minimanipulations based on a library database 720 of minimanipulations, which have been predefined and stored in the library database 720. High-level minimanipulations refer to a sequence of action primitives requiring a substantial amount of interaction movements and interaction forces and control over the same. Three examples of minimanipulations are provided, which are stored in the database library 720. The first example of minimanipulation is to use the pair of robotic hands 72 to knead the dough 722. The second example of minimanipulation is to use the pair of robotic hands 72 to make ravioli 724. The third example of minimanipulation is to use the pair of robotic hands 72 to make sushi 726. Each of the three examples of minimanipulations has motion/interaction time profiles 728 that are tracked by the computer 16.

FIG. 16C is a simplified flow diagram illustrating one embodiment on taxonomy of manipulation actions for food preparation in kneading dough 740. Kneading dough 740 may be a minimanipulation that has been previously predefined in the library database of minimanipulations. The process of kneading dough 740 comprises a sequence of actions (or short minimanipulations), including grasping the dough 742, placing the dough on a surface 744, and repeating the kneading action until one obtains a desired shape 746.

FIG. 17 is a block diagram illustrating an example of a database library structure 770 of a minimanipulation that results in "cracking an egg with a knife." The minimanipulation 770 of cracking an egg includes how to hold an egg in the right position 772, how to hold a knife relative to the egg 774, what is the best angle to strike the egg with the knife 776, and how to open the cracked egg 778. Various possible parameters for each 772, 774, 776, and 778, are tested to find the best way to execute a specific movement. For example in holding an egg 772, the different positions, orientations, and ways to hold an egg are tested to find an optimal way to hold the egg. Second, the robotic hand 72 picks up the knife from a predetermined location. The holding the knife 774 is explored as to the different positions, orientations, and the way to hold the knife in order to find an optimal way to handle the knife. Third, the striking the egg with knife 776 is also tested for the various combinations of striking the knife on the egg to find the best way to strike the egg with the knife. Consequently, the optimal way to execute the minimanipulation of cracking an egg with a knife 770 is stored in the library database of minimanipulations. The saved minimanipulation of cracking an egg with a knife 770 would comprise the best way to hold the egg 772, the best way to hold the knife 774, and the best way to strike the knife with the egg 776.

To create the minimanipulation that results in cracking an egg with a knife, multiple parameter combinations must be tested to identify a set of parameters that ensure the desired functional result—that the egg is cracked—is achieved. In this example, parameters are identified to determine how to grasp and hold an egg in such a way so as not to crush it. An appropriate knife is selected through testing, and suitable placements are found for the fingers and palm so that it may be held for striking. A striking motion is identified that will successfully crack an egg. An opening motion and/or force are identified that allows a cracked egg to be opened successfully.

The teaching/learning process for the robotic apparatus 75 involves multiple and repetitive tests to identify the necessary parameters to achieve the desired final functional result.

These tests may be performed over varying scenarios. For example, the size of the egg can vary. The location at which it is to be cracked can vary. The knife may be at different locations. The minimanipulations must be successful in all of these variable circumstances.

Once the learning process has been completed, results are stored as a collection of action primitives that together are known to accomplish the desired functional result.

FIG. 18 is a block diagram illustrating an example of recipe execution 780 for a mini manipulation with real-time adjustment by three-dimensional modeling of non-standard objects 112. In recipe execution 780, the robotic hands 72 execute the minimanipulations 770 of cracking an egg with a knife, where the optimal way to execute each movement in the cracking an egg operation 772, the holding a knife operation 774, the striking the egg with a knife operation 776, and opening the cracked egg operation 778 is selected from the minimanipulations library database. The process of executing the optimal way to carry out each of the movements 772, 774, 776, 778 ensures that the minimanipulation 770 will achieve the same (or guarantee of), or substantially the same, outcome for that specific minimanipulation. The multimodal three-dimensional sensor 20 provides real-time adjustment capabilities 112 as to the possible variations in one or more ingredients, such as the dimension and weight of an egg.

As an example of the operative relationship between the creation of a minimanipulation in FIG. 19 and the execution of the minimanipulation in FIG. 20, specific variables associated with the minimanipulation of "cracking an egg with a knife," includes an initial xyz coordinates of egg, an initial orientation of the egg, the size of the egg, the shape of the egg, an initial xyz coordinate of the knife, an initial orientation of the knife, the xyz coordinates where to crack the egg, speed, and the time duration of the minimanipulation. The identified variables of the minimanipulation, "crack an egg with a knife," are thus defined during the creation phase, where these identifiable variables may be adjusted by the robotic food preparation engine 56 during the execution phase of the associated minimanipulation.

FIG. 19 is a flow diagram illustrating the software process 782 to capture a chef's food preparation movements in a standardized kitchen module to produce the software recipe files 46 from the chef studio 44. In the chef studio 44, at step 784, the chef 49 designs the different components of a food recipe. At step 786, the robotic cooking engine 56 is configured to receive the name, ID ingredient, and measurement inputs for the recipe design that the chef 49 has selected. At step 788, the chef 49 moves food/ingredients into designated standardized cooking ware/appliances and into their designated positions. For example, the chef 49 may pick two medium shallots and two medium garlic cloves, place eight crimini mushrooms on the chopping counter, and move two 20 cm×30 cm puff pastry units thawed from freezer lock F02 to a refrigerator (fridge). At step 790, the chef 49 wears the capturing gloves 26 or the haptic costume 622, which has sensors that capture the chef's movement data for transmission to the computer 16. At step 792, the chef 49 starts working the recipe that he or she selects from step 122. At step 794, the chef movement recording module 98 is configured to capture and record the chef's precise movements, including measurements of the chef's arms and fingers' force, pressure, and XYZ positions and orientations in real time in the standardized robotic kitchen 50. In addition to capturing the chef's movements, pressure, and positions, the chef movement recording module 98 is configured to record video (of dish, ingredients, process, and interaction images) and sound (human voice, frying hiss, etc.) during the entire food preparation process for a particular recipe. At step 796, the robotic cooking engine 56 is configured to store the captured data from step 794, which includes the chef's movements from the sensors on the capturing gloves 26 and the multimodal three-dimensional sensors 30. At step 798, the recipe abstraction software module 104 is configured to generate a recipe script suitable for machine implementation. At step 799, after the recipe data has been generated and saved, the software recipe file 46 is made available for sale or subscription to users via an app store or marketplace to a user's computer located at home or in a restaurant, as well as integrating the robotic cooking receipt app on a mobile device.

FIG. 20 is a flow diagram 800 illustrating the software process for food preparation by the robotic apparatus 75 in the robotic standardized kitchen with the robotic apparatus 75 based one or more of the software recipe files 22 received from chef studio system 44. At step 802, the user 24 through the computer 15 selects a recipe bought or subscribed to from the chef studio 44. At step 804, the robot food preparation engine 56 in the household robotic kitchen 48 is configured to receive inputs from the input module 50 for the selected recipe to be prepared. At step 806, the robot food preparation engine 56 in the household robotic kitchen 48 is configured to upload the selected recipe into the memory module 102 with software recipe files 46. At step 808, the robot food preparation engine 56 in the household robotic kitchen 48 is configured to calculate the ingredient availability to complete the selected recipe and the approximate cooking time required to finish the dish. At step 810, the robot food preparation engine 56 in the household robotic kitchen 48 is configured to analyze the prerequisites for the selected recipe and decides whether there is any shortage or lack of ingredients, or insufficient time to serve the dish according to the selected recipe and serving schedule. If the prerequisites are not met, at step 812, the robot food preparation engine 56 in the household robotic kitchen 48 sends an alert, indicating that the ingredients should be added to a shopping list, or offers an alternate recipe or serving schedules. However, if the prerequisites are met, the robot food preparation engine 56 is configured to confirm the recipe selection at step 814. At step 816, after the recipe selection has been confirmed, the user 60 through the computer 16 moves the food/ingredients to specific standardized containers and into the required positions. After the ingredients have been placed in the designated containers and the positions as identified, the robot food preparation engine 56 in the household robotic kitchen 48 is configured to check if the start time has been triggered at step 818. At this juncture, the household robot food preparation engine 56 offers a second process check to ensure that all the prerequisites are being met. If the robot food preparation engine 56 in the household robotic kitchen 48 is not ready to start the cooking process, the household robot food preparation engine 56 continues to check the prerequisites at step 820 until the start time has been triggered. If the robot food preparation engine 56 is ready to start the cooking process, at step 822, the quality check for raw food module 96 in the robot food preparation engine 56 is configured to process the prerequisites for the selected recipe and inspects each ingredient item against the description of the recipe (e.g. one center-cut beef tenderloin roast) and condition (e.g. expiration/purchase date, odor, color, texture, etc.). At step 824, the robot food preparation engine 56 sets the time at a "0" stage and uploads the software recipe file 46 to the one or more robotic arms 70 and the robotic hands 72 for replicating the chef's cooking movements to produce a selected dish according to the software recipe file 46. At step 826, the one or more robotic arms 72 and hands 74 process ingredients and execute the cooking method/technique with identical movements as that of the chef's 49 arms, hands and fingers, with the exact pressure, the precise force, and the same XYZ position, at the same time increments as captured and recorded from the chef's movements. During this time, the one or more robotic arms 70 and hands 72 compare the results of cooking against the controlled data (such as temperature, weight, loss, etc.) and the media data (such as color, appearance, smell, portion-size, etc.), as illustrated in step 828. After the data has been compared, the robotic apparatus 75 (including the robotic arms 70 and the robotic hands 72) aligns and adjusts the results at step 830. At step 832, the robot food preparation engine 56 is configured to instruct the robotic apparatus 75 to move the completed dish to the designated serving dishes and placing the same on the counter.

FIG. 21 is a flow diagram illustrating one embodiment of the software process for creating, testing, and validating, and storing the various parameter combinations for a minimanipulation library database 840. The minimanipulation library database 840 involves a one-time success test process 840 (e.g., holding an egg), which is stored in a temporary library, and testing the combination of one-time test results 860 (e.g., the entire movements of cracking an egg) in the minimanipulation database library. At step 842, the computer 16 creates a new minimanipulation (e.g., crack an egg) with a plurality of action primitives (or a plurality of discrete recipe actions). At step 844, the number of objects (e.g., an egg and a knife) associated with the new minimanipulation are identified. The computer 16 identifies a number of discrete actions or movements at step 846. At step 848, the computer selects a full possible range of key parameters (such as the positions of an object, the orientations of the object, pressure, and speed) associated with the particular new minimanipulation. At step 850, for each key parameter, the computer 16 tests and validates each value of the key parameters with all possible combinations with other key parameters (e.g., holding an egg in one position but testing other orientations). At step 852, the computer 16 is configured to determine if the particular set of key parameter combinations produces a reliable result. The validation of the result can be done by the computer 16 or a human. If the determination is negative, the computer 16 proceeds to step 856 to find if there are other key parameter combinations that have yet to be tested. At step 858, the computer 16 increments a key parameter by one in formulating the next parameter combination for further testing and evaluation for the next parameter combination. If the determination at step 852 is positive, the computer 16 then stores the set of successful key parameter combinations in a temporary location library at step 854. The temporary location library stores one or more sets of successful key parameter combinations (that have either the most successful or optimal test or have the least failed results).

At step 862, the computer 16 tests and validates the specific successful parameter combination for X number of times (such as one hundred times). At step 864, the computer 16 computes the number of failed results during the repeated test of the specific successful parameter combination. At step 866, the computer 16 selects the next one-time successful parameter combination from the temporary library, and returns the process back to step 862 for testing the next one-time successful parameter combination X number of times. If no further one-time successful parameter combination remains, the computer 16 stores the test results of one or more sets of parameter combinations that produce a reliable (or guaranteed) result at step 868. If there are more than one reliable sets of parameter combinations, at step 870, the computer 16 determines the best or optimal set of parameter combinations and stores the optimal set of parameter combination which is associated with the specific minimanipulation for use in the minimanipulation library database by the robotic apparatus 75 in the standardized robotic kitchen 50 during the food preparation stages of a recipe.

FIG. 22 is a flow diagram illustrating the process 920 of assigning and utilizing a library of standardized kitchen tools, standardized objects, and standardized equipment in a standardized robotic kitchen. At step 922, the computer 16 assigns each kitchen tool, object, or equipment/utensil with a code (or bar code) that predefines the parameters of the tool, object, or equipment such as its three-dimensional position coordinates and orientation. This process standardizes the various elements in the standardized robotic kitchen 50, including but not limited to: standardized kitchen equipment, standardized kitchen tools, standardized knifes, standardized forks, standardized containers, standardized pans, standardized appliances, standardized working spaces, standardized attachments, and other standardized elements. When executing the process steps in a cooking recipe, at step 924, the robotic cooking engine is configured to direct one or more robotic hands to retrieve a kitchen tool, an object, a piece of equipment, a utensil, or an appliance when prompted to access that particular kitchen tool, object, equipment, utensil or appliance, according to the food preparation process for a specific recipe.

FIG. 23 is a flow diagram illustrating the process 926 of identifying a non-standard object through three-dimensional modeling and reasoning. At step 928, the computer 16 detects a non-standard object by a sensor, such as an ingredient that may have a different size, different dimensions, and/or different weight. At step 930, the computer 16 identifies the non-standard object with three-dimensional modeling sensors 66 to capture shape, dimensions, orientation and position information and robotic hands 72 make a real-time adjustment to perform the appropriate food preparation tasks (e.g. cutting or picking up a piece of steak).

FIG. 24 is a flow diagram illustrating the process 932 for testing and learning of minimanipulations. At step 934, the computer performs a food preparation task composition analysis in which each cooking operation (e.g. cracking an egg with a knife) is analyzed, decomposed, and constructed into a sequence of action primitives or minimanipulations. In one embodiment, a minimanipulation refers to a sequence of one or more action primitives that accomplish a basic functional outcome (e.g., the egg has been cracked, or a vegetable sliced) that advances toward a specific result in preparing a food dish. In this embodiment, a minimanipulation can be further described as a low-level minimanipulation or a high-level minimanipulation where a low-level minimanipulation refers to a sequence of action primitives that requires minimal interaction forces and relies almost exclusively on the use of the robotic apparatus 75, and a high-level minimanipulation refers to a sequence of action primitives requiring a substantial amount of interaction and interaction forces and control thereof. The process loop 936 focuses on minimanipulation and learning steps and comprises tests, which are repeated many times (e.g. 100 times) to ensure the reliability of minimanipulations. At step 938, the robotic food preparation engine 56 is configured to assess the knowledge of all possibilities to perform a food preparation stage or a minimanipulation, where each minimanipulation is tested with respect to orientations, positions/velocities, angles, forces, pressures, and speeds with a particular minimanipulation. A minimanipulation or an action primitive may involve the robotic hand 72 and a standard object, or the robotic hand 72 and a nonstandard object. At step 940, the robotic food preparation engine 56 is configured to execute the minimanipulation and determine if the outcome can be deemed successful or a failure. At step 942, the computer 16 conducts an automated analysis and reasoning about the failure of the minimanipulation. For example, the multimodal sensors may provide sensing feedback data on the success or failure of the minimanipulation. At step 944, the computer 16 is configured to make a real-time adjustment and adjusts the parameters of the minimanipulation execution process. At step 946, the computer 16 adds new information about the success or failure of the parameter adjustment to the minimanipulation library as a learning mechanism to the robotic food preparation engine 56.

FIG. 25 is a flow diagram illustrating the process 950 for quality control and alignment functions for robotic arms. At step 952, the robotic food preparation engine 56 loads a human chef replication software recipe file 46 via the input module 50. For example, the software recipe file 46 to replicate food preparation from Michelin starred chef Arnd Beuchel's "Wiener Schnitzel". At step 954, the robotic apparatus 75 executes tasks with identical movements such as those for the torso, hands, fingers, with identical pressure, force and xyz position, at an identical pace as the recorded recipe data stored based on the actions of the human chef preparing the same recipe in a standardized kitchen module with standardized equipment based on the stored receipt-script including all movement/motion replication data. At step 956, the computer 16 monitors the food preparation process via a multimodal sensor that generates raw data supplied to abstraction software where the robotic apparatus 75 compares real-world output against controlled data based on multimodal sensory data (visual, audio, and any other sensory feedback). At step 958, the computer 16 determines if there any differences between the controlled data and the multimodal sensory data. At step 960, the computer 16 analyzes whether the multimodal sensory data deviates from the controlled data. If there is a deviation, at step 962, the computer 16 makes an adjustment to re-calibrate the robotic arm 70, the robotic hand 72, or other elements. At step 964, the robotic food preparation engine 16 is configured to learn in process 964 by adding the adjustment made to one or more parameter values to the knowledge database. At step 968, the computer 16 stores the updated revision information to the knowledge database pertaining to the corrected process, condition, and parameters. If there is no difference in deviation from step 958, the process 950 goes directly to step 970 in completing the execution.

FIG. 26 is a table illustrating one embodiment of a database library structure 972 of minimanipulation objects for use in the standardized robotic kitchen. The database library structure 972 shows several fields for entering and storing information for a particular minimanipulation, including (1) the name of the minimanipulation, (2) the assigned code of the minimanipulation, (3) the code(s) of standardized equipment and tools associated with the performance of the minimanipulation, (4) the initial position and orientation of the manipulated (standard or non-standard) objects (ingredients and tools), (5) parameters/variables defined by the user (or extracted from the recorded recipe during execution), (6) sequence of robotic hand movements (control signals for all servos) and connecting feedback parameters (from any sensor or video monitoring system) of minimanipulations on the timeline. The parameters for a particular minimanipulation may differ depending on the complexity and objects that are necessary to perform the minimanipulation. In this example, four parameters are identified: the starting XYZ position coordinates in the volume of the standardized kitchen module, the speed, the object size, and the object shape. Both the object size and the object shape may be defined or described by non-standard parameters.

FIG. 27 is a table illustrating a database library structure 974 of standard objects for use in the standardized robotic kitchen 50, which contains three-dimensional models of standard objects. The standard object database library structure 974 shows several fields to store information pertaining to a standard object, including (1) the name of an object, (2) an image of the object, (3) an assigned code for the object, (4) a virtual 3D model with full dimensions of the object in an XYZ coordinate-matrix with the preferred resolution predefined, (5) a virtual vector model of the object (if available), (6) definition and marking of the working elements of the object (the elements, which may be in contact with hands and other objects for manipulation), and (7) an initial standard orientation of the object for each specific manipulation. The sample database structure 974 of an electronic library contains three-dimensional models of all standard objects (i.e., all kitchen equipment, kitchen tools, kitchen appliances, containers), which is part of the overall standardized kitchen module 50. The three-dimensional models of standard objects can be visually captured by a three-dimensional camera and store in the database library structure 974 for subsequent use.

FIG. 28 depicts the robotic recipe-script replication process 988, wherein a multi-modal sensor outfitted head 20, and dual arms with multi-fingered hands 72 holding ingredients and utensils, interact with cookware 990. The robotic sensor head 20 with a multi-modal sensor unit is used to continually model and monitor the three-dimensional task-space being worked by both robotic arms while also providing data to the task-abstraction module to identify tools and utensils, appliances and their contents and variables, so as to allow them to be compared to the cooking-process sequence generated recipe-steps to ensure the execution is proceeding along the computer-stored sequence-data for the recipe. Additional sensors in the robotic sensor head 20 are used in the audible domain to listen and smell during significant parts of the cooking process. The robotic hands 72 and their haptic sensors are used to handle respective ingredients properly, such as an egg in this case; the sensors in the fingers and palm are able to for example detect a usable egg by way of surface texture and weight and its distribution and hold and orient the egg without breaking it. The multi-fingered robotic hands 72 are also capable of fetching and handling particular cookware, such as a bowl in this case, and grab and handle cooking utensils (a whisk in this case), with proper motions and force application so as to properly process food ingredients (e.g. cracking an egg, separating the yolks and beating the egg-white until a stiff composition is achieved) as specified in the recipe-script.

FIG. 29 depicts the ingredient storage system notion 1000, wherein food storage containers 1002, capable of storing any of the needed cooking ingredients (e.g. meats, fish, poultry, shellfish, vegetables, etc.), are outfitted with sensors to measure and monitor the freshness of the respective ingredient. The monitoring sensors embedded in the food storage containers 1002 include, but are not limited to, ammonia sensors 1004, volatile organic compound sensors 1006, internal container temperature sensors 1008 and humidity sensors 1010. Additionally a manual probe (or detection device) 1012 with one or more sensors can be used, whether employed by the human chef or the robotic arms and hands, to allow for key measurements (such as temperature) within a volume of a larger ingredient (e.g. internal meat temperature).

FIG. 30 depicts the measurement and analysis process 1040 carried out as part of the freshness and quality check for ingredients placed in food storage containers 1042 containing sensors and detection devices (e.g. a temperature probe/needle) for conducing online analysis for food freshness on cloud computing or a computer over the Internet or a computer network. A container is able to forward its data set by way of a metadata tag 1044, specifying its container-ID, and including the temperature data 1046, humidity data 1048, ammonia level data 1050, volatile organic compound data 1052 over a wireless data-network through a communication step 1056, to a main server where a food control quality engine processes the container data. The processing step 1060 uses the container-specific data 1044 and compares it to data-values and -ranges considered acceptable, which are stored and retrieved from media 1058 by a data retrieval and storage process 1054. A set of algorithms then make the decision as to the suitability of the ingredient, providing a real-time food quality analysis result over the data-network via a separate communication process 1062. The quality analysis results are then utilized in another process 1064, where the results are forwarded to the robotic arms for further action and may also be displayed remotely on a screen (such as a smartphone or other display) for a user to decide if the ingredient is to be used in the cooking process for later consumption or disposed of as spoiled.

FIG. 31 depicts the functionalities and process-steps of pre-filled ingredient containers 1070 with one or more program dispenser controls for use in the standardized robotic kitchen 50, whether it be the standardized robotic kitchen or the chef studio. Ingredient containers 1070 are designed in different sizes 1082 and varied usages are suitable for proper storage environments 1080 to accommodate perishable items by way of refrigeration, freezing, chilling, etc. to achieve specific storage temperature ranges. Additionally, the pre-filled ingredient storage containers 1070 are also designed to suit different types of ingredients 1072, with containers already pre-labeled and pre-filled with solid (salt, flour, rice, etc.), viscous/pasty (mustard, mayonnaise, marzipan, jams, etc.) or liquid (water, oil, milk, juice, etc.) ingredients, where dispensing processes 1074 utilize a variety of different application devices (dropper, chute, peristaltic dosing pump, etc.) depending on the ingredient type, with exact computer-controllable dispensing by way of a dosage control engine 1084 running a dosage control process 1076 ensuring that the proper amount of ingredient is dispensed at the right time. It should be noted that the recipe-specified dosage is adjustable to suit personal tastes or diets (low sodium, etc.), by way of a menu-interface or even through a remote phone application. The dosage determination process 1078 is carried out by the dosage control engine 1084, based on the amount specified in the recipe, with dispensing occurring either through manual release command or remote computer control based on the detection of a particular dispensing container at the exit point of the dispenser.

FIG. 32 is a block diagram illustrating a recipe structure and process 1090 for food preparation in the standardized robotic kitchen 50. The food preparation process 1090 is shown as divided into multiple stages along the cooking timeline, with each stage having or more raw data blocks for each stage 1092, stage 1094, stage 1096 and stage 1098. The data blocks can contain such elements as video-imagery, audio-recordings, textual descriptions, as well as the machine-readable and -understandable set of instructions and commands that form a part of the control program. The raw data set is contained within the recipe structure and representative of each cooking stage along a timeline divided into many time-sequenced stages, with varying levels of time-intervals and -sequences, all the way from the start of the recipe replication process to the end of the cooking process, or any sub-process therein.

The standardized robotic kitchen 50 in FIG. 33 depicts a possible configuration for the use of an augmented sensor system 1152, which represents one embodiment of the multimodal three-dimensional sensors 20. The augmented sensor system 1152 shows a single augmented sensor system 1854 placed on a movable computer-controllable linear rail travelling the length of the kitchen axis with the intent to cover the complete visible three-dimensional workspace of the standardized kitchen effectively. The standardized robotic kitchen 50 shows a single augmented sensor system 20 placed on a movable computer-controllable linear rail travelling the length of the kitchen axis with the intent to cover the complete visible three-dimensional workspace of the standardized kitchen effectively.

Based on the proper placement of the augmented sensor system 1152 placed somewhere in the robotic kitchen, such as on a computer-controllable railing, or on the torso of a robot with arms and hands, allows for 3D-tracking and raw data generation, both during chef-monitoring for machine-specific recipe-script generation, and monitoring the progress and successful completion of the robotically-executed steps in the stages of the dish replication in the standardized robotic kitchen 50.

FIG. 34 is a block diagram illustrating the standardized kitchen module 50 with multiple camera sensors and/or lasers 20 for real-time three-dimensional modeling 1160 of the food preparation environment. The robotic kitchen cooking system 48 includes a three-dimensional electronic sensor that is capable of providing real-time raw data for a computer to create a three-dimensional model of the kitchen operating environment. One possible implementation of the real-time three-dimensional modeling process involves the use of three-dimensional laser scanning. An alternative implementation of the real-time three-dimensional modeling is to use one or more video cameras. Yet a third method involves the use of a projected light-pattern observed by a camera, so-called structured-light imaging. The three-dimensional electronic sensor scans the kitchen operating environment in real-time to provide a visual representation (shape and dimensional data) 1162 of the working space in the kitchen module. For example, the three-dimensional electronic sensor captures in real-time the three-dimensional images of whether the robotic arm/hand has picked up meat or fish. The three-dimensional model of the kitchen also serves as sort of a 'human-eye' for making adjustments to grab an object, as some objects may have nonstandard dimensions. The compute processing system 16 generates a computer model of the three-dimensional geometry, robotic kinematics, objects in the workspace and provides controls signals 1164 back to the standardized robotic kitchen 50. For instance, three-dimensional modeling of the kitchen can provide a three-dimensional resolution grid with a desirable spacing, such as with 1 centimeter spacing between the grid points.

The standardized robotic kitchen 50 depicts another possible configuration for the use of one or more augmented sensor systems 20. The standardized robotic kitchen 50 shows a multitude of augmented sensor systems 20 placed in the corners above the kitchen work-surface along the length of the kitchen axis with the intent to effectively cover the complete visible three-dimensional workspace of the standardized robotic kitchen 50.

The proper placement of the augmented sensor system 20 in the standardized robotic kitchen 50, allows for three-dimensional sensing, using video-cameras, lasers, sonars and other two- and three-dimensional sensor systems to enable the collection of raw data to assist in the creation of processed data for real-time dynamic models of shape, location, orientation and activity for robotic arms, hands, tools, equipment and appliances, as they relate to the different steps in the multiple sequential stages of dish replication in the standardized robotic kitchen 50.

Raw data is collected at each point in time to allow the raw data to be processed to be able to extract the shape, dimension, location and orientation of all objects of importance to the different steps in the multiple sequential stages of dish replication in the standardized robotic kitchen 50 in a step 1162. The processed data is further analyzed by the computer system to allow the controller of the standardized robotic kitchen to adjust robotic arm and hand trajectories and minimanipulations, by modifying the control signals defined by the robotic script. Adaptations to the recipe-script execution and thus control signals is essential in successfully completing each stage of the replication for a particular dish, given the potential for variability for many variables (ingredients, temperature, etc.). The process of recipe-script execution based on key measurable variables is an essential part of the use of the augmented (also termed multi-modal) sensor system 20 during the execution of the replicating steps for a particular dish in a standardized robotic kitchen 50.

Figure 35A:
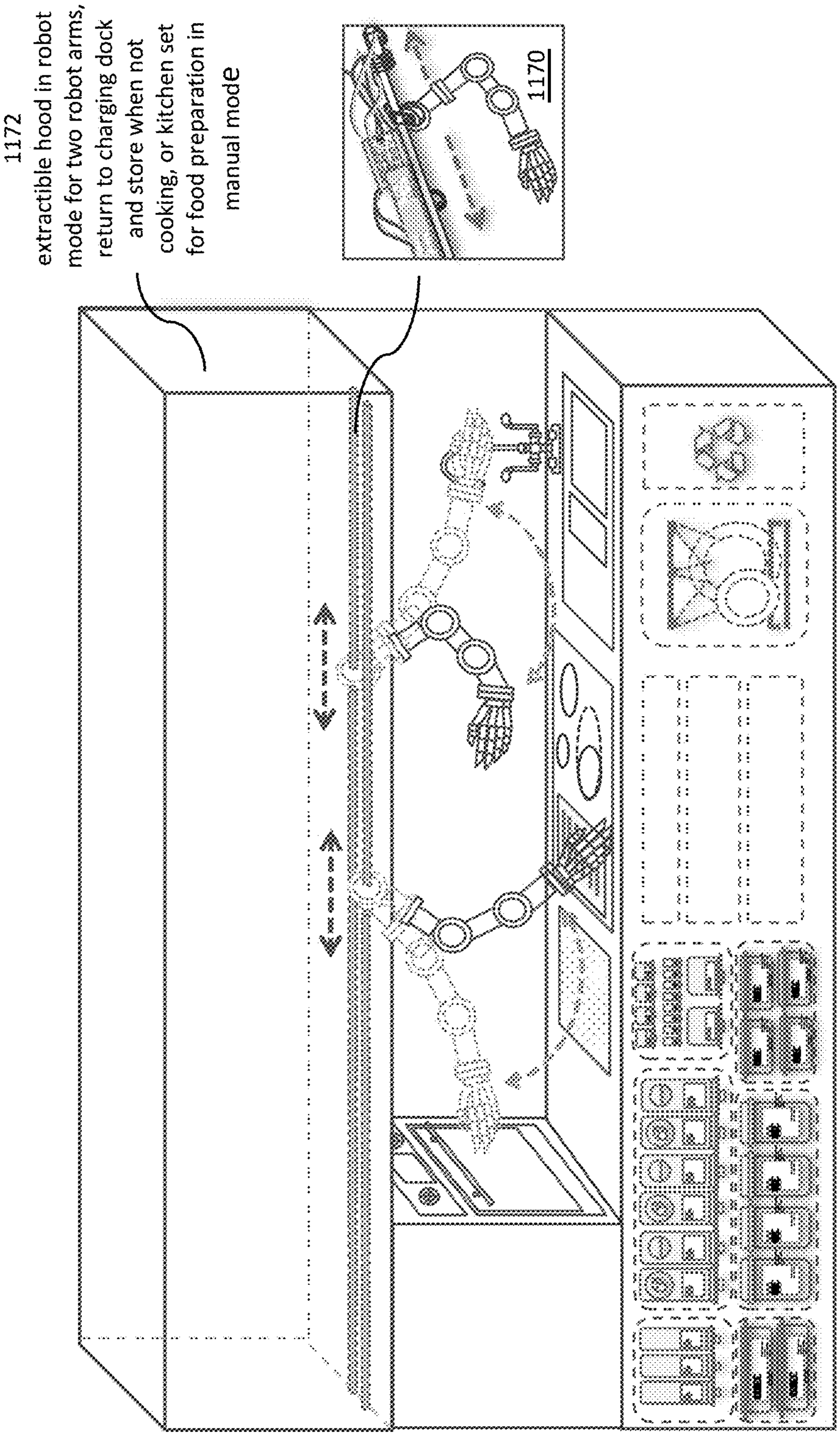

FIG. 35A is a diagram illustrating a robotic kitchen prototype. The prototype kitchen comprises three levels, the top level includes a rail system 1170 with a pair of arms to move along for food preparation during a robot mode. An extractible hood 1172 is assessable for two robot arms to return to a charging dock to allow them to be stored when not used for cooking, or for when the kitchen is set to manual cooking mode in a manual mode. The mid level includes sinks, stove, griller, oven, and a working counter top with access to ingredients storage. The middle level has also a computer monitor to operate the equipment, choose the recipe, watching the video and text instructions, and listening to the audio instruction. The lower level includes an automatic container system to store food/ingredients at their best conditions, with the possibility to automatically deliver ingredients to the cooking volume as required by the recipe. The kitchen prototype also includes an oven, dishwasher, cooking tools, accessories, cookware organizer, drawers and recycle bin.

Figure 35B:
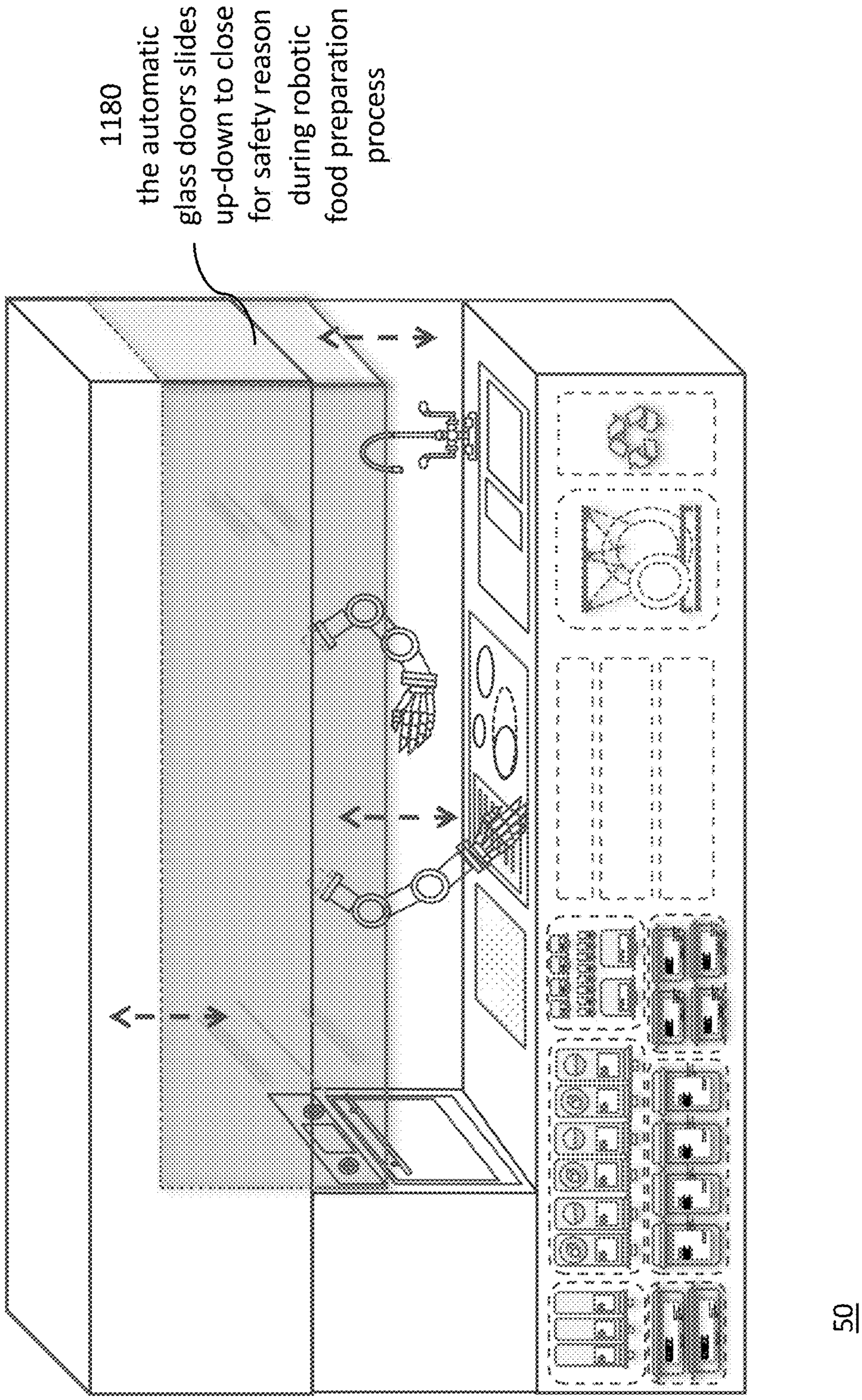

FIG. 35B is a diagram illustrating a robotic kitchen prototype with a transparent material enclosure 1180 that serves as a protection mechanism while the robotic cooking process is occurring to prevent causing potential injuries to surrounding humans. The transparent material enclosure can be made from a variety of transparent materials, such as glass, fiberglass, plastics, or any other suitable material for use in the robotic kitchen 50 to provide as a protective screen to shield from the operation of robotic arms and hand from external sources outside the robotic kitchen 50, such as people. In one example, the transparent material enclosure comprises an automatic glass door (or doors). As shown in this embodiment, the automatic glass doors are positioned to slide up-down or down-up (from bottom section) to close for safety reasons during the cooking process involving the use of robotic arms. A variation in the design of the transparent material enclosure is possible, such as vertically sliding down, vertically sliding up, horizontally from left to right, horizontally from right to left, or any other methods that place allow for the transparent material enclosure in the kitchen to serve as a protection mechanism.

Figure 35C:
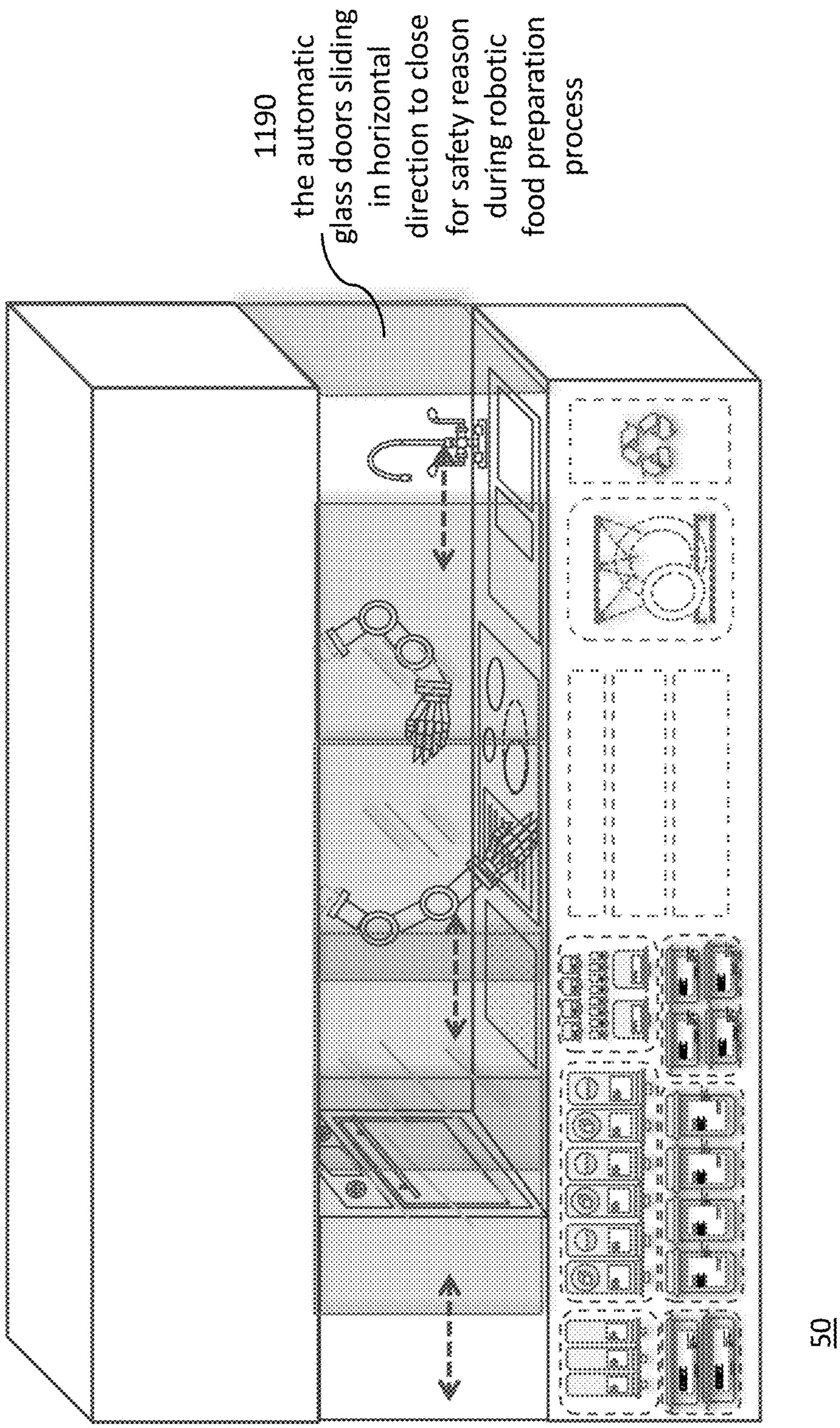

FIG. 35C depicts an embodiment of the standardized robotic kitchen, where the volume prescribed by the countertop surface and the underside of the hood, has horizontally sliding glass doors 1190, that can be manually, or under computer control, moved left or right to separate the workspace of the robotic arms/hands from its surroundings for such purposes as safeguarding any human standing near the kitchen, or limit contamination into/out-of the kitchen work-area, or even allow for better climate control within the enclosed volume. The automatic sliding glass doors slide left-right to close for safety reasons during the cooking processes involving the use of the robotic arms.

Figure 35D:
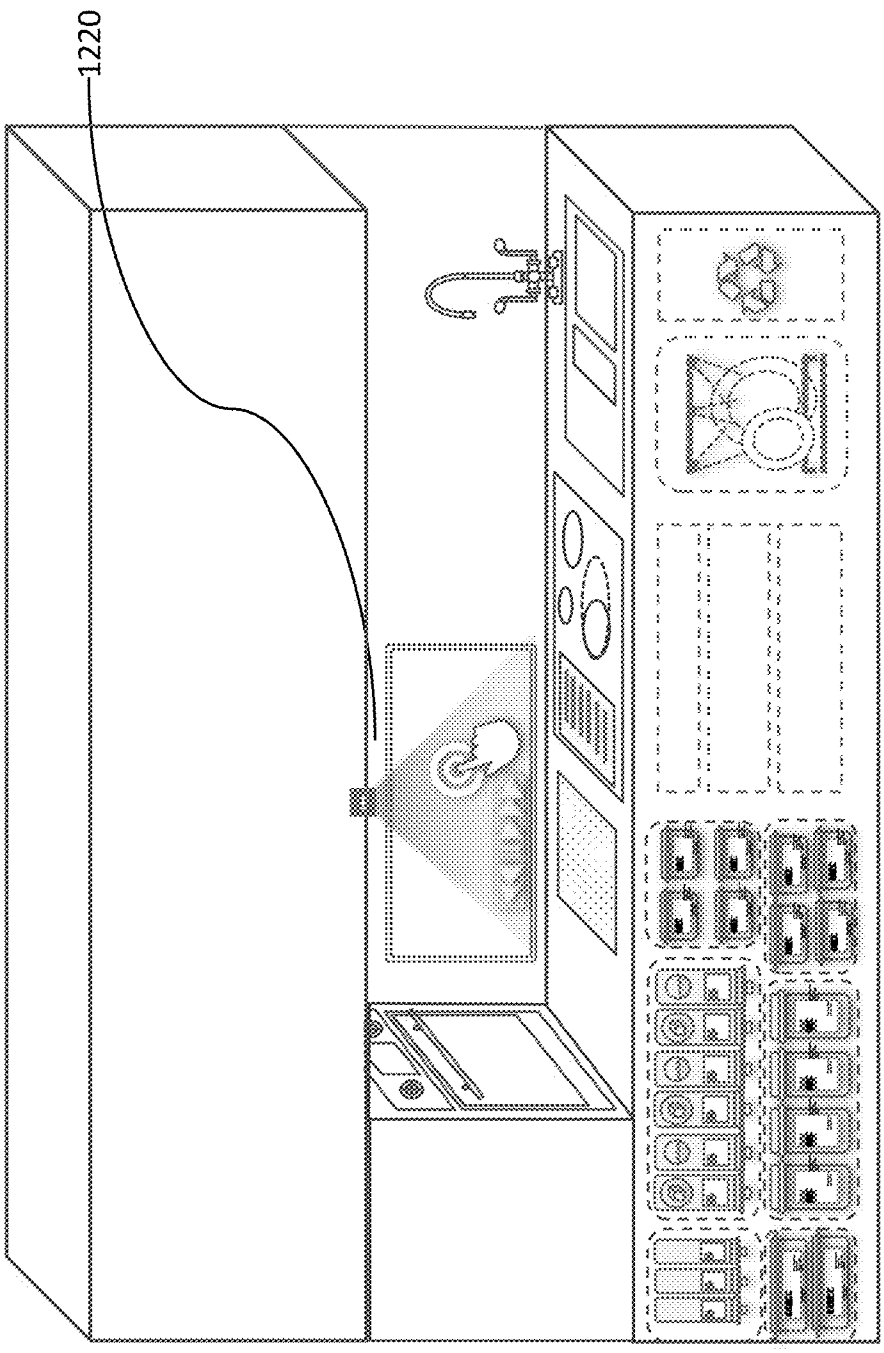

In FIG. 35D an embodiment of the standardized robotic kitchen includes a backsplash area 1220, wherein is mounted a virtual monitor/display with a touchscreen area to allow a human operating the kitchen in manual mode to interact with the robotic kitchen and its elements. A computer-projected image and a separate camera monitoring the projected area can tell where the human hand and its finger are located when making a specific choice based on a location in the projected image, upon which the system then acts accordingly. The virtual touchscreen allows for access to all control and monitoring functions for all aspects of the equipment within the standardized robotic kitchen 50, retrieval and storage of recipes, reviewing stored videos of complete or partial recipe execution steps by a human chef, as well as listening to audible playback of the human chef voicing descriptions and instructions related to a particular step or operation in a particular recipe.

Figure 35E:
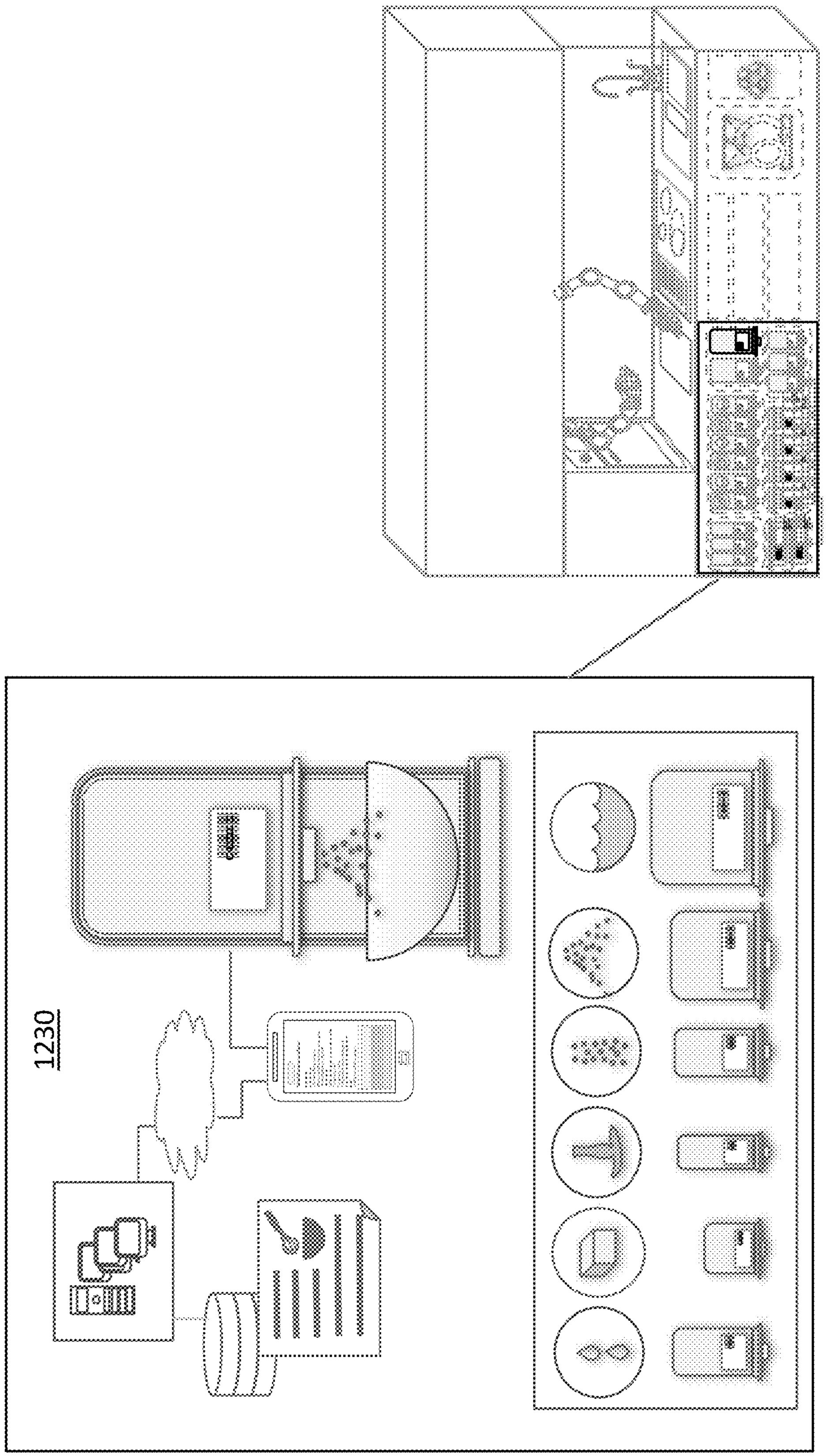

FIG. 35E depicts a single or a series of robotic hard automation device(s) 1230, which are built into the standardized robotic kitchen. The device or devices are programmable and controllable remotely by a computer and are designed to feed or provide pre-packaged or pre-measured amounts of dedicated ingredient elements needed in the recipe replication process, such as spices (salt, pepper, etc.), liquids (water, oil, etc.) or other dry ingredients (flour, sugar, baking powder, etc.). These robotic automation devices 1230 are located to make them readily accessible to the robotic arms/hands to allow them to be used by the robotic arms/hands or those of a human chef, to set and/or trigger the release of a determined amount of an ingredient of choice based on the needs specified in the recipe-script.

Figure 35F:
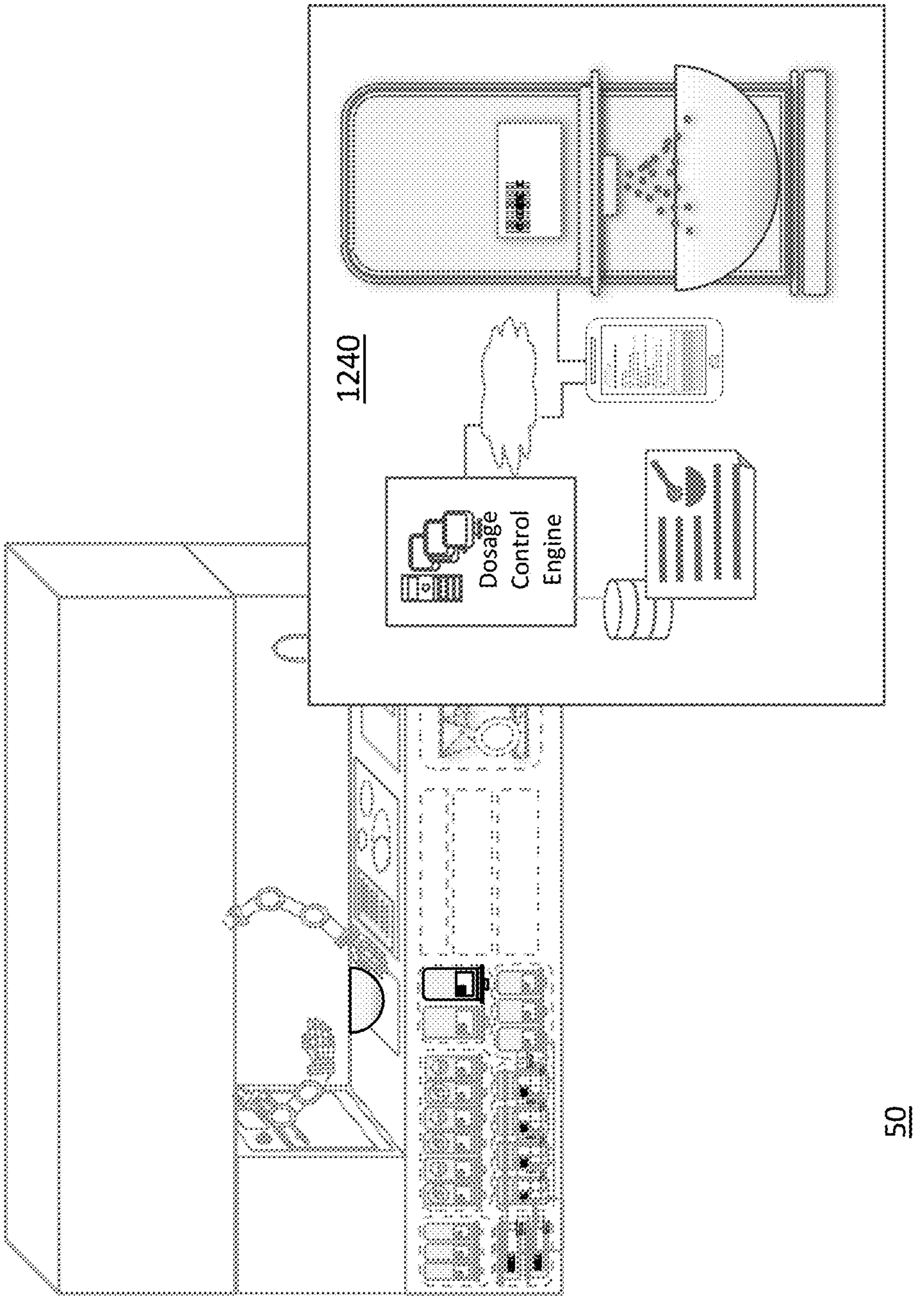

FIG. 35F depicts a single or a series of robotic hard automation device(s) 1240, which are built into the standardized robotic kitchen. The device or devices are programmable and controllable remotely by a computer and are designed to feed or provide pre-packaged or pre-measured amounts of common and repetitively used ingredient elements needed in the recipe replication process, where a dosage control engine/system, is capable of providing just the proper amount to a specific piece of equipment, such as a bowl, pot or pan. These robotic automation devices 1240 are located so as to make them readily accessible to the robotic arms/hands to allow them to be used by the robotic arms/hands or those of a human cook, to set and/or trigger the release of a dosage-engine controlled amount of an ingredient of choice based on the needs specified in the recipe-script. This embodiment of an ingredient supply and dispensing system can be thought of as more cost- and space-efficient approach while also reducing container-handling complexity as well as wasted motion-time by the robot arms/hands.

Figure 35G:
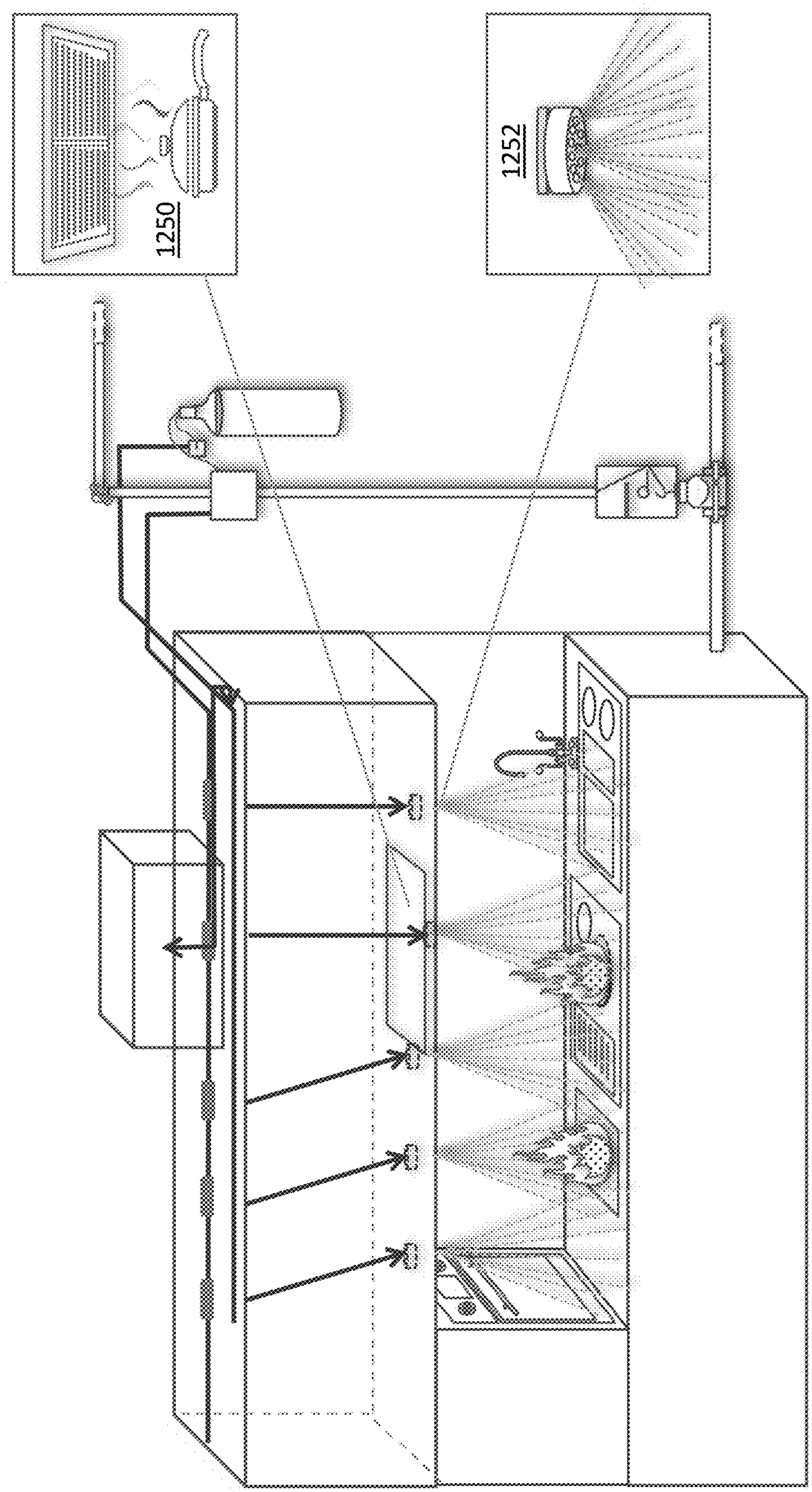

FIG. 35G depicts the standardized robotic kitchen outfitted with both a ventilation system 1250 to extract fumes and steam during the automated cooking process, as well as an automatic smoke/flame detection and suppression system 1252 to extinguish any source of noxious smoke and dangerous fire also allowing the safety glass of the sliding doors to enclose the standardized robotic kitchen 50 to contain the affected space.

Figure 35H:
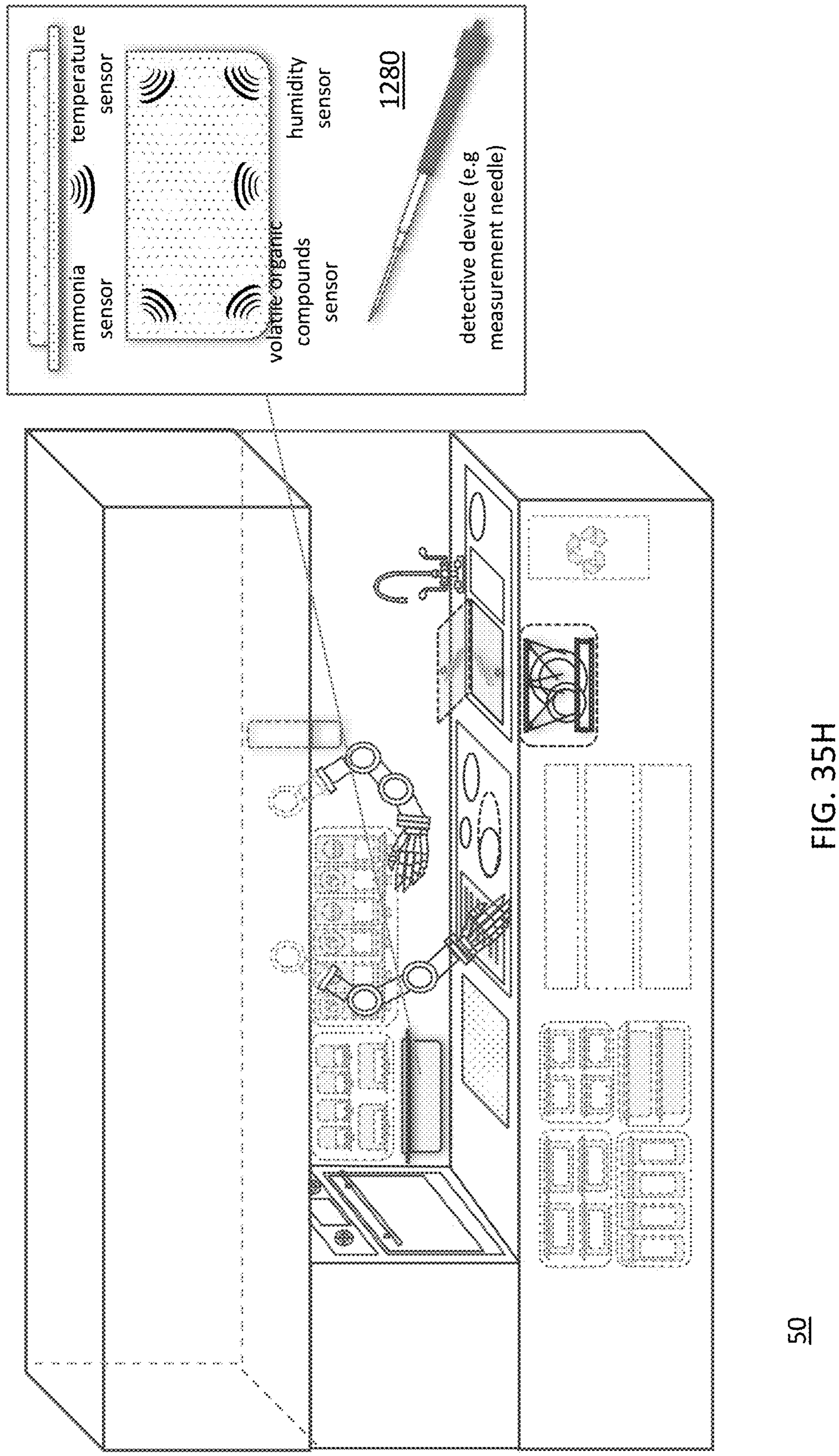

FIG. 35H depicts the standardized kitchen with an instrumented ingredient quality-check system 1280 comprised of an instrumented panel with sensors and a food-probe. The area includes sensors on the backsplash capable of detecting multiple physical and chemical characteristics of ingredients placed within the area, including but not limited to spoilage (ammonia sensor), temperature (thermocouple), volatile organic compounds (emitted upon biomass decomposition), as well as moisture/humidity (hygrometer) content. A food probe using a temperature-sensor (thermocouple) detection device can also be present to be wielded by the robotic arms/hands to probe the internal properties of a particular cooking ingredient or element (such as internal temperature of red meat, poultry, etc.).

FIG. 36A depicts one embodiment of a standardized robotic kitchen 50 in plan view 1290, whereby it should be understood that the elements therein could be arranged in a different layout. The standardized robotic kitchen 50 is divided in to three levels, namely the top level 1292-1, the counter level 1292-2 and the lower level 1292-3.

The top level 1292-1 contains multiple cabinet-type modules with different units to perform specific kitchen functions by way of built-in appliances and equipment. At the simplest level a shelf/cabinet storage area 1294 is included, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, another storage pantry zone 1304 for other ingredients and rarely used spices, and a hard automation ingredient supplier 1305, and others.

The counter level 1292-2 not only houses the robotic arms 70, but also includes a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher.

The lower level 1292-3 houses the combination convection oven and microwave 1316, the dish-washer 1318 and a larger cabinet volume 1320 that holds and stores additional frequently used cooking and baking ware, as well as tableware and packing materials and cutlery.

FIG. 36B depicts a perspective view 50 of the standardized robotic kitchen, depicting the locations of the top level 1292-1, counter level 1292-2 and the lower level 1294-3, within an xyz coordinate frame with axes for x 1322, y 1324 and z 1326 to allow for proper geometric referencing for positioning of the robotic arms 34 within the standardized robotic kitchen.

The perspective view of the robotic kitchen 50 clearly identifies one of the many possible layouts and locations for equipment at all three levels, including the top level 1292-1 (storage pantry 1304, standardized cooking tools and ware 1320, storage ripening zone 1298, chilled storage zone 1300, and frozen storage zone 1302, the counter level 1292-2 (robotic arms 70, sink 1308, chopping/cutting area 1310, charcoal grill 1312, cooking appliances 1314 and serving counter 1306) and the lower level (dish-washer 1318 and oven and microwave 1316).

FIG. 37 depicts a perspective layout view of a telescopic life 1350 in the standardized robotic kitchen 50 in which a pair of robotic arms, wrists and multi-fingered hands move as a unit on a prismatically (through linear staged extension) and telescopically actuated torso along the vertical y-axis 1351 and the horizontal x-axis 1352, as well as rotationally about the vertical y-axis running through the centerline of its own torso. One or more actuators 1353 are embedded in the torso and upper level to allow the linear and rotary motions to allow the robotic arms 72 and the robotic hands 70 to be moved to different places in the standardized robotic kitchen during all parts of the replication of the recipe spelled out in the recipe script. These multiple motions are necessary to be able to properly replicate the motions of a human chef 49 as observed in the chef studio kitchen setup during the creation of the dish when cooked by the human chef. A panning (rotational) actuator 1354 on the telescopic actuator 1350 at the base of the left/right translational stage allows at least the partial rotation of the robot arms 70, akin to a chef turning its shoulders or torso for dexterity or orientation reasons—otherwise one would be limited to cooking in a single plane.

FIG. 38 is a block diagram illustrating a programmable storage system 88 for use with the standardized robotic kitchen 50. The programmable storage system 88 is structured in the standardized robotic kitchen 50 based on the relative xy position coordinates within the programmable storage system 88. In this example, the programmable storage system 88 has twenty seven (27; arranged in a 9×3 matrix) storage locations that have nine columns and three rows. The programmable storage system 88 can serve as the freezer location or the refrigeration location. In this embodiment, each of the twenty-seven programmable storage locations includes four types of sensors: a pressure sensor 1370, a humidity sensor 1372, a temperature sensor 1374, and a smell (olfactory) sensor 1376. With each storage location recognizable by its xy coordinates, the robotic apparatus 75 is able to access a selected programmable storage location to obtain the necessary food item(s) in the location to prepare a dish. The computer 16 can also monitor each programmable storage location for the proper temperature, proper humidity, proper pressure, and proper smell profiles to ensure optimal storage conditions for particular food items or ingredients are monitored and maintained.

FIG. 39 depicts an elevation view of the container storage station 86, where temperature, humidity and relative oxygen content (and other room conditions) can be monitored and controlled by a computer. Included in this storage container unit can be, but it is not limited to, a pantry/dry storage area 1304, a ripening area 1298 with separately controllable temperature and humidity (for fruit/vegetables), of importance to wine, a chiller unit 1300 for lower temperature storage for produce/fruit/meats so as to optimize shelf life, and a freezer unit 1302 for long-term storage of other items (meats, baked goods, seafood, ice cream, etc.).

FIG. 40 depicts an elevation view of ingredient containers 1380 to be accessed by a human chef and the robotic arms and multi-fingered hands. This section of the standardized robotic kitchen includes, but is not necessarily limited to, multiple units including an ingredient quality monitoring dashboard (display) 1382, a computerized measurement unit 1384, which includes a barcode scanner, camera and scale, a separate countertop 1386 with automated rack-shelving for ingredient check-in and check-out, and a recycling unit 1388 for disposal of recyclable hard (glass, aluminum, metals, etc.) and soft goods (food rests and scraps, etc.) suitable for recycling.

FIG. 41 depicts the ingredient quality-monitoring dashboard 1390, which is a computer-controlled display for use by the human chef. The display allows the user to view multiple items of importance to the ingredient-supply and ingredient-quality aspect of human and robotic cooking. These include the display of the ingredient inventory overview 1392 outlining what is available, the individual ingredient selected and its nutritional content and relative distribution 1394, the amount and dedicated storage as a function of storage category 1396 (meats, vegetables, etc.), a schedule 1398 depicting pending expiry dates and fulfillment/replenishment dates and items, an area for any kinds of alerts 1400 (sensed spoilage, abnormal temperatures or malfunctions, etc.), and the option of voice-interpreter command input 1402, to allow the human user to interact with the computerized inventory system by way of the dashboard 1390.

FIG. 42 is a flow diagram illustrating one embodiment of the process 1420 of one embodiment of recording a chef's food preparation process. At step 1422 in the chef studio 44, the multimodal three-dimensional sensors 20 scan the kitchen module volume to define xyz coordinates position and orientation of the standardized kitchen equipment and all objects therein, whether static or dynamic. At step 1424, the multimodal three-dimensional sensors 20 scan the kitchen module's volume to find xyz coordinates position of non-standardized objects, such as ingredients. At step 1426, the computer 16 creates three-dimensional models for all non-standardized objects and stores their type and attributes (size, dimensions, usage, etc.) in the computer's system memory, either on a computing device or on a cloud computing environment, and defines the shape, size and type of the non-standardized objects. At step 1428, the chef movements recording module 98 is configured to sense and capture the chef's arm, wrist and hand movements via the chef's gloves in successive time intervals (chef's hand movements preferably identified and classified according to standard minimanipulations). At step 1430, the computer 16 stores the sensed and captured data of the chef's movements in preparing a food dish into a computer's memory storage device(s).

FIG. 43 is a flow diagram illustrating one embodiment of the process 1440 of one embodiment of a robotic apparatus 75 preparing a food dish. At step 1442, the multimodal three-dimensional sensors 20 in the robotic kitchen 48 scan the kitchen module's volume to find xyz position coordinates of non-standardized objects (ingredients, etc.). At step 1444, the multimodal three-dimensional sensors 20 in the robotic kitchen 48 create three-dimensional models for non-standardized objects detected in the standardized robotic kitchen 50 and store the shape, size and type of non-standardized objects in the computer's memory. At step 1446, the robotic cooking module 110 starts a recipe's execution according to a converted recipe file by replicating the chef's food preparation process with the same pace, with the same movements, and with similar time duration. At step 1448, the robotic apparatus 75 executes the robotic instructions of the converted recipe file with a combination of one or more minimanipulations and action primitives, thereby resulting in the robotic apparatus 75 in the robotic standardized kitchen preparing the food dish with the same result or substantially the same result as if the chef 49 had prepared the food dish himself or herself.

FIG. 44 is a flow diagram illustrating the process of one embodiment in the quality and function adjustment 1450 in obtaining the same or substantially the same result in a food dish preparation by a robotic relative to a chef. At step 1452, the quality check module 56 is configured to conduct a quality check by monitoring and validating the recipe replication process by the robotic apparatus 75 via one or more multimodal sensors, sensors on the robotic apparatus 75, and using abstraction software to compare the output data from the robotic apparatus 75 against the controlled data from the software recipe file created by monitoring and abstracting the cooking processes carried out by the human chef in the chef studio version of the standardized robotic kitchen while executing the same recipe. In step 1454, the robotic food preparation engine 56 is configured to detect and determine any difference(s) that would require the robotic apparatus 75 to adjust the food preparation process, such as at least monitoring for the difference in the size, shape, or orientation of an ingredient. If there is a difference, the robotic food preparation engine 56 is configured to modify the food preparation process by adjusting one or more parameters for that particular food dish processing step based on the raw and processed sensory input data. A determination for acting on a potential difference between the sensed and abstraction process progress compared to the stored process variables in the recipe script is made in step 1454. If the process results of the cooking process in the standardized robotic kitchen are identical to those spelled out in the recipe script for the process step, the food preparation process continues as described in the recipe script. Should a modification or adaptation to the process be required based on raw and processed sensory input data, the adaptation process 1556 is carried out by adjusting any parameters needed to ensure the process variables are brought into compliance with those prescribed in the recipe script for that process step. Upon successful conclusion of the adaptation process 1456, the food preparation process 1458 resumes as specified in the recipe script sequence.

FIG. 45 depicts a flow diagram illustrating a first embodiment in the process 1460 of the robotic kitchen preparing a dish by replicating a chef's movements from a recorded software file in a robotic kitchen. In step 1461, a user, through a computer, selects a particular recipe for the robotic apparatus 75 to prepare the food dish. In step 1462, the robotic food preparation engine 56 is configured to retrieve the abstraction recipe for the selected recipe for food preparation. In step 1463, the robotic food preparation engine 56 is configured to upload the selected recipe script into the computer's memory. In step 1464, the robotic food preparation engine 56 calculates the ingredient availability and the required cooking time. In step 1465, the robotic food preparation engine 56 is configured to raise an alert or notification if there is a shortage of ingredients or insufficient time to prepare the dish according to the selected recipe and serving schedule. The robotic food preparation engine 56 sends an alert to place missing or insufficient ingredients on a shopping list or selects an alternate recipe in step 1466. The recipe selection by the user is confirmed in step 1467. In step 1468, the robotic food preparation engine 56 is configured to check whether it is time to start preparing the recipe. The process 1460 pauses until the start time has arrived in step 1469. In step 1470, the robotic apparatus 75 inspects each ingredient for freshness and condition (e.g. purchase date, expiration date, odor, color). In step 1471, robotic food preparation engine 56 is configured to send instructions to the robotic apparatus 75 to move food or ingredients from standardized containers to the food preparation position. In step 1472, the robotic food preparation engine 56 is configured to instruct the robotic apparatus 75 to start food preparation at the start time "0" by replicating the food dish from the software recipe script file. In step 1473, the robotic apparatus 75 in the standardized kitchen 50 replicates the food dish with the same movement as the chef's arms and fingers, the same ingredients, with the same pace, and using the same standardized kitchen equipment and tools. The robotic apparatus 75 in step 1474 conducts quality checks during the food preparation process to make any necessary parameter adjustment. In step 1475, the robotic apparatus 75 has completed replication and preparation of the food dish, and therefore is ready to plate and serve the food dish.

FIG. 46 depicts the process of storage container check-in and identification process 1480. Using the quality-monitoring dashboard, the user selects to check in an ingredient in step 1482. In step 1484, the user then scans the ingredient package at the check-in station or counter. Using additional data from the bar code scanner, weighing scales, camera and laser-scanners, the robotic cooking engine processes the ingredient-specific data and maps the same to its ingredient and recipe library and analyzes it for any potential allergic impact in step 1486. Should an allergic potential exist based on step 1488, the system in step 1490 decides to notify the user and dispose of the ingredient for safety reasons. Should the ingredient be deemed acceptable, it is logged and confirmed by the system in step 1492. The user may in step 1494 unpack (if not unpacked already) and drop off the item. In the succeeding step 1496, the item is packed (foil, vacuum bag, etc.), labeled with a computer-printed label with all necessary ingredient data printed thereon, and moved to a storage container and/or storage location based on the results of the identification. At step 1498, the robotic cooking engine then updates its internal database and displays the available ingredient in its quality-monitoring dashboard.

FIG. 47 depicts an ingredient's check-out from storage and cooking preparation process 1500. In the first step 1502, the user selects to check out an ingredient using the quality-monitoring dashboard. In step 1504, the user selects an item to check out based on a single item needed for one or more recipes. The computerized kitchen then acts in step 1506 to move the specific container containing the selected item from its storage location to the counter area. In case the user picks up the item in step 1508, the user processes the item in step 1510 in one or more of many possible ways (cooking, disposal, recycling, etc.), with any remaining item(s) rechecked back into the system in step 1512, which then concludes the user's interactions with the system 1514. In the case that the robotic arms in a standardized robotic kitchen receive the retrieved ingredient item(s), step 1516 is executed in which the arms and hands inspect each ingredient item in the container against their identification data (type, etc.) and condition (expiration date, color, odor, etc.). In a quality-check step 1518, the robotic cooking engine makes a decision on a potential item mismatch or detected quality condition. In case the item is not appropriate, step 1520 causes an alert to be raised to the cooking engine to follow-up with an appropriate action. Should the ingredient be of acceptable type and quality, the robotic arms move the item(s) to be used in the next cooking process stage in step 1522.

FIG. 48 depicts the automated pre-cooking preparation process 1524. In step 1530, the robotic cooking engine calculates the margin and/or wasted ingredient materials based on a particular recipe. Subsequently in step 1532, the robotic cooking engine searches all possible techniques and methods for execution of the recipe with each ingredient. In step 1534, the robotic cooking engine calculates and optimizes the ingredient usage and methods for time and energy consumption, particularly for dish(es) requiring parallel multi-task processes. The robotic cooking engine then creates a multi-level cooking plan 1536 for the scheduled dishes and sends the request for cooking execution to the robotic kitchen system. In the next step 1538, the robotic kitchen system moves the ingredients, cooking/baking ware needed for the cooking processes from its automated shelving system and assembles the tools and equipment and sets up the various work stations in step 1540.

FIG. 49 depicts the recipe design and scripting process 1542. As a first step 1544, the chef selects a particular recipe, for which he then enters or edits the recipe data in step 1546, including, but not limited to, the name and other metadata (background, techniques, etc.). In step 1548, the chef enters or edits the necessary ingredients based on the database and associated libraries and enters the respective amounts by weight/volume/units required for the recipe. A selection of the necessary techniques utilized in the preparation of the recipe is made in step 1550 by the chef, based on those available in the database and the associated libraries. In step 1552, the chef performs a similar selection, but this time he or she is focused on the choice of cooking and preparation methods required to execute the recipe for the dish. The concluding step 1554 then allows the system to create a recipe ID that will be useful for later database storage and retrieval.

FIG. 50 is a block diagram illustrating a first embodiment of a robotic restaurant kitchen module 1676 configured in a rectangular layout with multiple pairs of robotic hands for simultaneous food preparation processing. Other types or modification of configuration layout, in addition to the rectangular layout, is contemplated within the spirits of the present disclosure. Another embodiment of the disclosure revolves around a staged configuration for multiple successive or parallel robotic arm and hand stations in a professional or restaurant kitchen setup shown in FIG. 67. The embodiment depicts a more linear configuration, even though any geometric arrangement could be used, showing multiple robotic arm/hand modules, each focused on creating a particular element, dish or recipe script step (e.g. six pairs of robotic arms/hands to serve different roles in a commercial kitchen such as sous-chef, broiler-cook, fry/sauté cook, pantry cook, pastry chef, soup and sauce cook, etc.). The robotic kitchen layout is such that the access/interaction with any human or between neighboring arm/hand modules is along a single forward-facing surface. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station for a subsequent step in the recipe script) or multiple recipes/steps in parallel (such as pre-meal food-/ingredient-preparation for later use during dish replication completion to meet the time crunch during rush times).

FIG. 51 is a block diagram illustrating a second embodiment of a robotic restaurant kitchen module 1678 configured in a U-shape layout with multiple pairs of robotic hands for simultaneous food preparation processing. Yet another embodiment of the disclosure revolves around another staged configuration for multiple successive or parallel robotic arm and hand stations in a professional or restaurant kitchen setup shown in FIG. 68. The embodiment depicts a rectangular configuration, even though any geometric arrangement could be used, showing multiple robotic arm/hand modules, each focused on creating a particular element, dish or recipe script step. The robotic kitchen layout is such that the access/interaction with any human or between neighboring arm/hand modules is both along a U-shaped outward-facing set of surfaces and along the central-portion of the U-shape, allowing arm/hand modules to pass/reach over to opposing work areas and interact with their opposing arm/hand modules during the recipe replication stages. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station along the U-shaped path for a subsequent step in the recipe script) or multiple recipes/steps in parallel (such as pre-meal food-/ingredient-preparation for later use during dish replication completion to meet the time crunch during rush times, with prepared ingredients possibly stored in containers or appliances (fridge, etc.) contained within the base of the U-shaped kitchen).

FIG. 52 depicts a second embodiment of a robotic food preparation system 1680. The chef studio 44 with the standardized robotic kitchen system 50 includes the human chef 49 preparing or executing a recipe, while sensors on the cookware 1682 record variables (temperature, etc.) over time and store the value of variables in a computer's memory 1684 as sensor curves and parameters that form a part of a recipe script raw data file. The stored sensory curves and parameter software data (or recipe) files from the chef studio 50 are delivered to a standardized (remote) robotic kitchen on a purchase or subscription basis 1686. The standardized robotic kitchen 50 installed in a household includes both the user 48 and the computer controlled system 1688 to operate the automated and/or robotic kitchen equipment based on the received raw data corresponding to the measured sensory curves and parameter data files.

FIG. 53 depicts a second embodiment of the standardized robotic kitchen 50. The computer 16 that runs the robotic cooking (software) engine 56, which includes a cooking operations control module 1692 that processes recorded, analyzed and abstraction sensory data from the recipe script, and associated storage media and memory 1684 to store software files comprising of sensory curves and parameter data, interfaces with multiple external devices. These external devices include, but are not limited to, sensors for inputting raw data 1694, a retractable safety glass 68, a computer-monitored and computer-controllable storage unit 88, multiple sensors reporting on the process of raw-food quality and supply 198, hard-automation modules 82 to dispense ingredients, standardized containers 86 with ingredients, cook appliances fitted with sensors 1696, and cookware 1700 fitted with sensors.

FIG. 54 depicts a typical set of sensory curves 220 with recorded temperature profiles for data-1 1708, data-2 1710 and data-3 1712, each corresponding to the temperature in each of the three zones at the bottom of a particular area of a cookware unit. The measurement units for time are reflected as cooking time in minutes from start to finish (independent variable), while the temperature is measured in degrees Celsius (dependent variable).

FIG. 55 depicts a multiple set of sensory curves 1730 with recorded temperature 1732 and humidity 1734 profiles, with the data from each sensor represented as data-1 1708, data-2 1710 all the way to data-N 1712. Streams of raw data are forwarded and processed to and by an electronic (or computer) operating control unit 1736. The measurement units for time are reflected as cooking time in minutes from start to finish (independent variable), while the temperature and humidity values are measured in degrees Celsius and relative humidity, respectively (dependent variables).

FIG. 56 depicts a smart (frying) pan with process setup for real-time temperature control 1700. A power source 1750 uses three separate control units, but need not be limited to such, including control-unit-1 1752, control-unit-2 1754 and control-unit-3 1756, to actively heat a set of inductive coils. The control is in effect a function of the measured temperature values within each of the (three) zones 1702 (Zone 1), 1704 (Zone 2) and 1706 (Zone 3) of the (frying) pan, where temperature sensors 1716-1 (Sensor 1), 1716-3 (Sensor 2) and 1716-5 (Sensor 3) wirelessly provide temperature data via data streams 1708 (Data 1), 1710 (Data 2) and 1712 (Data 3) back to the operating control unit 274, which in turn directs the power source 1750 to independently control the separate zone-heating control units 1752, 1754 and 1756. The goal is to achieve and replicate the desired temperature curves over time, as the sensory curve data logged during the human chef's certain (frying) step during the preparation of a dish.

FIG. 57 is a flow diagram illustrating a second embodiment 1900 in the process of the robotic kitchen preparing a dish from one or more previously recorded parameter curves in a standardized robotic kitchen. In step 1902, a user, through a computer, selects a particular recipe for the robotic apparatus 75 to prepare the food dish. In step 1904, the robotic food preparation engine is configured to retrieve the abstraction recipe for the selected recipe for food preparation. In step 1906, the robotic food preparation engine is configured to upload the selected recipe script into the computer's memory. In step 1908, the robotic food preparation engine calculates the ingredient availability. In step 1910, the robotic food preparation engine is configured to evaluate whether there is a shortage or an absence of ingredients to prepare the dish according to the selected recipe and serving schedule. The robotic food preparation engine sends an alert to place missing or insufficient ingredients on a shopping list or selects an alternate recipe in step 1912. The recipe selection by the user is confirmed in step 1914. In step 1916, the robotic food preparation engine is configured to send robotic instructions to the user to place food or ingredients into standardized containers and move them to the proper food preparation position. In step 1918, the user is given the option to select a real-time video-monitor projection, whether on a dedicated monitor or a holographic laser-based projection, to visually see each and every step of the recipe replication process based on all movements and processes executed by the chef while being recorded for playback in this instance. In step 1920, the robotic food preparation engine is configured to allow the user to start food preparation at start time "0" of their choosing and powering on the computerized control system for the standardized robotic kitchen. In step 1922, the user executes a replication of all the chef's actions based on the playback of the entire recipe creation process by the human chef on the monitor/projection screen, whereby semi-finished products are moved to designated cookware and appliances or intermediate storage containers for later use. In step 1924, the robotic apparatus 75 in the standardized kitchen executes the individual processing steps according to sensory data curves or based on cooking parameters recorded when the chef executed the same step in the recipe preparation process in the chef studio's standardized robotic kitchen. In step 1926 the robotic food preparation's computer controls all the cookware and appliance settings in terms of temperature, pressure and humidity to replicate the required data curves over the entire cooking time based on the data captured and saved while the chef was preparing the recipe in the chef's studio standardized robotic kitchen. In step 1928, the user makes all simple movements to replicate the chef's steps and process movements as evidenced through the audio and video instructions relayed to the user over the monitor or projection screen. In step 1930, the robotic kitchen's cooking engine alerts the user when a particular cooking step based on a sensory curve or parameter set has been completed. Once the user and computer controller interactions result in the completion of all cooking steps in the recipe, the robotic cooking engine sends a request to terminate the computer-controlled portion of the replication process in step 1932. In step 1934, the user removes the completed recipe dish, plates and serves it, or continues any remaining cooking steps or processes manually.

FIG. 58 depicts one embodiment of the sensory data capturing process 1936 in the chef studio. The first step 1938 is for the chef to create or design the recipe. A next step 1940 requires that the chef input the name, ingredients, measurement and process descriptions for the recipe into the robotic cooking engine. The chef begins by loading all the required ingredients into designated standardized storage containers, appliances and select appropriate cookware in step 1942. The next step 1944 involves the chef setting the start time and switching on the sensory and processing systems to record all sensed raw data and allow for processing of the same. Once the chef starts cooking in step 1946, all embedded and monitoring sensor units and appliances report and send raw data to the central computer system to allow it to record in real time all relevant data during the entire cooking process 1948. Additional cooking parameters and audible chef comments are further recorded and stored as raw data in step 1950. A robotic cooking module abstraction (software) engine processes all raw data, including two- and three-dimensional geometric motion and object recognition data, to generate a machine-readable and machine-executable recipe script as part of step 1952. Upon completion of the chef studio recipe creation and cooking process by the chef, the robotic cooking engine generates a simulation visualization program 1954 replicating the movement and media data used for later recipe replication by a remote standardized robotic kitchen system. Based on the raw and processed data, and a confirmation of the simulated recipe execution visualization by the chef, hardware-specific applications are developed and integrated for different (mobile) operating systems and submitted to online software-application stores and/or marketplaces in step 1956, for direct single-recipe user purchase or multi-recipe purchase via subscription models.

FIG. 59 depicts the process and flow of a household robotic cooking process 1960. The first step 1962 involves the user selecting a recipe and acquiring the digital form of the recipe. In step 1964, the robotic cooking engine receives the recipe script containing machine-readable commands to cook the selected recipe. The recipe is uploaded in step 1966 to the robotic cooking engine with the script being placed in memory. Once stored, step 1968 calculates the necessary ingredients and determines their availability. In a logic check 1970 the system determines whether to alert the user or send a suggestion in step 1972 urging adding missing items to the shopping list or suggesting an alternative recipe to suit the available ingredients, or to proceed should sufficient ingredients be available. Once ingredient availability is verified in step 1974, the system confirms the recipe and the user is queried in step 1976 to place the required ingredients into designated standardized containers in a position where the chef started the recipe creation process originally (in the chef studio). The user is prompted to set the start time of the cooking process and to set the cooking system to proceed in step 1978. Upon start-up, the robotic cooking system begins the execution of the cooking process 1980 in real time according to sensory curves and cooking parameter data provided in the recipe script data files. During the cooking process 1982, the computer, to replicate the sensory curves and parameter data files originally captured and saved during the chef studio recipe creation process, controls all appliances and equipment. Upon completion of the cooking process, the robotic cooking engine sends a reminder based on having decided the cooking process is finished in step 1984. Subsequently the robotic cooking engine sends a termination request 1986 to the computer-control system to terminate the entire cooking process, and in step 1988, the user removes the dish from the counter for serving or continues any remaining cooking steps manually.

FIG. 60 depicts one embodiment of a standardized robotic food preparation kitchen system 50 with a command, visual monitoring module 1990. The computer 16 that runs the robotic cooking (software) engine 56, which includes the cooking operations control module 1990 that processes recorded, analyzed and abstraction sensory data from the recipe script, the visual command monitoring module 1990, and associated storage media and memory 1684 to store software files comprising of sensory curves and parameter data, interfaces with multiple external devices. These external devices include, but are not limited to, an instrumented kitchen working counter 90, the retractable safety glass 68, the instrumented faucet 92, cooking appliances with embedded sensors 74, cookware 1700 with embedded sensors (stored on a shelf or in a cabinet), standardized containers and ingredient storage units 78, a computer-monitored and computer-controllable storage unit 88, multiple sensors reporting on the process of raw food quality and supply 1694, hard automation modules 82 to dispense ingredients, and the operations control module 1692.

FIG. 61 depicts an embodiment of a fully instrumented robotic kitchen 2020 in perspective view. The standardized robotic kitchen is divided into three levels, namely the top level, the counter level and the lower level, with the top and lower levels containing equipment and appliances that have integrally mounted sensors 1884 and computer-control units 1886, and the counter level being fitted with one or more command and visual monitoring devices 2022.

The top level contains multiple cabinet-type modules with different units to perform specific kitchen functions by way of built-in appliances and equipment. At the simplest level this includes a cabinet volume 1296 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 86 for deep-frozen items, and another storage pantry zone 1294 for other ingredients and rarely used spices, etc. Each of the modules within the top level contains sensor units 1884 providing data to one or more control units 1886, either directly or by way of one or more central or distributed control computers, to allow for computer-controlled operations.

The counter level 1292-2 houses not only monitoring sensors 1884 and control units 1886, but also visual command monitoring devices 1316 while also including a counter area with a sink and electronic faucet 1308, another counter area 1310 with removable working surfaces (cutting/chopping board, etc.), a (smart) charcoal-based slatted grill 1312 and a multi-purpose area for other cooking appliances 1314, including a stove, cooker, steamer and poacher. Each of the modules within the counter level contains sensor units 1184 providing data to one or more control units 1186, either directly or by way of one or more central or distributed control computers, to allow for computer-controlled operations. Additionally, one or more visual command monitoring devices (not shown) are also provided within the counter level for the purposes of monitoring the visual operations of the human chef in the studio kitchen as well as the robotic arms or human user in the standardized robotic kitchen, where data is fed to one or more central or distributed computers for processing and subsequent corrective or supportive feedback and commands sent back to the robotic kitchen for display or script-following execution.

The lower level 1292-3 houses the combination convection oven and microwave as well as steamer, poacher and grill 1316, the dish-washer 1318, the hard automation controlled ingredient dispensers 86 (not showed)s, and a larger cabinet volume 1309 that holds and stores additional frequently used cooking and baking ware, as well as tableware, flatware, utensils (whisks, knives, etc.) and cutlery. Each of the modules within the lower level contains sensor units 1307 providing data to one or more control units 376, either directly or by way of one or more central or distributed control computers, to allow for computer-controlled operations.

FIG. 62A depicts another embodiment of the standardized robotic kitchen system 48. The computer 16 that runs the robotic cooking (software) engine 56 and the memory module 52 for storing recipe script data and sensory curves and parameter data files, interfaces with multiple external devices. These external devices include, but are not limited to, instrumented robotic kitchen stations 2030, instrumented serving stations 2032, an instrumented washing and cleaning station 2034, instrumented cookware 2036, computer-monitored and computer-controllable cooking appliances 2038, special-purpose tools and utensils 2040, an automated shelf station 2042, an instrumented storage station 2044, an ingredient retrieval station 2046, a user console interface 2048, dual robotic arms 70 and robotic hands 72, hard automation modules 1305 to dispense ingredients, and an optional chef-recording device 2050.

FIG. 62B depicts one embodiment of a robotic kitchen cooking system 2060 in plan view, where a humanoid 2056 (or the chef 49, a home-cook user or a commercial user 60) can access various cooking stations from multiple (four shown here) sides, where the humanoid would walk around the robotic food preparation kitchen system 2060, as illustrated in FIG. 87B, by accessing the shelves from around a robotic kitchen module 2058. A central storage station 2062 provides for different storage areas for various food items held at different temperatures (chilled/frozen) for optimum freshness, allowing access from all sides. Along the perimeter of the square arrangement of the current embodiment, a humanoid 2052 the chef 49 or user 60 can access various cooking areas with modules that include, but are not limited to, a user/chef console 2064 for laying out the recipe and overseeing the processes, an ingredient access station 2066 including a scanner, camera and other ingredient characterization systems, an automatic shelf station 2068 for cookware/baking ware/tableware, a washing and cleaning station 2070 comprising at least a sink and dish-washer unit, a specialized tool and utensil station 2072 for specialized tools required for particular techniques used in food or ingredient preparation, a warming station 2074 for warming or chilling served dishes and a cooking appliance station 2076 comprising multiple appliances including, but not limited to, an oven, stove, grill, steamer, fryer, microwave, blender, dehydrator, etc.

FIG. 62C depicts a perspective view of the same embodiment of the robotic kitchen 2058, allowing the humanoid 2056 (or a chef 49 or a user 60) to gain access to multiple cooking stations and equipment from at least four different sides. A central storage station 2062 provides for different storage areas for various food items held at different temperatures (chilled/frozen) for optimum freshness, allowing access from all sides, and is located at an elevated level. An automatic shelf station 2068 for cookware/baking ware/tableware is located at a middle level beneath the central storage station 2062. At a lower level an arrangement of cooking stations and equipment is located that includes, but is not limited to, a user/chef console 2064 for laying out the recipe and overseeing the processes, an ingredient access station 2060 including a scanner, camera and other ingredient characterization systems, an automatic shelf station 2068 for cookware/baking ware/tableware, a washing and cleaning station 2070 comprising at least a sink and dish-washer unit, a specialized tool and utensil station 2072 for specialized tools required for particular techniques used in food or ingredient preparation, a warming station 2076 for warming or chilling served dishes and a cooking appliance station 2076 comprising multiple appliances including, but not limited to, an oven, stove, grill, steamer, fryer, microwave, blender, dehydrator, etc.

FIG. 63 is a block diagram Illustrating a robotic human-emulator electronic intellectual property (IP) library 2100. The robotic human-emulator electronic IP library 2100 covers the various concepts in which the robotic apparatus 75 is used as a means to replicate a human's particular skill set. More specifically, the robotic apparatus 75, which includes the pair of robotic hands 70 and the robotic arms 72, serves to replicate a set of specific human skills. In some way, the transfer to intelligence from a human can be captured using the human's hands; the robotic apparatus 75 then replicates the precise movements of the recorded movements in obtaining the same result. The robotic human-emulator electronic IP library 2100 includes a robotic human-culinary-skill replication engine 56, a robotic human-painting-skill replication engine 2102, a robotic human-musical-instrument-skill replication engine 2104, a robotic human-nursing-care-skill replication engine 2106, a robotic human-emotion recognizing engine 2108, a robotic human-intelligence replication engine 2110, an input/output module 2112, and a communication module 2114. The robotic human emotion recognizing engine 1358 is further described with respect to FIGS. 89, 90, 91, 92 and 93.

FIG. 64 is a flow diagram illustrating the process and logic flow of a robotic human emotion method 250 in the robotic human emotion (computer-operated) engine 2108. In its first step 2151, the (software) engine receives sensory input from a variety of sources akin to the senses of a human, including vision, audible feedback, tactile and olfactory sensor data from the surrounding environment. In the decision step 2152, the decision is made whether to create a motion reflex, either resulting in a reflex motion 2153 or, if no reflex motion is required, step 2154 is executed, where specific input information or patterns or combinations thereof are recognized based on information or patterns stored in memory, which are subsequently translated into abstraction or symbolic representations. The abstraction and/or symbolic information is processed through a sequence of intelligence loops, which can be experience-based. Another decision step 2156 decides on whether a motion-reaction 2157 should be engaged based on a known and pre-defined behavior model and, if not, step 12158 is undertaken. In step 2158 the abstraction and/or symbolic information is then processed through another layer of emotion- and mood-reaction behavior loops with inputs provided from internal memories, which can be formed through learning. Emotion is broken down into a mathematical formalism and programmed into robot, with mechanisms that can be described, and quantities that can be measured and analyzed (e.g. by capturing facial expressions of how quickly a smile forms and how long it lasts to differentiate between a genuine and a polite smile, or by detecting emotion based on the vocal qualities of a speaker, where the computer measures the pitch, energy and volume of the voice, as well as the fluctuations in volume and pitch from one moment to the next). There will thus be certain identifiable and measurable metrics to an emotional expression, where these metrics in the behavior of an animal or the sound of a human speaking or singing will have identifiable and measurable associated emotion attributes. Based on these identifiable and measurable metrics, the emotion engine can make a decision 2159 as to which behavior to engage, whether pre-learned or newly learned. The engaged or executed behavior and its effective result are updated in memory and added to the experience personality and natural behavior database 2160. In a follow-on step 2161, the experience personality data is translated into more human-specific information, which then allows him or her to execute the prescribed or resultant motion 2162.

FIG. 65A depicts a robotic human-intelligence engine 2250. In the replication engine 1360, there are two main blocks, including a training block and an application block, both containing multiple additional modules all interconnected to each other over a common inter-module communication bus 2252. The training block of the human-intelligence engine contains further modules, including, but not limited to, a sensor input module 2522, a human input stimuli module 2254, a human intelligence response module 2256 that reacts to input stimuli, an intelligence response recording module 2258, a quality check module 2260 and a learning machine module 2262. The application block of the human-intelligence engine contains further modules, including, but not limited to, an input analysis module 2264, a sensor input module 2266, a response generating module 2268, and a feedback adjustment module 2270.

FIG. 65B depicts the architecture of the robotic human intelligence system 2108. The system is split into both the cognitive robotic agent and the human-skill execution module. Both modules share sensing feedback data 2109, as well as sensed motion data and modeled motion data. The cognitive robotic agent module includes, but is not necessarily limited to, modules that represent a knowledge database 2282, interconnected to an adjustment and revision module 2286, with both being updated through a learning module 2288. Existing knowledge 2290 is fed into the execution monitoring module 2292 as well as existing knowledge 2294 being fed into the automated analysis and reasoning module 2296, where both receive sensing feedback data 2109 from the human-skill execution module, with both also providing information to the learning module 2288. The human-skill execution module comprises both a control module 2209 that bases its control signals on collecting and processing multiple sources of feedback (visual and auditory), as well as a module 2230 with a robot utilizing standardized equipment, tools and accessories.

FIG. 66A depicts the architecture for a robotic painting system 2102. Included in this system are both a studio robotic painting system 2332 and a commercial robotic painting system 2334, communicatively connected to allow software program files or applications 2336 for robotic painting to be delivered from the studio robotic painting system 2332 to the commercial robotic painting system 2334 based on a single-unit purchase or subscription-based payment basis. The studio robotic painting system 2332 comprises a (human) painting artist 2337 and a computer 2338 that is interfaced to motion and action sensing devices and painting-frame capture sensors to capture and record the artist's movements and processes, and store in memory 2340 the associated software painting files. The commercial robotic painting system 2334 is comprised of a user 2342 and a computer 2344 with a robotic painting engine capable of interfacing and controlling robotic arms to recreate the movements of the painting artist 2337 according to the software painting files or applications along with visual feedback for the purpose of calibrating a simulation model.

FIG. 66B depicts the robotic painting system architecture 2350. The architecture includes a computer 2374, which is interfaced to/with multiple external devices, including, but not limited to, motion sensing input devices and touch-frame 2354, a standardized workstation 2356, including an easel 2384, a rinsing sink 2360, an art horse 2362, a storage cabinet 2634 and material containers 2366 (paint, solvents, etc.), as well as standardized tools and accessories (brushes, paints, etc.) 2368, visual input devices (camera, etc.) 2370, and one or more robotic arms 70 and robotic hands (or at least one gripper) 72.

The computer module 2374 includes modules that include, but are not limited to, a robotic painting engine 2376 interfaced to a painting movement emulator 2378, a painting control module 2380 that acts based on visual feedback of the painting execution processes, a memory module 2382 to store painting execution program files, algorithms 2384 for learning the selection and usage of the appropriate drawing tools, as well as an extended simulation validation and calibration module 2386.

FIG. 66C depicts a robotic human-painting skill-replication engine 2102. In the robotic human-painting skill-replication replication engine 2102, there are multiple additional modules all interconnected to each other over a common inter-module communication bus 2393. The replication engine 2102 contains further modules, including, but not limited to, an input module 2392, a paint movement recording module 2394, an ancillary/additional sensory data recording module 2396, a painting movement programming module 2398, a memory module 2399 containing software execution procedure program files, an execution procedure module 2400 that generates execution commands based on recorded sensor data, a module 2402 containing standardized painting parameters, an output module 2404, and an (output) quality checking module 2403, all overseen by a software maintenance module 2406.

One embodiment of the art platform standardization is defined as follows. First, standardized position and orientation (xyz) of any kind of art tools (brushes, paints, canvas, etc.) in the art platform. Second, standardized operation volume dimensions and architecture in each art platform. Third, standardized art tools set in each art platform. Fourth, standardized robotic arms and hands with a library of manipulations in each art platform. Fifth, standardized three-dimensional vision devices for creating dynamic three-dimensional vision data for painting recording and execution tracking and quality check function in each art platform. Sixth, standardized type/producer/mark/of all using paints during particular painting execution. Seventh, standardized type/producer/mark/size of canvas during particular painting execution.

One main purpose to have Standardized Art Platform is to achieve the same result of the painting process (i.e., the same painting) executing by the original painter and afterward duplicated by robotic Art Platform. Several main points to emphasize in using the standardized Art Platform: (1) have the same timeline (same sequence of manipulations, same initial and ending time of each manipulation, same speed of moving object between manipulations) of Painter and automatic robotic execution; and (2) there are quality checks (3D vision, sensors) to avoid any fail result after each manipulation during the painting process. Therefore, the risk of not having the same result is reduced if the painting was done at the standardized art platform. If a non-standardized art platform is used, this will increase the risk of not having the same result (i.e. not the same painting) because adjustment algorithms may be required when the painting is not executed at not the same volume, with the same art tools, with the same paint or with the same canvas in the painter studio as in the robotic art platform.

FIG. 67A depicts the studio painting system and program commercialization process 2410. A first step 2451 is for the human painting artist to make decisions pertaining to the artwork to be created in the studio robotic painting system, which includes deciding on such topics as the subject, composition, media, tools and equipment, etc. The artist inputs all this data to the robotic painting engine in step 2452, after which in step 2453 the artist sets up the standardized workstation, tools and equipment and accessories and materials, as well as the motion and visual input devices as required and spelled out in the set-up procedure. The artist sets the starting point of the process and turns on the studio painting system in step 2454, after which the artist then begins step 2455 of actually painting. In step 2456, the studio painting system records the motions and video of the artist's movements in real time and in a known xyz coordinate frame during the entire painting process. The data collected in the painting studio is then stored in step 2457, allowing the robotic painting engine to generate a simulation program 2458 based on the stored movement and media data. At step 2459, the robotic painting program file or application (app) of the produced painting is developed and integrated for use by different operating systems and mobile systems and submitted to App-stores or other marketplace locations for sale as a single-use purchase or on a subscription basis.

FIG. 67B depicts the logical execution flow 2460 for the robotic painting engine. As a first step, the user selects a painting title in step 2461, with the input being received by the robotic painting engine in step 2462. The robotic painting engine uploads the painting execution program files in step 2463 into the onboard memory, and then proceeds to step 2464, where it calculates the necessary tools and accessories. A checking step 2465 provides the answers as to whether there is a shortage of tools or accessories and materials; should there be a shortage, the system sends an alert 2466 or a suggestion to the user for an ordering list or an alternate painting. In the case of no shortage, the engine confirms the selection in step 2467, allowing the user to proceed to step 2468, comprised of setting up the standardized workstation, motion and visual input devices using the step-by-step instruction contained within the painting execution program files. Once completed, the robotic painting engine performs a check-up step 2469 to verify the proper setup; should it detect an error through step 2470, the system engine will send an error alert 2472 to the user and prompt the user to re-check the setup and correct any detected deficiencies. If the check passes with no errors detected, the setup will be confirmed by the engine in step 2471, allowing it to prompt the user in step 2473 to set the starting point and power on the replication and visual feedback and control systems. In step 2474, the robotic arm(s) will execute the steps specified in the painting execution program file, including movements, usage of tools and equipment at an identical pace as specified by the painting program execution files. A visual feedback step 2475 monitors the execution of the painting replication process against the controlled parameter data that define a successful execution of the painting process and its outcomes. The robotic painting engine further takes the step 2476 of simulation model verification to increase the fidelity of the replication process, with the goal of the entire replication process to reach an identical final state as captured and saved by the studio painting system. Once the painting is completed, a notification 2477 is sent to the user, including drying and curing time for the applied materials (paint, paste, etc.)

FIG. 68A depicts a robotic human musical-instrument skill-replication engine 2104. In the robotic human musical-instrument skill-replication engine 2104, there are multiple additional modules all interconnected to each other over a common inter-module communication bus 2478. The replication engine contains further modules, including, but not limited to, an audible (digital) audio input module 2480, a human's musical instrument playing movement recording module 2482, an ancillary/additional sensory data recording module 2484, a musical instrument playing movement programming module 12486, a memory module 2488 containing software execution procedure program files, an execution procedure module 2490 that generates execution commands based on recorded sensor data, a module 2492 containing standardized musical instrument playing parameters (e.g. pace, pressure, angles, etc.), an output module 2494, and an (output) quality checking module 2496, all overseen by a software maintenance module 2498.

FIG. 68B depicts the process carried out and the logical flow for a musician replication engine 2104. To start, in step 2501 a user selects a music title and/or composer, and is then queried in step 2502 whether the selection should be made by the robotic engine or through interaction with the human. In the case, the user selects the robot engine to select the title/composer in step 2503, the engine 2104 is configured to use its own interpretation of creativity in step 2512, to offer the human user to provide input to the selection process in step 2504. Should the human decline providing input, the robotic musician engine 2104 is configured to use settings such as manual inputs to tonality, pitch and instrumentation as well as melodic variation in step 2519, to gather the necessary input in step 2520 to generate and upload selected instrument playing execution program files in step 2521, allowing the user to select the preferred one in step 2523, after the robotic musician engine has confirmed the selection in step 2522. The choice made by the human is then stored as a personal choice in the personal profile database in step 2524. Should the human decide to provide input to the query in step 2513, the user will be able in step 2513 to provide additional emotional input to the selection process (facial expressions, photo, news article, etc.). The input from step 2514 is received by the robotic musician engine in step 2515, allowing it to proceed to step 2516, where the engine carries out a sentiment analysis related to all available input data and uploads a music selection based on the mood and style appropriate to the emotional input data from the human. Upon confirmation of selection for the uploaded music selection in step 2517 by the robotic musician engine, the user may select the 'start' button to play the program file for the selection in step 2518.

In the case where the human wants to be intimately involved in the selection of the title/composer, the system provides a list of performers for the selected title to the human on a display in step 2503. In step 2504 the user selects the desired performer, a choice input that the system receives in step 2505. In step 2506, the robotic musician engine generates and uploads the instrument playing execution program files, and proceeds in step 2507 to compare potential limitations between a human and a robotic musician's playing performance on a particular instrument, thereby allowing it to calculate a potential performance gap. A checking step 2508 decides whether there exists a gap. Should there be a gap, the system will suggest other selections based on the user's preference profile in step 2509. Should there be no performance gap, the robotic musician engine will confirm the selection in step 2510 and allow the user to proceed to step 2511, where the user may select the 'start' button to play the program file for the selection.

FIG. 69 depicts a robotic human-nursing-care skill-replication engine 2106. In the robotic human-nursing-care skill-replication engine replication engine 2106, there are multiple additional modules all interconnected to each other over a common inter-module communication bus 2521. The replication engine 2106 contains further modules, including, but not limited to, an input module 2520, a nursing care movement recording module 2522, an ancillary/additional sensory data recording module 2524, a nursing care movement programming module 2526, a memory module 2528 containing software execution procedure program files, an execution procedure module 2530 that generates execution commands based on recorded sensor data, a module 2532 containing standardized nursing care parameters, an output module 2534, and an (output) quality checking module 2536, all overseen by a software maintenance module 2538.

FIG. 70A depicts a robotic human nursing care system process 2550. A first step 2551 involves a user (care receiver or family/friends) creating an account for the care receiver, providing personal data (name, age, ID, etc.). A biometric data collection step 2552 involves the collection of personal data, including facial images, fingerprints, voice samples, etc. The user then enters contact information for emergency contact in step 2553. The robotic engine receives all this input data to build up a user account and profile in step 2554. Should the user not be under a remote health monitoring program as determined in step 2555, the robot engine sends an account creation confirmation message and a self-downloading manual file/app to the user's tablet, TV, smartphone or other device for future touch-screen or voice-based command interface purposes, as part of step 2561. Should the user be part of a remote health-monitoring program, the robot engine will request in step 2556 permission to access medical records. As part of step 2557 the robotic engine connects with the user's hospital and physician's offices, laboratories and medical insurance databases to receive the medical history, prescription, treatment, and appointments data for the user and generates a medical care execution program for storage in a file particular to that user. As a next step 2558, the robotic engine connects with any and all of the user's wearable medical devices (such as blood pressure monitors, pulse and blood-oxygen sensors), or even electronically controllable drug dispensing system (whether oral or by injection) to allow for continuous monitoring. As a follow-on step, the robotic engine receives medical data file and sensory inputs allowing it to generate one or more medical care execution program files for the user's account in step 2559. The next step 2560 involves the creation of a secure cloud storage data space for the user's information, daily activities, associated parameters and any past or future medical events or appointments. As before in step 2561, the robot engine sends an account creation confirmation message and a self-downloading manual file/app to the user's tablet, TV, smartphone or other device for future touch-screen or voice-based command interface purposes.

FIG. 70B depicts a continuation of the robotic human nursing care system process 2250 first started with FIG. 70A, but which is now related to a physically present robot in the user's environment. As a first step 2562, the user turns on the robot in a default configuration and location (e.g. charging station). In task 2563, the robot receives a user's voice or touch-screen-based command to execute one specific or groups of commands or actions. In step 2564, the robot carries out particular tasks and activities based on engagement with the user using voice and facial recognition commands and cues, responses or behaviors of the user, basing its decisions on such factors as task-urgency and task-priority based on knowledge of the particular or overall situation. In task 2565 the robot carries out typical fetching, grasping and transportation of one or more items, completing the tasks using object recognition and environmental sensing, localization and mapping algorithms to optimize movements along obstacle-free paths, possibly even to serve as an avatar to provide audio/video teleconferencing ability for the user or interface with any controllable home appliance. At step 2568, the robot is continually monitoring the user's medical condition based on sensory input and the user's profile data, and monitors for possible symptoms of potential medically dangerous conditions, with the ability to inform first responders or family members about any potential situations requiring their immediate attention at step 2570. The robot continually checks in step 2566 for any open or remaining task and always remains ready to react to any user input from step 2522.

In general terms, there may be considered a method of motion capture and analysis for a robotics system, comprising sensing a sequence of observations of a person's movements by a plurality of robotic sensors as the person prepares a product using working equipment; detecting in the sequence of observations minimanipulations corresponding to a sequence of movements carried out in each stage of preparing the product; transforming the sensed sequence of observations into computer readable instructions for controlling a robotic apparatus capable of performing the sequences of minimanipulations; storing at least the sequence of instructions for minimanipulations to electronic media for the product. This may be repeated for multiple products. The sequence of minimanipulations for the product is preferably stored as an electronic record. The minimanipulations may be abstraction parts of a multi-stage process, such as cutting an object, heating an object (in an oven or on a stove with oil or water), or similar. Then, the method may further comprise transmitting the electronic record for the product to a robotic apparatus capable of replicating the sequence of stored minimanipulations, corresponding to the original actions of the person. Moreover, the method may further comprise executing the sequence of instructions for minimanipulations for the product by the robotic apparatus 75, thereby obtaining substantially the same result as the original product prepared by the person.

In another general aspect, there may be considered a method of operating a robotics apparatus, comprising providing a sequence of pre-programmed instructions for standard minimanipulations, wherein each minimanipulation produces at least one identifiable result in a stage of preparing a product; sensing a sequence of observations corresponding to a person's movements by a plurality of robotic sensors as the person prepares the product using equipment; detecting standard minimanipulations in the sequence of observations, wherein a minimanipulation corresponds to one or more observations, and the sequence of minimanipulations corresponds to the preparation of the product; transforming the sequence of observations into robotic instructions based on software implemented methods for recognizing sequences of pre-programmed standard minimanipulations based on the sensed sequence of person motions, the minimanipulations each comprising a sequence of robotic instructions and the robotic instructions including dynamic sensing operations and robotic action operations; storing the sequence of minimanipulations and their corresponding robotic instructions in electronic media. Preferably, the sequence of instructions and corresponding minimanipulations for the product are stored as an electronic record for preparing the product. This may be repeated for multiple products. The method may further include transmitting the sequence of instructions (preferably in the form of the electronic record) to a robotics apparatus capable of replicating and executing the sequence of robotic instructions. The method may further comprise executing the robotic instructions for the product by the robotics apparatus, thereby obtaining substantially the same result as the original product prepared by the human. Where the method is repeated for multiple products, the method may additionally comprise providing a library of electronic descriptions of one or more products, including the name of the product, ingredients of the product and the method (such as a recipe) for making the product from ingredients.

Another generalized aspect provides a method of operating a robotics apparatus comprising receiving an instruction set for a making a product comprising of a series of indications of minimanipulations corresponding to original actions of a person, each indication comprising a sequence of robotic instructions and the robotic instructions including dynamic sensing operations and robotic action operations; providing the instruction set to a robotic apparatus capable of replicating the sequence of minimanipulations; executing the sequence of instructions for minimanipulations for the product by the robotic apparatus, thereby obtaining substantially the same result as the original product prepared by the person.

A further generalized method of operating a robotic apparatus may be considered in a different aspect, comprising executing a robotic instructions script for duplicating a recipe having a plurality of product preparation movements; determining if each preparation movement is identified as a standard grabbing action of a standard tool or a standard object, a standard hand-manipulation action or object, or a non-standard object; and for each preparation movement, one or more of: instructing the robotic cooking device to access a first database library if the preparation movement involves a standard grabbing action of a standard object; instructing the robotic cooking device to access a second database library if the food preparation movement involves a standard hand-manipulation action or object; and instructing the robotic cooking device to create a three-dimensional model of the non-standard object if the food preparation movement involves a non-standard object. The determining and/or instructing steps may be particularly implemented at or by a computer system. The computing system may have a processor and memory.

Another aspect may be found in a method for product preparation by robotic apparatus 75, comprising replicating a recipe by preparing a product (such as a food dish) via the robotic apparatus 75, the recipe decomposed into one or more preparation stages, each preparation stage decomposed into a sequence of minimanipulations and active primitives, each minimanipulation decomposed into a sequence of action primitives. Preferably, each mini manipulation has been (successfully) tested to produce an optimal result for that mini manipulation in view of any variations in positions, orientations, shapes of an applicable object, and one or more applicable ingredients.

A further method aspect may be considered in a method for recipe script generation, comprising receiving filtered raw data from sensors in the surroundings of a standardized working environment module, such as a kitchen environment; generating a sequence of script data from the filtered raw data; and transforming the sequence of script data into machine-readable and machine-executable commands for preparing a product, the machine-readable and machine-executable commands including commands for controlling a pair of robotic arms and hands to perform a function. The function may be from the group comprising one or more cooking stages, one or more minimanipulations, and one or more action primitives. A recipe script generation system comprising hardware and/or software features configured to operate in accordance with this method may also be considered.

In any of these aspects, the following may be considered. The preparation of the product normally uses ingredients. Executing the instructions typically includes sensing properties of the ingredients used in preparing the product. The product may be a food dish in accordance with a (food) recipe (which may be held in an electronic description) and the person may be a chef. The working equipment may comprise kitchen equipment. These methods may be used in combination with any one or more of the other features described herein. One, more than one or all of the features of the aspects may be combined, so a feature from one aspect may be combined with another aspect for example. Each aspect may be computer-implemented and there may be provided a computer program configured to perform each method when operated by a computer or processor. Each computer program may be stored on a computer-readable medium. Additionally or alternatively, the programs may be partially or fully hardware-implemented. The aspects may be combined. There may also be provided a robotics system configured to operate in accordance with the method described in respect of any of these aspects.

In another aspect, there may be provided a robotics system, comprising: a multi-modal sensing system capable of observing human motions and generating human motions data in a first instrumented environment; and a processor (which may be a computer), communicatively coupled to the multi-modal sensing system, for recording the human motions data received from the multi-modal sensing system and processing the human motions data to extract motion primitives, preferably such that the motion primitives define operations of a robotics system. The motion primitives may be minimanipulations, as described herein (for example in the immediately preceding paragraphs) and may have a standard format. The motion primitive may define specific types of action and parameters of the type of action, for example a pulling action with a defined starting point, end point, force and grip type. Optionally, there may be further provided a robotics apparatus, communicatively coupled to the processor and/or multi-modal sensing system. The robotics apparatus may be capable of using the motion primitives and/or the human motions data to replicate the observed human motions in a second instrumented environment.

In a further aspect, there may provided a robotics system, comprising: a processor (which may be a computer), for receiving motion primitives defining operations of a robotics system, the motion primitives being based on human motions data captured from human motions; and a robotics system, communicatively coupled to the processor, capable of using the motion primitives to replicate human motions in an instrumented environment. It will be understood that these aspects may be further combined.

A further aspect may be found in a robotics system comprising: first and second robotic arms; first and second robotic hands, each hand having a wrist coupled to a respective arm, each hand having a palm and multiple articulated fingers, each articulated finger on the respective hand having at least one sensor; and first and second gloves, each glove covering the respective hand having a plurality of embedded sensors. Preferably, the robotics system is a robotic kitchen system.

There may further be provided, in a different but related aspect, a motion capture system, comprising: a standardized working environment module, preferably a kitchen; plurality of multi-modal sensors having a first type of sensors configured to be physically coupled to a human and a second type of sensors configured to be spaced away from the human. One or more of the following may be the case: the first type of sensors may be for measuring the posture of human appendages and sensing motion data of the human appendages; the second type of sensors may be for determining a spatial registration of the three-dimensional configurations of one or more of the environment, objects, movements, and locations of human appendages; the second type of sensors may be configured to sense activity data; the standardized working environment may have connectors to interface with the second type of sensors; the first type of sensors and the second type of sensors measure motion data and activity data, and send both the motion data and the activity data to a computer for storage and processing for product (such as food) preparation.

An aspect may additionally or alternatively be considered in a robotic hand coated with a sensing gloves, comprising: five fingers; and a palm connected to the five fingers, the palm having internal joints and a deformable surface material in three regions; a first deformable region disposed on a radial side of the palm and near the base of the thumb; a second deformable region disposed on a ulnar side of the palm, and spaced apart from the radial side; and a third deformable region disposed on the palm and extend across the base of the fingers. Preferably, the combination of the first deformable region, the second deformable region, the third deformable region, and the internal joints collectively operate to perform a mini manipulation, particularly for food preparation.

In respect of any of the above system, device or apparatus aspects, there may further be provided method aspects comprising steps to carry out the functionality of the system. Additionally or alternatively, optional features may be found based on any one or more of the features described herein with respect to other aspects.

FIG. 71 is a block diagram illustrating the general applicability (or universal) of robotic human-skill replication system 2700 with a creator's recording system 2710 and a commercial robotic system 2720. The human-skill replication system 2700 may be used to capture the movements or manipulations of a subject expert or creator 2711. Creator 2711 may be an expert in his/her respective field and may be a professional or someone who has gained the necessary skills to have refined specific tasks, such as cooking, painting, medical diagnostics, or playing a musical instrument. The creator's recording system 2710 comprises a computer 2712 with sensing inputs, e.g. motion sensing inputs, a memory 2713 for storing replication files and a subject/skill library 2714. Creator's recording system 2710 may be a specialized computer or may be a general purpose computer with the ability to record and capture the creator 2711 movements and analyze and refine those movements down into steps that may be processed on computer 2712 and stored in memory 2713. The sensors may be any type of visual, IR, thermal, proximity, temperature, pressure, or any other type of sensor capable of gathering information to refine and perfect the minimanipulations required by the robotic system to perform the task. Memory 2713 may be any type of remote or local memory type storage and may be stored on any type of memory system including magnetic, optical, or any other known electronic storage system. Memory 2713 maybe a public or private cloud based system and may be provided locally or by a third party. Subject/skill library 2714 may be a compilation or collection of previously recorded and captured minimanipulations and may be categorized or arranged in any logical or relational order, such as by task, by robotic components, or by skill.

Commercial robotic system 2720 comprises a user 2721, a computer 2722 with a robotic execution engine and a minimanipulation library 2723. The computer 2722 comprises a general or special purpose computer and may be any compilation of processors and or other standard computing devices. Computer 2722 comprises a robotic execution engine for operating robotic elements such as arms/hands or a complete humanoid robot to recreate the movements captured by the recording system. The Computer 2722 may also operate standardized objects (e.g. tools and equipment) of the creator's 2711 according to the program files or app's captured during the recording process. Computer 2722 may also control and capture 3-D modeling feedback for simulation model calibration and real time adjustments. Minimanipulation library 2723 stores the captured minimanipulations that have been downloaded from the creator's recording system 2710 to the commercial robotic system 2720 via communications link 2701. Minimanipulation library 2723 may store the minimanipulations locally or remotely and may store them in a predetermined or relational basis. Communications link 2701 conveys program files or app's for the (subject) human skill to the commercial robotic system 2720 on a purchase, download, or subscription basis. In operation robotic human-skill replication system 2700 allows a creator 2711 to perform a task or series of tasks which are captured on computer 2712 and stored in memory 2713 creating minimanipulation files or libraries. The minimanipulation files may then be conveyed to the commercial robotic system 2720 via communications link 2701 and executed on computer 2722 causing a set of robotic appendage of hands and arms or a humanoid robot to duplicate the movements of the creator 2711. In this manner, the movements of the creator 2711 are replicated by the robot to complete the required task.

FIG. 72 is a software system diagram illustrating the robotic human-skill replication engine 2800 with various modules. Robotic human-skill replication engine 2800 may comprise an input module 2801, a creator's movement recording module 2802, a creator's movement programming module 2803, a sensor data recording module 2804, a quality check module 2805, a memory module 2806 for storing software execution procedure program files, a skill execution procedure module 2807, which may be based on the recorded sensor data, a standard skill movement and object parameter capture module 2808, a minimanipulation movement and object parameter module 2809, a maintenance module 2810 and an output module 2811. Input module 2801 may include any standard inputting device, such as a keyboard, mouse, or other inputting device and may be used for inputting information into robotic human-skill replication engine 2800. Creator movement recording module 2802 records and captures all the movements, and actions of the creator 2711 when robotic human-skill replication engine 2800 is recording the movements or minimanipulations of the creator 2711. The recording module 2802 may record input in any known format and may parse the creator's movements in small incremental movements to make up a primary movement. Creator movement recording module 2802 may comprise hardware or software and may comprise any number or combination of logic circuits. The creator's movement programming module 2803 allows the creator 2711 to program the movements rather then allow the system to capture and transcribe the movements. Creator's movement programming module 2803 may allow for input through both input instructions as well as captured parameters obtained by observing the creator 2711. Creator's movement programming module 2803 may comprise hardware or software and may be implemented utilizing any number or combination of logic circuits. Sensor Data Recording Module 2804 is used to record sensor input data captured during the recording process. Sensor Data Recording Module 2804 may comprise hardware or software and may be implemented utilizing any number or combination of logic circuits. Sensor Data Recording Module 2804 may be utilized when a creator 2711 is performing a task that is being monitored by a series of sensors such as motion, IR, auditory or the like. Sensor Data Recording Module 2804 records all the data from the sensors to be used to create a mini-manipulate of the task being performed. Quality Check Module 2805 may be used to monitor the incoming sensor data, the health of the overall replication engine, the sensors or any other component or module of the system. Quality Check Module 2805 may comprise hardware or software and may be implemented utilizing any number or combination of logic circuits. Memory Module 2806 may be any type of memory element and may be used to store Software Execution Procedure Program Files. It may comprise local or remote memory and may employ short term, permanent or temporary memory storage. Memory module 2806 may utilize any form of magnetic, optic or mechanical memory. Skill Execution Procedure Module 2807 is used to implement the specific skill based on the recorded sensor data. Skill Execution Procedure Module 2807 may utilize the recorded sensor data to execute a series of steps or minimanipulations to complete a task or a portion of a task one such a task has been captured by the robotic replication engine. Skill Execution Procedure Module 2807 may comprise hardware or software and may be implemented utilizing any number or combination of logic circuits.

Standard skill movement and object Parameters module 2802 may be a modules implemented in software or hardware and is intended to define standard movements of objects and or basic skills. It may comprise subject parameters, which provide the robotic replication engine with information about standard objects that may need to be utilized during a robotic procedure. It may also contain instructions and or information related to standard skill movements, which are not unique to any one minimanipulation. Maintenance module 2810 may be any routine or hardware that is used to monitor and perform routine maintenance on the system and the robotic replication engine. Maintenance module 2810 may allow for controlling, updating, monitoring, and troubleshooting any other module or system coupled to the robotic human-skill replication engine. Maintenance module 2810 may comprise hardware or software and may be implemented utilizing any number or combination of logic circuits. Output module 2811 allows for communications from the robotic human-skill replication engine 2800 to any other system component or module. Output module 2811 may be used to export, or convey the captured minimanipulations to a commercial robotic system 2720 or may be used to convey the information into storage. Output module 2811 may comprise hardware or software and may be implemented utilizing any number or combination of logic circuits. Bus 2812 couples all the modules within the robotic human-skill replication engine and may be a parallel bus, serial bus, synchronous or asynchronous. It may allow for communications in any form using serial data, packetized data, or any other known methods of data communication.

Minimanipulation movement and object parameter module 2809 may be used to store and/or categorize the captured minimanipulations and creator's movements. It may be coupled to the replication engine as well as the robotic system under control of the user.

FIG. 102 is a block diagram illustrating one embodiment of the robotic human-skill replication system 2700. The robotic human-skill replication system 2700 comprises the computer 2712 (or the computer 2722), motion sensing devices 2825, standardized objects 2826, non-standard objects 2827.

Computer 2712 comprises robotic human-skill replication engine 2800, movement control module 2820, memory 2821, skills movement emulator 2822, extended simulation validation and calibration module 2823 and standard object algorithms 2824. As described with respect to FIG. 102, robotic human-skill replication engine 2800 comprises several modules, which enable the capture of creator 2711 movements to create and capture minimanipulations during the execution of a task. The captured minimanipulations are converted from sensor input data to robotic control library data that may be used to complete a task or may be combined in series or parallel with other minimanipulations to create the necessary inputs for the robotic arms/hands or humanoid robot 2830 to complete a task or a portion of a task.

Robotic human-skill replication engine 2800 is coupled to movement control module 2820, which may be used to control or configure the movement of various robotic components based on visual, auditory, tactile or other feedback obtained from the robotic components. Memory 2821 may be coupled to computer 2712 and comprises the necessary memory components for storing skill execution program files. A skill execution program file contains the necessary instructions for computer 2712 to execute a series of instructions to cause the robotic components to complete a task or series of tasks. Skill movement emulator 2822 is coupled to the robotic human-skill replication engine 2800 and may be used to emulate creator skills without actual sensor input. Skill movement emulator 2822 provides alternate input to robotic human-skill replication engine 2800 to allow for the creation of a skill execution program without the use of a creator 2711 providing sensor input. Extended simulation validation and calibration module 2823 may be coupled to robotic human-skill replication engine 2800 and provides for extended creator input and provides for real time adjustments to the robotic movements based on 3-D modeling and real time feedback. Computer 2712 comprises standard object algorithms 2824, which are used to control the robotic hands 72/the robotic arms 70 or humanoid robot 2830 to complete tasks using standard objects. Standard objects may include standard tools or utensils or standard equipment, such as a stove or EKG machine. The algorithms in 2824 are precompiled and do not require individual training using robotic human-skills replication.

Computer 2712 is coupled to one or more motion sensing devices 2825. Motion sensing device 2825 may be visual motion sensors, IR motion sensors, tracking sensors, laser monitored sensors, or any other input or recording device that allows computer 2712 to monitor the position of the tracked device in 3-D space. Motion sensing devices 2825 may comprise a single sensor or a series of sensors that include single point sensors, paired transmitters and receivers, paired markers and sensors or any other type of spatial sensor. Robotic human-skill replication system 2700 may comprise standardized objects 2826 Standardized objects 2826 is any standard object found in a standard orientation and position within the robotic human-skill replication system 2700. These may include standardized tools or tools with standardized handles or grips 2826-*a*, standard equipment 2826-*b*, or a standardized space 2826-*c*. Standardized tools 2826-*a* may be those depicted in FIGS. 12A-C and 152-162S, or may be any standard tool, such as a knife, a pot, a spatula, a scalpel, a thermometer, a violin bow, or any other equipment that may be utilized within the specific environment. Standard equipment 2826-*b* may be any standard kitchen equipment, such as a stove, broiler, microwave, mixer, etc. or may be any standard medical equipment, such as a pulse-ox meter, etc. the space itself, 2826-*c* may be standardized such as a kitchen module or a trauma module or recovery module or piano module. By utilizing these standard tools, equipment and spaces, the robotic hands/arms or humanoid robots may more quickly adjust and learn how to perform their desired function within the standardized space.

Also within the robotic human-skill replication system 2700 may be non standard objects 2827. Non standard objects may be for example, cooking ingredients such as meats and vegetables. These non standard sized, shaped and proportioned objects may be located in standard positions and orientations, such as within drawers or bins but the items themselves may vary from item to item.

Visual, audio, and tactile input devices 2829 may be coupled to computer 2712 as [part of the robotic human-skill replication system 2700. Visual, audio, and tactile input devices 2829 may be cameras, lasers, 3-D steroptics, tactile sensors, mass detectors, or any other sensor or input device that allows computer 21712 to determine an object type and position within 3-D space. It may also allow for the detection of the surface of an object and detect objects properties based on touch sound, density or weight.

Robotic arms/hands or humanoid robot 2830 may be directly coupled to computer 2712 or may be connected over a wired or wireless network and may communicate with robotic human-skill replication engine 2800. Robotic arms/hands or humanoid robot 2830 is capable of manipulating and replicating any of the movements performed by creator 2711 or any of the algorithms for using a standard object.

FIG. 73 is a block diagram illustrating a humanoid 2840 with controlling points for skill execution or replication process with standardized operating tools, standardized positions and orientations, and standardized equipment. As seen in FIG. 104, the humanoid 2840 is positioned within a sensor field 2841 as part of the Robotic Human-skill replication system 2700. The humanoid 2840 may be wearing a network of control points or sensors points to enable capture of the movements or minimanipulations made during the execution of a task. Also within the Robotic Human-skill replication system 2700 may be standard tools, 2843, standard equipment 2845 and non standard objects 2842 all arranged in a standard initial position and orientation 2844. As the skills are executed, each step in the skill is recorded within the sensor field 2841. Starting from an initial position humanoid 2840 may execute step 1-step n, all of which is recorded to create a repeatable result that may be implemented by a pair of robotic arms or a humanoid robot. By recording the human creator's movements within the sensor filed 2841, the information may be converted into a series of individual steps 1-n or as a sequence of events to complete a task. Because all the standard and non-standard objects are located and oriented in a standard initial position, the robotic component replicating the human movements is able to accurately and consistently perform the recorded task.

FIG. 75 is a block diagram illustrating one embodiment of a conversion algorithm module 2880 between a human or creator's movements and the robotic replication movements. A movement replication data module 2884 converts the captured data from the human's movements in the recording suite 2874 into a machine—readable and machine—executable language 2886 for instructing the robotic arms and the robotic hands to replicate a skill performed by the human's movement in the robotic robot humanoid replication environment 2878. In the recording suite 2874, the computer 2812 captures and records the human's movements based on the sensors on a glove that the human wears, represented by a plurality of sensors $S_0$, $S_1$, $S_2$, $S_3$, $S_4$, $S_5$, $S_6$ . . . $S_r$, in the vertical columns, and the time increments $t_0$, $t_1$, $t_2$, $t_3$, $t_4$, $t_5$, $t_6$ . . . $t_{end}$ in the horizontal rows, in a table 2888. At time to, the computer 2812 records the xyz coordinate positions from the sensor data received from the plurality of sensors S0, S1, S2, S3, S4, S5, S6 . . . $S_n$. At time $t_1$, the computer 2812 records the xyz coordinate positions from the sensor data received from the plurality of sensors $S_0$, $S_1$, $S_2$, $S_3$, $S_4$, $S_5$, $S_6$ . . . $S_n$. At time $t_2$, the computer 2812 records the xyz coordinate positions from the sensor data received from the plurality of sensors $S_0$, $S_1$, $S_2$, $S_3$, $S_4$, $S_5$, $S_6$ . . . $S_n$. This process continues until the entire skill is completed at time $t_{end}$. The duration for each time units $t_0$, $t_1$, $t_2$, $t_3$, $t_4$, $t_5$, $t_6$ . . . $t_{end}$ is the same. As a result of the captured and recorded sensor data, the table 2888 shows any movements from the sensors $S_0$, $S_1$, $S_2$, $S_3$, $S_4$, $S_5$, $S_6$ . . . $S_n$ in the glove in xyz coordinates, which would indicate the differentials between the xyz coordinate positions for one specific time relative to the xyz coordinate positions for the next specific time. Effectively, the table 2888 records how the human's movements change over the entire skill from the start time, to, to the end time, $t_{end}$. The illustration in this embodiment can be extended to multiple sensors, which the human wears to capture the movements while performing the skill. In the standardized environment 2878, the robotic arms and the robotic hands replicate the recorded skill from the recording suite 2874, which is then converted to robotic instructions, where the robotic arms and the robotic hands replicate the skill of the human according to the timeline 2894. The robotic arms and hands carry out the skill with the same xyz coordinate positions, at the same speed, with the same time increments from the start time, $t_0$, to the end time, $t_{end}$, as shown in the timeline 2894.

In some embodiments a human performs the same skill multiple times, yielding values of the sensor reading, and parameters in the corresponding robotic instructions that vary somewhat from one time to the next. The set of sensor readings for each sensor across multiple repetitions of the skill provides a distribution with a mean, standard deviation and minimum and maximum values. The corresponding variations on the robotic instructions (also called the effector parameters) across multiple executions of the same skill by the human also defines distributions with mean, standard deviation, minimum and maximum values. These distributions may be used to determine the fidelity (or accuracy) of subsequent robotic skills.

In one embodiment the estimated average accuracy of a robotic skill operation is given by:

$$A(C, R) = 1 - \frac{1}{n} \sum_{n=1,\ldots n} \frac{|c_i - p_i|}{\max(|c_{i,t} - p_{i,t}|}$$

Where C represents the set of human parameters ($1^{st}$ through $n^{th}$) and R represents the set of the robotic apparatus 75 parameters (correspondingly ($1^{st}$ through $n^{th}$). The numerator in the sum represents the difference between robotic and human parameters (i.e. the error) and the denominator normalizes for the maximal difference). The sum gives the total normalized cumulative error $$(\text{i.e. } \sum_{n=1,\ldots\, n} \frac{|C_i - p_i|}{\max(|c_{i,t} - p_{i,t}|}),$$

and multiplying by 1/n gives the average error. The complement of the average error corresponds to the average accuracy.

Another version of the accuracy calculation weighs the parameters for importance, where each coefficient (each αi) represents the importance of the $i^{th}$ parameter, the normalized cumulative error is $$\sum_{n=1,\ldots\, n} \frac{\propto_i |C_i - p_i|}{\max(|c_{i,t} - p_{i,t}|})$$

and the estimated average accuracy is given by:

$$A(C, R) = 1 - \left( \sum_{n=1,\ldots\, n} \frac{\propto_i |c_i - p_i|}{(|c_{i,t} - p_{i,t}|} \right) \Big/ \sum_{i=1,\ldots\, n} \propto_i$$

FIG. 76 is a block diagram illustrating the creator movement recording and humanoid replication based on the captured sensory data from sensors aligned on the creator. In the creator movement recording suite 3000, the creator may wear various body sensors D1-Dn with sensors for capturing the skill, where sensor data 3001 are recorded in a table 3002. In this example, the creator is preforming a task with a tool. These action primitives by the creator, as recorded by the sensors and may constitute a mini-manipulation 3002 that take place over time slots 1, 2, 3 and 4. The skill Movement replication data module 2884 is configured to convert the recorded skills file from the creator recording suite 3000 to robotic instructions for operating robotic components such as arms and the robotic hands in the robotic human-skill execution portion 1063 according to a robotic software instructions 3004. The robotic components perform the skill with control signals 3006 for the mini-manipulation, as pre-defined in the mini-manipulation library 116 from a minimanipulation library database 3009, of performing the skill with a tool. The robotic components operate with the same xyz coordinates 3005 and with possible real-time adjustment to the skill by creating a temporary three-dimensional model 3007 of the skill from a real-time adjustment device.

In order to operate a mechanical robotic mechanism such as the ones described in the embodiments of this disclosure, a skilled artisan realizes that many mechanical and control problems need to be addressed, and the literature in robotics describes methods to do just that. The establishment of static and/or dynamic stability in a robotics system is an important consideration. Especially for robotic manipulation, dynamic stability is a strongly desired property, in order to prevent accidental breakage or movements beyond those desired or programmed.

FIG. 77 depicts the overall robotic control platform 3010 for a general-purpose humanoid robot at as a high level description of the functionality of the present disclosure. An universal communication bus 3002 serves an electronic conduit for data, including reading from internal and external sensors 3014, variables and their current values 3016 pertinent to the current state of the robot, such as tolerances in its movements, exact location of its hands, etc. and environment information 3018 such as where the robot is or where are the objects that it may need to manipulation. These input sources make the humanoid robot situationally aware and thus able to carry out its tasks, from direct low level actuator commands 3020 to high level robotic end-to-end task plans from the robotic planner 3022 that can reference a large electronic library of component minimanipulations 3024, which are then interpreted to determine whether their preconditions permit application and converted to machine-executable code from a robotic interpreter module 3026 and then sent as the actual command-and-sensing sequences to the robotic execution module 3028.

In addition to the robotic planning, sensing and acting, the robotic control platform can also communicate with humans via icons, language, gestures, etc. via the robot-human interfaces module 3030, and can learn new minimanipulations by observing humans perform building-block tasks corresponding to the minimanipulations and generalizing multiple observations into minimanipulations, i.e., reliable repeatable sensing-action sequences with preconditions and postconditions by a minimanipulation learning module 3032.

FIG. 78 is a block diagram illustrating a computer architecture 3050 (or a schematic) for generation, transfer, implementation and usage of minimanipulation libraries as part of a humanoid application-task replication process. The present disclosure relates to a combination of software systems, which include many software engines and datasets and libraries, which when combined with libraries and controller systems, results in an approach to abstracting and recombining computer-based task-execution descriptions to enable a robotic humanoid system to replicate human tasks as well as self-assemble robotic execution sequences to accomplish any required task sequence. Particular elements of the present disclosure relate to a Minimanipulation (MM) Generator 3051, which creates Minimanipulation libraries (MMLs) that are accessible by the humanoid controller 3056 in order to create high-level task-execution command sequences that are executed by a low-level controller residing on/with the humanoid robot itself.

The computer architecture 3050 for executing minimanipulations comprises a combination of disclosure of controller algorithms and their associated controller-gain values as well as specified time-profiles for position/velocity and force/torque for any given motion/actuation unit, as well as the low-level (actuator) controller(s) (represented by both hardware and software elements) that implement these control algorithms and use sensory feedback to ensure the fidelity of the prescribed motion/interaction profiles contained within the respective datasets. These are also described in further detail below and so designated with appropriate color-code in the associated FIG. 107.

The MML generator 3051 is a software system comprising multiple software engines GG2 that create both minimanipulation (MM) data sets GG3 which are in turn used to also become part of one or more MML Data bases GG4.

The MML Generator 3051 contains the aforementioned software engines 3052, which utilize sensory and spatial data and higher-level reasoning software modules to generator parameter-sets that describe the respective manipulation tasks, thereby allowing the system to build a complete MM data set 3053 at multiple levels. A hierarchical MM Library (MML) builder is based on software modules that allow the system to decompose the complete task action set in to a sequence of serial and parallel motion-primitives that are categorized from low- to high-level in terms of complexity and abstraction. The hierarchical breakdown is then used by a MML database builder to build a complete MML database 3054.

The previously mentioned parameter sets 3053 comprise multiple forms of input and data (parameters, variables, etc.) and algorithms, including task performance metrics for a successful completion of a particular task, the control algorithms to be used by the humanoid actuation systems, as well as a breakdown of the task-execution sequence and the associated parameter sets, based on the physical entity/subsystem of the humanoid involved as well as the respective manipulation phases required to execute the task successfully. Additionally, a set of humanoid-specific actuator parameters are included in the datasets to specify the controller-gains for the specified control algorithms, as well as the time-history profiles for motion/velocity and force/torque for each actuation device(s) involved in the task execution.

The MML database 3054 comprises multiple low- to higher-level of data and software modules necessary for a humanoid to accomplish any specific low- to high-level task. The libraries not only contain MM datasets generated previously, but also other libraries, such as currently-existing controller-functionality relating to dynamic control (KDC), machine-vision (OpenCV) and other interaction/inter-process communication libraries (ROS, etc.). The humanoid controller 3056 is also a software system comprising the high-level controller software engine 3057 that uses high-level task-execution descriptions to feed machine-executable instructions to the low-level controller 3059 for execution on, and with, the humanoid robot platform.

The high-level controller software engine 3057 builds the application-specific task-based robotic instruction-sets, which are in turn fed to a command sequencer software engine that creates machine-understandable command and control sequences for the command executor GG8. The software engine 3052 decomposes the command sequence into motion and action goals and develops execution-plans (both in time and based on performance levels), thereby enabling the generation of time-sequenced motion (positions & velocities) and interaction (forces and torques) profiles, which are then fed to the low-level controller 3059 for execution on the humanoid robot platform by the affected individual actuator controllers 3060, which in turn comprise at least their own respective motor controller and power hardware and software and feedback sensors.

The low level controller contain actuator controllers which use digital controller, electronic power-driver and sensory hardware to feed software algorithms with required set-points for position/velocity and force/torque, which the controller is tasked to faithfully replicate along a time-stamped sequence, relying on feedback sensor signals to ensure the required performance fidelity. The controller remains in a constant loop to ensure all set-points are achieved over time until the required motion/interaction step(s)/profile(s) are completed, while higher-level task-performance fidelity is also being monitored by the high-level task performance monitoring software module in the command executor 3058, leading to potential modifications in the high-to-low motion/interaction profiles fed to the low-level controller to ensure task-outcomes fall within required performance bounds and meet specified performance metrics.

In a teach-playback controller 3061, a robot is led through a set of motion profiles, which are continuously stored in a time-synched fashion, and then 'played-back' by the low-level controller by controlling each actuated element to exactly follow the motion profile previously recorded. This type of control and implementation are necessary to control a robot, some of which may be available commercially. While the present described disclosure utilizes a low-level controller to execute machine-readable time-synched motion/interaction profiles on a humanoid robot, embodiments of the present disclosure are directed to techniques that are much more generic than teach-motions, more automated and far more capable process, more complexity, allowing one to create and execute a potentially high number of simple to complex tasks in a far more efficient and cost-effective manner.

FIG. 79 depicts the different types of sensor categories 3070 and their associated types for studio-based and robot-based sensory data input categories and types, which would be involved in both the creator studio-based recording step and during the robotic execution of the respective task. These sensory data-sets form the basis upon which minimanipulation action-libraries are built, through a multi-loop combination of the different control actions based on particular data and/or to achieve particular data-values to achieve a desired end-result, whether it be very focused 'sub-routine' (grab a knife, strike a piano-key, paint a line on canvas, etc.) or a more generic MM routine (prepare a salad, play Shubert's #5 piano concerto, paint a pastoral scene, etc.); the latter is achievable through a concatenation of multiple serial and parallel combinations of MM subroutines.

Sensors have been grouped in three categories based on their physical location and portion of a particular interaction that will need to be controlled. Three types of sensors (External 3071, Internal 3073, and Interface 3072) feed their data sets into a data-suite process 3074 that forwards the data over the proper communication link and protocol to the data processing and/or robot-controller engine(s) 3075.

External Sensors 3071 comprise sensors typically located/used external to the dual-arm robot torso/humanoid and tend to model the location and configuration of the individual systems in the world as well as the dual-arm torso/humanoid. Sensor types used for such a suite would include simple contact switches (doors, etc.), electromagnetic (EM) spectrum based sensors for one-dimensional range measurements (IR rangers, etc.), video cameras to generate two-dimensional information (shape, location, etc.), and three-dimensional sensors used to generate spatial location and configuration information using bi-/tri-nocular cameras, scanning lasers and structured light, etc.).

Internal Sensors 3073 are sensors internal to the dual-arm torso/humanoid, mostly measuring internal variables, such as arm/limb/joint positions and velocity, actuator currents and joint- and Cartesian forces and torques, haptic variables (sound, temperature, taste, etc.) binary switches (travel limits, etc.) as well as other equipment-specific presence switches. Additional One-/two- and three-dimensional sensor types (such as in the hands) can measure range/distance, two-dimensional layouts via video camera and even built-in optical trackers (such as in a torso-mounted sensor-head).

Interface-sensors 3072 are those kinds of sensors that are used to provide high-speed contact and interaction movements and forces/torque information when the dual-arm torso/humanoid interacts with the real world during any of its tasks. These are critical sensors as they are integral to the operation of critical MM sub-routine actions such as striking a piano-key in just the right way (duration and force and speed, etc.) or using a particular sequence of finger-motions to grab and achieve a safe grab of a knife to orient it to be able for a particular task (cut a tomato, strike an egg, crush garlic gloves, etc.). These sensors (in order of proximity) can provide information related to the stand-off/contact distance between the robot appendages to the world, the associated capacitance/inductance between the endeffector and the world measurable immediately prior to contact, the actual contact presence and location and its associated surface properties (conductivity, compliance, etc.) as well as associated interaction properties (force, friction, etc.) and any other haptic variables of importance (sound, heat, smell, etc.).

FIG. 80 depicts a block diagram illustrating a system-based minimanipulation library action-based dual-arm and torso topology 3080 for a dual-arm torso/humanoid system 3082 with two individual but identical arms 1 (3090) and 2 (3100), connected through a torso 3110. Each arm 3090 and 3100 are split internally into a hand (3091, 3101) and a limb-joint sections 3095 and 3105. Each hand 3091, 3101 is in turn comprised of a one or more finger(s) 3092 and 3102, a palm 3093 and 3103, and a wrist 3094 and 3104. Each of the limb-joint sections 3095 and 3105 are in turn comprised of a forearm-limb 3096 and 3106, an elbow-joint 3097 and 3107, an upper-arm-limb 3098 and 3108, as well as a shoulder-joint 3099 and 3109.

The interest in grouping the physical layout as shown in FIG. BB is related to the fact that MM actions can readily be split into actions performed mostly by a certain portion of a hand or limb/joint, thereby reducing the parameter-space for control and adaptation/optimization during learning and playback, dramatically. It is a representation of the physical space into which certain subroutine or main minimanipulation (MM) actions can be mapped, with the respective variables/parameters needed to describe each minimanipulation (MM) being both minimal/necessary and sufficient.

A breakdown in the physical space-domain also allows for a simpler breakdown of minimanipulation (MM) actions for a particular task into a set of generic minimanipulation (sub-) routines, dramatically simplifying the building of more complex and higher-level complexity minimanipulation (MM) actions using a combination of serial/parallel generic minimanipulation (MM) (sub-) routines. Note that the physical domain breakdown to readily generate minimanipulation (MM) action primitives (and/or sub-routines), is but one of the two complementary approaches[1] allowing for simplified parametric descriptions of minimanipulation (MM) (sub-) routines to allow one to properly build a set of generic and task-specific minimanipulation (MM) (sub-) routines or motion primitives to build up a complete (set of) motion-library(ies).

FIG. 81 depicts a dual-arm torso humanoid robot system 3120 as a set of manipulation function phases associated with any manipulation activity, regardless of the task to be accomplished, for MM library manipulation-phase combinations and transitions for task-specific action-sequences 3120.

Hence in order to build an ever more complex and higher level set of minimanipulation (MM) motion-primitive routines form a set of generic sub-routines, a high-level minimanipulation (MM) can be thought of as a transition between various phases of any manipulation, thereby allowing for a simple concatenation of minimanipulation (MM) sub-routines to develop a higher-level minimanipulation routine (motion-primitive). Note that each phase of a manipulation (approach, grasp, maneuver, etc.) is itself its own low-level minimanipulation described by a set of parameters involved in controlling motions and forces/torques (internal, external as well as interface variables) involving one or more of the physical domain entities [finger(s), palm, wrist, limbs, joints (elbow, shoulder, etc.), torso, etc.].

Arm 1 3131 of a dual-arm system, can be thought of as using external and internal sensors as defined in FIG. 79, to achieve a particular location 3131 of the endeffector, with a given configuration 3132 prior to approaching a particular target (tool, utensil, surface, etc.), using interface-sensors to guide the system during the approach-phase 3133, and during any grasping-phase 3035 (if required); a subsequent handling-/maneuvering-phase 3136 allows for the endeffector to wield an instrument in it grasp (to stir, draw, etc.). The same description applies to an Arm 2 3140, which could perform similar actions and sequences.

Note that should a minimanipulation (MM) sub-routine action fail (such as needing to re-grasp), all the minimanipulation sequencer has to do is to jump back backwards to a prior phase and repeat the same actions (possibly with a modified set of parameters to ensure success, if needed). More complex sets of actions, such playing a sequence of piano-keys with different fingers, involves a repetitive jumping-loops between the Approach 3133, 3134 and the Contact 3134, 3144 phases, allowing for different keys to be struck in different intervals and with different effect (soft/hard, short/long, etc.); moving to different octaves on the piano key-scale would simply require a phase-backwards to the configuration-phase 3132 to reposition the arm, or possibly even the entire torso 3140 through translation and/or rotation to achieve a different arm and torso orientation 3151.

Arm 2 3140 could perform similar activities in parallel and independent of Arm 3130, or in conjunction and coordination with Arm 3130 and Torso 3150, guided by the movement-coordination phase 315 (such as during the motions of arms and torso of a conductor wielding a baton), and/or the contact and interaction control phase 3153, such as during the actions of dual-arm kneading of dough on a table.

One aspect depicted in FIG. 110, is that minimanipulations (MM) ranging from the lowest-level sub-routine to the more higher level motion-primitives or more complex minimanipulation (MM) motions and abstraction sequences, can be generated from a set of different motions associated with a particular phase which in turn have a clear and well-defined parameter-set (to measure, control and optimize through learning). Smaller parameter-sets allow for easier debugging and sub-routines that an be guaranteed to work, allowing for a higher-level MM routines to be based completely on well-defined and successful lower-level MM sub-routines.

Notice that coupling a minimanipulation (sub-) routine to a not only a set of parameters required to be monitored and controlled during a particular phase of a task-motion as depicted in FIG. 110, but also associated further with a particular physical (set of) units as broken down in FIG. 109, allows for a very powerful set of representations to allow for intuitive minimanipulation (MM) motion-primitives to be generated and compiled into a set of generic and task-specific minimanipulation (MM) motion/action libraries.

FIG. 82 depicts a flow diagram illustrating the process 3160 of minimanipulation Library(ies) generation, for both generic and task-specific motion-primitives as part of the studio-data generation, collection and analysis process. This figure depicts how sensory-data is processed through a set of software engines to create a set of minimanipulation libraries containing datasets with parameter-values, time-histories, command-sequences, performance-measures and -metrics, etc. to ensure low- and higher-level minimanipulation motion primitives result in a successful completion of low-to-complex remote robotic task-executions.

In a more detailed view, it is shown how sensory data is filtered and input into a sequence of processing engines to arrive at a set of generic and task-specific minimanipulation motion primitive libraries. The processing of the sensory data 3162 identified in FIG. 108 involves its filtering-step 3161 and grouping it through an association engine 3163, where the data is associated with the physical system elements as identified in FIG. 109 as well as manipulation-phases as described in FIG. 110, potentially even allowing for user input 3164, after which they are processed through two MM software engines.

The MM data-processing and structuring engine 3165 creates an interim library of motion-primitives based on identification of motion-sequences 3165-1, segmented groupings of manipulation steps 3165-2 and then an abstraction-step 3165-3 of the same into a dataset of parameter-values for each minimanipulation step, where motion-primitives are associated with a set of pre-defined low- to high-level action-primitives 3165-5 and stored in an interim library 3165-4. As an example, process 3165-1 might identify a motion-sequence through a dataset that indicates object-grasping and repetitive back-and-forth motion related to a studio-chef grabbing a knife and proceeding to cut a food item into slices. The motion-sequence is then broken down in 3165-2 into associated actions of several physical elements (fingers and limbs/joints) shown in FIG. 109 with a set of transitions between multiple manipulation phases for one or more arm(s) and torso (such as controlling the fingers to grasp the knife, orienting it properly, translating arms and hands to line up the knife for the cut, controlling contact and associated forces during cutting along a cut-plane, re-setting the knife to the beginning of the cut along a free-space trajectory and then repeating the contact/force-control/trajectory-following process of cutting the food-item indexed for achieving a different slice width/angle). The parameters associated with each portion of the manipulation-phase are then extracted and assigned numerical values in 3165-3, and associated with a particular action-primitive offered by 3165-5 with mnemonic descriptors such as 'grab', 'align utensil', 'cut', 'index-over', etc.

The interim library data 3165-4 is fed into a learning-and-tuning engine 3166, where data from other multiple studio-sessions 3168 is used to extract similar minimanipulation actions and their outcomes 3166-1 and comparing their data sets 3166-2, allowing for parameter-tuning 3166-3 within each minimanipulation group using one or more of standard machine-learning/-parameter-tuning techniques in an iterative fashion 3166-5. A further level-structuring process 3166-4 decides on breaking the minimanipulation motion-primitives into generic low-level sub-routines and higher-level minimanipulations made up of a sequence (serial and parallel combinations) of sub-routine action-primitives.

A following library builder 3167 then organizes all generic minimanipulation routines into a set of generic multi-level minimanipulation action-primitives with all associated data (commands, parameter-sets and expected/required performance metrics) as part of a single generic minimanipulation library 3167-2. A separate and distinct library is then also built as a task-specific library 3167-1 that allows for assigning any sequence of generic minimanipulation action-primitives to a specific task (cooking, painting, etc.), allowing for the inclusion of task-specific datasets which only pertain to the task (such as kitchen data and parameters, instrument-specific parameters, etc.) which are required to replicate the studio-performance by a remote robotic system.

A separate MM library access manager 3169 is responsible for checking-out proper libraries and their associated datasets (parameters, time-histories, performance metrics, etc.) 3169-1 to pass onto a remote robotic replication system, as well as checking back in updated minimanipulation motion primitives (parameters, performance metrics, etc.) 3169-2 based on learned and optimized minimanipulation executions by one or more same/different remote robotic systems. This ensures the library continually grows and is optimized by a growing number of remote robotic execution platforms.

FIG. 83 depicts a block diagram illustrating the process of how a remote robotic system would utilize the minimanipulation (MM) library(ies) to carry out a remote replication of a particular task (cooking, painting, etc.) carried out by an expert in a studio-setting, where the expert's actions were recorded, analyzed and translated into machine-executable sets of hierarchically-structured minimanipulation datasets (commands, parameters, metrics, time-histories, etc.) which when downloaded and properly parsed, allow for a robotic system (in this case a dual-arm torso/humanoid system) to faithfully replicate the actions of the expert with sufficient fidelity to achieve substantially the same end-result as that of the expert in the studio-setting.

At a high level, this is achieved by downloading the task-descriptive libraries containing the complete set of minimanipulation datasets required by the robotic system, and providing them to a robot controller for execution. The robot controller generates the required command and motion sequences that the execution module interprets and carries out, while receiving feedback from the entire system to allow it to follow profiles established for joint and limb positions and velocities as well as (internal and external) forces and torques. A parallel performance monitoring process uses task-descriptive functional and performance metrics to track and process the robot's actions to ensure the required task-fidelity. A minimanipulation learning-and-adaptation process is allowed to take any minimanipulation parameter-set and modify it should a particular functional result not be satisfactory, to allow the robot to successfully complete each task or motion-primitive. Updated parameter data is then used to rebuild the modified minimanipulation parameter set for re-execution as well as for updating/rebuilding a particular minimanipulation routine, which is provided back to the original library routines as a modified/re-tuned library for future use by other robotic systems. The system monitors all minimanipulation steps until the final result is achieved and once completed, exits the robotic execution loop to await further commands or human input.

In specific detail the process outlined above, can be detailed as the sequences described below. The MM library 3170, containing both the generic and task-specific MM-libraries, is accessed via the MM library access manager 3171, which ensures all the required task-specific data sets 3172 required for the execution and verification of interim/end-result for a particular task are available. The data set includes at least, but is not limited to, all necessary kinematic/dynamic and control parameters, time-histories of pertinent variables, functional and performance metrics and values for performance validation and all the MM motion libraries relevant to the particular task at hand.

All task-specific datasets 3172 are fed to the robot controller 3173. A command sequencer 3174 creates the proper sequential/parallel motion sequences with an assigned index-value 'I', for a total of 'i=N' steps, feeding each sequential/parallel motion command (and data) sequence to the command executor 3175. The command executor 3175 takes each motion-sequence and in turn parses it into a set of high-to-low command signals to actuation and sensing systems, allowing the controllers for each of these systems to ensure motion-profiles with required position/velocity and force/torque profiles are correctly executed as a function of time. Sensory feedback data 3176 from the (robotic) dual-arm torso/humanoid system is used by the profile-following function to ensure actual values track desired/commanded values as close as possible.

A separate and parallel performance monitoring process 3177 measures the functional performance results at all times during the execution of each of the individual minimanipulation actions, and compares these to the performance metrics associated with each minimanipulation action and provided in the task-specific minimanipulation data set provided in 3172. Should the functional result be within acceptable tolerance limits to the required metric value(s), the robotic execution is allowed to continue, by way of incrementing the minimanipulation index value to 'i++', and feeding the value and returning control back to the command-sequencer process 3174, allowing the entire process to continue in a repeating loop. Should however the performance metrics differ, resulting in a discrepancy of the functional result value(s), a separate task-modifier process 3178 is enacted.

The minimanipulation task-modifier process 3178 is used to allow for the modification of parameters describing any one task-specific minimanipulation, thereby ensuring that a modification of the task-execution steps will arrive at an acceptable performance and functional result. This is achieved by taking the parameter-set from the 'offending' minimanipulation action-step and using one or more of multiple techniques for parameter-optimization common in the field of machine-learning, to rebuild a specific minimanipulation step or sequence $MM_i$ into a revised minimanipulation step or sequence $MM_i$*. The revised step or sequence $MM_i$* is then used to rebuild a new command-0sequence that is passed back to the command executor 3175 for re-execution. The revised minimanipulation step or sequence $MM_i$* is then fed to a re-build function that re-assembles the final version of the minimanipulation dataset, that led to the successful achievement of the required functional result, so it may be passed to the task- and parameter monitoring process 3179.

The task- and parameter monitoring process 3179 is responsible for checking for both the successful completion of each minimanipulation step or sequence, as well as the final/proper minimanipulation dataset considered responsible for achieving the required performance-levels and functional result. As long as the task execution is not completed, control is passed back to the command sequencer 3174. Once the entire sequences have been successfully executed, implying 'i=N', the process exits (and presumably awaits further commands or user input. For each sequence-counter value 'I', the monitoring task 3179 also forwards the sum of all rebuilt minimanipulation parameter sets $\Sigma(MM_i^*)$ back to the MM library access manager 3171 to allow it to update the task-specific library(ies) in the remote MM library 3170 shown in FIG. 111. The remote library then updates its own internal task-specific minimanipulation representation [setting $\Sigma(MM_{i,new})=\Sigma(MM_i^*)$], thereby making an optimized minimanipulation library available for all future robotic system usage.

FIG. 84 depicts a block diagram illustrating an automated minimanipulation parameter-set building engine 3180 for a minimanipulation task-motion primitive associated with a particular task. It provides a graphical representation of how the process of building (a) (sub-) routine for a particular minimanipulation of a particular task is accomplished based on using the physical system groupings and different manipulation-phases, where a higher-level minimanipulation routine can be built up using multiple low-level minimanipulation primitives (essentially sub-routines comprised of small and simple motions and closed-loop controlled actions) such as grasp, grasp the tool, etc. This process results in a sequence (basically task- and time-indexed matrices) of parameter values stored in multi-dimensional vectors (arrays) that are applied in a stepwise fashion based on sequences of simple maneuvers and steps/actions. In essence this figure depicts an example for the generation of a sequence of minimanipulation actions and their associated parameters, reflective of the actions encapsulated in the MM Library Processing & Structuring Engine 3160 from FIG. 112.

The example depicted in FIG. 113 shows a portion of how a software engine proceeds to analyze sensory-data to extract multiple steps from a particular studio data set. In this case it is the process of grabbing a utensil (a knife for instance) and proceeding to a cutting-station to grab or hold a particular food-item (such as a loaf of bread) and aligning the knife to proceed with cutting (slices). The system focuses on Arm 1 in Step 1., which involves the grabbing of a utensil (knife), by configuring the hand for grabbing (1.a.), approaching the utensil in a holder or on a surface (1.b.), performing a pre-determined set of grasping-motions (including contact-detection and -force control not shown but incorporated in the GRASP minimanipulation step 1.c.) to acquire the utensil and then move the hand in free-space to properly align the hand/wrist for cutting operations. The system thereby is able to populate the parameter-vectors (1 thru 5) for later robotic control. The system returns to the next step that involves the torso in Step 2., which comprises a sequence of lower-level minimanipulations to face the work (cutting) surface (2.a.), align the dual-arm system (2.b.) and return for the next step (2.c.). In the next Step 3., the Arm2 (the one not holding the utensil/knife), is commanded to align its hand (3.a.) for a larger-object grasp, approach the food item (3.b.; involves possibly moving all limbs and joints and wrist; 3.c.), and then move until contact is made (3.c.) and then push to hold the item with sufficient force (3.d.), prior to aligning the utensil (3.f.) to allow for cutting operations after a return (3.g.) and proceeding to the next step(s) (4. and so on).

The above example illustrates the process of building a minimanipulation routine based on simple sub-routine motions (themselves also minimanipulations) using both a physical entity mapping and a manipulation-phase approach which the computer can readily distinguish and parameterize using external/internal/interface sensory feedback data from the studio-recording process. This minimanipulation library building-process for process-parameters generates 'parameter-vectors' which fully describe a (set of) successful minimanipulation action(s), as the parameter vectors include sensory-data, time-histories for key variables as well as performance data and metrics, allowing a remote robotic replication system to faithfully execute the required task(s). The process is also generic in that it is agnostic to the task at hand (cooking, painting, etc.), as it simply builds minimanipulation actions based on a set of generic motion- and action-primitives. Simple user input and other pre-determined action-primitive descriptors can be added at any level to more generically describe a particular motion-sequence and to allow it to be made generic for future use, or task-specific for a particular application. Having minimanipulation datasets comprised of parameter vectors, also allows for continuous optimization through learning, where adaptions to parameters are possible to improve the fidelity of a particular minimanipulation based on field-data generated during robotic replication operations involving the application (and evaluation) of minimanipulation routines in one or more generic and/or task-specific libraries.

FIG. 85A is a block diagram illustrating a data-centric view of the robotic architecture (or robotic system), with a central robotic control module contained in the central box, in order to focus on the data repositories. The central robotic control module 3191 contains working memory needed by all the processes disclosed in <fill in>. In particular the Central Robotic Control establishes the mode of operation of the Robot, for instance whether it is observing and learning new minimanipulations, from an external teacher, or executing a task or in yet a different processing mode.

A working memory 1 3192 contains all the sensor readings for a period of time until the present: a few seconds to a few hours—depending on how much physical memory, typical would be about 60 seconds. The sensor readings come from the on-board or off-board robotic sensors and may include video from cameras, ladar, sonar, force and pressure sensors (haptic), audio, and/or any other sensors. Sensor readings are implicitly or explicitly time-tagged or sequence-tagged (the latter means the order in which the sensor readings were received).

A working memory 2 3193 contains all of the actuator commands generated by the Central Robotic Control and either passed to the actuators, or queued to be passed to same at a given point in time or based on a triggering event (e.g. the robot completing the previous motion). These include all the necessary parameter values (e.g. how far to move, how much force to apply, etc.).

A first database (database 1) 3194 contains the library of all minimanipulations (MM) known to the robot, including for each MM, a triple <PRE, ACT, POST>, where PRE=$\{s_1, s_2, \ldots, s_n\}$ is a set of items in the world state that must be true before the actions ACT=$[a_1, a_2, \ldots, a_k]$ can take place, and result in a set of changes to the world state denoted as POST=$\{p_1, p_2, \ldots, p_m\}$. In a preferred embodiment, the MMs are index by purpose, by sensors and actuators they involved, and by any other factor that facilitates access and application. In a preferred embodiment each POST result is associated with a probability of obtaining the desired result if the MM is executed. The Central Robotic Control both accesses the MM library to retrieve and execute MM's and updates it, e.g. in learning mode to add new MMs.

A second database (database 2) 3195 contains the case library, each case being a sequence of minimanipulations to perform a give task, such as preparing a given dish, or fetching an item from a different room. Each case contains variables (e.g. what to fetch, how far to travel, etc.) and outcomes (e.g. whether the particular case obtained the desired result and how close to optimal—how fast, with or without side-effects etc.). The Central Robotic Control both accesses the Case Library to determine if has a known sequence of actions for a current task, and updates the Case Library with outcome information upon executing the task. If in learning mode, the Central Robotic Control adds new cases to the case library, or alternately deletes cases found to be ineffective.

A third database (database 3) 3196 contains the object store, essentially what the robot knows about external objects in the world, listing the objects, their types and their properties. For instance, an knife is of type "tool" and "utensil" it is typically in a drawer or countertop, it has a certain size range, it can tolerate any gripping force, etc. An egg is of type "food", it has a certain size range, it is typically found in the refrigerator, it can tolerate only a certain amount of force in gripping without breaking, etc. The object information is queried while forming new robotic action plans, to determine properties of objects, to recognize objects, and so on. The object store can also be updated when new objects introduce and it can update its information about existing objects and their parameters or parameter ranges.

A fourth database (database 4) 3197 contains information about the environment in which the robot is operating, including the location of the robot, the extent of the environment (e.g. the rooms in a house), their physical layout, and the locations and quantities of specific objects within that environment. Database 4 is queried whenever the robot needs to update object parameters (e.g. locations, orientations), or needs to navigate within the environment. It is updated frequently, as objects are moved, consumed, or new objects brought in from the outside (e.g. when the human returns form the store or supermarket).

FIG. 85B is a block diagram illustrating examples of various minimanipulation data formats in the composition, linking and conversion of minimanipulation robotic behavior data. In composition, high-level MM behavior descriptions in a dedicated/abstraction computer programming language are based on the use of elementary MM primitives which themselves may be described by even more rudimentary MM in order to allow for building behaviors from ever-more complex behaviors.

An example of a very rudimentary behavior might be 'finger-curl', with a motion primitive related to 'grasp' that has all 5 fingers curl around an object, with a high-level behavior termed 'fetch utensil' that would involve arm movements to the respective location and then grasping the utensil with all five fingers. Each of the elementary behaviors (incl. the more rudimentary ones as well) have a correlated functional result and associated calibration variables describing and controlling each.

Linking allows for behavioral data to be linked with the physical world data, which includes data related to the physical system (robot parameters and environmental geometry, etc.), the controller (type and gains/parameters) used to effect movements, as well as the sensory-data (vision, dynamic/static measures, etc.) needed for monitoring and control, as well as other software-loop execution-related processes (communications, error-handling, etc.).

Conversion takes all linked MM data, from one or more databases, and by way of a software engine, termed the Actuator Control Instruction Code Translator & Generator, thereby creating machine-executable (low-level) instruction code for each actuator ($A_1$ thru $A_n$) controller (which themselves run a high-bandwidth control loop in position/velocity and/or force/torque) for each time-period ($t_1$ thru $t_m$), allowing for the robot system to execute commanded instruction in a continuous set of nested loops.

FIG. 86 is a block diagram illustrating one perspective on the different levels of bidirectional abstractions 3200 between the robotic hardware technical concepts 3206, the robotic software technical concepts 3208, the robotic business concepts 3202, and mathematical algorithms 3204 for carrying the robotic technical concepts. If the robotic concept of the present disclosure is viewed as vertical and horizontal concepts, the robotic business concept comprises business applications of the robotic kitchen at the top level 3202, mathematical algorithm 3204 of the robotic concept at the bottom level, and robotic hardware technical concepts 3206, and robotic software technical concepts 3208 between the robotic business concepts 3202 and mathematical algorithm 3204. Practically speaking, each of the levels in the robotic hardware technical concept, robotic software technical concept, mathematical algorithm, and business concepts interact with any of the levels bidirectionally as shown in FIG. 115. For example, a computer processor for processing software minimanipulations from a database in order to prepare a food dish by sending command instructions to the actuators for controlling the movements of each of the robotic elements on a robot to accomplish an optimal functional result in preparing the food dish. Details of the horizontal perspective of the robotic hardware technical concepts and robotic software technical concepts are described throughout the present disclosure, for example as illustrated in FIG. 100 through FIG. 114.

FIG. 87A is a diagram illustrating one embodiment of a humanoid type robot 3220. Humanoid robot 3220 may have a head 3222 with a camera to receive images of external environment and the ability to detect and detect target object's location, and movement. The humanoid robot 3220 may have a torso 3224 with sensors on body to detect body angle and motion, which may comprise a global positioning sensor or other locational sensor. The humanoid robot 3220 may have one or more dexterous hands 72, fingers and palm with a various sensors (laser, stereo cameras) incorporated into the hand and fingers. The hands 72 are capable of precise hold, grasp, release, finger pressing movements to perform subject expert human skills such as cooking, musical instrument playing, painting, etc. The humanoid robot 3220 may optionally comprise legs 3226 with an actuator on the legs to control speed of operation. Each leg 3226 may have a number of degrees of freedom (DOF) to perform human like walking running, and jumping movements. Similarly, the humanoid robot 3220 may have a foot 3228 with the capability to moving through a variety of terrains and environments.

Additionally, humanoid robot 3220 may have a neck 3230 with a number of DOF for forward/backward, up/down, left/right and rotation movements. It may have shoulder 3232 with a number of DOF for forward/backward, rotation movements, elbow with a number of DOF for forward/backward movements, and wrists 314 with a number of DOF for forward/backward, rotation movements. The humanoid robot 3220 may have hips 3234 with a number of DOF for forward/backward, left/right and rotation movements, knees 3236 with a number of DOF for forward/backward movements, and ankles 3236 with a number of DOF for forward/backward and left/right movements. The humanoid robot 3220 may house a battery 3238 or other power source to allow it to move untethered about its operational space. The battery 3238 may be rechargeable and may be any type of battery or other power source known.

FIG. 87B is a block diagram illustrating one embodiment of humanoid type robot 3220 with a plurality of gyroscope 3240 installed in the robot body in the vicinity or at the location of respective joints. As an orientation sensor, the rotatable gyroscope 3240 shows the different angles for the humanoid to make angular movements with high degree of complexity, such as stooping or sitting down. The set of gyroscopes 3240 provides a method and feedback mechanism to maintain dynamic stability by the whole humanoid robot, as well as individual parts of the humanoid robot 3220. Gyroscopes 3240 may provide real time output data, such as such as euler angles, attitude quaternion, magnetometer, accelerometer, gyro data, GPS altitude, position and velocity.

FIG. 87C is graphical diagram illustrating the creator recording devices on a humanoid, including a body sensing suit, an arm exoskeleton, head gear, and sensing glove. In order to capture a skill and record the human creator's movements, in an embodiment, the creator can wear a body sensing suit or exoskeleton 3250. The suit may include head gear 3252, extremity exoskeletons, such as arm exoskeleton 3254, and gloves 3256. The exoskeletons may be covered with a sensor network 3258 with any numbers of sensor and reference points. These sensors and reference points allow creator recording devices 3260 to capture the creator's movements from the sensor network 3258 as long as the creator remains within the field of the creator recording devices 3260. Specifically, if the creator moves his hand while wearing glove 3256, the position in 3D space with be captured by the numerous sensor data points D1, D2 . . . Dn. Because of the body suit 3250 or the head gear 3252, the creator's movement s are not limited to the head but encompass the entire creator. In this manner, each movement may be broken down and categorized as a minimanipulation as part of the overall skill.

FIG. 88 is a block diagram illustrating a robotic human-skill subject expert electronic IP minimanipulation library 2100. Subject/skill library 2100 comprises any number of minimanipulation skills in a file or folder structure. The library may be arranged in any number of ways including but not limited to, by skill, by occupation, by classification, by environment, or any other catalog or taxonomy. It may be categorized using flat files or in a relational manner and may comprise an unlimited number of folder, and subfolder and a virtually unlimited number of libraries and minimanipulations. As seen in FIG. 118, the library comprises several module IP human-skill replication libraries 56, 2102, 2104, 2106, 3270, 3272, 3274, covering topics such as human culinary skills 56, human painting skills 2102, human musical instrument skills 2104, human nursing skills 2106, human house keeping skills 3270, and human rehab/therapist skills 3272. Additionally and/or alternatively, the robotic human-skill subject matter electronic IP minimanipulation library 2100 may also comprise basic human motion skills such as walking, running, jumping, stair climbing, etc. Although not a skill per se, creating minimanipulation libraries of basic human motions 3274 allows a humanoid robot to function and interact in a real world environment in an easier more human like manner.

FIG. 89 is a block diagram illustrating the creation process of an electronic library of general minimanipulations 3280 for replacing human-hand-skill movements. In this illustration, one general minimanipulation 3290 is described with respect to FIGS. 119A-B. The minimanipulation MM1 3292 produces a functional result 3294 for that particular minimanipulation (e.g., successfully hitting a 1st object with a 2nd object). Each minimanipulation can be broken down into sub manipulations or steps, for example, MM1 3292 comprises one or more minimanipulations (sub-minimanipulations), a minimanipulation MM1.1 3296 (e.g., pick up and hold object 1), a minimanipulation MM1.2 3310 (e.g., pick up and hold a 2nd object), a minimanipulation MM1.3 3314 (e.g., strike the 1st object with the 2nd object), a minimanipulation MM1.4n 3318 (e.g., open the 1st object). Additional sub-minimanipulations may be added or subtracted that are suitable for a particular minimanipulation that achieves a particular functional result. The definition of a minimanipulation depends in part how it is defined and the granularity used to define such a manipulation, i.e., whether a particular minimanipulation embodies several sub-minimanipulations, or if what was characterized as a sub-minimanipulation may also be defined as a broader minimanipulation in another context. Each of the sub-minimanipulations has a corresponding functional result, where the sub-minimanipulation MM1.1 3296 obtains a sub-functional result 3298, the sub-minimanipulation MM1.2 3310 obtains a sub-functional result 3312, the sub-minimanipulation MM1.3 3314 obtains a sub-functional result 3316, and the sub-minimanipulation MM1.4n 3318 obtains a sub-functional result 3294. Similarly, the definition of a functional result depends in part how it is defined, whether a particular functional result embodies several functional results, or if what was characterized as a sub-functional-result may also be defined as a broader functional result is another context. Collectively, the sub-minimanipulation MM1.1 3296, the sub-minimanipulation MM1.2 3310, sub-minimanipulation MM1.3 3314, the sub-minimanipulation MM1.4n 3318 accomplishes the overall functional result 3294. In one embodiment, the overall functional result 3294 is the same as the functional result 3319 that is associated with the last sub-minimanipulation 3318.

Various possible parameters for each minimanipulation 1.1-1.n are tested to find the best way to execute a specific movement. For example minimanipulation 1.1 (MM1.1) may be holding an object or playing a chord on a piano. For this step of the overall minimanipulation 3290, all the various sub-minimanipulations for the various parameters are explored that complete step 1.1. That is, the different positions, orientations, and ways to hold the object, are tested to find an optimal way to hold the object. How does the robotic arm, hand or humanoid hold their fingers, palms, legs, or any other robotic part during the operation. All the various holding positions and orientations are tested. Next, the robotic hand, arm, or humanoid may pick up a second object to complete minimanipulation 1.2. The 2nd object, i.e., a knife may be picked up and all the different positions, orientations, and the way to hold the object may be tested and explored to find the optimal way to handle the object. This continues until minimanipulation 1.n is completed and all the various permutations and combinations for performing the overall minimanipulation are completed. Consequently, the optimal way to execute the mini-manipulation 3290 is stored in the library database of mini-manipulations broken down into sub-minimanipulations 1.1-1.n. The saved minimanipulation then comprise the best way to perform the steps, of the desired task, i.e., the best way to hold the first object, the best way to hold the 2nd object, the best way to strike the 1st object with the second object, etc. These top combinations are saved as the best way to perform the overall minimanipulation 3290.

To create the minimanipulation that results in the best way to complete the task, multiple parameter combinations are tested to identify an overall set of parameters that ensure the desired functional result is achieved. The teaching/learning process for the robotic apparatus 75 involves multiple and repetitive tests to identify the necessary parameters to achieve the desired final functional result.

These tests may be performed over varying scenarios. For example, the size of the object can vary. The location at which the object is found within the workspace, can vary. The second object may be at different locations. The minimanipulation must be successful in all of these variable circumstances. Once the learning process has been completed, results are stored as a collection of action primitives that together are known to accomplish the desired functional result.

FIG. 90 is a block diagram illustrating performing a task 3330 by robot by execution in multiple stages 3331-3333 with general minimanipulations. When action plans require sequences of minimanipulations as in FIGS. 119A-B, in one embodiment the estimated average accuracy of a robotic plan in terms of achieving its desired result is given by:

$$A(G, P) = 1 - \frac{1}{n}\sum_{n=1,\ldots n}\frac{|g_i - p_i|}{\max(|g_{i,t} - p_{i,t}|}$$

where G represents the set of objective (or "goal") parameters (1st through nth) and P represents the set of Robotic apparatus 75 parameters (correspondingly (1st through nth). The numerator in the sum represents the difference between robotic and goal parameters (i.e. the error) and the denominator normalizes for the maximal difference). The sum gives the total normalized cumulative error $$(\text{i.e. } \sum_{n=1,\ldots n}\frac{|g_i - p_i|}{\max(|g_{i,t} - p_{i,t}|}),$$

and multiplying by 1/n gives the average error. The complement of the average error (i.e. subtracting it from 1) corresponds to the average accuracy.

In another embodiment the accuracy calculation weighs the parameters for their relative importance, where each coefficient (each αi) represents the importance of the ith parameter, the normalized cumulative error is $$\sum_{n=1,\ldots n}\frac{\alpha_1|g - p_i|}{\max(|g_{i,t}\, p_{i,t}|}$$

and the estimated average accuracy is given by:

$$A(G, P) = 1 - \left(\sum_{n=1,\ldots n}\frac{\alpha_i|g - p_i|}{\max(|g_{i,t} - p_{i,t}|}\right) \Big/ \sum_{i=1,\ldots n}\alpha_i$$

In FIG. 90, task 3330 may be broken down into stages which each need to be completed prior to the next stage. For example, stage 3331 must complete the stage result **3331*d* before advancing onto stage 3332. Additionally and/or alternatively, stages 3331 and 3332 may proceed in parallel. Each minimanipulation can be broken down into a series of action primitives which may result in a functional result for example, in stage $S_1$ all the action primitives in the first defined minimanipulation 3331*a* must be completed yielding in a functional result 3331*a*' before proceeding to the second predefined minimanipulation 3331*b* (MM1.2). This in turn yields the functional result 3331*b*' etc. until the desired stage result 3331*d* is achieved. Once stage 1 is completed, the task may proceed to stage S2 3332. At this point, the action primitives for stage S2 are completed and so on until the task 3330** is completed. The ability to perform the steps in a repetitive fashion yields a predictable and repeatable way to perform the desired task.

Figure 120:
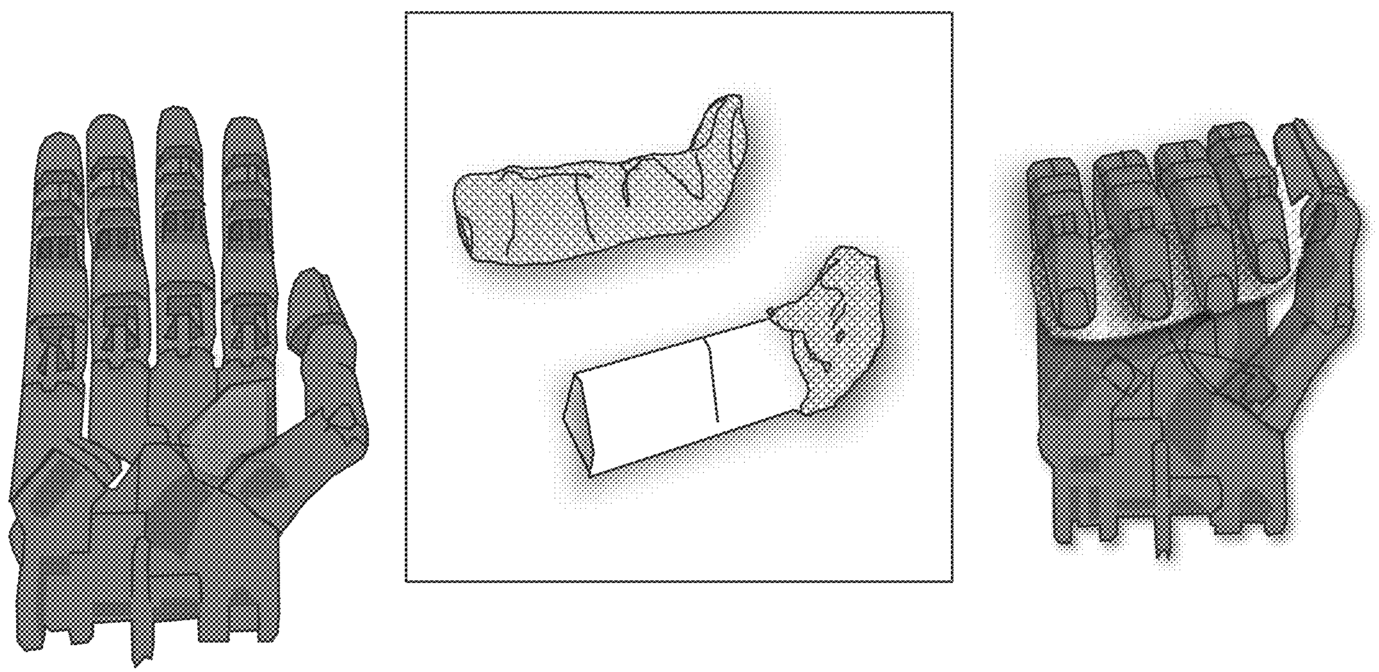
Figure 121:
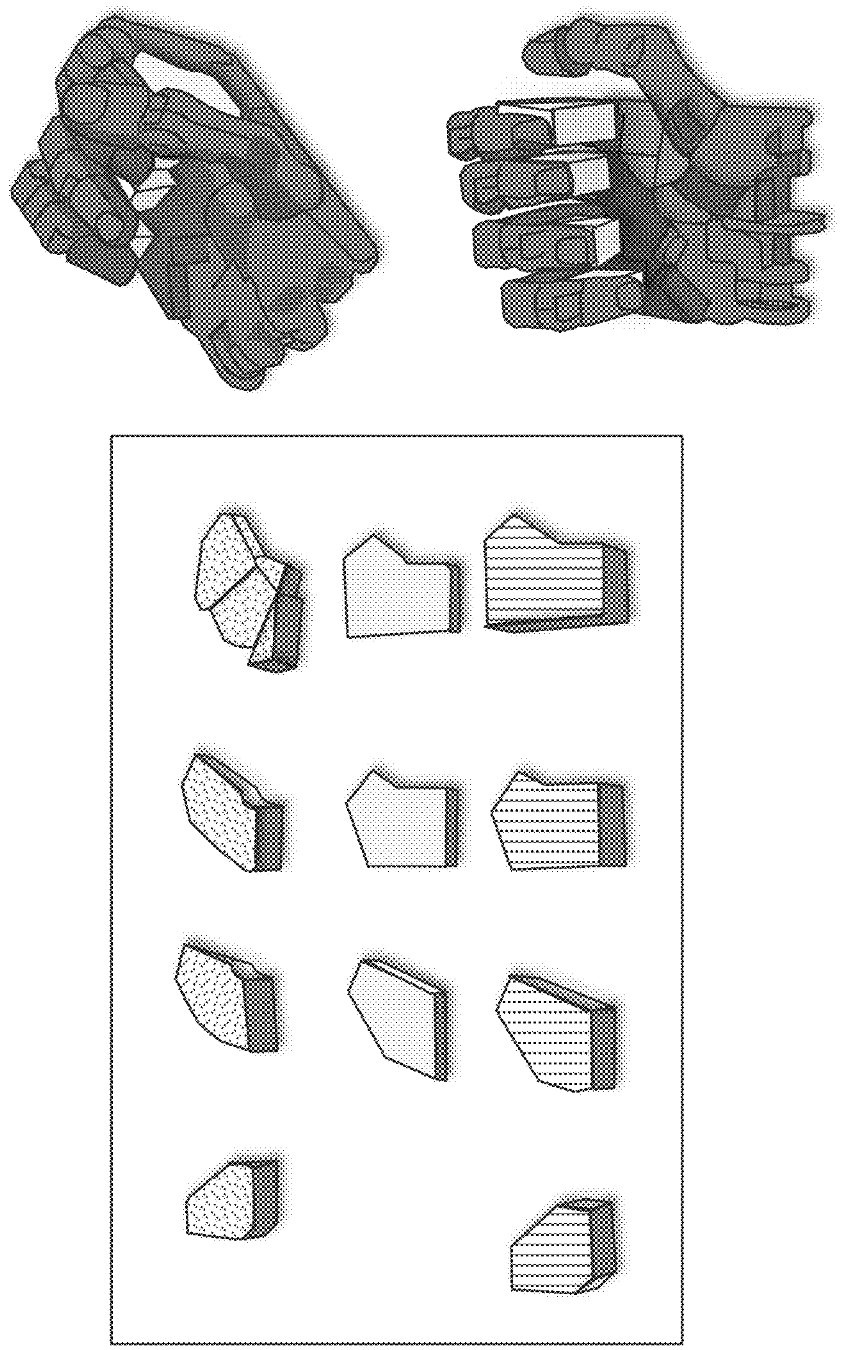

FIG. 91 is a block diagram illustrating the real-time parameter adjustment during the execution phase of minimanipulations in accordance with the present disclosure. The performance of a specific task may require adjustments to the stored minimanipulations to replicate actual human skills and movements. In an embodiment, the real-time adjustments may be necessary to address variations in objects. Additionally and or alternatively, adjustments may be required to coordinate left and right hand, arm, or other robotic parts movements. Further, variations in an object requiring a minimanipulation in the right hand may affect the minimanipulation required by the left hand or palm. For example, if a robotic hand is attempting to peel fruit that it grasps with the right hand, the minimanipulations required by the left hand will be impacted by the variations of the object held in the right hand. As seen in FIG. 120, each parameter to complete the minimanipulation to achieve the functional result may require different parameters for the left hand. Specifically, each change in a parameter sensed by the right hand as a result of a parameter in the first object make impact the parameters used by the left hand and the parameters of the object in the left hand.

In an embodiment, in order to complete minimanipulations 1-.1-1.3, to yield the functional result, right hand and left hand must sense and receive feedback on the object and the state change of the object in the hand or palm, or leg. This sensed state change may result in an adjustment to the parameters that comprise the minimanipulation. Each change in one parameter may yield in a change to each subsequent parameter and each subsequent required minimanipulation until the desired tasks result is achieved.

FIG. 92 is a block diagram illustrating a set of minimanipulations for making sushi in accordance with the present disclosure. As can be seen from the diagrams of FIG. 92, the functional result of making Nigiri Sushi can be divided into a series of minimanipulations 3351-3355. Each minimanipulation can be broken down further into a series of sub minimanipulations. In this embodiment, the functional result requires about five minimanipulations, which in turn may require additional sub-minimanipulations.

Figure 122:
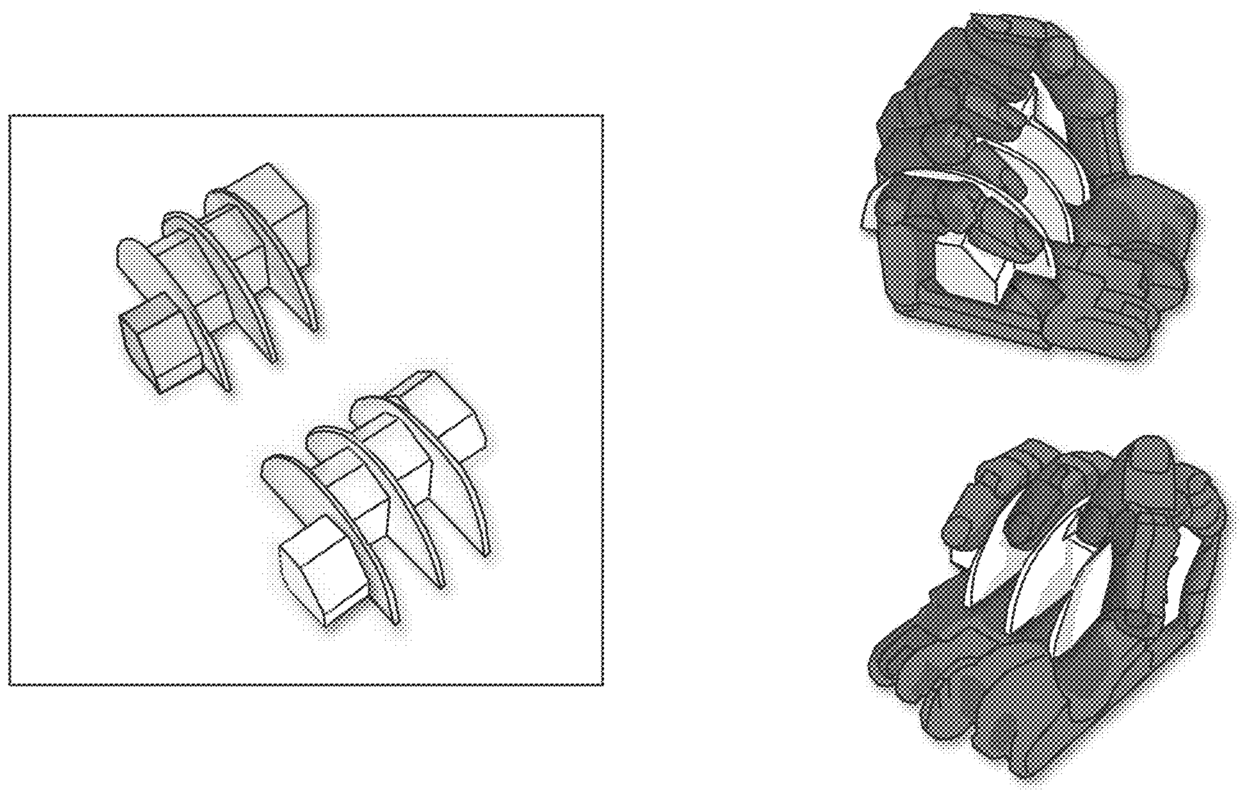
Figure 123:
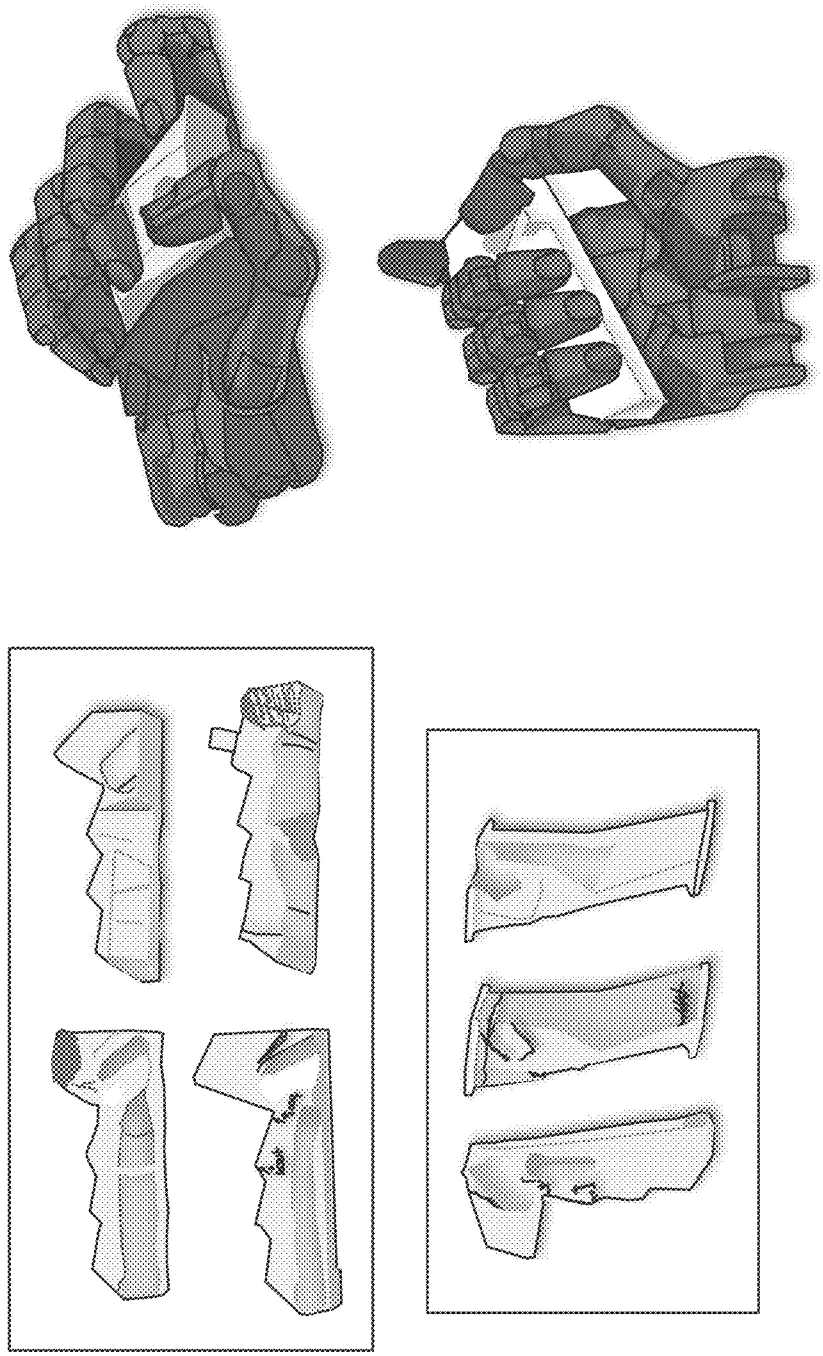
Figure 124:
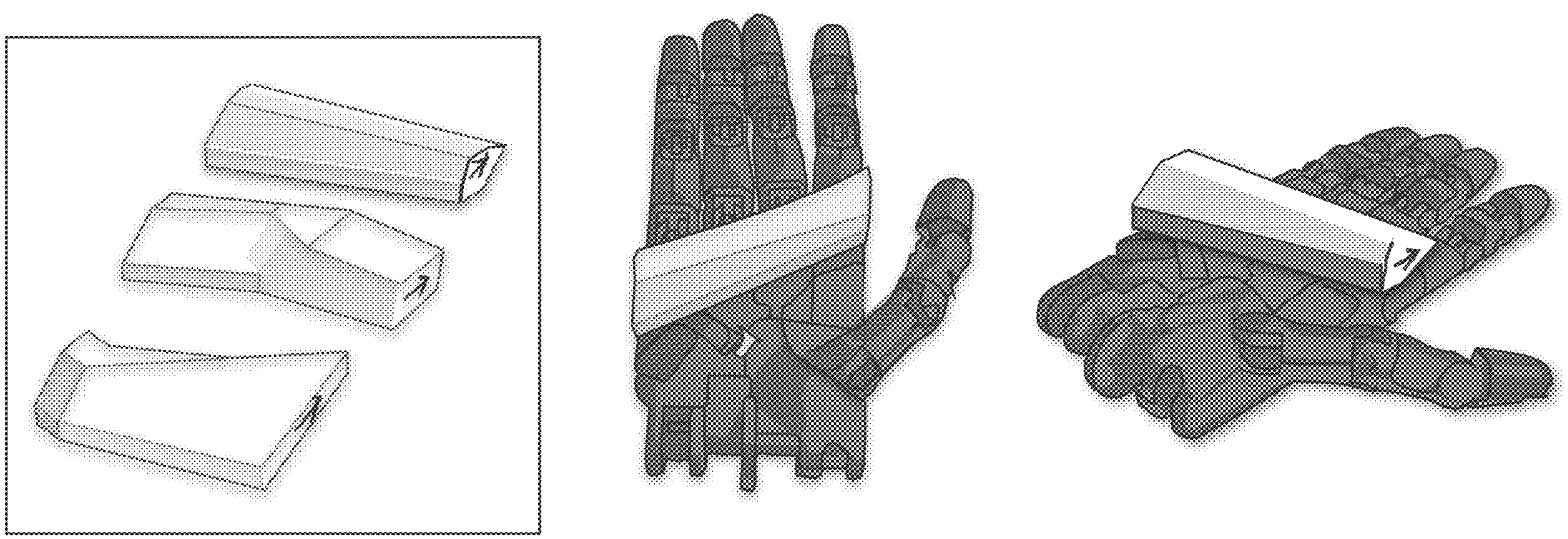

FIG. 93 is a block diagram illustrating a first minimanipulation 3351 of cutting fish in the set of minimanipulations for making sushi in accordance with the present disclosure. For each minimanipulation 3351*a* and 3351*b*, the time, position, and locations of standard ad non-standard objects must be captured and recorded. The initially captured values in the task may be captured in the tasks process or defined by a creator or by obtaining three-dimensional volume scanning of the real time process. In FIG. 122, the first minimanipulation, taking a piece of fish from a container and lying it on a cutting board requires the starting time and position and starting time for the left and right hand to remove the fish from the container and place it on the board. This requires a recording of finger position, pressure, orientation, and relationship to the other fingers, palm, and other hand to yield a coordinated movement. This also requires the determination of position and orientations of both standard and non-standard objects. For example, in this embodiment, the fish fillet is a non-standard object and may be different size, texture, and firmness weight from piece to piece. Its position within its storage container or location may vary and be non-standard as well. Standard objects may be a knife, its position and location, a cutting board, a container and their respective positions.

The second sub-minimanipulation in step 3351 may be 3351*b*. The step 3351*b* requires positioning the standard knife object in a correct orientation and applying the correct pressure, grasp, and orientation to slice the fish on the board. Simultaneously, the left hand, leg, pal, etc. is required to be performing coordinate steps to complement and coordinate the completion of the sub-minimanipulation. All these starting positions, times, and other sensor feedbacks and signals need to be captured and optimized to ensure a successful implementation of the action primitive to complete the sub-minimanipulation.

Figure 125:
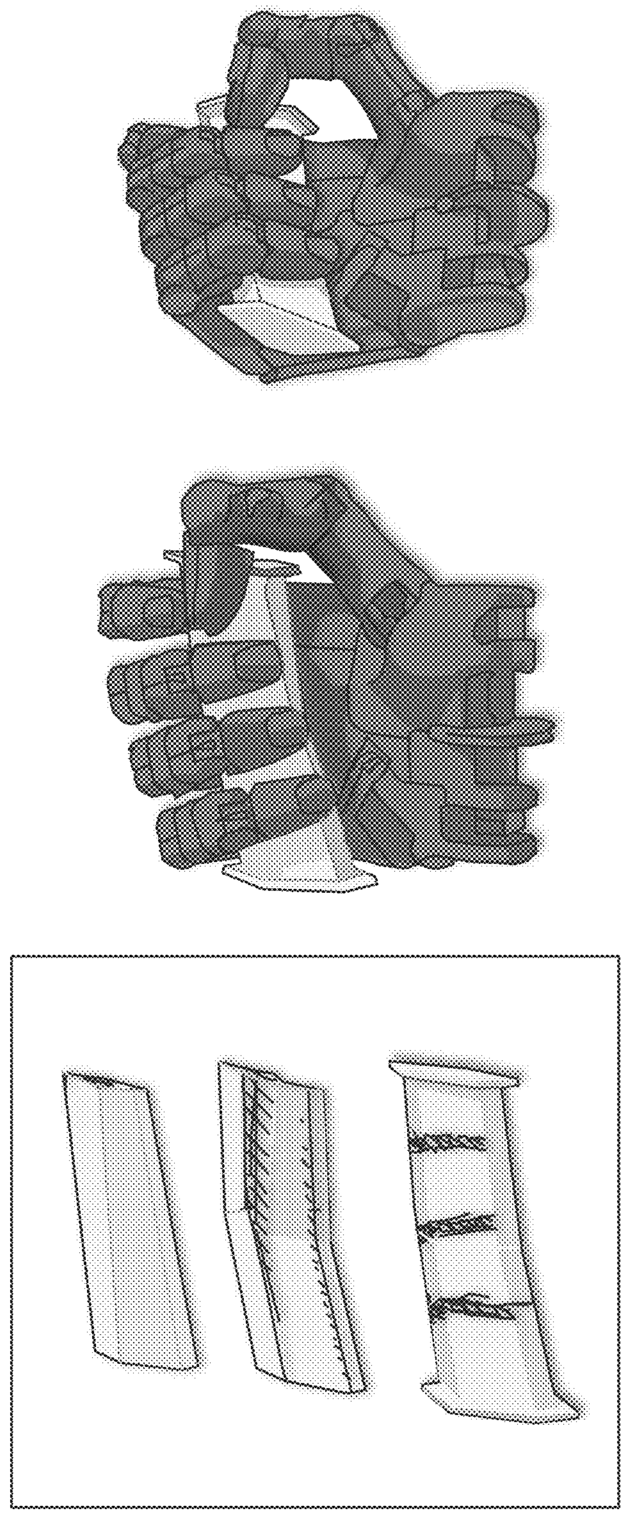
Figure 126:
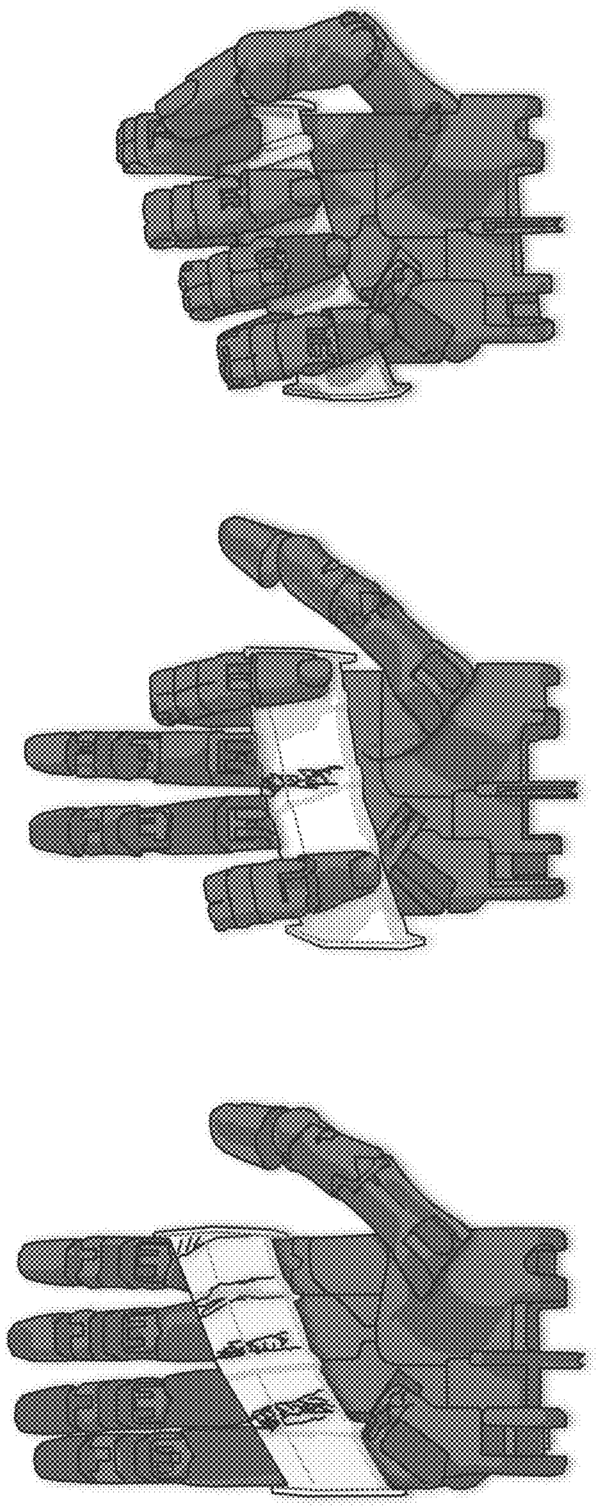
Figure 127:
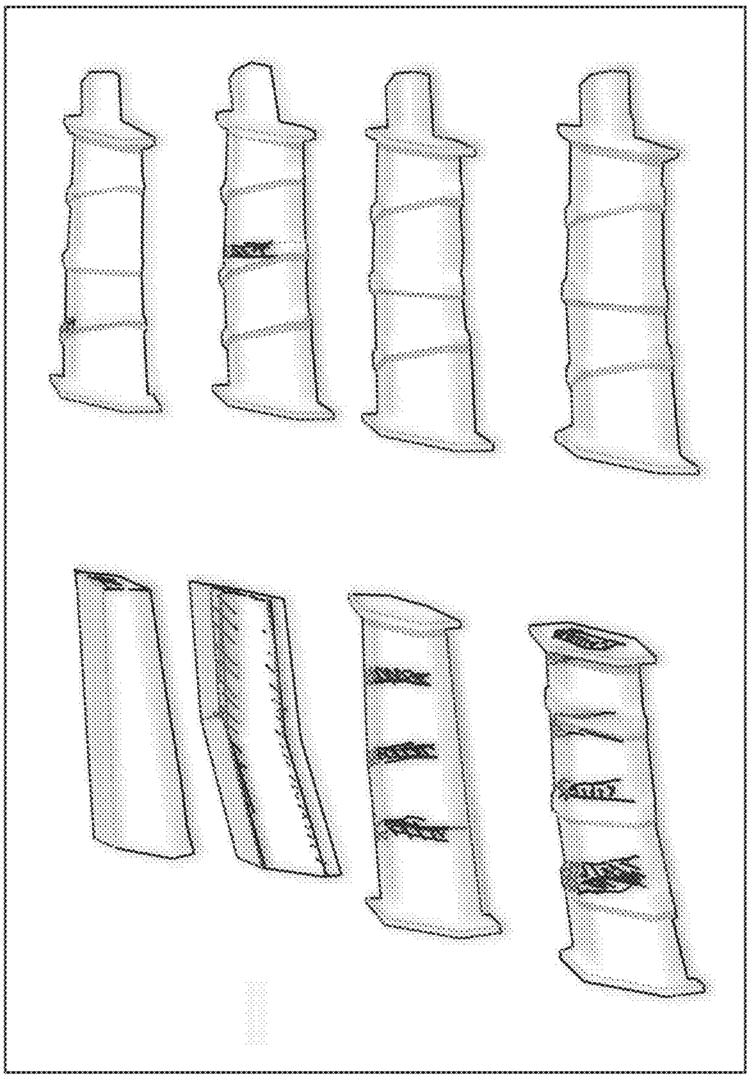
Figure 128:
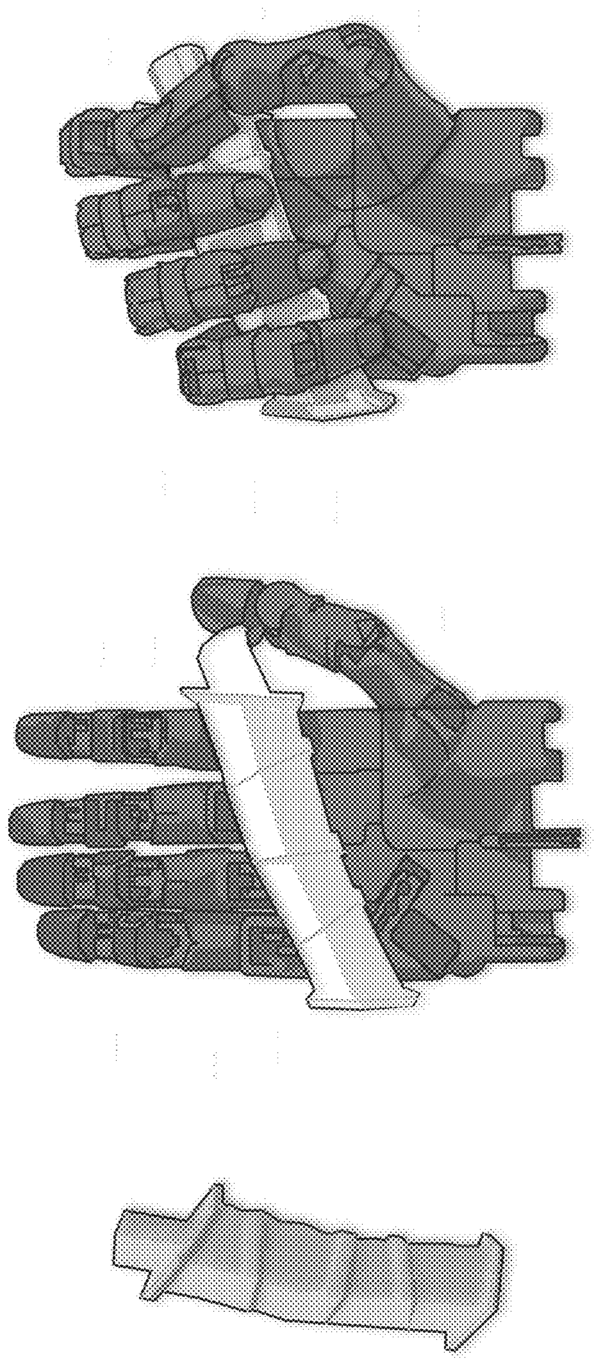
Figure 129:
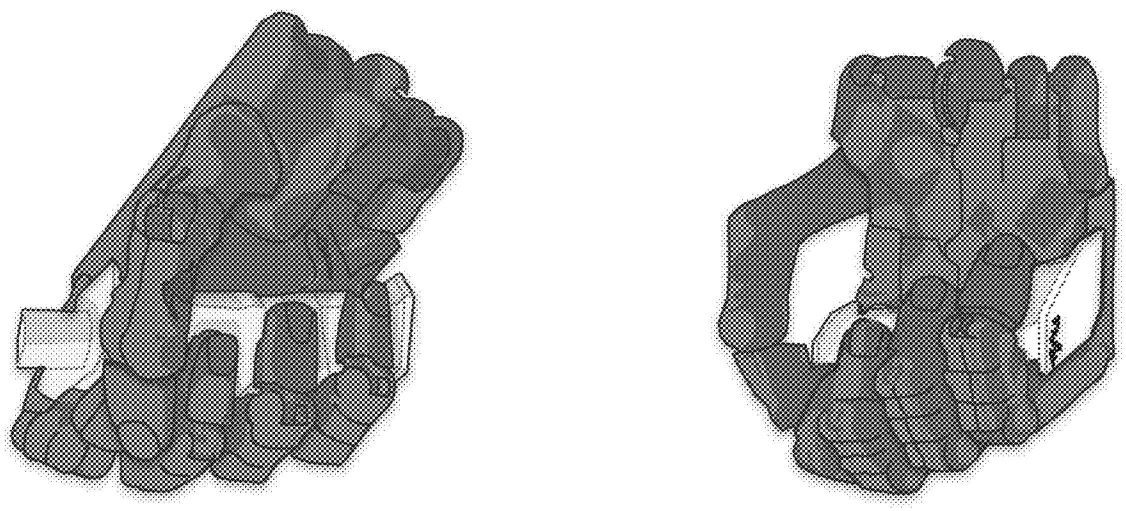
Figure 130A:
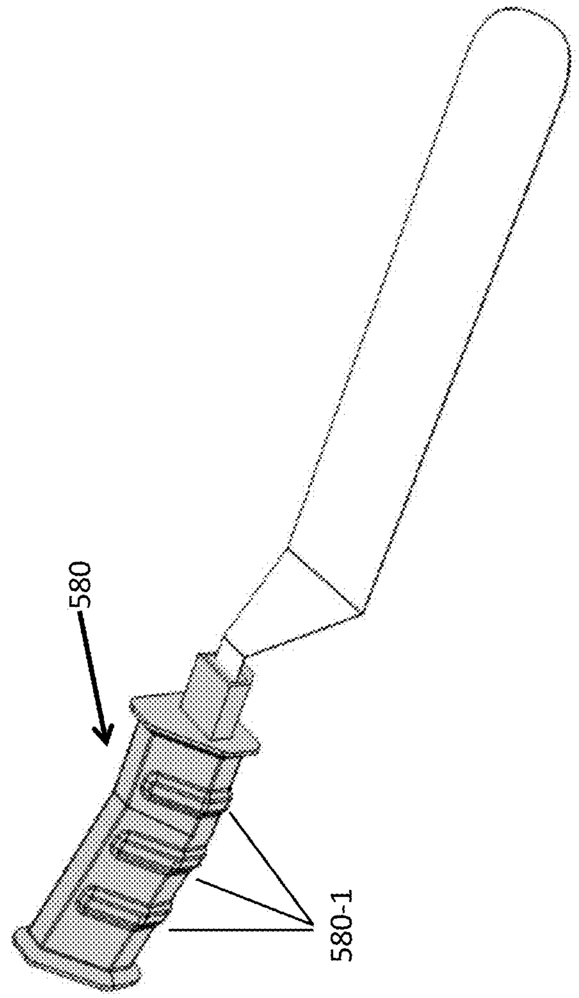
Figure 130B:
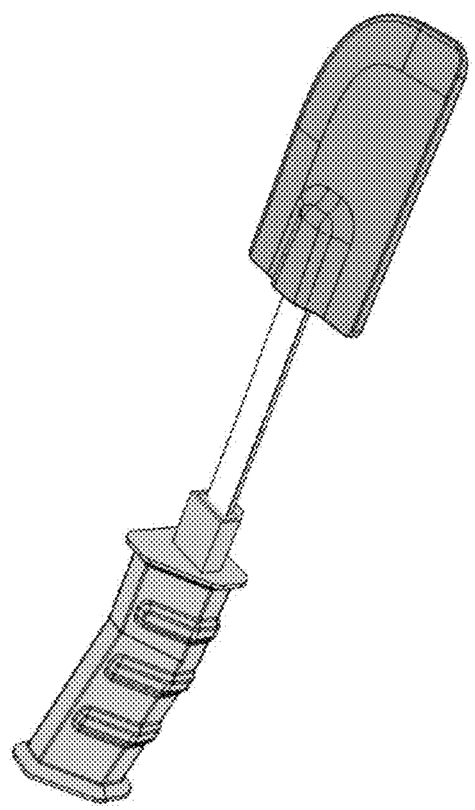
Figure 130C:
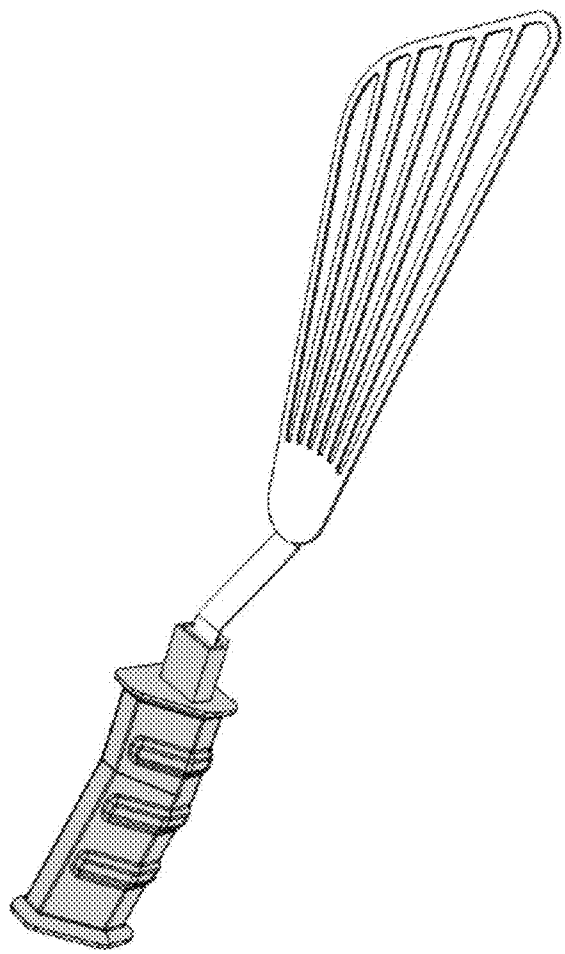
Figure 130D:
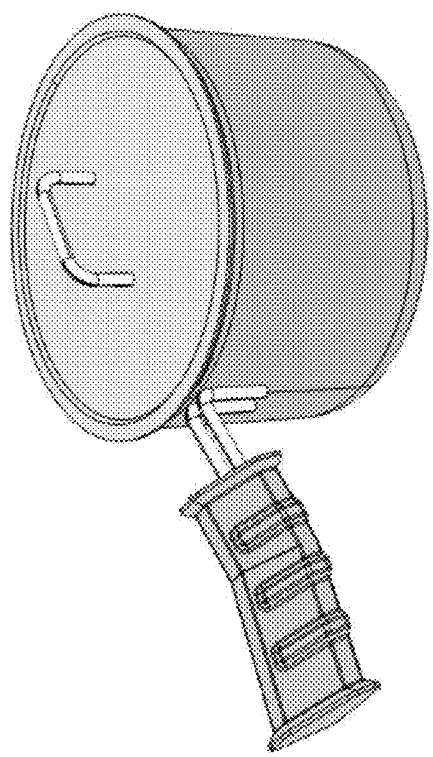
Figure 130E:
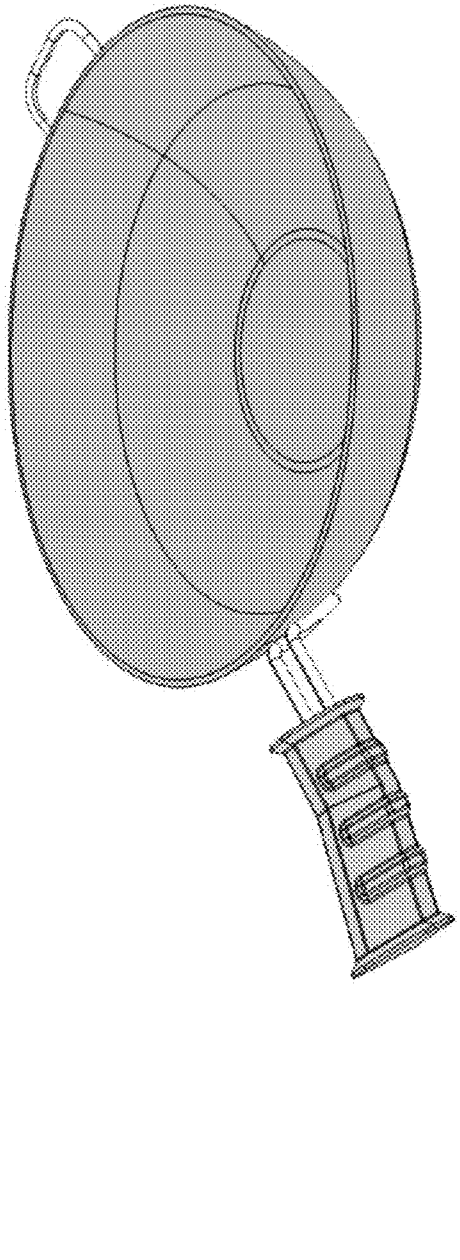
Figure 130F:
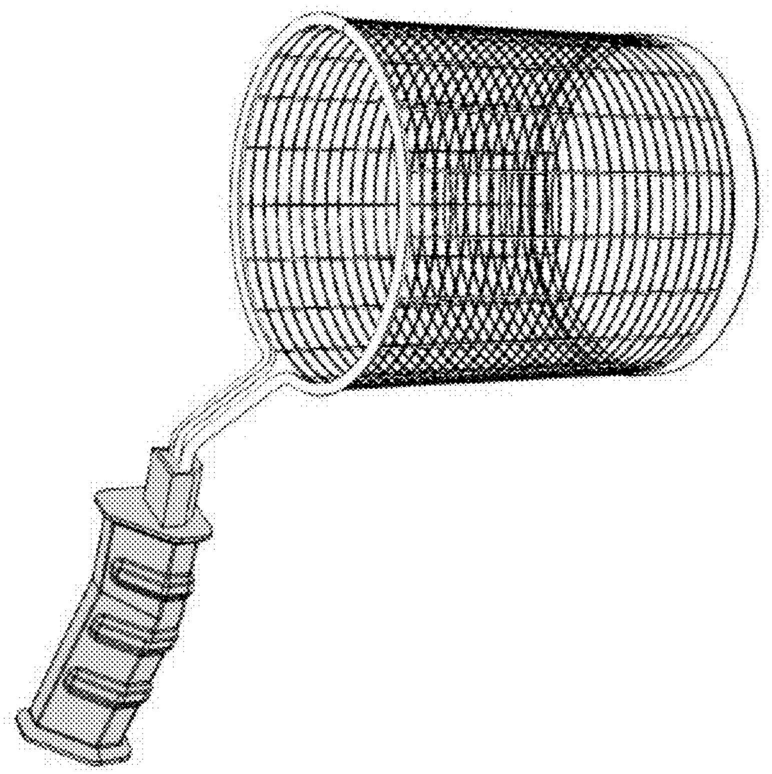
Figure 130G:
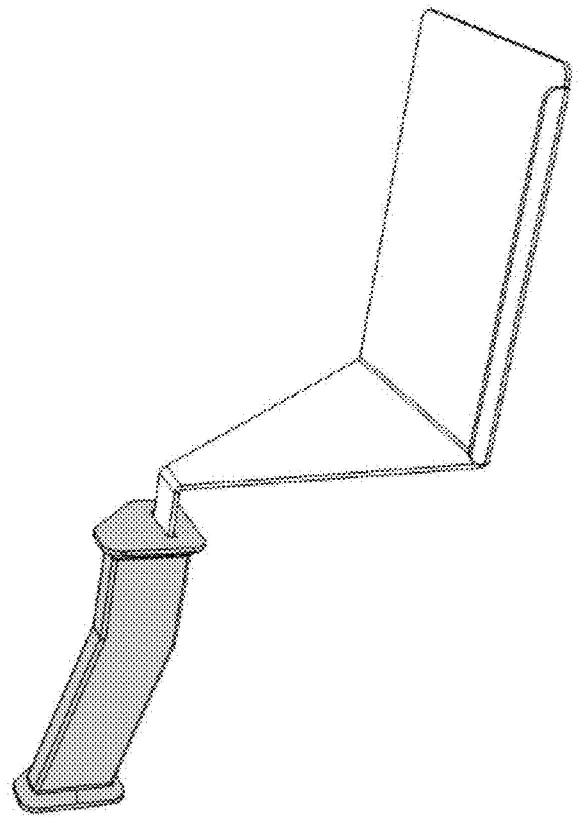
Figure 130H:
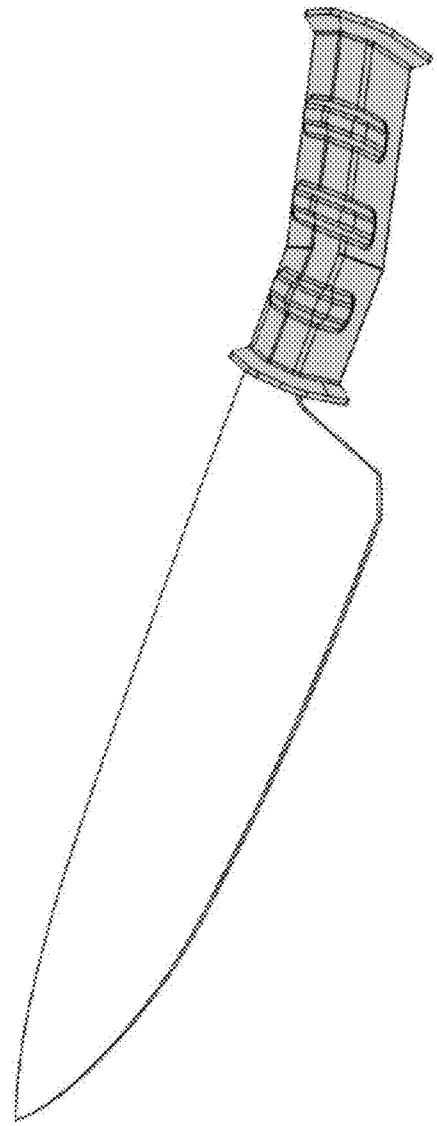

FIGS. 94-97 are block diagrams illustrating the second through fifth minimanipulations required to complete the task of making sushi, with minimanipulations 3352*a*, 3342*b* in FIG. 94, minimanipulations 3353*a*, 3353*b* in FIG. 125, minimanipulation 3354 in FIG. 126, and minimanipulation 3355 in FIG. 127. The minimanipulations to complete the functional task may require taking rice from a container, picking up a piece of fish, firming up the rice and fish into a desirable shape and pressing the fish to hug the rice to make the sushi in accordance with the present disclosure.

FIG. 98 is a block diagram illustrating a set of minimanipulations 3361-3365 for playing piano 3360 that may occur in any sequence or in any combination in parallel to obtain a functional result 3266. Tasks such as playing the piano may require coordination between the body, arms, hands, fingers, legs, and feet. All of these minimanipulations may be performed individually, collectively, in sequence, in series and/or in parallel.

The minimanipulations required to complete this task may be broken down into a series of techniques for the body and for each hand and foot. For example, there may be a series of right hand minimanipulations that successfully press and hold a series of piano keys according to playing techniques 1-n. Similarly, there may be a series of left hand minimanipulations that successfully press and hold a series of piano keys according to playing techniques 1-n. There may also be a series of minimanipulations identified to successfully press a piano pedal with the right or left foot. As will be understood by one skilled in the art, each minimanipulation for the right and left hands and feet, can be further broken down into sub-minimanipulations to yield the desired functional result, e.g. playing a musical composition on the piano.

FIG. 99 is a block diagram illustrating the first minimanipulation 3361 for the right hand and the second minimanipulation 3362 for the left hand of the set of minimanipulations that occur in parallel for playing piano from the set of minimanipulations for playing piano in accordance with the present disclosure. To create the minimanipulation library for this act, the time each finger starts and ends its pressing on the keys is captured. He piano keys may be defined as standard objects as they will not change from one occurrence to the next. Additionally, the number of pressing techniques for each time period (one time pressing key period, or holding time)—may be defined as a particular time cycle, where the time cycle could be the same time duration or different time durations.

FIG. 100 is a block diagram illustrating the third minimanipulation 3363 for the right foot and the fourth minimanipulation 3364 for the left foot of the set of minimanipulations that occur in parallel from the set of minimanipulations for playing piano in accordance with the present disclosure. To create the minimanipulation library for this act, the time each foot starts and ends its pressing on the pedals is captured. The Pedals may be defined as standard objects. The number of pressing techniques for each time period (one time pressing key period, or holding time)—may be defined as a particular time cycle, where the time cycle could be the same time duration or different time durations for each motion.

FIG. 101 is a block diagram illustrating the fifth minimanipulation 3365 that may be required for playing a piano. The minimanipulation illustrated in FIG. 131 relates to the body movement that may occur in parallel with one or more other minimanipulations from the set of minimanipulations for playing piano in accordance with the present disclosure. For example, the initial starting and ending positions of the body may be captured as well as interim positions captured as periodic intervals.

FIG. 102 is a block diagram illustrating a set of walking minimanipulations 3370 that can occur in any sequence, or in any combination in parallel, for a humanoid to walk in accordance with the present disclosure. As seen the minimanipulation illustrated in FIG. 132 may be divided into a number of segments. Segment 3371, the stride, 3372, the squash, segment 3373 the passing, segment 3374 the stretch and segment 3375, the stride with the other leg. Each segment is an individual minimanipulation that results in the functional result of the humanoid not falling down when walking on an uneven floor, or stairs, ramps or slopes. Each of the individual segments or minimanipulations may be described by how the individual portions of the leg and foot move during the segment. These individual minimanipulations may be captured, programmed, or taught to the humanoid and each may be optimized based on the specific circumstances. In an embodiment, the minimanipulation library is captured from monitoring a creator. In another embodiment, the minimanipulation is created from a series of commands.

FIG. 103 is a block diagram illustrating the first minimanipulation of stride 3371 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stride for minimanipulation 3371 are captured. Additional information, such as body position, center of gravity, and joint vectors may be required to be captured to insure the complete data required to complete the minimanipulation.

FIG. 104 is a block diagram illustrating the second minimanipulation of squash 3372 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the squash for minimanipulation 3372 are captured. Additional information, such as body position, center of gravity, and joint vectors may be required to be captured to insure the complete data required to complete the minimanipulation.

FIG. 105 is a block diagram illustrating the third minimanipulation of passing 3373 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for the right and left, leg, knee and foot at the start of the minimanipulation. The minimanipulation is created and all the interim positions to complete the passing for minimanipulation 3373 are captured. Additional information, such as body position, center of gravity, and joint vectors may be required to be captured to insure the complete data required to complete the minimanipulation.

FIG. 106 is a block diagram illustrating the fourth minimanipulation of stretch pose 3374 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stretch for minimanipulation 3374 are captured. Additional information, such as body position, center of gravity, and joint vectors may be required to be captured to insure the complete data required to complete the minimanipulation.

FIG. 107 is a block diagram illustrating the fifth minimanipulation of stride 3375 pose (for the other leg) with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stride for the other foot for minimanipulation 3375 are captured. Additional information, such as body position, center of gravity, and joint vectors may be required to be captured to insure the complete data required to complete the minimanipulation.

FIG. 108 is a block diagram illustrating a robotic nursing care module 3381 with a three-dimensional vision system in accordance with the present disclosure. Robotic nursing care module 3381 may be any dimension and size and may be designed for a single patient, multiple patients, patients needing critical care, or patients needing simple assistance. Nursing care module 3381 may be integrated into a nursing facility or may be installed in an assisted living, or home environment. Nursing care module 3381 may comprise a three-dimensional (3D) vision system, medical monitoring devices, computers, medical accessories, drug dispensaries or any other medical or monitoring equipment. Nursing care module 3381 may comprise other equipment and storage 3382 for any other medical equipment, monitoring equipment robotic control equipment. Nursing care module 3381 may house one or more sets of robotic arms, and hands or may include robotic humanoids. The Robotic arms may be mounted on a rail system in the top of the nursing care module 3381 or may be mounted from the walls, or floor.

Nursing care module 3381 may comprise a 3D vision system 3383 or any other sensor system which may track and monitor patient and/or robotic movement within the module.

FIG. 109 is a block diagram illustrating a robotic nursing care module 3381 with standardized cabinets 3391 in accordance with the present disclosure. As shown in FIG. 108, nursing care module 3381 comprises 3D vision system 3383, and may further comprise cabinets 3391 for storing mobile medical carts with computers, and/or in imaging equipment, that can be replace by other standardized lab or emergency preparation carts. Cabinets 3391 may be used for housing and storing other medical equipment, which has been standardized for robotic use, such as wheelchairs, walkers, crutches, etc. Nursing care module 3381 may house a standardized bed of various sizes with equipment consoles such as headboard console 3392. Headboard console 3392 may comprise any accessory found in a standard hospital room including but not limited to medical gas outlets, direct, indirect, nightlight, switches, electric sockets, grounding jacks, nurse call buttons, suction equipment, etc.

FIG. 110 is a block diagram illustrating a back view of a robotic nursing care module 3381 with one more standardized storages 3402, a standardized screen 3403, a standardized wardrobe 3404 in accordance with the present disclosure. In addition, FIG. 109 depicts railing system 3401 for robot arms/hands moving and storage/charging dock for robot arms/hands when in manual mode. Railing system 3401 may allow for horizontal movement in any direction and left/right. Front and back. It may be any type of rail or track and may accommodate one or more robot arms and hands. Railing system 3401 may incorporate power and control signals and may include wiring and other control cables necessary to control and or manipulate the installed robotic arms. Standardized storages 3402 may be any size and may be located in any standardized position within module 3381. Standardized storage 3402 may be used for medicines, medical equipment, and accessories or may be use for other patient items and/or equipment. Standardized screen 3403 may be a single or multiple multi purpose screens. It may be utilized for internet usage, equipment monitoring, entertainment, video conferencing, etc. There may be one or more screens 3403 installed within a nursing module 3381. Standardized wardrobe 3404 may be used to house a patient's personal belongings or may be used to store medical or other emergency equipment. Optional module 3405 may be coupled to or otherwise co-located with standardized nursing module 3381 and may include a robotic or manual bathroom module, kitchen module, bathing module or any other configured module that may be required to treat or house a patient within the standard nursing suite 3381. Railing systems 3401 may connect between modules or may be separate and may allow one or more robotic arms to traverse and/or travel between modules.

FIG. 111 is a block diagram illustrating a robotic nursing care module 3381 with a telescopic lift or body 3411 with a pair of robotic arms 3412 and a pair of robotic hands 3413 in accordance with the present disclosure. Robot arms 3412 are attached to the shoulder 3414 with a telescopic lift 3411 that moves vertically (up and down) and horizontally (left and right), as a way to move robotic arms 3412 and hands 3413. The telescopic lift 3411 can be moved as a shorter tube or a longer tube or any other rail system for extending the length of the robotic arms and hands. The arm 1402 and shoulder 3414 can move along the rail system 3401 between any positions within the nursing suite 3381. The robotic arms 3412, hands 3413 may move along the rail 3401 and lift system 3411 to access any point within the nursing suite 3381. In this manner, the robotic arms and hands can access, the bed, the cabinets, the medical carts for treatment or the wheel chairs. The robotic arms 3412 and hands 3413 in conjunction with the lift 3411 and rail 3401 may aide to lift a patient to sit a sitting or standing position or may assist placing the patient in a wheel chair or other medical apparatus.

FIG. 112 is a block diagram illustrating a first example of executing a robotic nursing care module with various movements to aid an elderly patient in accordance with the present disclosure. Step (a) may occur at a predetermined time or may be initiated by a patient. Robot arms 3412 and robotic hands 3413 take the medicine or other test equipment from the designated standardized location (e.g. storage location 3402). During step (b) robot arms 3412, hands 3413, and shoulders 3414 moves to the bed via rail system 3401 and to the lower level and may turn to face the patient in the bed. At step (c) robot arms 3412 and hands 3413 perform the programmed/required minimanipulation of giving medicine to a patient. Because the patient may be moving and is not standardized, 3D real time adjustment based on patient, standard/non standard objects position, orientation may be utilized to ensure successful a result. In this manner, the real time 3D visual system allows for adjustments to the otherwise standardized minimanipulations.

FIG. 113 is a block diagram illustrating a second example of executing a robotic nursing care module with the loading and unloading a wheel chair in accordance with the present disclosure. In position, (a) robot arms 3412 and hands 3413 perform minimanipulations of moving and lifting the senior/patient from a standard object, such as the wheel chair, and placing them on another standard object, such as laying them on the bed, with 3D real time adjustment based on patient, standard/non standard objects position, orientation to ensure successful result. During step (b) the robot arms/hands/shoulder may turn and move the wheelchair back to the storage cabinet after the patient has been removed. Additionally and/or alternatively, if there is more then one set of arms/hands, step (b) may be performed by one set, while step (a) is being completed. Cabinet. During step (c) the robot arms/hands open the cabinet door (standard object), push the wheelchair back in and close the door.

FIG. 114 depicts a humanoid robot 3500 serving as a facilitator between persons A 3502 and B 3504. In this embodiment, the humanoid robot acts as a real time communications facilitator between humans that are no co-located. In the embodiment, person A 3502 and B 3504 may be remotely located from each other. They may be located in different rooms within the same building, such as an office building or hospital, or may be located in different countries. Person A 3502 maybe co-located with a humanoid robot (not shown) or alone. Person B 3504 may also be co-located with a robot 3500. During communications between person A 3502 and person B 3504, the humanoid robot 3500 may emulate the movements and behaviors of person A 3502. Person A 3502 may be fitted with a garment or suit that contains sensors that translate the motions of person A 3502 into the motions of humanoid robot 3500. For example, in an embodiment, person A could wear a suit equipped with sensors that detect hand, torso, head, leg arms and feet movement. When Person B 3504 enters the room at the remote location person A 3502 may rise from a seated position and extend a hand to shake hands with person B 3504. Person A's 3502 movements are captured by the sensors and the information may be conveyed through wired or wireless connections to a system coupled to a wide area network, such as the internet. That sensor data may then be conveyed in real time or near real time via a wired or wireless connection to 3500 regardless of its physical location with respect to Person A 3500, based on the received sensor data will emulate the movements of Person A 3502 in the presence of person B 3504. In an embodiment, Person A 3502 and person B 3504 can shake hands via humanoid robot 3500. In this manner, person B 3504 can feel the same, grip positioning, and alignment of person A's hand through the robotic hand of humanoid robot's 3500 hand. As will be appreciated by those skilled in the art, Humanoid robot 3500 is not limited to shaking hands and may be used for its vision, hearing, speech or other motions. It may be able to assist Person B 3504 in any way that person A could accomplish if person A 3502 were in the room with person B 3504. In one embodiment, the humanoid robot 3500 emulate person A's 3502 movements by minimanipulations for person B to feel the sensation of Person A 3502.

FIG. 115 depicts a humanoid robot 3500 serving as a therapist 3508 on person B 3504 while under the direct control of person A 3502. In this embodiment, the humanoid robot 3500 acts as a therapist for person B based on actual real time or captured movements of person A. In an embodiment, person A 3502 may be a therapist and person B 3504 a patient. In an embodiment, person A performs a therapy session on person B while wearing a sensor suit. The therapy session may be captured via the sensors and converted into a minimanipulation library to be used later by humanoid robot 3500. In an alternative embodiment, person A 3502 and person B 3504 may be remotely located from each other. Person A, the therapist may perform therapy on a stand in patient or an anatomically correct humanoid figure while wearing a sensor suit. Person A's 3502 movements may be captured by the sensors and transmitted to humanoid robot 3500 via recording and network equipment 3506. These captured and recorded movements are then conveyed to humanoid robot 3500 to apply to person B 3504. In this manner, person B may receive therapy from the humanoid robot 3500 based on pre-recorded therapy sessions performed either by person A or in real time remote from person A 3502. Person B will feel the same sensation of Person A's 3502 (therapist) hand (e.g., strong grip of soft grip) through the humanoid robot's 3500's hand. The therapy can be scheduled to perform on same patient in a different time/day (e.g. every other day) or to different patient (person C, D) with each one having his/her pre-recorded program file. In one embodiment, the humanoid robot 3500 emulate person A's 3502 movements by minimanipulations for person B 3504 for replacing the therapy session.

FIG. 116 is a block diagram illustrating the first embodiment in the placement of motors relative to the robotic hand and arm with full torque require to move the arm, while FIG. 117 is a block diagram illustrating the second embodiment in the placement of motors relative to the robotic hand and arm with a reduced torque require to move the arm. A challenge in robotic design is to minimize mass and therefore weight, especially at the extremities of robotic manipulators (robotic arms) where it requires the maximal force to move and generates the maximal torque on the overall system. Electrical motors are a large contributor to the weight at the extremities of manipulators. The disclosure and design of new lighter-weight powerful electric motors is one way to alleviate the problem. Another way, the preferred way given current motor technology, is to change the placement of the motors so that they are as far away as possible from the extremities, but yet transmit the movement energy to the robotic manipulator at the extremity.

One embodiment requires placing a motor 3510 that controls the position of a robotic hand 72 not at the wrist where it would normally be placed in proximity of the hand, but rather further up in the robotic arm 70, preferentially just below the elbow 3212. In that embodiment the advantage of the motor placement closer to the elbow 3212 can be calculated as follows, starting with the original torque on the hand 72 caused by the weight of the hand.

$$T_{original}(\text{hand})=(w_{hand}+w_{motor})d_h(\text{hand,elbow})$$

where weight $w_i=gm_i$ (gravitational constant g times mass of object i), and horizontal distance $d_h$=length(hand, elbow) cos $\theta_v$ for the vertical angle theta. However, if the motor is placed near (epsilon away from the joint), then the new torque is:

$$T_{new}(\text{hand})=(w_{hand})d_h(\text{hand,elbow})+(w_{motor})\in_h$$

Since the motor 3510 next to the elbow-joint 3212 the robotic arm contributes only epsilon-distance to the torque the torque in the new system is dominated by the weight of the hand, including whatever the hand may be carrying. The advantage of this new configuration is that the hand may lift greater weight with the same motor since the motor itself contributes very little to the torque.

A skilled artisan will appreciate the advantage of this aspect of the disclosure, and would also realize that a small corrective factor is needed to account for the mass of the device used to transmit the force exerted by the motor to the hand—such a device could be a set of small axels. Hence, the full new torque with this small corrective factor would be:

$$T_{new}(\text{hand})=(w_{hand})d_h(\text{hand,elbow})+(w_{motor})\in_h+\tfrac{1}{2}w_{axel}d_h(\text{hand,elbow})$$

where the weight of the axel exerts half-torque since its center of gravity is half way between the hand and the elbow. Typically the weight of the axels is much less than the weight of the motor.

FIG. 118A is a pictorial diagrams illustrating robotic arms extending from an overhead mount for use in a robotic kitchen. As will be appreciated, the robotic arms may traverse in any direction along the overhead track and may be raised and lowered in order to perform the required minimanipulations.

FIG. 118B is an overhead pictorial diagrams illustrating robotic arms extending from an overhead mount for use in a robotic kitchen. As seen in FIGS. 118A-B, the placement of equipment, may be standardized. Specifically, in this embodiment, the oven 1316, cooktop 3520, sink 1308, and dishwasher 356 are located such that the robotic arms and hands know their exact location within the standardized kitchen.

FIGS. 119A-B are a pictorial diagrams illustrating robotic arms extending from an overhead mount for use in a robotic kitchen. In an embodiment, sliding storage compartments may be included in the kitchen module. As illustrated in FIGS. 119A-B, "sliding storages" 3524 may be installed on both side of the kitchen module. In this embodiment, the overall dimensions remain the same as those depicted in FIGS. 148-150. In an embodiment, a customized refrigerator may be installed in one of these "sliding storages" 3524. As will be appreciated by those skilled in the art, there are many layouts and many embodiments that may be implemented for any standardized robotic module. These variations are not limited to kitchens, or patient care facilities, but may also be used for construction, manufacturing, assembly, food production, etc., without departing from the spirit of the disclosure.

FIGS. 120-129 are pictorial diagrams of the various embodiments of robotic gripping options in accordance with the present disclosure. FIGS. 162A-H are pictorial diagrams illustrating various cookware utensils with standardized handles suitable for the robotic hands. In an embodiment, kitchen handle 580 is designed to be used with the robotic hand 72. One or more ridges 580-1 are placed to allow the robotic hand to grasp the standardized handle in the same position every time and to minimize slippage and enhance grasp. The design of the kitchen handle 580 is intended to be universal (or standardized) so that the same handle 580 can attach to any type of kitchen utensils or other type of tool, e.g. a knife, a medical test probe, a screwdriver, a mop, or other attachment that the robotic hand may be required to grasp. Other types of standardized (or universal) handles may be designed without departing from the spirit of the present disclosure.

FIG. 131 is a pictorial diagram of a blender portion for use in the robotic kitchen. As will be appreciated by those skilled in the art, any number of tool, equipment or appliances may be standardized and designed for use and control by the robotic hands and arms to perform any number of tasks. Once a minimanipulation is created for the operation of any tool or piece of equipment, the robotic hands or arms may repeatedly and consistently use the equipment in a uniform and reliable manner.

FIG. 132 are pictorial diagrams illustrating the various kitchen holders for use in the robotic kitchen. Any one or all of them may be standardized and adopted for use in other environments. As will be appreciated, medical equipment, such as tape dispensers, flasks, bottles, specimen jars, bandage containers, etc. may be designed and implemented for use with the robotic arms and hands.

One embodiment of the present disclosure illustrates a universal android-type robotic device that comprises the following features or components. A robotic software engine, such as the robotic food preparation engine 56, is configured to replicate any type of human hands movements and products in an instrumented or standardized environment. The resulting product from the robotic replication can be (1) physical, such as a food dish, a painting, a work of art, etc., and (2) non-physical, such as the robotic apparatus playing a musical piece on a musical instrument, a health care assistant procedure, etc.

Several significant elements in the universal android-type (or other software operating systems) robotic device may include some or all of the following, or in combination with other features. First, the robotic operating or instrumented environment operates a robotic device providing standardized (or "standard") operating volume dimensions and architecture for Creator and Robotic Studios. Second, the robotic operating environment provides standardized position and orientation (xyz) for any standardized objects (tools, equipment, devices, etc.) operating within the environment. Third, the standardized features extend to, but are not limited by, standardized attendant equipment set, standardized attendant tools and devices set, two standardized robotic arms, and two robotic hands that closely resemble functional human hands with access to one or more libraries of minimanipulations, and standardized three-dimensional (3D) vision devices for creating dynamic virtual 3D-vision model of operation volume. This data can be used for hand motion capturing and functional result recognizing. Fourth, hand motion gloves with sensors are provided to capture precise movements of a creator. Fifth, the robotic operating environment provides standardized type/volume/size/weight of the required materials and ingredients during each particular (creator) product creation and replication process. Sixth, one or more types of sensors are use to capture and record the process steps for replication.

Software platform in the robotic operating environment includes the following subprograms. The software engine (e.g., robotic food preparation engine 56) captures and records arms and hands motion script subprograms during the creation process as human hands wear gloves with sensors to provide sensory data. One or more minimanipulations functional library subprograms are created. The operating or instrumented environment records three-dimensional dynamic virtual volume model subprogram based on a timeline of the hand motions by a human (or a robot) during the creation process. The software engine is configured to recognize each functional minimanipulation from the library subprogram during a task creation by human hands. The software engine defines the associated minimanipulations variables (or parameters) for each task creation by human hands for subsequent replication by the robotic apparatus. The software engine records sensor data from the sensors in an operating environment, which quality check procedure can be implemented to verify the accuracy of the robotic execution in replicating the creator's hand motions. The software engine includes an adjustment algorithms subprogram for adapting to any non-standardized situations (such as an object, volume, equipment, tools, or dimensions), which make a conversion from non-standardized parameters to standardized parameters to facilitate the execution of a task (or product) creation script. The software engine stores a subprogram (or sub software program) of a creator's hand motions (which reflect the intellectual property product of the creator) for generating a software script file for subsequent replication by the robotic apparatus. The software engine includes a product or recipe search engine to locate the desirable product efficiently. Filters to the search engine are provided to personalize the particular requirements of a search. An e-commerce platform is also provided for exchanging, buying, and selling any IP script (e.g., software recipe files), food ingredients, tools, and equipment to be made available on a designated website for commercial sale. The e-commerce platform also provides a social network page for users to exchange information about a particular product of interest or zone of interest.

One purpose of the robotic apparatus replicating is to produce the same or substantially the same product result, e.g., the same food dish, the same painting, the same music, the same writing, etc. as the original creator through the creator's hands. A high degree of standardization in an operating or instrumented environment provides a framework, while minimizing variance between the creator's operating environment and the robotic apparatus operating environment, which the robotic apparatus is able to produce substantially the same result as the creator, with some additional factors to consider. The replication process has the same or substantially the same timeline, with preferable the same sequence of minimanipulations, the same initial start time, the same time duration and the same ending time of each minimanipulation, while the robotic apparatus autonomously operates at the same speed of moving an object between minimanipulations. The same task program or mode is used on the standardized kitchen and standardized equipment during the recording and execution of the minimanipulation. A quality check mechanism, such as a three-dimensional vision and sensors, can be used to minimize or avoid any failed result, which adjustments to variables or parameters can be made to cater to non-standardized situations. An omission to use a standardized environment (i.e., not the same kitchen volume, not the same kitchen equipment, not the same kitchen tools, and not the same ingredients between the creator's studio and the robotic kitchen) increases the risk of not obtaining the same result when a robotic apparatus attempts to replicate a creator's motions in hopes of obtaining the same result.

The robotic kitchen can operate in at least two modes, a computer mode and a manual mode. During the manual mode, the kitchen equipment includes buttons on an operating console (without the requirement to recognize information from a digital display or without the requirement to input any control data through touchscreen to avoid any entering mistake, during either recording or execution). In case of touchscreen operation, the robotic kitchen can provide a three-dimensional vision capturing system for recognizing current information of the screen to avoid incorrect operation choice. The software engine is operable with different kitchen equipment, different kitchen tools, and different kitchen devices in a standardized kitchen environment. A creator's limitation is to produce hand motions on sensor gloves that are capable of replication by the robotic apparatus in executing mini-manipulations. Thus, in on embodiment, the library (or libraries) of minimanipulations that are capable of execution by the robotic apparatus serves as functional limitations to the creator's motion movements. The software engine creates an electronic library of three-dimensional standardized objects, including kitchen equipment, kitchen tools, kitchen containers, kitchen devices, etc. The pre-stored dimensions and characteristics of each three-dimensional standardized object conserve resources and reduce the amount of time to generate a three-dimensional modeling of the object from the electronic library, rather than having to create a three-dimensional modeling in real time. In one embodiment, the universal android-type robotic device is capable to create a plurality of functional results. The functional results make success or optimal results from the execution of minimanipulations from the robotic apparatus, such as the humanoid walking, the humanoid running, the humanoid jumping, the humanoid (or robotic apparatus) playing musical composition, the humanoid (or robotic apparatus) painting a picture, and the humanoid (or robotic apparatus) making dish. The execution of minimanipulations can occur sequentially, in parallel, or one prior minimanipulation must be completed before the start of the next minimanipulation. To make humans more comfortable with a humanoid, the humanoid would make the same motions (or substantially the same) as a human and at a pace comfortable to the surrounding human(s). For example, if a person likes the way that a Hollywood actor or a model walks, the humanoid can operate with minimanipulations that exhibits the motion characteristics of the Hollywood actor (e.g., Angelina Jolie). The humanoid can also be customized with a standardized human type, including skin-looking cover, male humanoid, female humanoid, physical, facial characteristics, and body shape. The humanoid covers can be produced using three-dimensional printing technology at home.

One example operating environment for the humanoid is a person's home; while some environments are fixed, others are not. The more that the environment of the house can be standardized, the less risk in operating the humanoid. If the humanoid is instructed to bring a book, which does not relate to a creator's intellectual property/intellectual thinking (IP), it requires a functional result without the IP, the humanoid would navigate the pre-defined household environment and execute one or more minimanipulations to bring the book and give the book to the person. Some three-dimensional objects, such as a sofa, have been previously created in the standardized household environment when the humanoid conducts its initial scanning or perform three-dimensional quality check. The humanoid may necessitate creating a three-dimensional modeling for an object that the humanoid does not recognized or that was not previously defined.

Sample types of kitchen equipment are illustrated as Table A in FIGS. 166A-L, which include kitchen accessories, kitchen appliances, kitchen timers, thermometers, mills for spices, measuring utensils, bowls, sets, slicing and cutting products, knives, openers, stands and holders, appliances for peeling and cutting, bottle caps, sieves, salt and pepper shakers, dish dryers, cutlery accessories, decorations and cocktails, molds, measuring containers, kitchen scissors, utensil for storages, potholders, railing with hooks, silicon mats, graters, presses, rubbing machines, knife sharpeners, breadbox, kitchen dishes for alcohol, tableware, utensils for table, dishes for tea, coffee, dessert, cutlery, kitchen appliances, children's dishes, a list of ingredient data, a list of equipment data, and a list of recipe data.

FIG. 133A-C illustrate sample minimanipulations for a robot making sushi, a robot playing piano, a robot moving a robot by moving from a first position (A-position) to a second position (B-position), a robot moving the robot by running from a first position to a second position, jumping from a first position to a second position, a humanoid taking a book from book shelf, a humanoid brings a bag from a first position to a second position, a robot opening a jar, and a robot putting food in a bowl for a cat to consume.

FIGS. 134A-I illustrate sample multi-level minimanipulations for a robot to perform measurement, lavage, supplemental oxygen, maintenance of body temperature, catheterization, physiotherapy, hygienic procedures, feeding, sampling for analyses, care of stoma and catheters, care of a wound, and methods of administering drugs.

FIG. 135 illustrate sample multi-level minimanipulations for a robot to perform intubation, resuscitation/cardiopulmonary resuscitation, replenishment of blood loss, hemostasis, emergency manipulation on trachea, fracture of bone, and wound closure (excluding sutures). A list of sample medical equipment and medical device list is illustrated FIG. 175.

FIGS. 137A-B illustrate a sample nursery service with minimanipulations. Another sample equipment list is illustrated in FIG. 138.

FIG. 139 depicts a block diagram illustrating one embodiment of the physical layer structured as a macro-manipulation/micro-manipulation in accordance with the present disclosure. One objective of the macro-micro manipulation subsystem separation at the logical and physical level, is to bound the computational load on planners and controllers, particularly for the required inverse kinematic computation, to a level that allows the system to operate in real-time, with sampling rates described in the hundreds to thousands of Hertz. In order to achieve this goal, particularly for complex robotic systems beyond the typical 6 DoFs, such as those comprised of arms with fingered hands, or multi-arms or even mobile (via legs or wheels) humanoids, it is critical to split the system at both the physical and logical level into subsystems that have separate controller and processor devices operating on a dedicated bus, each responsible for only a sub-portion of the complete kinematic chain, while being overseen by a planning and executor system capable of synchronizing the same to achieve a desirable task. This is only achievable through the use of separate distributed processor and bus architectures with interconnected buses and a supervisory planner and controller. In our case the physical and logical split is performed based on the length of the kinematic chain (<6 DoFs) and also based on the workspace capabilities and demands of a robotic system with a movable base with an arm and a wrist (achieving 6 DoE; 3 in translation and 3 in rotation) capable of larger workspace coarser motions, with a thereto-attached endeffector, in this case a multi-fingered hand and/or tools capable of smaller-workspace but much higher-resolution and -fidelity motions.

While it is possible to conceive of a dynamic approach to define the macro-/micro-manipulation subsystems at any desirable time-domain level (task-based or even at every controller sampling-step) using an intelligent subsystem separation planner, providing a system that operates at a more optimal and minimal computational load level, it would however add substantial complexity to the system. In our embodiment we propose an a-priori logical and physical separation of the entire physical system into its macro- and micro-manipulation subsystems, each carrying out their own dedicated planning and control tasks based on a more real-world and computationally-motivated level. The implemented separation allows for the use of well known and understood real-time inverse kinematic planners for free-space translational and rotational movements in all degrees of freedom, namely 3 translational (XYZ) and 3 rotational (roll, pitch, yaw), adding up to 6 DoFs. Beyond that, we are able to use a separate multi-DoF inverse kinematic planner that addresses the remaining manipulation elements, namely the palm and fingers with their attached tools/utensils and vessels, thereby decoupling the entire inverse kinematic planning into multiple sets of computationally-manageable processes, each capable of providing solutions in real time for each of their respective (sub-)systems. For workspace movements beyond those of the stationary articulation system, namely the articulated arm/hand systems, a separate planner can be used that allows a coarse positioning system, in our case the Cartesian XYZ positioner, to provide an inverse kinematic solution to said system that can re-center the available workspace around that of the arm/hand system (akin to moving the robotic system along rails to reach parts of the workspace that lie outside of the reach of the articulated robot-arm).

The robotic system operating in a real-world environment has been split into three (3) separate physical entities, namely the (1) articulated base, which includes the (a) upper-extremity (sensor-head) and torso, and (b) linked appendages, which are typically articulated serial-configuration arms (but need not be) with multiple DoFs of differing types; (2) endeffectors, which include a wrist with a variety of end-of-arm (EoA) tooling such as fingers, docking-fixtures, etc., and (3) the domain-application itself, such as a fully-instrumented laboratory, bathroom or kitchen, where the latter would contain cooking tools, pots/pans, appliances, ingredients, user-interaction devices, etc.

A typical manipulation system, particularly those requiring substantial mobility over larger workspaces while still needing appreciable endpoint motion accuracy, can be physically and logically subdivided into a macro-manipulation subsystem comprising of a large workspace positioner 3540, coupled with an articulated body 3531 comprising multiple elements 3541 for coarse motion, and a micro-manipulation subsystem 3549 utilized for fine motions, physically joined and interacting with the environment 3551 they operate in.

For larger workspace applications, where the workspace exceeds that of a typical articulated robotic system, it is possible to increase the systems' reach by adding a positioner, typically in free-space, allowing movements in XYZ (three translational coordinates) space, as depicted by 3540 allowing for workspace repositioning 3544. Such a positioner could be a mobile wheeled or legged base, aerial platform, or simply a gantry-style orthogonal XYZ positioner, capable of positioning an articulated body 3531. Such an articulated body 3531 targeted at applications where a humanoid-type configuration is one of the possible physical robot instantiations, said articulated body 3531 would describe a physical set of interlinked elements 3541, comprising of upper-extremities 3545 and linked appendages 3546. Each of these interlinked elements within the macro-manipulation subsystem 3541 and 3540 would consist of a instrumented articulated and controller-actuated sub-elements, including a head 3542 replete with a variety of environment perception and modelling sensing elements, connected to an instrumented articulated and controller-actuated shouldered torso 3534 and an instrumented articulated and controller-actuated waist 3543. The shoulders in the torso can have attached to it linked appendages 3546, such as one (typically two) or more instrumented articulated and controller-actuated jointed arms 3536 to each of which would be attached an instrumented articulated and controller-actuated wrist 3537. A waist may also have attached to its mobility elements such as one or more legs 3535, in order to allow the robotic system to operate in a much more expanded workspace.

A physically attached micro-manipulation subsystem 3549 is used in applications where fine position and/or velocity trajectory-motions and high-fidelity control of interaction forces/torques is required, that a macro-manipulation subsystem 3541, whether coupled to a positioner 3540 or not, would not be able to sense and/or control to the level required for a particular domain-application. The micro-manipulation subsystem 3549 is typically attached to each of the linked appendages 3546 interface mounting locations of the instrumented articulated and controller-actuated wrist 3537. It is possible to attach a variety of instrumented articulated and controller-actuated end-of-arm (EoA) tooling 3547 to said mounting interface(s). While a wrist 3537 itself can be an instrumented articulated and controller-actuated multi-degree-of-freedom (DoE; such as a typical three-DoF rotation configuration in roll/pitch/yaw), it is also the mounting platform to which one may choose to attach a highly dexterous instrumented articulated and controller-actuated multi-fingered hand including fingers with a palm 3538. Other options could also include a passive or actively controllable fixturing-interface 3539 to allow the grasping of particularly designed devices meant to mate to the same, many times allowing for a rigid mechanical and also electrical (data, power, etc.) interface between the robot and the device. The depicted concept need not be limited to the ability to attach fingered hands 3538 or fixturing devices 3539, but potentially other devices 3550, which can include rigidly anchoring to the surface, or even other devices.

The variety of endeffectors 3532 that can form part of the micro-manipulation subsystem 3549 allow for high-fidelity interactions between the robotic system and the environment/world 3548 by way of a variety of devices 3551. The types of interactions depend on the domain application 3533. In the case of the domain application being that of a robotic kitchen with a robotic cooking system, the interactions would occur with such elements as cooking tools 3556 (whisks, knives, forks, spoons, whisks, etc.), vessels including pots and pans 3555 among many others, appliances 3554 such as toasters, electric-beater or -knife, etc., cooking ingredients 3553 to be handled and dispensed (such as spices, etc.), and even potential live interactions with a user 3552 in case of required human-robot interactions called for in the recipe or due to other operational considerations.

FIG. 140 depicts a logical diagram of main action blocks in the software-module/action layer within the macro-manipulation and micro-manipulation subsystems and the associated mini-manipulation libraries dedicated to each in accordance with the present disclosure. The architecture of the software-module/action layer provides a framework that allows the inclusion of: (1) refined Endeffector sensing (for refined and more accurate real-world interface sensing); (2) introduction of the macro-(overall sensing by and from the articulated base) and micro-(local task-specific sensing between the endeffectors and the task-/cooking-specific elements) tiers to allow continuous minimanipulation libraries to be used and updated (via learning) based on a physical split between coarse and fine manipulation (and thus positioning, force/torque control, product-handling and process monitoring); (3) distributed multi-processor architecture at the macro- and micro-levels; (4) introduction of the "0-Position" concept for handling any environment elements (tools, appliances, pans, etc.); (5) use of aids such as fixturing-elements and markers (structured targets, template-matching, virtual markers, RFID/IR/NFC markers, etc.) to increase speed and fidelity of docking/handling and improve minimanipulations; and (6) electronic inventorying system for tools and pots/pans as well as Utensil/Container/Ingredient storage and access.

The macro-/micro-distinctions provide differentiations on athe types of minimanipulation libraries and their relative descriptors and improved and higher-fidelity learning results based on more localized and higher-accuracy sensory elements contained within the endeffectors, rather than relying on sensors that are typically part of (and mounted on) the articulated base (for larger FoV, but thereby also lower resolution and fidelity when it comes to monitoring finer movements at the "product-interface" (where the cooking tasks mostly take place when it comes to decision-making).

The overall structure in FIG. 140 illustrates (a) using sensing elements to image/map the surroundings and then (b) create motion-plans based on primitives stored in mini-manipulation libraries which are (c) translated into actionable (machine-executable) joint-/actuator-level commands (of position/velocity and/or force/torque), with (d) a feedback loop of sensors used to monitor and proceed in the assigned task, while (e) also learning from its execution-state to improve existing minimanipulation descriptors and thus the associated libraries. The elaboration on having macro- and micro-level actions based on macro- and micro-level sensory systems, at the articulated base and endeffectors, respectively. The sensory systems then perform identical functions, but create and optimize descriptors and minimanipulations in separate minimanipulation databases, which are all merged into a single database that the respective systems draw from.

The macro-/micro-level split also allows: (1) presence and integration of sensing systems at the macro (base) and micro (endeffector) levels (not to speak of the varied sensory elements one could list, such as cameras, lasers, haptics, any EM-spectrum based elements, etc.); (2) application of varied learning techniques at the macro- and micro levels to apply to different minimanipulation libraries suitable to different levels of manipulation (such as coarser movements and posturing of the articulated base using macro-minimanipulation databases, and finer and higher-fidelity configurations and interaction forces/torques of the respective endeffectors using micro-minimanipulation databases), and each thus with descriptors and sensors better suited to execute/monitor/optimize said descriptors and their respective databases; (3) need and application of distributed and embedded processors and sensory architecture, as well as the real-time operating system and multi-speed buses and storage elements; (4) use of the "0-Position" method, whether aided by markers or fixtures, to aid in acquiring and handling (reliably and accurately) any needed tool or appliance/pot/pan or other elements; and (5) interfacing of an instrumented inventory system (for tools, ingredients, etc.) and a smart Utensil/Container/Ingredient storage system.

A multi-level robotic operational system, in this case one of a two-level macro- and micro-manipulation subsystem (3541 and 3549, respectively), comprising of a macro-level articulated and instrumented large workspace coarse-motion articulated and instrumented base 3610, connected to a micro-level fine-motion high-fidelity environment interaction instrumented EoA-tooling subsystem 3620, allows for position and velocity motion planners to provide task-specific motion commands through Mini-manipulation libraries 3630 at both the macro- and micro-levels (3631 and 3632, respectively). The ability to share feedback data and send and receive motion commands is only possible through the use of a distributed processor and sensing architecture 3650, implemented via a (distributed) real-time operating system interacting over multiple varied-speed bus interfaces 3640, taking in high-level task-execution commands from a high-level planner 3660, which are in turn broken down into separate yet coordinated trajectories for both the macro and micro manipulation subsystems.

The macro-manipulation subsystem 610 instantiated by an instrumented articulated and controller-actuated articulated instrumented base 3610 requires a multi-element linked set of operational blocks 3611 thru 3616 to function properly. Said operational blocks rely on a separate and distinct set of processing and communication bus hardware responsible for the macro-level sensing and control tasks at the macro-level. In a typical macro-level subsystem said operational blocks require the presence of a macro-level command translator 3616, that takes in mini-manipulation commands from a library 3630 and its macro-level mini-manipulation sublibrary 3631, and generates a set of properly sequenced machine-readable commands to a macro-level planning module 3612, where the motions required for each of the instrumented and actuated elements are calculated in at least the joint- and Cartesian-space. Said motion commands are sequentially fed to an execution block 3613, which controls all instrumented articulated and actuated joints in at least joint- or Cartesian space to ensure the movements track the commanded trajectories in position/velocity and/or torque/force. A feedback sensing block 3614 provides feedback data from all sensors to the execution block 3613 as well as an environment perception block/module 3611 for further processing. Feedback is not only provided to allow tracking the internal state of variables, but also sensory data from sensor measuring the surrounding environment and geometries. Feedback data from said module 3614 is used by the execution module 3613 to ensure actual values track their commanded setpoints, as well as an environment perception module 3611 to image and map, model and identify the state of each articulated element, the overall configuration of the robot as well as the state of the surrounding environment the robot is operating in. Additionally, said feedback data is also provided to a learning module 3615 responsible for tracking the overall performance of the system and comparing it to known required performance metrics, allowing one or more learning methods to develop a continuously updated set of descriptors that define all mini-manipulations contained within their respective mini-manipulation library 3630, in this case the macro-level mini-manipulation sublibrary 3631.

In the case of the micro-manipulation system 620 instantiated by an instrumented articulated and controller-actuated articulated instrumented EoA-tooling subsystem 3620, the logical operational blocks described above are similar except that operations are targeted and executed only for those elements that form part of the micro-manipulation subsystem 620. Said instrumented articulated and controller-actuated articulated instrumented EoA-tooling subsystem 3620, requires a multi-element linked set of operational blocks 3621 thru 3626 to function properly. Said operational blocks rely on a separate and distinct set of processing and communication bus hardware responsible for the micro-level sensing and control tasks at the micro-level. In a typical micro-level subsystem said operational blocks require the presence of a micro-level command translator 3626, that takes in mini-manipulation commands from a library 3630 and its micro-level mini-manipulation sublibrary 3632, and generates a set of properly sequenced machine-readable commands to a micro-level planning module 3622, where the motions required for each of the instrumented and actuated elements are calculated in at least the joint- and Cartesian-space. Said motion commands are sequentially fed to an execution block 3623, which controls all instrumented articulated and actuated joints in at least joint- or Cartesian space to ensure the movements track the commanded trajectories in position/velocity and/or torque/force. A feedback-sensing block 3624 provides feedback data from all sensors to the execution block 3623 as well as a task perception block/module 3621 for further processing. Feedback is not only provided to allow tracking the internal state of variables, but also sensory data from sensors measuring the immediate EoA configuration/geometry as well as the measured process and product variables such as contact force, friction, interaction product state, etc. Feedback data from said module 3624 is used by the execution module 3623 to ensure actual values track their commanded set-points, as well as a task perception module 3621 to image and map, model and identify the state of each articulated element, the overall configuration of the EoA-tooling as well as the type and state of the environment interaction variables the robot is operating in, as well as the particular variables of interest of the element/product being interacted with (as an example a paintbrush bristle width during painting or a the consistency and of egg whites being beaten or the cooking-state of a fried egg). Additionally, said feedback data is also provided to a learning module 3625 responsible for tracking the overall performance of the system and comparing it to known required performance metrics for each task and its associated mini-manipulation commands, allowing one or more learning methods to develop a continuously updated set of descriptors that define all mini-manipulations contained within their respective mini-manipulation library 3630, in this case the micro-level mini-manipulation sublibrary 3632.

FIG. 141 depicts a block diagram illustrating the macro-manipulation and micro-manipulation physical subsystems and their associated sensors, actuators and controllers with their interconnections to their respective high-level and subsystem planners and controllers as well as world and interaction perception and modelling systems for mini-manipulation planning and execution process. The hardware systems innate within each the macro- and micro-manipulation subsystems are reflected at both the macro-manipulation subsystem level through the instrumented articulated and controller-actuated articulated base 3710, and the micro-manipulation level through the instrumented articulated and controller-actuated end-of-arm (EoA) tooling 3720 subsystems. Both are connected to their perception and modelling systems 3730 and 3740, respectively.

In the case of the macro-manipulation subsystem 3710, a connection is made to the world perception and modelling subsystem 3730 through a dedicated sensor bus 3770, with the sensors associated with said subsystem responsible for sensing, modelling and identifying the world around the entire robot system and the latter itself, within said world. The raw and processed macro-manipulation subsystem sensor data is then forwarded over the same sensor bus 3770 to the macro-manipulation planning and execution module 3750, where a set of separate processors are responsible for executing task-commands received from the task mini-manipulation parallel task execution planner 3830, which in turn receives its task commands from the high-level mini-manipulation planner 3870 over a data and controller bus 3780, and controlling the macro-manipulation subsystem 3710 to complete said tasks based on the feedback it receives from the world perception and modelling module 3730, by sending commands over a dedicated controller bus 3760. Commands received through this controller bus 3760, are executed by each of the respective hardware modules within the articulated and instrumented base subsystem 3710, including the positioner system 3713, the repositioning single kinematic chain system 3712, to which are attached the head system 3711 as well as the appendage system 3714 and the thereto attached wrist system 3715.

The positioner system 3713 reacts to repositioning movement commands to its Cartesian XYZ positioner 3713*a*, where an integral and dedicated processor-based controller executes said commands by controlling actuators in a high-speed closed loop based on feedback data from its integral sensors, allowing for the repositioning of the entire robotic system to the required workspace location. The repositioning single kinematic chain system 3712 attached to the positioner system 3713, with the appendage system 3714 attached to the repositioning single kinematic chain system 3712 and the wrist system 3715 attached to the ends of the arms articulation system 3714*a*, uses the same architecture described above, where each of their articulation subsystems 3712*a*, 3714*a* and 3715*a*, receive separate commands to their respective dedicated processor-based controllers to command their respective actuators and ensure proper command-following through monitoring built-in integral sensors to ensure tracking fidelity. The head system 3711 receives movement commands to the head articulation subsystem 3711*a*, where an integral and dedicated processor-based controller executes said commands by controlling actuators in a high-speed closed loop based on feedback data from its integral sensors.

The architecture is similar for the micro-manipulation subsystem. The micro-manipulation subsystem 3720, communicates with the product and process modelling subsystem 3740 through a dedicated sensor bus 3771, with the sensors associated with said subsystem responsible for sensing, modelling and identifying the immediate vicinity at the EoA, including the process of interaction and the state and progression of any product being handled or manipulated. The raw and processed micro-manipulation subsystem sensor data is then forwarded over its own sensor bus 3771 to the micro-manipulation planning and execution module 3751, where a set of separate processors are responsible for executing task-commands received from the mini-manipulation parallel task execution planner 3830, which in turn receives its task commands from the high-level mini-manipulation planner 3870 over a data and controller bus 3780, and controlling the micro-manipulation subsystem 3720 to complete said tasks based on the feedback it receives from the product and process perception and modelling module 3740, by sending commands over a dedicated controller bus 3761. Commands received through this controller bus 3761, are executed by each of the respective hardware modules within the instrumented EoA tooling subsystem 3720, including the hand system 3723 and the cooking-system 3722. The hand system 3723 receives movement commands to its palm and fingers articulation subsystem 3723*a* with its respective dedicated processor-based controllers commanding their respective actuators to ensure proper command-following through monitoring built-in integral sensors to ensure tracking fidelity. The cooking system 3722, which encompasses specialized tooling and utensils 3722*a* (which may be completely passive and devoid of any sensors or actuators or contain simply sensing elements without any actuation elements), is responsible for executing commands addressed to it, through a similar dedicated processor-based controller executing a high-speed control-loop based on sensor-feedback, by sending motion commands to its integral actuators. Furthermore, a vessel subsystem 3722*b* representing containers and processing pots/pans, which may be instrumented through built-in dedicated sensors for various purposes, can also be controlled over a common bus spanning between the hand system 3723 and the cooking system 3722.

FIG. 142 depicts a block diagram illustrating one embodiment of an architecture for multi-level generation process of minimanipulations and commends based on perception and model data, sensor feedback data as well as mini-manipulation commands based on action-primitive components, combined and checked prior to being furnished to the mini-manipulation task execution planner responsible for the macro- and micro manipulation subsystems in accordance with the present disclosure.

A high-level task executor 3900 provides a task description to the mini-manipulation sequence selector 3910, that selects candidate action-primitives (elemental motions and controls) separately to the separate macro- and micro-manipulation subsystems 3810 and 420 respectively, where said components are processed to yield a separate stack of commands to the mini-manipulation parallel task execution planner 430 that combines and checks them for proper functionality and synchronicity through simulation, and then forwards them to each of the respective macro- and micro-manipulation planner and executor modules 350 and 351, respectively.

In the case of the macro-manipulation subsystem, input data used to generate the respective mini-manipulation command stack sequence, includes raw and processed sensor feedback data 3860 from the instrumented base, environment perception and modelling data 3850 from the world perception modeller 330. The incoming mini-manipulation component candidates 491 are provided to the macro mini-manipulation database 3811 with its respective integral descriptors, which organizes them by type and sequence 3815, before they are processed further by its dedicated mini-manipulation planner 3812; additional input to said database 3811 occurs by way of mini-manipulation candidate descriptor updates 3814 provided by a separate learning process described later. Said macro manipulation subsystem planner 3812 also receives input from the mini-manipulation progress tracker 3813, which is responsible to provide progress information on task execution variables and status, as well as observed deviations, to said planning system 3812. The progress tracker 3813 carries out its tracking process by comparing inputs comprising of the required baseline performance 3817 for each task-execution element with sensory feedback data 3860 (raw & processed) from the instrumented base as well as environment perception and modelling data 3850 in a comparator, which generates deviation data 3816 and process improvement data 3818 comprising of performance increases through descriptor variable and constant modifications developed by an integral learning system, back to the planner system 3812.

The mini-manipulation planner system 3812 takes in all these input data streams 3816, 3818 and 3815, and performs a series of steps on this data, in order to arrive at a set of sequential command stacks for task execution commands 3892 developed for the macro-manipulation subsystem, which are fed to the mini-manipulation parallel task execution planner 3830 for additional checking and combining before being converted into machine-readable mini-manipulation commands 3870 provided to each macro- and micro-manipulation subsystem separately for execution. The mini-manipulation planner system 3812 generates said command sequence 3892, through a set of steps, including but not limited to nor necessarily in this sequence but also with possible internal looping, passing the data through: (i) an optimizer to remove any redundant or overlapping task-execution timelines, (ii) a feasibility evaluator to verify that each sub-task is completed according a to a given set of metrics associated with each subtask, before proceeding to the next subtask, (iii) a resolver to ensure no gaps in execution-time or task-steps exist, and finally (iv) a combiner to verify proper task execution order and end-result, prior to forwarding all command arguments to (v) the mini-manipulation command generator that maps them to the physical configuration of the macro-manipulation subsystem hardware.

The process is similar for the generation of the command-stack sequence of the mini-manipulation subsystem 3820, with a few notable differences identified in the description below. As above, input data used to generate the respective mini-manipulation command stack sequence for the micro-manipulation subsystem, includes raw and processed sensor feedback data 3890 from the EoA tooling, product process and modelling data 3880 from the interaction perception modeller 3740. The incoming mini-manipulation component candidates 3892 are provided to the micro mini-manipulation database 3821 with its respective integral descriptors, which organizes them by type and sequence 3825, before they are processed further by its dedicated mini-manipulation planner 3822; additional input to said database 3821 occurs by way of mini-manipulation candidate descriptor updates 3824 provided by a separate learning process described previously and again below. Said micro manipulation subsystem planner 3822 also receives input from the mini-manipulation progress tracker 3823, which is responsible to provide progress information on task execution variables and status, as well as observed deviations, to said planning system 3822. The progress tracker 3823 carries out its tracking process by comparing inputs comprising of the required baseline performance 3827 for each task-execution element with sensory feedback data 3890 (raw & processed) from the instrumented EoA-tooling as well as product and process perception and modelling data 3880 in a comparator, which generates deviation data 3826 and process improvement data 3828 comprising of performance increases through descriptor variable and constant modifications, developed by an integral learning system, back to the planner system 3822.

The mini-manipulation planner system 3822 takes in all these input data streams 3826, 3828 and 3825, and performs a series of steps on this data, in order to arrive at a set of sequential command stacks for task execution commands 3893 developed for the micro-manipulation subsystem, which are fed to the mini-manipulation parallel task execution planner 3830 for additional checking and combining before being converted into machine-readable mini-manipulation commands 3870 provided to each macro- and micro-manipulation subsystem separately for execution. AS for the macro-manipulation subsystem planning process outlined for 3812 before, the mini-manipulation planner system 3822 generates said command sequence 3893, through a set of steps, including but not limited to nor necessarily in this sequence but also with possible internal looping, passing the data through: (i) an optimizer to remove any redundant or overlapping task-execution timelines, (ii) a feasibility evaluator to verify that each sub-task is completed according a to a given set of metrics associated with each subtask, before proceeding to the next subtask, (iii) a resolver to ensure no gaps in execution-time or task-steps exist, and finally (iv) a combiner to verify proper task execution order and end-result, prior to forwarding all command arguments to (v) the mini-manipulation command generator that maps them to the physical configuration of the macro-manipulation subsystem hardware.

FIG. 143 depicts the process by which mini-manipulation command-stack sequences are generated for any robotic system, in this case deconstructed to generate two such command sequences for a single robotic system that has been physically and logically split into a macro- and micro-manipulation subsystem, which provides an alternate approach to FIG. 142. The process of generating mini-manipulation command-stack sequences for any robotic system, in this case a physically and logically split macro- and micro-manipulation subsystem receiving dedicated macro- and micro-manipulation subsystem command sequences 3891 and 3892, respectively, requires multiple processing steps be executed, by a mini-manipulation action-primitive (AP) components selector module 3910, on high-level task-executor commands 3950, combined with input utilizing all available action-primitive alternative (APA) candidates 3940 from an AP-repository 3920.

The AP-repository is akin to a relational database, where each AP described as $AP_1$ through $AP_n$ (3922, 3923, 3926, 3927) associated with a separate task, regardless of the level of abstraction by which the task is described, consists of a set of elemental $AP_i$-subblocks ($APSB_1$ through $APSB_m$; $\mathbf{3922}_{1\rightarrow m}$, $\mathbf{3923}a_{1\rightarrow m}$, $\mathbf{3927}a_{1\rightarrow m}$) which can be combined and concatenated in order to satisfy task-performance criteria or metrics describing task-completion in terms of any individual or combination of such physical variables as time, energy, taste, color, consistency, etc. Hence any complexity of task can be described through a combination of any number of AP-alternatives ($APA_a$ through $APA_z$; 3921, 3925), which could result in the successful completion of a specific task, well understanding that there is more than a single $APA_i$ that satisfies the baseline performance requirements of a task, however they may be described.

The mini-manipulation AP components sequence selector 3910 hence uses a specific APA selection process 3913 to develop a number of potential $APA_{a\ thru\ z}$ candidates from the AP repository 3920, by taking in the high-level task executor task-directive 3940, processing it to identify a sequence of necessary and sufficient sub-tasks in module 3911, and extracting a set of overall and subtask performance criteria and en-states for each sub-task in step 3912, before forwarding said set of potentially viable APs for evaluation. The evaluation process 3914 compares each $APA_i$ for overall performance and en-states along any of multiple stand-alone or combined metrics developed previously in 3912, including such metrics as time required, energy-expended, workspace required, component reachability, potential collisions, etc. Only the one $APA_i$ that meets a pre-determined set of performance metrics is forwarded to the planner 3915, where the required movement profiles for the macro- and micro manipulation subsystems are generated in one or more movement spaces, such as joint- or Cartesian-space. Said trajectories are then forwarded to the synchronization module 3916, where said trajectories are processed further by concatenating individual trajectories into a single overall movement profile, each actuated movement s synchronized in the overall timeline of execution as well as with its preceding and following movements, and combined further to allow for coordinated movements of multi-arm/-limb robotic appendage architectures. The final set of trajectories are then passed to a final step of mini-manipulation generation 3917, where said movements are transformed into machine-executable command-stack sequences that define the mini-manipulation sequences for a robotic system. In the case of a physical or logical separation, command-stack sequences are generated for each subsystem separately, such as in this case for the macro-manipulation subsystem command-stack sequence 3891 and the micro-manipulation subsystem command-stack sequence 3892.

FIG. 144 depicts a block diagram illustrating another embodiment of the physical layer structured as a macro-manipulation/micro-manipulation in accordance with the present disclosure.

The hardware systems innate within each the macro- and micro-manipulation subsystems are reflected at both the macro-manipulation subsystem level through the instrumented articulated and controller-actuated articulated base 4010, and the micro-manipulation level through the instrumented articulated and controller-actuated humanoid-like appendages 4020 subsystems. Both are connected to their perception and modelling systems 4030 and 4040, respectively.

In the case of the macro-manipulation subsystem 4010, a connection is made to the world perception and modelling subsystem 4030 through a dedicated sensor bus 4070, with the sensors associated with said subsystem responsible for sensing, modelling and identifying the world around the entire robot system and the latter itself, within said world. The raw and processed macro-manipulation subsystem sensor data is then forwarded over the same sensor bus 4070 to the macro-manipulation planning and execution module 4050, where a set of separate processors are responsible for executing task-commands received from the task mini-manipulation parallel task execution planner 3830, which in turn receives its task commands from the high-level mini-manipulation task/action parallel execution planner 3870 over a data and controller bus 4080, and controlling the macro-manipulation subsystem 4010 to complete said tasks based on the feedback it receives from the world perception and modelling module 4030, by sending commands over a dedicated controller bus 4060. Commands received through this controller bus 4060, are executed by each of the respective hardware modules within the articulated and instrumented base subsystem 4010, including the positioner system 4013, the repositioning single kinematic chain system 4012, to which is attached the central control system 4011.

The positioner system 4013 reacts to repositioning movement commands to its Cartesian XYZ positioner 4013*a*, where an integral and dedicated processor-based controller executes said commands by controlling actuators in a high-speed closed loop based on feedback data from its integral sensors, allowing for the repositioning of the entire robotic system to the required workspace location. The repositioning single kinematic chain system 4012 attached to the positioner system 4013, uses the same architecture described above, where each of their articulation subsystems 4012*a* and 4013*a*, receive separate commands to their respective dedicated processor-based controllers to command their respective actuators and ensure proper command-following through monitoring built-in integral sensors to ensure tracking fidelity. The central control system 4011 receives movement commands to the head articulation subsystem 4011*a*, where an integral and dedicated processor-based controller executes said commands by controlling actuators in a high-speed closed loop based on feedback data from its integral sensors.

The architecture is similar for the micro-manipulation subsystem. The micro-manipulation subsystem 4020, communicates with the interaction perception and modeller subsystem 4040 responsible for product and process perception and modelling, through a dedicated sensor bus 4071, with the sensors associated with said subsystem responsible for sensing, modelling and identifying the immediate vicinity at the EoA, including the process of interaction and the state and progression of any product being handled or manipulated. The raw and processed micro-manipulation subsystem sensor data is then forwarded over its own sensor bus 4071 to the micro-manipulation planning and execution module 4051, where a set of separate processors are responsible for executing task-commands received from the mini-manipulation parallel task execution planner 3830, which in turn receives its task commands from the high-level mini-manipulation planner 3870 over a data and controller bus 4080, and controlling the micro-manipulation subsystem 4020 to complete said tasks based on the feedback it receives from the interaction perception and modelling module 4040, by sending commands over a dedicated controller bus 4061. Commands received through this controller bus 4061, are executed by each of the respective hardware modules within the instrumented EoA tooling subsystem 4020, including the one or more single sinematic chain system 4023, to which is attached the wrist system 4025, to which in turn is attached the hand-/end-effector system 4023, allowing for the handling of the thereto attached cooking-system 4022. The single kinematic chain system contains such elements as one or more limbs/legs and/or arms subsystems 4024*a*, which receive commands to their respective elements each with their respective dedicated processor-based controllers commanding their respective actuators to ensure proper command-following through monitoring built-in integral sensors to ensure tracking fidelity. The wrist system 4025 receives commands passed through the single kinematic chain system 4024 which are forwarded to its wrist articulation subsystem 4025*a* with its respective dedicated processor-based controllers commanding their respective actuators to ensure proper command-following through monitoring built-in integral sensors to ensure tracking fidelity. The hand system 4023 which is attached to the wrist system 4025, receives movement commands to its palm and fingers articulation subsystem 4023*a* with its respective dedicated processor-based controllers commanding their respective actuators to ensure proper command-following through monitoring built-in integral sensors to ensure tracking fidelity. The cooking system 4022, which encompasses specialized tooling and utensil subsystem 4022*a* (which may be completely passive and devoid of any sensors or actuators or contain simply sensing elements without any actuation elements), is responsible for executing commands addressed to it, through a similar dedicated processor-based controller executing a high-speed control-loop based on sensor-feedback, by sending motion commands to its integral actuators. Furthermore, a vessel subsystem 4022*b* representing containers and processing pots/pans, which may be instrumented through built-in dedicated sensors for various purposes, can also be controlled over a common bus spanning from the single kinematic chain system 4024, through the wrist system 4025 and onwards through the hand/effector system 4023, terminating (whether through a hardwired or a wireless connection type) in the operated object system 4022.

FIG. 145 depicts a block diagram illustrating another embodiment of an architecture for multi-level generation process of minimanipulations and commends based on perception and model data, sensor feedback data as well as mini-manipulation commands based on action-primitive components, combined and checked prior to being furnished to the mini-manipulation task execution planner responsible for the macro- and micro manipulation subsystems in accordance with the present disclosure.

As tends to be the case with manipulation system, particularly those requiring substantial mobility over larger workspaces while still needing appreciable endpoint motion accuracy, as is shown in this alternate embodiment in FIG. 900, they can be physically and logically subdivided into a macro-manipulation subsystem comprising of a large workspace positioner 4140, coupled with an articulated body 4142 comprising multiple elements 4110 for coarse motion, and a micro-manipulation subsystem 4120 utilized for fine motions, physically joined and interacting with the environment 4138, which may contain multiple elements 4130.

For larger workspace applications, where the workspace exceeds that of a typical articulated robotic system, it is possible to increase the systems' reach and operational boundaries by adding a positioner, typically capable of movements in free-space, allowing movements in XYZ (three translational coordinates) space, as depicted by 4140 allowing for workspace repositioning 4143. Such a positioner could be a mobile wheeled or legged base, aerial platform, or simply a gantry-style orthogonal XYZ positioner, capable of positioning an articulated body 4142. Such an articulated body 4142 targeted at applications where a humanoid-type configuration is one of the possible physical robot instantiations, said articulated body 4142 would describe a physical set of interlinked elements 4110, comprising of upper-extremities 4117 and lower-extremities 4117*a*. Each of these interlinked elements within the macro-manipulation subsystem 4110 and 4140 would consist of an instrumented articulated and controller-actuated sub-elements, including a head 4111 replete with a variety of environment perception and modelling sensing elements, connected to an instrumented articulated and controller-actuated shouldered torso 4112 and an instrumented articulated and controller-actuated waist 4113. The waist 4113 may also have attached to its mobility elements such as one or more legs 3535, or even articulated wheels, in order to allow the robotic system to operate in a much more expanded workspace. The shoulders in the torso can have attachment points for mini-manipulation subsystem elements in a kinematic chain described further below.

A micro-manipulation subsystem 4120 physically attached to the macro-manipulation subsystem 4110 and 4140, is used in applications where fine position and/or velocity trajectory-motions and high-fidelity control of interaction forces/torques is required, that a macro-manipulation subsystem 4110, whether coupled to a positioner 4140 or not, would not be able to sense and/or control to the level required for a particular domain-application. The micro-manipulation subsystem 4120 consists of shoulder-attached linked appendages 4116, such as one (typically two) or more instrumented articulated and controller-actuated jointed arms 4114 to each of which would be attached an instrumented articulated and controller-actuated wrist 4118. It is possible to attach a variety of instrumented articulated and controller-actuated end-of-arm (EoA) tooling 4125 to said mounting interface(s). While a wrist 4118 itself can be an instrumented articulated and controller-actuated multi-degree-of-freedom (DoE; such as a typical three-DoF rotation configuration in roll/pitch/yaw) element, it is also the mounting platform to which one may choose to attach a highly dexterous instrumented articulated and controller-actuated multi-fingered hand including fingers with a palm 4122. Other options could also include a passive or actively controllable fixturing-interface 4123 to allow the grasping of particularly designed devices meant to mate to the same, many times allowing for a rigid mechanical and also electrical (data, power, etc.) interface between the robot and the device. The depicted concept need not be limited to the ability to attach fingered hands 4122 or fixturing devices 4123, but potentially other devices 4124, through a process which may include rigidly anchoring them to the surface, or even other devices.

The variety of endeffectors 4126 that can form part of the micro-manipulation subsystem 4120 allow for high-fidelity interactions between the robotic system and the environment/world 4138 by way of a variety of devices 4130. The types of interactions depend on the domain application 4139. In the case of the domain application being that of a robotic kitchen with a robotic cooking system, the interactions would occur with such elements as cooking tools 4131 (whisks, knives, forks, spoons, whisks, etc.), vessels including pots and pans 4132 among many others, appliances 4133 such as toasters, electric-beater or -knife, etc., cooking ingredients 4134 to be handled and dispensed (such as spices, etc.), and even potential live interactions with a user 4135 in case of required human-robot interactions called for in the recipe or due to other operational considerations.

In some embodiments, a multi-level robotic system for high speed and high fidelity manipulation operations segmented into two physical and logical subsystems made up of instrumented, articulated and controller-actuated subsystems, each comprising of a larger- and coarser-motion macro-manipulation system responsible for operations in larger unconstrained environment workspaces at a reduced endpoint accuracy, and a smaller- and finer-motion micro-manipulation system responsible for operations in a smaller workspace and while interacting with tooling and the environment at a higher endpoint motion accuracy, each carrying out mini-manipulation trajectory-following tasks based on mini-manipulation commands provided through a dual-level database specific to the macro- and micro-manipulation subsystems, and each supported by a dedicated and separate distributed processor and sensor architecture operating under an overall real-time operating system communicating with all subsystems over multiple bus interfaces specific to sensor-, command and database-elements.

In some embodiments, the macro-manipulation subsystem contains dedicated sensors, actuators and processors interconnected over one or more dedicated interface buses, including a sensor suite used for perceiving the surrounding environment, which includes imaging and mapping the same and modeling elements within the environment and identifying said elements, performing macro-manipulation subsystem relevant motion planning in one or more of Joint- and/or Cartesian-space based on mini-manipulation commands provided by a dedicated macro-level mini-manipulation library, executing said commands through position or velocity or joint or force based control at the joint-actuator level, and providing sensory data back to the macro-manipulation control and perception subsystems, while also monitoring all processes to allow for learning algorithms to provide improvements to the mini-manipulation macro-level command-library to improve future performance based on criteria such as execution-time, energy-expended, collision-avoidance, singularity-avoidance and workspace-reachability.

In some embodiments, the micro-manipulation subsystem contains dedicated sensors, actuators and processors interconnected over one or more dedicated interface buses, including a sensor suite used for perceiving the immediate environment, which includes imaging and mapping the same and modeling elements within the environment and identifying said elements, particularly as it relates to interaction variables between the micro-manipulation system and associated tools during contact with the environment itself, performing micro-manipulation subsystem relevant motion planning in one or more of joint- and/or Cartesian-space based on mini-manipulation commands provided by a dedicated micro-level mini-manipulation library, executing said commands through position or velocity or joint or force based control at the joint-actuator level, and providing sensory data back to the micro-manipulation control and perception subsystems, while also monitoring all processes to allow for learning algorithms to provide improvements to the mini-manipulation micro-level command-library to improve future performance based on criteria such as execution-time, energy-expended, collision-avoidance, singularity-avoidance and workspace-reachability.

In some embodiments, a robotic cooking system configured into at least a dual-layer physical and logical macro-manipulation and micro-manipulation system capable of independent and coordinated task-motions by way of instrumented, articulated and controller-actuated subsystems, where the macro-manipulation system is used for coarse positioning of the entire robot assembly in free space using its own dedicated sensing-, positioning and motion execution subsystems, with a thereto attached one or more respective micro-manipulation subsystems for local sensing, fine-positioning and motion execution of the end effectors interacting with the environment, with both of the macro- and micro-manipulation system each configured with their own separate and dedicated buses for sensing, data-communication and control of associated actuators with their associated processors, with each of the macro- and micro-manipulation system receiving motion and behavior commands based on separate mini-manipulation commands from their dedicated planners, and with each planner receiving coordinated time- and process-progress dependent mini-manipulation commands from a central planner.

In some embodiments, the macro-manipulation system comprising of a large workspace translational Cartesian-space positioner with an attached body system made up of a sensor-head connected to a shoulder and torso with one or more articulated multi-jointed manipulator arms each with a thereto attached wrist capable of positioning one or more of the micro-manipulation subsystems via dedicated sensors and actuators interfaced through at least one or more dedicated controllers.

In some embodiments, the mini-manipulation system comprising of at least one thereto attached palm and dexterous multi-fingered end-of-arm end effector for handling utensils and tools, as well as any vessel needed in any stages of dish preparation cooking, via dedicated sensors and actuators interfaced through at least one or more controllers.

In some embodiments, where a set of legs or wheels is attached to a waist attached to the macro-manipulation system for larger workspace movements.

In some embodiments, providing sensor feedback data to a world perception and modeling system responsible for perceiving the macro-manipulation subsystem free-space environment as well as the entire robotic system pose.

In some embodiments, providing said world perception feedback and model data over one or more dedicated interface buses to a dedicated macro-manipulation planning, execution and tracking module operating on one or more stand-alone and separate processors.

In some embodiments, macro-manipulation motion commands may be provided from a separate stand-alone task-decomposition and planning module.

In some embodiments, a planning system generating mini-manipulation command-stack sequence that is configured to perform planning actions for the entire robot system combining and coordinating separately planned mini-manipulations from the macro- and micro-planners, where the macro-manipulation planner plans and generates time- and process-progress dependent mini-manipulations for the macro-manipulation subsystem, and where the micro-manipulation planner plans and generates time- and process-progress dependent mini-manipulations for the micro-manipulation subsystem.

In some embodiments, each of the subsystem planners may include a task-progress tracking module, a mini-manipulation planning module, and a mini-manipulation database for macro-manipulation tasks.

In some embodiments, the task-progress tracking module may include progress comparator module that tracks differences between commanded and actual task progress, model and environment data as well as product and process model data combined with all relevant sensor feedback data, and a learning module that creates and tracks variations that impact deviations in the descriptors of said mini-manipulations for potential future upgrades to the respective database.

In some embodiments, the mini-manipulation planning system module which generates mini-manipulation commands based on a set of steps that use mini-manipulation commands from a database which subsequently get evaluated for applicability, resolved for application to individual movable components, combined in space for a smooth motion profile, and optimized for optimum timing and subsequently translated into a machine-readable set of mini-manipulation commands configured into a command-stack sequence.

In some embodiments, mini-manipulation commands for one or both the macro- or micro-manipulation subsystems may be generated, through a process of receiving a high-level task-execution command, and selecting from an action-primitive repository, a set of alternative action primitives that are evaluated and selected to achieve the commanded task based on a set of pre-determined criteria of importance to the application which describe the required entry boundary conditions as well as the minimum necessary exit boundary conditions defining a successful task-completion state at its start and its completion.

In some embodiments, the process of mini-manipulation command generation for one or both the macro- or micro-manipulation subsystems, comprises receiving a high-level task execution command, identifying individual subtasks which will be mapped to the applicable robotic subsystems, generation of individual performance criteria and measurable success end-state criteria for each of the above subtasks, selection of one or more in either a stand-alone or combination, of the most suitable action primitive candidates, evaluation of these action primitive alternatives for maximizing or minimizing such measures as execution-time, energy expended, robot reachability, collision avoidance or any other task-critical criteria, generation of either or both macro- and/or micro-manipulation subsystem trajectories in one or more motion spaces, including joint- and Cartesian-space, synchronizing said trajectories for path consecutiveness, path-segment smoothness, intra-segment time-stamp synchronization and coordination amongst multi-arm robot subsystems, and generating a machine-executable command-sequence stack for one or both the macro- and/or micro manipulation subsystems.

In some embodiments, the step of receiving mini-manipulation descriptor updates generated during the mini-manipulation progress tracking and performance learning process, may involve extracting relevant constants and variables related to specific mini-manipulations and their associated action primitives, assigning variances for each variable and constant for each affected action primitive, and providing the updates back to the action-primitive repository to allow each of the updates to be logged and implemented within said repository or database.

AP Execution Process

FIG. 147 depicts a block diagram illustrating a data structure of a functional action primitive (FAP). A functional action primitive, which consists of alternative sequences (AP Alternative) of APSBs, is executed in the following way: First, the APSBs are customized according to the minimanipulation they are a part of. Then, if present, appliance commands are sent to kitchen appliances. If an APSB specifies a robot movement, it is are planned and evaluated for reachability and collisions and the preferred alternative sequence one is chosen. If it contains a Cartesian trajectory, it will be planned, if possible similar to the current configuration of the robot in order to allow smooth transitions. In between planned Cartesian trajectories or joint space trajectories, motions are planned to move the robot from its last configuration to the start of the following trajectories. This process is then repeated for all trajectories in the selected FAP Alternative. After all of these partial plans are calculated, they are concatenated, postprocessed, and sent to the robot for execution and cached for optimization.

To do reliable and efficient manipulations in unstructured environments, objects and the robot are brought into standardised positions, then pre-calculated movement plans are executed on the robot. Planning for repeated parts of the manipulation is done off-line to allow for better quality and immediately available plans.

Functional Action Primitive (FAP) Data Structure

Functional action primitives are the minimal building blocks a MM consists of. The AP data structure is shown in illustration, although not all fields are necessary. They are simple actions of the robotic kitchen that can be reused in multiple minimanipulations and recipes. An AP consists of multiple AP Alternatives (APA) which represent alternative actions that reach the same final state. APAs are prioritized according to their preferability (which can include duration of execution, safety distance from objects, energy usage or others). An APA contains an ordered list of AP Sub Blocks (APSB), which are either robot trajectories, vision system commands or appliance commands. All APSBs in an APA are associated with a start timestamp, which implicitly also defines the order in which they are to be executed, possible breaks in between, and simultaneous execution when this timing overlaps as described later. A robot trajectory can either be a joint space trajectory, which defines the position for all robot joints in time and in the robot's joint space, or a Cartesian trajectory, which defines the position of an object or a robot end effector in the kitchen's Cartesian space.

Functional Action Primitive Execution

An example minimanipulation includes five FAPs with one to three APSBs is displayed in FIG. 178, which instructs the robot to do the following:

1. Get a container that is already filled with some contents
2. Get a spoon with the other hand
3. Move the container contents using the spoon, dropping them into a pot
4. Put the spoon back
5. Dispose the container into the sink Functional Action Primitive Alternative (FAPA) Selection To select the preferred FAPA, all available FAPAs are prepared and tested for executability according to the following process in the prioritized order, and the first one that is executable will be executed.

Pre/Postprocessing

Parameters

FAPs are meant to be reusable in different contexts and they possess parameters to make them customisable. Values for these parameters are passed down from the minimanipulation that uses the AP. In preparation for the AP execution process, all parameters are evaluated and a working copy of the AP is modified according to them. One of this parameters is the speed factor. It is a factor that scales the trajectory speed, and is applied by multiplying all timestamps with it (which are relative to the start of the AP).

Coordinating Multiple Arms

First, by evaluating all of the FAP's FAPSBs start timestamps and durations, overlaps in time are detected, which—in the case of FAPSBs with Cartesian trajectories—mean that multiple arms are supposed to perform a specified action at the same time. Arms that have a specified trajectory are called active, the others passive.

There are two simple possibilities for the passive arm(s) to behave: They can either keep their joints in the same joint space configuration or keep their respective end effectors in their respective Cartesian Poses (position and orientations). If the robot has no joints that are shared amongst the kinematic chains between the base and any end effector, these two possibilities behave the same.

Other than that, the passive arms can be allowed to do any movement as long as it is collision free. Which behavior is executed is specified by the FAP data. An example action that would specify the passive end effector to keep in its position is stirring (active arm) while holding the pot (passive arm). By using FAPSB timing information and a simple logical behavior switch for the passive arm(s) as described above, creating FAPs is simplified and their maintainability and reusability is increased.

If there are multiple active arms at any time in the FAP, it means that the trajectories of those arms needs to be planned for together, then for the transitions between a different number of active arms, motion plans must be calculated.

Converting Object Trajectories to Robot Trajectories

If the FAP has specified a trajectory for an object that is attached to the robot, the object's trajectory is converted to an end effector trajectory (which is part of the kinematic chain) by using either a saved transformation from the used grasp or the last known geometric relation between the object and the robot end effector. This is to plan a movement trajectory for the robot by using an inverse kinematics solver for chain robots, which requires that a trajectory defines the movement of a part of the kinematic chain.

Allowed Contacts

To simplify models of real world objects, all models are riding, while real objects deform when in contact with each other due to the contact forces. Also for other reasons, real objects are never represented by models perfectly. Therefore, when Motion Planning or Cartesian Planning, if contacts between multiple objects are supposed to happen, for example when grasping an object, the planning algorithm must ignore collisions between the specified objects.

The information when to allow and disallow contacts (which for the planner are collisions) is stored in the FAPSB that contains the respective trajectories and must be forwarded to the planner before and after execution of those trajectories.

Grasp State

If an FAPSB contains information about a change in grasp status, this change is implemented by logically attaching or deattaching an object from the robot's kinematic chain after the APSB has been executed. This change will cause Motion or Cartesian Planners to consider collisions by the attached objects and allow the system to update the object's position based on the movement of the kinematic chain.

Dynamic Object Attributes

An FAPSB can contain information about transitions in dynamic object attributes. This can for example be about a container containing a certain amount of water after executing an APSB that fills uses the tap, or a pot having a lid attached after placing the lid above the pot. This information is used in future actions for example for collision detection.

Planning

Planning is the process of turning a goal or requirement for a movement into a series of joint space configurations that fulfil this goal. Before any planning starts, the internal representation of the world the robot must be updated to correspond to their real counterparts.

Motion Planning

The process of finding a joint space path that moves the robot from a start configuration to an end configuration without collisions is called Motion Planning. Start and end configuration always contain all joints of the robot. It is done using an algorithm that samples the joint space looking for collision free configurations, then generating a graph between the samples and connecting it with start and end configurations. Any path between start and end on this graph is a valid motion plan that fulfils the requirements.

Motion Planning can be done while considering various constraints. This constraints can include an end effector orientation constraint in order to hold a container upright to not drop its contents. Constraints are implemented in the planner by randomly varying its sample configurations until the constraints are met.

Motion Planning is done without any timing information and its plans are made executable in the postprocessing step.

Cartesian Planning

When a Cartesian movement is to be executed by the robot, Cartesian Planning generates a joint space trajectory that fulfils this movement. The input of Cartesian Planning is a list of Cartesian trajectories, each for a different robot end effector.

Feasibility Check

Before a set of trajectories is planned for, a feasibility check is done. This check will calculate reachability of the end effector Poses and collisions only by the end effector and its statically connected arm links. This check is a necessary criterion for executability and is a fast way to detect trajectories that cannot be executed, in order for the system to skip the current AP Alternative and continue with the next one.

It is implemented by first trying to finding an IK solution for all given trajectory poses without considering collisions. If at least one poses has no IK solution, the trajectory is not executable. If all poses have corresponding IK solutions, the check continues: Now, the trajectory is executable if and only if for all trajectory poses, the end effector and its statically connected arm links are not in collision.

Pseudocode:

```
Bool trajectoryIsFeasible(trajectory)
    Foreach (pose in trajectory)
        solution = IK(pose, collision_check=false)
        if (!solution)   // No solution found
            return false
        else if (linksInCollision(solution,
        link_group=eef_and_statically_connected_links))
            return false
    return true
```

Planning

When planning for a Cartesian movement, typically only a subset of the robot's degrees of freedom are used. The redundant degrees of freedom can therefore be used to optimize the movement. As a Cartesian movement is typically executed in the context of a recipe with other movements, all Cartesian plans are done in a similar configuration. Because the movements are recorded by humans for a humanoid robot to perform actions that are typically performed by humans, the preferred configuration which all movements should be similar to is defined as a humanlike standby configuration as depicted in FIG. 149.

The Cartesian planner finds similar IK solutions for the whole trajectory. This similarity in joint space ensures minimal movements between the trajectory poses. Similarity is achieved by using an iteratively optimizing IK solver, starting the search for each pose with the solution of the previous one. The first solution is based on the preferred humanlike configuration or another configuration specified by the system that coordinates the planner (see next section). This way, the IK solver will follow the same local optimum while planning for the whole trajectory. Each IK solution must be collision free and must be similar to the last solution. If an IK solver cannot find a similar solution, the search will be restarted with a different configuration for the first pose. Candidates for this configuration are different saved preferred humanlike configurations or random variations of it, or if necessary completely random configurations. For some APSBs, it may also be suitable to use a configuration specific to this FAPSB.

In the case of input trajectories that cover only a part of the robot, a static configuration is specified for the passive arms and kept during the planning process, or the other arm is put into any position that does not collide as described above. The IK solver then only considers the active parts of the robot, but collision checking still needs to be done for the whole robot.

Cartesian Planning is done in the same resolution and with the same time information as the input trajectory and its plans may not be immediately executable because the movements of the input trajectory may be too fast for the robot to follow. Only the postprocessing step (see below) makes it executable.

Coordination Between the Plans

FAPSBs typically specify only certain parts of the recipe's robot movements, via Cartesian trajectories or Joint space trajectories. The intermediate movements that connect the ones specified by APSBs are implicit and done by Motion Planning. This is to increase flexibility and reusability.

FIG. 150 shows an example FAP for plan coordination that contains multiple FAPSBs of different type. The abbreviations are as follows:

L/R: Horizontal lanes for right/left arm

FAPSB:CT are the Cartesian trajectories requested by APSB

FAPSB:JT are the Joint-Space trajectories by APSB

FAPSB:Standby2 is a postures for the free arm on single arm plans

MP are the transitional motion plans

In order to provide smooth transitions between the different kinds of trajectories, the Cartesian Planning is always done first, trying to find a plan with joint space solutions similar the current state of the robot. Then, Motion Planning is done to move the robot from its current state to the start of the Cartesian trajectory.

As Cartesian trajectories are processed first with resulting joint space trajectories, Motion Planning is always done to connect these joint space trajectories, also generating a joint space trajectory. It can only be skipped if the joint space trajectories from the APs are already connected (the end configuration of the first FAP's joint space trajectory matches the beginning of the second AP's joint space trajectory.

Time Parametrization

As all plans are done without considering the dynamic properties of the robot, they may be too fast for the robot to execute. Therefore, before execution they are processed and parts of it may be slowed down using a suitable time parametrization algorithm.

Plan Caching (Saving and Reusing)

In order to speed up future planning, the resulting trajectory is saved together with environmental information and performance metrics. This includes the APSB identifier and version, all object positions and model information and model and state information for the kitchen and robot. Performance metrics can include the trajectory length (in joint space or Cartesian space), energy usage, or humanlikeness. To use a cached trajectory for an APSB, either all of the saved environment needs to be identical with the current environment, or the saved trajectory needs to be checked for collisions in the current environment.

To check the whole saved trajectory for collisions with the environment in an efficient manner, its bounding volume is calculated and saved together with it. This allows testing saved trajectories for validity in real time. A trajectory trail is displayed in FIG. 151: all joint space configurations of the trajectory are rendered in one frame. This trail is similar to the bounding volume.

Once a set of cached plans exist, for every new APSB that needs to be planned, saved trajectories are checked in the order of decreasing performance rating, so that the best feasible one is used.

Just-in-of-Time-Planning

Alternatively to alternate planning and executing, plans can be made once the future environment is known sufficiently enough. The system simulates the movement of the robot, objects and the change in environment caused by a certain APSB. This is possible because all APSBs have predictable outcomes. The planner can make a plan in this future environment for the APSB that follows. The plan must be invalidated if the environment changes in an unexpected way. Otherwise it can be executed. Using this method, it is possible to execute a sequence of APSBs (and in extension APs) without waiting for planning.

FIG. 152 depicts a timing diagram illustrating a sequence of execution and planning where planning is done while executing, except for the start of the sequence and one instance of an unexpected environment change that invalidates the plan and causes another planning attempt.

Manipulations in a Standard Environment

Being able to reuse cached trajectories has numerous advantages. As planning can be done ahead of time, more computationally expensive algorithms can be used and enough time can be given for calculation, not only to reliably find solutions at all, but also to find optimal solutions according to a performance metrics as mentioned above. Also, trajectories can be manually selected for performance metrics or criteria that are hard to formalizable (for example aesthetics) and it is easier to confirm their reliability when no planning is included.

As many robotic manipulation actions can be separated into: (1) moving objects and the robot into a defined configuration, and (2) doing manipulations using these objects and configuration.

It is worthwhile to also split up the planning tasks into a part that can be solved with optimized pre-planning and one that is solved with live planning (which is done just before execution).

To be able to use optimized pre-planned trajectories, the direct environment where the manipulation is to be executed must be in a defined state (standard direct environment). This means that all objects that can possibly collide with the robot and all objects that are manipulated or are needed for the manipulation are in positions that match the positions recorded together with the pre-planned trajectory. The positions may be specified in respect to the robot or in respect to the environment. The rest of the environment may be non-standardized. A cached trajectory is always associated with a direct environmental state and can only be reused once the real state matches the saved state.

So before executing a pre-planned manipulation, first all objects that are manipulated or are relevant for the manipulation must be moved to the position and orientation as defined by the pre-planned manipulation. This part of the handling possibly requires live planning to move objects from the non-standard environment to the standard environment.

FIG. 153 depicts one embodiment of the process in the object interactions in an unstructured environment. In order to move objects that are not in the direct standard environment, they need to be grasped using a standard grasp (a fingers joint space trajectory that has been tested before) and moved (using live Motion planning). If they cannot be grasped (because for example the handle is blocked), a non-standard move (which can include pushing the objects in some way) is planned live and executed, then another standard grasp and move attempt is made. This procedure will be repeated until an object is in the expected relation to the robot, then for all other objects.

An example for this in the kitchen context is grasping and moving ingredients and tools from the storage area (cluttered, unpredictable, changes often) to the worktop surface into a defined Poses, then moving the robot to the defined configuration, then executing a trajectory that grasps and mixes the ingredients using the tools.

With this method, optimal Cartesian and Motion Plans for standard environments are generated off-line in a dedicated and calculation resource intense way and then transferred to be used by the robot. The data modeling is implemented either by retaining the regular FAP structure and using plan caching, or by replacing some Cartesian trajectories in the FAPs by pre-planned joint space trajectories, including joint space trajectories to connect the trajectories for individual APSBs inside the APs to even replace some parts of live motion planning during the manipulations in the standard environment. In the latter case, there are two sets of FAPs: One set that has "source" Cartesian trajectories suitable for planning, and one with optimized joint space trajectories.

Tolerances for the differences between real direct environment and direct environment of the saved optimised trajectory, which can be determined using experimental methods, are saved per trajectory or per FAPSB.

Using pre-planned manipulations can be extended to include positioning the robot, especially along linear or axes, to be able to execute pre-planned manipulations on a variety of positions. Another application is placing a humanoid robot in a defined relation to other objects (for example a window in a residential house) and then starting a pre-planned manipulation trajectory (for example cleaning the window).

Time Management Scheme

FIG. 152 depicts a pictorial representation on the time sequence of planning and execution in complex Environment. The time management scheme that utilizes proposed applications is described herein. The time-course of planning and execution shown in FIG. 152 represent one preferable scenario when all planning times are less than execution time of the previous APSB. However, this might not be the case when the complexity of the inverse kinetics (IK) problem increases as happens in complex or changing environment. This happens because the number of constraints increases when checking if Cartesian trajectory is executable for more complex environment. As a result the waiting time between the consecutive APSBs becomes nonzero as shown in FIG. 154. In one embodiment, the time management scheme minimizes the sum of these waiting times.

Furthermore, we propose that time management scheme must not only reduce the average sum of waiting times between the executions of movements but also reduce the variability of total waiting time. Specifically, this is very important for cooking processes where the recipes set up the required timing for the operations. Thus, we introduce the cost function which is given by the probability of cooking failure, namely$P(\tau>\tau_{failure})$, where u is the total time of operation execution. Given the probability distribution $p(\tau)$ is determined by its average $<\tau>$ and the variance $\sigma_\tau^2$ and neglecting higher order $$P(\tau > \tau_{failure}) = \int_{\tau_{failure}}^{\infty} p(\tau)d\tau = f\left(\frac{\langle\tau\rangle - \tau_{failure}}{\sigma_\tau}\right),$$

moments some monotonic increasing function, (which is for example just the error function $f(x)=\mathrm{erf}(x)$ if the higher order moments indeed vanish and $p(\tau)$ has normal distribution). Therefore for the time management scheme it is beneficial to reduce both the average time and its variance, when the average is below the failure time. Since the total time is the sum of consequential and independently obtained waiting and execution times, the total average and variance are the sums of individual averages and variances. Minimizing the time average and variance at each individual scheme improves the performance by reducing the probability of cooking failure.

To reduce the uncertainty and thus the variance of the planning times (and therefore the variance in the waiting times) we propose to use the data sets of pre-planned and stored sequences that perform typical FAPs. These sequences are optimized beforehand with heavy computational power for the best time performance and any other relevant criteria. Essentially, their uncertainty is reduced to zero and thus they have zero contribution to the total time variance. So if the time management scheme finds a solution that allows the system to come to a pre-defined state from where the sequence of actions to reach the target state is known and does so before the cooking failure time, the probability of cooking failure is reduced to zero since it has zero estimated time variance. In general if the pre-defined sequence is just a part of a total AP it still does not contribute to the total time variance and has the beneficial effect on uncertainty of the total execution time.

To reduce the complexity and thus the average of the planning times (and therefore the average of the waiting times) we propose to use the data sets of pre-planned and stored configurations for which the number of constraints is minimal. As shown in FIG. 155 that illustrated complexity of inverse kinematics with constraints, if the complexity of inverse kinematics algorithm and thus the average time to find an executable solution increases faster than linear with the number of constraints (which is the case for all algorithms up to date) than we propose to use FAP alternatives (FAPA) obtained using pre-planned Cartesian trajectories or joint trajectories and object interactions that result in constraint removal. If Cartesian trajectory of the found sequence of solutions of IK problem cannot be executed due to a number of constraints the scheme implements simultaneous attempt to find FAPSB which will result in the removal of these constraints one-by one or several at a time. Performing a sequence of FAPSBs for consecutive removal of constraints will lead to linear dependency of the total waiting time on the number of constraints as shown in Illustration 8, therefore providing the lower upper boundary for the estimated waiting time while performing AP. To reduce the slope of that linear curve we propose to use a set of pre-planned FAPSBs to retract the robot arm to one the pre-set states and another set of pre-planned FAPSBs to remove the objects from the direct environment which may block the path and thus provide the constraints for Cartesian trajectory solutions of IK problem.

The logic of this scheme as follows, once the timeout to find a solution is reached (typically set by the execution time of previous FAPSB) and executable trajectory is not found we perform a transitional FAPSB from the incomplete FAPA which does not lead to the target state but rather leads to the new IK problem with reduced complexity. In effect we trade the unknown waiting time with long tail distribution and high average into a fixed time spent on the additional FAPSB and unknown waiting time for the new IK problem with lower average. The time course of the decisions made in this scheme is shown in FIG. 156, which shows information flow and generation of incomplete FAPAs. Before the timeout is reached we accumulate a set of complete FAPA and incomplete FAPA, when the timeout is reached we choose the FAPSB from the appropriate APA for execution according to the selection criteria described in the previous sections. If no complete APA is found we choose FAPSB from the set of incomplete FAPAs to avoid large waiting times. The choice of FAPSB from the incomplete FAPA is driven by the list of unfulfilled constraints for the non-executable solutions of IK problem. Namely we preferentially remove the constraints that are most often unsatisfied and prevent solutions of IK problem from execution. The example for this scenario would be the situation when a certain container blocks the path for the robotic arm to perform an action behind it, thus if no solution is found before the timeout we do not wait for the solution to emerge and instead we grab and remove that container from direct environment to a pre-set location outside of it, even if we did not obtain the complete FAPA to finish the FAP. In the case when the list of unsatisfied constraints is unavailable we reduce the number of constraints in a pre-planned manner where we remove the maximum number of constraints at a time. The example for such a pre-FAPA can be relocation of the object to a dedicated area with no other external objects or the retraction of the robotic arm to a standard initial position.

Between the internal and external constraints, the internal constraints are due to the limitations of the robotic arm movements and their role is increased when the joints are in complex positions. Thus the typical constraint removal APSB is the retraction of the robotic arm to one the pre-set joint configurations. The external constraints are due to the objects located in the direct environment. The typical constraint removal APSB is the relocation of the object to one of the pre-set locations. The separation of internal and external constraints is used for the selection of APA from the executable complete and incomplete sets.

To combine the complexity reduction with the uncertainty reduction to decrease both the average and the variance of the total execution time, the following structure of the pre-planned and stored data sets is proposed. The sequences of the IK solutions are stored for the list of manipulations with each type of objects that are executable in the dedicated area. In this area we have no external objects and the robotic arm is in one of the pre-defined standard positions. This ensures the minimal number of constraints. So if the direct solution for FAP is not readily obtained we find and use the solution for FAPA which leads to relocation of the object under consideration to a dedicated area, where the manipulation is performed. This result in a massive constraint removal and allows for the usage of pre-computed sequences that minimizes the uncertainty of the execution times. After the manipulation is performed in the dedicated area the object is returned to the working area to complete the FAP.

In some embodiments, time management system that minimizes the probability of failure to meet the temporal deadline requirements by minimizing the average and the variance of waiting times, comprising of pre-defined list of states and corresponding list of operations, pre-computed and stored set of optimized sequences of IK solutions to perform the operations in the pre-defined state, parallel search and generation of AP and APAs (Cartesian trajectories or sequences of IK solutions) towards the target state and the set of the pre-defined states, APSB selection among the executable APAs or AP, based on the performance metrics for the corresponding APA.

In some embodiments, the average and the variance of waiting times may be minimized with the use of pre-defined and pre-calculated states and solutions, which essentially produce zero contribution to the total average and variance when performed in a sequence of actions, from initial state to pre-defined state where the stored sequence is executed and then back to target state.

In some embodiments, the choice of the pre-defined states with minimal number of constraints, the empirically obtained list may include, but not limited to, a. Pre-defined state: the object is held by the robot in the dedicated area in a standardized position. These states are used when it is not possible to execute the action at the location of the object due to collisions and lack of space and thus relocation to a dedicated space is performed first;

b. Pre-defined state: the robotic arms (and their joints) are at the standard initial configuration. These states are used when the current joint configurations have complex structure and prevents execution due to internal collisions of the robotic arms, so the retraction of the robotic arms is done before new attempt to perform an action; and c. Pre-defined state: the external object is held by the robot in the dedicated area. These states are used when the external object blocks the path and causes a collision on a found non-executable trajectory, the grasping and the relocation of the object to the storage area is performed before returning to the main sequence.

In some embodiments, the APSB selection scheme performs the following sequence of choices:

d. If at a timeout one or several executable AP or APAs are found make a selection according to the performance metric based on, but not limited to total time of execution, energy consumption, aesthetics and the like; and e. If at a timeout non-executable solution is found, make the selection among the incomplete APAs which lead from current state to one of the pre-defined states even when the complete sequence to the target state is not known; and f. The APSB selection among the sets of incomplete APA is done according to the performance metric plus the number of the constraints removed by the incomplete APA. The preference is given to the incomplete APA which removes the maximum number of constraints FIG. 157 is a block diagram illustrating write-in and read-out scheme for a database of pre-planned solutions. The database of pre-planned solutions is created for the library of objects and corresponding manipulations with these objects. Numerous solutions of joint value trajectories are stored for each object and manipulation combination. These solutions differ in initial configuration of the robotic arms and the object. These datasets can be pre-calculated by systematically varying and sampling Cartesian coordinates of the initial location and configuration of the robotic arm and the object. Such database can be updated and expanded by writing in the joint value trajectories for the successful live planning operation. If the life planning procedure failed to produce a solution before the timeout, the scheme attempts to find a pre-stored solution that satisfies no collision conditions with current direct environment by comparing the volume of the pre-stored joint value trajectory with excluded volume due to the external objects in the direct environment. The database is structured in such a way that the data list of pre-stored solutions is sorted according to the performance metric, so that the most desirable solutions were attempted first.

FIG. 158A is a pictorial diagram illustrating examples of markers. Marker placed on the End Effector enables to estimate its pose with respect to central camera system (see more about types and features of vision subsystems in Vision System Overview chapter) and so workspace origin. This can be used for calibration and check of End Effector positioning accuracy, damage or run-out. Moley marker is binary square pattern, that contains logo and 8 dots (or their placeholders) encoding integer value in 0-255 range. Each dot indicates 1 at the corresponding bit of the binary encoding and absence of the dot indicates 0. Internal logo pattern is asymmetric which enables to use it as direction indicator: company's title is easily detected and indicates bottom side of the marker. Four corners of the outer marker's border serves pose estimation, which is performed in 4 steps: Camera is calibrated (e.g., focus length, principal point and distortion coefficients are estimated). This step is performed once. Projection matrix is computed in case of stereo camera. FIG. 158B illustrate some sample mathematical representations in computing the marker positions. Marker corners are located (pixel positions are computed) on the analyzed image from embedded or overhead camera. For stereo camera case corners are located on images from both left and right cameras. 3D real world coordinates of each corner with respect to the object's origin are known, os each point should fit the equation (pinhole camera model). Where U and V are pixel coordinates of the corner, fx, fy, cx, cy are camera's focus lengths and projection's center, X, Y and Z are real world coordinates of the corner in object's coordinate frame, and R, T are unknown object's rotation and translation matrices, which specifies object position and orientation with respect to the camera. By placing the coordinates of each corner to the formula we can get 12 equations and find R and T matrices by solving them using Ransac or any similar algorithm. Even though rotation matrix seem to have 9 unknowns, it's values are dependent in between and are derived from 3 rotation angles. That means, we only need to find 6 unknowns (3 angles and 3 shifts) by solving (minimizing) 12 equations. For overhead camera system, that is responsible for detecting object's on the working surface, we can reduce number of unknown parameters by 3, since object is laying on the known surface and so can only have 3 degrees of freedom (X, Y and angle of rotation around Z axis). In that case camera position with respect to the surface needs to be computed on the calibration stage. For embedded camera system, stereo camera is recommended to be used. In that case we have same equations for left and right images and so can find R and T with higher accuracy (directly, using RANSAC and similar or using triangulation). Triangle marker—For better accuracy markers can be grouped to complex geometry structures, for example—triangle. In addition to accuracy improvement this approach enables to utilize more direct ways to object pose estimation and navigating to Position 0. FIG. 159 is pictorial diagram illustrating opening of a bottle with one or more markers.

Robotic Operation Ecosystem

FIG. 159 illustrates a robotic operation ecosystem 5000, according to an exemplary embodiment. As shown, the robotic operation ecosystem 5000 includes a robotic assisted environment 5002, a robotic assistant management system 5004, a cloud computing system 5006, and one or more third party systems 5008-1, 5008-2, . . . , **5008-*n* (collectively referred to as "5008"). The robotic operation ecosystem 5000 also includes a network 5010 configured to enable communications between or among one or more of the robotic assisted environment 5002, robotic assistant management system 5004, cloud computing system 5006, and third party systems 5008. As described in detail herein, the robotic operation ecosystem 5000, including the systems therein independently and/or collectively, is configured to perform interactions within and/or impacting the robotic assisted environment 5002**—e.g., to achieve a particular objective (e.g., goal). In some embodiments, an objective is made up of one or more recipes, which are made up of one or more interactions or manipulations, as described in further detail herein.

More specifically, as illustrated in FIG. 179, the robotic assisted environment 5002 includes a robotic assisted workspace 5002*w* and a robotic assistant 5002*r* (also interchangeably referred to herein as "universal robotic assistant" or "robot"). The robotic assistant 5002*r* operates with the robotic assisted workspace 5002*w*, within the environment 5002, to, perform interactions and, as indicated above, achieve an objective. The robotic assisted environment 5002 can be any real-world, physical location, setting, surrounding, or area within which the robotic assistant 5002*r* can be deployed. For example, in some embodiments, the robotic assisted environment 5002 can be a kitchen, such as one of the robotic kitchens and/or chef kitchens described herein (e.g., FIG. 2: robotic kitchen 48, chef kitchen 44). It should be understood that the robotic assisted environment 5002 can be a kitchen (e.g., fully robotic, partially robotic (e.g., robotic assistant with human), and/or human operated) known to those of skill in the art, that is different than the kitchens described herein.

While a robotic kitchen is referenced herein as the type of robotic assisted environment 5002 in connection with some exemplary embodiments, it should be understood that the robotic assisted environment 5002 can be any of a number of other environments known to those of skill in the art. Moreover, as known to those of skill in the art, the functionality of robotic kitchens that are configured as the robotic assisted environment 5002 can be applied to other such environments.

Non-exhaustive illustrative examples of other types of robotic assisted environments 5002 are shown in Table 1 below. Table 1 below also illustrates examples of objectives to be achieved via interactions performed by a robotic assistant 5002*r* deployed in each corresponding type of robotic assisted environment.

TABLE 1

| Examples of Robotic Assisted Environments | Examples of Objectives |
|---|---|
| Factory | Operate machinery; perform quality assurance of product; execute emergency shutdown. |
| Warehouse | Monitor safety of premises; move stored goods. |
| Retail Shop | Restock shelves; monitor for unsafe conditions (e.g., spills). |
| Home | Clean rooms; wash laundry. |
| School | Teach a class. |
| Office | Perform printing functions; deliver interoffice mail. |
| Medical Facility (e.g., clinic, hospital) | Make/unmake patient beds; sterilize equipment. |
| Laboratory | Execute experiment. |
| Garden | Maintain plants; harvest. |
| Bathroom | Clean; refill products. |

Other examples of robotic assisted environments can include a street, bedroom living room, and the like.

As described above, the robotic assisted environment 5002 is associated with or includes a workspace 5002*w*. Although only a single workspace 5002*w* is illustrated in connection with robotic assisted environment 5002, it should be understood that multiple workspaces 5002*w* can be included in the robotic assisted environment 5002. The workspace 5002*w* can be any area, section, or part of the robotic assisted environment 5002 in or with which the robotic assistant 5002*r* can operate (e.g., interact, communicate, etc.). For instance, in some embodiments in which the robotic assisted environment 5002 is a robotic kitchen, the robotic assisted workspace 5002*w* can be a counter, a cooking surface or module, a washing station, a storage area (e.g., cupboard) and/or the like. That is, a robotic assisted workspace 5002*w* can refer to individual areas, sections, or parts of the robotic kitchen, or a group thereof that are coupled or decoupled physically or logically to one another. While the robotic assisted workspace 5002*w* can refer to physical sections or parts of the environment 5002, in some embodiments, the robotic assisted workspace 5002*w* can refer to and/or include non-tangible parts, such as a space or area between multiple physical parts. In some embodiments, the robotic assisted workspace 5002*w* (and/or the robotic assisted environment 5002) can include parts, systems, components or the like that are remotely located (e.g., cloud system, remote storage, remote client stations, etc.)

The robotic assisted workspace 5002*w* is described in further detail below. Nonetheless, in some embodiments, the robotic assisted workspace 5002*w* (and/or its respective environment 5002) includes and/or is associated with one or more workspace (or environment) objects, which can include physical parts, components, instruments, systems, elements or the like. More specifically, in some embodiments, the objects can include at least one module, sensor, utensil, equipment, stovetop/cooktop, sink, appliance (e.g., dishwasher, refrigerator, blender, etc.), and other objects known to those of skill in the art that can be used by the robotic assistant 5002*r* to achieve a target objective, as described in further detail herein. It should be understood that the objects can be embedded or built-in the workspace 5002*w* (e.g., dishwasher) or environment 5002 (e.g., kitchen), can be detachable or separable therefrom (e.g., pan, mixer), or can be fully or partially remotely located from the workspace 5002*w* and/or environment 5002 (e.g., remote storage). In some embodiments, the robotic assisted workspace 5002*w* can be or include the objects illustrated in FIGS. 7A to 7D (e.g., cooking module 350, utensils 360, cooktop 362, kitchen sink 358, dishwasher 356, table-top mixer and blender (also referred to as a "kitchen blender") 352, oven 354 and refrigerator/freezer combination unit 364). Non-exhaustive illustrative examples of objects corresponding to environments or workspaces are shown in Table 2 below.

TABLE 2

| Examples of Robotic Assisted Environments and/or Workspaces | Examples of Objectives |
|---|---|
| Kitchen | Spoons, knives, forks, plates, cups, pots, sauté pans, soup pots, spatulas, ladles, whisks, mixing bowls, cleaning rags, dispensers. |
| Laboratory | Laboratory flasks, shakers and mixers, centrifuges, incubators, mills, rotary evaporators. |
| Warehouse | Equipment, boxes, containers, shelves, bins and drawers, stacking frames, platforms. |
| Garden | String trimmers, hedge trimmers, leaf blowers, sweepers, spades, garden forks. |
| Bath | Combination units, grab bars, soap dispensers, sinks, faucets. |

Objects can be categorized, for example, as static objects, dynamic objects, standard objects and/or non-standard objects. The categorization of each object can impact the manner in which the robotic assistant interacts with the objects. Static objects are objects that can be interacted with but cannot or are typically not moved or physically altered. For example, static objects in a kitchen environment can include an overhead light, a sink, and a shelf. On the other hand, dynamic objects are objects that can be (or are actively) changed or altered (e.g., physically). For example, dynamic objects in a kitchen environment can include a spoon (which can be moved) and a fruit (which can be changed and altered).

Standard objects are those objects do not typically change in size, material, format, and/or texture; are not typically modifiable; and/or do not typically necessitate any adjustment thereof to be manipulated. Illustrative, non-exhaustive examples of standard objects in a kitchen environment include plates, cups, knives, griddles, lamps, bottles, and the like. Non-standard objects are typically enabled or configured to be modified; and/or do not typically necessitate detection and/or identification of their characteristics (e.g., size, material, format, texture, etc.) to be optimally manipulated or interacted with. Illustrative, non-exhaustive examples of non-standard objects include hand soap, candles, pencils, ingredients (e.g., sugar, oil), produce and other plants (e.g., herbs, tomatoes), and the like.

As described in further detail herein, the objects of the robotic assisted workspace 5002*w* are manipulated and/or interacted with by the robotic assistant 5002*r* to achieve target objectives. In some embodiments, a specific environment or type of environment is defined in part by and/or associated with a set of standard and/or non-standard objects, as well as a set of interactions available to be performed on, to or with those objects within that type of environment. Table 3 below illustrates non-exhaustive examples of objects in and/or defining an environment, and the interactions that can be performed thereon, therewith or thereto.

management system 5004, and/or one or more of the third-party systems 5008. Each set of environment data can be stored and/or referred to as an environment library. An environment library can be downloaded to a memory of the robotic assistant 5002*r* such that, in turn, the processors (e.g., high level processors, low level processors) can control or command the parts (e.g., end effectors) of the robotic assistant 5002*r* to perform the desired interactions. As described in further detail below, in some embodiments, objects in an environment are detected, identified, classified and/or categorized prior to and/or during interactions to optimize the results of the interactions and overall target objectives. As also described in further detail below, in some embodiments, objects can be provided with one or more markers to enable or optimize interactions therewith by the robotic assistant 5002*r*.

In some embodiments, to achieve the target objectives, the robotic assistant 5002*r* (together with the objects, robotic assisted workspace 5002, and/or robotic assisted environment) can communicate with the cloud computing system 5006, the robotic assistant management system 5004, and/or the third-party systems 5008, via the network 5010, prior to, during or after the execution of the interactions designed to achieve the objective. The network 5010 can include one or more networks. Non-limiting examples of the network 5010 include the Internet, a private area network (PAN), a local area network (LAN), a wide area network (WAN), an enterprise private network (EPN), a virtual private network (VPN), and the like. Such communications via the network 5010 can be performed using a variety of wired and wireless techniques, standards and protocols, known to those of skill in the art, including Wi-Fi, Bluetooth, cellular or satellite service, and short- and long-range communications known to those of skill in the art.

The cloud computing system 5006 refers to an infrastructure made up of shared computing resources and data that is

TABLE 3

| Env. | Env. ID | Object | Object ID | Interaction | Interaction ID | Interaction Description |
|---|---|---|---|---|---|---|
| Kitchen | 001 | KitchenCo Blender | Obj_100 | Mode control | 01A | Press button with optimal speed and strength |
| | | | Obj_100 | Unplug | 02A | Remove plug from wall with sufficient strength |
| Bath | 002 | CleanCo Shampoo | Obj_150 | Open bottle | 01B | Press on opener with optimal speed and strength by necessary finger of end effector |
| Warehouse | 003 | Big Box | Obj_183 | Move | 04C | Move the box using one or two end effectors with optimal speed and strength |
| Bedroom | 008 | Atlas Book | Obj_583 | Grasp book from shelf | 08D | Pick up book from shelf |

It should be understood that different and/or additional data regarding the environment, object and interactions, and/or other fields not illustrated in Table 3 above, can be maintained and/or stored. In some embodiments, data (e.g., templates) relating to specific environments or types of environments, including for example the objects (e.g., object templates) and interactions configured therefor, can be stored in a memory of the robotic assisted environment 5002, cloud computing system 5006, the robotic assistant accessible to other systems or devices of the ecosystem 5000. The shared computing resources of the cloud computing system 5006 can include networks, servers, storage, applications, data, and services. A person of skill in the art will understand that any type of data and devices can be included in the cloud 5006. For example, the cloud 5006 can store recipes or libraries of information (e.g., environments, objects, etc.) that can be made available to and downloaded by or to the robotic assisted environment 5002 (or workspace 5002*w*, robotic assistant 5002*r*, and the like). The robotic assisted environment 5002 can request and/or receive the data or information from the cloud computing system 5006. For instance, in one example embodiment in which the robotic assisted environment 5002 is a robotic kitchen, the cloud computing system 5006 can store cooking recipes (e.g., created and uploaded by or from other robotic kitchens) that can in turn be downloaded to the environment 5002 for execution.

The robotic assisted environment 5002 can also communicate, via the network 5010, with the robotic assistant management system 5004. The robotic assistant management system 5004 is a system or set of systems that are controlled or managed by a robotic assistant management entity. Such an entity can be a manufacturer of the robotic assistant environment 5002 or robotic assistant 5002*r*, or an entity configured to provide supervision or oversight, for instance, by deploying updates, expansions, patches, fixes, and the like.

The third-party systems 5008 can be any system or set of systems managed by third party entities (or individuals), with which the robotic assisted environment 5002 and/or robotic assistant 5002*r* can communicate to achieve desired objectives. Non-exhaustive examples of such third-party entities include developers, chef (e.g., corresponding to chef studio kitchens), social media providers, retail companies, e-commerce providers, and/or the like. These entities and their corresponding systems 5008 can be used to collect, generate, send, and/or store data such as social media feeds, product delivery information, weather, shipment status, plugins, widgets, apps, and other data as known to those of skill in the art.

Robotic Assistant

As discussed above, the robotic assisted environment 5002 includes the robotic assistant 5002*r*. The robotic assistant 5002*r* can be deployed in various workspaces 5002*w* (or environments 5002), and in different structural configurations. For example, FIGS. 162A to 162D illustrate views of various applications of the robotic assistant, according to an exemplary embodiment. As shown in FIGS. 162A-162D, various exemplary configurations of a robotic assistant 5002*r* are shown, in which the robotic assistant 5002*r* is deployed in a kitchen workspace (FIG. 162A), lab or laboratory (FIG. 162B), warehouse (FIG. 162C), and bath or bathroom (FIG. 162D). Each of the environments includes objects with which the robotic assistant 5002*r* can interact, and/or which the robotic 5002*r* can manipulate, including, for instance, a bowl and plate, a ladle, a lightbulb, beakers, shelfs, boxes, a bathtub, a faucet, and soap.

The robotic assistant 5002*r* can consist of a single, continuous body or structure, or can be made up of detached or detachable components. The robotic assistant 5002*r* can also include or have portions that are remotely located from other portions or bodies of the robotic assistant 5002*r*. For example, as shown for example in FIG. 162A in connection with the warehouse environment 5002*w*-C, the robotic assistant 5002*r* can have a single, continuous body that resembles or approximates a human body or the like (e.g., torso, arms, head, etc.). On the other hand, in some embodiments, the robotic assistant 5002*r* can be made up of multiple parts that do not resemble a human body, are not attached to one another (e.g., independent robotic arms, as shown for example in FIG. 162A in connection with the kitchen, lab and bath workspaces 5002*w*-A, 5002*w*-B, and 5002*w*-D, respectively), and/or can be physically located at different areas of the robotic assisted environment 5002.

In some embodiments, the robotic assistant 5002*r* can be configured or programmed to work solely with or within a particular robotic assisted environment 5002 and/or workspace 5002*w*. For instance, the robotic assistant 5002*r* can be attached (e.g., fixedly, movably and/or removably) to or within the robotic assisted environment 5002, in part or in whole. In some embodiments, as described herein, portions of the robotic assistant 5002*r* can be attached or fixed to rails, actuators, or the like at one or more areas of the robotic assisted environment 5002 (e.g., FIG. 7B, 7G). On the other hand, in some embodiments, the robotic assistant 5002*r* can be standalone, such that it is freely, independently movable within the robotic assisted environment 5002, as needed to perform its desired interactions. As known to those of skill in the art, the configurations of the robotic assistant 5002*r* (e.g., attached, detached, single or multiple disparate parts, etc.) can be designed for or based on factors such as the type of robotic assisted environment 5002 in which it is to be deployed, and the interactions and objectives for which it will be used. For instance, the robotic assistant 5002*r* can be programmed or configured to function in a specific type of environment or with a specific set of objects or workplaces, for example. The data or libraries of information (e.g., library of environments) to program or configure the robotic assistant 5002*r* can be obtained from any source, including by being downloaded, for example, from the cloud computing system 5006. In this way, a robotic assistant can be programmed and reprogrammed (or configured and reconfigured) as needed. Moreover, in some embodiments, in an environment in which a robotic assistant is intended to perform interactions within a limited area, the robotic assistant 5002*r* can positionally configured to be fixed or attached within a proximity of that area that enables the execution of those interactions. On the other hand, if the environment is large and/or interactions within the environment occur at varying areas thereof, the robotic assistant 5002*r* can be designed to be freely and independently movable about the environment.

Moreover, the anatomy and/or structure of the robotic assistant 5002*r* can vary and be configured in accordance with its intended purpose, objectives and/or corresponding environment. FIG. 163 illustrates the architecture of a robotic assistant (e.g., robotic assistant 5002*r*), according to an exemplary embodiment. As illustrated, the robotic assistant 5002*r* includes a robot anatomy 5002*r*-1, processors 5002*r*-2, memories 5002*r*-3, and sensors 5002*r*-4, each of which is now described in further detail. It should be understood that, as known to one skilled in the art, the number and types of anatomical parts, processors, memories, and sensors, and the connections therebetween, are not limited to those illustrated in the exemplary embodiment of FIG. 163. Instead, the number and types, and their connections, can be configured as deemed optimal or necessary. For example, although not illustrated herein, the anatomy 5002*r*-1 can include fingers as part of an end effector, or can include only a single end effector, if such a configuration is appropriate. As described below, in some embodiments, parts or components of the robotic assistant 5002*r* cooperate, collaborate and/or co-interact to form a subsystem of the robotic assistant, such as a vision subsystem, navigation subsystem (or "module"), and the like.

The exemplary robot anatomy 5002*r*-1 includes head 5002*r*-1*a*, torso 5002*r*-1*b*, end effector 5002*r*-1*c*, . . . , and end effector 5002*r*-1*n*. Again, it should be understood that the number and types of parts of the robot anatomy 5002*r*-1, and the physical and/or logical (e.g., communicative, software, non-tangible) connections therebetween, can vary from the illustrated example. In some embodiments, the head 5002*r*-1*a* refers to an upper portion of the robotic assistant 5002*r*; the torso 5002*r*-1*b* refers to a portion of the robotic assistant 5002*r* that extends away from the head 5002*r*-1, and to which the end effectors 5002*r*-1*c* and 5002*r*-1*n* are connected (e.g., directly or through another portion (e.g., arm)).

Each of these parts of the robot anatomy 5002*r*-1 can have or be connected to (physically and/or logically) one or more of the processors 5002*r*-2, memories 5002*r*-3, and/or sensors 5002*r*-4 (and/or other components, systems, subsystems, as known to those of skill in the art that are not illustrated in FIG. 163). For example, the head can have a camera-type sensor (e.g., 5002*r*-4*a*) disposed therein and be connected to a memory (e.g., 5002*r*-3*a*) where the sensed or captured images can be stored. As another example, the torso 5002*r*-1*b* can be communicatively coupled to a processor (e.g., 5002*r*-2*a*) that drives the angle, rotation, motion, etc., of the torso of the robotic assistant 5002*r*.

In some embodiments, the end effectors 5002*r*-1*c* and/or 5002*r*-1*n* (sometimes interchangeably referred to herein as "manipulators") refer to portions of the robotic assistant 5002*r* that are configured and/or designed to interact with objects in an environment, as described in further detail below. The end effectors extend and/or are disposed away from the torso 5002*r*-1*b*, and are physically connected thereto directly or indirectly. That is, in some embodiments, the end effectors can refer to a grouping of parts (e.g., robotic shoulder, arm, wrist, hand, palm, fingers, grippers, and/or objects connected thereto) or to a single part (e.g., gripper) of the robotic assistant 5002*r* that are disposed at a distalmost position relative to the torso 5002*r*-1*b* of the robotic assistant 5002*r*. In some embodiments, the end effectors can be connected directly to the torso 5002*r*-1*b*, or can be indirectly connected thereto through another part or set of parts, such as a gripper type end effector 5002*r*-1*c* that is connected to the torso 5002*r*-1*b* through an arm not deemed to be part of the end effector. It should be understood that the configuration (e.g., aspects, design, structure, purpose, materials, size, functions, etc.) of the end effectors (e.g., 5002*r*-1*c* and 5002*r*-1*n*) can vary from one to the next, as deemed optimal or necessary for each of their respective objectives, such that, for example, one end effector can have five fingers and another end effector can have two fingers. In some embodiments, an end effector refers to a hand having one or more robotic fingers, a palm, and a wrist.

The processors 5002*r*-2*a*, 5002*r*-2*b*, and 5002*r*-2*n* (collectively referred to herein as "5002*r*-2") refers to processors that are physically or logically connected to the robotic assistant 5002*r*. For example, one of the processors 5002*r*-2 can be located remotely (e.g., server, cloud) relative to the physical robotic assistant 5002*r* and/or its anatomy 5002*r*-1, while another one of the processors 5002*r*-2 can be embedded and/or physically disposed on or in the robotic assistant 5002*r* and/or its anatomy 5002*r*-1. It should be understood that although the processors 5002*r*-2 are illustrated in FIG. 163 as being outside of the robot anatomy 5002*r*-1, the processors 5002*r*-2 can be disposed internally, externally or remotely relative to the anatomy. Moreover, it should be understood that the processors 5002*r*-2 can be configured to drive and/or operate the entire robot anatomy and/or portions or parts thereof, as described in further detail below. The processors 5002*r*-2 can be or include a central processing unit (CPU), a graphics processing unit (GPU) or any type of processing device known to those of skill in the art.

In some embodiments, the processors 5002*r*-2 can include high level processors and/or low-level processors. For illustrative purposes, in FIG. 163, processor 5002*r*-2*a* is a high-level processor and processor 5002*r*-2*b* is a low-level processor. The high-level processor 5002*r*-2*a* can be referred to or treated as a main processor of the robotic assistant 5002*r*, while the low-level processor 5002*r*-2*b* can be referred to or treated as an embedded processor corresponding to a specific aspect or part of the robotic assistant 5002*r*. It should be understood that although the term "embedded processor" is sometimes referenced in conjunction with a specific part (e.g., end effector) of the robotic assistant 5002*r*, such a low level "embedded" processor does not need to be disposed within its respective part (e.g., end effector). That is, an embedded processor that drives or controls an end effector can be deployed on or in the embedded processor, on or in another part of the robot anatomy, or outside of the robot anatomy. It should also be understood that the robotic assistant 5002*r* can include multiple main processors. Each main processor need not drive the entirety of the robotic assistant, but can instead be configured to oversee, supervise, or manage other functions, processes, or components (e.g., low level processors).

In some embodiments, the high-level processor 5002*r*-2*a* can be configured to, for example, receive, generate and/or direct execution of processes or algorithms, such as algorithms (e.g., algorithms of interaction) that can correspond to recipes. For example, in some embodiments, the high-level processor 5002*r*-2*a* generates or obtains (e.g., downloads) an algorithm (e.g., algorithm of interaction). The algorithm can correspond to a part or all of a recipe or process. The algorithm is made up of commands (or instructions) to be executed to perform an interaction. Based on the algorithm, the high-level processor 5002*r*-2*a* commands or sends the commands to the appropriate low level processor 5002*r*-2*b* (or low level processors). The low-level processor 5002*r*-2*b* executes the commands received from or commanded by the high level processor 5002*r*-2*a*. In some embodiments, to execute the commands, the low-level processor 5002*r*-2*b* controls its corresponding part(s) of the anatomy, such as an end effector, for instance, by causing a local driver unit to operate the kinematic chains or other components of the part(s) of the anatomy.

In some embodiments, the execution of the commands can be performed by or in conjunction with the high-level processor 5002*r*-2*a*. Thus, other components or subsystems (e.g., memories, sensors) corresponding to or controlled by each of the processors 5002*r*-2 can be synchronized or communicatively coupled to provide accurate and efficient interaction between the processors 5002*r*-2. For example, in some embodiments, memories 5002*r*-3*a* and 5002*r*-3*b* can correspond to the high-level processor 5002*r*-2*a* and low-level processor 5002*r*-2*b*, respectively. These two memories can thus be mapped to or between each other for enhanced processing. The processors 5002*r*-2 can also share data, such as information about workspace models that define the robotic assisted workspaces (e.g., robotic assisted workspace 5002*w*). Such information can include, for example, data about objects in the workspace, including their position, size, types, materials, gravity directions, weights, velocities, expected positions and the like. Using this information, the low-level processor 5002*r*-2*b* corresponding to a particular part of the robot anatomy 5002*r*-1 (e.g., end effector 5002*r*-1*c*) can control that part to interact with or manipulate objects more effectively, for instance, by avoiding collisions. Moreover, as described in further detail herein, the workspace data (e.g., workspace models) can be stored and updated to provide reinforced learning abilities for training of the robotic assistant 5002*r* to perform optimal movements for each object, interaction, condition, and the like. Workspace data and/or workspace models can be generated, updated, and/or stored (e.g., with data obtained by the sensors 5002*r*-4), as described in further detail herein, for example, As described herein, workspace data (e.g., workspace models) and/or environment data (e.g., environment libraries) can be stored in a remote memory (e.g., cloud computing system 5006) and/or in one of the memories 5002*r*-3 of the robotic assistant 5002*r*. The memories 5002*r*-3 of the robotic assistant 5002*r* include memory 5002*r*-3*a*, 5002*r*-3*b*, and 5002*r*-3*n* (collectively referred to herein as "5002*r*-3"). These memories 5002*r*-3 refer to memories that are physically or logically connected to the robotic assistant 5002*r*. For example, one of the memories 5002*r*-3 can be located remotely (e.g., server, cloud) relative to the physical robotic assistant 5002*r* and/or its anatomy 5002*r*-1, while another one of the memories 5002*r*-3 can be embedded and/or physically disposed on or in the robotic assistant 5002*r* and/or its anatomy 5002*r*-1. It should be understood that although the memories 5002*r*-3 are illustrated in FIG. 163 as being outside of the robot anatomy 5002*r*-1, the memories 5002*r*-3 can be disposed internally, externally or remotely relative to the anatomy. The memories 5002*r*-3 can include volatile memory (e.g., static random access memory (SRAM), dynamic random access memory (DRAM), zero-capacitor random access memory (Z-RAM), advanced random access memory (A-RAM), and the like) and/or non-volatile memory (e.g., read-only memory (ROM), flash memory, storage devices, and the like), as known to those of skill in the art.

Still with reference to FIG. 163, the sensors 5002*r*-4 can include any type of device, module or subsystem configured to detect or collect information and transmit that information to other components. Non-exhaustive, illustrative types of sensors include devices configured to measure temperature, light, water levels, humidity, speed, pressure, moisture, mass, viscosity, and other types of data known to those of skill in the art. In some embodiments, the sensors 5002*r*-4 can include a camera. A camera type sensor can be a two-dimensional (2D) camera, a three-dimensional (3D) camera, an RGB camera, a stereo camera, a multimodal sensing device, and/or a camera with integrated light, structured light and/or laser sensors, among others, as known to those of skill in the art. It should be understood that, in some embodiments, a sensor can include or have embedded therein, multiple sensing devices or functionality. For instance, a camera type sensor can include functionality not only for still or moving image capturing, but also functionality to measure speed, motion, light, and the like. Moreover, sensors such as cameras can have other components and/or features associated therewith. As described in further detail below, a part (e.g., robotic arm, end effector) of the robotic assistant 5002*r* can include one or more sensors to aid in the execution of commands, such as one or more cameras with structured lights.

FIGS. 164A to 164F illustrate robotic arms equipped with sensors, according to exemplary embodiments. It should be understood that end effectors of the robotic assistant 5002*r* can refer to one or a combination of fingers, grippers, hands, palms, writs, and/or arms. For purposes of illustration, in FIGS. 164A to 164F, the illustrated robotic arms are considered to be end effectors.

FIG. 164A illustrates an exemplary embodiment of an end effector 5002*r*-1*c*, which is a robotic arm. As shown, the end effector 5002*r*-1*c* includes multiple camera type sensors, which as more clearly shown in FIG. 164C, can each include built-in lighting (e.g., light, structured light) to illuminate the respective camera's field of vision. The cameras are configured to optimally image or visualize an object, namely a hand blender. The cameras of the end effector 5002*r*-1*c* illustrated in FIG. 164A include cameras 5002*r*-4*a* and 5002*r*-4*b*. For instance, as illustrated in FIG. 164A, a camera 5002*r*-4*a* can be provided on the palm of a robotic hand of the end effector 5002*r*-1*c*. The camera 5002*r*-4*a* can be used to observe or image objects that are located in front of the palm at the moment of performing an action (e.g., grasping). The field of view of the camera 5002*r*-4*a* (and/or illumination by its embedded lights) is illustrated as field of view f-4*a*. Moreover, as also shown in FIG. 164A, a camera 5002*r*-4*b* can be provided protruding away (e.g., perpendicularly) from the wrist, and being positioned to observe or image (and/or illuminate) another angle or perspective of the object or the area of interaction between the hand and the object. The field of view of the camera 5002*r*-4*b* (and/or illumination by its embedded lights) is illustrated as field of view f-4*b*. Cameras such as camera 5002*r*-4*b* positioned on the wrist of the robotic hand can be positioned on a rotatable portion or component that enables rotation of the camera by up to 360 degrees relative to the arm, wrist and/or hand. In this way, the camera 5002*r*-4*b* can be positioned and repositioned as needed to image or capture the desired perspective of the interaction areas and/or the object.

FIG. 1646 illustrates an exemplary embodiment of an end effector 5002*r*-1*c*, which is a robotic arm. As shown, the end effector 5002*r*-1*c* includes multiple camera type sensors, including cameras 5002*r*-4*b* and 5002*r*-4*c*. The camera 5002*r*-4*b* is positioned protruding away from the wrist of the end effector 5002*r*-1*c*. As described above, such a camera enables imaging and/or illuminating of an object or area from an angle or perspective that is different than a typical or common structure or anatomy of a robotic arm. The camera 5002*r*-4*c* is positioned on the wrist of the end effector. In contrast to the camera 5002*r*-4*b*, the camera 5002*r*-4*c* does not protrude from the wrist. The field of view of the camera 5002*r*-4*c* (and/or illumination by its embedded lights) is illustrated as field of view f-4*c*. It should be understood that cameras 5002*r*-4*b* and 5002*r*-4*c* provide additional imaging and lighting, which can be useful for example in cases such as that shown in FIG. 164B when the palm (and therefore its embedded camera) is obstructed by an object which it is grasping.

FIG. 164C illustrates yet another exemplary embodiment of an end effector 5002*r*-1*c*, which is a robotic arm. As shown, the end effector includes multiple camera type sensors, including cameras 5002*r*-4*b* and 5002*r*-4*c*, similar to that shown in FIG. 1646. As shown in FIG. 164C, however, the camera 5002*r*-4*b* can be used to image and/or illuminate objects or areas that can sometimes not be accessible to the camera 5002*r*-4*c* and/or to a camera embedded in the palm of the robotic hand, particularly when the robotic hand is being used and/or is angled in manners that restrict the field of view of other cameras. The field of view of the camera 5002*r*-4*b* (and/or illumination by its embedded lights) in FIG. 164C is illustrated as field of view f-4*b*. As also shown in FIG. 164C, the output of the camera 5002*r*-4*b* (and/or other cameras described herein) includes a camera (e.g., lens), flanked on each side by lights (e.g., light, structured light).

FIG. 164D illustrates yet another exemplary embodiment of an end effector which is a robotic arm, interacting with a button on a screen or similar user interface.

FIG. 164E illustrates further examples of an end effector 5002*r*-1*c* (e.g., robotic arm) that includes camera type sensors (e.g., 5002r-4a, 5002r-4b, 5002r-4c) positioned on the robotic wrist and/or palm. As described herein, camera type sensors can also include or have embedded therein lights to illuminate the area or object in the respective camera's field of view. As shown, each camera can have a different field of view (e.g., f-4a, f-4b, and f-4c) for imaging and/or illuminating an area or object. By virtue of such an arrangement, optimal imaging and interactions can be performed and more precise execution of recipes can be achieved, for instance, by avoiding errors caused by incomplete or subpar imaging.

Thus, as illustrated in FIGS. 164A to 164E, camera type sensors located or disposed on a hand, wrist and/or otherwise on a robotic end effector of the robotic assistant 5002r facilitates, among other things: (1) performing observations or imaging when the area of the interaction between the object and the robotic assistant or robotic end-effector (or object fixed in robotic end effector) is unclear or out of sight; and (2) identifying points of control that define how successful or unsuccessful process of interaction is proceeding, to perform a confirmation of successful final interaction.

In some embodiments, the sensors 5002r-4 can include pressure type sensors. FIG. 164F(1) to 164F(4) (collectively referred to as "164F") illustrates an example of an end effector 5002r-1c, namely a robotic arm, that includes pressure type sensors. In FIG. 164F(1), the pressure sensor is disposed on the wrist of the robotic arm 5002r-1c. The pressure sensor 5002r-4d is configured to sense and/or measure multi-axis (e.g., six axis) force and/or torque. For example, in FIG. 164F, the robotic hand of the end effector 5002r-1c is move downward as it grasps a blender type object. When the blender object touches another object or surface, as shown in FIG. 164F, the pressure sensor 5002r-4d can recognize an opposite (e.g., upward) force being applied to the robotic hand. As known to one of skill the art, the amount and direction of the force identified by the pressure sensor 5002r-4d enables the robotic assistant 5002r to identify when the hand and/or the item it is interacting with touches and/or reaches another object or surface during an interaction. In some embodiments, pressure sensors and sensing areas can be provided on the palm of the robotic hand of the end effector, as shown in FIGS. 164F(2) to 164F(4).

Although not illustrated in connection with FIG. 163, the robotic assistant 5002r can include other features, components, parts, and/or modules, as known to those of skill in the art. For example, the robotic assistant 5002r and/or its anatomy 5002r-1 can include kinematic chains that form or contribute to the structure of the robotic anatomy 5002r-1. The kinematic chains can have any or multiple degrees of freedom, and be configured to allow the joints and parts of the anatomy 5002r-1 to provide pure, human-like movement and rotation. The kinematic chains can be driven or controlled by the processors 5002r-2 and/or local driver units, which dictate their operation (e.g., position, velocity, acceleration), as known to those of skill in the art.

Moreover, while also not illustrated in connection with FIG. 163, in some embodiments, the robotic assistant 5002r can be configured to interact with touchscreens and other similar technologies (e.g., trackpads, touch surfaces). Touchscreens and similar touch surfaces refer to interfaces that allow a robot or robotic assistant to interact with another system (e.g., computer) through touch or contact operations performed thereon. These interfaces can be screens or displays that, in addition to being configured to receive inputs via touches or contacts, can also display or output information. In some embodiments, touchscreens or touch surfaces can be capacitive, meaning that they rely on electrical properties to detect a contact or touch thereon. That is, to detect a contact, a capacitive touchscreen or surface recognizes or senses voltage changes (e.g., drops) occurring at areas (e.g., coordinates) thereon. A computing device and/or processor associated therewith recognizes the contact with the screen or surface and can execute an appropriate corresponding action.

Traditionally humans can readily interact with capacitive screens or surfaces using, for example, a finger, which can transmit a small electrical charge to the touchscreen or surface. Other instruments such as styluses and similar conductive devices can also be configured to pass a charge from a user's hand, through the stylus, to the touchscreen. In some embodiments, the robotic assistant 5002r and/or its end effectors (e.g., 5002r-1c, 5002r-1n) can include end portions such as tips (e.g., fingertips) that are configured to transmit an electrical charge onto a capacitive touchscreen or surface. The electrical charge can be obtained, for example, from a motor electrical terminal, battery or other power source included in or coupled to the robotic assistant 5002r and/or its end effectors. Portions of the end effectors 5002r-1c and/or 5002r-1n can be made of a material, or covered in a material or paint, that has conductive properties that enable the electrical charge to pass from its source, through the end effector and its capacitive portions (e.g., fingertips), onto the touchscreen or surface. By virtue of such a configuration, the robotic assistant 5002r can interact, much like a human, with capacitive touchscreens and surfaces such as mobile devices (e.g., iPhone, iPad), wearable devices (e.g., iWatch), laptops, or any other touchscreen or touch surface provided throughout the environment 5002 in which the robotic assistant 5002r is deployed (e.g., screens provided on drawers in a virtual or computer-controlled kitchen).

It should be understood that the robotic assistant 5002r can execute commands and instructions to perform a target objective of a recipe. The execution of commands and instructions can be performed using the robot anatomy 5002r-2, processors 5002r-2, memories 5002r-3, sensors 5002r-4 and/or other software or hardware components of the robotic assistant 5002r that are not illustrated in FIG. 163, such as the kinematic chains described herein. As known to a person of skill in the art, the robotic assistant 5002r can cooperate, coordinate and/or interact with other systems, subsystems, or components that are logically or physically connected thereto, including the cloud computing system 5006, the robotic assisted management system 5004, the third-party systems 5008, and/or the robotic assisted environment 5002 and/or robotic assisted workspace 5002w.

For instance, the robotic assisted environment 5002 and/or the robotic assisted workspace 5002w can include and/or be associated with processors, memories, sensors, and parts or components thereof, which as described above can communicate and/or interact with the robotic assistant 5002r. In some embodiments, the robotic assisted environment 5002 can include as part of its sensors one or more cameras. The cameras can (1) be any type of camera known to those of skill in the art; (2) be mounted or static; and (3) be configured to capture still or moving images during a recipe performance process by the robotic assistant. The captured data (e.g., images) can be shared with the robotic assistant 5002r in real-time, to provide more accurate executing of commands. In one illustrative embodiment, a camera of the robotic assisted environment 5002 can be used to identify the position of a part of an object that cannot be readily or effectively imaged by a camera of the robotic assistant

5002*r*. In this way, the two cameras can work together to ensure that the position and other characteristics of the object are optimally known and thus perfect or near-perfect interactions with that object can be performed. Other sensors or components of the robotic assisted environment 5002 can be employed to achieve such optimal execution of commands and recipes.

In some embodiments, aspects of the robotic assistant 5002*r*, robotic assisted workspace 5002*w*, and/or robotic environment 5002 cooperate to form subsystems or modules configured to, among other things, position the robotic assistant 5002*r* in a desired location, scan an environment or workspace to detect objects therein and their characteristics, and/or change the environment or workspace, for example, by interacting with or manipulating objects. Examples of these modules and/or subsystems include a navigation module and a vision subsystem (e.g., general, embedded), which are described in further detail below.

Interactions Using the Robotic Assistant System

As described above, the robotic assistant system 5002*r* can be deployed within the robotic assisted environment 5002 to perform a recipe, which is a series of interactions configured to achieve a desired object. For instance, a recipe can be a series of interactions in an automobile shop configured to achieve the objective of changing a tire, or can be a series of interactions in a kitchen to achieve the objective of cooking a desired dish. It should be understood that interactions refer to actions or manipulations performed by the robotic assistant 5002*r* to or with, among other things, the objects in the robotic assisted environment 5002 and/or workspace 5002*w*. FIG. 165 is a flow chart 6000 illustrating a process for executing an interaction using the robotic assistant 5002*r*, according to an exemplary embodiment. In some embodiments, Typical application of a Robotic assistant system may include, for example, three steps: Get to workspace (kitchen, bathroom, warehouse, etc.), scan the workspace (detect objects and their attributes) and change the workspace (manipulate objects) according to the recipe.

As shown, at step 6052, the robotic assistant 5002*r* navigates to a desired or target environment or workspace in which a recipe is to be performed. In the example embodiment described with reference to FIG. 165, the robotic assistant 5002*r* navigates to a robotic kitchen type workspace 5002*w* within a robotic home type environment 5002. For example, the robotic home environment 5002 can include multiple rooms, such as a bathroom, living room and bedrooms, and thus, at step 6050, the robotic assistant 5002*r* can navigate from one of those rooms to the kitchen in order to perform a recipe. In the example embodiment described with reference to FIG. 165, the robotic assistant 5002*r* is used to execute a recipe to cook a desired dish (e.g., chicken pot pie).

Navigating to the target environment 5002 and workspace 5002*w* can be triggered by a command received by the robotic assistant locally (e.g., via a touchscreen or audio command), received remotely (e.g., from a client system, third party system, etc.), or received from an internal processor of the robotic assistant that identifies the need to perform a recipe (e.g., according a predetermined schedule). In response to such a trigger, the robotic assistant 5002*r* moves and/or positions itself at an optimal area within the environment 5002. Such an optimal area can be a predetermined or preconfigured position (e.g., position 0, described in further detail below) that is a default starting point for the robotic assistant. Using a default position enables the robotic assistant 5002*r* to have a starting point of reference, which can provide more accurate execution of commands.

As described above, the robotic assistant 5002*r* can be a standalone and independently movable structure (e.g., a body on wheels) or a structure that is movably attached to the environment or workspace (e.g., robotic parts attached to a multi-rail and actuator system). In either structural scenario, the robotic assistant 5002*r* can navigate to the desired or target environment. In some embodiments, the robotic assistant 5002 includes a navigation module that can be used to navigate to the desired position in the environment 5002 and/or workspace 5002*w*.

In some embodiments, the navigation module is made up of one or more software and hardware components of the robotic assistant 5002*r*. For example, the navigation module that can be used to navigate to a position in the environment 5002 or workspace 5002*w* employs robotic mapping and navigation algorithms, including simultaneous localization and mapping (SLAM) and scene recognition (or classification, categorization) algorithms, among others known to those of skill in the art, that are designed to, among other things, perform or assist with robotic mapping and navigation. At step 6050, for instance, the robotic assistant 5002*r* navigates to the workspace 5002*w* in the environment 5002 by executing a SLAM algorithm or the like to generate or approximate a map of the environment 5002, and localize itself (e.g., its position) or plan its position within that map. Moreover, using the SLAM algorithm, the navigation module enables the robotic assistant 5002*r* to identify its position with respect or relative to distinctive visual features within the environment 5002 or workspace 5002*w* and plan its movement relative to those visual features within the map. Still with reference to step 6050, the robotic assistant 5002*r* can also employ scene recognition algorithms in addition to or in combination with the navigation and localization algorithms, to identify and/or understand the scenes or views within the environment 5002, and/or to confirm that the robotic assistant 502*r* achieved or reached its desired position, by analyzing the detected images of the environment.

In some embodiments, the mapping, localization and scene recognition performed by the navigation module of the robotic assistant can be trained, executed and re-trained using neural networks (e.g., convolutional neural networks). Training of such neural networks can be performed using exemplary or model workspaces or environments corresponding to the workspace 5002*w* and the environment 5000.

It should be understood that the navigation module of the robotic assistant 5002*r* can include and/or employ one or more of the sensors 5002*r*-4 of the robotic assistant 5002*r*, or sensors of the environment 5002 and/or the workspace 5002*w*, to allow the robotic assistant 5002*r* to navigate to the desired or target position. That is, for example, the navigation module can use a position sensor and/or a camera, for example, to identify the position of the robotic assistant 5002*r*, and can also use a laser and/or camera to capture images of the "scenes" of the environment to perform scene recognition. Using this captured or sensed data, the navigation module of the robotic assistant 5002*r* can thus execute the requisite algorithms (e.g., SLAM, scene recognition) used to navigate the robotic assistant 5002*r* to the target location in the workspace 5002*w* within the environment 5002.

At step 6052, the robotic assistant 5002*r* identifies the specific instance and/or type of the workspace 5002*w* and/or environment 5002, in which the robotic assistant navigates to at step 6050 to execute a recipe. It should be understood that the identification of step 6052 can occur prior to, simultaneously with, or after the navigation of step 6050.

For instance, the robotic assistant 5002*r* can identify the instance or type of the workspace 5002*w* and/or environment 5002 using information received or retrieved in order to trigger the navigation of step 6050. Such information, as discussed above, can include a request received from a client, third party system, or the like. Such information can therefore identify the workspace and environment with which a request to execute the recipe is associated. For example, the request can identify that the workspace 5002*w* is a RoboKitchen model 1000. ON the other hand, during or after the navigation of step 6050, the robotic assistant can identify that the environment and workspace through which it is navigating is a RoboKitchen (model 1000), by identifying distinctive features in the images obtained during the navigation. As described below, tis information can be used to more effectively and/or efficiently identify the objects therein with which the robotic assistant can interact.

At step 6054, the robotic assistant 5002*r* identifies the objects in the environment 5002 and/or workspace 5002*w* and thus with which the robotic assistant 5002*r* can communicate. Identifying of the objects of step 6054 can be performed either (1) based on the instance or type of environment and workspace identified at step 6052, and/or (2) based on a scan of the workspace 5002*w*. In some embodiments, identifying the objects at step 6054 is performed using, among other things, using a vision subsystem of the robotic assistant 5002*r*, such as a general-purpose vision subsystem (described in further detail below). As described in further detail below, the general-purpose vision subsystem can include or use one or more of the components of the robotic assistant 5002*r* illustrated in FIG. 163, and/or other of the systems or components illustrated in the ecosystem 5000, such as cameras and other sensors, memories, and processors. It should be understood that, in some embodiments, the object identification of step 6054 is performed based on the scan performed by the general-purpose vision subsystem, which can leverage a library of known objects to more accurately and/or efficiently identify objects.

FIG. 166 illustrates an architecture diagram of portions of the ecosystem 5000 illustrated in FIG. 163, according to an exemplary embodiment. More specifically, FIG. 166 illustrates aspects of the cloud computing system 5006 and of the robotic assistant 5002*r*, and the components and interactions there between that are used to, among other things, identify objects at step 6054. As shown, the cloud computing system 5006 can store a library of environments (and/or workspaces), including for example a library definition of environment 5002. The library definition of the environment 5002 (and any other of the environments defined in the library of environments) can include any data known to those of skill in the art that describes and/or is otherwise associated with or to the environment 5002. For example, in connection with each environment definition, including the definition of the environment 5002, the cloud computing system 5006 stores a library of known objects ("object library") 5006-1 and a library of recipes ("recipe library") 5006-2. The library of known objects 5006-1 includes data definitions of objects that are standard to or typically known to be in the environment 5002. The recipe library includes data definitions of recipes that can be performed or executed in the environment 5002.

Still with reference to FIG. 166, as illustrated, exemplary aspects of the robotic assistant 5002*r* can include at least one camera 5002*r*-4*a* (and/or other sensors), a general-purpose vision subsystem 5002*r*-5, a workspace model 5002*w*-1, a manipulations control module 5002*r*-7, and at least one manipulator (e.g., end effector) 5002*r*-1*c*. The general-purpose vision subsystem 5002*r*-5 (which is described if further detail below) is a subsystem of the robotic assistant 5002*r* made up of hardware and/or software and is configured to, among other things, visualize, image and/or detect objects in a workspace or environment. The workplace model 5002*w*-1 is a data definition of the workspace 5002*w*, which can be created and updated in real-time by the robotic assistant 5002*w*, in order to be readily aware of and/or understand the parts and processes of the of the workspace, for instance, for quality control. For instance, the data definition of the workspace 5002*w* can include a compilation of the data definitions of the objects identified to be present in the environment 5002. The manipulations control module 5002*r*-7 can be a combination of hardware and/or software configured to identify recipes to execute and to generate algorithms of interaction that define the manner in which the robotic assistant 5002*r* is to be commanded in order to accurately and successfully execute the recipe. For instance, the manipulations control module 5002*r*-7 can identify which interactions can or should be performed in order to perform each command of the recipe as efficiently and effectively as possible. The manipulator 5002*r*1-*c* can be a part of the robotic assistant 5002*r* or its anatomy 5002*r*-1, such an end effector 5002*r*1-*c*, which can be used to manipulate and/or interact with an object in the environment 5002. The manipulator 5002*r*-1*c* can include a corresponding and/or embedded vision subsystem 5002*r*-1*c*-A and/or a camera (or other sensor) 5002*r*-1*c*-B. The workspace 5002*w* is also illustrated in FIG. 166, which is the workspace in or with which the robotic assistant 5002*r* is to execute the recipe.

Still with reference to FIG. 165 the objects corresponding to the environment 5002 and/or the workspace 5002*w* are identified based on either the instance/type of the environment 5002 and/or workspace 5002*w*, and/or by scanning the workspace 5002*w* to detect the objects therein. An environment and/or workspace can be made up of or include known objects, which are those objects that are always or typically found in the environment 5002*w* or workspace 5002. For instance, in a kitchen type environment or workspace, a knife can be a "known" object, since a knife is typically found in a kitchen, while a roll of string, if detected in the kitchen, would be deemed to be an "unknown" object, since it is typically not found in a kitchen. Thus, in some embodiments, at step 6054, the robotic assistant 6054 can identify the objects that are known in the environment 5002 and/or workspace 5002*w*.

Moreover, at step 6054, objects can be identified using the general-purpose vision subsystem 5002*r*-5 of the robotic assistant 5002*r*, which is used to scan the environment 5002 and/or workspace 5002*w* and identify the objects that are actually (rather than expectedly) present in therein. The objects identified by the general-purpose vision subsystem 5002*r*-5 can be used to supplement and/or further narrow down the list of "known" objects identified as described above based on the specific instance or type of environment and/or workspace identified at step 6052. That is, the objects recognized by the scan of the general-purpose vision subsystem 5002*r*-5 can be used to cut down the list of known objects by eliminating therefrom objects that, while known and/or expected to be present in the environment 5002 and/or workspace 5002*w*, are actually not found therein at the time of the scan. Alternatively, the list of known objects can be supplemented by adding thereto any objects that are identified by the scan of the general-purpose vision subsystem 5002*r*-5. Such objects can be objects that were not expected to be found in the environment 5002 and/or workspace 5002*w*, but were indeed identified during the scan (e.g., by being manually inserted or introduced into the environment 5002 and/or workspace 5002*w*). By identifying the identification of objects using these two techniques, an optimal list of objects with which the robotic assistant 5002*r* is to interact is generated. Moreover, by referencing a pre-generated list of known objects, errors (e.g., omitted or misidentified objects) due to incomplete or less-than-optimal imaging by the general-purpose vision subsystem 5002*r*-5 can be avoided or reduced.

As shown in FIG. 166, the general-purpose vision subsystem 5002*r*-5 includes or can use a camera 5002*r*-4*a* (or multiple cameras and/or other sensors) to capture images and thereby visualize the environment 5002 and/or workspace 5002*w*. The general-purpose vision subsystem 5002*r*-5 can identify objects based on the obtained images, and thereby determine that those objects are indeed present in the environment 5002 and/or workspace 5002*w*. The general-purpose vision subsystem 5002*r*-5 is now described in further detail.

FIG. 167 illustrates an architecture of a general-purpose vision subsystem 5002*r*-5, according to an exemplary embodiment. As shown, the general-purpose vision subsystem 5002*r*-5 is made up of modules and components (e.g., cameras) configured to provide imaging, object detection and object analysis, for the purpose of identifying objects within the environment 5002 and/or workspace 5002*w*. The modules and systems of the general-purpose vision subsystem 5002*r*-5 can leverage the library of known objects (and surfaces) stored in the cloud computing system 5006 to more accurately or efficiently identify objects. Information about the identified objects can be stored in the workspace model 5002*w*-1, which as described above is a data definition of the workspace 5002.

Still with reference to FIG. 167, the modules of or corresponding to the general-purpose vision subsystem 5002*r*-5 can include: a camera calibration module 5002*r*-5-1, rectification and stitching module 5002*r*-5-2, a markers detection module 5002*r*-5-3, an object detection module 5002*r*-5-4, a segmentation module 5002*r*-5-5, a contours analysis module 5002*r*-5-6, and a quality check module 5002*r*-5-7. These modules can consist of code, logic and/or the like stored in one or more memories 5002*r*-3 and executed by one or more memories 5002*r*-2 of the robotic assistant 5002*r*. While each module is configured for a specific purpose, the modules are designed to detect objects and/or analyze objects in order to provide information (e.g., characteristics) about those objects. The object detection and/or analysis of these modules is performed using the illustrated cameras 5002*r*-4 to image the illustrated workspace 5002*w*.

In some embodiments, the cameras 5002*r*-4 illustrated in FIG. 167 can be deemed to correspond (exclusively or non-exclusively) to a camera system of the general-purpose vision subsystem 5002*r*-5. It should be understood that while FIG. 167 only illustrates three cameras, the general-purpose subsystem 5002*r*-5 and/or the camera system can include or be associated with any number of cameras. In some embodiments, the number (and other characteristics) of the cameras can be based on the size and/or structure of the workspace. For example, a three meter by one meter cooking surface can require at least three cameras mounted 1.2 meters high above the top-facing surface of the workspace 5002*w*. Thus, the cameras 5002*r*-4 can be cameras that are embedded in the robotic assistant 5002*r* and/or cameras that are logically connected thereto (e.g., cameras corresponding to the environment 5002 and/or the workspace 5002*w*).

The camera system can also be said to include the illustrated structured light and smooth light, which can be built or embedded in the cameras 5002*r*-4 or separate therefrom. It should be understood that the lights can be embedded in or separate from (e.g., logically connected to) the robotic assistant 5002*r*. Moreover, the camera system can also be said to include the illustrated camera calibration module 5002*r*-5-1 and the rectification and stitching module 5002*r*-5-2.

FIG. 168A illustrates an architecture for identifying objects using the general-purpose vision subsystem 5002*r*-5, according to an exemplary embodiment. As shown in FIG. 168A, a CPU such as processor 5002*r*-2*a* of the robotic assistant 5002*r* handles certain functions of the object identification of step 6054 of FIG. 165, including camera calibration, image rectification, image stitching, marker detection, contour analysis quality (or scene) check, and management of the workspace model. A graphics processing unit (GPU) such as processor 5002*r*-2*b* of the robotic assistant 5002*r* handles certain functions of the object identification of step 6054 of FIG. 165, including object detection and segmentation. And, the cloud computing system 5006, including its own components (e.g., processors, memories) provide storage, management and access to the library of known objects.

FIG. 168B illustrates a sequence diagram 7000 of a process for identifying objects (e.g., FIG. 165, step 6054) in an environment or workspace, according to an exemplary embodiment. The exemplary process 7000 illustrated in FIG. 168B is described in conjunction with features and aspects of other figures described herein, including FIG. 167 which illustrates an exemplary general-purpose vision subsystem. As shown, the process includes functionality performed by the general-purpose vision subsystem 5002*r*-5 of the robotic assistant 5002*r*, and the cloud computing system 5006. The general-purpose vision subsystem 5002*r*-5 includes and/or is associated with cameras 5002*r*-4, CPU 5002*r*-2*a*, and GPU 5002*r*-2*b*. As discussed herein, the cameras can include cameras that exclusively correspond to the robotic assistant 5002*r* (e.g., cameras embedded in the robot anatomy 5002*r*-1). It should be understood that the general-purpose vision subsystem 5002*r*-5 can include and/or be associated with other devices, components and/or subsystems not illustrated in FIG. 168B.

At step 7050, the cameras 5002*r*-4 are used to capture images of the workspace 5002*w* for calibration. Prior to capturing the images to be used for camera calibration, a checkerboard or chessboard pattern (or the like, as known to those of skill in the art) is disposed or provided on predefined positions of the workspace 5002*w*. The pattern can be formed on patterned markers that are outfitted on the workspace 5002*w* (e.g., top surface thereof). Moreover, in some embodiments such as the one illustrated in FIG. 167 in which the camera system of the general-purpose vision subsystem 5002*r*-5 includes two or more cameras, the cameras 5002*r*-4 are arranged for imaging such that the field of view of neighboring (e.g., adjacent) cameras overlap, thereby allowing at least a portion of the pattern to be visible by two cameras. Once the cameras 5002*r*-4 and 5002*w* have been configured for calibration, the calibration images are obtained at step 7050. At step 7052, the captured calibration images are transmitted from and/or made available by the cameras to the CPU 5002*r*-2*a*. It should be understood that the image capturing performed by the cameras 5002*r*-4 at step 7050, the transmission of the images to the CPU 5002*r*-2*a* at step 7052, and the calibration of cameras 7054 by the CPU 5002*r*-2*a* can be performed in sequential steps, or in real time, such that the calibration of step 7054 occurs "live" as the cameras are capturing the images at step 7050.

In turn, at step 7054, calibration of the cameras is performed to provide more accurate imaging such that optimal and/or perfect execution of commands of a recipe can be performed. That is, camera calibration enables more accurate conversion of image coordinates obtained from images captured by the cameras 5002*r*-4 into real world coordinates of or in the workspace 5002*w*. In some embodiments, the camera calibration module 5002*r*-5-2 of the general-purpose vision subsystem 5002*r*-5 is used calibrate the cameras 5002*r*-4. As illustrated, the camera calibration module 5002*r*-5-2 can be driven by the CPU 5002*r*-2*a*.

The cameras 5002*r*-4, in some embodiments, are calibrated as follows. The CPU 5002*r*-2*a* detects the pattern (e.g., checkerboard) in the images of the workspace 5002*w* captured at step 7050. Moreover, the CPU 5002*r*-2*a* locates the internal corners in the detected pattern in of the captured images. The internal corners are the corners where four squares of the checkerboard meet and that do not form part of the outside border of the checkerboard pattern disposed on the workspace 5002*w*. For each of the identified internal corners, the general-purpose vision subsystem 5002*r*-5 identifies the corresponding pixel coordinates. In some embodiments, the pixel coordinates refer to the coordinate on the captured images at which the pixel corresponding to each of the internal corners is located. In other words, the pixel coordinates indicate where each internal corner of the checkerboard pattern is located in the images captured by the cameras 500*r*-4, as measured in an array of pixel.

Still with reference to the calibration of step 7054, real world coordinates are assigned to each of the identified pixel coordinates of the internal corners of the checkerboard pattern of. In some embodiments, the respective real-world coordinates can be received from another system (e.g., library of environments stored in the cloud computing system 5006) and/or can be input to the robotic apparatus 5002*r* and/or the general-purpose vision subsystem 5002*r*-5. For example, the respective real-world coordinates can be input by a system administrator or support engineer. The real-world coordinates indicate the real-world position in space of the internal corners of the checkerboard pattern of the markers on the workspace 5002*w.*

Using the calculated pixel coordinates and real-world coordinates for each internal corner of the checkerboard pattern, the general-purpose vision subsystem 5002*r*-5 can generate and/or calculate a projection matrix for each of the cameras 5002*r*-4. The projection matrix thus enables the general-purpose vision subsystem 5002*r*-5 to convert pixel coordinates into real world coordinates. Thus, the pixel coordinate position and other characteristics of objects, as viewed in the images captured by the cameras 5002*r*-4, can be translated into real world coordinates in order to identify where in the real world (as opposed to where in the captured image) the objects are positioned.

As described herein, the robotic assistant 5002*r* can be a standalone and independently movable system or can be a system that is fixed to the workspace 5002*w* and/or other portion of the environment 5002. In some embodiments, parts of the robotic assistant 5002*r* can be freely movable while other parts are fixed to (and/or be part of) portions of the workspace 5002*w*. Nevertheless, in some embodiments in which the camera system of the general-purpose vision subsystem 5002*r*-5 is fixed, the calibration of the cameras 5002*r*-4 is performed only once and later reused based on that same calibration. Otherwise, if the robotic assistant 5002*r* and/or its cameras 5002*r*-4 are movable, camera calibration is repeated each time that the robotic assistant 5002*r* and/or any of its cameras 5002*r*-4 change position.

It should be understood that the checkerboard pattern (or the like) used for camera calibration can be removed from the workspace 5002*w* once the cameras have been calibrated and/or use of the pattern is no longer needed. Although, in some cases, it may be desirable to remove the checkerboard pattern as soon as the initial camera calibration is performed, in other cases it may be optimal to preserve the checkerboard markers on the workspace 5002*w* such that subsequent camera calibrations can more readily be performed.

With the cameras 5002*r*-4 calibrated, the general-purpose vision subsystem 5002*r*-5 can begin identifying objects with more accuracy. To this end, at step 7056, the cameras 5002*r*-4 capture images of the workspace 5002*w* (and/or environment 5002) and transmit those captured images to the CPU 5002*r*-2*a*. The images can be still images, and/or video made up of a sequence of continuous images. Although the sequence diagram 7000 of FIG. 168B only illustrates single transmission of captured image data at step 7056, it should be understood that images can be sequentially and/or continually captured and transmitted to the CPU 5002*r*-2*a* for further processing (e.g., in accordance with steps 7058 to 7078).

At step 7058, the captured images received at step 7056 are rectified by the rectification and stitching module 5002*r*-5-2 using the CPU 5002*r*-2*a*. In some example embodiments, rectification of the images captured by each of the cameras 5002*r*-4 includes removing distortion in the images, compensating each camera's angle, and other rectification techniques known to those of skill in the art. In turn, at step 7060, the rectified images captured from each of the cameras 5002*r*-4 are stitched together by the rectification and stitching module 5002*r*-5-2 to generate a combined captured image of the workspace 5002*w* (e.g., the entire workspace 5002*w*). The X and Y axes of the combined captured image are then aligned with the real-world X and Y axes of the workspace 5002*w*. Thus, pixel coordinates (x,y) on the combined image of the workspace 5002*w* can be transferred or translated into corresponding (x,y) real world coordinates. In some embodiments, such a translation of pixel coordinates to real world coordinates can include performing calculations using a scale or scaling factor calculated by the calibration module 5002*r*-5-2 during the camera calibration process.

In turn, at step 7062, the combined (e.g., stitched) image generated by the rectification and stitching module 5002*r*-5-2 is shared (e.g., transmitted, made available) with other modules, including the object detection module 5002*r*-5-4, to identify the presence of objects in the workspace 5002*w* and/or environment 5002 by detecting objects within the captured image. Moreover, at step 7064, the cloud computing system 5006 transmits libraries of known objects and surfaces stored therein to the general-purpose vision subsystem 5002*r*-5, and in particular to the GPU 5002*r*-2*b*. As discussed above, the libraries of known objects and surfaces that is transmitted to the general-purpose vision subsystem 5002*r*-5 can be specific to the instance or type of the environment 5002 and/or the workspace 5002*w*, such that only data definitions of objects known or expected to be identified are sent. Transmission of these libraries can be initiated by the cloud computing system 5006 (e.g., pushed), or can be sent in response to a request from the GPU 5002*r*-2*b* and/or the general-purpose vision subsystem

5002*r*-5. It should be understood that transmission of the libraries of known objects can be performed in one or multiple transmissions, each or all of which can occur immediately prior to or at any point before the object detection of step 7068 is initiated.

At step 7066, the GPU 5002*r*-2*b* of the general-purpose vision subsystem 5002*r*-5 of the robotic apparatus 5002*r* downloads trained neural networks or similar mathematical models (and weights) corresponding to the known objects and surfaces associated with step 7064. These neural networks are used by the general-purpose vision subsystem 5002*r*-5 to detect or identify objects. As shown in FIG. 185, such models can include a neural network such as convolutional neural networks (CNN), faster convolutional neural networks (F-CNN), you only look once (YOLO) neural networks, and single-shot detector (SSD) neural networks, for object detection and a neural network for image segmentation (e.g., SegNet). To maximize the accuracy and efficiency of the neural networks and their application to detect objects and perform image segmentation, the downloaded neural networks are specifically configured for the workspace 5002*w* (and/or environment 5002) by being trained only for the known objects and surfaces of the workspace 5002*w* (and/or environment 5002). Thereby, the neural networks need not account for objects or surfaces that are not known to the workspace 5002*w* (and/or environment 5002). That is, targeted or particularized neural networks—e.g., ones trained only for the known objects in the workspace and/or environment—can provide faster and less complex object identification processing by avoiding the burdens of considering and dismissing objects that are not known (and therefore less likely) to be present in the environment 5002 and/or the workspace 5002*w*. It should be understood that the neural networks (and/or other models) can be trained and obtained from the cloud computing system 5006 (as shown in FIG. 168B), or from another component of the ecosystem 5000. Alternatively, although not illustrated in FIG. 168B, the neural networks (and/or other models) can be trained and maintained by the robotic assistant 5002*r* itself.

In turn, at step 7068, the object detection module 5002*r*-5-4 uses the GPU 5002*r*-2*b* to detect objects in the combined image (and therefore implicitly in the real-world workspace 5002*w* and/or environment 5002) based on or using the received and trained object detection neural networks (e.g., CNN, F-CNN, YOLO, SSD). In some embodiments, object detection includes recognizing, in the combined image, the presence and/or position of objects that match objects included in the libraries of known objects received at step 7064.

Moreover, at step 7070, the segmentation module 5002*r*-5-5 uses the GPU 5002*r*-2*b* segments portions of the combined image and assign an estimated type or category to that segment based on or using the trained neural network such as SegNet received at step 7066. It should be understood that, at step 7070, the combined image of the workspace 5002*w* is segmented into pixels, though segmentation can be performed using a unit of measurement other than a pixel as known to those of skill in the art. Still with reference to step 7070, each of the segments of the combined image is analyzed by the trained neural network in order to be classified, by determining and/or approximating a type or category to which the contents of each pixel correspond. For example, the contents or characteristics of the data of a pixel can be analyzed to determine if they resemble a known object (e.g., category: "knife"). In some embodiments, pixels that cannot be categorized as corresponding to a known object can be categorized as a "surface," if the pixel most closely resembles a surface of the workspace, and/or as "unknown," if the contents of the pixel cannot be accurately classified. It should be understood that the detection and segmentation of steps 7068 and 7070 can be performed simultaneously or sequentially (in any order deemed optimal).

In turn, at step 7072, the results of the object detection of step 7068 and the segmentation results (and corresponding classifications) of step 7070 are transmitted by the GPU 5002*r*-2*b* to the CPU 5002*r*-2*a*. Based on these, at step 7074, the object analysis is performed by the marker detection module 5002*r*-5-3 and the contour analysis module 5002*r*-5-6, using the CPU 5002*r*-2*a*, to, among other things, identify markers (described in further detail below) on the detected objects, and calculate (or estimate) the shape and pose of each of the objects.

That is, at step 7074, the marker detection module 5002*r*-5-3 determines whether the detected objects include or are provided with markers, such as ArUco or checkerboard/chessboard pattern markers. Traditionally, standard objects are provided with markers. As known to those of skill in the art, such markers can be used to more easily determine the pose (e.g., position) of the object and manipulate it using the end effectors of the robotic assistant 5002*r*. Nonetheless, non-standard objects, when not equipped with markers can be analyzed to determine their pose in the workspace 5002*w* using neural networks and/or models trained on that type of non-standard object, which allows the general-purpose vision subsystem 5002*r*-5 to estimate, among other things, the orientation and/or position of the object. Such neural networks and models can be downloaded and/or otherwise obtained from other systems such as the cloud computing system 5006, as described above in detail. In some embodiments, analysis of the pose of objects, particularly non-standard objects, can be aided by the use of structured lighting. That is, neural networks or models can be trained using structured lighting matching that of the environment 5002 and/or workspace 5002*w*. The structured lighting highlights aspects or portions of the objects, thereby allowing the module 5002*r*-5-3 to calculate the object's position (and shape, which is described below) to provide more optimal orientation and positioning of the object for manipulations thereon. Still with reference to stop 7074, analysis of the detected objects can also include determining the shape of the objects, for instance, using the contours analysis module 5002*r*-5-6 of the general-purpose vision subsystem 5002*r*-5. In some embodiments, contour analysis includes identifying the exterior outlines or boundaries of the shape of detected objects in the combined image, which can be executed using a variety of contour analysis techniques and algorithms known to those of skill in the art. At step 7076, a quality check process is performed by the quality check module 5002*r*-5-7 using the CPU 5002*r*-2*a*, to further process segments of the image that were classified as unknown. This further processing by the quality check process serves as a fall back mechanism to provide last minute classification of "unknown" segments.

At step 7078, the results of the analysis of step 7074 and the quality check of step 7076 are used to update and/or generate the workspace model 5002*w*-1 corresponding to the model 5002*w*. In other words, data identifying the objects, and their shape, position, segment types, and other calculated or determined characteristics thereof are stored in association with the workspace model 5002*w*-1.

Moreover, with reference to step 6054, the process of identifying objects and downloading or otherwise obtaining information associated with each of the objects into the workspace model 5002*w*-1 can also include downloading or obtaining interaction data corresponding to each of the objects. That is, as described above in connection with FIG. 168B, object detection includes identifying objects present in the environment 5002 and/or the workspace 5002*w*. In addition, characteristics such as marker information, shape and pose associated with each object is determined or calculated for the identified objects. The detected presence and characteristics of these objects is stored in association with the workspace model 5002*w*-1. Moreover, the robotic assistant 5002*r* can also store, in the workspace model 5002*w*-1, in association with each of the detected objects, object information downloaded or received from the cloud computing system 5006. Such information can include data that was not calculated or determined by the general-purpose vision subsystem 5002*r*-5 of the robotic assistant 5002*r*. For instance, this data can include weight, material, and other similar characteristics that form part of the template or data definition of the objects. Other information that is downloaded to the workspace model in connection with each object are data definitions of interactions that can be performed, by the robotic assistant 5002*r* in the context of the workspace 5002*w* and/or environment 5002, on or with each of the detected objects. For instance, in the case of a blender type object, the object definition of the blender can include data definitions of interactions such as "turn on blender," "turn off blender," "increase power of blender," and other interactions that can be performed on or using the blender.

For example, a recipe to be performed in a kitchen can be to achieve a goal or objective such as cooking a turkey in an oven. Such a recipe can include or be made up of steps for marinating the turkey, moving the turkey to the refrigerator to marinate, moving the turkey to the oven, removing the turkey from the oven, etc. These steps that make up a recipe are made up of a list or set of specifically tailored (e.g., ordered) interactions (also referred to interchangeably as "manipulations"), which can be referred to as an algorithm of interactions. These interactions can include, for example: pressing a button to turn the oven on, turning a knob to increase the temperature of the oven to a desired temperature, opening the oven door, grasping the pan on which the turkey is placed and moving it into the oven, and closing the oven door. Each of these interactions is defined by a list or set of commands (or instructions) that are readable and executable by the robotic assistant 5002*r*. For instance, an interaction for turning on the oven can include or be made up of the following list of ordered commands or instructions:

Move finger of robotic end effector to real world position (x1, y1), where (x1, y1) are coordinates of a position immediately in front of the oven's "ON" button;

Advance finger of robotic end effector toward the "ON" button until X amount of opposite force is sensed by a pressure sensor of the end effector;

Retract finger of robotic end effector the same distance as in the preceding command.

As discussed in further detail below, the commands can be associated with specific times at which they are to be executed and/or can simply be ordered to indicate the sequence in which they are to be executed, relative to other commands and/or other interactions (and their respective timings). The generation of an algorithm mf interaction, and the execution thereof, is described in further detail below with reference to steps 6056 and 6058 of FIG. 165. Nonetheless, for clarity, interactions by the robotic assistant 5002*r* are now described.

As described herein, the robotic assistant 5002*r* can be deployed to execute recipes in order to achieve desired goals or objectives, such as cooking a dish, washing clothes, cleaning a room, placing a box on a shelf, and the like). To execute recipes, the robotic assistant 5002*r* performs sequences of interactions (also referred to as "manipulations") using, among other things, its end effectors 5002*r*-1*c* and 5002*r*-1*n*. In some embodiments, interactions can be classified based on the type of object that is being interacted with (e.g., static object, dynamic object). Moreover, interactions can be classified as grasping interactions and non-grasping interactions.

Non-exhaustive examples of types of grasping interactions include (1) grasping for operating, (2) grasping for manipulating, and (3) grasping for moving. Grasping for operating refers to interactions between one or more of the end effectors of the robotic assistant 5002*r* and objects in the workspace 5002*w* (or environment 5002) in which the objective is to perform a function to or on the object. Such functions can include, for example, grasping the object in order to press a button on the object (e.g., ON/OFF power button on a handheld blender, mode/speed button on a handheld blender). Grasping for manipulating refers to interactions between one or more of the end effectors of the robotic assistant 5002*r* and objects in the workspace 5002*w* (or environment 5002) in which the objective is to perform a manipulation on or to the object. Such manipulations can include, for example: compressing an object or part thereof; applying axial tension on an X,Y or an X,Y,Z axis; compressing and applying tension; and/or rotating an object. Grasping for moving refers to interactions between one or more of the end effectors of the robotic assistant 5002*r* and objects in the workspace 5002*w* (or environment 5002) in which the objective is to change the position of the object. That is, grasping for moving type interactions are intended to move an object from point A to point B (and other points, if needed or desired), or change its direction or velocity.

On the other hand, non-exhaustive examples of types of non-grasping interactions include (1) operating without grasping; (2) manipulating without grasping; and (3) moving without grasping. Operating an object without grasping refers to interactions between one or more of the end effectors of the robotic assistant 5002*r* and objects in the workspace 5002*w* (or environment 5002) in which the objective is to perform a function without having to grasp the object. Such functions can include, for example, pressing a button to operate an oven. Manipulating an object without grasping refers to interactions between one or more of the end effectors of the robotic assistant 5002*r* and objects in the workspace 5002*w* (or environment 5002) in which the objective is to perform a manipulation without the need to grasp the object. Such functions can include, for example, holding an object back or away from a position or location using the palm of the robotic hand. Moving an object without grasping refers to interactions between one or more of the end effectors of the robotic assistant 5002*r* and objects in the workspace 5002*w* (or environment 5002) in which the objective is to move an object from point A to point B (and other points, if needed or desired), or change its direction or velocity, without having to grasp the object. Such non-grasping movement can be performed, for example, using the palm or backside of the robotic hand.

While interactions with dynamic objects can also be classified into grasping and non-grasping interactions, n some embodiments, interactions with dynamic objects (as opposed to static objects) can be approached differently by the robotic assistant 5002*r*, as compared with interactions with static objects. For example, when performing interactions with dynamic objects, the robotic assistant additionally: (1) estimates each object's motion characteristics, such as direction and velocity; (2) calculates each objects expected position at each time instance or moment of an interaction; and (3) preliminarily positions its parts or components (e.g., end effectors, kinematic chains) according to the calculated expected position of each object. Thus, in some embodiments, interactions with dynamic objects can be more complex than interactions with static objects, because, among other reasons, they require synchronization with the dynamically changing position (and other characteristics, such as orientation and state) of the dynamic objects.

Moreover, interactions between end effectors of the robotic assistant 5002*r* and objects can also or alternatively be classified based on whether the object is a standard or non-standard object. As discussed above in further detail, standard objects are those objects that do not typically have changing characteristics (e.g., size, material, format, texture, etc.) and/or are typically not modifiable. Non-exhaustive, illustrative examples of standard objects include plates, cups, knives, lamps, bottles, and the like. Non-standard objects are those objects that are deemed to be "unknown" (e.g., unrecognized by the robotic assistant 5002*r*), and/or are typically modifiable, adjustable, or otherwise require identification and detection of their characteristics (e.g., size, material, format, texture, etc.). Non-exhaustive, illustrative examples of non-standard objects include fruits, vegetables, plants, and the like.

FIG. 169A to 169E illustrate interaction between a robotic arm and objects, according to exemplary embodiments. In FIG. 169A, the interaction is a moving without grasping (non-grasping) interaction, to move a cup from point A to point B. The moving interaction is shown as a sequence of illustrations (corresponding to a sequence of motions) of the robotic arm and a cup type standard object, at time intervals between "time 0" (t0) and "time 4" (t4). The robotic arm 5002*r*-1*c* includes a robotic hand which is used to move the cup (e.g., a particular point of the cup) from a starting point A at time t0, to an ending point B at time t4. At time t0, the robotic hand is controlled to be placed at a starting position for performing the interaction, which can be a position in which the robotic hand does not contact the cup, and the cup is located between the robotic hand and the ending point, point B. In turn, at time t1, the robotic hand is controlled to make contact with the cup, for example, by employing pressure sensors to indicate when contact is made. In turn, at time t2, the robotic hand begins to a apply a force or pressure upon the cup in the direction of point B. The pressure or force applied by the robotic hand or the cup can be monitored and controlled by sensors (e.g., pressure sensors) equipped on the robotic hand or end effector. At time t3, the robotic hand completes the movement of the cup to the desired position, point B and, in turn, at time t4, the robotic hand severs the contact with the cup, leaving the cup repositioned as targeted.

FIG. 169B illustrates an exemplary interaction between a robotic arm and a non-standard object, according to an exemplary embodiment. In FIG. 169B, the interaction is a grasping interaction of an apple, which is a non-standard object. The grasping interaction is shown as a sequence of illustrations of the robotic arm and an apple type non-standard object, at time intervals between "time 0" (t0) and "time 3" (t3). The robotic arm 5002*r*-1*c* includes a robotic hand and fingers which are used to grasp the apple. As described above, in some embodiments, interactions with non-standard objects can include different and/or additional steps to perform interactions. Thus, as shown in FIG. 169B, at time t0, the robotic hand is placed at a starting position within a predetermined proximity (but not in contact with) the apple. The robotic hand can be moved to the starting position with the assistance or guidance of data obtained by one or more of the sensors of the end effector 5002*r*-1*c*, the robotic assistant 5002*r*, and/or the workspace 5002*w* and environment 5002. For instance, as shown at time t0, the end effector 5002*r*-1*c* includes or has embedded therein at least two cameras. One camera 5002*r*-4*a* is disposed on the palm of the robotic hand, and the other camera 5002*r*-4*b* is disposed at a part protruding away from the robotic wrist. As described above, in some embodiments, the part on which the camera 5002*r*-4*b* is disposed can rotate by up to 360 degrees relative to the arm or wrist. These two cameras enable the robotic assistant 5002*r* and/or the end effector 5002*r*-1*c* to image or visualize the apple to be grasped from different perspectives. As a result, the position of the apple at time t0 can be accurately calculated, as well as its velocity and direction (if/when the apple is in motion). At time t1, the robotic hand is caused to be placed in contact with the apple. As described herein, such contact can be identified using camera type sensors and/or pressure type sensors, for example. In turn, at time t2, the robotic hand is moved further in the direction of the apple until a desired part of the palm is placed in contact with a desired part of the apple, to ensure optimal grasping. Lastly, at time t3, the robotic fingers of the robotic hand are caused to move or flex inwardly toward the palm to a position in which they are sufficiently in contact with the apple to be deemed a successful grasp. As described herein, the amount of movement of the fingers into contact with the apple can be managed and controlled using sensors such as pressure sensors to detect how much force the fingers are applying to the apple.

Similar to FIGS. 169A and 169B, FIGS. 169C to 169E illustrate exemplary interactions between a robotic arm and objects, according to exemplary embodiments. In particular, FIGS. 169C to 169E illustrate interactions between a robotic arm and a raw chicken, an apple, and a kitchen instrument (e.g., hand blender), respectively. As described above in connection with FIGS. 169A and 169B, the interactions are shown as sequences of illustrations corresponding to sequences of motions corresponding to time intervals.

When the identification of the object is performed by the end effector and the group of environment applicable to the object is identified, the list of interactions (being downloaded to the embedded processor that is operating the end effector) is narrowed to the particular list of possible operations or interactions with the object that are available in the exact environment where the end effector is located. When the lists (e.g., all lists) of objects are identified, they (e.g., their libraries) are made ready to be downloaded to embedded low-level processors that perform or control the actual operations of the end effector in accordance with the commands of the main processor of the high level. In some embodiments, every end effector can have its own sensors and cameras, and can receive enough final data to perform the interactions with the objects.

In some embodiments, cameras (e.g., of each end effector) can be located or positioned at (but not limited to):

1. A camera on the palm of the robotic hand, which can help observe the objects that are located in front of the palm at the moment of grasping or action.
2. A camera located at a special extension placed at the wrist of the robotic hand, which can observe the area over the top of the robotic hand and at a certain angle.

3. A camera on the wrist of the robotic hand located perpendicular to the hand. This camera location helps to observe the area of interaction with such objects as the blender, for example, that are grasped/held by hand and directed downwards.
4. A camera(s) on the ceiling of the workspace (so called central camera system). This camera location helps to observe the whole workspace and update it's virtual model, that can be used for collision avoidance, motion planning and etc.

In some embodiments, cameras such as the camera located on the wrist of the robotic hand are constructed to be able to rotate by up to 360 degrees. This enables the positioning or repositioning of the cameras to achieve the required observation of the interaction areas.

Moreover, the system of cameras located on the hand and wrist enables or facilitates: (1) performing observations anytime that the area of the interaction between the object and the robotic apparatus or robotic end-effector (or object fixed in robotic hand/end effector); (2) identifying the points of control that define how successful or unsuccessful the process of interaction is proceeding, and helps to perform the check and capture of the successful final interaction stage processing.

The commands that make up and are configured to perform an interaction are executed in accordance with an algorithm of interaction. With reference to FIG. 165, at step 6056, the robotic assistant 5002*r* generates an algorithm of interaction, configured to successfully perform an interaction. It should be understood that the robotic apparatus 5002*r* (e.g., using its high level processor), at step 6056, can generate one or multiple algorithms of interaction, as needed in order to perform a recipe, such as cooking a dish. It should be understood that, in some embodiments, the algorithm of interaction can be generated by a system or device other than the robotic assistant, and transmitted to the robotic assistant for execution. An algorithm of interaction is generated such that it achieves an error-free (or substantially error-free) interaction between the end effector and object or objects. To this end, the algorithm of interaction is well-defined and tested to maximize its accuracy, as described in further detail below, based on reinforced learning or training techniques.

Still with reference to step 6056, the algorithm of interaction is customized and/or specifically tailored for the specific configuration of the instance or type of environment 5002, workspace 5002*w* (and identified objects therein), and robotic assistant 5002*r* (including its parts, components, subsystems, and the like). That is, because each environment, workspace, and robotic apparatus can vary (e.g., in dimensions, arrangements, contents, etc.), a single algorithm of interaction preferably should generally not be used by any robotic assistant, and/or in any workspace or environment to perform a given interaction. For instance, moving a cup on a kitchen counter top having a surface slicker than the counter top surface of another kitchen would require that different amounts of force be applied by the robotic hand onto the cup in order to slide the cup to the desired position. Thus, because even slight differences in workspace, environment, robotic apparatus and other aspects of an interaction can generate less-than-optimal interaction results, for instance, in which the results do not perfectly (or substantially perfectly) match the expected results of that interaction. As one illustrative example, in some cases, cooking an ingredient over heat that is even slightly higher or lower than the expected or target heat could result in an entirely unusable (e.g., undercooked, burnt) ingredient.

As described above, the algorithm of interaction can be generated to achieve the goal or objective initially received and/or identified by the robotic assistant 5002*r*. For instance, the robotic assistant 5002*r* can be instructed by another system (e.g., client system, third party system, etc.) to execute a recipe, such as cooking a dish. Or, the robotic assistant can be triggered by internal logic (e.g., scheduler) to execute a recipe (e.g., cook a dish at 5 pm every Tuesday; cook a dish when low grocery count is identified in refrigerator and pantry). Having identified the recipe to be executed, the robotic assistant 5002*r*, at step 6056, can generate the algorithm of interaction for instance, by customizing a generic recipe algorithm of interaction for the identified environment 5002, workspace 5002*w*, and robotic apparatus 5002*w* (and its parts (e.g., joints, etc.)). It should be understood that, because the robotic assistant 5002*r* only downloads data definitions of identified objects and or interactions capable of being executed in the environment 5002 and/or workspace 5002*w*, the robotic assistant can minimize its storage and processing burdens by not having to download, store and/or consider and/or process a vast amount of inapplicable or irrelevant objects and interactions.

An algorithm of interaction is made up of multiple commands, and each command is made up as a sequence coordinates for each part (e.g., joint) of the robotic assistant 5002*r*. The coordinates can include three space coordinates (e.g., X, Y and Z axis coordinate) and time coordinates. In other words, the command definitions indicate where each joint of the robotic assistant 5002*r* should be at a defined time (e.g., as shown in FIGS. 187A and 187B). The coordinates can be measured from or relative to starting or default coordinates, which indicate the X, Y and Z axis positions (sometimes referred to herein as "position 0") of the parts of the robotic end effector at a time t0. It should be understood that the positions 0 can in some embodiments be a position relative to the position, orientation and/or other characteristics of the environment, workspace and/or the object to be interacted with. Thus, prior to, or as an initial step of the algorithm of interaction, the robotic assistant 5002*r* is moved to the position 0. For example, part of an interaction of grasping an apple can be defined as a sequence of commands that instruct each joint of multi-jointed fingers of the robot to gradually rotate (relative to the position 0 and/or a preceding position) in an internal direction over a sequence of time until sufficient contact is made by each of the fingers with the apple. Here, it is useful to highlight why an algorithm of interaction with a non-standard object such as an apple can be more complex than an algorithm of interaction with a standard object such as a cup. That is, because the cup's shape and other characteristics (e.g., malleability) are known, as opposed to the apple, it is possible for the algorithm to be perfectly tailored to cause the fingers of the robotic assistant to move to exact coordinates to grasp the cup, rather than relying on estimated coordinates (e.g., based on camera imaging) aided by other sensors (e.g., pressure sensors) to determine when the apple has indeed been sufficiently grasped.

As described above, the algorithm of interaction is designed to perform error-free (or substantially error-free interactions). As stated, because interactions performed by the robotic assistant 5002*r* can sometimes not be aided by supervision or human quality control, it is vital that the algorithm perform each command as precisely as possible. This precision can be achieved by training the robotic assistant to perform each command and/or interaction to perfection (or as perfectly as possible). For instance, when training the robotic assistant 5002*r* to perform an interaction such as pressing the "ON" button of an oven in the workspace 5002*w*, the robotic assistant can repeatedly perform (or attempt to perform) each of the commands necessary for that interaction until they are sufficiently accurately performed. When each command of the interaction is successfully performed by the robotic assistant, the underlying instructions and/or parameters such as the space coordinates (e.g., X, Y, Z, axis) of each part of the robotic assistant at each time period can be stored and/or used to program the robotic assistant 5002*r* accordingly. This training process can be referred to as "reinforced training" and/or "reinforced learning."

Reinforced learning, which is a process of training the robotic assistant 5002*r* (or other systems or processors) to execute interactions without errors (or substantially without errors), through one or more iterations of a testing and learning plan. The testing and learning plan of the reinforced learning process can be performed until the reliability of the interactions is achieved and confirmed. Reinforced learning can be performed by the robotic assistant 5002*r* at any point prior to executing interactions. For example, the robotic assistant 5002*r* can be trained when it is manufactured, when aspects of the robotic assistant 5002*r* have been changed (e.g., system update), and/or when the robotic assistant 5002*r* is deployed to a new environment 5002 and/or workspace 5002*w*. Additionally or alternatively, the robotic assistant 5002*r* can continuously be trained during its lifecycle. It should be understood that, in some embodiments, training of the robotic assistant 5002*r* can be performed specifically using the robotic assistant 5002*r*. In other cases, training can be performed on an robotic assistant that is the same as the robotic assistant 5002*r*. In such cases, training results or instructions customized for the type of the robotic assistant 5002*r* can transmitted to the robotic assistant 5002*r* for execution, such that the robotic assistant 5002*r* does not have to perform the training itself.

Reinforced training for a particular interaction is performed by executing a number of test interactions until a predetermined threshold number of successful cases or executions of that interaction have been achieved. It should be understood that the data that constitutes a successful case is fixed (e.g., known) and can be predetermined or preset prior to the interaction. For example, a successful case for an interaction of turning on the oven can be defined by the oven having its power state changed from the "OFF" position to the "ON" position. In cases where the training interaction is a grasping interaction for moving, the successful case can be defined by the coordinates of a position, orientation and the like to which the object should be moved. The training of the robotic assistant 5002*r* is therefore measured against these predetermined successful result criteria.

Training the robot to achieve successful cases (e.g., executions) of the desired interaction can include first imaging the object to be interacted with by one or more of the cameras 5002*r*-4 of the robotic assistant. In some embodiments, this includes moving the object or moving the object to a desired relative position of the cameras 5002*r*-4 and parts (e.g., end effectors) of the robotic assistant 5002*r*, where the object is imaged. This desired relative position is sometimes referred to as a "gauging point." When the object and/or robotic assistant are positioned at the gauging point, the cameras 5002*r*-4 can be used to image the object from various angles. For example, the object can be imaged from the top, front, side and/or bottom to produce various frames of observation (e.g., 5 frames). Thus, the robotic assistant 5002*r* iteratively attempts to perform an interaction (or portion thereof) until the gauging point is consistently reached as measured by the cameras 5002*r*-4 and/or other sensors, thereby indicating that the robotic assistant has repeatedly successfully performed that aspect of the interaction.

For example, to train the robotic assistant to grasp an apple, the robotic assistant 5002*r* attempts to use its end effectors 5002*r*-1, 5002*r*-1*n* to grasp the apple, and move the apple to the gauging point. After each attempt, the robotic assistant 5002*r* uses its cameras to image the object and determine whether its position, orientation, etc. match that of the successful case. If the apple is deemed to be placed, oriented, or otherwise incorrectly, the robotic assistant 5002*r* modifies its parameters until the apple is moved to a position, orientation, etc. that match the successful case. In some cases, training the robotic assistant 5002*r* to interact with non-standard objects include: scanning (e.g., imaging the object); creating rules for the interaction, including based on the size and other characteristics of the object; and classifying the object to specific types of interactions based on the size of the object.

At step 6058 of FIG. 165, the robotic assistant 5002*r* executes the algorithm of interaction generated at step 6056. FIG. 170 illustrates a flow chart of a process for executing an interaction, according to an exemplary embodiment. In FIG. 170, a single end effector is used to perform the interaction with a single object. However, as known to those of skill in the art, an interaction can be performed using one or more end effectors (or other components) of the robotic assistant 5002*r* and one or more objects. The high-level processor of the robotic assistant 5002*r*, having generated the algorithm of interaction, can identify various parameters (e.g., interaction data) needed to initiate the interaction and each command (e.g., motion) therein. Such parameters can include the starting preliminary position of the end effector 5002*r*-1*c* of the robotic assistant 5002*r*, the position 0, an interaction ID, and approximate coordinates of the object, among other data. As described above, the coordinates of the object can be identified based on imaging obtained from one or more cameras associated with the robotic assistant 5002*r*. At step 8050 of FIG. 170, the high-level processor sends all or portions of the interaction data to the end effector 5002*r*-1*c*, which is identified as the end effector to perform the interaction.

In turn, at step 8052, the embedded processor of the end effector 5002*r*-1*c* of the robotic assistant 5002*r* uses this information to initiate its interaction responsibilities, by positioning the end effector 5002*r*-1*c* and/or object to be interacted with at a preliminary position relative to one another. In some embodiments, the preliminary position includes the end effector being placed above the object to be manipulated, based on the imaging of the object performed during the object identification process described above.

At step 8054, the robotic assistant positions the end effector at position 0 (also referred as optimal standard position). Prior to positioning the end effector at position 0, the one or more processors (comprising the high-level processor/central processor and low-level processors) detect the environment and objects present in the environment. Therefore, initially, the one or more processors may receive environment data corresponding to a current environment, from one or more sensors configured in the robotic assistant system (also referred as robotic assistant). In some embodiments, each of the one or more sensors may be associated with a sensor collector configured in the robotic assistant system. The complete hierarchy/architecture of the illustrates of the robotic system is as shown in the FIG. 171A.

As shown in the FIG. 171A, the complete hierarchy comprises at bottom most level, a group of actuators and sensors which are further associated with the sensor collector via a signal bus. Further, the sensor collector may be associated with a kinematic chain processor system via the sensors link. In some embodiments, the kinematic chain processor system may be group of processors i.e. the one or more processors configured in a single kinematic chain for the working of the kinematic chain. As an example, the robotic arm may be considered as one kinematic chain and each of the one or more processors configured in the kinematic chain may be collectively referred as the kinematic chain processor system. Further, the kinematic chain processor system may be associated with the central processor via the chain link as shown in the FIG. 171A. Thereafter, the central processor may be further connected to a remote control system via the robot control link.

From the top down, high-level displacement commands in 3-dimensional space are converted into instructions for moving each particular kinematic chain (also referred as an end effector/one or more manipulation devices), each link in the manipulator, eventually turning into motor control signals (objective lenses, light sources, laser). Any subsystem is understood as a hardware-software unit, isolated mechanically, constructively, (optionally) electrically and logically (interface). Each subsystem, in turn, can also contain separate components (boards of connection for external interfaces, hardware acceleration modules, power supplies, etc.)

The purpose is to determine the minimum required set for each subsystem:

Interfaces (logical, mechanical, electrical);

Computational capabilities (within the framework of some algorithmic basis inherent in each subsystem);

Constructive and operational features of the subsystem.

Further, the main components of the hierarchy/architecture are described below in more detail.

Actuators & Sensors Group

This subsystem comprising a group of actuators and sensors is a set of mechanical components of a single kinematic chain. It also includes the entire set of physical sensors built into the one or more manipulation devices (also referred as manipulator/s). The set of sensors, the number of links, as well as the electromechanical properties of the subsystem interface are always unique for a certain type of manipulator.

Since different types of manipulators can have different sets of sensors (and the sensors themselves—differ by interfaces), a component that isolates the features (electrical, mechanical, logical) of the manipulator's parts may be necessary. The sensors collector abstracts the operation of higher-level subsystems with specific sensors and control objects embedded into the manipulator. Sensors Collector converts the Signals Bus to a "standard" stream for upstream event subsystems. And in the opposite direction—it converts the command flow into the corresponding sequence of control signals on the buses of sensors, motors, drives, lamps, etc. The design of the Sensors Collector may always correspond to the types of the specific end effector and/or manipulator.

Kinematic Chain Processor System

The kinematic chain processor system i.e. group of processor or the one or more processors is designed to solve the task of controlling one kinematic chain. Kinematic Chain Processor System provides the primary image processing from the manipulator cameras, recognizes vector objects in the geometric boundaries specified by the Central Processor (back-end CV). Kinematic Chain Processor system provides identification of a vector object as a possible element of the 'Local' Workplace using the identifier database received from the Central Processor. Also, the Kinematic Chain Processor system synchronizes its Local Workplace with the 'Robot' Workplace of its parent subsystem (Central Processor).

Central Processor

The Central Processor provides control of a group of kinematic circuits, either by executing high-level commands from the remote control system, or by autonomously executing a pre-loaded script. One or more Kinematic Chain Processor Systems can be connected to the Central Processor. The Central Processor provides the solution of the kinematic stability problem. The Central Processor solves the front-end tasks of computer vision by synchronizing the 'Local' Workplaces from the subordinate Kinematic Chain Processor Systems to its 'Robot' Workplace. Further, the Central Processor distributes low-level CV tasks on the connected Chain Controller, providing the necessary coverage of the 'Robot' Workplace. Also, the Central Processor includes human-machine interface elements such as recognition of voice commands, gestures, interfaces with user input/output devices (keyboard, touchscreen, etc.)

Standalone Robot

The stand-alone robot is a robot capable of moving, containing a set of a number of manipulators, the corresponding number of Kinematic chains (with Kinematic Chain Processor System), and also one Central Processor System placed in a single construction shows a variant with three kinematic chains.

The connections between the actuators and sensors group, sensors collector, kinematic chain processor system and the central processor system is as shown in the FIG. 171B.

Further, a remote control system is a subsystem for managing a group of Standalone robots combined through a local network or the Internet.

At each processing level of the hierarchy/architecture, a particular subsystem not only converts data, reducing the bandwidth requirements of data channels from the bottom to the top, but also, obviously, delays the propagation of information from sensors (or complex events based on a group of sensors) to the general processing path. For the aggregate of data paths in the proposed architecture, the growth of delays is characterized by a decrease in the volume of transmitted data on the way from the sensors to Central Processor System and Remote Control System. At the same time, strict real-time requirements may be put forward for the data streams terminating on the Central Processor, since the task of kinematic stability would be solved at the Central Processor level. A scheme representing connection between the bandwidth and latency in a hard real-time environment is shown in the FIG. 171C.

Further, data flows from the connected Kinematic Chain Processor Systems to the Central Processor level may be derived from data received from the Sensor Collector, and those from physical sensors on the manipulators or end effectors. The delay from the physical sensors to the Central Processor can be different because of the different number of sensors served by the Sensor Collectors, or the different types of interfaces that make their own, unique, delays. To facilitate the communication of the command with the feedback data stream, the information from the primary sensors receive timestamps, and the commands themselves are acknowledged. Each local clock in each of the subsystems mentioned as part of the hierarchy/architecture may be synchronized.

Using the architecture/hierarchy as explained above, the one or more processors may receive environment data corresponding to a current environment, from one or more sensors configured in the robotic assistant system via the sensors collector. In some embodiments, the environment data may include, but not limited to, position data and image data of the current environment, which may be obtained from the navigation systems and one or more image capturing devices configured in the robotic assistant system. The one or more processors may further transmit the environment data to a remote storage associated with the universal robotic assistant systems, wherein the remote storage comprises a library of environment candidates. Thereafter, the one or more processors may receive type of the current environment determined based on the environment data, from among the library of environment candidates. Further, the one or more processors may detect the one or more objects in the current environment, wherein the one or more objects are associated with the type of the current environment. The one or more objects may be detected based on at least one of the type of the current environment, the environment data corresponding to the current environment, and object data, from a plurality of objects belonging to the current environment. In some embodiments, the plurality of objects may be retrieved from a remote storage associated with the robotic assistant system. The one or more processors may detect the one or more objects by analysing features of the one or more objects, such as, but not limited to, shape, size, texture, colour, state, material and pose of the one or more objects.

Upon detecting the one or more objects and the current environment, the one or more processors may identify one or more interactions associated with each of the one or more objects based on interaction data that is retrieved from the remote storage. Further, the one or more interactions may be executed on the corresponding one or more objects based on the interaction data. However, execution of the one or more interactions requires that sequence of motions be performed by or on the one or more objects from the optimal standard position i.e. position 0. Therefore, initially, the one or more processors, are positioned on one or more manipulation devices within a proximity of the corresponding one or more objects and then the optimal standard position of the one or more manipulation devices relative to the corresponding one or more objects is identified, wherein the optimal standard position is selected from the one or more standard positions of the one or more manipulation devices. Upon identifying the optimal standard positions, the one or more manipulation devices may be positioned at the identified optimal standard position using one or more positioning techniques, after which the one or more interactions may be executed on/by the corresponding one or more objects using the one or more manipulation devices.

In some embodiments, position 0 is a starting or default relative position and orientation of the end effector 5002*r*-1*c* and object to the object to be interacted with. In some embodiments, the position 0 can serve as a basis or relative point from which each command or motion performed during an interaction is measured. Position 0 is used to ensure that interactions being executed based on prior reliable trainings are performed without errors. Position 0 is the standard position and orientation of the object relative to the end effector at the beginning of the interaction and manipulation process. Exit to Position 0 is the exit to that distance and that relative position between end effector and object where the robotic apparatus is trained by the reinforced learning or any other learning processor or system to have an error-free (or substantially error-free) interaction with the object and passes through a cyclical testing plan to confirm reliability of those interactions.

If the speed is the same, the position modification is the same, the object of the interaction is the same, then the result of the interaction will be the same and therefore error-free (or substantially error-free) in case of the achievement of the standard position between the end effector and object from which robotic apparatus is trained to start the interaction with the object. In other words, a successful functioning interaction between the end effector and object depends on the achievement of the adjustment to the standard position. In order to further facilitate or achieve an error-free (or substantially error-free), reliable and functional interaction between the end effector and object, a camera can be installed to the end effector to identify the position and object orientation, and compare it with expected one (Position 0).

As mentioned above, the end effector 5002*r*-1*c* (also referred as the one or more manipulation devices) may be positioned at position 0 using one or more positioning techniques. The one or more positioning techniques comprises at least one of object template matching technique and marker-based technique, wherein the object template matching technique is used for standard objects and the marker-based technique is used for standard and non-standard objects. Positioning (e.g., to position 0) can be performed using a 3D object template of the object to be interacted with. An object template is a detailed data description or definition of the 3D object's shape, color, surface, material, and other characteristics known to those of skill in the art. In some embodiments, the object template is used to compare the images of the object obtained from the cameras (e.g., cameras embedded in or of the end effector), as positioned and oriented at step 8052, to the data definition of the object stored in the 3D object template, which indicates the expected characteristics of the object when successfully positioned at position 0. To explain in detail, the one or more processors may retrieve an object template of a target object from a remote storage associated with the universal robotic assistant systems, wherein the target object is an object currently being subjected to one or more interactions, wherein the object template comprises at least one of shape, colour, surface and material characteristics of the target object. Further, the one or more processors may position the one or more manipulation devices to a first position proximal to the target object. Thereafter, the one or more processors may receive the one or more images, in real-time, of the target object from at least one of image capturing devices associated with the one or more manipulation devices, wherein the one or more images are captured by at least one of the image capturing devices when the one or more manipulation devices are at the first position. Further, the one or more processors may compare the object template of the target object with the one or more images of the target object. Further to comparison, the one or more processors may perform at least one of: adjusting position of the one or more manipulation devices towards the optimal standard position based on position of the one or more manipulation devices in previous iteration and reiterating steps of receiving and comparing, when the comparison results in mismatch; or inferring that the one or more manipulation devices reached the optimal standard position when the comparison results in a match.

In some embodiments, object templates cannot or are preferably not applied to non-standard objects that are modifiable (and/or that don't have a known shape, size, etc.). Modifiable objects include objects that can change their 3D shape after being interacted with (e.g., opened, squeezed, etc.). Other exceptional objects that cannot or are preferably not defined as object templates include glass or transparent objects, objects with reflective surfaces, objects of non-standardized shape and size, temporary objects, and the like. These objects, whose characteristics and features are not readily known or stored in an object template, can be interacted with (e.g., to be moved to position 0, using real-world i.e. physical markers and/or virtual markers, as described below in further detail. In some embodiments, the physical markers may be disposed on the target object, whereas the virtual markers corresponding to one or more points on the target object, wherein the one or more markers enable computation of position parameters comprising distance, orientation, angle, and slope, of the one or more manipulation devices with respect to the target object. In some embodiments, the target object may be an object currently being subjected to one or more interactions. In some embodiments, the one or more markers associated with the target object are physical markers when the target object is a standard object and the one or more markers associated with the target object are virtual markers when the target object is a non-standard object.

Marker based technique for navigation to position 0 uses one or more markers placed on the object to be interacted with and/or moved to position 0. The marker can be made up of one or more 2D patterns, which are placed on the object. Because markers have a pattern that is known to the end effector 5002*r*-1*c* and/or the robotic assistant 5002*r*, the markers can more easily be detected, such that the estimation of the pose of the object can be more computationally efficient and accurate. That is, markers can be used to more reliably and accurately to compute the orientation and distance between the object and end effector, and/or its cameras (which, in some embodiments, make up an embedded vision system (described in further detail below)). Markers placed on the one or more manipulating devices enables to estimate pose and orientation of the one or more manipulating devices with respect to General Purpose Vision system and kitchen surface origin. This can be used for calibration and check of positioning accuracy, damage or run-out of the one or more manipulating devices. However, markers placed on the one or more objects are used to compute pose and orientation of the one or more manipulating devices with respect to the one or more objects or vice versa.

As an example, the one or more markers may include, but not limited to, Quick Response (QR) codes, Augmented Reality (AR) markers, Infrared (IR) markers, chessboard/checkerboard markers, geometry and color markers, and combinations thereof (e.g., triangle marker, which consists of three other markers placed in the vertices of equilateral triangle). Markers are used for computing the orientation and distance between the object and dynamic image capturing devices embedded in the one or more manipulating devices or the static camera, which is part of Global Scene Vision system, more reliably and accurately. The types of markers that may be used depends on, for example, scene, object type and structure, lighting conditions and the like. Different types of markers enable the computation of distance and orientation of the object with different use of computational resources.

Each type of marker has characteristics that are considered for their selection, and which are known by the robotic assistant 5002*r* and that can be considered during a manipulation. These characteristics can include: orientation/symmetry; maximum viewing angle (maximum allowed angle that the marker can be detected from); tolerance to variations of lighting; ability to encode values; detection accuracy (e.g., in pixels); built in correction capabilities; computation resources, and the like. Based on these, optimal markers can be selected and used for particular objects and conditions of the environment 5002 and/or workspace 5002*w*. Each type of marker has different advantages. For example, some markers are oriented and some are not; detection of some markers is computationally more efficient than of other markers; detection of some kinds of markers is more precise due to angle and lighting conditions tolerance. For example, AR markers are oriented, encode integer values, and their detection is computationally efficient. Chessboard markers, on the other hand, are often not oriented and require almost twice as much or more computational resources to be detected. However, chessboard markers can be localized with higher (subpixel) accuracy and has built in mistakes correction capabilities. Further, IR markers is a special kind of pattern, implemented with small reflective points placed to the known points on the objects and visible in infra-red lighting. In conjunction with infrared light source and camera, reflective points may play a role of marker corners and used for pose estimation.

To make sure that system of markers or objects work flawlessly, remote identification technology such as Radio Frequency Identification (RFID) and/or Near Field Communication (NFC) in combination of different type of visual markers may be implemented. Integrated solution of these two types of technologies increase the reliability of the system and object identification in different environments.

More details about various types of markers and their particularities are provided below. Markers may vary and may be of different types and configuration to set up the distance to the object and space orientation of the object. Basically, almost every geometric shape with at least 3 sharp corners and some pattern inside can be used as an explicit marker. A calibrated camera system is able to compute the distance to and pose of the marker placed on the object, using the known distances between corners of the markers. The pattern contained in the marker may be used to filter out false detections and to encode an integer object's identifier (Id), or object's group Id. In addition to that, contained geometry pattern plays an important role in object's design and typically is based on company logo or symbolics. One of the key features of high quality marker detection technology is good design of internal pattern, information capacity of the internal pattern and robust detection in various lighting conditions and poses.

Using markers and marker detection during interactions, particularly interactions with dynamic objects, increases reliability because they can be quickly detected and thus pose estimation can be computationally efficiently done in real time, even with subpar hardware. In some embodiments, using markers during interactions, as described in detail herein, includes: detecting markers on the object in the images obtained from related cameras (e.g., overhead cameras of a general-purpose vision subsystem, described herein, which can be used for global scene monitoring); calculating real world coordinates of the markers at given time periods (e.g., every 10 milliseconds); estimating the trajectory (e.g., velocity and direction) of the object; calculating the expected position and pose of the object for a future moment m; moving the one or more manipulating devices (also referred as end-effector) to the estimated position in advance; holding the end effector in the required position and pose for the required moment of time; performing the actual interaction. Marker detection therefore enables the synchronization of positions and poses of the moving object and the end-effector.

As discussed above, one type of marker that can be provided on an object is a triangle marker. A triangle marker includes three detectable markers or patterns placed at the vertices of an equilateral triangle. FIG. 172A illustrates a triangle marker made up of three 2D binary code markers (e.g., AR markers), according to an exemplary embodiment; FIG. 172B illustrates a triangle marker made up of three colored circle shapes, according to an exemplary embodiment; FIG. 172C illustrates a triangle marker made up of three colored square shapes, according to an exemplary embodiment; and FIG. 172D illustrates a triangle marker made up of both binary code markers and colored shape markers, according to an exemplary embodiment. In some embodiments, AR markers and other binary markers are made up of detectable black and white patterns that have identifiable sides (e.g., top/bottom/left/right) that encode an integer value. These markers are ideally properly oriented, since triangle itself is symmetrical, therefore extra information may be necessary to detect its top/bottom to properly adjust to Position 0. Colored shape (e.g., circle, square) markers are another option. The color of each shape functions as an identifier of the triangle's top and/or bottom sides (e.g., blue circle means bottom side of triangle).

In some embodiments, triangle markers are disposed and/or applied to objects at areas where they are to be interacted with—e.g., grasped. For instance, as shown in FIGS. 172A to 172D, the markers are placed on a handle portion in order to more easily detect the grasping portion of the object, and thus position the end effector and/or object at position 0.

Adjusting the end effector (e.g., to position 0) can, in some embodiments, be performed as follows:

The one or more processors may move the one or more manipulation devices towards the triangle-shaped marker until at least one side of the triangle-shaped marker has a preferred length (or range of sizes, threshold size). As an example, the end effector may be moved or positioned toward the triangle-shaped marker, until at least one side of the triangle marker, as viewed through imaging captured by a camera of the end effector, measures for instance 225 pixels.

Further, the one or more processors may rotate the one or more manipulation devices until a bottom vertex of the triangle-shaped marker is disposed in a bottom position of the real-time image of the target object captured by the camera of the one or more manipulation devices.

Thereafter, the one or more processors may shift the one or more manipulation devices along an X-axis and/or Y-axis of the real-time image of the target object until a center of the triangle-shaped marker is positioned at the center of the real-time image of the target object captured by the camera of the one or more manipulation devices.

Finally, a slope of the angle of the camera relative to the triangle-shaped marker is adjusted (e.g., by moving the end effector and/or moving the object) until each angle of the triangle-shaped marker is at least one of equal to approximately 60 degrees or equal to a predetermined maximum difference between the angles that is smaller than their difference prior to initiating the adjustment of the position of the one or more manipulation devices. In some embodiments, achieving at least one of the two conditions mentioned above, indicates that the one or more manipulation devices have reached the optimal standard position.

These above-referenced steps can be iteratively performed until all angles of the triangle are equivalent to 60 degrees and all sides of the triangle are equal to a required or predetermined size, as viewed through the image captured by the camera of the end effector.

In turn, once the camera plane and the triangle are aligned—e.g., such that they are parallel to one another, and the triangle is on the optical axis of the camera, the projected triangle, as seen by the camera of the end effector is also equilateral. This means that all sides of the triangle are equal (or substantially equal) to each other and all angles are equal (or substantially equal) to 60 degrees. FIG. 173 illustrates imaging of a triangle-shaped marker, according to an exemplary embodiment in which the triangle marker and the camera plane are substantially aligned, such that there is no slope. More specifically, in FIG. 173, the angles measure 60, 61 and 59 degrees, and their respective vertices measure 228, 228 and 225 pixels.

When the end effector identifies a slope between the planes of the camera and the triangle-shaped marker, one of the triangle's angles, as imaged by the camera, is seen as being larger than the other two angles. This angle disparity indicates that the vertex having the apparently larger angle is closer or father to the camera than the other two angles or vertices. This can be seen in FIGS. 174A and 174B, which illustrate a same triangle marker imaged from two different angles or directions. In FIG. 174A, the triangle marker is imaged such that the vertex furthest from the camera is imaged as having the largest angle (87 degrees, versus 51 and 42 degrees), and in FIG. 174B, the triangle marker is imaged such that the vertex closest to the camera (e.g., the furthest vertex in FIG. 174A) is imaged as having the largest angle (86 degrees, versus 46 and 48 degrees).

In some embodiments, the vertex positions and movements of the triangle marker (e.g., during positioning) can be identified and/or calculated using a mathematical model that receives, as inputs, three axes X, Y and Z. X and Y are angles of the triangle—the fourth angle is therefore determinable based thereon—and the Z axis is a distance from the camera to the object. Distance is defined and/or calculated by the size of each of the triangle's axes. That is, closer triangles to the camera of the end effector result in longer sides of the triangle being imaged. Using these assumptions and information with the model, the end effector can be moved (e.g., forward, backward, left, right) as needed in order to make the sides equal in the imaging of the marker.

Depending on the slopes of the camera at various positions, altered as the camera is rotated to the right, left, front and/or back, the angles of the triangle-shaped marker, as visualized by the camera, are changed. The bigger the angle is or becomes on the image of the camera, the further it is or moves from the camera. Because the sum of all angles of a triangle always equal 360 degrees, the robotic assistant 5002*r* can calculate or determine which angles of the triangle are being observed by the camera, and the position in which the angles are positioned in relation to the camera. In this way, the end effector, depending on the images captured by its camera, can calculate or identify how the end effector should move—e.g., to which side, distance and inclination—in order to reach or achieve the position 0. When the imaged triangle-shaped marker is determined to match the angle of two of its vertices, it becomes possible for the robotic assistant to calculate the inclinations and lengths of the sides of the triangle, which thereby also makes it possible to calculate the distance from the camera to the triangle marker. As a result, the robotic assistant can, in turn, move in the opposite direction (e.g., in the direction of decreasing angle) to achieve the position 0 of the end effector.

FIGS. 175A to 175D illustrate triangle-shaped markers disposed on an object (e.g., pan handle) as viewed through camera image of the end effector, according to an exemplary embodiment. Each of the images illustrated in FIGS. 175A to 175D demonstrate the above-mentioned characteristics and principles of the triangle-shaped markers. For example, FIGS. 175A and 175B illustrate relative changes in angles of the vertices of the triangle markers as the camera is moved (e.g., rotated) front-to-back or back-to-front, thereby changing its slope. FIGS. 175C and 175D illustrate relative changes of angles of the vertices of the triangle markers as the camera of the end effector is moved (e.g., rotated) side to side, front to back and/or back to front. Such rotation causes the angles to be impacted accordingly, as described above.

In some embodiments, the robotic assistant can calculate the required shift or rotation of the end effector to position it at the target position, such as position 0, by using the visible and expected coordinates of a triangle marker. For the calculation, the robotic assistant considers two triangle markers, illustrated in FIGS. 176A(1) to 176A(3) and 176B(1) and 176B(2). That is, FIGS. 176A(1) to 176A(3) illustrate different exemplary types of a triangle marker as imaged through a camera, from a same position, namely a position in front of the camera at a distance $d_0$. The markers of FIGS. 176A(1) to 176A(3) form a triangle Δ ABC between each of the shapes of QR codes therein. FIG. 176B(1) illustrates a triangle marker as then (e.g., at the time of performing a calculation for movement/positioning of the end effector) imaged by the camera of the end effector; and FIG. 176B(2) illustrates the triangle formed by the triangle marker of FIG. 176B(1), namely triangle ΔÁB́Ć, which represents the triangle of the marker as then (e.g., at the moment of the calculation) imaged by the camera of the end effector.

Using this information about the triangles ΔABC and ΔÁB́Ć, the end effector and/or robotic assistant can perform the affine transformation shown in FIG. 177, to calculate the required movement of the end effector and/or its camera to cause the triangle ΔABC to be visualized by the camera instead as ΔÁB́Ć. In other words, the robotic assistant and/or end effector can calculate how to move the end effector and/or camera such that an imaged triangle can instead mirror the triangle as when it is positioned in front of the camera at a distance do, thereby indicating that the cameras has been properly placed relative to the triangle-shaped marker.

To this end, the robotic assistant can calculate the parameters of an affine transformation of the points of the triangle ΔABC of FIG. 176A(1) to points of the triangle ΔÁB́Ć of FIG. 176B(1) (or 176V(2)). Such an affine transformation can be represented as a composition of translation and linear transformation, for instance, as follows:

$$\vec{x}' = \vec{r} + M\cdot\vec{x},\ \vec{R} = \vec{O} - \vec{O}'$$

Therein, the center of triangle ΔABC can be represented as:

$$\vec{O} = \frac{\vec{A} + \vec{B} + \vec{C}}{3},$$

And the center of triangle ΔÁB́Ć can be represented as:

$$\vec{O}' = \frac{\vec{A}' + \vec{B}' + \vec{C}'}{3},$$

The centers of the triangles can be assumed to lie on the camera axis.

In turn, a matrix M is calculated as follows:

$$M\cdot\vec{A} = \vec{A}',\ M\cdot\vec{B} = \vec{B}' \Longrightarrow M\cdot\begin{bmatrix} A_x & B_x \\ A_y & B_y \end{bmatrix} = \begin{bmatrix} A'_x & B'_x \\ A'_y & B'_y \end{bmatrix}$$

$$M = \begin{bmatrix} A'_x & B'_x \\ A'_y & B'_y \end{bmatrix}\cdot\begin{bmatrix} A_x & B_x \\ A_y & B_y \end{bmatrix}^{-1}$$

That is, M can be represented as a composition of rotation and stretching matrices, such that a pair of perpendicular vectors are formed that remain perpendicular after the transformation, as shown below:

$$\vec{F}_0\cdot\vec{F}_{1=0},\ \vec{T}_0 = M\cdot\vec{F}_0,\ \vec{T}_1 = M\cdot\vec{F}_1\vec{T}_0\cdot\vec{T}_{1=0}$$

The perpendicularity of $\vec{F}_0$ and $\vec{F}_1$ indicates that that:

$$\vec{F}_0 = \begin{pmatrix} x \\ y \end{pmatrix}, \vec{F}_1 = \begin{pmatrix} y \\ -x \end{pmatrix},$$

Thus, the perpendicularity of $\vec{T}_0$ and $\vec{T}_1$ indicate that:

$$-(M_{11}M_{12} + M_{21}M_{22})\cdot x^2 + (M_{11}^2 - M_{12}^2 + M_{21}^2 - M_{22}^2)\cdot xy + (M_{11}M_{12} + M_{21}M_{22})\cdot y^2 = 0$$

$$U = M_{11}M_{12} + M_{21}M_{22}2V = M_{11}^2 - M_{12}^2 + M_{21}^2 - M_{22}^2$$

$$-U\cdot x^2 + 2UV\cdot xy + U\cdot y^2 = 0 \Longrightarrow \begin{cases} x = 1,\ y = 0U = 0 \\ x = \left(\frac{V}{U} + \sqrt{\frac{V^2}{U^2} + 1}\right)yU \neq 0 \end{cases}$$

In turn, after two vectors that remain perpendicular prior to and after the transformation have been identified, the robotic assistant and/or end effector identify or determine parameters of M, including (1) rotation angle α and coefficients of stretching: $k_0$ and $k_1$ as follows, for example:

$$\sin(\alpha) = \frac{\vec{F_0}\times\vec{T_0}}{|\vec{F_0}||\vec{T_0}|},\ \cos(\alpha)\frac{\vec{F_0}\cdot\vec{T_0}}{|\vec{F_0}||\vec{T_0}|},\ k_0 = \frac{|\vec{T_0}|}{|\vec{F_0}|},\ k_1 = \frac{|\vec{T_1}|}{|\vec{F_1}|}$$

FIG. 178 illustrates the parameters of the rotation and stretching parts of the affine transformation, prior to the rotation, after the rotation, and after the stretching, according to an exemplary embodiment. Having identified the parameters of the affine transformation, the necessary camera movement needed to place the camera at the desired position (e.g., position 0) is calculated. For example, the rotation of the camera can, in some embodiments, be equal to the rotation angle α calculated for the affine transformation (and shown in FIG. 178). Stretching by $k_0$ and $k_1$ indicates the distance between the triangle and the camera and its rotation around the axis, parallel to the camera plane. In this regard, let For example, let $$k_i = \min(k_0, k_1), k_j = \max(k_0, k_1).$$

Then, $$d' = \frac{d}{k_j}$$

is the current distance between the camera and the triangle. β is the angle of rotation of the triangle relative to the axis $\vec{T}_j$, namely $$\cos(\beta) = \frac{k_i}{k_j} \cdot \sin(\beta)$$

In some embodiments, it may not be possible to calculate sin [β] from the initial data, for example, because there are two possible triangle positions that correspond to the same camera image and thus, only the absolute value of sin (β) can be found, while its sign is unknown. Therefore, calculating sin (β) can be performed as follows. First, to decrease the angle β, the camera of the end effector must be moved along the axis $\vec{T}_i$, as shown in FIG. 196, which illustrates imaging of a triangle of a triangle marker by the camera of an end effector, according to an exemplary embodiment.

The necessary movement of the camera in order to reach the target position of the camera of the end effector relative to the object (e.g., position 0), is calculated as follows:

Let $\vec{P}$ be the then-present position of the camera, directed along $\vec{I}$ and rotated relative to it by angle ω. Further calculations are made in camera's relative coordinate system, as follows:

$$\Delta\vec{P} = \vec{d} + \vec{R} \cdot \tau \frac{d}{d_0} - \vec{d}_0,$$

where:

$$\vec{d} = \begin{pmatrix} \vec{0} \\ d \end{pmatrix}, \vec{R} = \begin{pmatrix} \vec{R} \\ 0 \end{pmatrix}, \vec{d}_0 = d_0 \cdot \begin{pmatrix} \vec{T}_i \cdot \sin(\beta) \\ \cos(\beta) \end{pmatrix},$$

and τ indicates a coefficient of proportionality between the actual length of the object and its dimensions in the image from the camera.

Accordingly, as shown in FIG. 180, which illustrates the imaging of a triangle marker by a camera of an end effector, for calculating required movement of the camera, according to an exemplary embodiment, $\Delta\vec{I} = \vec{R}$.

Because the camera movement is in some embodiments calculated based on its own relative coordinate system, it can be necessary to transfer the camera's relative coordinate system to an absolute coordinate system. To do so, matrix A must be calculated as shown below, keeping in mind that it is known that an orthogonal transformation can be represented as a composition of three rotations relative to X and Z axis:

$$A = Az(\xi) \cdot Ax(\psi) \cdot Az(\omega),$$

where ψ, ξ, ω are Euler angles (e.g., ψ is the precession angle; ξ is the nutation angle; and ω is the intrinsic rotation angle). Matrix A is therefore calculated as follows:

$$A_x(\varphi) = \begin{pmatrix} 1 & 0 & 0 \\ 0 & \cos(\varphi) & -\sin(\varphi) \\ 0 & \sin(\varphi) & \cos(\varphi) \end{pmatrix}, A_z(\varphi) = \begin{pmatrix} \cos(\varphi) & -\sin(\varphi) & 0 \\ \sin(\varphi) & \cos(\varphi) & 0 \\ 0 & 0 & 1 \end{pmatrix}$$

$$\vec{l} = \begin{pmatrix} \sin(\psi) \cdot \sin(\xi) \\ -\sin(\psi) \cdot \cos(\xi) \\ \cos(\psi) \end{pmatrix}$$

The Euler angles can be calculated from the following equations:

$$\vec{l}: \cos(\psi) = l_z, \sin(\psi) = \sqrt{1 - l_z^2}, \sin(\xi) = \frac{l_x}{\sin(\psi)}, \cos(\xi) = \frac{-l_y}{\sin(\psi)}$$

FIG. 181 illustrates the calculated angles used to translate from the camera's relative coordinate system to an absolute coordinate system, according to an exemplary embodiment. The result of the translation from one coordinate system to the other can be expressed as:

$$\Delta\overrightarrow{P_{absolute}} = A \cdot \Delta\vec{P}, \Delta\overrightarrow{I_{absolute}} = A \cdot \Delta\vec{I}, \Delta\omega = \alpha$$

In the camera or end effector movement calculations described herein (e.g., to move the camera or end effector), in some embodiments, it is assumed that the camera image has no aberration affects and that any movement of the triangle perpendicular to the camera axis does not change its size on the image. The movement calculation algorithm may, in some cases, calculate the exact movement of the camera, but does it with an appropriate degree of accuracy. Nonetheless, the described algorithms decrease inaccuracies rapidly as the camera approaches the target or desired camera/end effector position, thus minimizing their impact on final positioning.

In some embodiments, a triangle marker can be created for use with an object by using the object's own contour points (or contour of a portion of the object). To this end, a series of points n points $\vec{A}_0, \vec{A}_1, \vec{A}_2, \ldots, \vec{A}_i, \ldots, \vec{A}_n$ is received from a sensor (e.g., camera) of the robotic assistant or end effector. This series of points define the contour of an object, as imaged. FIG. 182 illustrates a series of points defining a part of an object to be interacted with by an end effector, according to an exemplary embodiment. It should be understood that the shape of the contour of the object can dictate which method or technique to use in order to obtain a triangular marker.

For example, one technique to calculate a triangular marker from an object's contour assumes that (1) the object is highly planar, and (2) the shape of the object is not round or elliptic. Because the contour of the object has several bends that are distinguishable from various points of view of imaging, these bends can be used as (or as a basis) for finding the vectors of polygon sides and calculating their length and angles between consequent sides, as illustrated for example by the following equation:

$$\vec{l}_i = \vec{A}_{i+1} - \vec{A}_i, \; l_i = |\vec{l}_i|, \; \alpha_i = \widehat{\vec{l}_i, \vec{l}_{i+1}}$$

The parameters of the preceding equation are illustrated in connection with FIG. 183, which illustrates the parameters with relation to three points from a series of points of an object's contour. As these parameters are calculated by the end effector and/or robotic apparatus, bends can be identified, as represented by the following sequence:

$$\vec{l}_i \ with \ \frac{\alpha_i}{l_i} v\alpha,$$

where α is a parameter that defines the curvature of bends that are sought to be identified when calculating a marker. As bends are found, points for triangle marker $\vec{B}_i$ are constructed by intercepting sides $\vec{i}_{first}$ and $\vec{i}_{last+1}$ in the bend sequence, as shown in FIG. 184.

As shown in FIG. 184, a single contour can include multiple bends. It should be understood that, any of the bends of the contour can be used for calculating a marker. In some embodiments, bends having a higher curvature can be preferably used, as they can be more easily and efficiently recognized from different camera imaging angles.

In some embodiments, it is preferable to obtain the image of the object from which contour points are analyzed to create a marker from a camera perspective in which the camera is imaging or looking straight down at the object when the object is placed on a plane that is parallel to the surface on which the object is positioned. Once the camera is so positioned, it is possible to use the sequence of points of the contour to create or identify the triangular marker as described herein.

In some embodiments, a chessboard marker (also referred as chessboard-shaped marker or checkerboard marker) can be used as an alternative to other markers (e.g., as show in FIG. 185A), or in combination with other markers described herein (e.g., as shown in FIG. 185B), to identify the location and other characteristic of objects. The chessboard marker enables a camera to efficiently identify internal corners with higher (e.g., subpixel) accuracy. Because a chessboard contains many internal corners, inaccuracies in detection of individual corners can be compensated using knowledge of the chessboard structure, at least because every corner should be on the line with several other corners). However, chessboard markers have one main disadvantage of that it is symmetrical, thereby making it difficult for the camera to understand top and bottom of the chessboard marker. Therefore, always the chessboard marker should be used in combination with other markers or shape analyses as shown in the FIG. 185B.

In some embodiments, chessboard marker-based positioning can be performed as follows, in connection with exemplary FIG. 186:

The one or more processors may calibrate the image capturing devices (eg: camera) associated with the one or more manipulation devices using the chessboard marker, i.e. the camera of the end effector is calibrated. In some embodiments, the calibration may include, but not limited to, estimating focus length, principal point and distortion coefficients of the image capturing device with respect to the chessboard-shaped marker In some embodiments, camera calibration may be performed only once.

The one or more processors may identify image co-ordinates of corners of square slots in the chessboard marker in real-time images of the target object, i.e. the internal corners of the chessboard marker are located from the captured imaged, which is analyzed to identify points of interest therein such as the white points shown in FIG. 185A.

Further, the one or more processors may assign real-world coordinates to each internal corner among the corners of the square slots in the real-time image based on the image co-ordinates. Assuming that origin of the real-world coordinate system is in the top-left internal corner of the chessboard marker, then the X and Y coordinates of the top right corner of the chessboard marker can be, for example: (6*cell_size_mm, 0); and the X and Y coordinates of the bottom left corner of the chessboard marker can be, for example: (0, 2*cell_size_mm). Accordingly, real world coordinates are assigned to each internal corner.

Based on the above, the end effector and/or robotic assistant can calculate or identify, among other things, the following information, which can be used with the chessboard marker to determine position of the one or manipulation devices and navigate the camera and/or the one or more manipulation devices:

Camera parameters (e.g., focus length, projection center, distortion coefficients);

On-image coordinates of internal corners (e.g., in pixels);

Real-world coordinates of internal corners (e.g., in mm).

In some embodiments, real-world coordinates and on-image coordinates can be calculated or converted from the other. In one example embodiment, this conversion can be expressed as:

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

In this exemplary expression, (u,v): refers to on-image coordinates (e.g., computed after the tangential/radial distortion is eliminated);

fx, fy, $c_x$, $c_y$: refer to camera focus and projection center points;

R and T: refer to rotation and translation matrices that can be found by placing known coordinates to equations and solving them (e.g., using Ransac).

Once R and T are known or identified, it is possible to know or identify the position of the camera with respect to the position of the marker, in which: (1) T1, T2 and T3 are X, Y and Z coordinates of the top-left chessboard corner; and (2) R11 . . . R33 are rotation components, as shown below:

$$\begin{bmatrix} (\cos^*_\varphi\cos\phi + & (\sin^*_\varphi\cos\phi - & (\cos\theta^*\sin\phi) & 0 \\ \sin^*_\varphi\sin\theta^*\sin\phi) & \cos^*_\varphi\sin\theta^*\sin\phi) & & \\ (-\sin^*_\varphi\cos\theta) & (\cos^*_\varphi\cos\theta) & (\sin\theta) & 0 \\ (\sin^*_\varphi\sin\theta^*\cos\phi - & (-\cos^*_\varphi\sin\theta^*\cos\phi - & (\cos\theta^*\cos\phi) & 0 \\ \cos^*_\varphi\sin\phi) & \sin^*_\varphi\sin\phi) & & \\ 0 & 0 & 0 & 1 \end{bmatrix}$$

where:

8=rotation around the x-axis (pitch)

ϕ=rotation around the y-axis (roll)

φ=rotation around the z-axis (yaw)

In some embodiments, the process of calibrating, identifying, assigning and determining are repeated until the position of the one or more manipulation devices is equal to the optimal standard position.

In some embodiments, the same approach can be applied to positioning on the base of triangle marker, because its vertices are also at fixed positions relative to each other and so can be the base for RT matrix calculation.

Still with reference to FIG. 188, as described above, the end effector 5002*r*-1*c* and/or object is/are moved to position 0 at step 8054. In some embodiments, position 0 can be a starting or default position of the end effector relative to the object to be interacted with. Moving the end effector to position 0 can be performed, in addition to or supplemental to other techniques described herein (e.g., real-world and virtual marker-based positioning, 3D object template, etc.), using feature analyses techniques. Feature analysis can be used, for example, when dealing with non-standard objects, since in many cases non-standard objects cannot be equipped with real-world or tangible markers (e.g., chess-board markers), such as those described herein. Thus, features such as the shape and/or other visual features of the non-standard object can be used to position the end effector 5002*r*-1*c* at position 0 (and/or performing other manipulations (e.g., with non-standard objects)). It should be understood that the types of markers described herein are illustrative and non-limiting, and other shapes and types of markers can be used, as known to those of skill in the art.

In some embodiments, moving the end effector to position 0 at step 8054 can be performed for non-standard objects. In some embodiments, non-standard objects do not or may not have markers placed thereon. Thus, alternatively (or additionally), shape and visual feature analysis techniques are performed. Further, the one or more objects, that may not be suitable for 3D template matching or marker-based positioning, can be processed with intelligent visual feature analysis that produces coordinates for placing "virtual markers". These virtual markers may be further considered for navigating the one or more manipulation devices and/or the camera configured in the one or more manipulation devices to exit to Position 0. This virtual marker based technique may be used for objects such as ingredients and other types of objects having no fixed shape and size. Different types of objects have different visual features, suitable for detection and positioning, so there are multiple types of analyses, that can be used, depending on type of the object.

In some embodiments, the virtual markers are placed on the target object using at least one of shape analysis technique, particle filtering technique and Convolutional Neural Network (CNN) technique, based on type of the target object.

An algorithm is developed and stored for performing feature analysis techniques on each non-standard object or object type. The algorithms are configured to, among other things, detect capturing points on the images using embedded cameras (e.g., as shown in FIG. 187B), for example, by analyzing one or a combination of visual features of the non-standard object (e.g., apple).

To this end, the robotic assistant system can obtain or download the feature (e.g., shape and visual features) analysis algorithm for the respective object, for example, from a library of environment (e.g., stored in the cloud computing system 5006). In turn, the algorithm can be executed on the object using the cameras of the end effector(s) and/or other sensors thereof. Points detected by the end effector using the algorithm can be treated like virtual markers, and used for positioning in the same or similar manner as described above in connection with real-world-markers. FIG. 187 illustrates features (e.g., shape, coordinates) of a non-standard object (e.g., apple) identified using a feature analysis algorithm.

In some embodiments, objects such as non-standard objects that are not suitable for 3D template matching or marker-based positioning (e.g., ingredients, objects with non-fixed size and shape) can be processed or interacted with using intelligent feature (e.g., shape, visual) analysis algorithms and techniques that produce coordinates (e.g., FIG. 187) of "virtual markers", that can be used to exit to position 0. Because different types of objects have different visual features that make them differently suitable for detection and positioning, multiple types of analyses algorithms are used (e.g., one for each object or type of object) depending on the object's type.

It should be understood that virtual marker can be made up of multiple points corresponding to an object. The points of the virtual marker are measured to calculate their actual or relative characteristics or features, which can be relative to one another and/or to other systems or components such as a camera through which the virtual markers are imaged. For example, the features or characteristics of the points or coordinates of the virtual marker that can be measured or calculated can include their distance, orientation, angles, slope, and the like. Based on the measurements of the virtual marker features and characteristics, actual or relative characteristics of the object associated with the virtual marker can be calculated. For example, the measured characteristics of the virtual marker enable the detection of the distance, orientation, slope, and other geometric and position data thereof.

In some embodiments, the virtual markers are placed on the target object using at least one of shape analysis technique, particle filtering technique and Convolutional Neural Network (CNN) technique, based on type of the target object.

One example of performing visual or feature analysis of objects using virtual markers is shape analysis technique, as shown in FIG. 187. In the shape analysis technique, initially, the one or more processors may receive real-time images of the target object from at least one image capturing device associated with one or more manipulating devices. In some embodiments, shape analysis technique includes estimating the object's pose. Further, the one or more processors may determine shape of the target object and longest and shortest sides of the target object when compared to length of each side of the target object. Thereafter, the one or more processors may determine a geometric centre of the target object based on the shape of the target object, longest side and shortest side of the target object. Finally, the one or more processor may project an equilateral triangle on the target object. In some embodiments, each side of the equilateral triangle is equal to half of the shortest side of the target object, oriented along the longest side of the target object and the geometric centre of the equilateral triangle is coinciding with the geometric centre of the target object. The one or more processors may place the virtual markers at each vertex of the equilateral triangle, meaning that the virtual markers are set or recorded on the vertices of the equilateral triangle positioned in the centre of the object's shape. Using these virtual markers and intrinsic parameters of the camera (e.g., focus length, distortion coefficients, etc.), the orientation and distance to the object are adjusted, and thereby enabling the one or more processors to reach position 0.

Another type of visual feature analysis using virtual markers can include the use of a combination of visual features, such as histograms of gradients, spatial color distributions, texture features, and the like, computed in the neighbourhood of special points. Each special point is considered as a candidate of virtual marker position. For each type of object, there are known or predetermined feature values computed for ideal virtual marker position— also referred to as "ideal values." Thus, one approach includes identifying or finding the positions on the object that best match the "ideal values." Initially, the one or more processors may retrieve one or more ideal values corresponding to ideal positions of the target object from the remote storage associated with the robotic assistant system. Further, the one or more processors may receive real-time images of the target object from at least one image capturing device associated with one or more manipulating devices. Thereafter, the one or more processors generate special points within boundaries of the target object using the real-time images. Upon generating the special points, the one or more processors determine an estimated value for combination of visual features in neighbourhood of each special point, wherein the visual features may include at least one of histograms of gradients, spatial colour distributions and texture features. Further, the one or more processors may compare each estimated value with each of the one or more ideal values to identify respective proximal match. Finally, the one or more processors may place the virtual markers at each position on the target object corresponding to each proximal match.

Because in some embodiments marker patterns include a triangle, there can be at least three ideal values and three respective best matching positions, forming a triangle virtual marker.

Another type of visual feature analysis using virtual markers can include using CNN technique to detect virtual markers on arbitrary or non-standard object. Because objects can be very different, separate models can be trained for each type of object. On the execution stage, the one or more processors may download a CNN model corresponding to the target object from libraries stored in the remote storage associated with the robotic assistant system. Upon downloading the libraries, the one or more processors may detect positions on the target object for placing the virtual markers based on the CNN model.

All three methods provide positions, that can be treated like a virtual markers and used for positioning as if there were real markers on the object.

It should be understood that, in some embodiments, moving the end effector to the position 0 is a fundamental task of interaction between kinematic chains in end effectors and the object. This way, if the object is standard and the environment is standard, then all the processes of interaction can be standard. In this regard, a classification of environments in which the object is located are identified and stored such that standardization of environment can be achieved. For example, the blender can be placed on a stand and is on the table and in the way operational finger of robotic hand (end effector) is placed on the blender's operation button, and in either of these cases it is needed to grasp it in a different way. But in either of these cases, the robot will be trained by the reinforced learning to perform such interaction until it will grasp it correctly. As soon as the robotic end effector grasps it correctly, it will be possible to record this movement as a standard interaction in this particular case.

In some embodiments, the machine learning algorithm is a hypothesis set which is taken before considering the training data and which is used for finding the optimal model. Machine learning algorithms have 3 broad categories as illustrated in FIG. 187B—

- Supervised learning—the input features and the output labels are defined.
- Unsupervised learning—the dataset is unlabelled and the goal is to discover hidden relationships.
- Reinforcement learning—some form of feedback loop is present and there is a need to optimize some parameter.

Learning can be performed by the training system that starts from placing the object in the manipulator, then the robotic apparatus should be further programmed to bring the object to the camera system at a certain point, which can be referred to as the "gauging point". In some embodiments, it's necessary to bring the object to the point of gauging and shoot the initial shape from all angles. Next, the robotic assistant system is taught how the particular object should be grasped or operated. The developed robotic assistant system allows the robotic apparatus to change the algorithms of grasping. Each time the robotic assistant system makes the algorithm, it brings the object to the point of gauging and checks if the form matches or not, which indicates that the robotic assistant system has learned to take/grasp the object correctly. Such robotic assistant system makes it possible to learn by itself and automatically. Having the gauging point parameter, the reinforced learning system can repeatedly grasp one object for a long period of time trying to grasp it correctly in the same initial Position 0, making various modifications of movements. However, it will always check the point by which it will be possible to say whether it is a successful case or not. FIG. 187C shows an essentials of an exemplary machine learning algorithm.

Further, the non-standard objects are classified by the type of interaction. When the robotic assistant system is grasping the target object for moving, the successful case creation utilizes, in some embodiments, the following process: scanning the object; creating of the rules (from and to sizes); classifying the object to several sizes depending on the correct grasping process; joints movement establishment in a training mode (e.g., to grasp the object in different ways to understand the mechanics of grasping and to identify where exactly should be located the fingers of the end effector). Accordingly, this process helps to identify which sizes of the objects allow to grasp the object in one way or another. However, some objects may be large in size and grasping such large objects may not be possible with one end effector, meaning that the grasping should be made by two end effectors in order not to damage the target object. Consistence of the object should preferably be known as it influences the force of end effector's compression function in terms of the interaction with the object.

Also, upon completion of the reinforced learning, the standard object may become a known object. A standard object that the robotic assistant system has not learnt to interact or operate with are termed as unknown objects. Upon completion of cycle of the learning process, the standard unknown object is becoming a standard known object. Accordingly, the cycle of learning starts with the movement of the human to the object, when human shows to the machine how the interaction should be performed with the help of motion capture, vision, vision motion capture, gloves motion capture and different types of sensors on the glove.

Moreover, like the position 0, the final orientation position of the object is also needed for reinforced learning. To start a manipulation or interaction with an object, robotic end effectors should be in the correct position to be able to observe the object under correct angles. From this final orientation position, the end effectors or manipulators are rotated in certain angles, changing the speed and compression of the fingers for learning how to grasp the particular size of the object. This can be performed, for example, in two ways: by manual training with the help of a human trainer—when the form of the object is read from the Position 0 and after the system grasps the object exactly as it was taught. However, one obstacle is that the object can differ slightly (e.g., because the object is not identical with the object used for the learning process). In such cases, learning starts exactly from this moment: parameters of the capture needs to be changed, parameters should be verified in a certain range, the object should be brought to the gauging point. Finally, if the object is grasped, then this is a successful case, if the object is not grasped, then it is not a successful case. By searching through these parameters the system finds the successful case for each object and the correct algorithm for its grasping, moving, operating or manipulating.

As illustrated in exemplary FIG. 188, the movements, interactions and/or manipulations described herein, two systems of coordinates can be used: (1) local or object vs. robot oriented coordinates, which have an origin or relative point in the object; and (2) global coordinates, which refer to a workspace system of coordinates. In some embodiments, position 0 refers to a position of the end effector relative to the object, and therefore is measured or identified using a local system of coordinates. Manipulations are recorded in a local system of coordinates. Such coordinates are recorded or stored including a trajectory of the end effector relative to the object (e.g., DX1, DY1, DZ1, Dangle1, DX2, DY2, DZ2 . . . ). Each time there is a need to execute the manipulation, there is a conversion from local to global system of coordinates, with respect to the current object position. In turn, it is converted to an exact sequence of joint values, with respect to the current joint values of kinematic chain and workspace model (e.g., to avoid collisions). In a scenario, when there are both standard and non-standard objects during the interaction with objects, the one or more processors may be trained to remember final position of joints/fingers of the end effector "around" the object to enable the robotic assistant system to plan the movements and practically to make the motion planning of all joints of end effector and put the trajectory of movement on the target points of the objects. Recording the final positions helps in optimizing the end effector movements and learn the machine to work with end effector by the way of understanding of final coordinates of each joints.

End effector on the object and practically the robotic assistant system itself does the motion planning of the whole kinematic chain to achieve the required positions on the object. Here the number of joints is important (2, 3 or 4 fingers, parallel gripper, 3 axis grippers, robotic hands) and depending on the type of the gripper the position of joints on the object should be according to the type of the gripper. Practically, the robotic apparatus is programming the joints positions on the object depending on the type of the gripper and N-amount of interactions. To place the joints to the correct areas of the object at the same time avoiding the collisions with the object processor generates the motion planning of the kinematic chain.

Still with reference to FIG. 188, once the end effector has been moved to position 0 at step 8054, the system determines whether there are interactions that have or remain to be performed, at step 8056. If so, at step 8058, the robotic assistant system performs the one or more interactions on the target object. In some embodiments, interactions by the robotic assistant are performed using an embedded vision subsystem of or communicatively coupled to the robotic assistant. FIG. 189 illustrates an embedded vision subsystem according to an exemplary embodiment. The embedded VS assists the end-effector or manipulator on or during an object manipulation or interaction stage (e.g., step 8058). As described above, the end effector is equipped with one or more embedded cameras, structured and smooth lights, CPU and GPU modules.

Each manipulation or interaction consists of fixed sequence of motions, that leads to desired result (e.g., success point, particularly when an initial position of the manipulator relative to the object is the same, as it was during the training ("position 0"). Since an object can be reached from various directions, there are several variations of the same manipulation that are trained and recorded or stored for different directions. Each variation has its own corresponding position 0. On the execution stage, the central control unit analyses the workspace model and decides which direction is optimal for the object to be manipulated, and based thereon selects the appropriate position 0. Information about the particular object type can be downloaded from the Library of Environments. In turn, the selected position 0, manipulation ID and approximate coordinates of the object, among other data, are transmitted to the universal end effector (manipulator).

Based thereon, the interaction can be performed as follows:

- Step 1: the end effector or manipulator is preliminarily positioned above the object, using approximate coordinates from the workspace model;
- Step 2: the manipulator is fine-tuned and/or positioned to the corresponding position 0;
- Step 3: the manipulation or interaction is executed (e.g., based on a fixed sequence of motions);
- Step 4: manipulations results are validated to (e.g. check if success point was achieved), as described in further detail below at step 8060.

In some embodiments, the embedded vision subsystem assists the end effector or one or more manipulation devices on steps 2 and/or 4 above, as explained above in connection with step 8054 (moving to position 0) and below in connection with step 8060 (validating interaction results).

In turn, at step 8060, once the interaction (e.g., sequence of motions) has been performed, its results are validated. In some embodiments, validation for interactions with standard and non-standard objects can be performed in the same manner. For example, validation can be performed by analysing image obtained from various embedded visual sensors. Such analyses can be performed using convolutional neural networks or the like, trained on examples of successful and failed manipulations. For instance, if the interaction or manipulation is to "turn the blender on" and the expected result (e.g., success point) is "lightbulb lit up," the convolutional neural network is trained on images of the blender with the lightbulb on and off, together with a corresponding ground truth. During execution of the interaction, the central control unit can download the relevant neural network from the library of environments and apply it to the image obtained from the embedded camera, thus finding out if the success point was achieved (e.g., lightbulb is on). Images of failed and successful manipulations can be continuously obtained and transmitted to a central system (e.g., the central use cases laboratory) for storage, analysis and training. Training of neural networks on the examples of failed and succeed manipulations enables automatically finding distinctive features for each particular object type and manipulation.

Due to recording data from each of the one or more sensors and success point coordinates along with movements of all fingers of human hand and further transmitting such data recorded to the robotic assistant system, the result of operations performed on the one or more objects is becoming the expected success factor. To achieve the success factor reinforced learning system in the robotic assistant system is looking for and choosing different combinations of movements of end-effector to the object based on raw data from the operator to optimize these movements for the particular model of end-effector that is used (depending on joints positions of the end effector and number of degrees of freedom). Success point can be the result of the interaction, as well as the position of the finger on the object depending on the type of the gripper. Success points are used to give the start to reinforced learning which leads the machine to learn how to achieve the success points in 100 percent of cases from the overall cases.

Further, Steps 8056, 8058, and 8060 are iterated until it is determined at step 8056 that no interactions remain to be performed according to the recipe algorithm. At that point, the process ends at step 8062, indicating that the recipe has been completed.

In some embodiments, the robotic assisted environment 5002 and/or robotic assisted workspace 5002*w* can include a drawer system that includes drawers for robotic operation. FIGS. 190A, 190B, 190C and 190D illustrate exemplary embodiments of a storage unit (drawers), and are now described in further detail. An electronic inventory system may include one or more storage units. As an example, the storage units may be a drawer 9000, a shelf and the like which may be capable of storing the one or more objects. Hereafter, the electronic inventory system is explained in terms of a single storage unit. However, this should not be construed as a limitation, since the electronic inventory system may comprise more than one storage unit. In some embodiments, the storage unit may have doors on which one or more actions may be performed. As an example, the one or more actions may include, but not limited to, opening the doors, closing the doors, locking the doors and unlocking the doors. The storage unit generally comprises one or more image capturing devices, one or more sensors, one or more light sources and one or more embedded processors 9109. As an example, the one or more image capturing devices may be cameras installed in the storage unit. In some embodiments, the one or more image capturing devices may capture one or more images of each of the one or more objects stored in the storage unit, in real-time. Further, the one or more image capturing devices may transmit each of the one or more images to the one or more embedded processors and a display screen. In some embodiments, the display screen may be configured on external surface of the storage unit. In some embodiments, the display screen may be located on front door of the storage unit. The display screen may display the one or more images or videos received from the one or more image capturing devices configured in the storage unit. In some embodiments, the display screen may display one or more interactions performed by the robotic assistant system one the one or more objects stored in the storage unit, in real-time. In some embodiments, the one or more image capturing devices may further serve many other purposes. As an example, consider the storage unit is a drawer. In some embodiments, the construction of the storage unit enables the user to observe what is located inside each storage unit without actual opening the storage unit or doors of the storage unit. Also, the construction of the storage unit enables the user to visualize interactions of the robotic assistant system with the one or more objects on the display screen while at the same time we can see the robotic assistant system as well. Every single display screen includes an address and their own corresponding information installed in the inventory of sensors. That way we get all the information from all the display screens installed in each of the one or more storage units. Such a drawer system can identify and provide the observed location of each of the one or more objects stored in the drawer and display the one or more images on the display screen located at the front side of the door, for kitchen and drawer usability and for fast search of the contents within the drawer. The one or more images can be processed to identify the objects that are located in the drawer by their type, title, position and location, pose orientation, etc. This information can be stored in the virtual kitchen model to enable the robotic assistant system to interact with the objects in the drawer, or for a human to search for the specific object in the exact drawer. Data obtained from the one or more image capturing devices in the storage unit can be updated in real-time to allow the robotic apparatus system to perform error-free interaction with any of the one or more objects in the storage unit regardless of where and when such objects were placed in the storage unit.

Further, the one or more sensors configured in the storage unit provide corresponding sensor data associated with position and orientation of each of the one or more objects to at least one of the one or more embedded processors. As an example, the one or more sensors may include, but not limited to, a temperature sensor 9116, a humidity sensor 9117, a position sensor 9107, an image sensor 9102, an ultrasound sensor, a laser measurement sensors and SOund Navigation And Ranging (SONAR).

Further, the one or more light sources may include, but not limited to, Light Emitting Diodes (LEDs) 9101 and light bulbs. The one or more light sources are configured to assist with illumination in the storage unit, such that, the one or more image capturing devices may capture clear images of the one or more objects stored in the storage unit. Based on the one or more images, a user may view what is present inside the storage unit without even opening the storage unit or doors of the storage unit.

Further, the one or more embedded processors configured in the storage unit interact with a central processor of the robotic assistant system through a communication network. In some embodiments, the communication network may be a wired network, a wireless network or a combination of both wired and wireless networks. In some embodiments, the central processor may be remotely located or may be configured within the environment in which the storage unit is configured. The one or more embedded processors 9109 may detect each of the one or more objects stored in the storage unit based on the one or more images and the sensor data. Further, the one or more embedded processors may be configured to transmit the one or more images and the sensor data to the central processor 9104. In some embodiments, the one or more embedded processors 9109 may transmit the sensor data and the one or more images in real-time or periodically.

In some embodiments, detecting each of the one or more objects may mean identifying and locating the one or more objects. Further, detecting each of the one or more objects may include, detecting presence/absence of the one or more objects, estimating content stored in the one or more objects, detecting position and orientation of each of the one or more objects, reading at least one of visual markers and radio type markers attached to each of the one or more objects and reading object Identifiers. In some embodiments, the presence/absence of the one or more objects may be detected based on CNN or any other machine learning classifier such as decision trees, Support Vector Machine (SVM) and the like, which the one or more embedded processors 9109 and the central processor 9104 are trained with. In some embodiments, the one or more embedded processors 9109 and the central processor 9104 may be trained with example images of full storage unit, empty storage unit and the like. Further, using the same CNN or machine learning techniques, the one or more embedded processors 9109 or the central processor 9104 may estimate content stored in each of the one or more objects. Further, the position and orientation of each of the one or more objects is detected using region-based CNN by getting trained on example images. Optionally poses of the one or more objects may be refined using marker-based detection technique. Furthermore, the one or more embedded processor 9109 may read the visual markers attached to the objects, defined object ID, object position/orientation. In some embodiments, the one or more embedded processors 9109 may include detecting radio type of markers attached to each object, defined object ID, approximate object position/orientation. A combination of the aforementioned techniques may increase reliability of the electronic inventory system by confirming and double checking the result compared to other methods. In some embodiments, each of the one or more detected objects are added to an electronic inventory associated with the electronic inventory system, which is in turn shared with the central processor so that the one or more objects can be easily found during execution of recipes or during pre-check.

In some embodiments, CNN used for object detection inside the storage unit is different from the network, used for general purpose camera system. It is adopted to (fish-eye) camera and lighting conditions, specific to the storage unit.

Further, in some embodiments, the storage unit may be furnished with a specialized electronic system that allows performing the one or more actions on doors of the storage unit automatically, using servomotors and the guiding systems. As an example, the one or more actions may be closing and opening options Further, the storage unit may be configured with electronically controlled locks that can be applied to the storage unit for locking and unlocking the doors of the storage unit that prevents unauthorized closing or opening of the drawer or enable the user to program the access to only permitted ingredients at permitted hours and time of the day.

In some embodiments, each storage unit in the electronic inventory system is controlled by the central processor 9104 remotely. The central processor 9104 receives real-time data from the one or more embedded processors 9109 configured in the storage unit to locally control the storage unit. Each of the one or more embedded processors 9109 may be integrated in a peer-to-peer network, to which the central processor 9104 is also connected. The central processor 9104 communicates with the one or more embedded processors 9109 via wired or wireless protocols. Each processor system manages at least one box. It is located in the immediate environment of the box. To reduce the number of cables that are carried out inside the furniture or any applicable storage structures, the one or more embedded processors 9109 use a power line and a data line. As an example, one Cat5e cable 9106 from the nearest PoE ethernet switch 9105 may be connected to each embedded system. A group of boxes localized in one place may be controlled by a "local" switch with PoE capability, which in turn may be connected to a higher one, etc., forming a data transmission network of the complex. An example of connecting a group of boxes is shown in FIG. 190E that illustrates an example scheme of main components of the storage unit. Further, FIG. 190F shows an example of the constructive arrangement of the modules of the one or more embedded processors 9109. In some embodiments, the processor could be embedded in main processor or micro controller system. In the FIG. 190F, there is a vertical section of the conventional curbstone with the box. The stack of boards is mounted to the rear wall of the curbstone, and the sensors, the camera module and the backlight module are placed above the box on the rigid bracket.

The electronic inventory system (also referred as digital inventory system), (a system that allows to structure data on the inventory of various storage units, including boxes, drawers-boxes, open storage shelves, closed storage shelves, containers, safes, etc.) for storing any kinds of objects, includes of the following set of modules:

a. Base Board—a module with the central processor 9104, Random Access Memory (RAM), and non-volatile memory; An exemplary base board is a Beagle Board Black rev. C 1 or any processor board with similar functionality as the Base Board, with a good ecosystem.
b. Cloud memory including object data bases and inventories data bases.
c. Extension Board 9103—a module including the necessary connectors for plugging external modules and sensors, power supplies and control circuits for these modules and sensors, as well as power supply for the Base Board. As an example, elements of the extension board 9103 may include, but not limited to, PoE splitter, Base Board power supply, Touch screen interface connector, one or more thermal sensors connectors, one or more humidity sensors connectors, thermoelectric cooling block power supply, thermoelectric cooling block connector, one or more fan connectors, embedded Universal Serial Bus (USB) Hub (2-4 ports), light module connector, light modules power supply, a capacitive or a magnetic drawer proximity sensor connector, door lock connector and additional required sensors and control devices connectors. In some embodiments, constructively, the extension board 9103 is a carrier for the base board and may include connectors required for the base board installation, and also allows the boards stack to be mechanically attached.
d. one or more image capturing devices—device including image sensors such as Complementary Metal-Oxide-Semiconductor (CMOS) or Charge-Coupled Device (CCD), combined with the lens. The one or more image capturing devices are connected to the extension board 9103 by a cable that provides power and control.
e. One or more light sources—the light sources act as a companion for the one or more image capturing devices, wherein the exemplary light sources include LED lamps of flash illumination. The one or more light sources are connected to the extension board 9103 by a cable that provides power and control. In some embodiments, the base board may include a set of light sources including: LED light, structured light, infra-red light, fluorescent lights and paints and any other light sources in different light ranges but not limited to, power circuit and control keys. Further, the one or more light sources can be connected in daisy-chain, ensuring uniform illumination of volume of the storage unit.
f. One or more sensors—As an example, the one or more sensors may include, but not limited to, temperature sensors 9116, humidity sensors 9117, position sensors 9107, sonars, lazer measurement device, radio type markers as Infrared Light Demand Feeder (IRDF), Near Field Communication (NFC) detection sensors, and other types of sensors, that are capable of identifying different objects and their corresponding location. In some embodiments, the one or more sensors may be any UCV compatible module such as ELP-USB500W02M-L212, thereby allowing installation of interchangeable M8/M10 lenses 3.

g. Embedded Software: the one or more embedded processors 9109 may be configured with the embedded software that allows interaction with the one or more sensors, the one or more image capturing devices and the one or more light sources connected to the extension board 9103, on the one hand, and with the software running on the central processing unit (hereinafter referred to as the server), on the other. In some embodiments, the embedded software may enable the one or more embedded processors 9109 to support System On a Chip (SoC) hardware components sufficient for Transmission Control Protocol (TCP)/Internet Protocol (IP) or similar stack operations, boot (start) the electronic inventory system from the built-in non-volatile memory, self-registration on the central processor, control the position of the storage unit, obtain an image of the content in the storage unit in automatic mode and by explicit request from the central processor, accumulate telemetry from connected temperature and humidity sensors, transmit the accumulated telemetry to the central processor 9104 both periodically and explicitly, server-configurable control process for the thermoelectric cooler element, remote management by the server of box lock and other additional required functions.

FIG. 190G shows various components of the client-server environment in the electronic inventory system. From the point of view of the software, there are a number of clients and servers in the electronic inventory system. As an example, the one or more storage units or the network of storage units may be considered as clients, whereas, modules of a central processor 9104 such as robot control server 9130, Network Time Protocol (NTP) server 9128, Dynamic Host Configuration Protocol (DHCP) server 9127 and the like, may be considered as servers in the client-server environment.

A computer controlled kitchen, such as those examples illustrated in FIGS. 191A to 191D, can be managed by the robotic apparatus described herein. Such illustrated configurations of the kitchen enable storage of kitchen appliances at pre-defined places, to facilitate their reachability by robots and humans. Moreover, by integrating a dishwasher into the kitchen model, appliances and instruments located or positioned inside the dishwasher can be washed. That is, a computer controlled kitchen can include integrated technology to, for example, store appliances and provide dishwashing capabilities.

In some embodiments, storage is designed or configured for optimal use by the robotic apparatus (e.g., rather than for use by humans). The storage can have different ways to access it, e.g., from the side of the cooking volume to be accessed by the robot and from the front side of the kitchen to be accessed by human.

As shown in FIGS. 191A to 191D, in some embodiments, kitchen appliances in the dishwasher can be hung on specially configured hangers/hooks. When the dishwasher is on, such location of the kitchen appliances that are hanging on the hangers under the different angles and dishwasher water circulation enables effective washing and drying of the appliances inside the storage. The specific system of hangers and shelfs in the dishwasher enables keeping or maintaining, washing and drying different types of kitchen appliances including, for example: cooking pots, strainers, frying pans, etc. In some embodiments, there are specific locations in the dishwasher for plates or other appliances of materials of special sizes, saucepan covers, cups, spoons, knives, forks etc.

The cover door of the dishwasher can be opened as traditional kitchen door in an external direction or by sliding it (e.g., up, down, sideways) using an electronic mechanism. The cover door of the dishwasher is furnished specifically and will be adjacent to the storage dishwasher block to prevent the water leaks.

In some embodiments, the robotic assistant system may be configured to interact with touchscreens and other similar technologies such as trackpads, touch surfaces and the like. The touchscreens and similar touch surfaces may refer to interfaces that allow the robotic assistant system to interact with a computer through touch or contact operations performed thereon. These interfaces can be display screens that, in addition to being configured to receive inputs via touches or contacts, can also display or output information as explained under the display screen of the storage unit. In some embodiments, touchscreens or touch surfaces can be capacitive, meaning that they rely on electrical properties to detect a contact or touch thereon. Therefore, to detect a contact, a capacitive touchscreen or surface recognizes or senses voltage changes (e.g., drops) occurring at areas (e.g., coordinates) thereon. A computing device and/or processor recognizes the contact with the touchscreen or touch surface and can execute an appropriate corresponding action. Further, a touchscreen may have the ability to detect a touch within the given display area. The touchscreen may be made up of 3 basic elements i.e. a sensor, a controller and a software driver. Each variant of the touch screen technology carry their own distinctive characteristics, with individual benefits. As an example, different variants of the touchscreen may include, but not limited to, a resistive touchscreen, a capacitive touchscreen, a Surface Acoustic Wave (SAW) touchscreen, infrared touchscreen, optical imaging touchscreen and acoustic pulse recognition touchscreen. Further, the electrical charge can be obtained from a motor electrical terminal, battery or other power source included in the robotic system and/or end effector. Portions of the end effectors can be made of a material, or covered in a material or paint, that has conductive properties that enable the electrical charge to pass from its source, through the end effector and its capacitive portions (e.g., fingertips), onto the touchscreen or surface.

FIGS. 192A and 192B illustrates a block diagram of the components of a robotic assistant (e.g., 5002*r*), according to an exemplary embodiment. As shown in FIGS. 192A and 192B, a robotic assistant can include a main system interconnected to or with various subsystems, such as end effectors of the robotic assistant. As illustrated, the main system can include a main processor 9226, main memory 9228, static memory 9230, a video display 9234, a network interface device 9248 connected to a network, an alpha numeric input device 9236, a cursor control device 9238, a drive unit 9240 including a machine readable medium 9244 storing instructions 9246, and a signal generation device 9242. The components of the main system can communicate over a communication bus 9232 or the like. Each embedded subsystem can include a respective embedded processor (1, 2, 3 . . . ), main memory 9228 storing instructions 9246, static memory 9230, network interface device 9248, alpha numeric input device 9236, cursor control device 9238, drive unit 9240 with machine readable medium 9244 and instructions 9246, a signal generation device 9242, and one or more sensors. The sensors can include kinematic chains haptic variables, binary switches, singular variables, cameras (3D video cameras, video cameras, bi/tri-nocular video camera), light, pressure sensor, humidity sensor, temperature sensor, and the like. Each of these components of the subsystem can communicate over a communication bus or the like. The main system and subsystem can communicate with one another, for example, to communicate data (e.g., for memory mapping) and/or transmit instructions). The system and subsystems illustrated in FIGS. 192A and 192B can be configured as needed to perform the robotic assistant processing techniques described herein.

A main processor of a higher level (also referred as central processor) may send commands to the processor of lower levels (also referred as one or more embedded processors in the kinematic chain). Movements of joints of the end effector are performed, either exactly or precisely, by the embedded processor of low level. The final command for interaction is thus generated by the central processor and direct execution of the commands is performed by the one or more embedded processors. The number of the processors of low level may vary and is not limited an exact number. The direct operation and algorithm execution by the end effector is performed by the embedded processors and kinematic chains. The kinematic chains are operated by local driver units, which can be switched if needed to the driver unit of the main processor. Memories of the embedded processors and main processor can be mapped between each other as well. A detailed exemplary system diagrams illustrating the processors, memories, and other hardware, together with the detailed explanation is provided herewith. The one or more embedded processors may update the workspace model in real-time with information about the status of currently executed command and all caused changes. The information may include, but not limited to states, poses (positions and orientations) and velocities of the one or more objects, visible to the embedded camera or reached by sensors, success check results of current and previous manipulations and safety check results (presence of unexpected objects, smoke and fire detection and etc.). The updated workspace model is shared with the central processor, via memory mapping or other mechanism.

Further, in the illustrated architecture, the robotized complex is viewed as a collection of subsystems hierarchically interconnected. At each level of the hierarchy, the corresponding subsystem processes the input stream from the underlying subsystems and transfers the results of processing to the higher subsystem. Thus, a high-level pipeline is formed, at each stage of which the data is transformed, ideally with some reduction of the flow. From the point of view of the data paths on the diagram, one way is shown—from the manipulator sensors to some control center of a group of robots. The schema can be considered as a two-way data pipeline. Further, from bottom to top, from the sensors of the physical environment such as video stream, temperature, humidity, accelerometers, feedback values for the forces of electric motors, etc., the data may be converted into vector object descriptors, trajectories and current manipulator positions. The one or more objects may be identified as participants in some Workplace: 'Local', 'Robot', 'Global'. Also, there exists a reduction of pixel information into a vector, vectors into objects, and objects into workplace elements and the like.

Further, in addition to the shared commands, the central processor and the one or more embedded processors may share, among other things workspace models, which may contain information about positions, sizes and types of each of the one or more objects, surface materials, gravity directions, object weights, directions, velocities, expected positions and the like. This may enable the one or more embedded processors to plan manipulations with the current object in accordance with the positions and sizes of neighboring objects (e.g., to avoid collisions), gravity direction, weight, surface characteristics and the like.

All of this information of the workspace models (e.g., gravity, object's weight, surface and the like) can be used for the reinforced learning, which is a part of training stage, in which optimal robotic arm and end-effector movements are learned for any kind of objects, interactions and initial conditions. In this way, the embedded processor can choose and execute the optimal kinematic chains and end-effector movements, based on the current workspace model. The central processor may maintain up to date workspace model using a central camera system or by collecting the information from embedded cameras.

Further, the FIG. 192C shows a three-tier composition 1 and FIG. 192D illustrates a three-tier composition 2, that comprises compositions of the top-level subsystems such as the central processor and kinematic chain processor system. Various graphic symbols used in the FIG. 192C and the FIG. 192D are listed in the below Table 4.

TABLE 4

| Label | Description |
|---|---|
| [illegible] | High and low-level commands streams |
| [illegible] | Descriptors of vector objects for front-end computer vision process (recognition & identification) |
| [illegible] | Vector objects stream (result of back-end computer vision process) |
| [illegible] | Stream of low-speed sensors data |
| [illegible] | Stream of high-speed, high-bandwidth sensors data (in this case, the 2d pixels streams, but may be SONAR, LIDAR & etc.) |
| [illegible] | Short-term streams of high-bandwidth sensors data (i.e. high-resolution video stream but with low FPS) |
| [illegible] | Workplace objects stream |
| [illegible] | User interface data |
| [illegible] | Some mechanical connector |
| [illegible] | Data link-a single physical data line (optical fiber, coax, twisted pair, etc.) |

Further, fullform of all the abbreviations used in the FIG. 192C and FIG. 192D are listed in the below Table 5.

TABLE 5

| Abbrev | Description |
|---|---|
| FPGA | Field Programmable Gate Array |
| PHY | Physical layer of data line controller |
| CF | CompactFlash |
| DMA | Direct memory access controller |
| μC | Microcontroller. A small and very simple computer on a single integrated circuit. |

FIG. 193 in one exemplary embodiment of the present disclosure illustrates a coupling device 9300 for coupling one or more objects 9302 with a robotic system. The coupling device 9300 comprises a first coupling member *9303a* defined onto the robotic system and a second coupling member *9304a* defined into one or more objects 9302. The second coupling member *9304a* is adapted to be connectable with the first coupling member *9303a*.

The first coupling member 9303*a* may include a first connection surface 9303*b*, for connecting the first coupling member 9303*a* with the robotic system. The first connection surface 9303*b* may be configured with a first attachment means [not shown in Figures] for connecting the first coupling member 9303*a* with the robotic system. The first attachment means may ensure that, the robotic system upon coupling with the one or more objects 9302 via the coupling device 9300 is capable of holding and manipulating the one or more objects 9302 efficiently. The first coupling member 9303*a* also includes a first mating surface, having a plurality of first projections defined on its periphery. The plurality of first projections are configured to engage with the second coupling member 9304*a*, for coupling the first coupling member 9303*a* with the second coupling member 9304*a*.

Further, the second coupling member 9304*a* may include a second connection surface 9304*b*, for connecting the second coupling member 9304*a* with the one or more objects 9302 [as shown in FIGS. 198*a*-198*d*]. The second connection surface 9304*b* may be configured with a second attachment means [not shown in Figures] for connecting the second coupling member 9304*a* with the one or more objects 9302. The second attachment means may ensure that the one or more objects 9302 upon coupling with the first coupling member 9303*a* is capable of holding and manipulating the one or more objects 9302 efficiently. The second coupling member 9304*a* also includes a second mating surface 9304*c*, having a plurality of second projections 9304*d* defined on its periphery. The configuration of the plurality of second projections 9304*d* may be complementary to the plurality of first projections, to facilitate engagement. The plurality of second projections 9304*d* thus engage with the plurality of first projections, for coupling the first coupling member 9303*a* with the second coupling member 9304*a*.

In an embodiment, the plurality of first projections may be shaped such that, the periphery of the first mating surface is machined to form a crest and trough profile. In another embodiment, the plurality of first projections may be shaped such that, the periphery of the first mating surface is machined to form at least one of a convex shape or a concave shape. In another embodiment, the plurality of first projections may be shaped to form a wavy profile or undulations along the periphery.

In an embodiment, the plurality of second projections 9304*d* may be shaped such that, the periphery of the second mating surface 9304*c* is machined to form a crest and trough profile corresponding to the configuration of the plurality of first projections. In other words, the plurality of second projections 9304*d* include a trough region in the corresponding crest region in the plurality of first projections and vice versa, to facilitate engagement. In another embodiment, the plurality of second projections 9304*d* may be shaped such that, the periphery of the second mating surface 9304*c* is machined to form at least one of a convex shape or a concave shape, corresponding to the configuration of the plurality of first projections. In another embodiment, the plurality of second projections 9304*d* may be shaped such that, the periphery of the second mating surface 9304*c* may be shaped to form a wavy profile or undulations, corresponding to the configuration of the plurality of first projections.

In an embodiment, the first connection surface 9303*b* is connected to the robotic system by means such as but not limiting to mechanical means and non-mechanical means. In an embodiment, the mechanical means of connection for the first connection surface 9303*b* and the second connection surface 9304*b* is selected from at least one of a magnetic means, a snap-fit arrangement, a screw-nut arrangement, a plug-socket 1006*b* means, a vacuum actuation means or any other means, as per feasibility and requirement.

In an embodiment, the first connection surface 9303*b* may be configured corresponding to the configuration of the robotic system, so that upon connection, the first connection surface 9303*b* is flush with the robotic system.

In an embodiment, the first connection surface 9303*b* is a rear surface of the first coupling member 9303*a* and the first mating surface is a front surface of the first coupling member 9303*a*.

In an embodiment, the first connection surface 9303*b* is configured to connect with a robotic arm of the robotic system.

In an embodiment, the first connection surface 9303*b* is connected to the robotic system via at least one of a mechanical means or an electro-mechanical means or any other means as per deign feasibility and requirement.

In an embodiment, the first coupling member 9303*a* and the second coupling member 9304*a* is configured with at least one of a cylindrical profile, a rectangular profile, a circular profile, a curved profile or any other profile as per design feasibility and requirement.'

In an embodiment, cross-section of the first coupling member 9303*a* and the second coupling member 9304*a* are selected from at least one of a rectangular cross-section, a circular cross-section, a square cross-section or any other cross-section, as per design feasibility and requirement.

Referring to FIG. 194, a locking mechanism 9305 is configured at an interface of the first coupling member 9303*a* and the second coupling member 9304*a*, so that the one or more objects 9302 are coupled to the robotic system. The locking mechanism 9305 is configured to provide additional stability at the interface, thereby improving the coupling between the first coupling member 9303*a* and the second coupling member 9304*a*. The locking mechanism 9305 also ensures additional stabilization for side loads acting on the coupling device 9300, while operating the robotic system.

The locking mechanism 9305 includes at least one notch 9305*a* [shown in FIG. 195*b*] on either of the first mating surface and the second mating surface 9304*c*. The at least one notch 9305*a* may be defined on a central region of either of the first mating surface and the second mating surface 93404*c*. The locking mechanism 9305 further includes at least one protrusion 9305*b* which is defined corresponding to the location of the at least one notch 9305*a*. In other words, the at least one protrusion 9305*b* is configured on the second mating surface 9304*c*, when the at least one notch 9305*a* is configured on the first mating surface and vice versa. The at least one protrusion 9305*b* may also be positioned on central region of either of the first mating surface and the second mating surface 9304*c*. The configuration of the at least one notch 9305*a* and the at least one protrusion 9305*b* also ensures that the first coupling member 9303*a* and second coupling member 9304*a* are coupled at optimal orientation, so that the one or more objects 9302 are secured with an optimum force.

In an embodiment, the at least one notch 9305*a* is configurable on either of the first coupling member 9303*a* and the second coupling member 9304*a* at a predetermined location, as per design feasibility and requirement. In other words, the at least one notch 9305*a* may be provided at any location on the first coupling member 9303*a* or the second coupling member 9304*a*, without hindering accessibility of the at least one notch 9305*a* with the at least one protrusion 9305*b*. In another embodiment, shape of the at least one notch 9305*a* is selected from at least one of a triangular shape, a circular shape, a rectangular shape or any other geometric shape, as per design feasibility and requirement.

In an embodiment, the at least one notch 9305*a* of a predetermined geometric shape may be machined on either of the first coupling member 9303*a* and the second coupling member 9304*a*. In another embodiment, a secondary attachment with at least one notch 9305*a* may be attached to the first coupling member 9303*a* or the second coupling member 9304*a*, for configuring the at least one notch 9305*a* on either of the first coupling member 9303*a* and the second coupling member 9304*a*.

In an embodiment, the at least one protrusion 9305*b* is configurable on either of the first coupling member 9303*a* and the second coupling member 9304*a* at a predetermined location, as per design feasibility and requirement. In other words, the at least one protrusion 9305*b* may be provided at any location on the first coupling member 9303*a* or the second coupling member 9304*a*, without hindering accessibility of the at least one protrusion 9305*b* with the at least one notch 9305*a*. In another embodiment, shape of the at least one protrusion 9305*b* is corresponding to the configuration of the at least one notch 9305*a*. In another embodiment, shape of the at least one protrusion 9305*b* is selected from at least one of a triangular shape, a circular shape, a rectangular shape or any other geometric shape, as per design feasibility and requirement.

In an embodiment, the at least one protrusion 9305*b* of a predetermined geometric shape may be machined on either of the first coupling member 9303*a* and the second coupling member 9304*a*. In another embodiment, a secondary attachment with at least one protrusion 9305*b* may be attached to the first coupling member 9303*a* or the second coupling member 9304*a*, for configuring the at least one protrusion 9305*b* on either of the first coupling member 9303*a* and the second coupling member 9304*a*.

Figure 197A:
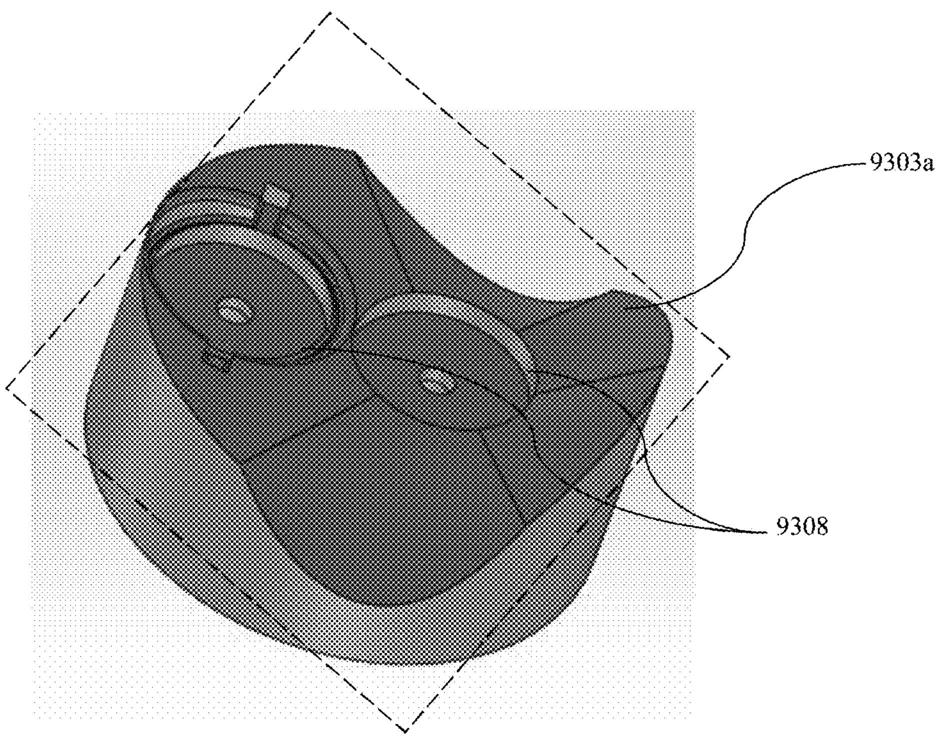
Figure 197B:
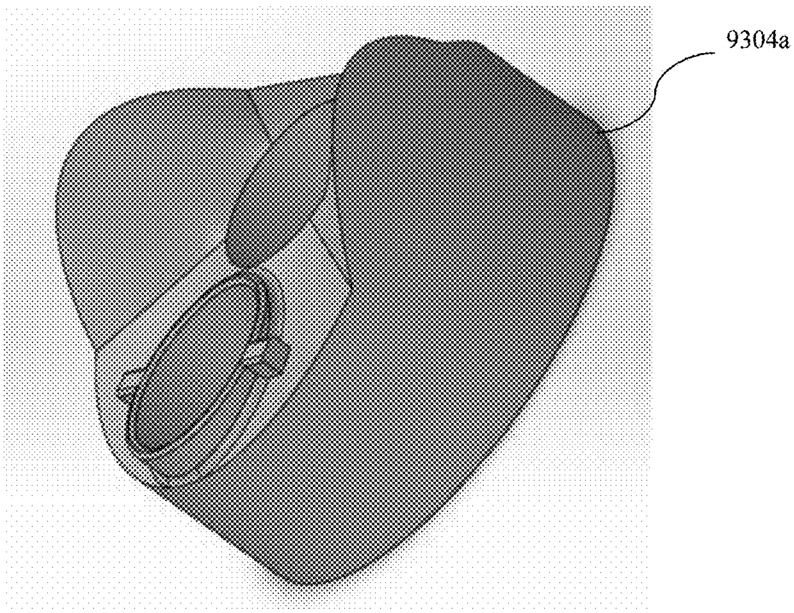
Figure 197C:
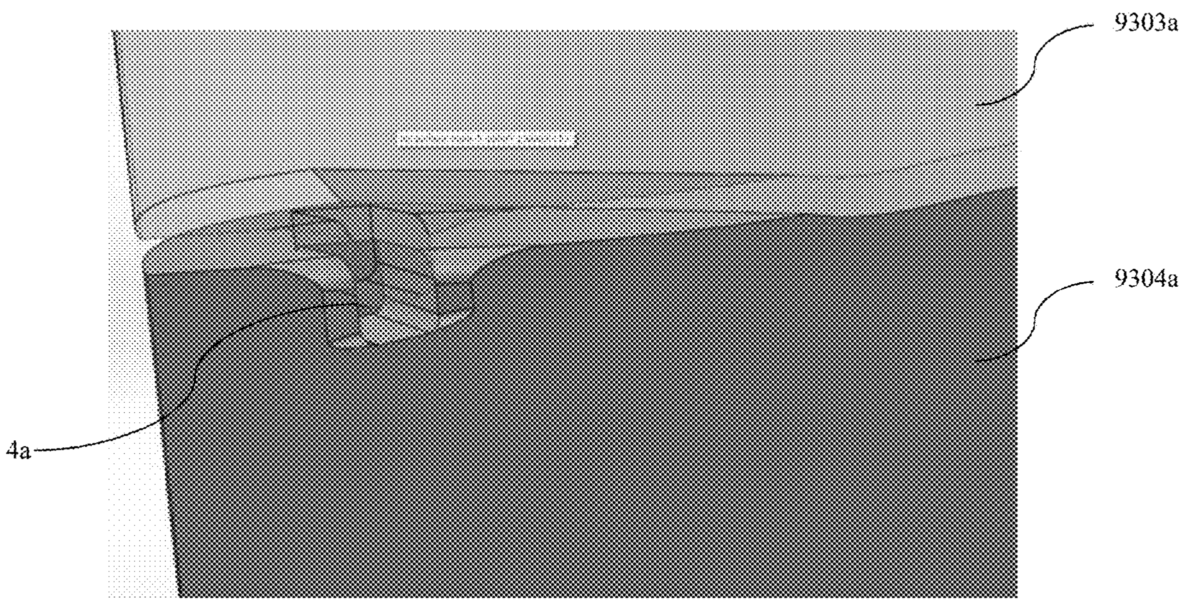
Figure 197D:
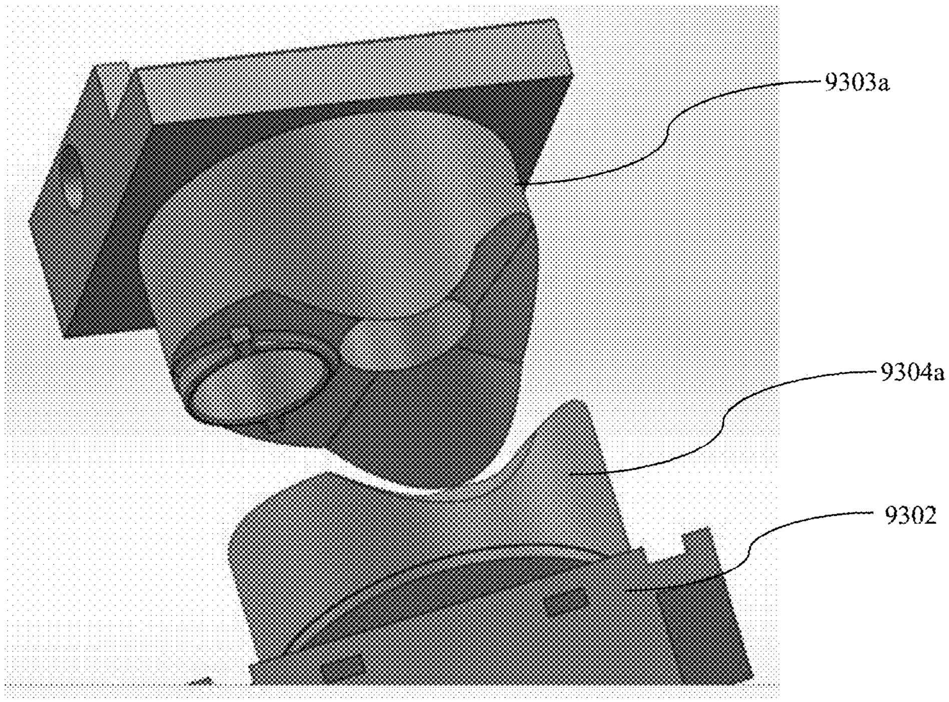

In an embodiment, a combination of the at least one notch 9305*a* and the at least one protrusion 9305*b* may be provided on both the first coupling member 9303*a* and the second coupling member 9304*a*, as per design feasibility and requirement [as shown in FIG. 197*d*]. In other words, a combination of the at least one notch 9305*a* and the at least one protrusion 9305*b* may be provided on the first coupling member 9303*a* and the at least one second coupling member 9304*a*, for facilitating better coupling characteristics.

Referring back to FIG. 194, at least one sensor 9306 may be provided at the connection interface of the robotic system and the first connection surface 9303*b*. The at least one sensor 9306 may be adapted to identify and determine orientation of the first mating surface with the second mating surface 9304*c*, during coupling. Thus, preventing misalignment or mi-orientation of engagement between the first mating surface and the second mating surface 9304*c*. In an exemplary embodiment, for a crest and trough shaped first mating surface and the corresponding second mating surface 9304*c*, the at least sensor is configured to match the trough of the first mating surface with the crest of the second mating surface 9304*c*, for effective engagement and coupling. The at least one sensor 9306 is also configured to monitor orientation of the at least one notch 9305*a* and the at least one protrusion 9305*b* during coupling, thereby preventing misalignment of the at least one notch 9305*a* with the at least one protrusion 9305*b* during engagement and coupling.

In an embodiment, the at least one sensor 9306 may be interfaced with one or more processors or control units, for transmitting signals relating to the orientation of the first coupling member 9303*a* with respect to the second coupling member 9304*a*, during engagement. The one or more processors or control units, may operate the first coupling member 9303*a* suitably, based on the feedback received from the at least one sensor 9306 for appropriate orientation and position. In an embodiment, the one or more processors or control units may rotate or actuate the first coupling member 9303*a* along different axis or axes, as per feasibility and requirement.

In an embodiment, the at least one sensor 9306 is selected from group comprising piezoelectric sensors, hall-effect sensors, infrared sensors or any other sensors which serves the purpose of determining the position and orientation of the first coupling member 9303*a* with respect to the second coupling member 9304*a*.

In an embodiment, the first coupling member 9303*a* may be connected to the robotic system such as a robotic arm via at least one of an electro-mechanical means, a mechanical means, a vacuum means or a magnetic means. In an exemplary embodiment, the mechanical means of connection between the first coupling member 9303*a* and the robotic system may be selected from at least one of a snap-fit arrangement, a screw-thread arrangement, a twist-lock arrangement or any other means which serves the design feasibility and requirement.

In an embodiment, the second coupling member 9304*a* may be connected to the one or more objects 9302 via at least one of an electro-mechanical means, a mechanical means, a vacuum means or a magnetic means. In an exemplary embodiment, the mechanical means of connection between the second coupling member 9304*a* and the one or more objects 9302 may be selected from at least one of a snap-fit arrangement, a screw-thread arrangement, a twist-lock arrangement or any other means which serves the design feasibility and requirement.

In an embodiment, an interface port 9307 [as shown in FIGS. 199*a*-199*c*] is defined on the first coupling member 9303*a* and is interfaced with the robotic system. The interface port 9307 provides peripheral connection between the second coupling member 9304*a* and the robotic system, to facilitate manipulation of the one or more objects 9302 by the robotic system.

In an embodiment, the one or more objects 9302 may be selected from at least one of a kitchen appliance, a household appliance, a shop-floor appliance, an industrial appliance or any other appliance which serves the user's requirement.

In an embodiment, the robotic system may be selected from at least one of a commercial robotic system and an industrial robotic system. In another embodiment, the commercial robotic system may be selected from at least one of a house-hold robotic system, a field robotic system, a medical robotic system and an autonomous robotic system.

FIGS. 195*a*-195*e* in one exemplary embodiment of the present disclosure illustrates the coupling device 9300, defined with the locking mechanism 9305 having the at least one notch 9305*a* and the at least one protrusion 9305*b* in triangular configuration [also referred as locking mechanism 9305 in triangular configuration].

As illustrated in FIG. 195*a*, the coupling device 9300 includes the first coupling member 9303*a*, which is cylindrical in shape and circular in cross-section. The first coupling member 9303*a* has the first connection surface 9303*b* connectable to the robotic system, and the first mating surface having a plurality of first projections. The plurality of first projections are configured to be symmetrical about an axis A-A', with only one trough region formed on either side of the axis A-A'. The trough region may be formed such that, the one of the plurality of first projections is smaller than that other of the plurality of first projections. The first mating surface also includes the at least one protrusion 9305*b* in triangular configuration, defined in its central portion and extending by a predetermined distance. Also, the at least one protrusion 9305*b* is configured with a predetermined thickness, corresponding to the one or more objects 9302 that is to be gripped and manipulated. The thickness of the at least one protrusion 9305*b* inherently provides the side load stability required for handling the one or more objects 9302 during operation of the robotic system. Thus, an optimal thickness of the at least one protrusion 9305*b* is considered based on the side load stability requirement. The first coupling member 9303*a* may also include a central slot, as a provision for the at least one sensor 6 for determining position of the first coupling member 9303*a* with respect to the second coupling member 9304*a* during engagement.

Referring to FIG. 195*b*, the second coupling member 9304*a* of the coupling device 9300 is illustrated. The second coupling member 9304*a* is selected corresponding to the configuration of the first coupling member 9303*a*. That is, the second coupling member 9304*a* is cylindrical in shape and circular in cross-section corresponding to the dimensions of the first coupling member 9303*a*. The second coupling member 9304*a* has the second connection surface 9304*b* connectable to the one or more objects 9302, and the second mating surface 9304*c* having a plurality of second projections 9304*d*. The plurality of second projections 9304*d* are configured to be symmetrical about axis A-A', with only one crest region formed on either side of the axis A-A'. The crest region may be formed such that, the one of the plurality of first projections is smaller than that other of the plurality of first projections. Also, the configuration of the crest region in the second coupling member 9304*a* is selected corresponding to the configuration of the trough region in the first coupling member 9303*a*, thereby ensuring that a flush joint after engagement. The second mating surface 9304*c* also includes the at least one notch 9305*a* in triangular configuration, defined in its central portion and extending by a predetermined distance. The at least one notch 9305*a* is configured corresponding to the configuration of the at least one protrusion 9305*b*, to form a flush joint upon engagement. Also, the at least one notch 9305*a* may be configured with a predetermined depth, corresponding to the extension of the at least one protrusion 9305*b*. The depth of the at least one notch 9305*a* may be selected such that, the overall strength characteristics of the second coupling member 9304*a* remains optimum for handling the one or more objects 9302, during operation of the robotic system. Thus, an optimal depth of the at least one notch 9305*a* is considered based on the integrity and strength characteristics of the second coupling member 9304*a*. The second coupling member 9304*a* may also include a central cut-out, which may act as a marker or an indication for the at least one sensor 6 for determining position of the second coupling member 9304*a* with respect to the first coupling member 9303*a* during engagement.

In an embodiment, the extension of the at least one protrusion 9305*b* is lesser than the extension of the plurality of first projections, thus ensure that the at least one protrusion 9305*b* engage with the at least one notch 9305*a*, only upon engagement of the plurality of first projections with the plurality of second projections 9304*d*.

In an embodiment, the first coupling member 9303*a* is made of material selected from group comprising ferromagnetic materials or non-ferro magnetic materials.

In an embodiment, the second coupling member 9304*a* is made of material selected from group comprising ferromagnetic materials or non-ferro magnetic materials.

Referring to FIG. 195*c*, the engagement between the first coupling member 9303*a* connected to the robotic arm and the second coupling member 9304*a* connected to the one or more objects 9302 is illustrated. The one or more processors in the robotic system actuates the first coupling member 9303*a* to actuate in a work space and locate the second coupling member 9304*a*. Upon locating, the at least one sensor 9306 provided in the first coupling member 9303*a* determines the orientation of the plurality of first projections with respect to the plurality of second projections 9304*d*. The at least one sensor 9306, upon determining optimum orientation between the first coupling member 9303*a* and the second coupling member 9304*a*, transmits a feedback signal to the one or more processors for operating the first coupling member 9303*a* further. Thus, the one or more processors ensures engagement between the first coupling member 9303*a* and the second coupling member 9304*a* [as shown in FIG. 195*d*].

Referring to FIG. 195*e*, wherein the one or more objects 9302 created for simulation is attached with the robotic system via the coupling device 9300, for determining the stability and strength of the coupling during operation of the robotic system. Forces are applied onto the one or more objects 9302, after attachment with the robotic system for determining the coupling strength [as shown in FIGS. 195*f* and 195*g*].

The forces on the one or more objects 9302 are applied, as per the directions mentioned in FIG. 195*g*, wherein each letter signifies, the direction of the forces acting. The forces acting on the one or more objects 9302 is mentioned in the below table 6.

TABLE 6

| Letter | Direction of Force |
|---|---|
| L | Left |
| R | Right |
| U | Up |
| D | Down |
| MF | Middle Front |
| MB | Middle Back |
| MU | Middle Up |

Based on the above-mentioned direction of forces, the below table 7 represents the force test with the locking mechanism 9305 in triangular configuration.

TABLE 7

| | Force | | |
|---|---|---|---|
| Area | 5N | 10N | 20N |
| L | 6 | 5 | 3 |
| R | | 5 | 4 |
| U | | | |
| D | | | |
| MF | | | |
| MB | | | |
| MU | | | |

The numerals mentioned in the above table 7, corresponds to the direction of forces on the one or more objects 9302, which the robotic system failed to hold. However, below table 8 illustrates the results of the force-test on the one or more objects 9302 connected to the robotic system via conventional coupling device 9300.

TABLE 8

| | Force | | |
|---|---|---|---|
| Area | 5N | 10N | 20N |
| L | | 1 | |
| R | | 2 | 5 |
| U | | | 3 |
| D | 2 | 2 | |
| MF | | 4 | 3 |
| MB | | | |
| MU | | 1 | |

From the table 8, it is evident that providing the locking mechanism 9305 in the triangular configuration has significantly improved the stability and strength of the coupling device 9300 in comparison with the conventional coupling devices. Hence, the one or more objects 9302 can be handled more effectively by incorporating the locking mechanism 9305 in the triangular configuration.

FIGS. 196*a*-196*d* in one exemplary embodiment of the present disclosure illustrates the coupling device 9300, defined with the locking mechanism 9305 having the at least one notch 9305*a* and the at least one protrusion 9305*b* in circular configuration [also referred as locking mechanism 9305 in circular configuration].

Figure 196A:
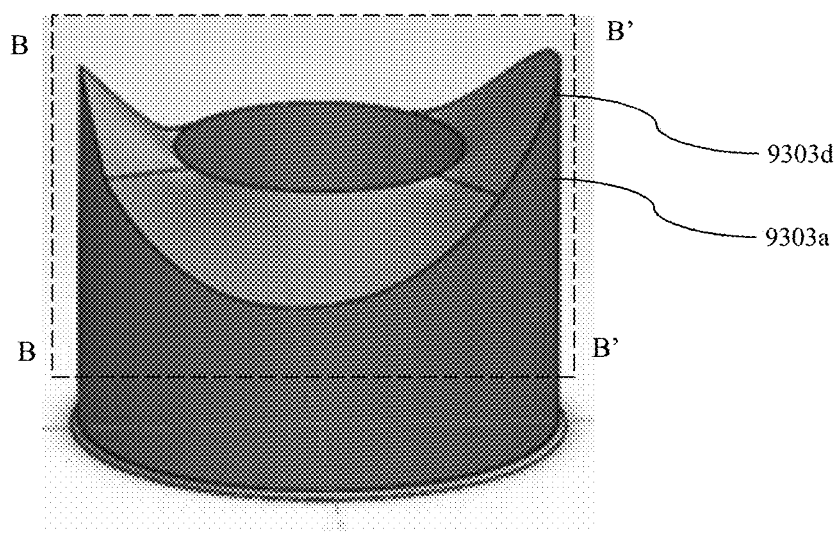

As illustrated in FIG. 196*a*, the coupling device 9300 includes the first coupling member 9303*a*, which is cylindrical in shape and circular cross-section. The first coupling member 9303*a* has the first connection surface 9303*b* connectable to the robotic system, and the first mating surface having a plurality of first projections. The plurality of first projections are configured to be symmetrical about a plane B-B' [wherein the plane B-B' is perpendicular to axis A-A'], with only one trough region formed on either side of the plane B-13'. The trough region may be formed such that, the one of the plurality of first projections is smaller than that other of the plurality of first projections. The first mating surface also includes the at least one protrusion 9305*b* in circular configuration, defined in its central portion and extending by a predetermined distance. The first coupling member 9303*a* also includes the central slot, for receiving the at least one sensor 6 for determining position of the first coupling member 9303*a* with respect to the second coupling member 9304*a* during engagement.

Figure 196B:
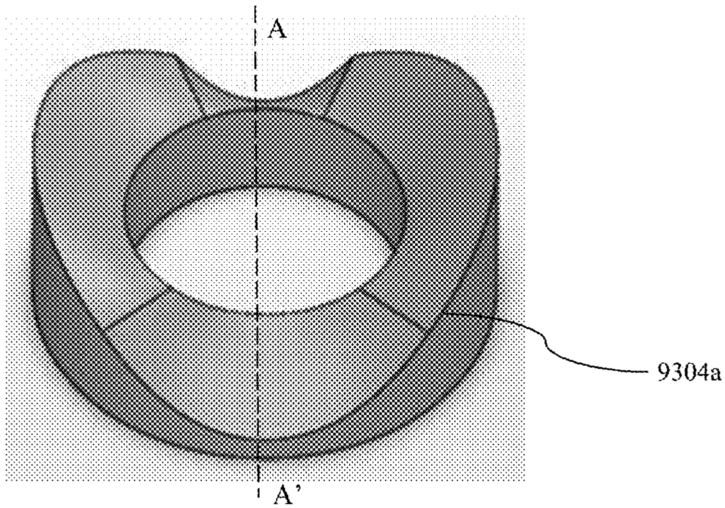

Referring to FIG. 196*b*, the second coupling member 9304*a* of the coupling device 9300 is illustrated. The second coupling member 9304*a* is selected corresponding to the configuration of the first coupling member 9303*a*. That is, the second coupling member 9304*a* is cylindrical in shape and circular in cross-section corresponding to the dimensions of the first coupling member 9303*a*. The second coupling member 9304*a* has the second connection surface 9304*b* connectable to the one or more objects 9302, and the second mating surface 9304*c* having a plurality of second projections 9304*d*. The plurality of second projections 9304*d* are configured to be symmetrical about the axis A-A', with only one crest region formed on either side of the axis A-A'. The crest region may be formed such that, the one of the plurality of first projections is smaller than that other of the plurality of first projections. Also, the configuration of the crest region in the second coupling member 9304*a* is selected corresponding to the configuration of the trough region in the first coupling member 9303*a*, thereby ensuring that a flush joint after engagement. The second mating surface 9304*c* also includes the at least one notch 9305*a* in circular configuration, defined in its central portion and extending by a predetermined distance. The second coupling member 9304*a* may also include a central cut-out, which may act as the marker or the indication for the at least one sensor 6 for determining position of the second coupling member 9304*a* with respect to the first coupling member 9303*a* during engagement.

Figure 196C:
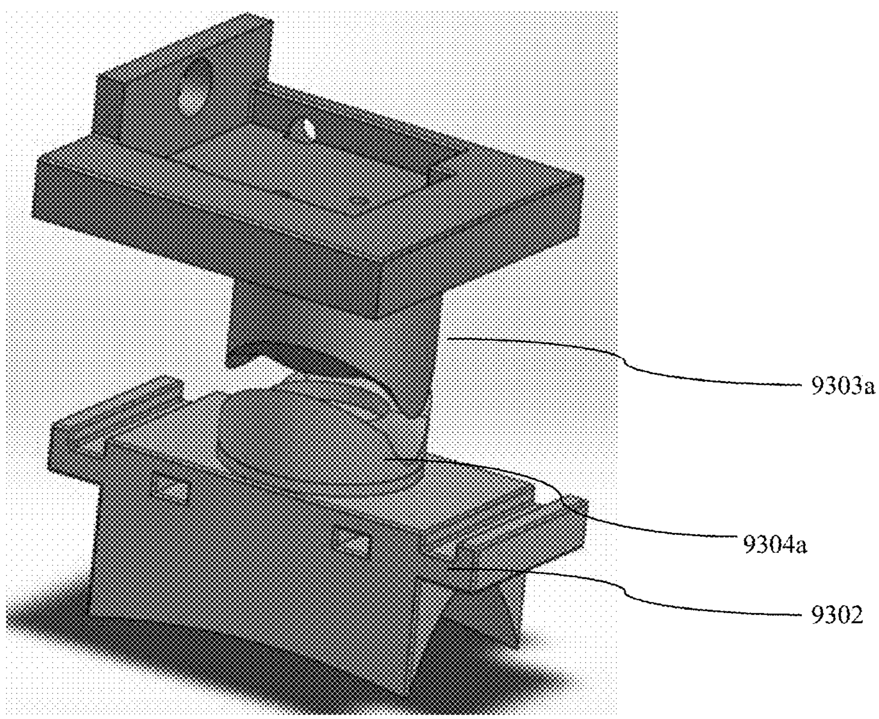
Figure 196D:
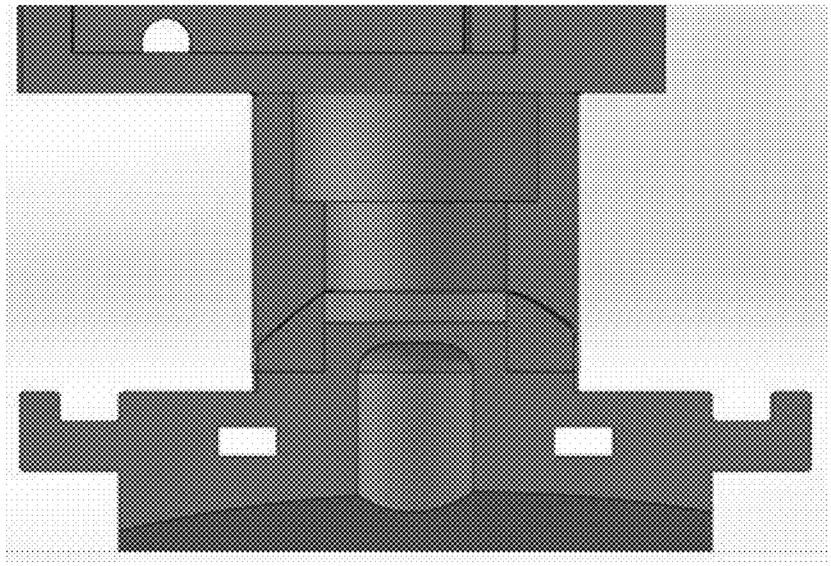

Referring to FIG. 196*c*, the engagement between the first coupling member 9303*a* connected to the robotic arm and the second coupling member 9304*a* connected to the one or more objects 9302 is illustrated. The one or more processors in the robotic system actuates the first coupling member 9303*a* to actuate in a work space and locate the second coupling member 9304*a*. Upon locating, the at least one sensor 6 provided in the first coupling member 9303*a* determines the orientation of the plurality of first projections with respect to the plurality of second projections 9304*d*. The at least one sensor 6, upon determining optimum orientation between the first coupling member 9303*a* and the second coupling member 9304*a*, transmits a feedback signal to the one or more processors for operating the first coupling member 9303*a* further. Thus, the one or more processors ensures engagement between the first coupling member 9303*a* and the second coupling member 9304*a* [as shown in FIG. 196*d*].

Further, the load test is carried out for the one or more objects 9302 [as shown in FIG. 903*e*] attached with the robotic system via the coupling device 9300 illustrated in FIGS. 196*a*-196*d*, for determining the stability and strength of the coupling during operation of the robotic system. Forces are applied onto the one or more objects 9302, after attachment with the robotic system for determining the coupling strength [as shown in FIGS. 195*f* and 195*g*].

The below table 9 represents the force test with the locking mechanism 9305 in circular configuration.

TABLE 9

| | Force | | |
|---|---|---|---|
| Area | 5N | 10N | 20N |
| L | | 5 | 4 |
| R | 6 | 4 | 4 |
| U | | | |
| D | | | |
| MF | | | |
| MB | | | |
| MU | | | |

The numerals mentioned in the above table 9, corresponds to the direction of forces on the one or more objects 9302, which the robotic system failed to hold.

From the table 9, it is evident that providing the locking mechanism 9305 in the circular configuration has significantly improved the stability and strength of the coupling device 9300 as compared to the conventional coupling devices. Hence, the one or more objects 9302 can be handled more effectively by incorporating the locking mechanism 9305 in the circular configuration. However, the locking mechanism 9305 in the circular configuration may be less stable and rigid as compared to the locking mechanism 9305 in triangular configuration.

FIGS. 197*a*-197*e* in one exemplary embodiment of the present disclosure illustrates the coupling device 9300, defined with the locking mechanism 9305 having the combination of the at least one notch 9305*a* and the at least one protrusion 9305*b* in circular configuration [also referred as locking mechanism 9305 in electromagnet configuration].

As illustrated in FIG. 197*a*, the coupling device 9300 includes the first coupling member 9303*a*, which is cylindrical in shape and circular cross-section. The first coupling member 9303*a* has the first connection surface 9303*b* connectable to the robotic system, and the first mating surface having a plurality of first projections. The plurality of first projections are configured to be symmetrical about a plane B-B' [wherein the plane B-B' is perpendicular to axis A-A'], with only one trough region formed on either side of the plane B-13'. The trough region may be formed such that, the one of the plurality of first projections is smaller than that other of the plurality of first projections. The first mating surface also includes the at least one protrusion 9305*b* in circular configuration, defined in its central portion and extending by a predetermined distance. The first coupling member 9303*a* also includes two slots 8 configured to receive electromagnets. The electromagnets are configured to be interfaced with the robotic system via the interface port 7, so that the robotic system can power the electromagnets are per requirement. Further, the electromagnets in one of the slots 9403*c* may be positioned at a higher level than the other electromagnet, thereby forming a stepped profile [as shown in FIG. 197*b*]. Also, the at least one sensor 6 is provided within one of the two slots 8, for determining position of the first coupling member 9303*a* with respect to the second coupling member 9304*a* during engagement.

Referring to FIG. 197*b*, the second coupling member 9304*a* of the coupling device 9300 is illustrated. The second coupling member 9304*a* is selected corresponding to the configuration of the first coupling member 9303*a*. That is, the second coupling member 9304*a* is cylindrical in shape and circular in cross-section corresponding to the dimensions of the first coupling member 9303*a*. The second coupling member 9304*a* has the second connection surface 9304*b* connectable to the one or more objects 9302, and the second mating surface 9304*c* having a plurality of second projections 9304*d*. The plurality of second projections 9304*d* are configured to be symmetrical about the plane B-B', with only one crest region formed on either side of the plane B-B'. The crest region may be formed such that, the one of the plurality of first projections is smaller than that other of the plurality of first projections. Also, the configuration of the crest region in the second coupling member 9304*a* is selected corresponding to the configuration of the trough region in the first coupling member 9303*a*, thereby ensuring that a flush joint after engagement. The second mating surface 9304*c* also includes two notches in circular configuration and located corresponding to the electromagnets. The notches are configured to receive the electromagnets for engagement and coupling. The notches may also include a central cut-out, which may act as the marker or the indication for the at least one sensor 6 for determining position of the second coupling member 9304*a* with respect to the first coupling member 9303*a* during engagement.

Referring to FIG. 197*c*, one of the notches of the second coupling member 9304*a* may include a slit, so that the electromagnet once inserted into these notches may engage with the slit for improved engagement with the second coupling member 9304*a*. In an embodiment, the slit may also be configured in the first coupling member 9303*a*.

Figure 197E:
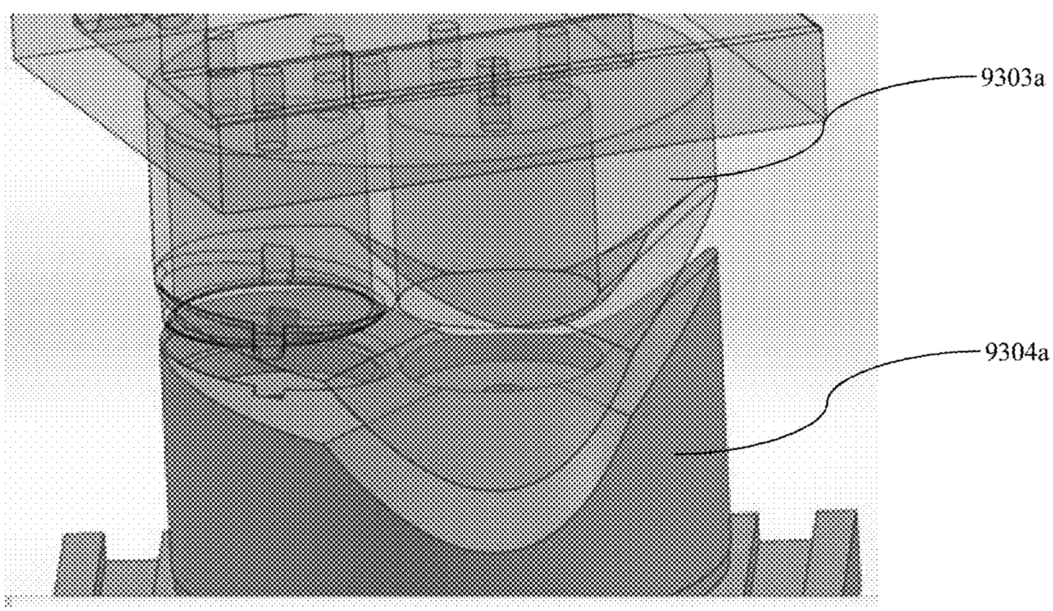

Referring to FIG. 197*d*, the engagement between the first coupling member 9303*a* connected to the robotic arm and the second coupling member 9304*a* connected to the one or more objects 9302 is illustrated. The one or more processors in the robotic system actuates the first coupling member 9303*a* to actuate in the work space and locate the second coupling member 9304*a*. Upon locating, the at least one sensor 9306 provided in the first coupling member 9303*a* determines the orientation of the plurality of first projections with respect to the plurality of second projections 9304*d*. The at least one sensor 9306, upon determining optimum orientation between the first coupling member 9303*a* and the second coupling member 9304*a*, transmits a feedback signal to the one or more processors for operating the first coupling member 9303*a* further. At this stage, the one or more processors, may actuate the electromagnets selectively, based on locking force required for locking the one or more objects 9302. Thus, the one or more processors ensures engagement between the first coupling member 9303*a* and the second coupling member 9304*a* [as shown in FIG. 197*e*].

Further, the load test is carried out for the one or more objects 9302 [as shown in FIG. 195*e*] attached with the robotic system via the coupling device 9300 illustrated in FIGS. 197*a*-197*e*, for determining the stability and strength of the coupling during operation of the robotic system. Forces are applied onto the one or more objects 9302, after attachment with the robotic system for determining the coupling strength [as shown in FIGS. 195*f* and 195*g*].

The below table 10 represents the force test with the locking mechanism 9305 of electromagnet configuration.

TABLE 10

| | Force | | |
|---|---|---|---|
| Area | 5N | 10N | 20N |
| L | | | 6 |
| R | | | 6 |
| U | | | |
| D | | | |
| MF | | | |
| MB | | | |
| MU | | | |

The numerals mentioned in the above table 10, corresponds to the direction of forces on the one or more objects 9302, which the robotic system failed to hold.

From the table 10, it is evident that providing the locking mechanism 9305 in electromagnet configuration has significantly improved the stability and strength of the coupling device 9300 as compared to the conventional coupling devices. Moreover, this configuration of the coupling device 9300 has higher reliability than that of the circular configuration and the triangular configurations.

FIGS. 198*a*-198*d* in one exemplary embodiment of the present disclosure illustrates the second coupling member 9304*a* connected to one or more objects 9302. In one embodiment, the one or more objects 9302 are kitchen appliances such as a blender, a spoon, a utensil and the like.

As illustrated in the drawings, the second coupling member 9304*a* may be located on the one or more objects 9302 such that, it does not hinder manual usage of the one or more objects 9302 to the user. At the same time, the location of the second coupling member 9304*a* may also enable the robotic system for effective manipulation of the one or more objects 9302, once coupled. Thus, location of the second coupling member 9304*a* on the one or more objects 9302, plays a crucial role in its utility both for the robotic system and the user.

Figure 198A:
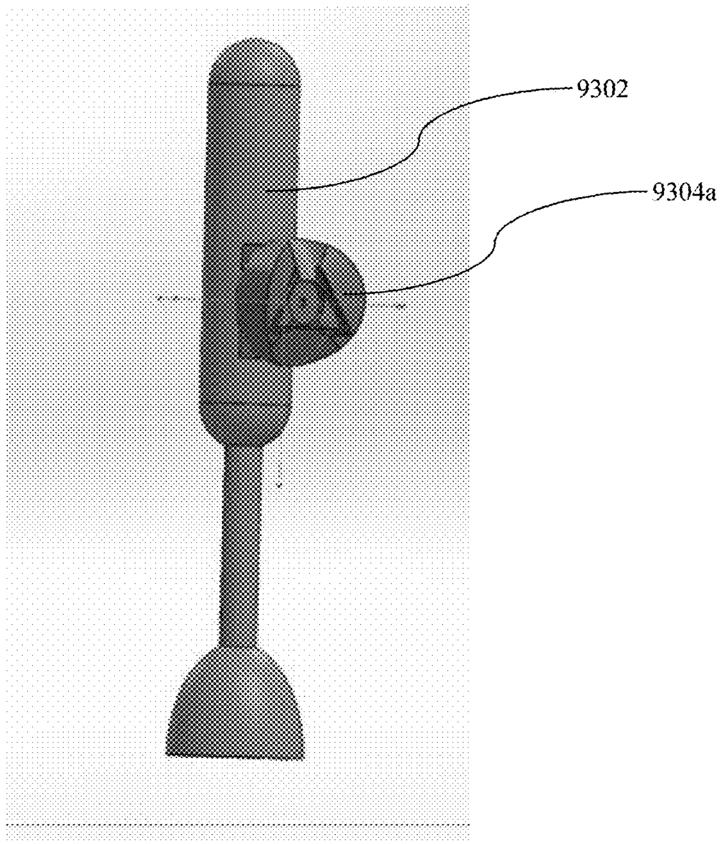
Figure 198B:
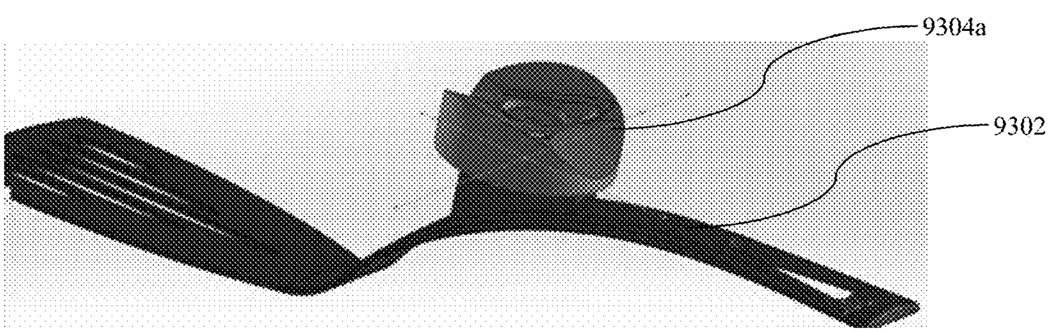
Figure 198C:
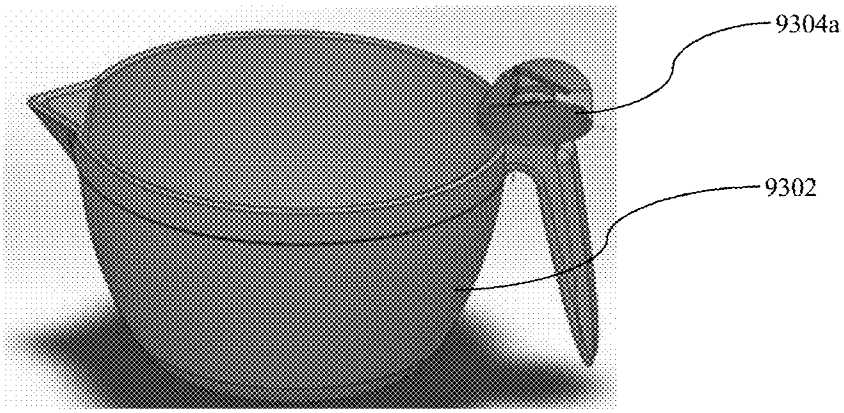
Figure 198D:
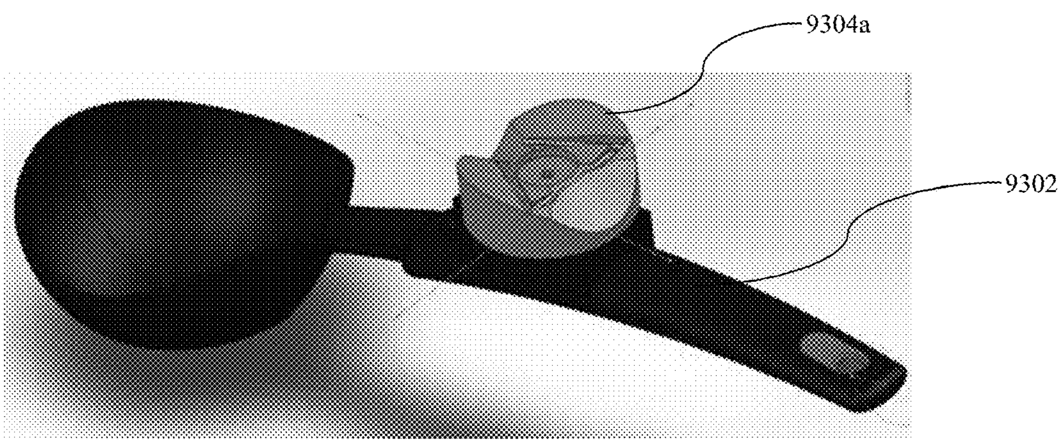

In an exemplary embodiment, as shown in FIG. 198*a*, the second coupling member 9304*a* is located at a central region of the length of the blender. This location ensures that the user may manually operate the blender, and also may connect to the robotic system for operation. The location of the second coupling member 9304*a* for the one or more objects 9302 illustrated in FIGS. 198*b*-198*d*, is considered in the same way as that of the blender.

Figure 200A:
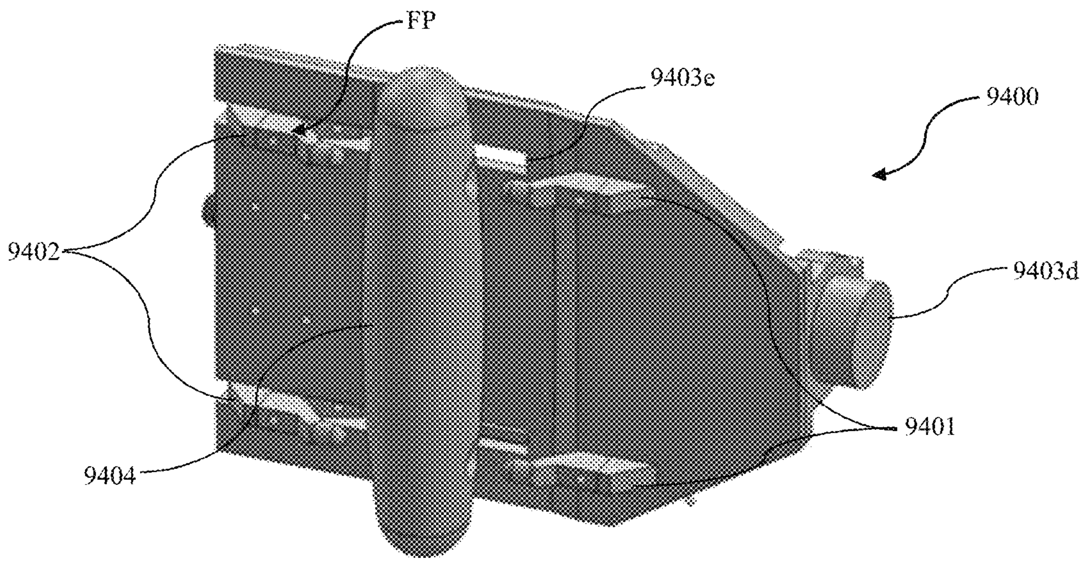
Figure 200B:
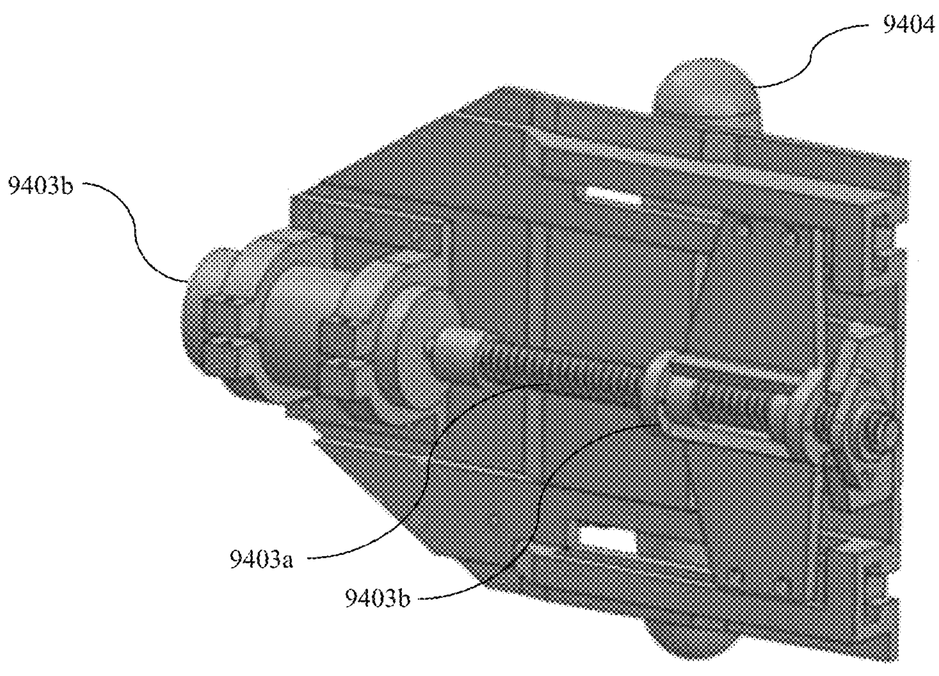
Figure 200C:
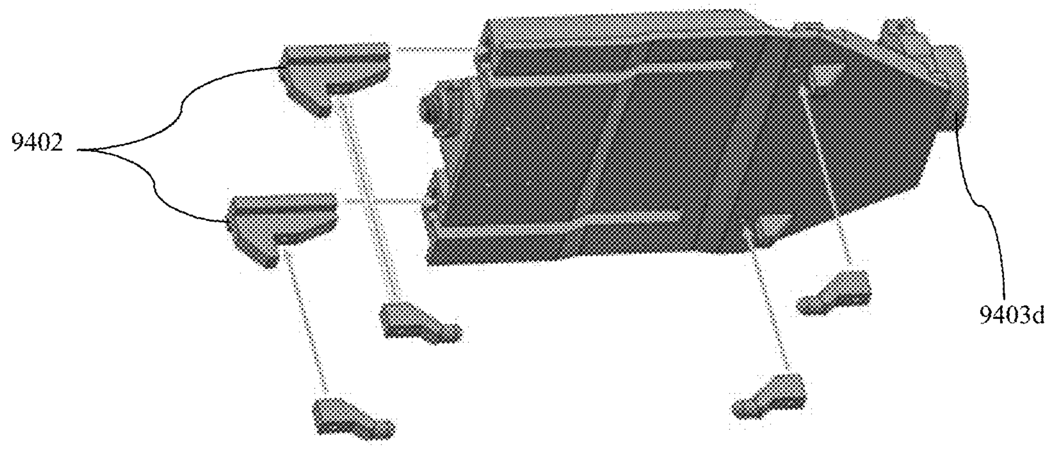
Figure 200D:
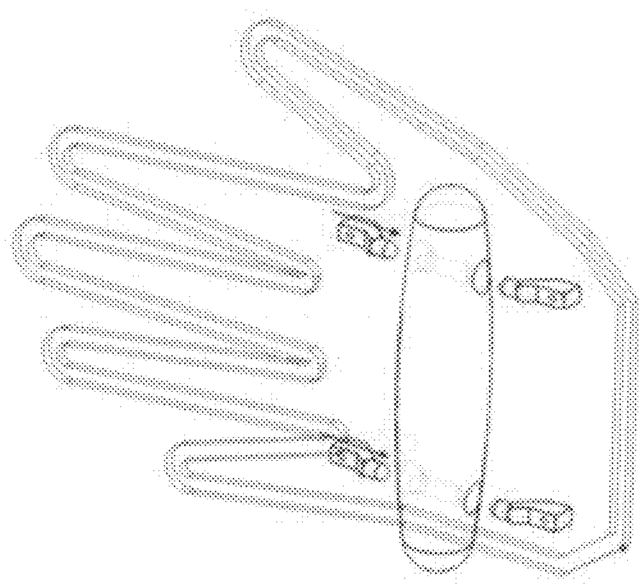
Figure 200E:
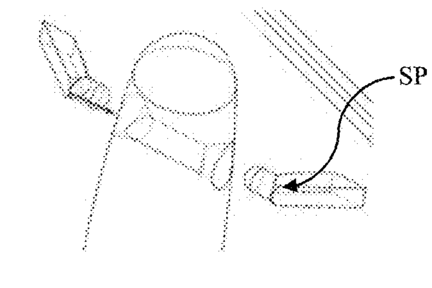

FIG. 200*a*-200*e* in one exemplary embodiment of the present disclosure illustrates a locking mechanism 9305 for securing one or more objects 9302 to the robotic system. The locking mechanism 9305 comprises at least one first locking member 9401 fixed on a manipulator of the robotic system and at least one second locking member 9402 mounted on the manipulator. The at least one first locking member 9401 and the at least one second locking member 9402 are positioned in the same plane, for securing the one or more objects 9302. The at least one second locking member 9402 is positioned in a guideway defined on the manipulator, for sliding between a first position 9402*a* and a second position 9402*b* by at least one actuator 9403*a* assembly. The at least one actuator 9403*a* assembly is configured to operate the at least one second locking member 9402 from the first position 9402*a* to the second position 9402*b* to engage the one or more objects 9302 between the at least one first locking member 9401 and the at least one second locking member 9402, for securing the one or more objects 9302. The at least one first locking member 9401 and the at least one second locking member 9402 are configured to engage with a plurality of slots 9403*c* defined on the one or more objects 9302 for engagement [as shown in FIG. 200*b*].

In an embodiment, the at least one second locking member 9402 is actuated to slide towards the at least one first locking member 9401, while operating between the first position 9402*a* to the second position 9402*b*.

In an embodiment, the at least one actuator 9403*a* assembly may be associated with the one or more processors. The one or more processors may be configured to actuate the at least one actuator 9403*a*, for operating the at least one second locking member 9402 between the first position 9402*a* and the second position 9402*b*. In another embodiment, the one or more processors may be configured to actuate the at least one actuator 9403*a*, when the manipulator approaches vicinity of the one or more objects 9302 to be secured.

In an embodiment, the plurality of slots 9403*c* defined on the one or more slots 9403*c* are selected corresponding to the configuration of the at least one first locking member 9401 and the second locking member.

In an embodiment, the plurality of slots 9403*c* are configured such that, the frictional forces acting on the at least one first locking member 9401 and the second locking member during engagement is minimal. For the frictional forces to be minimal, the plurality of slots 9403*c* may be provided with features such as fillets or chamfers or any other features, which mitigate frictional forces for engagement.

In an embodiment, the plurality of slots 9403*c* may be configured with a predetermined sliding angle, based on the strength and smoothness of travel of the at least one first locking member 9401 and the second locking member.

In an embodiment, the predetermined sliding angle for the plurality of slots 9403*c* are considered on various factors, as collated in below table 11.

TABLE 11

| Factor | Low sliding angle | High sliding angle |
|---|---|---|
| Strength of the locking system | high | low |
| Smoothness of the movement | high | low |
| Required size of the hole in the utensil | big | small |
| Size of the hook on the robotic hand | big | small |
| motor 1003d power requirements | low power | high power |
| Error tolerance (range/scope) | low | high |
| Locking time | slow | fast |

In an embodiment, the at least one actuator 9403*a* assembly comprises a lead screw operated by a motor 9403*d* and a nut mounted on the lead screw. A motor 9403*d* supported by a clamp, is coupled to the lead screw, and thus upon rotation of the lead screw, the nut is configured to slide along the lead screw. The nut is fixedly connected to the at least one second locking member 9402, so that the at least one second locking member 9402 is operated along with the nut, when the motor 9403*d* rotates the lead screw. The motor 9403*d* may be associated with the one or more processors of the robotic system. The one or more processors, thus, control the rotation of the lead screw as per requirement of movement of the at least one second locking member 9402. Accordingly, the at least one second locking member 9402 is operated between the first position 9402*a* and the second position 9402*b*.

In an embodiment, the lead screw may be mounted co-axial to a horizontal axis of the manipulator. In another embodiment, the lead screw may be mounted on the manipulator as per requirement of sliding movement of the at least one second locking member 9402 between the first position 9402*a* and the second position 9402*b* for securing the one or more objects 9302.

In an embodiment, a lead screw holder may be provided for supporting the lead screw on the manipulator.

In an embodiment, the lead screw holder includes a plurality of threads with a lead angle selected to restrict movement of the nut, when the motor 9403*d* ceases to operate.

In an embodiment, the one or more processors are configured to actuate the motor 9403*d* upon alignment of either of the at least one first locking member 1000 and the at least one second locking member 9402. In an embodiment, the plurality of slots 9403*c* may include the indication device or the marker for determining position of the one or more objects 9302 during engagement. In another embodiment, the indication device or the marker in the plurality of slots 9403*c* may enable the one or more processors to align either of the least one first locking member and the second locking member with the plurality of slots 9403*c* prior to engagement.

In an embodiment, the motor 9403*d* is powered by a power source selected from at least one of an Alternating-Current power source or a Direct-Current power source, for rotating the lead screw.

In an exemplary embodiment, the torque required to operate the lead screw is calculated as follows:

Based on the required force, friction of the screw and lead/pitch of the thread, the torque was calculated for the 6 mm screw:

$$\text{Torque (raise)} = F*dm/2*(L+u*PI*dm)/(PI*dm-u*L) = 20N*6\ \text{mm}/2*(1\ \text{mm}+0.2*PI*6\ \text{mm})/(PI*6\ \text{mm}-0.2*1\ \text{mm}) = 13.5N*\text{mm of torque must be applied on the screw end to achieve } 20N \text{ force on the nut} \quad \text{(Eq. 1)}$$

The equation used to calculate the required torque:

$$T_{raise} = \frac{Fd_m}{2}\left(\frac{l+\pi\mu d_m}{\pi d_m-\mu l}\right) = \frac{Fd_m}{2}\tan(\phi+\lambda)$$

$$T_{lower} = \frac{Fd_m}{2}\left(\frac{\pi\mu d_m-l}{\pi d_m+\mu l}\right) = \frac{Fd_m}{2}\tan(\phi-\lambda)$$

T—torque
F—load on the screw
dm—screw diameter
μ—coefficient of friction
(according to the table 1 below)
I—lead/pitch
ϕ—angle of friction
λ—lead angle In another embodiment, the material used for the lead screw and the nut material is selected from group comprising steel, stainless steel, bronze, brass, cast iron and the like, as per design feasibility and requirement.

In an exemplary embodiment, the lead screw rotation is calculated as follows:

For 1 mm per second speed of the at least one second locking member 9402, the rotation of the lead screw may be calculated via:

$$V=L*\text{Rps} \quad \text{(Eq. 2)}$$

Where:
V—speed of the hooks
L—lead/pitch of the thread
Rps—Revolutions per second (of the screw)
Therefore: 10 mm/sec=1 mm*Rps
Rps=(10 mm/sec)/1 mm
Rps=10/sec In other words, 10 revolutions per second of the lead screw is required to move the at least one second locking member 9402 at 10 mm per second.

Therefore, the motor **9403*d*** will have to rotate the screw 600 rpm (10 rps*60 sec) to achieve the hooks' speed equal to 10 mm per second.

In an embodiment, the at least one actuator **9403*a* assembly may comprise a housing 9404*a* mounted on the manipulator. The housing 9404*a* includes a solenoid coil 9404*b* and powered by the power source. A plunger 9404*c* is accommodated within the housing 9404*a* and is suspended concentrically to the solenoid coil 9404*b*. The plunger 9404*c* is adapted to be actuated by the solenoid coil 9404*b* in an energized condition. Further, a frame member 9404*d* extends from the plunger 9404*c*, to connect to the at least one second locking means. The frame member 9404*d* is thus configured to transfer actuation of the plunger 9404*c* to the at least one second locking means, and thereby operating the at least one second locking means between the first position 9402*a* and the second position 9402*b***.

In an embodiment, a damper member may be provided such that, one end of the damper member may be fixed to the housing **9404*a* and the other end may be connected to the frame member 9404*d*. This configuration ensures that the frame member 9404*d* returns back to an initial position, when the solenoid coil 9404*b* is deenergized. Thus, enable smooth translation of the frame member 9404*d* and the at least one second locking member 9402 between the first position 9402*a* and the second position 9402*b***.

In an embodiment, the frame member **9404*d* includes one or more link 9405 members which are connected to the at least one second locking member 9402 for transferring actuation of the plunger 9404*c* to the at least one second locking member 9402**.

In an embodiment, the solenoid coil **9404*b*** is energized by the power source selected from at least one of an Alternating-Current power source or a Direct-Current power source, for rotating the lead screw.

In an embodiment, the least one first locking member and the second locking member are hook members.

In an embodiment, the at least one sensor 6 provided in the manipulator is configured to detect secured and unsecured condition of the one or more objects 9302 with the manipulator.

In an embodiment, both the at least one first locking member 9401 and the at least one second locking member 9402 can be slidable relative to one another for securing the one or more objects 9302. In other words, instead of moving only the at least one second locking member 9402, the at least one first locking member 9401 may also be slidably operated for securing the one or more objects 9302.

In an embodiment, the plurality of slots **9403*c* are provided on the one or more objects 9302 corresponding to the location and position in which the one or more objects 9302 needs to be secured with the manipulator. In an exemplary embodiment, if the one or more objects 9302 needs to be positioned vertically [as shown in FIG. 200*a*], the plurality of slots 9403*c* may be provided along the length of a holder portion of the one or more objects 9302. Thus, ensure that the manipulator secures only the holder portion of the one or more objects 9302**.

In an embodiment, the solenoid assembly may be selected from at least one of pull-type solenoid actuator or a push-type solenoid actuator, as per design feasibility and requirement.

In an embodiment, the plurality of slots **9403*c* are located such that, manual operation of the one or more objects 9302** is not restricted.

In an embodiment, the calculations pertaining to the force generated by the solenoid coil **9404*b*** is mentioned below:

The DC solenoid's force and response time are both directly affected by Wattage. Since DC Wattage=Voltage×Current, increasing or decreasing either voltage or current (amperage) will increase or decrease force and response time.

However, increasing the current results in temperature rising and significantly lowering the magnetic force (similar effect to increasing a duty cycle.

The magnetic force is very low at the start of the stroke and much higher at the end of the stroke (as presented below in the examples of the solenoids' characteristics). For instance, at 50% duty cycle, the magnetic force could be 5-20 times lower at the stroke equal to 5 mm than the magnetic force at the end of the stroke [as shown in FIG. **202*a*-202*c***].

The solenoid's force is inversely proportional to the stroke (air gap "g") squared. When the air gap is doubled, the force will quarter.

According to the equation below, the DC solenoid's magnetic field decays with the square of distance. Therefore, the solenoid's force is not linear, and increasing from small at the beginning of the stroke to very high at the end of the stroke.

$$F = (N \cdot I)^2 \cdot 4\pi 10^{-7} \cdot \frac{A}{2g^2} \quad \text{(Eq. 3)}$$

where:

F=Solenoid's force in Newtons

I=Current in Amperes

N=Number of turns(wiring)

g=Stroke/Length of the air gap in meters

A=Area in square meters (m2)

4×PI×10−7=Magnetic constant

That means if current (I), area (A) and number of turns (N) are constant, then the force (F) is inversely proportional to the gap squared.

In an exemplary embodiment, for current (1=4 Ampers), number of turns (N=500) and the area (A=49 mm2=7 mm*7 mm) are constant. The table 1 on the right shows the results for different stokes/air gaps "g" (which in fact are the plunger 9404*c*'s positions). The force was calculated with the equation below:

$$F = (N \cdot I)^2 \cdot 4\pi 10^{-7} \cdot \frac{A}{2g^2} \quad \text{(Eq. 4)}$$

Figure 202A:
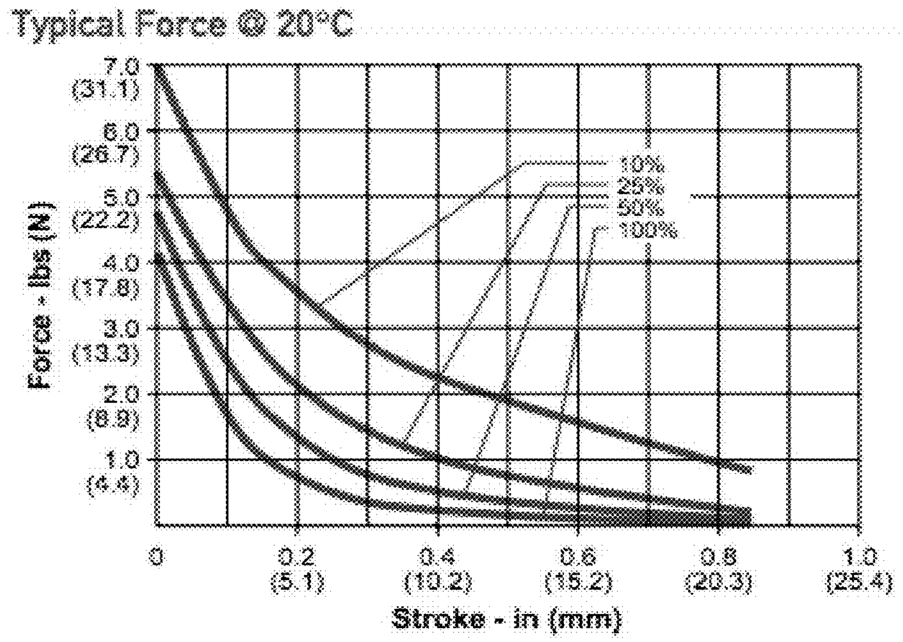
Figure 202B:
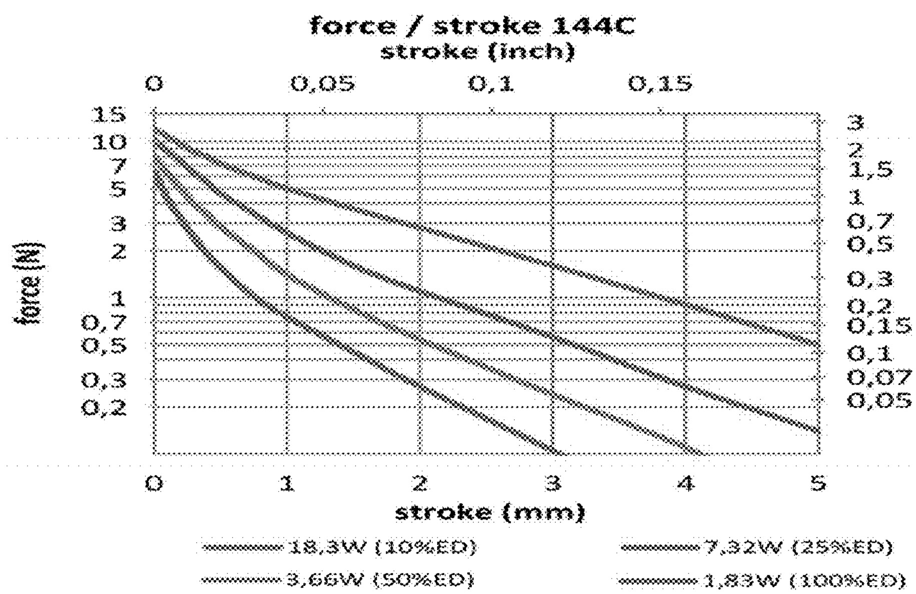
Figure 202C:
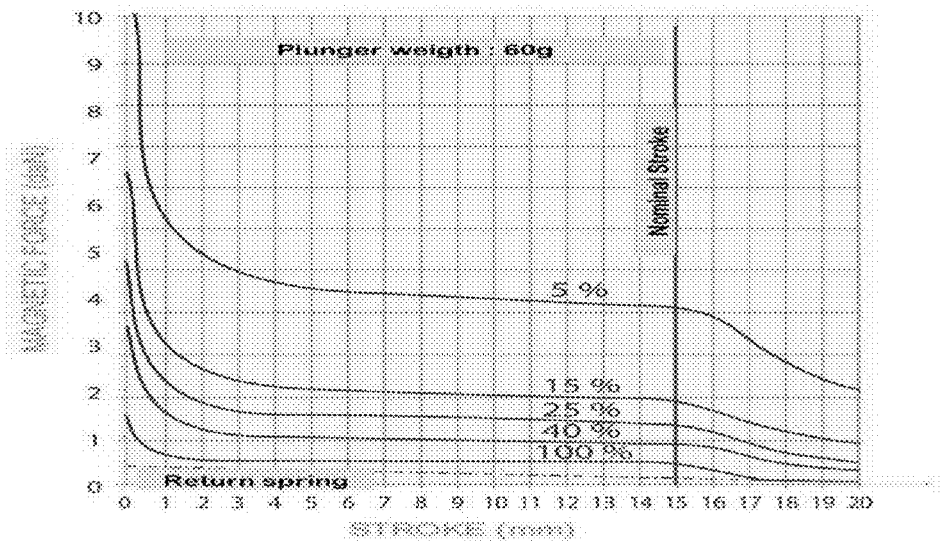
Figure 202D:
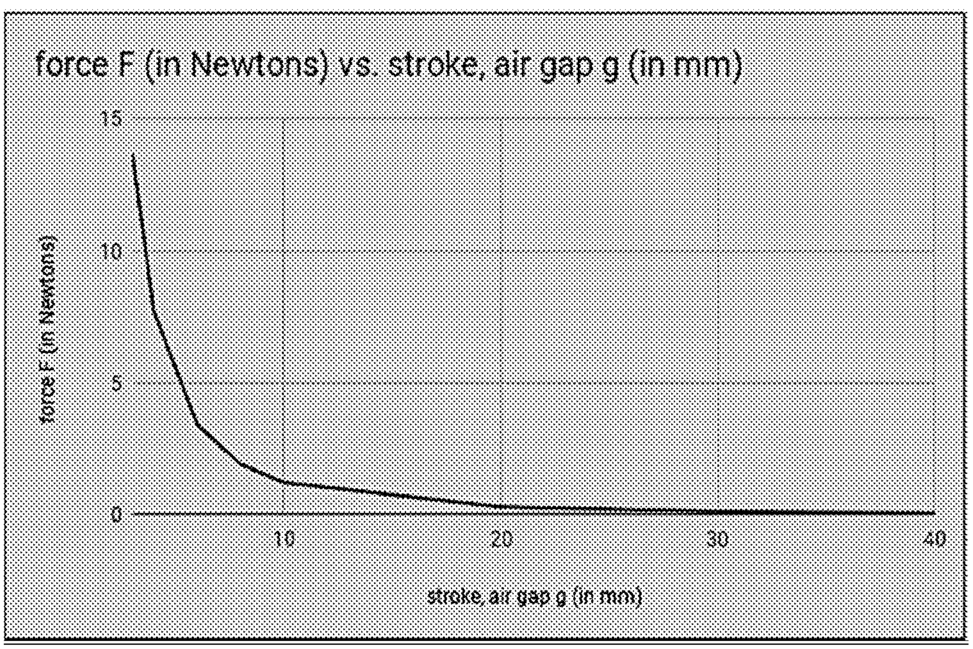

The force (F) quickly decreases when stroke increases. The force (F) is inversely proportional to the gap squared. It is displayed as a hyperbola in the force/stroke chart [as shown in FIG. 202*d*].

When the stroke is doubled, the force quarters:

10 mm stroke=>1.2 Newton force 20 mm stroke=>0.3 Newton force

The force is close to zero at the long stroke.

FIGS. 203*a*-203*e* in one exemplary embodiment of the present disclosure, illustrates a wall locking mechanism 9406 for the one or more objects 9302. The wall locking mechanism 9406 includes an opening 9406*a* for receiving the one or more objects 9302. The opening 9406*a* extends into a socket 9406*b*, which configured to retain a portion of a wall mount bracket 9407 fixed to the one or more objects 9302. Further, a stopper is provided to the opening 9406*a*, which extends parallel to the surface of the wall and is configured to lock the portion of the wall mount bracket 9407 into the socket 9406*b* [as shown in FIG. 203*d*].

In an embodiment, for storing the one or more objects 9302 the robotic system is adapted approach the wall locking mechanism 9406 and orient the one or more objects 9302 at a predetermined angle for inserting the wall mount bracket 9407 of the one or more objects 9302. At this stage, the robotic system tilts the one or more objects 9302 suitably, to lock the wall mount bracket 9407 into the opening 9406*a*.

In an embodiment, the opening 9406*a*, the socket 9406*b* and the stopper may be configured corresponding to the configuration of the wall mount bracket 9407 provisioned to the one or more brackets.

In an embodiment, the wall locking mechanism 9406 may be configured to directly receive and store the one or more objects 9302.

In an embodiment, a magnet may be provided in the socket 9406*b*, for providing extra locking force to the one or more objects 9302.

In an embodiment, the magnet may be provided to the wall mount bracket 9407 or may be directly mounted to the one or more objects 9302 for fixing onto the wall locking mechanism 9406.

In an embodiment, wall mount mechanism is defined in at least one of a kitchen environment, a structured environment or an un-structured environment.

FIG. 160 is a block diagram illustrating an example of a computer device, as shown in 4324, on which computer-executable instructions to perform the methodologies discussed herein may be installed and run. As alluded to above, the various computer-based devices discussed in connection with the present disclosure may share similar attributes. Each of the computer devices or computers 16 is capable of executing a set of instructions to cause the computer device to perform any one or more of the methodologies discussed herein. The computer devices 16 may represent any or the entire server, or any network intermediary devices. Further, while only a single machine is illustrated, the term "machine" shall also be taken to include any collection of machines that individually or jointly execute a set (or multiple sets) of instructions to perform any one or more of the methodologies discussed herein. The example computer system 4324 includes a processor 4326 (e.g., a central processing unit (CPU), a graphics processing unit (GPU), or both), a main memory 4328 and a static memory 30, which communicate with each other via a bus 4332. The computer system 4324 may further include a video display unit 34 (e.g., a liquid crystal display (LCD)). The computer system 4324 also includes an alphanumeric input device 4336 (e.g., a keyboard), a cursor control device 4338 (e.g., a mouse), a disk drive unit 4340, a signal generation device 4342 (e.g., a speaker), and a network interface device 3648.

The disk drive unit 4340 includes a machine-readable medium 244 on which is stored one or more sets of instructions (e.g., software 4346) embodying any one or more of the methodologies or functions described herein. The software 4346 may also reside, completely or at least partially, within the main memory 3644 and/or within the processor 4326 during execution thereof the computer system 4324, the main memory 4328, and the instruction-storing portions of processor 4326 constituting machine-readable media. The software 4346 may further be transmitted or received over a network 4350 via the network interface device 248.

While the machine-readable medium 3644 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present disclosure. The term "machine-readable medium" shall accordingly be taken to include, but not be limited to, solid-state memories, and optical and magnetic media.

In general, a robotic control platform comprises one or more robotic sensors; one or more robotic actuators; a mechanical robotic structure including at least a robotic head with mounted sensors on an articulated neck, two robotic arms with actuators and force sensors; an electronic library database, communicatively coupled to the mechanical robotic structure, of minimanipulations, each including a sequence of steps to achieve a predefined functional result, each step comprising a sensing operation or a parameterized actuator operation; and a robotic planning module, communicatively coupled to the mechanical robotic structure and the electronic library database, configured for combining a plurality of minimanipulations to achieve one or more domain-specific applications; a robotic interpreter module, communicatively coupled to the mechanical robotic structure and the electronic library database, configured for reading the minimanipulation steps from the minimanipulation library and converting to a machine code; and a robotic execution module, communicatively coupled to the mechanical robotic structure and the electronic library database, configured for executing the minimanipulation steps by the robotic platform to accomplish a functional result associated with the minimanipulation steps.

Another generalized aspect provides a humanoid having a robot computer controller operated by robot operating system (ROS) with robotic instructions comprises a database having a plurality of electronic minimanipulation libraries, each electronic minimanipulation library including a plurality of minimanipulation elements, the plurality of electronic minimanipulation libraries can be combined to create one or more machine executable application-specific instruction sets, the plurality of minimanipulation elements within an electronic minimanipulation library can be combined to create one or more machine executable application-specific instruction sets; a robotic structure having an upper body and a lower body connected to a head through an articulated neck, the upper body including torso, shoulder, arms and hands; and a control system, communicatively coupled to the database, a sensory system, a sensor data interpretation system, a motion planner, and actuators and associated controllers, the control system executing application-specific instruction sets to operate the robotic structure.

A further generalized computer-implemented method for operating a robotic structure through the use of one more controllers, one more sensors, and one more actuators to accomplish one or more tasks comprises providing a database having a plurality of electronic minimanipulation libraries, each electronic minimanipulation library including a plurality of minimanipulation elements, the plurality of electronic minimanipulation libraries can be combined to create one or more machine executable task-specific instruction sets, the plurality of minimanipulation elements within an electronic minimanipulation library can be combined to create one or more machine executable task-specific instruction sets; executing task-specific instruction sets to cause the robotic structure to perform a commanded task, the robotic structure having an upper body connected to a head through an articulated neck, the upper body including torso, shoulder, arms and hands; sending time-indexed high-level commands for position, velocity, force, and torque to the one or more physical portions of the robotic structure; and receiving sensory data from one or more sensors for factoring with the time-indexed high-level commands to generate low-level commands to control the one or more physical portions of the robotic structure.

Another generalized computer-implemented method for generating and executing a robotic task of a robot comprises generating a plurality minimanipulations in combination with parametric minimanipulation (MM) data sets, each minimanipulation being associated with at least one particular parametric MM data set which defines the required constants, variables and time-sequence profile associated with each minimanipulation; generating a database having a plurality of electronic minimanipulation libraries, the plurality of electronic minimanipulation libraries having MM data sets, MM command sequencing, one or more control libraries, one or more machine-vision libraries, and one or more inter-process communication libraries; executing high-level robotic instructions by a high-level controller for performing a specific robotic task by selecting, grouping and organizing the plurality of electronic minimanipulation libraries from the database thereby generating a task-specific command instruction set, the executing step including decomposing high-level command sequences, associated with the task-specific command instruction set, into one more individual machine-executable command sequences for each actuator of a robot; and executing low-level robotic instructions, by a low-level controller, for executing individual machine-executable command sequences for each actuator of a robot, the individual machine-executable command sequences collectively operating the actuators on the robot to carry out the specific robot task.

A generalized computer-implemented method for controlling a robotic apparatus, comprises composing one or more minimanipulation behavior data, each minimanipulation behavior data including one or more elementary minimanipulation primitives for building one or more ever-more complex behaviors, each minimanipulation behavior data having a correlated functional result and associated calibration variables for describing and controlling each minimanipulation behavior data; linking one or more behavior data to a physical environment data from one or more databases to generate a linked minimanipulation data, the physical environment data including physical system data, controller data to effect robotic movements, and sensory data for monitoring and controlling the robotic apparatus 75; and converting the linked minimanipulation (high-level) data from the one or more databases to a machine-executable (low-level) instruction code for each actuator ($A_1$ thru $A_n$) controller for each time-period ($t_1$ thru $t_m$) to send commands to the robot apparatus for executing one or more commanded instructions in a continuous set of nested loops.

In any of these aspects, the following may be considered. The preparation of the product normally uses ingredients. Executing the instructions typically includes sensing properties of the ingredients used in preparing the product. The product may be a food dish in accordance with a (food) recipe (which may be held in an electronic description) and the person may be a chef. The working equipment may comprise kitchen equipment. These methods may be used in combination with any one or more of the other features described herein. One, more than one, or all of the features of the aspects may be combined, so a feature from one aspect may be combined with another aspect for example. Each aspect may be computer-implemented and there may be provided a computer program configured to perform each method when operated by a computer or processor. Each computer program may be stored on a computer-readable medium. Additionally or alternatively, the programs may be partially or fully hardware-implemented. The aspects may be combined. There may also be provided a robotics system configured to operate in accordance with the method described in respect of any of these aspects.

In another aspect, there may be provided a robotics system, comprising: a multi-modal sensing system capable of observing human motions and generating human motions data in a first instrumented environment; and a processor (which may be a computer), communicatively coupled to the multi-modal sensing system, for recording the human motions data received from the multi-modal sensing system and processing the human motions data to extract motion primitives, preferably such that the motion primitives define operations of a robotics system. The motion primitives may be minimanipulations, as described herein (for example in the immediately preceding paragraphs) and may have a standard format. The motion primitive may define specific types of action and parameters of the type of action, for example a pulling action with a defined starting point, end point, force and grip type. Optionally, there may be further provided a robotics apparatus, communicatively coupled to the processor and/or multi-modal sensing system. The robotics apparatus may be capable of using the motion primitives and/or the human motions data to replicate the observed human motions in a second instrumented environment.

In a further aspect, there may provided a robotics system, comprising: a processor (which may be a computer), for receiving motion primitives defining operations of a robotics system, the motion primitives being based on human motions data captured from human motions; and a robotics system, communicatively coupled to the processor, capable of using the motion primitives to replicate human motions in an instrumented environment. It will be understood that these aspects may be further combined.

A further aspect may be found in a robotics system comprising: first and second robotic arms; first and second robotic hands, each hand having a wrist coupled to a respective arm, each hand having a palm and multiple articulated fingers, each articulated finger on the respective hand having at least one sensor; and first and second gloves, each glove covering the respective hand having a plurality of embedded sensors. Preferably, the robotics system is a robotic kitchen system.

There may further be provided, in a different but related aspect, a motion capture system, comprising: a standardized working environment module, preferably a kitchen; plurality of multi-modal sensors having a first type of sensors configured to be physically coupled to a human and a second type of sensors configured to be spaced away from the human. One or more of the following may be the case: the first type of sensors may be for measuring the posture of human appendages and sensing motion data of the human appendages; the second type of sensors may be for determining a spatial registration of the three-dimensional configurations of one or more of the environment, objects, movements, and locations of human appendages; the second type of sensors may be configured to sense activity data; the standardized working environment may have connectors to interface with the second type of sensors; the first type of sensors and the second type of sensors measure motion data and activity data, and send both the motion data and the activity data to a computer for storage and processing for product (such as food) preparation.

An aspect may additionally or alternatively be considered in a robotic hand coated with a sensing gloves, comprising: five fingers; and a palm connected to the five fingers, the palm having internal joints and a deformable surface material in three regions; a first deformable region disposed on a radial side of the palm and near the base of the thumb; a second deformable region disposed on a ulnar side of the palm, and spaced apart from the radial side; and a third deformable region disposed on the palm and extend across the base of the fingers. Preferably, the combination of the first deformable region, the second deformable region, the third deformable region, and the internal joints collectively operate to perform a mini manipulation, particularly for food preparation.

A multi-level robotic system for high speed and high fidelity manipulation operations segmented into two physical and logical subsystems made up of instrumented, articulated and controller-actuated subsystems, each comprising a larger- and coarser-motion macro-manipulation system responsible for operations in larger unconstrained environment workspaces at a reduced endpoint accuracy, and a smaller- and finer-motion micro-manipulation system responsible for operations in a smaller workspace and while interacting with tooling and the environment at a higher endpoint motion accuracy, each carrying out mini-manipulation trajectory-following tasks based on mini-manipulation commands provided through a dual-level database specific to the macro-manipulation and micro-manipulation subsystems, each supported by a dedicated and separate distributed processor and sensor architecture operating under an overall real-time operating system communicating with all subsystems over multiple bus interfaces specific to sensor, command and database-elements. The robotic system of the present disclosure pertains to where the macro-manipulation subsystem contains its dedicated sensors, actuators and processors interconnected over one or more dedicated interface buses, including a sensor suite used for perceiving the surrounding environment, which includes imaging and mapping the same and modeling elements within the environment and identifying said elements, performing macro-manipulation subsystem relevant motion planning in one or more of Joint- and/or Cartesian-space based on mini-manipulation commands provided by a dedicated macro-level mini-manipulation library, executing said commands through position or velocity or joint or force based control at the joint-actuator level, and providing sensory data back to the macro-manipulation control and perception subsystems, while also monitoring all processes to allow for learning algorithms to provide improvements to the mini-manipulation macro-level command-library to improve future performance based on criteria such as execution-time, energy-expended, collision-avoidance, singularity-avoidance and workspace-reachability. The robotic system of the present disclosure pertains to wherein the micro-manipulation subsystem contains its dedicated sensors, actuators and processors interconnected over one or more dedicated interface buses, including a sensor suite used for perceiving the immediate environment, which includes imaging and mapping the same and modeling elements within the environment and identifying said elements, particularly as it relates to interaction variables between the micro-manipulation system and associated tools during contact with the environment itself, performing micro-manipulation subsystem relevant motion planning in one or more of joint- and/or Cartesian-space based on mini-manipulation commands provided by a dedicated micro-level mini-manipulation library, executing said commands through position or velocity or joint or force based control at the joint-actuator level, and providing sensory data back to the micro-manipulation control and perception subsystems, while also monitoring all processes to allow for learning algorithms to provide improvements to the mini-manipulation micro-level command-library to improve future performance based on criteria such as execution-time, energy-expended, collision-avoidance, singularity-avoidance and workspace-reachability.

A robotic cooking system configured into at least a dual-layer physical and logical macro-manipulation and micro-manipulation system capable of independent and coordinated task-motions by way of instrumented, articulated and controller-actuated subsystems, where the macro-manipulation system is used for coarse positioning of the entire robot assembly in free space using its own dedicated sensing-, positioning and motion execution subsystems, with a thereto attached one or more respective micro-manipulation subsystems for local sensing, fine-positioning and motion execution of the endeffectors interacting with the environment, with both of the macro- and micro-manipulation system each configured with their own separate and dedicated buses for sensing, data-communication and control of associated actuators with their associated processors, with each of the macro- and micro-manipulation system receiving motion and behavior commands based on separate mini-manipulation commands from their dedicated planners, with each planner receiving coordinated time- and process-progress dependent mini-manipulation commands from a central planner. The system pertains to the macro-manipulation system comprising a large workspace translational Cartesian—space positioner with an attached body system made up of a sensor-head connected to a shoulder and torso with one or more articulated multi-jointed manipulator arms each with a thereto attached wrist capable of positioning one or more of the micro-manipulation subsystems via dedicated sensors and actuators interfaced through at least one or more dedicated controllers. The system relates to the mini-manipulation system comprising of at least one thereto attached palm and dexterous multi-fingered end-of-arm endeffector for handling utensils and tools, as well as any vessel needed in any stages of dish preparation cooking, via dedicated sensors and actuators interfaced through at least one or more controllers. The system relates to where a set of legs or wheels is attached to a waist attached to the macro-manipulation system for larger workspace movements. The system provides sensor feedback data to a world perception and modeling system responsible for perceiving the macro-manipulation subsystem free-space environment as well as the entire robotic system pose. The system provides the world perception feedback and model data over one or more dedicated interface buses to a dedicated macro-manipulation planning, execution and tracking module operating on one or more stand-alone and separate processors. The planning system pertains to macro-manipulation motion commands provided to it from a separate stand-alone task-decomposition and planning module. The system provides sensor feedback data to a world perception and modeling system responsible for perceiving the micro-manipulation subsystem free-space environment as well as the entire robotic system pose. The system provides the world perception feedback and model data over one or more dedicated interface buses to a dedicated micro-manipulation planning, execution and tracking module operating on one or more stand-alone and separate processors.

The planning system provides micro-manipulation motion commands provided to it from a separate stand-alone task-decomposition and planning module.

A planning system generates mini-manipulation command-stack sequence that is configured to perform planning actions for the entire robot system combining and coordinating separately planned mini-manipulations from the macro- and micro-planners, where the macro-manipulation planner plans and generates time- and process-progress dependent mini-manipulations for the macro-manipulation subsystem, where the micro-manipulation planner plans and generates time- and process-progress dependent mini-manipulations for the micro-manipulation subsystem. Each of the subsystem planners from claim 14, comprising a task-progress tracking module, a mini-manipulation planning module, and a mini-manipulation database for macro-manipulation tasks. The task-progress tracking module includes progress comparator module that tracks differences between commanded and actual task progress, model and environment data as well as product and process model data combined with all relevant sensor feedback data, and a learning module that creates and tracks variations that impact deviations in the descriptors of said mini-manipulations for potential future upgrades to the respective database. The mini-manipulation planning system module generates mini-manipulation commands based on a set of steps that use mini-manipulation commands from a database which subsequently get evaluated for applicability, resolved for application to individual movable components, combined in space for a smooth motion profile, and optimized for optimum timing and subsequently translated into a machine-readable set of mini-manipulation commands configured into a command-stack sequence.

A method for generating mini-manipulation commands for one or both the macro-manipulation or micro-manipulation subsystems, through a process of receiving a high-level task-execution command, comprises selecting from an action-primitive repository, a set of alternative action primitives that are evaluated and selected to achieve the commanded task based on a set of pre-determined criteria of importance to the application which describe the required entry boundary conditions as well as the minimum necessary exit boundary conditions defining a successful task-completion state at its start and its completion. The method of mini-manipulation command generation for one or both the macro- or micro-manipulation subsystems, comprises receiving a high-level task execution command, identifying individual subtasks which will be mapped to the applicable robotic subsystems, generation of individual performance criteria and measurable success end-state criteria for each of the above subtasks, selection of one or more in either a stand-alone or combination, of the most suitable action primitive candidates, evaluation of these action primitive alternatives for maximizing or minimizing such measures as execution-time, energy expended, robot reachability, collision avoidance or any other task-critical criteria, generation of either or both macro- and/or micro-manipulation subsystem trajectories in one or more motion spaces, including joint- and Cartesian-space, synchronizing said trajectories for path consecutiveness, path-segment smoothness, intra-segment time-stamp synchronization and coordination amongst multi-arm robot subsystems, and generating a machine-executable command-sequence stack for one or both the macro- and/or micro manipulation subsystems. The method includes the step of receiving mini-manipulation descriptor updates generated during the mini-manipulation progress tracking and performance learning process, involving extracting relevant constants and variables related to specific mini-manipulations and their associated action primitives, assigning variances for each variable and constant for each affected action primitive, and providing the updates back to the action-primitive repository to allow each of the updates to be logged and implemented within said repository or database.

In respect of any of the above system, device or apparatus aspects there may further be provided method aspects comprising steps to carry out the functionality of the system. Additionally or alternatively, optional features may be found based on any one or more of the features described herein with respect to other aspects.

The present disclosure has been described in particular detail with respect to possible embodiments. Those skilled in the art will appreciate that the disclosure may be practiced in other embodiments. The particular naming of the components, capitalization of terms, the attributes, data structures, or any other programming or structural aspect is not mandatory or significant, and the mechanisms that implement the disclosure or its features may have different names, formats, or protocols. The system may be implemented via a combination of hardware and software, as described, or entirely in hardware elements, or entirely in software elements. The particular division of functionality between the various systems components described herein is merely example and not mandatory; functions performed by a single system component may instead be performed by multiple components, and functions performed by multiple components may instead be performed by a single component.

In various embodiments, the present disclosure can be implemented as a system or a method for performing the above-described techniques, either singly or in any combination. The combination of any specific features described herein is also provided, even if that combination is not explicitly described. In another embodiment, the present disclosure can be implemented as a computer program product comprising a computer-readable storage medium and computer program code, encoded on the medium, for causing a processor in a computing device or other electronic device to perform the above-described techniques.

As used herein, any reference to “one embodiment” or to “an embodiment” means that a particular feature, structure, or characteristic described in connection with the embodiments is included in at least one embodiment of the disclosure. The appearances of the phrase “in one embodiment” in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to convey most effectively the substance of their work to others skilled in the art. An algorithm is generally perceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like.

Furthermore, it is also convenient at times to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that, throughout the description, discussions utilizing terms such as “processing” or “computing” or “calculating” or “displaying” or “determining” or the like refer to the action and processes of a computer system, or similar electronic computing module and/or device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, and/or hardware, and, when embodied in software, it can be downloaded to reside on, and operated from, different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs, in accordance with the teachings herein, or the systems may prove convenient to construct more specialized apparatus needed to perform the required method steps. The required structure for a variety of these systems will be apparent from the description provided herein. In addition, the present disclosure is not described with reference to any particular programming language. It will be appreciated that a variety of programming languages may be used to implement the teachings of the present disclosure as described herein, and any references above to specific languages are provided for disclosure of enablement and best mode of the present disclosure.

In various embodiments, the present disclosure can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the disclosure include a mobile phone, personal digital assistant, smartphone, kiosk, desktop computer, laptop computer, consumer electronic device, television, set-top box, or the like. An electronic device for implementing the present disclosure may use an operating system such as, for example, iOS available from Apple Inc. of Cupertino, Calif., Android available from Google Inc. of Mountain View, Calif., Microsoft Windows 7 available from Microsoft Corporation of Redmond, Wash., webOS available from Palm, Inc. of Sunnyvale, Calif., or any other operating system that is adapted for use on the device. In some embodiments, the electronic device for implementing the present disclosure includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one as or more than one. The term "plurality," as used herein, is defined as two or as more than two. The term "another," as used herein, is defined as at least a second or more.

An ordinary artisan should require no additional explanation in developing the methods and systems described herein but may find some possibly helpful guidance in the preparation of these methods and systems by examining standardized reference works in the relevant art.

While the disclosure has been described with respect to a limited number of embodiments, those skilled in the art, having benefit of the above description, will appreciate that other embodiments may be devised which do not depart from the scope of the present disclosure as described herein. It should be noted that the language used in the specification has been principally selected for readability and instructional purposes, and may not have been selected to delineate or circumscribe the inventive subject matter. The terms used should not be construed to limit the disclosure to the specific embodiments disclosed in the specification and the claims, but the terms should be construed to include all methods and systems that operate under the claims set forth herein below. Accordingly, the disclosure is not limited by the disclosure, but instead its scope is to be determined entirely by the following claims.

What is claimed and desired to be secured by Letters Patent of the United States is:

1. A method for operating a robotic system, the robotic system having one or more robotic arms coupled to one or more robotic end effectors, comprising:

receiving, by one or more processors in a robotic system, environment data corresponding to a current environment, from one or more sensors;

detecting, by the one or more processors, one or more objects in the current environment; and retrieving, by the one or more processors, one or more interaction data corresponding to each of the one or more objects from a memory associated with the robotic system;

executing, by the one or more processors, one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein identifying the virtual markers using the CNN technique comprises executing a CNN model corresponding to the target object from one or more libraries stored in the memory associated with the robotic system; and detecting positions on the target object for positioning the virtual markers using the CNN model.

2. The method as claimed in claim 1, wherein determining the type of the current environment includes:

transmitting, by the one or more processors, the environment data to a remote storage associated with the robotic system, wherein the remote storage comprises a library of environment candidates; and receiving, by the one or more processors, the type of the current environment determined based on the environment data, from among the library of environment candidates.

3. The method as claimed in claim 2, wherein the environment data includes position data and image data of the current environment.

4. The method as claimed in claim 3, wherein the position data and the image data are obtained from one or more sensors, wherein the one or more sensors comprises at least one of a navigation system and one or more image capturing devices.

5. The method as claimed in claim 1, wherein detecting the one or more objects is based on at least one of the type of the current environment, the environment data corresponding to the current environment, and object data.

6. The method as claimed in claim 5, wherein the one or more objects are detected from a plurality of objects associated with the type of the current environment, wherein the plurality of objects are retrieved from a remote storage associated with the robotic system.

7. The method as claimed in claim 5, wherein the object data is collected by the one or more sensors comprising image capturing devices.

8. The method as claimed in claim 1, wherein detecting the one or more objects and the type of the one or more objects further comprises analysing features of the one or more objects, wherein the features comprises at least one of shape, size, texture, color, state, material and pose of the one or more objects.

9. The method as claimed in claim 8, wherein analysing the features of the one or more objects further comprises detecting one or more markers disposed on each of the one or more objects.

10. The method as claimed in claim 1, wherein the one or more interactions identified for each of the one or more objects based on the type of objects and the type of the current environment indicates the one or more interactions to be performed by the respective object or on the respective object within the current environment.

11. The method as claimed in claim 1, wherein the interaction data of each of the one or more interactions comprises a sequence of motions to be performed by or on the one or more objects and one or more predetermined standard positions of one or more end effectors, configured to interact with the one or more objects, relative to the corresponding one or more objects.

12. The method as claimed in claim 1, wherein positioning one or more end effectors at an optimal standard position using the object template matching technique comprises:

retrieving, by the one or more processors, an object template of a target object from a remote storage associated with the robotic system, wherein the target object is an object currently being subjected to one or more interactions, wherein the object template comprises at least one of shape, color, surface and material characteristics of the target object;

positioning, by the one or more processors, the one or more end effectors to a first position proximal to the target object;

receiving, by the one or more processors, one or more images, in real-time, of the target object from at least one image capturing device associated with the one or more end effectors, wherein the one or more images are captured by at least one image capturing device when the one or more end effectors are at the first position;

comparing, by the one or more processors, the object template of the target object with the one or more images of the target object; and performing, by the one or more processors, at least one of:

adjusting position of the one or more end effectors towards the optimal standard position based on position of the one or more end effectors in previous iteration and reiterating the steps of receiving and comparing, when the comparison results in mismatch; or inferring that the one or more end effectors reached the optimal standard position when the comparison results in a match and executing, using the one or more end effectors, one or more interactions on the target object from the optimal standard position.

13. The method as claimed in claim 1, wherein the one or more markers associated with the target object are physical markers when the target object is a standard object and the one or more markers associated with the target object are virtual markers when the target object is a non-standard object.

14. The method as claimed in claim 1, wherein the one or more markers include the physical marker disposed on the target object, wherein the physical marker is a triangle-shaped marker, and wherein adjusting position of the one or more end effectors comprises:

moving, by the one or more processors, the one or more end effectors towards the triangle-shaped marker until at least one side of the triangle-shaped marker has a preferred length;

rotating, by the one or more processors, the one or more end effectors until a bottom vertex of the triangle-shaped marker is disposed in a bottom position of the real-time image of the target object;

shifting, by the one or more processors, the one or more end effectors along an x-axis or y-axis of the real-time image of the target object until a center of the triangle-shaped marker is in a center position of the real-time image of the target object; and adjusting, by the one or more processors, a slope of the one or more end effectors until each angle of the triangle-shaped marker are at least one of equal to approximately 60 degrees or equal to a predetermined maximum difference between the angles that is smaller than their difference prior to initiating the adjustment of the position of the one or more end effectors, wherein achieving at least one of the two conditions mentioned above, indicates that the one or more end effectors reached the optimal standard position.

15. The method as claimed in claim 1, wherein the one or more markers include the physical marker disposed on the target object, wherein the physical marker is a chessboard-shaped marker, and wherein adjusting position of the one or more end effectors comprises:

calibrating, by the one or more processors, each image capturing device associated with the one or more end effectors using the chessboard-shaped marker, wherein the calibration comprises estimating at least one of focus length, principal point and distortion coefficients of each image capturing device with respect to the chessboard-shaped marker;

identifying, by the one or more processors, in real-time, images of the target object and image co-ordinates of corners of square slots in the chessboard-shaped marker;

assigning, by the one or more processors, real-world coordinates to each internal corner among the corners of the square slots in the real-time image based on the image co-ordinates; and determining, by the one or more processors, position of the one or more end effectors based on the calibration, image co-ordinates and the real-time co-ordinates with respect to the chessboard-shaped marker, wherein the steps of calibrating, identifying, assigning and determining are repeated until the position of the one or more end effectors is equal to the optimal standard position.

16. The method as claimed in claim 1, wherein placing the virtual markers using shape analysis technique comprises:

receiving, by the one or more processors, real-time images of the target object from at least one image capturing device associated one or more manipulating devices;

determining, by the one or more processors, shape of the target object and longest and shortest sides of the target object, wherein sides of the target object are determined as longest and shortest with reference to length of each side of the target object;

determining, by the one or more processors, geometric center of the target object based on the shape of the target object and, the longest and the shortest sides of the target object; and projecting, by the one or more processors, an equilateral triangle on the target object, wherein each side of the equilateral triangle is equal to half of the shortest side of the target object;

the equilateral triangle is oriented along the longest side of the target object; and geometric center of the equilateral triangle is coinciding with the geometric center of the target object; and placing, by the one or more processors, the virtual markers at each vertex of the equilateral triangle.

17. The method as claimed in claim 1, wherein placing the virtual markers using particle filtering technique comprises:

retrieving, by the one or more processors, one or more predetermined values corresponding to predetermined positions of the target object from a remote storage associated with the robotic system;

receiving, by the one or more processors, real-time images of the target object from at least one image capturing device associated with one or more manipulating devices;

generating, by the one or more processors, special points within boundaries of the target object using the real-time images;

determining, by the one or more processors, an estimated value for combination of visual features in neighborhood of each special point, wherein the visual features comprises at least one of histograms of gradients, spatial color distributions and texture features;

comparing, by the one or more processors, each estimated value with each of the one or more predetermined values to identify respective proximal match; and placing, by the one or more processors, the virtual markers at each position on the target object corresponding to each proximal match.

18. The method as claimed in claim 1, wherein the executing the one or more interactions further includes, for each of the one or more interactions, validating a result of the respective interaction after executing the sequence of motions on the respective object.

19. The method as claimed in claim 18, wherein validating the result of the respective interaction comprises:

receiving, by the one or more processors, feature data of the respective object after the execution of the sequence of the motions thereon, wherein the captured feature data of the respective object includes an image of the respective object at an actual state after the executing of the sequence of the motions; and comparing, by the one or more processors, the captured feature data with success case data of the respective interaction, wherein the success case data is retrieved from a remote storage associated with the robotic system.

20. The method as claimed in claim 19, wherein the success case data includes an image of the respective object at an expected success state after the execution of the sequence of the motions.

21. A robotic system, comprising:

one or more hardware processors operable to:

receive environment data corresponding to a current environment: from one or more sensors configured in the robotic system;

detect one or more objects in the current environment;

retrieve interaction data corresponding to the one or more objects from a memory associated with the robotic system; and execute one or more interactions on one or more corresponding objects in the one or more objects, based on the interaction data, wherein executing at least one of the one or more interactions on the one or more corresponding objects in the one or more objects comprises for each or the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein identifying the virtual markers using the CNN technique comprises executing a CNN model corresponding to the target object from one or more libraries stored in the memory associated with the robotic system; and detecting positions on the target object for positioning the virtual markers using the CNN model.

22. The robotic system as claimed in claim 21, wherein the one or more processors determines the type of the current environment by:

transmitting the environment data to a remote storage associated with the robotic systems, wherein the remote storage comprises a library of environment candidates; and receiving the type of the current environment determined based on the environment data, from among the library of environment candidates.

23. The robotic system as claimed in claim 22, wherein the environment data includes position data and image data of the current environment.

24. The robotic system as claimed in claim 23, wherein the one or more processors obtain the position data and the image data from one or more sensors, wherein the one or more sensors comprises at least one of a navigation system and one or more image capturing devices.

25. The robotic system as claimed in claim 21, wherein the one or more processors detect the one or more objects based on at least one of the type of the current environment, the environment data corresponding to the current environment, and object data.

26. The robotic system as claimed in claim 25, wherein the one or more processors detect the one or more objects from a plurality of objects associated with the type of the current environment, wherein the plurality of objects are retrieved from a remote storage associated with the robotic system.

27. The robotic system as claimed in claim 25, wherein the one or more processors collect the object data by the one or more sensors comprising image capturing devices.

28. The robotic system as claimed in claim 21, wherein the one or more processors detect the one or more objects and the type of the one or more objects by analyzing features of the one or more objects, wherein the features comprises at least one of shape, size, texture, color, state, material and pose of the one or more objects.

29. The robotic system as claimed in claim 28, wherein the one or more processors analyze the features of the one or more objects by detecting one or more markers disposed on each of the one or more objects.

30. The robotic system as claimed in claim 21, wherein the one or more interactions identified for each of the one or more objects based on the type of objects and the type of the current environment indicates the one or more interactions to be performed by the respective object or on the respective object within the current environment.

31. The robotic system as claimed in claim 21, wherein the interaction data of each of the one or more interactions comprises a sequence of motions to be performed by or on the one or more objects and one or more optimal standard positions of one or more end effectors, configured to interact with the one or more objects, relative to the corresponding one or more objects.

32. The robotic system as claimed in claim 21, wherein the one or more processors position one or more end effectors at an optimal standard position using the object template matching technique by:

retrieving an object template of a target object from a remote storage associated with the robotic systems, wherein the target object is an object currently being subjected to one or more interactions, wherein the object template comprises at least one of shape, color, surface and material characteristics of the target object;

positioning the one or more end effectors to a first position proximal to the target object;

receiving one or more images, in real-time, of the target object from at least one of image capturing devices associated with the one or more end effectors, wherein the one or more images are captured by at least one of the image capturing devices when the one or more end effectors are at the first position;

comparing the object template of the target object with the one or more images of the target object; and performing at least one of:

adjusting position of the one or more end effectors towards the optimal standard position based on position of the one or more end effectors in previous iteration and reiterating the steps of receiving and comparing, when the comparison results in mismatch; or inferring that the one or more end effectors reached the optimal standard position when the comparison results in a match and executing, using the one or more end effectors, one or more interactions on the target object from the optimal standard position.

33. The robotic system as claimed in claim 21, wherein the one or more markers include the physical marker disposed on the target object, wherein the physical marker is a triangle-shaped marker, and wherein the one or more processors adjust position of the one or more end effectors by:

moving the one or more end effectors towards the triangle-shaped marker until at least one side of the triangle-shaped marker has a preferred length;

rotating the one or more end effectors until a bottom vertex of the triangle-shaped marker is disposed in a bottom position of the real-time image of the target object;

shifting the one or more end effectors along an X-axis or y-axis of the real-time image of the target object until a center of the triangle-shaped marker is in a center position of the real-time image of the target object; and adjusting a slope of the one or more end effectors until each angle of the triangle-shaped marker are at least one of equal to approximately 60 degrees or equal to a predetermined maximum difference between the angles that is smaller than their difference prior to initiating the adjustment of the position of the one or more end effectors, wherein achieving at least one of the two conditions mentioned above, indicates that the one or more end effectors reached the optimal standard position.

34. The robotic system as claimed in claim 21, wherein the one or more markers include the physical marker disposed on the target object, wherein the physical marker is a chessboard-shaped marker, and wherein the one or more processors adjusts position of the one or more end effectors by:

Calibrating each image capturing device associated with the one or more end effectors using the chessboard-shaped marker, wherein the calibration comprises estimating at least one of focus length, principal point and distortion coefficients of each image capturing device with respect to the chessboard-shaped marker;

identifying in real-time images of the target object and image co-ordinates of corners of square slots in the chessboard-shaped marker;

assigning real-world coordinates to each internal corner among the corners of the square slots in the real-time image based on the image co-ordinates; and determining position of the one or more end effectors based on the calibration, image co-ordinates and the real-time co-ordinates with respect to the chessboard-shaped marker, wherein the steps of calibrating, identifying, assigning and determining are repeated until the position of the one or more end effectors is equal to the optimal standard position.

35. The robotic system as claimed in claim 21, wherein the one or more processors place the virtual markers using shape analysis technique by:

receiving real-time images of a target object from at least one image capturing device associated with one or more manipulating devices;

determining shape of the target object and longest and shortest sides of the target object, wherein sides of the target object are determined as longest and shortest with reference to length of each side of the target object;

determining geometric center of the target object based on the shape of the target object and, the longest and the shortest sides of the target object; and projecting an equilateral triangle on the target object, wherein each side of the equilateral triangle is equal to half of the shortest side of the target object;

the equilateral triangle is oriented along the longest side of the target object; and geometric center of the equilateral triangle is coinciding with the geometric center of the target object; and placing the virtual markers at each vertex of the equilateral triangle.

36. The robotic system as claimed in claim 21, wherein the one or more processors place the virtual markers using particle filtering technique by:

retrieving one or more predetermined values corresponding to predetermined positions of the target object from a remote storage associated with the robotic system;

receiving real-time images of the target object from at least one image capturing device associated with one or more manipulating devices;

generating special points within boundaries of the target object using the real-time images;

determining an estimated value for combination of visual features in neighborhood of each special point, wherein the visual features comprises at least one of histograms of gradients, spatial color distributions and texture features;

comparing each estimated value with each of the one or more predetermined values to identify respective proximal match; and placing the virtual markers at each position on the target object corresponding to each proximal match.

37. The robotic system as claimed in claim 21, wherein the one or more processors executes the one or more interactions by validating a result of the respective interaction after executing the sequence of motions on the respective object.

38. The robotic system as claimed in claim 37, wherein the one or more processors validates the result of the respective interaction by:

receiving feature data of the respective object after the executing of the sequence of the motions thereon, wherein the captured feature data of the respective object includes an image of the respective object at an actual state after the executing of the sequence of the motions; and comparing the captured feature data with success case data of the respective interaction, wherein the success case data is retrieved from a remote storage associated with the robotic system.

39. The robotic system as claimed in claim 38, wherein the success case data includes an image of the respective object at an expected success state after the execution of the sequence of the motions.

40. A method for operating a robotic system, the robotic system having one or more robotic arms coupled to one or more robotic end effectors, comprising:

receiving, by one or more processors in a robotic system, environment data corresponding to a current environment, from one or more sensors;

detecting, by the one or more processors, one or more objects in the current environment; and retrieving, by the one or more processors, one or more interaction data corresponding to each of the one or more objects from a memory associated with the robotic system;

executing, by the one or more processors, one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein identifying the virtual markers using shape analysis technique comprises:

receiving real-time images of the target object from at least one image capturing device associated one or more end effectors;

determining shape of the target object and longest and shortest sides of the target object, wherein sides of the target object are determined as longest and shortest with reference to length of each side of the target object;

determining geometric center of the target object based on the shape of the target object and, the longest and the shortest sides of the target object; and positioning a geometric shape on the target object, each side of the geometric shape is equal to half of the shortest side of the target object; the geometric shape oriented along the longest side of the target object; and the geometric shape having a geometric center that coincides with a geometric center of the target object; and positioning by the virtual markers at each vertex of the geometric shape.

41. A method for operating a robotic system, the robotic system having one or more robotic arms coupled to one or more robotic end effectors, comprising:

receiving, by one or more processors in a robotic system, environment data corresponding to a current environment, from one or more sensors;

detecting, by the one or more processors, one or more objects in the current environment; and retrieving, by the one or more processors, one or more interaction data corresponding to each of the one or more objects from a memory associated with the robotic system;

executing, by the one or more processors, one or more interactions on one or more corresponding objects in the one or more objects, based on the interaction data, wherein executing at least one of the one or more interactions on the one or more corresponding objects in the one or more objects comprises for each of the one or more interactions:

positioning the one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein positioning the virtual markers using particle filtering technique comprises:

retrieving one or more predetermined values corresponding to predetermined positions of the target object from a memory associated with the robotic system;

receiving real-time images of the target object from at least one image capturing device associated with the one or more end effectors;

generating one or more points within boundaries of the target object using the real-time images;

determining an estimated value for combination of visual features in neighborhood of each point, wherein the visual features comprises at least one of histograms of gradients, spatial color distributions or texture features;

comparing each estimated value with each of the one or more predetermined values to identify respective proximal match; and positioning the virtual markers at each position on the target object corresponding to each proximal match.

42. A method for operating a robotic system, the robotic system having one or more robotic arms coupled to one or more robotic end effectors, comprising:

receiving, by one or more processors in a robotic system, environment data corresponding to a current environment, from one or more sensors;

detecting, by the one or more processors, one or more objects in the current environment; and retrieving, by the one or more processors, one or more interaction data corresponding to each of the one or more objects from a memory associated with the robotic system;

executing, by the one or more processors, one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object; and wherein the one or more markers include the physical marker disposed on the target object, wherein the physical marker is a geometric shape marker, and wherein adjusting position of the one or more end effectors comprises:

moving the one or more end effectors towards the geometric shape marker until at least one side of the geometric shape marker has a preferred length;

rotating the one or more end effectors until a bottom vertex of the geometric shape marker is disposed in a bottom position of the real-time image of the target object;

shifting the one or more end effectors along an x-axis or y-axis of the real-time image of the target object until a center of the geometric shape marker is in a center position of the real-time image of the target object; and adjusting a slope of the one or more end effectors until each angle of the geometric shape marker are at least one of equal to a predetermined maximum difference between the angles that is smaller than their difference prior to initiating the adjustment of the position of the one or more end effectors.

43. A robotic system, comprising:

one or more hardware processors operable to:

receive environment data corresponding to a current environment from one or more sensors configured in the robotic system;

detect one or more objects in the current environment;

retrieve interaction data corresponding to the one or more objects from a memory associated with the robotic system; and execute one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a predetermined standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein positioning the virtual markers using shape analysis technique by:

receiving real-time images of a target object from at least one image capturing device associated with the one or more end effectors;

determining a shape of the target object and longest and shortest sides of the target object, wherein the sides of the target object are determined as longest and shortest with reference to length of each side of the target object;

determining a geometric center of the target object based on the shape of the target object, and the longest and the shortest sides of the target object; and positioning a geometric shape on the target object, wherein each side of the geometric shape is equal to a portion of the shortest side of the target object; the geometric shape is oriented along the longest side of the target object; and the geometric shape having a geometric shape that coincides with the geometric center of the target object; and positioning the virtual markers at each vertex of the geometric shape.

44. A robotic system, comprising:

one or more hardware processors operable to:

receive environment data corresponding to a current environment from one or more sensors configured in the robotic system;

detect one or more objects in the current environment;

retrieve interaction data corresponding to the one or more objects from a memory associated with the robotic system; and execute one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a predetermined standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the virtual markers are identified on the target object using at least one of a plurality of techniques: shape analysis technique, particle filtering technique or Convolutional Neural Network (CNN) technique; and wherein positioning the virtual markers using particle filtering technique by:

retrieving one or more predetermined values corresponding to predetermined positions of the target object from a memory associated with the robotic system;

receiving real-time images of the target object from at least one image capturing device associated with one or more end effectors;

generating one or more points within boundaries of the target object using the real-time images;

determining an estimated value for combination of visual features in neighborhood of each point in the one more points, wherein the visual features comprises at least one of histograms of gradients, spatial color distributions or texture features;

comparing each estimated value with each of the one or more predetermined values to identify respective proximal match; and positioning the virtual markers at each position on the target object corresponding to each proximal match.

45. A robotic system, comprising:

one or more hardware processors operable to:

receive environment data corresponding to a current environment from one or more sensors configured in the robotic system;

detect one or more objects in the current environment;

retrieve interaction data corresponding to the one or more objects from a memory associated with the robotic system; and execute one or more interactions on one or more corresponding objects in the one or more objects, based on the interaction data, wherein executing at least one of the one or more interactions on the one or more corresponding objects in the one or more objects comprises for each of the one or more interactions:

positioning one or more end effectors within a proximity of the corresponding one or more objects;

identifying one or more predefined positions of the one or more end effectors relative to the corresponding one or more objects, the predetermined standard position being selected from one or more standard positions of the one or more end effectors;

positioning the one or more end effectors at the identified standard position using one or more positioning techniques, the one or more positioning techniques including an object template matching technique or a marker-based technique, the object template matching technique having a sensor matching technique for use with standard objects or respective corresponding locations, the marker-based technique for use with the standard objects or non-standard objects; and controlling the one or more end effectors to execute the one or more interactions on the corresponding one or more objects;

wherein positioning one or more end effectors at a predetermined standard position using the marker-based technique comprises detecting one or more markers associated with a target object; and adjusting position of the one or more end effectors towards the standard position based on the detected one or more markers associated with the target object, wherein the position is adjusted using a real-time image of the target object received from at least one image capturing device associated with the one or more end effectors;

wherein the one or more markers comprises at least one of a physical marker disposed on the target object or a virtual marker corresponding to one or more points on the target object, wherein the one or more markers enable computation of position parameters comprising distance, orientation, angle, or slope, of the one or more end effectors with respect to the target object;

wherein the one or more markers include the physical marker disposed on the target object, wherein the physical marker is a geometric shape marker, and wherein the one or more processors adjust position of the one or more end effectors by:

moving the one or more end effectors towards the geometric shape marker until at least one side of the geometric shape marker has a preferred length;

rotating the one or more end effectors until a bottom vertex of the geometric shape marker is disposed in a bottom position of the real-time image of the target object;

shifting the one or more end effectors along an x-axis or y-axis of the real-time image of the target object until a center of the geometric shape marker is in or near a center position of the real-time image of the target object; and adjusting a slope of the one or more end effectors until each angle of the triangle-shaped marker is equal to a predetermined maximum difference between the angles that is smaller than their difference prior to initiating the adjustment of the position of the one or more end effectors.

* * * * *